US011920077B2

(12) United States Patent
Kumakura et al.

(10) Patent No.: US 11,920,077 B2
(45) **Date of Patent: *Mar. 5, 2024**

(54) REFRIGERATION CYCLE DEVICE FOR VEHICLE

(71) Applicant: DAIKIN INDUSTRIES, LTD., Osaka (JP)

(72) Inventors: Eiji Kumakura, Osaka (JP); Kazuhiro Furusho, Osaka (JP); Masaru Tanaka, Osaka (JP); Shun Ohkubo, Osaka (JP); Mitsushi Itano, Osaka (JP); Yuuki Yotsumoto, Osaka (JP); Akihito Mizuno, Osaka (JP); Tomoyuki Gotou, Osaka (JP); Yasufu Yamada, Osaka (JP); Tatsumi Tsuchiya, Osaka (JP); Kenji Gobou, Osaka (JP); Hitomi Kuroki, Osaka (JP); Daisuke Karube, Osaka (JP); Tatsuya Takakuwa, Osaka (JP); Tetsushi Tsuda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/260,775

(22) PCT Filed: Jul. 16, 2019

(86) PCT No.: PCT/JP2019/027988

§ 371 (c)(1),
(2) Date: Jan. 15, 2021

(87) PCT Pub. No.: WO2020/017520

PCT Pub. Date: Jan. 23, 2020

(65) Prior Publication Data

US 2021/0309902 A1 Oct. 7, 2021
US 2023/0029441 A2 Jan. 26, 2023

(30) Foreign Application Priority Data

| | | |
|---|---|---|
| Jul. 17, 2018 | (JP) | 2018-134448 |
| Dec. 4, 2018 | (JP) | 2018-227398 |
| Dec. 7, 2018 | (JP) | 2018-230259 |
| Jan. 30, 2019 | (JP) | 2019-013974 |
| Jan. 30, 2019 | (JP) | 2019-013979 |
| Feb. 5, 2019 | (JP) | 2019-018617 |
| Feb. 6, 2019 | (JP) | 2019-019701 |
| Apr. 16, 2019 | (JP) | 2019-078133 |
| Apr. 25, 2019 | (JP) | 2019-084708 |
| Jun. 17, 2019 | (JP) | 2019-112408 |
| Jun. 21, 2019 | (JP) | 2019-115584 |
| Jul. 8, 2019 | (WO) | PCT/JP2019/027031 |

(51) Int. Cl.
*C09K 5/04* (2006.01)
*B60H 1/32* (2006.01)
(Continued)

(52) U.S. Cl.
CPC .......... *C09K 5/045* (2013.01); *B60H 1/3227* (2013.01); *C10M 171/008* (2013.01);
(Continued)

(58) Field of Classification Search
CPC ............. C09K 5/045; C09K 2205/126; C09K 2205/22; C09K 2205/106; C09K 2205/128; C09K 2205/40; C09K 5/04; C09K 2205/122; B60H 1/3227; B60H 1/3204; C10M 171/008; C10M 2207/0406; C10M 2207/2835; C10M 2209/1033; C10N 2040/30; F25B 2700/197; F25B 13/00; F25B 49/02; F25B 2313/0312; F25B 2313/0314; F25B 2339/047; F25B 2400/0403; F25B 2400/0411; F25B 2700/21162; F25B 1/00
(Continued)

(56) References Cited

U.S. PATENT DOCUMENTS

| | | | |
|---|---|---|---|
| 2,309,224 | A | 1/1943 | Terry et al. |
| 6,054,064 | A | 4/2000 | D'Aubarede |

(Continued)

FOREIGN PATENT DOCUMENTS

| | | |
|---|---|---|
| CA | 3 015 523 | 9/2017 |
| CN | 102245731 | 11/2011 |

(Continued)

OTHER PUBLICATIONS

International Preliminary Report on Patentability dated Jan. 19, 2021 in International (PCT) Application No. PCT/JP2019/027989.

(Continued)

*Primary Examiner* — Douglas J McGinty
(74) *Attorney, Agent, or Firm* — Wenderoth, Lind & Ponack, L.L.P.

(57) ABSTRACT

No studies have been made regarding what kinds of refrigerants should be used in a refrigeration cycle device for a vehicle. An air conditioner (1) for a vehicle includes a refrigerant circuit (10) and a refrigerant that is sealed in the refrigerant circuit (10). The refrigerant circuit (10) includes a compressor (80), a first heat exchanger (85), which serves as a heat dissipater in a dehumidifying heating mode, an outside-air heat exchanger (82), a cooling control valve (87), and a second heat exchanger (86), which serves as an evaporator in the dehumidifying heating mode. The refrigerant is a refrigerant having a low GWP.

12 Claims, 57 Drawing Sheets

(51) Int. Cl.
*C10M 171/00* (2006.01)
*C10N 40/30* (2006.01)

(52) U.S. Cl.
CPC .. *C09K 2205/106* (2013.01); *C09K 2205/126* (2013.01); *C09K 2205/128* (2013.01); *C09K 2205/40* (2013.01); *C10M 2207/0406* (2013.01); *C10M 2207/2835* (2013.01); *C10M 2209/1033* (2013.01); *C10N 2040/30* (2013.01)

(58) Field of Classification Search
USPC .......................................................... 252/67
See application file for complete search history.

(56) References Cited

U.S. PATENT DOCUMENTS

| | | | | |
|---|---|---|---|---|
| 6,658,882 | B2 | 12/2003 | Ohama et al. | |
| 8,168,077 | B2 | 5/2012 | Spatz | |
| 8,961,811 | B2 * | 2/2015 | Minor | F01K 25/08 516/8 |
| 10,131,827 | B2 * | 11/2018 | Fukushima | C09K 5/044 |
| 11,365,335 | B2 | 6/2022 | Itano et al. | |
| 11,441,819 | B2 | 9/2022 | Itano et al. | |
| 11,447,613 | B2 | 9/2022 | Fabian et al. | |
| 2006/0243945 | A1 | 11/2006 | Minor | |
| 2010/0122545 | A1 | 5/2010 | Minor et al. | |
| 2011/0252801 | A1 | 10/2011 | Minor et al. | |
| 2011/0253927 | A1 * | 10/2011 | Minor | F25B 45/00 252/182.29 |
| 2011/0258146 | A1 | 10/2011 | Low | |
| 2013/0193368 | A1 | 1/2013 | Low | |
| 2014/0077123 | A1 | 3/2014 | Fukushima | |
| 2015/0027156 | A1 | 1/2015 | Bellamy, Jr. | |
| 2015/0051426 | A1 | 2/2015 | Fukushima et al. | |
| 2015/0322232 | A1 | 11/2015 | Hong et al. | |
| 2015/0322321 | A1 | 11/2015 | Deur-Bert et al. | |
| 2015/0376486 | A1 | 12/2015 | Hashimoto et al. | |
| 2016/0002518 | A1 | 1/2016 | Taniguchi et al. | |
| 2016/0075927 | A1 | 3/2016 | Fukushima | |
| 2016/0097569 | A1 | 4/2016 | Matsunaga | |
| 2016/0333243 | A1 | 11/2016 | Fukushima et al. | |
| 2016/0333244 | A1 | 11/2016 | Fukushima | |
| 2016/0340565 | A1 | 11/2016 | Tasaka et al. | |
| 2016/0347980 | A1 | 12/2016 | Okamoto | |
| 2017/0002245 | A1 | 1/2017 | Fukushima | |
| 2017/0058171 | A1 | 3/2017 | Fukushima et al. | |
| 2017/0058172 | A1 | 3/2017 | Fukushima et al. | |
| 2017/0058173 | A1 | 3/2017 | Fukushima | |
| 2017/0058174 | A1 | 3/2017 | Fukushima et al. | |
| 2017/0138642 | A1 | 5/2017 | Ueno et al. | |
| 2017/0146284 | A1 | 5/2017 | Matsunaga et al. | |
| 2017/0218241 | A1 | 8/2017 | Deur-Bert et al. | |
| 2018/0002586 | A1 | 1/2018 | Low | |
| 2018/0051198 | A1 | 2/2018 | Okamoto et al. | |
| 2018/0057724 | A1 | 3/2018 | Fukushima | |
| 2018/0079941 | A1 | 3/2018 | Ueno et al. | |
| 2018/0320942 | A1 | 11/2018 | Hayamizu et al. | |
| 2020/0041174 | A1 | 2/2020 | Wakabayashi et al. | |
| 2020/0048520 | A1 | 2/2020 | Fukushima | |
| 2020/0079986 | A1 | 3/2020 | Fukushima | |
| 2020/0326100 | A1 | 10/2020 | Ukibune et al. | |
| 2020/0326103 | A1 | 10/2020 | Kumakura et al. | |
| 2020/0326109 | A1 | 10/2020 | Kumakura et al. | |
| 2020/0385622 | A1 | 12/2020 | Itano et al. | |
| 2020/0393178 | A1 | 12/2020 | Kumakura et al. | |
| 2021/0198549 | A1 | 7/2021 | Fukushima | |
| 2022/0089928 | A1 | 3/2022 | Fukushima | |
| 2022/0389299 | A1 * | 12/2022 | Itano | C10M 171/008 |
| 2022/0404070 | A1 * | 12/2022 | Ohtsuka | F25B 31/026 |
| 2023/0002659 | A1 * | 1/2023 | Itano | C09K 5/045 |

FOREIGN PATENT DOCUMENTS

| | | |
|---|---|---|
| CN | 104837951 | 8/2015 |
| CN | 105164227 | 12/2015 |
| CN | 105452417 | 3/2016 |
| CN | 106029821 | 10/2016 |
| CN | 106029823 | 10/2016 |
| CN | 106133110 | 11/2016 |
| CN | 106414654 | 2/2017 |
| CN | 106414682 | 2/2017 |
| CN | 107614651 | 1/2018 |
| CN | 107614652 | 1/2018 |
| CN | 108699428 | 10/2018 |
| CN | 111032817 | 4/2020 |
| CN | 111479894 | 7/2020 |
| EP | 0 811 670 | 12/1997 |
| EP | 3 012 556 | 4/2016 |
| EP | 3 101 082 | 12/2016 |
| EP | 3 109 292 | 12/2016 |
| EP | 3 121 242 | 1/2017 |
| EP | 3 153 559 | 4/2017 |
| EP | 3 153 567 | 4/2017 |
| EP | 3 305 869 | 4/2018 |
| EP | 3 423 541 | 1/2019 |
| EP | 3 666 848 | 6/2020 |
| EP | 3 739 018 | 11/2020 |
| EP | 3 825 382 | 5/2021 |
| FR | 3 000 095 | 6/2014 |
| GB | 2530915 | 4/2016 |
| GB | 2566809 | 3/2019 |
| JP | 9-324175 | 12/1997 |
| JP | 2012-510550 | 5/2012 |
| JP | 2013-529703 | 7/2013 |
| JP | WO2014/203353 | 12/2014 |
| JP | 5689068 | 3/2015 |
| JP | WO2015/136977 | 9/2015 |
| JP | 2015-214927 | 12/2015 |
| JP | 2015-229767 | 12/2015 |
| JP | WO2015/186558 | 12/2015 |
| JP | 2016-11423 | 1/2016 |
| JP | 2016-501978 | 1/2016 |
| JP | 2016-028119 | 2/2016 |
| JP | 2016-539208 | 12/2016 |
| JP | 6105511 | 3/2017 |
| JP | 2017-145380 | 8/2017 |
| JP | 2018-104565 | 7/2018 |
| JP | 2018-104566 | 7/2018 |
| JP | 2018-177966 | 11/2018 |
| JP | 2018-177967 | 11/2018 |
| JP | 2018-177968 | 11/2018 |
| JP | 2018-177969 | 11/2018 |
| JP | 2018-179404 | 11/2018 |
| JP | 2018-184597 | 11/2018 |
| JP | 2019-34972 | 3/2019 |
| JP | 2019-034983 | 3/2019 |
| JP | 2019-512031 | 5/2019 |
| JP | 2019-207054 | 12/2019 |
| KR | 10-2011-0099253 | 9/2011 |
| KR | 10-2015-0099530 | 8/2015 |
| KR | 10-2018-0118174 | 10/2018 |
| MX | 2018010417 | 11/2018 |
| WO | 2005/105947 | 11/2005 |
| WO | 2009/036537 | 3/2009 |
| WO | 2010/059677 | 5/2010 |
| WO | 2010/064011 | 6/2010 |
| WO | 2011/163117 | 12/2011 |
| WO | 2014/085973 | 6/2014 |
| WO | 2014/102477 | 7/2014 |
| WO | 2014/178352 | 11/2014 |
| WO | 2014/203356 | 12/2014 |
| WO | 2015/015881 | 2/2015 |
| WO | 2015/054110 | 4/2015 |
| WO | 2015/115252 | 8/2015 |
| WO | 2015/125874 | 8/2015 |
| WO | 2015/125885 | 8/2015 |
| WO | 2015/141678 | 9/2015 |
| WO | 2015/186557 | 12/2015 |
| WO | 2015/186670 | 12/2015 |
| WO | 2015/186671 | 12/2015 |
| WO | 2016/075541 | 5/2016 |
| WO | 2016/182030 | 11/2016 |
| WO | 2016/190177 | 12/2016 |
| WO | 2016/194847 | 12/2016 |

(56) References Cited

FOREIGN PATENT DOCUMENTS

| | | |
|---|---|---|
| WO | 2017/122517 | 7/2017 |
| WO | 2018/193974 | 10/2018 |
| WO | 2019/030508 | 2/2019 |
| WO | 2019/123782 | 6/2019 |
| WO | 2019/124396 | 6/2019 |
| WO | 2019/124398 | 6/2019 |
| WO | 2019/124399 | 6/2019 |
| WO | 2019/172008 | 9/2019 |
| WO | 2020/017520 | 1/2020 |
| WO | 2020/017521 | 1/2020 |
| WO | 2020/017522 | 1/2020 |
| WO | 2020/071380 | 4/2020 |
| WO | 2020/256129 | 12/2020 |
| WO | 2020/256131 | 12/2020 |
| WO | 2020/256134 | 12/2020 |

OTHER PUBLICATIONS

International Search Report dated Sep. 10, 2019 in International (PCT) Application No. PCT/JP2019/027989.

International Preliminary Report on Patentability dated Jan. 19, 2021 in International (PCT) Application No. PCT/JP2019/027988.

International Search Report dated Sep. 10, 2019 in International (PCT) Application No. PCT/JP2019/027988.

International Preliminary Report on Patentability dated Jan. 19, 2021 in International (PCT) Application No. PCT/JP2019/027990.

International Search Report dated Oct. 21, 2019 in International (PCT) Application No. PCT/JP2019/027990.

International Preliminary Report on Patentability dated Jul. 27, 2021 in International (PCT) Application No. PCT/JP2020/002974.

International Search Report dated Apr. 14, 2020 in International (PCT) Application No. PCT/JP2020/002974.

International Search Report dated Sep. 3, 2019 in International (PCT) Application No. PCT/JP2019/027031.

International Search Report dated Jan. 28, 2020 in International (PCT) Application No. PCT/JP2019/047097.

International Search Report dated Mar. 31, 2020 in International (PCT) Application No. PCT/JP2019/050501.

Extended European Search Report dated Apr. 21, 2021 in European Patent Application No. 19912660.8.

Takahashi et al., "Construction of Comprehensive Reaction Model for Predicting Tetrafluoroethylene Explosion by High-Pressure Shock Tube", (https://kaken.nii.ac.jp/), Research Result Report of Grants-in-Aid for Scientific Research, 2018, 4 pages, Abstract.

Otsuka et el., "Development of control method of HFO-1123 disproportionation and investigation of probability of HFO-1123 disproportionation", AGC Research Report, 2018, No. 68, pp. 29-33, Abstract.

International Search Report dated Mar. 31, 2020 in International (PCT) Application No. PCT/JP2020/003943.

International Search Report dated Mar. 31, 2020 in International (PCT) Application No. PCT/JP2020/003990.

International Search Report dated Jul. 21, 2020 in International (PCT) Application No. PCT/JP2020/016787.

International Search Report dated Jul. 28, 2020 in International (PCT) Application No. PCT/JP2020/17777.

Chief Editor: Fei Qian, Marine Auxiliary Engine, Dalian Maritime University Press, 2008, 3rd Ed., pp. 224-225, with English translation.

Trane Air Conditioning Manual, Chapter X, The Air Conditioning System, pp. 303-359, 1996.

* cited by examiner

REFRIGERATION CYCLE DEVICE FOR VEHICLE

TECHNICAL FIELD

The present disclosure relates to a refrigeration cycle device for a vehicle that uses a refrigerant having a low global warming potential (GWP).

BACKGROUND ART

Hitherto, in a heat cycle system of a refrigeration device or a freezing device, R134a, which is a single refrigerant, has been frequently used as a refrigerant. In addition, R410A or R404 may be used. R410A is a two-component mixed refrigerant containing (CH2F2; HFC-32 or R32) and pentafluoroethane (C2HF5; HFC-125 or R125), and is a pseudo-azeotropic composition. R404 is a three-component mixed refrigerant containing R125, R134a, and R143a, and is a pseudo-azeotropic composition.

However, the global warming potential (GWP) of R134a is 1430, the global warming potential (GWP) of R410A is 2088, and the global warming potential (GWP) of R404A is 3920. In recent years, due to increasing concern about global warming, refrigerants having a lower GWP are more frequently being used.

For example, Japanese Literature 1 (International Publication No. 2005/105947) proposes various mixed refrigerants having a low GWP that can be used as alternatives for R134a; Japanese Literature 2 (International Publication No. 2015/141678) proposes various mixed refrigerants having a low GWP that can be used as alternatives for R410A; and Japanese Literature 3 (Japanese Unexamined Patent Application Publication No. 2018-184597) proposes various mixed refrigerants having a low GWP that can be used as alternatives for R404A.

SUMMARY OF INVENTION

Technical Problem

So far, no studies have been made regarding what kinds of refrigerants should be used among refrigerants having a low GWP in a refrigeration cycle device for a vehicle.

Solution to Problem

A refrigeration cycle device for a vehicle according to a first aspect includes a refrigerant circuit and a refrigerant that is sealed in the refrigerant circuit. The refrigerant circuit includes a compressor, a heat dissipater, a decompressor, and a heat absorber. The refrigerant contains at least 1,2-difluoroethylene.

A refrigeration cycle device for a vehicle according to a second aspect is the refrigeration cycle device for a vehicle according to the fast aspect, in which the refrigerant contains trans-1,2-difluoroethylene (HFO-1132(E)), trifluoroethylene (HFO1123), and 2,3,3,3-tetrafluoro-1-propene (R1234yf).

A refrigeration cycle device for a vehicle according to a third aspect is the refrigeration cycle device for a vehicle according to the second aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments OD, DG, GH, and HO that connect the following 4 points:

point D (87.6, 0.0, 12A),
point G (18.2, 55.1, 26.7),
point H (56.7, 43.3, 0.0), and
point O (100.0, 0.0, 0.0), or on the line segments OD, DG, and GH (excluding the points O and H);

the line segment DG is represented by coordinates ($0.0047y^2-1.5177y+87.598$, y, $-0.0047y^2+0.5177y+12.402$), the line segment GH is represented by coordinates ($-0.0134z^2-1.0825z+56.692$, $0.0134z^2+0.0825z+43.308$, z), and the line segments HO and OD are straight lines.

A refrigeration cycle device for a vehicle according to a fourth aspect is the refrigeration cycle device for a vehicle according to the second aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments LG, GH, HI, and IL that connect the following 4 points:

point L (72.5, 10.2, 17.3),
point G (18.2, 55.1, 26.7),
point H (56.7, 43.3, 0.0), and
point I (72.5, 27.5, 0.0), or on the line segments LG, GH, and IL (excluding the points H and I);

the line segment LG is represented by coordinates ($0.0047y^2-1.5177y+87.598$, y, $-0.0047y^2+0.5177y+12.402$), the line segment GH is represented by coordinates ($-0.0134z^2-1.0825z+56.692$, $0.0134z^2+0.0825z+43:308$, z), and the line segments HI and IL are straight lines.

A refrigeration cycle device for a vehicle according to a fifth aspect is the refrigeration cycle device for a vehicle according to any one of the second aspect to the fourth aspect, further comprising difluoromethane (R32).

A refrigeration cycle device for a vehicle according to a sixth aspect is the refrigeration cycle device for a vehicle according to the fifth aspect, wherein when the mass % of HFO-1132(E), HFO-1123, R1234yf, and R32 based on their sum in the refrigerant is respectively represented by x, y, z, and a, if $0<a\leq 10.0$, coordinates (x,y,z) in a ternary composition diagram in which the sum of HFO-1132(E), HFO-1123, and R1234yf is 100 mass % are within the range of a figure surrounded by straight lines that connect the following 4 points:

point A ($0.02a^2-2.46a+93.4$, 0, $-0.02a^2+2.46a+6.6$),
point B' ($-0.008a^2-1.38a+56.0.018a^2-0.53a+26.3$, $-0.01a^2+1.91a+17.7$),
point C ($-0.016a^2+1.02a+77.6$, $0.016a^2-1.02a+22.4$, 0), and
point O (100.0, 0.0, 0.0), or on the straight lines OA, AB', and B'C (excluding point O and point C);

if $10.0<a\leq 16.5$, coordinates (x,y,z) in the ternary composition diagram are within the range of a figure surrounded by straight lines that connect the following 4 points:

point A ($0.0244a^2-2.5695a+94.056$, 0, $-0.0244a^2+2.5695a+5.944$), point B' ($0.1161a^2-1.9959a+59.749$, $0.014a^2-0.3399a+24.8$, $-0.1301a^2+2.3358a+15.451$), point C ($0.0161a^2+1.02a+77.6$, $0.0161a^2-1.02a+22.4$, 0), and point O (100.0, 0.0, 0.0), or on the straight lines OA, AB', and B'C (excluding point C and point C); or if $16.5<a\leq71.8$, coordinates (x,y,z) in the ternary composition diagram are within the range of a figure surrounded by straight lines that connect the following 4 points:

point A ($0.0161a^2-2.3535a+92.742$, 0, $-0.0161a^2+2.3535a+7.258$), point B' ($-0.0435a^2-0.0435a+50.406$, $-0.0304a^2+1.8991a-0.0661$, $0.0739a^2-1.8556a+49.6601$), point C ($-0.0161a^2+0.9959a+77.851$, $0.0161a^2-0.9959a+22.149$, 0), and point O (100.0, 0.0, 0.0), or on the straight lines OA, AB', and B'C (excluding point O and point C).

A refrigeration cycle device for a vehicle according to a seventh aspect is the refrigeration cycle device for a vehicle according to the second aspect, wherein the refrigerant comprising HFO-1132(E) and HFO-1123 in a total amount of 99.5 mass % or more based on the entire refrigerant, and the refrigerant comprising 62.5 mass % to 72.5 mass % of HFO-1132(E) based on the entire refrigerant.

A refrigeration cycle device for a vehicle according to a eighth aspect is the refrigeration cycle device for a vehicle according to the first aspect, wherein.

the refrigerant comprising HFO-1132(E), R32, and R1234yf, wherein when the mass % of HFO-1132(E), R32, and R1234yf based on their sum in the refrigerant is respectively represented by x, y, and z; coordinates (x,y,z) in a ternary composition diagram in which the sum of HFO-1132(E), R32, and R1234yf is 100 mass % are within the range of a figure surrounded by line segments AC, CF, FD, and DA that connect the following 4 points:

point A (71.1, 0.0, 28.9), point C (36.5, 18.2, 45.3), point F (47.6, 18.3, 34.1), and point D (72.0, 0.0, 28.0), or on these line segments;

the line segment AC is represented by coordinates ($0.0181y^2-2.2288y+71.096$, y, $0.0181y^2+1.2288y+28.904$), the line segment FD is represented by coordinates ($0.02y^2-1.7y+72$, y, $0.02y^2+0.7y+28$), and the line segments CF and DA are straight lines.

A refrigeration cycle device for a vehicle according to a ninth aspect is the refrigeration cycle device for a vehicle according to the first aspect, wherein the refrigerant comprising HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments AB, BE, ED, and DA that connect the following 4 points:

point A (711, 0.0, 28.9), point B (42.6, 14.5, 42.9), point E (51.4, 14.6, 34.0), and point D (72.0, 0.0, 28.0), or on these line segments;

the line segment AB is represented by coordinates ($0.0181y^2-2.2288y+71.096$, y, $-0.0181y^2+1.2288y+28.904$), the line segment ED is represented by coordinates ($0.02y^2-1.7y+72$, y, $-0.02y^2+0.7y+28$), and the line segments BE and DA are straight lines.

A refrigeration cycle device for a vehicle according to a tenth aspect is the refrigeration cycle device for a vehicle according to the first aspect, wherein the refrigerant comprising HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments GI, IJ, and JG that connect the following 3 points:

point G (77.5, 6.9, 15.6), point I (55.1, 18.3, 26.6), and point J (77.5, 18.4, 4.1), or on these line segments;

the line segment GI is represented by coordinates ($0.02y^2-2.4583y+93.396$, y, $-0.02y^2+1.4583y+6.604$), and the line segments IJ and JO are straight lines.

A refrigeration cycle device for a vehicle according to a eleventh aspect is the refrigeration cycle device for a vehicle according to the first aspect, wherein the refrigerant comprising HFO-1132(E), R32, and R1234yf, wherein.

when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments GH, HK, and KG that connect the following 3 points:

point G (77.5, 6.9, 15.6), point H (61.8, 14.6, 23.6), and point K (77.5, 14.6, 7.9), or on these line segments;

the line segment GH is represented by coordinates ($0.02y^2-2.4583y+93.396$, y, $0.02y^2+1.4583y+6.604$), and the line segments HK and KG are straight lines.

A refrigeration cycle device for a vehicle according to a twelfth aspect is the refrigeration cycle device for a vehicle according to the first aspect, wherein the refrigerant comprising HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'E', E'A', and A'O that connect the following 5 points:

point O (100.0, 0.0, 0.0),
point C' (56.7, 43.3, 0.0),
point D' (52.2, 38.3, 9.5),
point E' (41.8, 39.8, 18.4), and
point A' (81.6, 0.0, 18.4), or on the line segments C'D', D'E', and E'A' (excluding the points C' and A');

the line segment C'D' is represented by coordinates $(-0.0297z^2-0.1915z+56.7,\ 0.0297z^2+1.1915z+43.3,\ z)$, the line segment D'E' is represented by coordinates $(-0.0535z^2+0.3229z+53.957,\ 0.0535z^2+0.6771z+46.043,\ z)$, and the line segments OC', E'A', and A'O are straight lines.

A refrigeration cycle device for a vehicle according to a thirteenth aspect is the refrigeration cycle device for a vehicle according to the fast aspect, wherein the refrigerant comprising HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum off-MO-1132(E), HFO-1123, and R32 is 100 mass % are within the range of a figure surrounded by line segments OC, CD, DE, EA', and A'O that connect the following 5 points:

point O (100.0, 0.0, 0.0),
point C (77.7, 22.3, 0.0),
point D (76.3, 14.2, 9.5),
point E (72.2, 9.4, 18.4), and
point A' (81.6, 0.0, 18.4), or on the line segments CD, DE, and EA' (excluding the points C and A');

the line segment CDE is represented by coordinates $(-0.017z^2+0.0148z+77.684,\ 0.017z^2+0.9852z+22316,\ z)$, and the line segments OC, EA', and A'O are straight lines.

A refrigeration cycle device for a vehicle according to a fourteenth aspect is the refrigeration cycle device for a vehicle according to the first aspect, wherein the refrigerant comprising HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'A, and AO that connect the following 4 points:

point O (100.0, 0.0, 0.0),
point C' (56.7, 43.3, 0.0),
point D' (52.2, 38.3, 9.5), and
point A (90.5, 0.0, 9.5), or on the line segments C'D' and D'A (excluding the points C' and A);

the line segment C'D' is represented by coordinates $(-0.0297z^2-0.1915z+56.7,\ 0.0297z^2+1.1915z+43.3,\ z)$, and the line segments OC', D'A, and AO are straight lines.

A refrigeration cycle device for a vehicle according to a fifteenth aspect is the refrigeration cycle device for a vehicle according to the first aspect, wherein the refrigerant comprising HFO-1132(E), HFO-1123, and R32, wherein when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DA, and AO that connect the following 4 points:

point O (100.0, 0.0, 0.0),
point C (77.7, 22.3, 0.0),
point D (76.3, 14.2, 9.5), and
point (90.5, 0.0, 9.5), or on the line segments CD and DA (excluding the points C and A);

the line segment CD is represented by coordinates $(-0.017z^2+0.0148z+77.684,\ 0.017z^2+0.9852z+22.316,\ z)$, and the line segments OC, DA, and AO are straight lines.

A refrigeration cycle device for a vehicle according to a sixteenth aspect is the refrigeration cycle device for a vehicle according to the first aspect, wherein the refrigerant contains $CO_2$, trans-1,2-difluoroethylene (HFO-1132(E)), difluoromethane (R32), and 2,3,3,3-tetrafluoro-1-propene (R1234yf);

wherein when the mass % of $CO_2$, R32, HFO-1132(E), and R1234yf based on their sum in the refrigerant is respectively represented by w, x, y, and z, if $0<w\leq1.2$, coordinates (x,y,z) in a ternary composition diagram in which the sum of R32, HFO-1132(E), and R1234yf is (100−w) mass % are within the range of a figure surrounded by curve IJ, curve JK, curve KL, straight line LB", straight line B"D, straight line DC, and straight line CI that connect the following 7 points or on these line segments (excluding points on straight line B"D and straight line CI):

point I (0.0, 72.0, 28.0−w)
point J (18.3, 48.5, 33.2−w)
point K (36.8, 35.6, 27.6−w)
point L (51.7, 28.9, 19.4−w)
point B" $(-1.5278w^2+2.75w+50.5,\ 0.0,\ 1.5278w^2-3.75w+49.5)$
point D $(-2.9167w+40.317,\ 0.0,\ 1.9167w+59.683)$
point C $(0.0,\ -4.9167w+58.317,\ 3.9167w+41.683)$;

if $1.2<w\leq4.0$, coordinates (x,y,z) in the ternary composition diagram are within the range of a figure surrounded by curve IJ, curve JK, curve KL, straight line LB", straight line B"D, straight line DC, and straight line CI that connect the following 7 points or on these line segments (excluding the points on straight line B"D and straight line CI):

point I (0.0, 72.0, 28.0−w)
point J (18.3, 48.5, 33.2−w)
point K (36.8, 35.6, 27.6−w)
point L (51.7, 28.9, 19.4−w)
point B" (51.6, 0.0, 48.4−w)
point D $(-2.8226w+40.211,\ 0.0,\ 1.8226w+59.789)$
point C $(0.0,\ 0.1081w^2-5.169w+58.447,\ -0.1081w^2+4.169w+41.553)$; and if $4.0<w\leq7.0$, coordinates (x,y,z) in the ternary composition diagram are within the range of a figure surrounded by curve IJ, curve JK, curve KL, straight line LB", straight line B"D, straight line DC, and straight line CI that connect the following 7 points or on these line segments (excluding points on straight line B'D and straight line CI):

point I (0.0, 72.0, 28.0−w)

point J (18.3, 48.5, 33.2−w)

point K (36.8, 35.6, 27.6−w)

point L (51.7, 28.9, 19.4−w)

point B" (51.6, 0.0, 48.4−w)

point D (−2.8w+40.1, 0.0, 0.1.8w+59.9)

point C (0.0, $0.0667w^2$−4.9667w+58.3, $-0.0667w^2$+3.9667w+41.7), and curve IJ is represented by coordinates (x, $0.0236x^2$−1.716x+72, $-0.0236x^2$+0.716x+28−w), curve JK is represented by coordinates (x, $0.0095x^2$−1.2222x+67.676, $-0.0095x^2$+0.2222x+32.324−w), and curve KL is represented by coordinates (x, $0.0049x^2$−0.8842x+61.488, $-0.0049x^2$−0.1158x+38.512).

A refrigeration cycle device for a vehicle according to a seventeenth aspect is the refrigeration cycle device for a vehicle according to the first aspect, wherein the refrigerant contains $CO_2$, trans-1,2-difluoroethylene (HFO-1132(E)), difluoromethane (R32), and 2,3,3,3-tetrafluoro-1-propene (R1234yf);

wherein when the mass % of $CO_2$, R32, HFO-1132(E), and R1234yf based on their sum in the refrigerant is respectively represented by w, x, y, and z, if 0<w≤1.2, coordinates (x,y,z) in a ternary composition diagram in which the sum of R32, HFO-1132(E), and R1234yf is (100−w) mass % are within the range of a figure surrounded by curve IJ, curve JK, straight line KF, straight line FC, and straight line CI that connect the following 5 points or on these line segments (excluding points on straight line CI):

point I (0.0, 72.0, 28.0−w)

point 0.1 (18.3, 48.5, 33.2−w)

point K (36.8, 35.6, 27.6−w)

point F (−0.0833w+36.717, −4.0833w+5.1833, 3.1666w+58.0997)

point C (0.0, −4.9167w+58.317, 3.9167w+41.683);

if 1.2<w≤1.3, coordinates (x,y,z) in the ternary composition diagram are within the range of a figure surrounded by curve IJ, curve JK, straight line KF, straight line FC, and straight line CI that connect the following 5 points or on these line segments (excluding points on straight line CI):

point I (0.0, 72.0, 28.0−w)

point J (18.3, 48.5, 33.2−w)

point K (36.8, 35.6, 27.6−w)

point F (36.6, −3w+3.9, 2w+59.5)

point C (0.0, $0.1081w^2$−5.169w+58.447, $-0.1081w^2$+4.169w+41.553);

if 1.3<w≤4.0, coordinates (x,y,z) in the ternary composition diagram are within the range of a figure surrounded by curve IJ, curve JK, straight line KB', straight line B'D, straight line DC, and straight line CI that connect the following 6 points or on these line segments (excluding points on straight line CI):

point I (0.0, 72.0, 28.0−w)

point J (18.3, 48.5, 33.2−w)

point K (36.8, 35.6, 27.6−w)

point B'(36.6, 0.0, −w+63.4)

point D (−2.8226w+40.211, 0.0, 1.8226w+59.789)

point C (0.0, $0.1081w^2$−5.169w+58.447, $-0.1081w^2$+4.169w+41.553); and if 4.0<w≤7.0, coordinates (x,y,z) in the ternary composition diagram are within the range of a figure surrounded by curve IJ, curve JK, straight line KB', straight line B'D, straight line DC, and straight line CI that connect the following 6 points or on these line segments (excluding points on straight line. CI):

point I (0.0, 72.0, 28.0−w)

point J (18.3, 48.5, 33.2−w)

point K (36.8, 35.6, 27.6−w)

point B' (36.6, 0.0, −w+63.4)

point D (−2.8w+40.1, 0.0, 1.8w+59.9)

point C (0.0, $0.0667w^2$−4.9667w+58.3, $-0.0667w^2$+3.9667w+41.7), and curve IJ is represented by coordinates (x, $0.0236x^2$−1.716x+72, $-0.0236x^2$+0.716x+28−w), and curve JK is represented by coordinates (x, $0.0095x^2$ 0.1.2222x+67.676, $-0.0095x^2$+0.2222x+32.324−w).

A refrigeration cycle device for a vehicle according to a eighteenth aspect is the refrigeration cycle device for a vehicle according to the first aspect, wherein the refrigerant contains $CO_2$, R32, HFO-1132(E), and R1234yf;

wherein when the mass % of $CO_2$, R32, HFO-1132(E), and R1234yf based on their sum in the refrigerant is respectively represented by w, x, y, and z, if 0<w≤1.2, coordinates (x,y,z) in a ternary composition diagram in which the sum of R32, HFO-1132(E), and R1234yf is (100−w) mass % are within the range of a figure surrounded by curve IJ, curve JK, straight line KF, straight line FC, and straight line CI that connect the following 4 points or on these line segments (excluding points on straight line CI):

point I (0.0, 72.0, 28.0−w)

point J (18.3, 48.5, 33.2−w)

point E (18.2, $-1.1111w^2$−3.1667w+31.9, $1.1111w^2$+2.1667w+49.9)

point C (0.0, −4.9167w+58.317, 3.9167w+41.683);

if 1.2<w≤4.0, coordinates (x,y,z) in the ternary composition diagram are within the range of a figure surrounded by curve IJ, curve JK, straight line KF, straight line FC, and straight line CI that connect the following 4 points or on these line segments (excluding points on straight line CI):

point I (0.0, 72.0, 28.0−w)

point J (18.3, 48.5, 33.2−w)

point E (−0.0365w+18.26, $0.0623w^2$−4.5381w+31.856, $-0.0623w^2$+3.5746w+49.884)

point C (0.0, $0.1081w^2$−5.169w+58.447, $-0.1081w^2$+4.169w+41.553); and if 4.0<w≤7.0, coordinates (x,y,z) in the ternary composition diagram are within the range of a figure surrounded by curve IJ, curve JK, straight line KF, straight line FC, and straight line CI that connect the following 4 points or on these line segments (excluding points on straight line CI):

point I (0.0, 72.0, 28.0−w)

point J (18.3, 48.5, 33.2−w)

point E (18.1, $0.0/111w^2$−4.3556w+31.411, $-0.0444w^2$+3.3556w+50.489)

point C (0.0, $0.0667w^2$−4.9667w+58.3, $-0.0667w^2$+3.9667w+41.7), and curve IJ is represented by coordinates (x, $0.0236x^2$−1.716x+72, $-0.0236x^2$+0.716x+28−w).

A refrigeration cycle device for a vehicle according to a nineteenth aspect is the refrigeration cycle device for a vehicle according to the first aspect, wherein the refrigerant contains $CO_2$, R32, HFO-1132(E), and R1234yf;

wherein when the mass % of $CO_2$, R32, HFO-1132(E), and R1234yf based on their sum in the refrigerant is respectively represented by w, x, y, and z, if $0<w\leq 0.6$, coordinates (x,y,z) in a ternary composition diagram in which the sum of R32, HFO-1132(E), and R1234yf is (100−w) mass % are within the range of a figure surrounded by curve GO, curve OP, straight line PB", straight line B"D, and straight line DG that connect the following 5 points or on these line segments (excluding points on straight line B'D):

point G $(-5.8333w^2-3.1667w+22.2,\ 7.0833w^2+1.4167w+26.2,\ -1.25w^2+0.75w+51.6)$ point O $(36.8,\ 0.8333w^2+1.8333w+22.6,\ -0.8333w^2-2.8333w+40.6)$ point P $(51.7,\ 1.1111w^2+20.5,\ -1.1111w^2-w+27.8)$ point B" $(-1.5278w^2+2.75w+50.5,\ 0.0,\ 1.5278w^2-3.75w+49.5)$ point D $(-2.9167w+40.317,\ 0.0,\ 1.9167w+59.683)$;

and if $0.6<w\leq 0.1.2$, coordinates (x,y,z) in the ternary composition diagram are within the range of a figure surrounded by curve GN, curve NO, curve OP, straight line PB", straight line B"D, and straight line DG that connect the following 6 points or on these line segments (excluding the points on straight line B"D):

point G $(5.8333w^2-3.1667w+22.2,\ 7.0833w^2+1.4167w+26.2,\ -1.25w^2+0.75w+51.6)$ point N $(18.2,\ 0.2778w^2+3w+27.7,\ -0.2778w^2-4w+54.1)$ point O $(36.8,\ 0.8333w^2+1.8333w+22.6,\ -0.8333w^2-2.8333w+40.6)$ point P $(51.7,\ 1.1111w^2+20.5,\ 1.1111w^2+20.5,\ -1.1111w^2-w+27.8)$ point B" $(-1.5278w^2+2.75w+50.5,\ 0.0,\ 1.5278w^2-3.75w+49.5)$ point D $(-2.9167w+40.317,\ 0.0,\ 1.9167w+59.683)$; and when $0<w\leq 0.6$, curve GO is represented by coordinates $(x,\ (0.00487w^2-0.0059w+0.0072)x^2+(-0.279w^2+0.2844w-0.6701)x+3.7639w^2-0.2467w+37.512,\ 100-w-x-y)$;

when $0.6<w\leq 1.2$, curve GN is represented by coordinates $(x,\ (0.0122w^2\ \ 0.0113w+0.0313)x^2+(-0.3582w^2+0.1624w-1.4551)x+2.7889w^2+3.7417w+43.824,\ 100-w-x-y)$;

when $0.6<w\leq 1.2$, curve NO is represented by coordinates $(x,\ (0.00487w^2-0.0059w+0.0072)x^2+(-0.279w^2+0.2844w-0.6701)x+3.7639w^2-0.2467w+37.512,\ 100-w-x-y)$; and when $0<w\leq 1.2$, curve OP is represented by coordinates $(x,\ (0.0074w^2\ \ 0.0133w+0.0064)x^2+(-0.5839w^2+1.0268w-0.7103)x+11.472w^2-17.455w+40.07,\ 100-w-x-y)$;

if $1.2<w\leq 4.0$, coordinates (x,y,z) in the ternary composition diagram are within the range of a figure surrounded by curve MW, curve WN, curve NO, curve OP, straight line PB", straight line B"D, straight line DC, and straight line CM that connect the following 8 points or on these line segments (excluding points on straight line B'D and straight line CM):

point M $(0.0,\ -0.3004w^2+2.419w+55.53,\ 0.3004w^2-3.419w+44.47)$ point W $(10.0,\ -0.3645w^2+3.5024w+44.422,\ 0.3645w^2-4.5024w+55.578)$ point N $(18.2,\ -0.3773w^2+3.319w+28.26,\ 0.3773w^2-4.319w+53.54)$ point O $(36.8,\ -0.1392w^2+1.4381w+24.475,\ 0.1392w^2-2.4381w+38.725)$ point P $(51.7,\ -0.2381w^2+1.881w+20.186,\ 0.2381w^2-2.881w+28.114)$ point B" $(51.6,\ 0.0,\ -w+48.4)$ point D $(-2.8226w+40.211,\ 0.0,\ 1.8226w+59.789)$ point C $(0.0,\ 0.1081w^2-5.169w+58.447,\ -0.1081w^2+4.169w+41.553)$, and curve MW is represented by coordinates $(x,\ (0.0043w^2-0.0359w+0.1509)x^2+(-0.0493w^2+0.4669w\ \ 3.6193)x-0.3004w^2+2.419w+55.53,\ 100-w-x-y)$, curve WN is represented by coordinates $(x,\ (0.0055w^2-0.0326w+0.0665)x^2+(-0.1571w^2+0.8981w-2.6274)x+0.6555w^2-2.2153w+54.044,\ 100-w-x-y)$, curve NO is represented by coordinates $(x,\ (-0.00062w^2+0.0036w+0.0037)x^2+(0.0375w^2-0.239w-0.4977)x-0.8575w^2+6.4941w+36.078,\ 100-w-x-y)$, and curve OP is represented by coordinates $(x,\ (-0.000463w^2+0.0024w-0.0011)x^2+(0.0457w^2-0.2581w-0.075)x-1.355w^2+8.749w+27.096,\ 100-w-x-y)$; and if $4.0<w\leq 7.0$, coordinates (x,y,z) in the ternary composition diagram are within the range of a figure surrounded by curve MW, curve WN, curve NO, curve OP, straight line PB", straight line B"D, straight line DC, and straight line CM that connect the following 8 points or on these line segments (excluding points on straight line BID and straight line CM):

point M $(0.0,\ -0.0667w^2+0.8333w+58.133,\ 0.0667w^2-1.8333w+41.867)$ point W $(10.0,\ 0.0667w^2+1.1w+39.267,\ 0.0667w^2-2.1w+50.733)$ point N $(18.2,\ -0.0889w^2+1.3778w+31.411,\ 0.0889w^2-2.3778w+50.389)$ point O $(36.8,\ -0.0441w^2+0.6889w+25.956,\ 0.0444w^2-1.6889w+37.244)$ point P $(51.7,\ -0.0667w^2+0.8333w+21.633,\ 0.0667w^2-1.8333w+26.667)$ point B $(51.6,\ 0.0,\ -w+48.4)$ point D $(-2.8w+40.1,\ 0.0,\ 1.8w+59.9)$ point C $(0.0,\ 0.0667w^2-4.9667w+58.3,\ -0.0667w^2+3.9667w+41.7)$, and curve MW is represented by coordinates $(x,\ (0.00357w^2-0.0391w+0.1756)x^2+(-0.0356w^2+0.4178w-3.6422)x-0.0667w^2+0.8333w+58.103,\ 100-w-x-y)$, curve WN is represented by coordinates $(x,\ (-0.002061w^2+0.0218w-0.0301)x^2+(0.0556w^2-0.5821w-0.1108)x-0.4158w^2+4.7352w+43.383,\ 100-w-x-y)$, curve NO is represented by coordinates $(x,\ 0.0082x^2+(0.0022w^2-0.0345w-0.7521)x-0.1307x^2+2.0247w+42.327,\ 100-w-x-y)$, and curve OP is represented by coordinates $(x,\ (-0.0006258w^2+0.0066w\ \ 0.0153)x^2+(0.0516w^2-0.5478w+0.9894)x-1.074w^2+11.651\ w+10.992,\ 100-w-x-y)$.

A refrigeration cycle device for a vehicle according to a twentieth aspect is the refrigeration cycle device for a vehicle according to the first aspect, wherein the refrigerant contains $CO_2$, R32, HFO-1132(E), and R1234yf;

wherein when the mass % of $CO_2$, R32, HFO-1132(E), and R1234yf based on their sum in the refrigerant is respectively represented by w, x, y, and z, if $0<w\leq 0.6$, coordinates (x,y,z) in a ternary composition diagram in which the sum of R32, HFO-1132(E), and R1234yf is (100−w) mass % are within the range of a figure surrounded by curve GO, straight line OF, and straight line FG that connect the following 3 points or on these line segments:

point G (−58333$w^2$−3.1667w+22.2, 7.0833$w^2$−1.4167w+26.2, −1.25$w^2$+3.5834w+51.6)

point O (36.8, 0.8333$w^2$+1.8333w+22.6, −0.8333$w^2$−2.8333w+40.6)

point F (−0.0833w+36.717, −4.0833w+5.1833, 3.1666w+58.0997), and curve GO is represented by coordinates (x, (0.00487$w^2$−0.0059w+0.0072)$x^2$+(−0.279$w^2$+0.2844w−0.6701)x+3.7639$w^2$−0.2467w+37.512, 100−w−x−y);

if 0.6<w≤1.2, coordinates (x,y,z) in the ternary composition diagram are within the range of a figure surrounded by curve GN, curve NO, straight line OF, and straight line FG that connect the following 4 points or on these line segments:

point G (−5.8333$w^2$−3.1667w+22.2, 7.0833$w^2$−1.4167w+26.2, −1.25$w^2$+3.5834w+51.6)

point N (18.2, 0.2778$w^2$+3.0w+27.7, −0.2.778$w^2$−4.0w+54.1)

point O (36.8, 0.8333$w^2$+1.8333w+22.6, −0.8333$w^2$−2.8333w+40.6)

point F (−0.0833w+36.717, −4.0833w+5.1833, 3.1666w+58.0997), and when 0.6<w≤1.2, curve GN is represented by coordinates (x, (0.0122$w^2$−0.0113w+0.0313)$x^2$+(−0.3582$w^2$+0.1624w−1.4551)x+2.7889$w^z$+3.7417w+43.824, 100−w−x−y), and when 0.6<w≤1.2, curve NO is represented by coordinates (x, (0.00487$w^2$−0.0059w+0.0072)$x^2$+(−0.279$w^2$+0.2844w−0.6701)x+3.7639$w^2$−0.2467w+37.512, 100−w−x−y); and if 1.2<w≤1.3, coordinates (x,y,z) in the ternary composition diagram are within the range of a figure surrounded by curve MW, curve WN, curve NO, straight line OF, straight line FC, and straight line CM that connect the following 6 points or on these line segments (excluding points on straight line CM):

point M (0.0, −0.3004$w^2$+2.419w+55.53, 0.3004$w^2$−3.419w+44.47)

point W (10.0, −0.3645$w^2$+3.5024w−34.422, 0.3645$w^2$−4.5024w+55.578)

point N (18.2, −0.3773$w^2$+3.319w+28.26, 0.3773$w^2$−4.319w+53.54)

point O (36.8, −0.1392$w^2$+1.4381w+24.475, 0.1392$w^2$−2.4381w+38.725)

point F (36.6, −3w+3.9, 2w+59.5)

point C (0.1081$w^2$−5.169w+58.447, 0.0, −0.1081$w^2$+4:169w+41.553), and curve MW is represented by coordinates (x, (0.0043$w^2$−0.0359w+0.1509)$x^2$+(−0.0493$w^2$+0.4669w−3.6193)x−0.3004$w^2$+2.419w+55.53, 100−w−x−y), curve WN is represented by coordinates (x, (0.0055$w^2$−0.0326w+0.0665)$x^2$+(0.1571$w^2$+0.8981w−2.6274)x+0.6555$w^2$−2.2153w+54.044, 100−w−x−y), and curve NO is represented by coordinates (x, (−0.00062$w^2$+0.0036w+0.0037)$x^2$+(0.0375$w^2$−0.239w−0.4977)x−0.8575$w^2$+6.4941w+36.078, 100−w−x−y);

if 1.3<w≤4.0, coordinates (x,y,z) in the ternary composition diagram are within the range of a figure surrounded by curve MW, curve WN, curve NO, straight line OB', straight line B'D, straight line DC, and straight line CM that connect the following 7 points or on these line segments (excluding points on straight line CM):

point M (0.0, −0.3004$w^2$+2.419w+55.53, 0.3004$w^2$−3.419w+44.47)

point W (10.0, −0.3645$w^2$+3.5024w+34.422, 03645$w^2$−4.5024w+55.578)

point N (18.2, −0.3773$w^2$+3.319w+28.26, 0.3773$w^2$−4.319w+53.54)

point O (36.8, −0.1392$w^2$+1.4381w+24.475, 0.1392$w^2$−2.4381w+38.725)

point B'(36.6, 0.0, −w+63.4)

point D (−2.8226w+40.211, 0.0, 1.8226w+59.789)

point C (0.0, 0.1081$w^2$−5.169w+58.447, −0.1081$w^2$+4.169w+41.553), and curve MW is represented by coordinates (x, (0.0043$w^2$−0.0359w+0.1509)$x^2$+(−0.0493$w^2$+0.4669w−3.6193)x−0.3004$w^2$+2.419w+55.53, 100−w−x−y), curve WN is represented by coordinates (x, (0.0055$w^2$−0.0326w+0.0665)$x^2$+(−0.1571$w^2$+0.8981w−2.6274)x+0.6555$w^2$−2.2153w+54.044, 100−w−x−y), and curve NO is represented by coordinates (x, (−0.00062$w^2$+0.0036w+0.0037)$x^2$+(0.0457$w^2$−0.2581w−0.075)x−1.355$w^2$+8.749w+27.096, 100−w−x−y); and if 4.0<w≤7.0, coordinates (x,y,z) in the ternary composition diagram are within the range of a figure surrounded by curve MW, curve WN, curve NO, straight line OB', straight line B'D, straight line DC, and straight line CM that connect the following 7 points or on these line segments (excluding points on straight line CM):

point M (0.0, −0.0667$w^2$+0.8333w−58.133, 0.0667$w^2$−1.8333w+41.867)

point W (10.0, −0.0667$w^2$+1.1w+39.267, 0.0667$w^2$−2.1w+50.733)

point N (18.2, −0.0889$w^2$+1.3778w+31.411, 0.0889$w^2$−2.3778w+50.389)

point O (36.8, −0.0444$w^2$+0.6889w+25.956, 0.0/141$w^2$−1.6889w+37.244)

point B' (36.6, 0.0, −w+63.4)

point D (−2.8w+40.1, 0.0, 1.8w+59.9)

point C (0.0, 0.0667$w^2$−4.9667w+58.3, −0.0667$w^2$+3.9667w+41.7), and curve MW is represented by coordinates (x, (0.00357$w^2$−0.0391w+0.1756)$x^2$+(−0.0356$w^2$+0.4178w−3.6422)x−0.0667$w^2$+0.8333w+58.103, 100−w−x−y), curve WN is represented by coordinates (x, (0.002061$w^2$+0.0218w−0.0301)$x^2$+(0.0556$w^2$−0.5821w−0.1108)x−0.4158$w^2$+4.7352w+43.383, 100−w−x−y), and curve NO is represented by coordinates (x, (0.0082$x^2$+(0.0022$w^2$−0.0345w−0.7521)x−0.1307$w^2$+2.0247w+42.327, 100−w−x−y).

A refrigeration cycle device for a vehicle according to a twenty-first aspect is the refrigeration cycle device for a vehicle according to the first aspect, wherein the refrigerant contains $CO_2$, R32, HFO-1132(E), and R1234yf;

wherein when the mass % of $CO_2$, R32, HFO-1132(E), and R1234yf based on their sum in the refrigerant is respectively represented by w, x, y, and z, if 1.2<w≤4.0, coordinates (x,y,z) in a ternary composition diagram in which the sum of R32, HFO-1132(E), and R1234yf is (100−w) mass % are within the range of a figure surrounded by curve MW, curve WN, straight line NE, straight line EC, and straight line CM that connect the following 5 points or on these line segments (excluding points on straight line CM):

point M $(0.0, -0.3004w^2+2.419w+55.53, 0.3004w^2-3.419w+44.47)$
point W $(10.0, -0.3645w^2+3.5024w+34.422, 0.3645w^2-4.5024w+55.578)$
point $(18.2, -0.3773w^2+3.319w+28.26, 0.3773w^2-4.319w+53.54)$
point E $(0.0365w+18.26, 0.0623w^2-4.5381w+31.856, -0.0623w^2+3.5746w+49.884)$
point C $(0.0, 0.1081w^2-5.169w+58.447, -0.1081w^2+4.169w+41.553)$,
and curve MW is represented by coordinates $(x, (0.0043w^2-0.0359w+0.1509)x^2+(-0.0493w^2+0.4669w-3.6193)x-0.3004w^2+2.419w+55.53, 100-w-x-y)$, and curve WN is represented by coordinates $(x, (0.0055w^2-0.0326w+0.0665)x^2+(-0.1571w^2+0.8981\ w-2.6274)x+0.6555w^2-2.2153w+54.044, 100-w-x-y)$; and if $4.0<w\leq 7.0$, coordinates (x,y,z) in the ternary composition diagram are within the range of a figure surrounded by curve MW, curve WN, straight line NE, straight line EC, and straight line CM that connect the following 5 points or on these line segments (excluding points on straight line CM):

point M $(0.0, -0.0667w^2+0.8333w+58.133, 0.0667w^2-1.8333w+41.867)$
point W $(10.0, -0.0667w^2+1.1w+39.267, 0.0667w^2-2.1w+50.733)$
point N $(18.2, -0.0889w^2+1.3778w+31.411, 0.0889w^2-2.3778w+50.389)$
point E $(18.1, 0.0/1/14w^2-4.3556w+31.411, -0.0444w^2+3.3556w+50.489)$
point C $(0.0, 0.0667w^2-4.9667w+58.3, -0.0667w^2+3.9667w+41.7)$, and curve MW is represented by coordinates $(x, (0.00357w^2-0.0391w+0.1756)x^2+(-0.0356w^2+0.4178w-3.6422)x-0.0667w^2+0.8333w+58.103, 100-w-x-y)$, and curve WN is represented by coordinates $(x, (-0.002061w^2+0.0218w\ \ 0.0301)x^2+(0.0556w^2-0.5821w-0.1108)x-0.4158w^2+4.7352w+43.383, 100-w-x-y)$.

A refrigeration cycle device for a vehicle according to a twenty-second aspect includes a refrigerant circuit and a refrigerant that is sealed in the refrigerant circuit. The refrigerant circuit includes a compressor, a heat dissipater, a decompressor, and a heat absorber. The refrigerant contains at least trans-1,2-difluoroethylene (HFO-1132(E)), difluoromethane (HFC-32), and 2,3,3,3-tetrafluoropropene (HFO-1234yf).

A refrigeration cycle device for a vehicle according to a twenty-third aspect is the refrigeration cycle device for a vehicle according to the twenty-second aspect, wherein the refrigerant comprises trans-1,2-difluoroethylene (HFO-1132(E)), difluoromethane (HFC-32) and 2,3,3,3-tetrafluoropropene (HFO-1234yf), and a total concentration of the three components is 99.5 mass % or more based on the entire refrigerant, and a mass ratio of the three components is within a range of a region surrounded by a figure passing through four points:

point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point C (HFO-1132(E)/HFC-32/HFO-1234yf=10.1/18.0/71.9 mass %) and
point D (HFO-1132(E)/HFC-32/HFO-1234yf=27.8/18.0/54.2 mass %);
in a ternary composition diagram with the three components as respective apexes.

A refrigeration cycle device for a vehicle according to a twenty-fourth aspect is the refrigeration cycle device for a vehicle according to the twenty-second aspect, wherein the refrigerant comprises HFO-1132(E), HFC-32 and HFO-1234yf, and a total concentration of the three components is 99.5 mass % or more based on the entire refrigerant, and a mass ratio of the three components is within a range of a region surrounded by a figure passing through four points:

point A (HFO-1132(E)/HFC-32/HFO-1234yf=51.8/1.0/47.2 mass %),
point B (HFO-1132(E)/HFC-32/HFO-1234yf=35.3/1.0/63.7 mass %),
point E (HFO-1132(E)/HFC-32/HFO-1234yf=15.2/14.3/70.5 mass %) and
point F (HFO-1132(E)/HFC-32/HFO-1234yf=31.1/14.3/54.6 mass %);
in a ternary composition diagram with the three components as respective apexes.

A refrigeration cycle device for vehicle according to a twenty-fifth aspect is the refrigeration cycle device for a vehicle according to the twenty-second aspect, wherein the refrigerant comprises WO-1132(E), HFC-32 and HFO-1234yf, and a total concentration of the three components is 99.5 mass % or more based on the entire refrigerant, and a mass ratio of the three components is within a range of a region surrounded by a figure passing through five points:

point P (HFO-1132(E)/HFC-32/HFO-1234y=45.6/1.0/53.4 mass %),
point B (HFO-1132(E)/HFC-32/HFO-1234yf=35.3/1.0/63.7 mass %),
point Q (HFO-1132(E)/HFC-32/HFO-1234y=1.0/24.8/74.2 mass %),
point R (HFO-1132(E)/HFC-32/HFO-1234yf=1.0/29.2/69.8 mass %) and
point S (HFO-1132(E)/HFC-32/HFO-1234y=6.5/29.2/64.3 mass %);
in a ternary composition diagram with the three components as respective apexes.

A refrigeration cycle device for a vehicle according to any one of the twenty-third aspect to the twenty-fifth aspect is the refrigeration cycle device for a vehicle according to the twenty-second aspect, wherein the refrigerant consists only of HFO-1132(E), HFC-32 and HFO-1234yf.

A refrigeration cycle device for a vehicle according to a twenty-seventh aspect includes a refrigerant circuit and a refrigerant that is sealed in the refrigerant circuit. The refrigerant circuit includes a compressor, a heat dissipater, a decompressor, and a heat absorber. The refrigerant contains at least HFO-1132(E), HFO-1123, and HFO-1234yf.

A refrigeration cycle device for a vehicle according to a twenty-eighth aspect is the refrigeration cycle device for a vehicle according to the twenty-seventh aspect, wherein the refrigerant comprises HFO-1132(E), HFO-1123 and HFO-1234yf, and a total concentration of the three components is 99.5 mass % or more based on the entire refrigerant, and a mass ratio of the three components is within a range of a region surrounded by a figure passing through five points:

point A (HFO-1132(E)/HFO-1123/HFO-1234yf=42.5/1.0/56.5 mass %),
point B (HFO-1132(E)/HFO-1123/HFO-1234yf=27.1/1.0/71.9 mass %),
point C (HFO-1132(E)/HFO-1123/HFO-1234yf=1.0/30.4/68.6 mass %),
point D (HFO-1132(E)/HFO-1123/HFO-1234yf=1.0/57.0/42.0 mass %) and
point E (HFO-1132(E)/HFO-1123/HFO-1234yf=42.5/24.1/33.4 mass %);
in a ternary composition diagram with the three components as respective apexes.

A refrigeration cycle device for a vehicle according to a twenty-ninth aspect is the refrigeration cycle device for a vehicle according to the twenty-seventh aspect, wherein the refrigerant comprises HFO-1132(E), HFO-1123 and HFO-1234yf, and a total concentration of the three components is 99.5 mass % or more based on the entire refrigerant, and a mass ratio of the three components is within a range of a region surrounded by a figure passing through five points:

point A (HFO-1132(E)/HFO-1123/HFO-1234yf=42.5/1.0/56.5 mass %),
point B (HFO-1132(E)/HFO-1123/HFO-1234yf=27.1/1.0/71.9 mass %),
point C (HFO-1132(E)/HFO-1123/HFO-1234yf=1.0/30.4/68.6 mass %),
point F (HFO-1132(E)/HFO-1123/HFO-1234yf=1.0/52.2/46.8 mass %) and
point G (HFO-1132(E)/HFO-1123/HFO-1234yf=42.5/18.9/38.6 mass %);
in a ternary composition diagram with the three components as respective apexes.

A refrigeration cycle device for a vehicle according to a thirtieth aspect is the refrigeration cycle device for a vehicle according to the twenty-eighth or twenty-ninth aspect, wherein the refrigerant comprises HFO-1132(E), HFO-1123 and HFO-1234yf, and a total concentration of the three components is 99.5 mass % or more based on the entire refrigerant, and a mass ratio of the three components is within a range of a region surrounded by a figure passing through six points:

point A (ISO-1132(E)/HFO-1123/HFO-1234yf=42.5/1.0/56.5 mass %),
point B (ISO-1132(E)/HFO-1123/HFO-1234yf=27.1/1.0/71.9 mass %),
point C (HFO-1132(E)/HFO-1123/HFO-1234yf=1.0/30.4/68.6 mass %),
point H (HFO-1132(E)/HFO-1123/HFO-1234yf=1.0/35.2/63.8 mass %),
point I (HFO-1132(E)/HFO-1123/HFO-1234yf=27.4/29.8/42.8 mass %) and
point G (HFO-1132(E)/HFO-1123/HFO-1234yf=42.5/18.9/38.6 mass %);
in a ternary composition diagram with the three components as respective apexes.

A refrigeration cycle device for a vehicle according to a thirty-first aspect is the refrigeration cycle device for a vehicle according to any one of the twenty-eighth aspect to the thirtieth aspect, wherein the refrigerant consists only of HFO-1132(E), HFO-1123 and HFO-1234yf.

A refrigeration cycle device for a vehicle according to a thirty-second aspect includes a refrigerant circuit and a refrigerant that is sealed in the refrigerant circuit. The refrigerant circuit includes a compressor, a heat dissipater, a decompressor, and a heat absorber. The refrigerant contains at least HFO-1132(E) and HFO-1234yf.

A refrigeration cycle device for a vehicle according to a thirty-third aspect is the refrigeration cycle device for a vehicle according to the thirty-second aspect, wherein the refrigerant comprises HFO-1132(E) and HFO-1234yf, a content rate of HFO-1132(E) is 35.0 to 65.0 mass % and a content rate of HFO-1234yf is 65.0 to 35.0 mass %, based on a total mass of HFO-1132(E) and HFO-1234yf, and an evaporating temperature is −75 to −5° C.

A refrigeration cycle device for a vehicle according to a thirty-fourth aspect is the refrigeration cycle device for a vehicle according to the thirty-second aspect, wherein a content rate of HFO-1132(E) is 41.3 to 53.5 mass % and a content rate of HFO-1234yf is 58.7 to 46.5 mass %, based on a total mass of HFO-1132(E) and HFO-1234yf.

A refrigeration cycle device for a vehicle according to a thirty-fifth aspect is the refrigeration cycle device for a vehicle according to the thirty-third or thirty-fourth aspect, wherein the refrigerant consists only of HFO-1132(E) and HFO-1234yf.

A refrigeration cycle device for a vehicle according to a thirty-sixth aspect is the refrigeration cycle device for a vehicle according to the thirty-second aspect, wherein the refrigerant comprises HFO-1132(E) and HFO-1234yf, and a content rate of HFO-1132(E) is 40.5 to 49.2 mass % and a content rate of HFO-1234yf is 59.5 to 50.8 mass %, based on a total mass of HFO-1132(E) and HFO-1234yf A refrigeration cycle device for a vehicle according to a thirty-seventh aspect is the refrigeration cycle device for a vehicle according to the thirty-sixth aspect, wherein the refrigerant consists only of HFO-1132(E) and HFO-1234yf A refrigeration cycle device for a vehicle according to a thirty-eighth aspect is the refrigeration cycle device for a vehicle according to the thirty-second aspect, wherein the refrigerant comprises HFO-1132(E) and HFO-1234yf, and a content rate of HFO-1132(E) is 31.1 to 39.8 mass % and a content rate of HFO-1234yf is 68.9 to 60.2 mass %, based on a total mass of HFO-1132(E) and HFO-1234yf.

A refrigeration cycle device for a vehicle according to a thirty-ninth aspect is the refrigeration cycle device for a vehicle according to the thirty-second aspect, wherein
a content rate of HFO-1132(E) is 31.1 to 37.9 mass % and a content rate of HFO-1234yf is 68.9 to 62.1 mass %, based on a total mass of HFO-1132(E) and HFO-1234yf.

A refrigeration cycle device for a vehicle according to a fortieth aspect is the refrigeration cycle device for a vehicle according to the thirty-eight or thirty-ninth aspect, wherein the refrigerant consists only of HFO-1132(E) and HFO-1234yf.

A refrigeration cycle device for a vehicle according to a forty-first aspect is the refrigeration cycle device for a vehicle according to the thirty-second aspect, wherein the refrigerant comprises HFO-1132(E) and HFO-1234yf, and a content rate of HFO-1132(E) is 21.0 to 28.4 mass % and a content rate of HFO-1234yf is 79.0 to 71.6 mass %, based on a total mass of HFO-1132(E) and HFO-1234yf.

A refrigeration cycle device for a vehicle according to a forty-second aspect is the refrigeration cycle device for a vehicle according to the forty-first aspect, wherein the refrigerant consists only of HFO-1132(E) and HFO-1234yf.

A refrigeration cycle device for a vehicle according to a forty-third aspect is the refrigeration cycle device for a vehicle according to the thirty-second aspect, wherein the refrigerant comprises HFO-1132(E) and HFO-1234yf, a content rate of HFO-1132(E) is 12.1 to 72.0 mass % and a content rate of HFO-1234yf is 87.9 to 28.0 mass %, based on a total mass of HFO-1132(E) and WO-1234yf, and the apparatus is in-car air conditioning equipment A refrigeration cycle device for a vehicle according to a forty-fourth aspect includes a refrigerant circuit and a refrigerant that is sealed in the refrigerant circuit. The refrigerant circuit includes a compressor, a heat dissipater; a decompressor, and a heat absorber. The refrigerant contains at least HFC-32 and HFO-1234yf and at least one type selected from 1,1-difluoroethylene (HFO-1132a) and tetrafluoroethylene (FO-1114).

A refrigeration cycle device for a vehicle according to a forty-fifth aspect is the refrigeration cycle device for a vehicle according to the forty-fourth aspect, wherein the refrigerant comprises HFO-1132a.

A refrigeration cycle device for a vehicle according to a forty-sixth aspect is the refrigeration cycle device for a vehicle according to the forty-fourth aspect, wherein the refrigerant comprises 15.0 to 24.0 mass % of HFC-32 and 1.0 to 7.0 mass % of HFO-1132a when a total amount of HFC-32, HFO-1234yf and HFO-1132a is 100 mass %.

A refrigeration cycle device for a vehicle according to a forty-seventh aspect is the refrigeration cycle device for a vehicle according to the forty-fourth aspect, wherein the refrigerant comprises 19.5 to 23.5 mass % of HFC-32 and 3.1 to 3.7 mass % of HFO-1132a when a total amount of HFC-32, HFO-1234yf and HFO-1132a is 100 mass %.

A refrigeration cycle device for a vehicle according to a forty-eighth aspect is the refrigeration cycle device for a vehicle according to the forty-fourth aspect, wherein the refrigerant comprises HFC-32, HFO-1234yf and HFO-1132a, and when HFC-32, HFO-1132a and HFO-1234yf in terms of mass % based on their sum in the refrigerant are represented by x, y and z, respectively, coordinates (x,y,z) in a three-component composition diagram in which a sum of HFC-32, HFO-1132a and HFO-1234yf is 100 mass % are within a range of a triangle surrounded by line segments RS, ST and TR that connect three points:

point R (21.80, 3.95, 74.25),
point S (21.80, 3.05, 75.15), and
point T (20.95, 75.30, 3.75);

or are on the line segments.

A refrigeration cycle device for a vehicle according to a forty-ninth aspect is the refrigeration cycle device for a vehicle according to the forty-fourth aspect, wherein the refrigerant comprises HFC-32, HFO-1234yf and HFO-1132a, and when HFC-32, HFO 1132a and HFO-1234yf in terms of mass % based on their sum in the refrigerant are represented by x, y and z, respectively, coordinates (x,y,z) in a three-component composition diagram in which a sum of HFC-32, HFO-1132a and HFO-1234yf is 100 mass % are within a range of a figure surrounded by line segments LF, FG, GO, OB and BL that connect five points:

point L (74.0, 19.9, 6.1),
point F (49.1, 25.9, 25.0),
point G (0.0, 48.6, 51.4),
point O (0.0, 0.0, 100), and
point B (73.9, 0.0, 26.1);

or are on the line segments (but not on the line segments GO and OB), the line segment LF is represented by coordinate ($y=0.0021x^2-0.4975x+45.264$),
the line segment FG is represented by coordinate ($y=0.0031x^2-0.6144x+48.6$), and
the line segments GO, OB and BL are straight lines.

A refrigeration cycle device for a vehicle according to a fifty aspect is the refrigeration cycle device for a vehicle according to the forty-fourth aspect, wherein the refrigerant comprises HFC-32, HFO-1234yf and HFO-1132a, and when HFC-32, HFO-1132a and HFO-1234yf in terms of mass % based on their sum in the refrigerant are represented by x, y and z, respectively, coordinates (x,y,z) in a three-component composition diagram in which a sum of HFC-32, HFO-1132a and HFO-1234yf is 100 mass % are within a range of a figure surrounded by line segments PF, FG, GO, OB' and B'P that connect five points:

point P (59.1, 23.2, 17.7),
point F (49.1, 25.9, 25.0),
point G (0.0, 48.6, 51.4),
point O (0.0, 0.0, 100), and
point B' (59.0, 0.0, 40.2);

or are on the line segments (but not on the line segments GO and OH), the line segment PF is represented by coordinate ($y=0.0021x^2-0.4975x+45.264$),
the line segment FG is represented by coordinate ($y=0.0031x^2-0.6144x+48.6$), and
the line segments GO, OB' and B'P are straight lines.

A refrigeration cycle device for a vehicle according to a fifty-first aspect is the refrigeration cycle device for a vehicle according to the forty-fourth aspect, wherein the refrigerant comprises HFC-32, HFO-1234yf and HFO-1132a, and when HFC-32, HFO-1132a and HFO-1234yf in terms of mass % based on their sum in the refrigerant are represented by x, y and z, respectively, coordinates (x,y,z) in a three-component composition diagram in which a sum of HFC-32, HFO-1132a and HFO-1234yf is 100 mass % are within a range of a figure surrounded by segments MI, IJ, JB and BM that connect four points:

point M (74.0, 19.5, 6.5),
point I (62.9, 15.5, 21.6),
point J (33.5, 0.0, 66.5), and
point B (73.9, 0.0, 26.1), or are on the line segments (but not on the line segment JB), the line segment MI is represented by coordinate ($y=0.006x^2+1.1837x-35.264$),
the line segment IJ is represented by coordinate ($y=0.0083x^2-0.2719x-0.1953$), and
the line segments JB and BM are straight lines.

A refrigeration cycle device for a vehicle according to a fifty-second aspect is the refrigeration cycle device for a vehicle according to the forty-fourth aspect, wherein the refrigerant comprises HFC-32, HFO-1234yf and HFO-1132a, and when HFC-32, HFO-1132a and HFO-1234yf in terms of mass % based on their sum in the refrigerant are represented by x, y and z, respectively, coordinates (x,y,z) in a three-component composition diagram in which a sum of HFC-32, HFO-1132a and HFO-1234yf is 100 mass % are within a range of a figure surrounded by line segments QJ, JB' and B'Q that connect three points:

point Q (59.1, 12.7, 28.2), point J (33.5, 0.0, 66.5), and point B' (59.0, 0.0, 40.2), or are on the line segments (but not on the line segment JB'), the line segment QJ is represented by coordinate ($y=0.0083x^2-0.2719x-0.1953$), and the line segments JB' and B'Q are straight lines.

A refrigeration cycle device for a vehicle according to a fifty-third aspect is the refrigeration cycle device for a vehicle according to the forty-fourth aspect, wherein the refrigerant comprises HFC-32, HFO-1234yf and HFO-1132a, and when HFC-32, HFO-1132a and HFO-1234yf in terms of mass % based on their sum in the refrigerant are represented by x, y and z, respectively, coordinates (x,y,z) in a three-component composition diagram in which a sum of HFC-32, HFO-1132a and HFO-1234yf is 100 mass % are within a range of a figure surrounded by line segments QU, UV and VQ that connect three points:

point Q (59.1, 12.7, 28.2), point U (59.0, 5.5, 35.5), and point V (52.5, 8.4, 39.1), or are on the line segments, the line segment VQ is represented by coordinate ($y=0.0083x^2-0.2719x-0.1953$), the line segment UV is represented by coordinate ($y=0.0026x^2-0.7385x+39.946$), and the line segment QU is a straight line.

A refrigeration cycle device for a vehicle according to a fifty-fourth aspect includes a refrigerant circuit and a refrigerant that is sealed in the refrigerant circuit. The refrigerant circuit includes a compressor, a heat dissipater, a decompressor, and a heat absorber. The refrigerant contains at least difluoromethane (R32), carbon dioxide ($CO_2$), pentafluoroethane (R125), 1,1,1,2-tetrafluoroethane (R134a), and 2,3,3,3-tetrafluoropropene (R1234yf).

A refrigeration cycle device for a vehicle according to a fifty-fifth aspect is the refrigeration cycle device for a vehicle according to the fifty-fourth aspect, wherein the refrigerant comprises difluoromethane (R32), carbon dioxide ($CO_2$), pentafluoroethane (R125), 1,1,1,2-tetrafluoroethane (R134a), and 2,3,3,3-tetrafluoropropene (R1234yf), and in a case where a mass % of R32 is defined as a, a mass % of $CO_2$ is defined as b, a mass % of R125 is defined as $c_1$, a mass % of R134a is defined as $c_2$, a mass % of a total of R125 and R134a is defined as c and a mass % of R1234yf is defined as x, and $c_1/(c_1+c_2)$ is defined as r based on a sum of R32, $CO_2$, R125, R134a and R1234yf in the refrigerant, coordinates (a,b,c) in a three-component composition diagram with, as respective apexes, a point where R32 occupies (100−x) mass %, a point where $CO_2$ occupies (100−x) mass % and a point where the total of R125 and R134a occupies (100−x) mass % are 1-1-1) with 43.8≥x≥41 and 0.5≥r≥0.25, within a range of a quadrangle surrounded by line segments that connect:

point A (−0.6902x+43.307, 100−a−x, 0.0), point $O_{r=0.25\ to\ 0.5}$($(-2.2857x+87.314)r^2+(1.7143x-55.886)r+(-0.9643x+55.336)$, $(2.2857x-112.91)r^2+(-1.7143x+104.69)r+(-0.25x+11.05)$, 100−a−b−x), point $D_{r=0.25\ to\ 0.5}$ (0.0, $-28.8r^2+54.0r+(-x+49.9)$, 100−b−x) and point Q (0.0, 100−x, 0.0)

or on the line segments (provided that any point on line segments $D_{r=0.25\ to\ 0.5}$Q and QA is excluded), or 1-1-2) with 43.8≥x≥41 and 1.0≥r≥0.5, within a range of a quadrangle surrounded by line segments that connect:

point A (0.6902x+43.307, 100−a−c, 0.0), point $O_{r=0.5\ to\ 1.0}$($(-0.2857x+8.5143)r^2+(0.5x-10.9)+(-0.8571x+52.543)$, $(-0.2857x+4.5143)r^2+(0.5x+0.9)r+(-0.7143x+33.586)$, 100−a−b−x), point $D_{r=0.5\ to\ 1.0}$(0.0, $(-0.5714x+12.229)r^2+(0.8571x-0.3429)r+(-1, 2857x+66.814)$, 100−b−x) and point Q (0.0, 100−x, 0.0)

or on the line segments (provided that any point online segments $D_{r=0.5\ to\ 1.0}$Q and QA is excluded), or 1-2-1) with 46.5≥x≥43.8 and 0.5≥r≥0.25, within a range of a quadrangle surrounded by line segments that connect:

point A (−0.6902x+43.307, 100−a−x, 0.0), point $O_{r=0.25\ to\ 0.5}$ ($(1.1852x-64.711)r2+(-0.7407x+51.644)r+(-0.5556x+37.433)$, $(-2.3704x+91.022)r^2+(2.0741\ x-61.244)r+(-0.963x+42.278)$, 100−a−b−x), point $D_{r=0.25\ to\ 0.5}$(0.0, $28.8r^2+54.0r+(-x+49.9)$, 100−b−x) and point Q (0.0, 100−x, 0.0)

or on the line segments (provided that any point on line segments $D_{r=0.25\ to\ 0.5}$Q and QA is excluded), or 1-2-2) with 46.5≥x≥43 and 1.0≥r≥0.5, within a range of a quadrangle surrounded by line segments that connect:

point A (−0.6902x+43.307, 100−a−x, 0.0), point $O_{r=0.5\ to\ 1.0}$($(0.2963x-16.978)r2+(-0.3704x+27.222)r+(-0.5185x+37.711)$, $-8.0r2+22.8r+(-0.5185x+25.011)$, 100−a−b−x), point $D_{r=0.5\ to\ 1.0}$(0.0; $12.8r^2+37.2r+(-x+54.3)$, 100−b) and point Q (0.0, 100−x, 0.0)

or on the line segments (provided that any point on line segments $D_{r=0.5\ to\ 1.0}$Q and QA is excluded), or 1-3-1) with 50≥x≥46.5 and 0.5≥r≥0.25, within a range of a quadrangle surrounded by line segments that connect:

point A (−0.6902x+43.307, 100−a−x, 0.0), point $O_{r=0.25\ to\ 0.5}$($-9.6r^2+17.2r+(-0.6571x+42.157)$; $19.2r^2+(0.2286x+24.571)r+(-0.6286x+26.729)$, 100−a−b−x), point $D_{r=0.25\ to\ 0.5}$(0.0, $(0.9143x-71.314)r^2+(-0.5714x+80.571)+(-0.9143x+45.914)$, 100−b−x) and point Q (0.0, 100−x, 0.0)

or on the line segments (provided that any point on line segments $D_{r=0.25\ to\ 0.5}$Q and QA is excluded), or 1-3-2) with 50≥x≥46.5 and 1.0≥r≥0.5, within a range of a quadrangle surrounded by line segments that connect:

point A (−0.6902x+43.307, 100−a−x, 0.0), point $O_{r=0.5\ to\ 1.0}$($(0.2286x+7.4286)r^2+(0.4x-8.6)r+(-0.8x+50.8)$, $(0.2286x-18.629)r^2+(=0.2857x+36.086)r+(-0.4286x+20.829)$, 100−a−b−x), point $D_{r=0.5\ to\ 1.0}$(0.0, $(0.2286x-23.429)r^2+(-0.4x+55.8)r+(-0.8286x+46.329)$, 100−b−x) and point Q (0.0, 100−x, 0.0)

or on the line segments (provided that any point on line segments $D_{r=0.5\ to\ 1.0}$Q and QA is excluded).

A refrigeration cycle device for a vehicle according to a fifty-sixth aspect is the refrigeration cycle device for a vehicle according to the fifty-fourth aspect, wherein the refrigerant comprises R32, $CO_2$, R125, R134a and R1234yf, and in a case where a mass % of R32 is defined as a, a mass % of $CO_2$ is defined as b, a mass % of R125 is defined as et, a mass % of R134a is defined as $c_2$, a mass % of a total of R125 and R134a is defined as c and a mass % of R1234yf is defined as x, and $c_1/(c_1+c_2)$ is defined as r based on a sum of R32, $CO_2$, R125, R134a and R1234yf in the refrigerant, coordinates (a,b,c) in a three-component composition diagram with, as respective apexes, a point where R32 occupies (100−x) mass %, a point where $CO_2$ occupies (100−x) mass % and a point where the total of R125 and R134a occupies (100−x) mass % are 2-1-1) with 43.8≥x≥41 and 0.5≥r≥0.25, within a range of a triangle surrounded by line segments that connect:

point $F_{r=0.25\ to\ 0.5}$ (0.0, (−1.1429x+37.257)r²+(1.2857x−38.714)r−(−1.7143x+106.89), 100−b−x), point $P_{r=0.25\ to\ 0.5}$ ((−1.1429x+34.057)r²+(1.0x−21.0)r+(−0.4643x+27.636), (2.2857x−119.31)r²+(−2.0x+122.0)r+(−0.3929x+19.907), 100−a−b−x) and point $D_{r=0.25\ to\ 0.5}$(0.0, 28.8x²+54.0r+(−x+49.9), 100−b−x)

or on the line segments (provided that any point on line segment $D_{r=0.25\ to\ 0.5}F_{r=0.25\ to\ 0.5}$ is excluded), or 2-1-2) with 43.8≥x≥41 and 1.0≥r≥0.5, within a range of a triangle surrounded by line segments that connect:

point $F_{r=0.5\ to\ 1.0}$(0.0, (3.7143x−159.49)r²+(−5.0714x+222.53)r+(0.25x+25.45), 100−b−x), point $P_{r=0.5\ to\ 1.0}$((3.4286x−138.17)r²+(−5.4286x+203.57)+(1.6071x−41.593), (−2.8571x+106.74)r²+(4.5714x−143.63)r+(−2.3929x+96.027), 100−a−b−x) and point $D_{r=0.5\ to\ 1.0}$(0.0, (−0.5714x+12.229)x²+(0.8571x−0.3429)r+(−1.2857x+66.814), 100−b−x)

or on the line segments (provided that any point on line segment $D_{r=0.5\ to\ 1.0}F_{r=0.5\ to\ 1.0}$ is excluded), or 2-2-1) with 46.5≥x≥43 and 0.5≥r≥0.25, within a range of a triangle surrounded by line segments that connect:

point $F_{r=0.25\ to\ 0.5}$ (0.0, (9.4815x−428.09)r²+(−7.1111 x+329.07)r+(−0.2593x+43.156), 100−b−x), point $P_{r=0.25\ to\ 0.5}$ ((−8.2963x+347.38)x²+(4.8889x−191.33)r+(−0.963 x+49.478), (7.1111 x−330.67)r²+(−4.1481x+216.09)r+(−0.2593x+14.056), 100−a−b−x) and point $D_{r=0.25\ to\ 0.5}$ (0.0, 28.8x²+54.0r+(−x+49.9), 100−b−x)

or on the line segments (provided that any point on line segment $D_{r=0.25\ to\ 0.5}F_{r=0.25\ to\ 0.5}$ is excluded), or 2-2-2) with 46.5≥x≥43 and 1.0≥r≥0.5, within a range of a triangle surrounded by line segments that connect:

point $F_{r=0.5\ to\ 1.0}$(0.0, (−4.7407x+210.84)r²+(6.963x−304.58)r+(−3.7407x+200.24), 100−b−x), point $P_{r=0.5\ to\ 1.0}$((0.2963x−0.9778)r²+(0.2222x−43.933)r+(−0.7778x+62.867), (0.2963x−5.4222)r²+(−0.0741x+59.844)r+(−0.4'111x+10.867), 100−a−b−x) and point $D_{r=0.5\ to\ 1.0}$(0.0, 12.8x²+37.2r+(−x+54.3), 100−b−x)

or on the line segments (provided that any point on line segment $D_{r=0.5\ to\ 1.0}F_{r=0.5\ to\ 1.0}$ is excluded), or 2-3-1) with 50≥x≥46.5 and 0.37≥r≥0.25, within a range of a triangle surrounded by line segments that connect:

point $F_{r=0.25\ to\ 0.37}$ (0.0, (−35.714x+1744.0)x²+(23.333x−1128.3)r+(−5.144x+276.32), 100−b−x), point $P_{r=0.25\ to\ 0.37}$ ((11.905x−595.24)r²+(−7.6189x+392.61)r+(0.9322x−39.027), (−27.778x+1305.6)r²+(17.46x−796.35)r+(−3.5147x+166.48), 100−a−b−x) and point $D_{r=0.25\ to\ 0.37}$ (0.0, (0.9143x−71.314)r²+(−0.5714x+80.571)+(−0.9143x+45.914), 100−b−x)

or on the line segments (provided that any point on line segment $D_{r=0.25\ to\ 0.37}F_{r=0.25\ to\ 0.37}$ is excluded), or 2-3-2) with 50≥x≥46.5 and 1.0≥r≥0.5, within a range of a triangle surrounded by line segments that connect:

point $F_{r=0.5\ to\ 1.0}$(0.0, (2.2857x−115.89)r²+(−3.0857x+162.69)r+(−0.3714x+43.571), 100−b−x), point $P_{r=0.5\ to\ 1.0}$((−3.2x+161.6)r²+(4.4571x−240.86)r+(−2.0857x+123.69), (2.5143x−136.11)r2+(−3.3714x+213.17)r+(0.5429x−35.043), 100−a−b−x) and point $D_{r=0.5\ to\ 1.0}$(0.0, (0.2286x−23.429)r²+(−0.4x+55.8)r+(−0.8286x+46.329), 100−b−x)

or on the line segments (provided that any point on line segment $D_{r=0.25\ to\ 0.5}F_{r=0.25\ to\ 0.5}$ is excluded).

A refrigeration cycle device for a vehicle according to a fifty-seventh aspect is the refrigeration cycle device for a vehicle according to the fifty-fifth or the fifty-sixth aspect, wherein the refrigerant comprises 99.5 mass % or more in total of R32, $CO_2$, R125, R134a and R1234yf based on the entire refrigerant.

A refrigeration cycle device for a vehicle according to a fifty-eighth aspect includes a refrigerant circuit and a refrigerant that is sealed in the refrigerant circuit. The refrigerant circuit includes a compressor, a heat dissipater, a decompressor, and a heat absorber. The refrigerant contains at least cis-1,2-difluoroethylene (HFO-1132(Z)) and 2,3,3,3-tetrafluoropropene (HFO-1234yf).

A refrigeration cycle device for a vehicle according to a fifty-ninth aspect is the refrigeration cycle device for a vehicle according to the fifty-eighth aspect, wherein a content of HFO-1132(Z) is 53.0 to 59.5% by mass, and a content of HFO-1234yf is 47.0 to 40.5% by mass, based on a total mass of HFO-1132(Z) and HFO-1234yf.

A refrigeration cycle device for a vehicle according to a sixty aspect is the refrigeration cycle device for a vehicle according to the fifty-ninth aspect, wherein the refrigerant consists only of HFO-11320 and HFO-1234yf A refrigeration cycle device for a vehicle according to a sixty-first aspect is the refrigeration cycle device for a vehicle according to the fifty-eighth aspect, wherein a content of HFO-1132(Z) is 41.0 to 49.2% by mass, and a content of HFO-1234yf is 59.0 to 50.8% by mass, based on a total mass of HFO-1132(Z) and HFO-12343f.

A refrigeration cycle device for a vehicle according to a sixty-second aspect is the refrigeration cycle device for a vehicle according to the sixty first aspect, wherein the refrigerant consists only of HFO-1132(Z) and HFO-1234yf.

A refrigeration cycle device for a vehicle according to a sixty-third aspect is the refrigeration cycle device for a vehicle according to the fifty-ninth or the sixty-second aspect, wherein wherein used as an alternative refrigerant to R134a, R22, R12, R404A, R407A, R407C, R407F, R407H, R410A, R413A, R417A, R422A, R422B, R422C, R422D, R423A, R424A, R426A, R427A, R428A, R430A, R434A, R437A, R438A, R448A, R449A, R449B, R449C, R450A, R452A, R452B, R454A, R452B, R454C, R455A, R465A, R502, R507, R513A, R513B, R515A, or R515B.

A refrigeration cycle device for a vehicle according to a sixty-fourth aspect is the refrigeration cycle device for a vehicle according to any one of the fifty-eighth aspect to the sixty-third aspect, wherein the refrigerant containing at least one substance selected from the group consisting of water, a tracer, an ultraviolet fluorescent dye, a stabilizer, and a polymerization inhibitor.

A refrigeration cycle device for a vehicle according to a sixty-fifth aspect is the refrigeration cycle device for a vehicle according to any one of the fifty-eighth aspect or the sixty-fourth aspect, wherein the refrigerant further containing a refrigerator oil and used as a working fluid for a refrigeration apparatus.

A refrigeration cycle device for a vehicle according to a sixty-sixth aspect is the refrigeration cycle device for a vehicle according to the sixty-fifth aspect, wherein the refrigerator oil contains at least one polymer selected from the group consisting of a polyalkylene glycol (PAG), a polyol ester (POE), and a polyvinyl ether (PVE).

BRIEF DESCRIPTION OF DRAWINGS

FIG. 1O is a ternary composition diagram in which the sum of the concentrations of R32, HFO-1132(E), and R1234yf is 98.7 mass % (CO2 content is 1.3 mass %), the diagram showing points and line segments defining the refrigerant according to the present disclosure.

FIG. 2Db is a three-component composition diagram for explaining the composition of any refrigerant 2D according to a third aspect to a seventh aspect of the present disclosure.

FIG. 2O is a schematic view for explaining a normal cycle hot gas defrost.

DESCRIPTION OF EMBODIMENTS (1)

(1-1) Definition of Terms

Figure 1A:
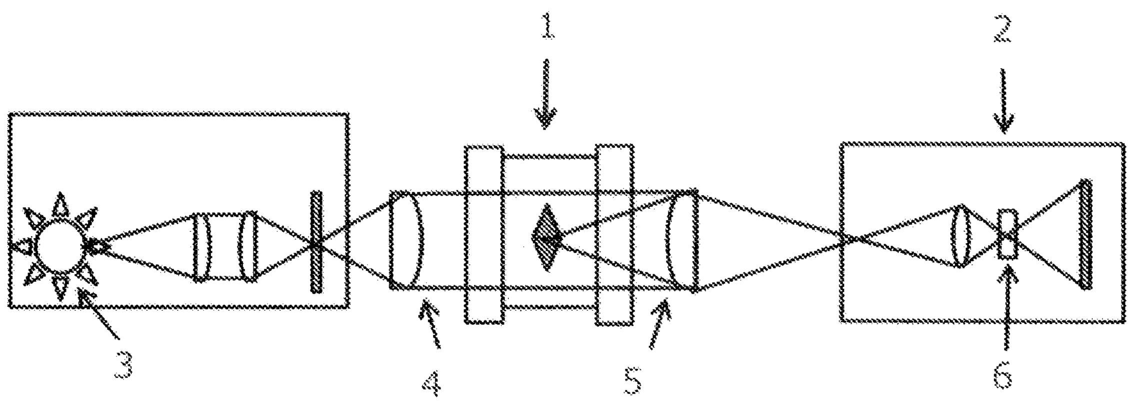
FIG. 1A is a schematic view of an apparatus used in a flammability test.

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant 2 Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same, use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

Any refrigerant having "non-flammability" in the present disclosure means that the WCF composition (Worst case of formulation for flammability), as a composition exhibiting most flammability, among acceptable concentrations of the refrigerant is rated as "Class 1" in US ANSI/ASHRAE Standard 34-2013.

Any refrigerant having "low flammability" herein means that the WCF composition is rated as "Class 2" in US ANSI/ASHRAE Standard 34-2013.

Any refrigerant having "ASHRAE non-flammability" in the present disclosure means that the WCF composition or WCFF composition can be specified as exhibiting non-flammability according to a test based on the measurement apparatus and the measurement method according to ASTM E681-2009 [Standard Test Method for Concentration Limits of Flammability of Chemicals (Vapors and Gases)], and is classified to "Class 1 ASHRAE non-flammability (WCF non-flammability" or "Class 1 ASHRAE non-flammability (WCFF non-flammability)". The WCFF composition (Worst case of fractionation for flammability: mixed composition causing most flammability) is specified by performing a leak test in storage, transport and use based on ANSI/ASHRAE 34-2013.

Any refrigerant having "lower flammability" herein means that the WCF composition is rated as "Class 2L" in US ANSI/ASHRAE Standard 34-2013.

The "temperature glide" can be herein restated as the absolute value of the difference between the start temperature and the end temperature in the course of phase transition of the composition including a refrigerant of the present disclosure, in any constituent element in a heat cycle system.

The "in-car air conditioning equipment" herein means one refrigerating apparatus for use in cars such as a gasoline-fueled car, a hybrid car, an electric car and a hydrogen-fueled car. The in-car air conditioning equipment refers to a refrigerating apparatus including a refrigeration cycle that allows a liquid refrigerant to perform heat exchange in an evaporator, allows a compressor to suction a refrigerant gas evaporated, allows a refrigerant gas adiabatically compressed to be cooled and liquefied by a condenser, furthermore allows the resultant to pass through an expansion valve and to be adiabatically expanded, and then anew feeds the resultant as a liquid refrigerant to an evaporating machine.

The "turbo refrigerator" herein means one large-sized refrigerator. The turbo refrigerator refers to a, refrigerating apparatus including a refrigeration cycle that allows a liquid refrigerant to perform heat exchange in an evaporator, allows a centrifugal compressor to suction a refrigerant gas evaporated, allows a refrigerant gas adiabatically compressed to be cooled and liquefied by a condenser, furthermore allows the resultant to pass through an expansion valve and to be adiabatically expanded, and then anew feeds the resultant as a liquid refrigerant to an evaporating machine. The "large-sized refrigerator" refers to a large-sized air conditioner for air conditioning in building units.

The "saturation pressure" herein means the pressure of saturated vapor.

The "discharge temperature" herein means the temperature of a mixed refrigerant at a discharge port in a compressor.

The "evaporating pressure" herein means the saturation pressure at an evaporating temperature.

The "critical temperature" herein means the temperature at a critical point, and means a boundary temperature where gas cannot turn to any liquid at a temperature more than such a boundary temperature even if compressed.

The GWP herein means the value based on the fourth report of IPCC (Intergovernmental Panel on Climate Change).

The description “mass ratio” herein has the same meaning as the description “composition ratio”.

(1-2) Refrigerant

Although the details thereof are described later, any one of the refrigerants 1A, 1B, 1C, 1D, 1E, 2A, 2B, 2C, 2D and 2E according to the present disclosure (sometimes referred to as “the refrigerant according to the present disclosure”) can be used as a refrigerant.

(1-3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

(1-3-1) Water

The refrigerant composition according to the present disclosure may contain a small amount of water. The water content of the refrigerant composition is preferably 0.1 mass % or less based on the entire refrigerant 1A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

(1-3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2{=}CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether; $CF_3OCHFCF_3$)
FIFE-236fa (trifluoromethyl-trifluoroethyl ether, $CF_3OCH_2CF_3$)

The refrigerant composition according to the present disclosure may contain one or more tracers at a total concentration of about 10 parts per million by weight (ppm) to about 1000 ppm, based on the entire refrigerant composition. The refrigerant composition according to the present disclosure may preferably contain one or more tracers at a total concentration of about 30 ppm to about 500 ppm, and more preferably about 50 ppm to about 300 ppm, based on the entire refrigerant composition.

(1-3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

(1-3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

(1-3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant (1-4) Refrigeration Oil-Containing Working Fluid The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

(1-4-1) Refrigerating Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

(1-4-2) Compatibilizer

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(1-5) Various Refrigerants 1

Refrigerants 1A to 1E used in the present disclosure are described below in detail. The disclosures of the refrigerant 1A, the refrigerant 1B, the refrigerant 1C, the refrigerant 1D and the refrigerant 1E are independent from each other. Thus, the alphabetical letters used for points and line segments, as well as the numbers used for Examples and Comparative Examples, are all independent in each of the refrigerant 1A, the refrigerant 1B, the refrigerant 1C, the refrigerant 1D and the refrigerant 1E. For example, Example 1 of the refrigerant 1A and Example 1 of the refrigerant 1B each represent an example according to a different embodiment.

(1-5-1) Refrigerant 1A

Refrigerant 1A according to the present disclosure is a mixed refrigerant comprising trans-1,2-difluoroethylene (HFO-1132(E)), trifluoroethylene (HFO-1123), and 2,3,3,3-tetrafluoro-1-propene (R1234yf).

The refrigerant 1A according to the present disclosure has various properties that are desirable as an R410A-alternative refrigerant, i.e., a refrigerating capacity and a coefficient of performance that are equivalent to those of R410A, and a sufficiently low GWP.

The refrigerant 1A according to the present disclosure is a composition comprising HFO-1132(E) and R1234yf, and optionally further comprising HFO-1123, and may further satisfy the following requirements. This refrigerant 1A also has various properties desirable as an alternative refrigerant for R410A; i.e., it has a refrigerating capacity and a coefficient of performance that are equivalent to those of R410A, and a sufficiently low GWP.

Requirements

When the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments OD, DG, GH, and HO that connect the following 4 points:

point D (87.6, 0.0, 12.4), point G (18.2, 55.1, 26.7), point H (56.7, 43.3, 0.0), and point O (100.0, 0.0, 0.0), or on the line segments OD, DG, and GH (excluding the points O and H);

the line segment DG is represented by coordinates $(0.0047y^2-1.5177y+87.598,\ y,\ -0.0047y^2+0.5177y+12.402)$, the line segment GH is represented by coordinates $(-0.0134z^2-1.0825z+56.692,\ 0.0134z^2+0.0825z+43{:}308,\ z)$, and the lines HO and OD are straight lines.

When the requirements above are satisfied, the refrigerant 1A according to the present disclosure has a refrigerating capacity ratio of 92.5% or more relative to that of R410A, and a COP ratio of 92.5% or more relative to that of R410A.

The refrigerant 1A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments LG, GH, HI, and IL that connect the following 4 points:

point L (72.5, 10.2, 17.3), point G (18.2, 55.1, 26.7), point H (56.7, 43.3, 0.0), and point I (72.5, 27.5, 0.0), or on the line segments LG, GH, and IL (excluding the points H and I);

the line segment LG is represented by coordinates $(0.0047y^2-1.5177y+87.598,\ y,\ -0.0047y^2+0.5177y+12.402)$, the line segment GH is represented by coordinates $(-0.0134z^2-1.0825z+56.692,\ 0.0134z^2+0.0825z+43.308,\ z)$, and the line segments HI and IL are straight lines.

When the requirements above are satisfied, the refrigerant 1A according to the present disclosure has a refrigerating capacity ratio of 92.5% or more relative to that of R410A, and a COP ratio of 92.5% or more relative to that of R410A; furthermore, the refrigerant has a lower flammability (Class 2L) according to the ASHRAE standard.

The refrigerant 1A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments OD, DE, EF, and FO that connect the following 4 points:

point D (87.6, 0.0, 12.4), point E (31.1, 42.9, 26.0), point F (65.5, 34.5, 0.0), and point O (100.0, 0.0, 0.0).

or on the line segments OD, DE, and EF (excluding the points O and F);

the line segment DE is represented by coordinates $(0.0047y^2-1.5177y+87.598,\ y,\ -0.0047y^2+0.5177y+12.402)$, the line segment EF is represented by coordinates $(-0.0064z^2-1.1565z+65.501,\ 0.0064z^2+0.1565z+34.499,\ z)$, and the line segments FO and OD are straight lines.

When the requirements above are satisfied, the refrigerant 1A according to the present disclosure has a refrigerating capacity ratio of 93.5% or more relative to that of R410A, and a COP ratio of 93.5% or more relative to that of R410A.

The refrigerant 1A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments LE, EF, FI, and IL that connect the following 4 points:

point L (72.5, 10.2, 17.3), point E (31.1, 42.9, 26.0), point F (65.5, 34.5, 0.0), and point I (72.5, 27.5, 0.0), or on the line segments LE, EF, and IL (excluding the points F and I);

the line segment LE is represented by coordinates $(0.0047y^2-1.5177y+87.598,\ y,\ -0.0047y^2+0.5177y+12.402)$, the line segment EF is represented by coordinates $(-0.0134z^2-1.0825z+56.692,\ 0.0134z^2+0.0825z+43.308,\ z)$, and the line segments FI and IL are straight lines.

When the requirements above are satisfied, the refrigerant 1A according to the present disclosure has a refrigerating capacity ratio of 93.5% or more relative to that of R410A, and a COP ratio of 93.5% or more relative to that of R410A; furthermore, the refrigerant has a lower flammability (Class 2L) according to the ASHRAE standard.

The refrigerant 1A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within a figure surrounded by line segments OA, AB, BC, and CO that connect the following 4 points:

point A (93.4, 0.0, 6.6), point B (55.6, 26.6, 17.8), point C (77.6, 22.4, 0.0), and point O (100.0, 0.0, 0.0), or on the line segments OA, AB, and BC (excluding the points O and C);

the line segment AB is represented by coordinates $(0.0052y^2-1.5588y+93.385,\ y,\ -0.0052y^2+0.5588y+6.615)$, the line segment BC is represented by coordinates $(-0.0032z^2-1.1791z+77.593,\ 0.0032z^2+0.1791z+22.407,\ z)$, and the line segments CO and OA are straight lines.

When the requirements above are satisfied, the refrigerant 1A according to the present disclosure has a refrigerating capacity ratio of 95% or, more relative to that of R410A, and a COP ratio of 95% or more relative to that of R410A.

The refrigerant 1A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within a figure surrounded by line segments KB, BJ, and JK that connect the following 3 points:

point K (72.5, 14.1, 13.4), point B (55.6, 26.6, 17.8), and point J (72.5, 23.2, 4.3), or on the line segments KB, BJ, and JK;

the line segment KB is represented by coordinates $(0.0052y^2-1.5588y+93.385,\ y,\ \text{and}\ -0.0052y^2+0.5588y+6.615)$, the line segment BJ is represented by coordinates $(-0.0032z^2-1.1791z+77.593,\ 0.0032z^2+0.1791z+22.407,\ z)$, and the line segment JK is a straight line.

When the requirements above are satisfied, the refrigerant 1A according to the present disclosure has a refrigerating capacity ratio of 95% or more relative to that of R410A, and a COP ratio of 95% or more relative to that of R410A; furthermore, the refrigerant has a lower flammability (Class 2L) according to the ASHRAE standard.

The refrigerant 1A according to the present disclosure may further comprise difluoromethane (R32) in addition to HFO-1132(E), HFO-1123, and R1234yf as long as the above properties and effects are not impaired. The content of R32 based on the entire refrigerant 1A according to the present disclosure is not limited and can be selected from a wide range. For example, when the R32 content of the refrigerant 1A according to the present disclosure is 21.8 mass %, the mixed refrigerant has a GWP of 150. Therefore, the R32 content can be 21.8 mass % or less. The R32 content of the refrigerant 1A according to the present disclosure may be, for example, 5 mass % or more, based on the entire refrigerant.

When the refrigerant 1A according to the present disclosure further contains R32 in addition to HFO-1132(E), HFO-1123, and R1234yf, the refrigerant may be a refrigerant wherein when the mass % of HFO-1132(E), HFO-1123, R1234yf, and R32 based on their sum is respectively represented by x, y, z, and a, if 0<a≤10.0, coordinates (x,y,z) in a ternary composition diagram (FIGS. 1C to 1I) in which the sum of HFO-1132(E), HFO-1123, and R1234yf is 100 mass % are within the range of a figure surrounded by straight lines that connect the following 4 points:

point A $(0.02a^2-2.46a+93.4, 0, -0.02a^2+2.46a+6.6)$,
point B' $(-0.008a^2-1.38a+56, 0.018a^2-0.53a+26.3, -0.01a^2+1.91a+17.7)$,
point C $(-0.016a^2+1.02a+77.6, 0.016a^2-1.02a+22.4, 0)$, and
point O (100.0, 0.0, 0.0),
or on the straight lines OA, AB', and B'C (excluding the points O and C);

if 10.0<a≤16.5, coordinates (x,y,z) in the ternary composition diagram are within the range of a figure surrounded by straight lines that connect the following 4 points:

point A $(0.0244a^2-2.5695a+94.056, 0, -0.0244a^2+2.5695a+5.944)$, point B' $(0.1161a^2-1.9959a+59.749, 0.014a^2-0.3399a+24.8, -0.1301a^2+2.3358a+15.451)$,
point C $(-0.0161a^2+1.02a+77.6, 0.0161a^2-1.02a+22.4, 0)$, and
point O (100.0, 0.0, 0.0),
or on the straight lines OA, AB', and B'C (excluding the points O and C); or if 16.5<a≤1.8, coordinates (x,y,z) in the ternary composition diagram are within the range of a figure surrounded by straight lines that connect the following 4 points:

point A $(0.0161a^2-2.3535a+92.742, 0, -0.0161a^2+2.3535a+7.258)$, point B' $(-0.0435a^2-0.0435a+50.406, -0.0304a^2+1.8991a-0.0661, 0.0739a^2-1.8556a+49.6601)$,
point C $(-0.0161a^2+0.9959a+77.851, 0.0161a^2-0.9959a+22.149, 0)$, and
point O (100.0, 0.0, 0.0),
or on the straight lines OA, AB', and B'C (excluding the points O and C).

Note that when point B in the ternary composition diagram is defined as a point where a refrigerating capacity ratio of 95% relative to that of R410A and a COP ratio of 95% relative to that of R410A are both achieved, point B' is the intersection of straight line AB and an approximate line formed by connecting the points where the COP ratio relative to that of R410A is 95%. When the requirements above are satisfied, the refrigerant 1A according to the present disclosure has a refrigerating capacity ratio of 95% or more relative to that of R410A, and a COP ratio of 95% or more relative to that of R410A.

The refrigerant 1A according to the present disclosure may further comprise other additional refrigerants in addition to HFO-1132(E), HFO-1123, R1234yf, and R32 as long as the above properties and effects are not impaired. In this respect, the refrigerant 1A according to the present disclosure preferably comprises HFO-1132(E), HFO-1123, R1234yf, and R32 in a total amount of 99.5 mass % or more, more preferably 99.75 mass % or more, and still more preferably 99.9 mass % or more, based on the entire refrigerant 1A.

The refrigerant 1A according to the present disclosure may comprise HFO-1132(E), HFO-1123, and R1234yf in a total amount of 99.5 mass % or more, 99.75 mass % or more, or 99.9 mass % or more, based on the entire refrigerant 1A.

The refrigerant 1A according to the present disclosure may comprise HFO-1132(E), HFO1123, R1234yf, and R32 in a total amount of 99.5 mass % or more, 99.75 mass % or more, or 99.9 mass % or more, based on the entire refrigerant 1A.

The additional refrigerants are not limited, and can be selected from a wide range of refrigerants. The mixed refrigerant may comprise a single additional refrigerant, or two or more additional refrigerants.

The refrigerant 1A according to the present disclosure is suitable for use as an alternative refrigerant for R410A.

Examples of Refrigerant 1A

The refrigerant 1A is described in more detail below with reference to Examples. However, the refrigerant 1A according to the present disclosure is not limited to the Examples.

Mixed refrigerants were prepared by mixing HFO-1132 (E), HFO-1123, and R1234yf at mass % based on their sum shown in Tables 1 to 5.

The COP ratio and the refrigerating capacity ratio of the mixed refrigerants relative to those of R410 were determined. The conditions for calculation were as described below.

Evaporating temperature: 5° C.
Condensation temperature: 45° C.
Degree of superheating: 1 K
Degree of subcooling: 5 K
$E_{comp}$ (compressive modulus): 0.7 kWh Tables 1 to 5 show these values together with the GWP of each mixed refrigerant.

TABLE 1

| Item | Unit | Comp. Ex. 1 | Example 1 A | Example 2 | Example 3 | Example 4 | Example 5 | Example 6 B |
|---|---|---|---|---|---|---|---|---|
| HFO-1132(E) | mass % | R410A | 93.4 | 85.7 | 78.3 | 71.2 | 64.3 | 55.6 |
| HFO-1123 | mass % | | 0.0 | 5.0 | 10.0 | 15.0 | 20.0 | 26.6 |
| R1234yf | mass % | | 6.6 | 9.3 | 11.7 | 13.8 | 15.7 | 17.8 |
| GWP | — | 2088 | 1 | 1 | 1 | 1 | 1 | 2 |
| COP ratio | % (relative to R410A) | 100 | 98.0 | 97.5 | 96.9 | 96.3 | 95.8 | 95.0 |

TABLE 1-continued

| Item | Unit | Comp. Ex. 1 | Example 1 A | Example 2 | Example 3 | Example 4 | Example 5 | Example 6 B |
|---|---|---|---|---|---|---|---|---|
| Refrigerating capacity ratio | % (relative to R410A) | 100 | 95.0 | 95.0 | 95.0 | 95.0 | 95.0 | 95.0 |

TABLE 2

| Item | Unit | Comp. Ex. 2 C | Example 7 | Example 8 | Example 9 |
|---|---|---|---|---|---|
| HTO-1132(E) | mass % | 77.6 | 71..6 | 65.5 | 59.2 |
| HFO-1123 | mass % | 22.4 | 23.4 | 24.5 | 25.8 |
| R1234yf | mass % | 0.0 | 5.0 | 10.0 | 15.0 |
| GWP | — | 1 | 1 | 1 | 1 |
| COP ratio | % (relative to R410A) | 95.0 | 95.0 | 95.0 | 95.0 |
| Refrigerating capacity ratio | % (relative to R410A) | 102.5 | 100.5 | 98.4 | 96.3 |

TABLE 3

| Item | Unit | Example 10 D | Example 11 | Example 12 | Example 13 | Example 14 | Example 15 | Example 16 G |
|---|---|---|---|---|---|---|---|---|
| HFO-1132(E) | mass % | 87.6 | 72.9 | 59.1 | 46.3 | 34.4 | 23.5 | 18.2 |
| HFO-1123 | mass % | 0.0 | 10.0 | 20.0 | 30.0 | 40.0 | 50.0 | 55.1 |
| R1234yf | mass % | 12.4 | 17.1 | 20.9 | 23.7 | 25.6 | 26.5 | 26.7 |
| GWP | — | 1 | 2 | 2 | 2 | 2 | 2 | 2 |
| COP ratio | % (relative to R410A) | 98.2 | 97.1 | 95.9 | 94.8 | 93.8 | 92.9 | 92.5 |
| Refrigerating capacity ratio | % (relative to R410A) | 92.5 | 92.5 | 92.5 | 92.5 | 92.5 | 92.5 | 92.5 |

TABLE 4

| Item | Unit | Comp. Ex. 3 H | Example 17 | Example 18 | Comp. Ex. 4 F | Example 19 | Example 20 | Example 21 E |
|---|---|---|---|---|---|---|---|---|
| HFO-1132(E) | mass % | 56.7 | 44.5 | 29.7 | 65.5 | 53.3 | 39.8 | 31.1 |
| HFO-1123 | mass % | 43.3 | 45.5 | 50.3 | 34.5 | 36.7 | 40.2 | 42.9 |
| R1234yf | mass % | 0.0 | 10.0 | 20.0 | 0.0 | 10.0 | 20.0 | 26.0 |
| GWP | — | 1 | 1 | 2 | 1 | 1 | 2 | 2 |
| COP ratio | % (relative to R410A) | 92.5 | 92.5 | 92.5 | 93.5 | 93.5 | 93.5 | 93.5 |
| Refrigerating capacity ratio | % (relative to R410A) | 105.8 | 101.2 | 96.2 | 104.5 | 100.2 | 95.5 | 92.5 |

TABLE 5

| Item | Unit | Comp. Ex. 5 I | Example 22 J | Example 23 K | Example 24 L | Comp. Ex. 6 M |
|---|---|---|---|---|---|---|
| HFO-1132(E) | mass % | 72.5 | 72.5 | 72.5 | 72.5 | 72.5 |
| HFO-1123 | mass % | 27.5 | 23.2 | 14.1 | 10.2 | 0.0 |
| R1234yf | mass % | 0.0 | 4.3 | 13.4 | 17.3 | 27.5 |
| GWP | — | 1 | 1 | 1 | 2 | 2 |
| COP ratio | % (relative to R410A) | 94.4 | 95.0 | 96.4 | 97.1 | 98.8 |
| Refrigerating capacity ratio | % (relative to R410A) | 103.5 | 100.8 | 95.0 | 92.5 | 85.7 |

These results indicate that under the condition that the mass % of HFO-1132(E), HFO-1123, and R1234yf based on their sum is respectively represented by x, y, and z, when coordinates (x,y,z) in a ternary composition diagram in which the sum of HFO-1132(E), HFO-1123, and R1234yf is 100 mass % are within the range of a figure (FIG. 1B) surrounded by line segments OD, DG, GH, and HO that connect the following 4 points:

point D (87.6, 0.0, 12.4), point G (18.2, 55.1, 26.7), point H (56.7, 43.3, 0.0), and point O (100.0, 0.0, 0.0), or on the line segments OD, DG, and GH (excluding the points O and H), the refrigerant has a refrigerating capacity ratio of 92.5% or more relative to that of R410A, and a COP ratio of 92.5% or more relative to that of R410A.

Likewise, the results indicate that when coordinates (x,y,z) are within the range of a figure (FIG. 1B) surrounded by line segments OD, DE, EF, and FO that connect the following 4 points:

point D (87.6, 0.0, 12.4), point E (31.1, 42.9, 26.0), point F (65.5, 34.5, 0.0), and point O (100.0, 0.0, 0.0), or on the line segments OD, DE, and EF (excluding the points O and F), the refrigerant has a refrigerating capacity ratio of 93.5% or more relative to that of R410A, and a COP ratio of 93.5% or more relative to that of R410A.

Likewise, the results indicate that when coordinates (x,y, z) are within the range of a figure (FIG. 1B) surrounded by line segments OA, AB, BC, and CO that connect the following 4 points:

point (93.4, 0.0, 6.6), point B (55.6, 26.6, 17.8), point C (77.6, 22.4, 0.0), and point O (100.0, 0.0, 0.0), or on the line segments OA, AB, and BC (excluding the points O and C), the refrigerant has a refrigerating capacity ratio of 95% or more relative to that of R410A, and a COP ratio of 95% or more relative to that of R410A.

R1234yf contributes to reduction of flammability and reduction of deterioration of polymerization etc. in these compositions. Therefore, the composition according to the present disclosure preferably contains R1234yf.

Further, the burning velocity of these mixed refrigerants was measured according to the ANSI/ASHRAE Standard 34-2013. Compositions that showed a burning velocity of 10 cm/s or less were determined to be Class 2L (lower flammability). These results clearly indicate that when the content of HFO-1132(E) in a mixed refrigerant of HFO-1132 (E), HFO-1123, and R1234yf is 72.5 mass % or less based on their sum, the refrigerant can be determined to be Class 2L (lower flammability).

A burning velocity test was performed using the apparatus shown in FIG. 1A in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Mixed refrigerants were prepared by mixing HFO-1132 (E), HFO-1123, R1234yf, and R32 in amounts shown in Tables 6 to 12, in terms of mass %, based on their sum.

The COP ratio and the refrigerating capacity ratio of these mixed refrigerants relative to those of R410A were determined. The calculation conditions were the same as described above. Tables 6 to 12 show these values together with the GWP of each mixed refrigerant.

TABLE 6

| Item | Unit | Comp. Ex. 1 | Comp. Ex. 7 A | Comp. Ex. 8 | Comp. Ex. 9 | Example 25 B' | Comp. Ex. 10 B | Example 26 | Example 27 | Comp. Ex. 11 C |
|---|---|---|---|---|---|---|---|---|---|---|
| HFO-1132(E) | mass % | R410A | 93.4 | 78.3 | 64.3 | 56.0 | 55.6 | 60.0 | 70.0 | 77.6 |
| HFO-1123 | mass % | | 0.0 | 10.0 | 20.0 | 26.3 | 26.6 | 25.6 | 23.7 | 22.4 |
| R1234yf | mass % | | 6.6 | 11.7 | 15.7 | 17.7 | 17.8 | 14.4 | 6.3 | 0.0 |
| R32 | mass % | | 0.0 | 0.0 | 0.0 | 0.0 | 0.0 | 0.0 | 0.0 | 0.0 |
| GWP | — | 2088 | 1 | 1.4 | 1.5 | 1.5 | 1.5 | 1.4 | 1.2 | 1.0 |
| COP ratio | % (relative to R410A) | 100 | 98.0 | 96.9 | 95.8 | 95.0 | 95.0 | 95.0 | 95.0 | 95.0 |
| Refrigerating capacity ratio | % (relative to R410A) | 100 | 95.0 | 95.0 | 95.0 | 95.0 | 95.0 | 96.5 | 100.0 | 102.5 |

TABLE 7

| Item | Unit | Comp. Ex. 12 A | Comp. Ex. 13 | Comp. Ex. 14 | Example 28 B' | Comp. Ex. 15 B | Example 29 | Example 30 | Comp. Ex. 16 C |
|---|---|---|---|---|---|---|---|---|---|
| HFO-1132(E) | mass % | 81.6 | 67.3 | 53.9 | 48.9 | 47.2 | 60.0 | 70.0 | 77.3 |
| HFO-1123 | mass % | 0.0 | 10.0 | 20.0 | 24.1 | 25.3 | 21.6 | 19.2 | 17.7 |
| R1234yf | mass % | 13.4 | 17.7 | 21.1 | 22.0 | 22.5 | 13.4 | 5.8 | 0.0 |
| R32 | mass % | 5.0 | 5.0 | 5.0 | 5.0 | 5.0 | 5.0 | 5.0 | 5.0 |
| GWP | — | 35 | 35 | 35 | 35 | 35 | 35 | 35 | 35 |
| COP ratio | % (relative to R410A) | 97.6 | 96.6 | 95.5 | 95.0 | 95.0 | 95.0 | 95.0 | 95.0 |
| Refrigerating capacity ratio | % (relative to R410A) | 95.0 | 95.0 | 95.0 | 104.4 | 95.0 | 99.0 | 102.1 | 104.4 |

TABLE 8

| Item | Unit | Comp. Ex. 17 A | Comp. Ex. 18 | Comp. Ex. 19 | Example 31 B' | Comp. Ex. 20 B | Example 32 | Example 33 | Comp. Ex. 21 C |
|---|---|---|---|---|---|---|---|---|---|
| HFO-1132(E) | mass % | 70.8 | 57.2 | 44.5 | 41.4 | 36.4 | 60.0 | 70.0 | 76.2 |
| HFO-1123 | mass % | 0.0 | 10.0 | 20.0 | 22.8 | 26.7 | 18.0 | 15.3 | 13.8 |
| R1234yf | mass % | 19.2 | 22.8 | 25.5 | 25.8 | 26.9 | 12.0 | 4.7 | 0.0 |
| R32 | mass % | 10.0 | 10.0 | 10.0 | 10.0 | 10.0 | 10.0 | 10.0 | 10.0 |
| GWP | — | 69 | 69 | 69 | 69 | 69 | 69 | 69 | 68 |
| COP ratio | % (relative to R410A) | 97.4 | 96.5 | 95.6 | 95.0 | 95.0 | 95.0 | 95.0 | 95.0 |
| Refrigerating capacity ratio | % (relative to R410A) | 95.0 | 95.0 | 95.0 | 106.2 | 95.0 | 101.5 | 104.4 | 106.2 |

TABLE 9

| Item | Unit | Comp. Ex. 22 A | Comp. Ex. 23 | Comp. Ex. 24 | Example 34 B' | Comp. Ex. 25 B | Example 35 | Example 36 | Comp. Ex. 26 C |
|---|---|---|---|---|---|---|---|---|---|
| HFO-1132(E) | mass % | 62.3 | 49.3 | 37.1 | 34.5 | 24.9 | 60.0 | 70.0 | 74.5 |
| HFO-1123 | mass % | 0.0 | 10.0 | 20.0 | 22.8 | 30.7 | 15.4 | 12.4 | 11.2 |
| R1234yf | mass % | 23.4 | 26.4 | 28.6 | 28.4 | 30.1 | 10.3 | 3.3 | 0.0 |
| R32 | mass % | 14.3 | 14.3 | 14.3 | 14.3 | 14.3 | 14.3 | 14.3 | 14.3 |
| GWP | — | 98 | 98 | 98 | 98 | 98 | 98 | 97 | 97 |
| COP ratio | % (relative to R410A) | 97.3 | 96.5 | 95.7 | 95.5 | 95.0 | 95.0 | 95.0 | 95.0 |
| Refrigerating capacity ratio | % (relative to R410A) | 95.0 | 95.0 | 95.0 | 95.4 | 95.0 | 103.7 | 106.5 | 107.7 |

TABLE 10

| Item | Unit | Comp. Ex. 27 A | Comp. Ex. 28 | Comp. Ex. 29 | Example 37 B' | Comp. Ex. 30 B | Example 38 | Example 39 | Comp. Ex. 31 C |
|---|---|---|---|---|---|---|---|---|---|
| HFO-1132(E) | mass % | 58.3 | 45.5 | 33.5 | 31.2 | 16.5 | 60.0 | 70.0 | 73.4 |
| HFO-1123 | mass % | 0.0 | 10.0 | 20.0 | 23.0 | 35.5 | 14.2 | 11.1 | 10.1 |
| R1234yf | mass % | 25.2 | 28.0 | 30.0 | 29.3 | 31.5 | 9.3 | 2.4 | 0.0 |
| R32 | mass % | 16.5 | 16.5 | 16.5 | 16.5 | 16.5 | 16.5 | 16.5 | 16.5 |
| GWP | — | 113.0 | 113.1 | 113.1 | 113.1 | 113.2 | 112.5 | 112.3 | 112.2 |
| COP ratio | % (relative to R410A) | 97.4 | 96.6 | 95.9 | 95.6 | 95.0 | 95.0 | 95.0 | 95.0 |
| Refrigerating capacity ratio | % (relative to R410A) | 95.0 | 95.0 | 95.0 | 95.7 | 95.0 | 104.9 | 107.6 | 108.5 |

TABLE 11

| Item | Unit | Comp. Ex. 32 A | Comp. Ex. 33 | Comp. Ex. 34 | Example 40 B' | Comp. Ex. 35 B | Example 41 | Example 42 | Comp. Ex. 36 C |
|---|---|---|---|---|---|---|---|---|---|
| HFO-1132(E) | mass % | 53.5 | 41.0 | 29.3 | 25.8 | 0.0 | 50.0 | 60.0 | 71.7 |
| HFO-1123 | mass % | 0.0 | 10.0 | 20.0 | 25.2 | 48.8 | 16.8 | 12.9 | 9.1 |
| R1234yf | mass % | 27.3 | 29.8 | 31.5 | 29.8 | 32.0 | 14.0 | 7.9 | 0.0 |
| R32 | mass % | 19.2 | 19.2 | 19.2 | 19.2 | 19.2 | 19.2 | 19.2 | 19.2 |
| GWP | | 131.2 | 131.3 | 131.4 | 131.3 | 131.4 | 130.8 | 130.6 | 130.4 |
| COP ratio | % (relative to R410A) | 97.4 | 96.7 | 96.1 | 97.8 | 95.0 | 95.0 | 95.0 | 95.0 |
| Refrigerating capacity ratio | % (relative to R410A) | 95.0 | 95.0 | 95.0 | 96.3 | 95.0 | 104.0 | 106.4 | 109.4 |

TABLE 12

| Item | Unit | Comp. Ex. 37 A | Comp. Ex. 38 | Comp. Ex. 39 | Example 43 B' | Comp. Ex. 40 B | Example 44 | Example 45 | Comp. Ex. 41 C |
|---|---|---|---|---|---|---|---|---|---|
| HFO-1132(E) | mass % | 49.1 | 36.9 | 25.5 | 20.0 | 0.0 | 50.0 | 60.0 | 69.7 |
| HFO-1123 | mass % | 0.0 | 10.0 | 20.0 | 26.9 | 45.3 | 15.8 | 11.9 | 8.5 |
| R1234yf | mass % | 29.1 | 31.3 | 20.0 | 31.3 | 32.9 | 12.4 | 6.3 | 0.0 |
| R32 | mass % | 21.8 | 21.8 | 21.8 | 21.8 | 21.8 | 21.8 | 21.8 | 21.8 |
| GWP | — | 148.8 | 148.9 | 148.9 | 148.9 | 148.9 | 148.3 | 148.1 | 147.9 |
| COP ratio | % (relative to R410A) | 97.6 | 96.9 | 96.4 | 95.9 | 95.5 | 95.0 | 95.0 | 95.0 |
| Refrigerating capacity ratio | % (relative to R410A) | 95.0 | 95.0 | 95.0 | 98.4 | 95.0 | 105.6 | 108.0 | 110.3 |

These results indicate that the refrigerants according to the present disclosure that satisfy the following conditions have a refrigerating capacity ratio of 95% or more relative to that of R410A, and a COP ratio of 95% or more relative to that of R410A:

when the mass % of HFO-1132(E), HFO-1123, R1234yf, and R32 based on their sum is respectively represented by x, y, z, and a, if $0<a\leq10.0$, coordinates (x,y,z) in a ternary composition diagram (FIGS. 1C to 1I) in which the sum of HFO-1132(E), HFO-1123, and R1234yf is 100 mass % are within the range of a figure surrounded by straight lines that connect the following 4 points:

point A $(0.02a^2-2.46a+93.4, 0, -0.02a^2+2.46a+6.6)$,
point B' $(-0.008a^2-1.38a+56, 0.018a^2-0.53a+26.3, -0.01a^2+1.91a+17.7)$,
point C $(-0.016a^2+1.02a+77.6, 0.016a^2-1.02a+22.4, 0)$, and
point O (100.0, 0.0, 0.0),
or on the straight lines OA, AB', and B'C (excluding the points O and C);

if $10.0<a\leq16.5$, coordinates (x,y,z) in the ternary composition diagram are within the range of a figure surrounded by straight lines that connect the following 4 points:

point A $(0.0244a^2-2.5695a+94.056, 0, -0.0244a^2+2.5695a+5.944)$, point B' $(0.1161a^2-1.9959a+59.749, 0.014a^2-0.3399a+24.8, -0.1301a^2+2.3358a+15.451)$,
point C $(-0.0161a^2+1.02a+77.6, 0.0161a^2-1.02a+22.4, 0)$, and
point O (100.0, 0.0, 0.0), or on the straight lines OA, AB', and B'C (excluding the points O and C); or if $16.5<a\leq21.8$, coordinates (x,y,z) in the ternary composition diagram are within the range of a figure surrounded by straight lines that connect the following 4 points:

point A $(0.0161a^2-2.3535a+92.742, 0, -0.0161a^2+2.3535a+7.258)$, point B' $(-0.0435a^2-0.0435a+50.406, -0.0304a^2+1.8991a-0.0661, 0.0739a^2-1.8556a+49.6601)$,
point C $(-0.0161a^2+0.9959a+77.851, 0.0161a^2-0.9959a+22.149, 0)$, and
point O (100.0, 0.0, 0.0),
or on the straight lines OA, AB', and B'C (excluding the points O and C).

FIGS. 1C to 1I show compositions whose R32 content a (mass %) is 0 mass %, 5 mass %, 10 mass %, 14.3 mass %, 16.5 mass %, 19.2 mass %, and 21.8 mass %, respectively.

Note that when point B in the ternary composition diagram is defined as a point where a refrigerating capacity ratio of 95% relative to that of R410A and a COP ratio of 95% relative to that of R410A are both achieved, point B' is the intersection of straight line AB and an approximate line formed by connecting three points, including point C, where the COP ratio relative to that of R410A is 95%.

Points A, B', and C were individually obtained by approximate calculation in the following manner.

Point A is a point where the HFO-1123 content is 0 mass % and a refrigerating capacity ratio of 95% relative to that of R410A is achieved. Three points corresponding to point A were obtained in each of the following three ranges by calculation, and their approximate expressions were obtained.

TABLE 13

| Item | 10.0 ≥ R32 ≥ 0 | | | 16.5 ≥ R32 ≥10.0 | | | 21.8 ≥ R32 ≥ 16.5 | | |
|---|---|---|---|---|---|---|---|---|---|
| R32 | 0.0 | 5.0 | 10.0 | 10.0 | 14.3 | 16.5 | 16.5 | 19.2 | 21.8 |
| HFO-1132(E) | 93.4 | 81.6 | 70.8 | 70.8 | 62.3 | 58.3 | 58.3 | 53.5 | 49.1 |
| HFO-1123 | 0.0 | 0.0 | 0.0 | 0.0 | 0.0 | 0.0 | 0.0 | 0.0 | 0.0 |
| R1234yf | 6.6 | 13.4 | 19.2 | 19.2 | 23.4 | 25.2 | 25.2 | 27.3 | 29.1 |
| R32 | x | | | x | | | x | | |
| HFO-1132(E) approximate expression | 0.02x2 − 2.46x + 93.4 | | | 0.0244x2 − 2.5695x + 94.056 | | | 0.0161x2 − 2.3535x + 92.742 | | |
| HFO-1123 approximate expression | 0 | | | 0 | | | 0 | | |
| R1234yf approximate expression | 100-R32-HFO-1132(E) | | | 100-R32-HFO-1132(E) | | | 100-R32-HFO-1132(E) | | |

Point C is a point where the R1234yf content is 0 mass % and a COP ratio of 95% relative to that of R410A is achieved. Three points corresponding to point C were obtained in each of the following three ranges by calculation, and their approximate expressions were obtained.

TABLE 14

| Item | 10.0 ≥ R32 ≥ 0 | | | 16.5 ≥ R32 ≥10.0 | | | 21.8 ≥ R32 ≥ 16.5 | | |
|---|---|---|---|---|---|---|---|---|---|
| R32 | 0 | 5 | 10 | 10 | 14.3 | 16.5 | 16.5 | 19.2 | 21.8 |
| HFO-1132(E) | 77.6 | 77.3 | 76.2 | 76.2 | 74.5 | 73.4 | 73.4 | 71.7 | 69.7 |
| HFO-1123 | 22.4 | 17.7 | 13.8 | 13.8 | 11.2 | 10.1 | 10.1 | 9.1 | 8.5 |
| R1234yf | 0 | 0 | 0 | 0 | 0 | 0 | 0 | 0 | 0 |
| R32 | | x | | | x | | | x | |
| HFO-1132(E) approximate expression | | 100-R32HFO-1123 | | | 100-R32HFO-1123 | | | 100-R32HFO-1123 | |
| HFO-1123 approximate expression | | 0.016x2 − 1.02x + 22.4 | | | 0.0161x2 − 0.9959x + 22.149 | | | 0.0161*2 − 0.9959* + 22.149 | |
| R1234yf approximate expression | | 100-R32-HFO-1132(E) | | | 100-R32-HFO-1132(E) | | | 100-R32-HFO-1132(E) | |

Three points corresponding to point B' were obtained in each of the following three ranges by calculation, and their approximate expressions were obtained.

TABLE 15

| Item | 10.0 ≥ R32 ≥ 0 | | | 16.5 ≥ R32 ≥10.0 | | | 21.8 ≥ R32 ≥ 16.5 | | |
|---|---|---|---|---|---|---|---|---|---|
| R32 | 0 | 5 | 10 | 10 | 14.3 | 16.5 | 16.5 | 19.2 | 21.8 |
| HFO-1132(E) | 56 | 48.9 | 41.4 | 41.4 | 34.5 | 31.2 | 31.2 | 25.8 | 20 |
| HFO-1123 | 26.3 | 24.1 | 22.8 | 22.8 | 22.8 | 23 | 23 | 25.2 | 26.9 |
| R1234yf | 17.7 | 22 | 25.8 | 25.8 | 28.4 | 29.3 | 29.3 | 29.8 | 31.3 |
| R32 | | x | | | x | | | x | |
| HFO-1132(E) approximate expression | | −0.008*2 − 1.38*56 | | | 0.0161x2 − 1.9959x + 59.749 | | | −0.0435x2 − 0.4456x + 50.406 | |
| HFO-1123 approximate expression | | 0.018x2 − 0.53x + 26.3 | | | 0.014x2 − 0.3399x + 24.8 | | | −0.0304*2 + 1.8991* − 0.0661 | |
| R1234yf approximate expression | | 100-R32-HFO-1132(E) | | | 100-R32-HFO-1132(E) | | | 100-R32-HFO-1132(E) | |

(1-5-2) Refrigerant 1B

Refrigerant 1B according to the present disclosure is a mixed refrigerant comprising HFO-1132(E) and HFO-1123 in a total amount of 99.5 mass % or more based on the entire refrigerant 1B, and the refrigerant 1B comprising 62.5 mass % to 72.5 mass % of HFO-1132(E) based on the entire refrigerant 1B.

The refrigerant 1B according to the present disclosure has various properties that are desirable as an R410A-alternative refrigerant, i.e., (1) a coefficient of performance equivalent to that of R410A, (2) a refrigerating capacity equivalent to that of R410A, (3) a sufficiently low GWP, and (4) a lower flammability (Class 2L) according to the ASHRAE standard.

The refrigerant 1B according to the present disclosure is particularly preferably a mixed refrigerant comprising 72.5 mass % or less of HFO-1132(E), because it has a lower flammability (Class 2L) according to the ASHRAE standard.

The refrigerant 1B according to the present disclosure is more preferably a mixed refrigerant comprising 62.5 mass % or more of HFO-1132(E). In this case, the refrigerant 1B according to the present disclosure has a superior coefficient of performance relative to that of R410A, the polymerization reaction of HFO-1132(E) and/or HFO-1123 is further suppressed, and the stability is further improved.

The refrigerant 1B according to the present disclosure may further comprise other additional refrigerants in addition to HFO-1132(E) and HFO-1123, as long as the above properties and effects are not impaired. In this respect, the refrigerant 1B according to the present disclosure preferably comprises HFO-1132(E) and HFO-1.123 in a total amount of 99.75 mass % or more, and more preferably 99.9 mass % or more, based on the entire refrigerant 1B.

Such additional refrigerants are not limited, and can be selected from a wide range of refrigerants. The mixed refrigerant may comprise a single additional refrigerant, or two or more additional refrigerants.

The refrigerant 1B according to the present disclosure is suitable for use as an alternative refrigerant for HFC refrigerants, such as R410A, R407C, and R404A, as well as for HCFC refrigerants, such as R22.

Examples of Refrigerant 1B

The refrigerant 1B is described in more detail below with reference to Examples. However, the refrigerant 1B according to the present disclosure is not limited to the Examples.

Mixed refrigerants were prepared by mixing HFO-1132 (E) and HFO-1123 at mass % based on their sum shown in Tables 16 and 17.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in PTL 1). The refrigerating capacity of compositions each comprising R410A and a mixture of HFO-1132 (E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 5° C.

Condensation temperature: 45° C.

Superheating temperature: 1 K

Subcooling temperature: 5 K.

Compressor efficiency: 70%

Tables 1 and 2 show GWP, COP, and refrigerating capacity, which were calculated based on these results. The COP and refrigerating capacity are ratios relative to R410A.

The coefficient of performance (COP) was determined by the following formula.

COP=(refrigerating capacity or heating capacity)/power consumption

For the flammability, the burning velocity was measured according to the ANSI/ASHRAE Standard 34-2013. Compositions having a burning velocity of 10 cm/s or less were determined to be "Class 2L (lower flammability)."

A burning velocity test was performed using the apparatus shown in FIG. 1A in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 16

| Item | Unit | Comp. Ex. 1 R410A | Comp. Ex. 2 HFO-1132E | Comp. Ex. 3 | Example 1 | Example 2 | Example 3 |
|---|---|---|---|---|---|---|---|
| HFO-1132E | mass % | 0 | 100 | 80 | 72.5 | 70 | 67.5 |
| HFO-1123 | mass % | 0 | 0 | 20 | 27.5 | 30 | 32.5 |
| GWP | — | 2088 | 1 | 1 | 1 | 1 | 1 |
| COP ratio | % (relative to R410A) | 100 | 98 | 95.3 | 94.4 | 94.1 | 93.8 |
| Refrigerating capacity ratio | % (relative to R410A) | 100 | 98 | 102.1 | 103.5 | 103.9 | 104.3 |
| Discharge pressure | MPa | 2.7 | 2.7 | 2.9 | 3.0 | 3.0 | 3.1 |
| Burning velocity | cm/sec | Non-flammable | 20 | 13 | 10 | 9 | 9 or less |

TABLE 17

| Item | Unit | Example 4 | Example 5 | Comp. Ex. 4 | Comp. Ex. 5 | Comp. Ex. 6 | Comp. Ex. 7 HFO-1123 |
|---|---|---|---|---|---|---|---|
| HFO-1132E | mass % | 65 | 62.5 | 60 | 50 | 25 | 0 |
| HFO-1123 | mass % | 35 | 37.5 | 40 | 50 | 75 | 100 |
| GWP | — | 1 | 1 | 1 | 1 | 1 | 1 |
| COP ratio | % (relative to R410A) | 93.5 | 93.2 | 92.9 | 91.8 | 89.9 | 89.9 |
| Refrigerating capacity ratio | % (relative to R410A) | 104.7 | 105.0 | 105.4 | 106.6 | 108.1 | 107.0 |
| Discharge pressure | MPa | 3.1 | 3.1 | 3.1 | 3.2 | 3.4 | 3.4 |
| Burning velocity | cm/sec | 9 or less | 9 or less | 9 or less | 9 or less | 9 or less | 5 |

The compositions each comprising 62.5 mass % to 72.5 mass % of HFO-1132(E) based on the entire composition are stable while having a low GWP (GWP=1), and they ensure ASHRAE 2L flammability. Further, surprisingly, they can ensure performance equivalent to that of R410A.

(1-5-3) Refrigerant 1C (5-3) Refrigerant 1C

Refrigerant 1C according to the present disclosure is a mixed refrigerant comprising HFO-1132(E), R32, and 2,3,3,3-tetrafluoro-1-propene (R1234yf).

The refrigerant 1C according to the present disclosure has various properties that are desirable as an R410A-alternative refrigerant; i.e., a refrigerating capacity equivalent to that of R410A, a sufficiently low GWP, and a lower flammability (Class 2L) according to the ASHRAE standard.

The refrigerant 1C according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments AC, CF, FD, and DA that connect the following 4 points:

point A (71.1, 0.0, 28.9),
point C (36.5, 18.2, 45.3),
point F (47.6, 18.3, 34.1), and
point D (72.0, 0.0, 28.0),
or on these line segments;

the line segment AC is represented by coordinates $(0.0181y^2-2.2288y+71.096, y, -0.0181y^2+1.2288y+28.904)$, the line segment FD is represented by coordinates $(0.02y^2-1.7y+72, y, -0.02y^2+0.7y+28)$, and the line segments CF and DA are straight lines. When the requirements above are satisfied, the refrigerant 1C according to the present disclosure has a refrigerating capacity ratio of 85% or more relative to that of R410A, a GWP of 125 or less, and a lower flammability (Class 2L) according to the ASHRAE standard.

The refrigerant 1C according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments AB, BE, ED, and DA that connect the following 4 points:

point A (71.1, 0.0, 28.9),
point B (42.6, 14.5, 42.9),
point E (51.4, 14.6, 34.0), and
point D (72.0, 0.0, 28.0),
or on these line segments;

the line segment AB is represented by coordinates $(0.0181y^2-2.2288y+71.096, y, -0.0181y^2+1.2288y+28.904)$, the line segment ED is represented by coordinates $(0.02y^2-1.7y+72, y, -0.02y^2+0.7y+28)$, and the line segments BE and DA are straight lines. When the requirements above are satisfied, the refrigerant 1C according to the present disclosure has a refrigerating capacity ratio of 85% or more relative to that of R410A, a GWP of 100 or less, and a lower flammability (Class 2L) according to the ASHRAE standard.

The refrigerant 1C according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of WO-1132(E), R32, and R1234yf is 100 mass % are within the range of a figure surrounded by line segments GI, IJ, and JG that connect the following 3 points:

point G (77.5, 6.9, 15.6),
point I (55.1, 18.3, 26.6), and
point J (77.5, 18.4, 4.1),
or on these line segments;

the line segment GI is represented by coordinates $(0.02y^2-2.4583y+93.396, y, -0.02y^2+1.4583y+6.604)$, and the line segments IJ and JG are straight lines. When the requirements above are satisfied, the refrigerant 1C according to the present disclosure has a refrigerating capacity ratio of 95% or more relative to that of R410A and a GWP of 100 or less, undergoes fewer or no changes such as polymerization or decomposition, and also has excellent stability.

The refrigerant 1C according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments GH, HK, and KG that connect the following 3 points:

point G (77.5, 6.9, 15.6),
point H (61.8, 14.6, 23.6), and
point K (77.5, 14.6, 7.9),
or on these line segments;

the line segment GH is represented by coordinates $(0.02y^2-2.4583y+93.396, y, -0.02y^2+1.4583y+6.604)$, and the line segments HK and KG are straight lines. When the requirements above are satisfied, the refrigerant 1C according to the present disclosure has a refrigerating capacity ratio of 95% or more relative to that of R410A and a GWP of 100 or less, undergoes fewer or no changes such as polymerization or decomposition, and also has excellent stability.

The refrigerant 1C according to the present disclosure may further comprise other additional refrigerants in addition to HFO-1132(E), R32, and R1234yf, as long as the above properties and effects are not impaired. In this respect, the refrigerant 1C according to the present disclosure preferably comprises HFO-1132(E), R32, and R1234yf in a total amount of 99.5 mass % or more, more preferably 99.75 mass % or more, and still more preferably 99.9 mass % or more based on the entire refrigerant 1C.

Such additional refrigerants are not limited, and can be selected from a wide range of refrigerants. The mixed refrigerant may comprise a single additional refrigerant, or two or more additional refrigerants.

The refrigerant 1C according to the present disclosure is suitable for use as an alternative refrigerant for R410A.

Examples of Refrigerant 1C

The refrigerant 1C is described in more detail below with reference to Examples. However, the refrigerant 1C according to the present disclosure is not limited to the Examples.

The burning velocity of individual mixed refrigerants of HFO-1132(E), R32, and R1234yf was measured in accordance with the ANSI/ASHRAE Standard 34-2013. A formulation that shows a burning velocity of 10 cm/s was found by changing the concentration of R32 by 5 mass %. Table 18 shows the formulations found.

A burning velocity test was performed using the apparatus shown in FIG. 1A in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 18

| Item | Unit | Point D | R32 = 5 mass % | R32 = 10 mass % | R32 = 15 mass % | R32 = 20 mass % |
|---|---|---|---|---|---|---|
| HFO-1132E | Mass % | 72 | 64 | 57 | 51 | 46 |
| R32 | Mass % | 0 | 5 | 10 | 15 | 20 |
| R1234yf | Mass % | 28 | 31 | 33 | 34 | 34 |
| Burning Velocity | cm/s | 10 | 10 | 10 | 10 | 10 |

Figure 1B:
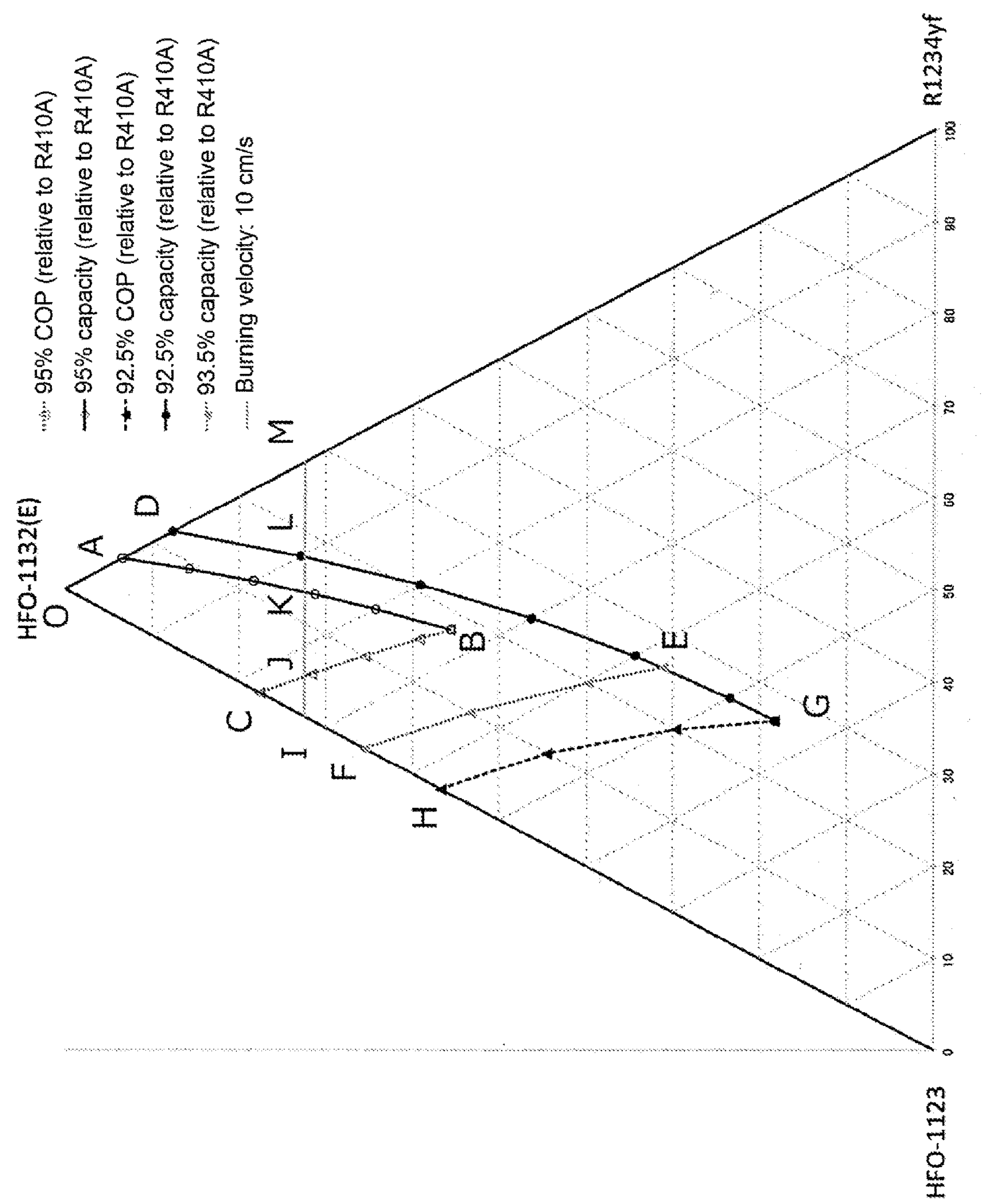
FIG. 1B is a diagram showing points A to M and O, and line segments that connect these points to each, other in a ternary composition diagram in which the sum of HFO-1132 (E), HFO-1123, and R1234yf is 100 mass %.
Figure 1C:
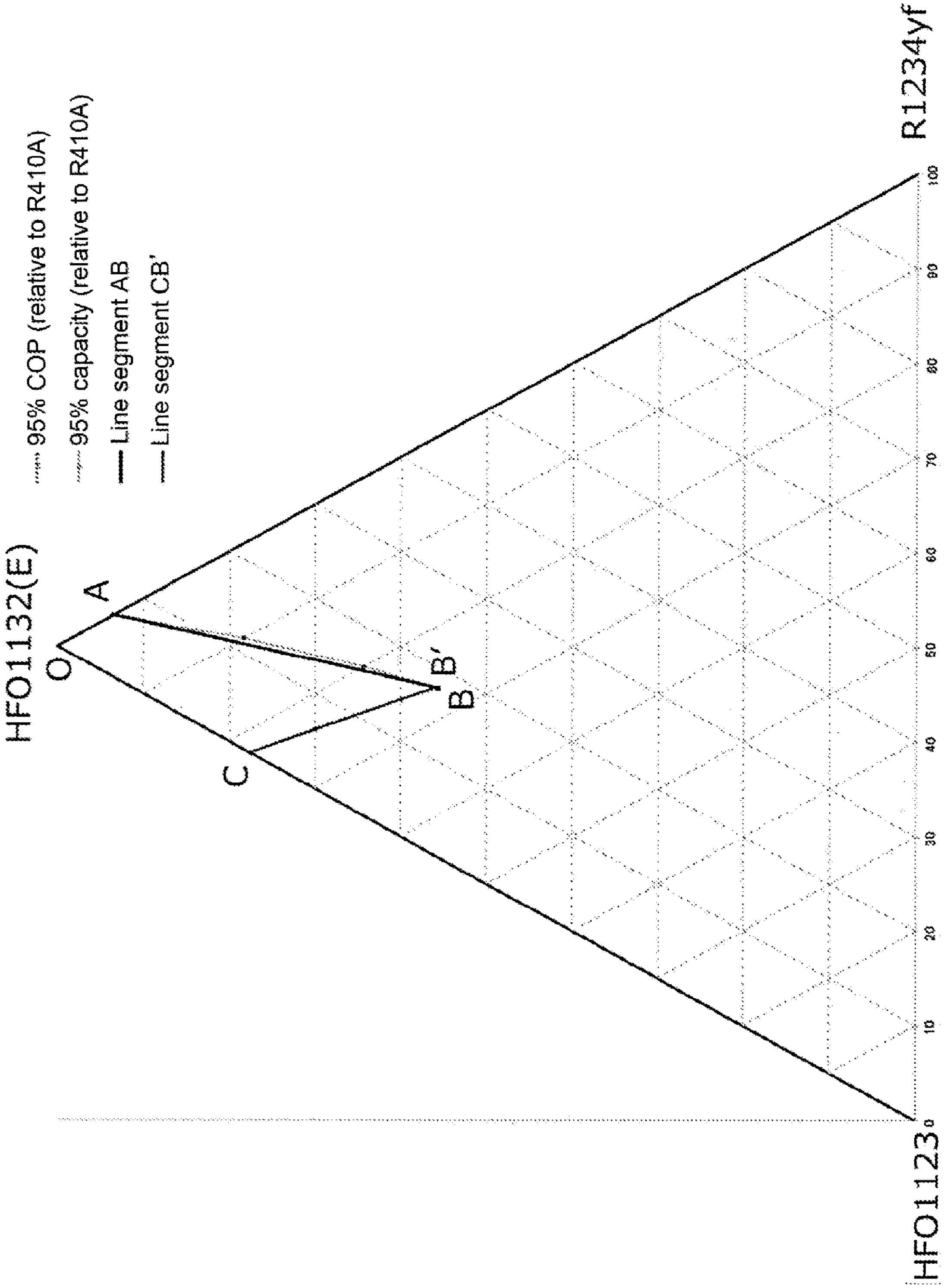
FIG. 1C is a diagram showing points A to C, B' and O, and line segments that connect these points to each other in a ternary composition diagram in which the sum of HFO-1132 (E), HFO-1123, and R1234yf is 100 mass %.
Figure 1D:
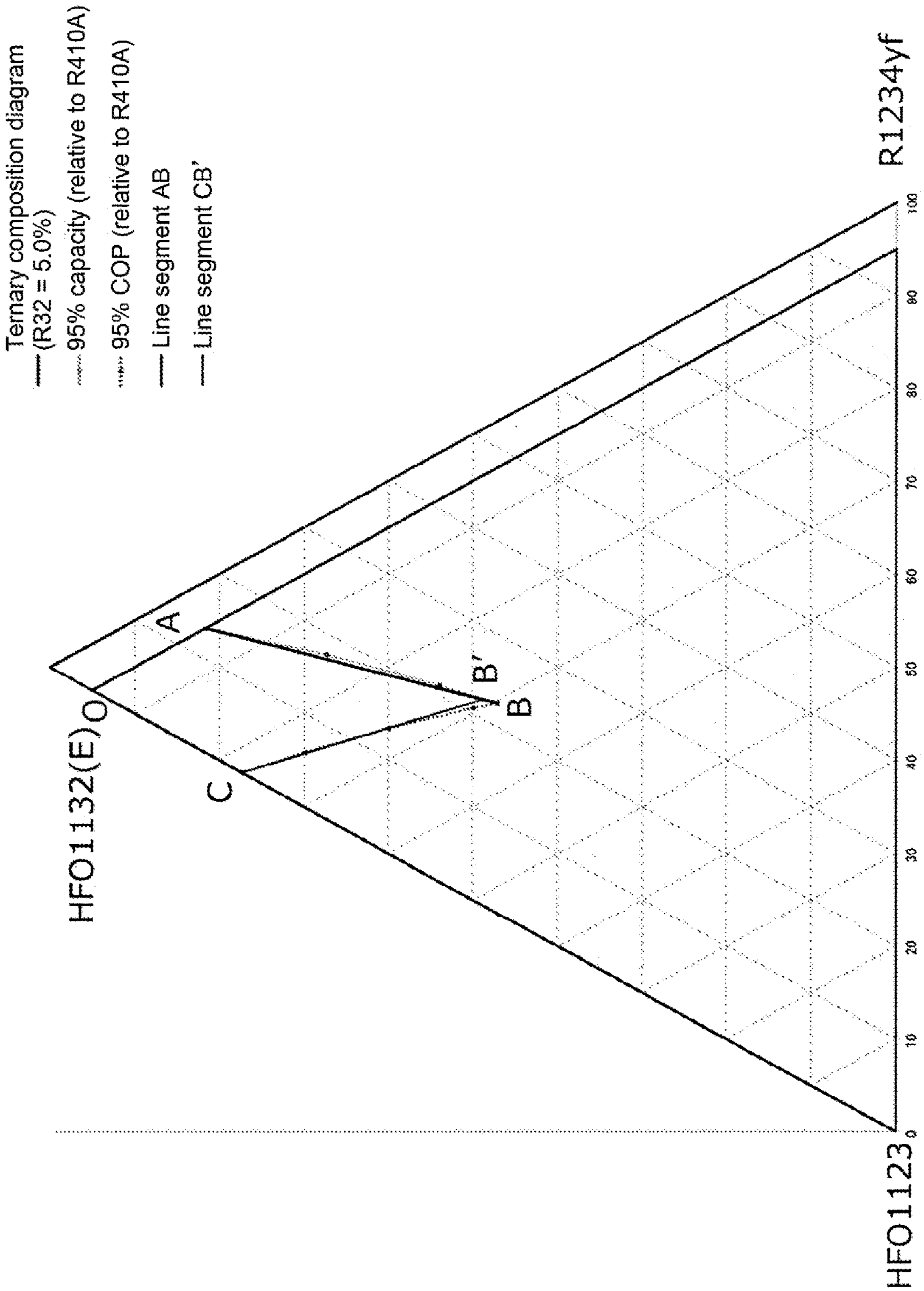
FIG. 1D is a diagram showing points A to C, B' and O, and line segments that connect these points to each other in a ternary composition diagram in which the sum of HFO-1132 (E), HFO-1123, and R1234yf is 95 mass % (R32 content is 5 mass %).
Figure 1E:
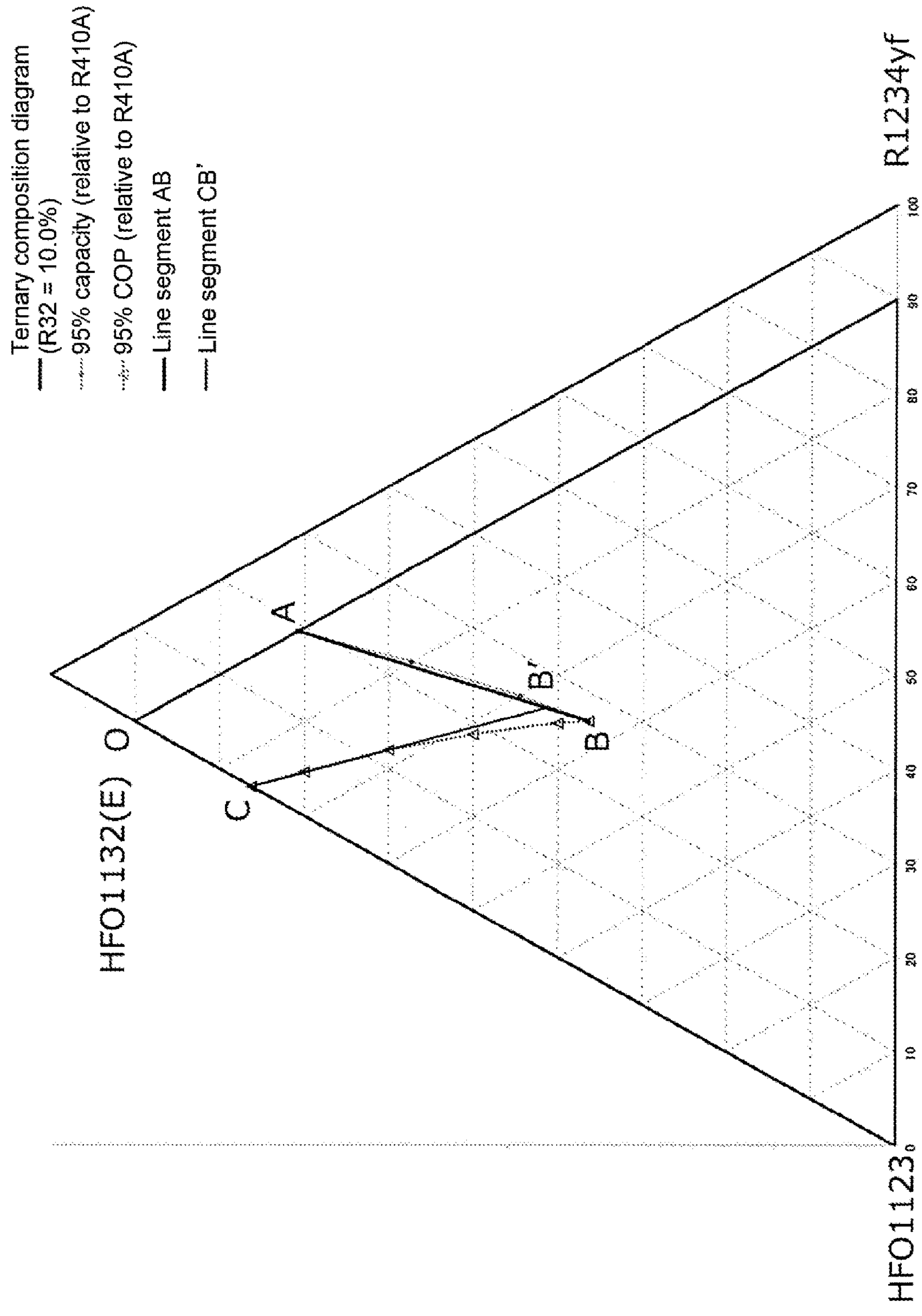
FIG. 1E is a diagram showing points A to C, B' and O, and line segments that connect these points to each other in a ternary composition diagram in which the sum of HFO-1132 (E), HFO-1123, and R1234yf is 90 mass % (R32 content is 10 mass %).
Figure 1F:
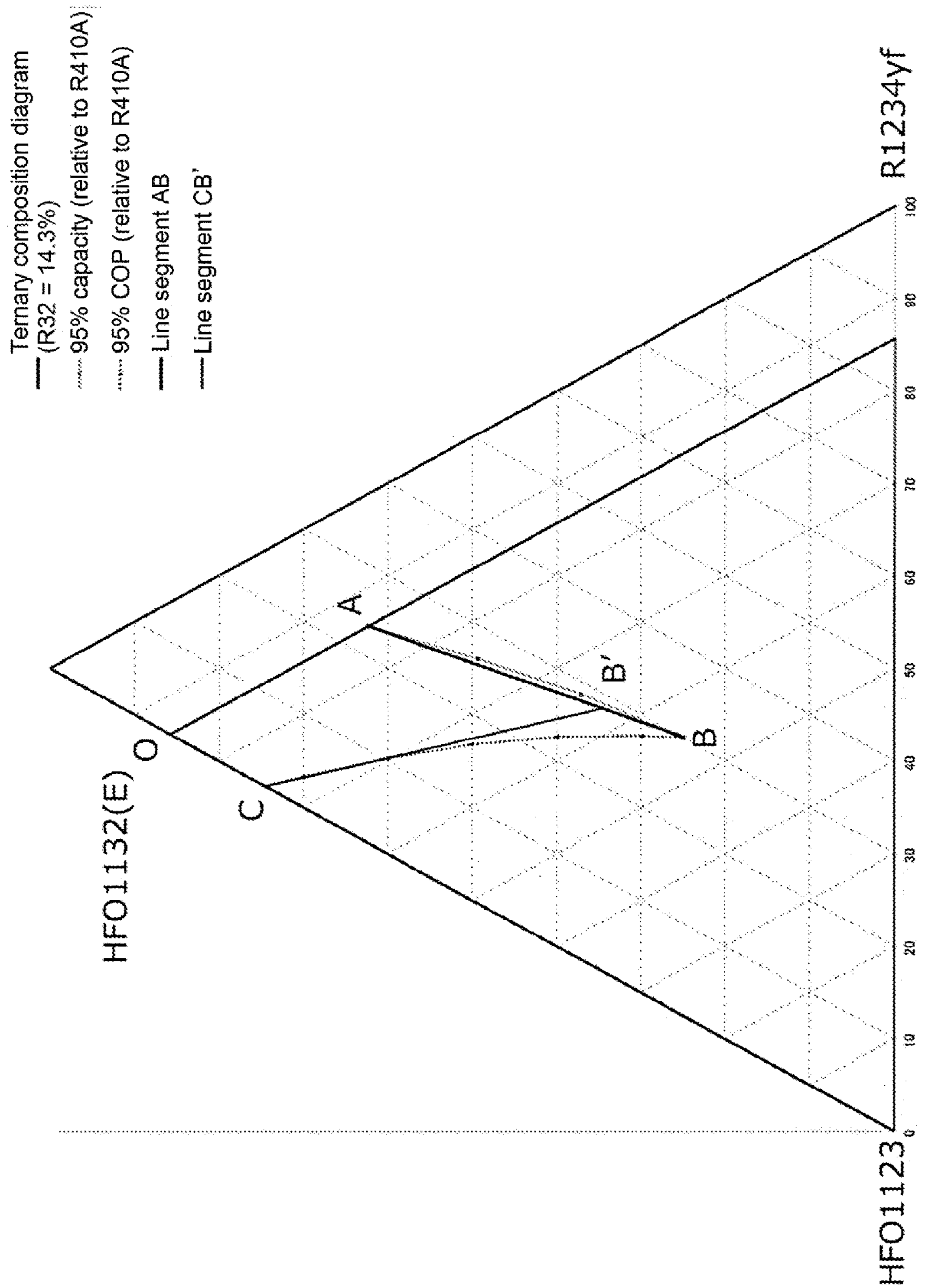
FIG. 1F is a diagram showing points A to C, B' and O, and line segments that connect these points to each other in a ternary composition diagram in which the sum of HFO-1132 (E), HFO-1123, and R1234yf is 85.7 mass % (R32 content is 14.3 mass %).
Figure 1G:
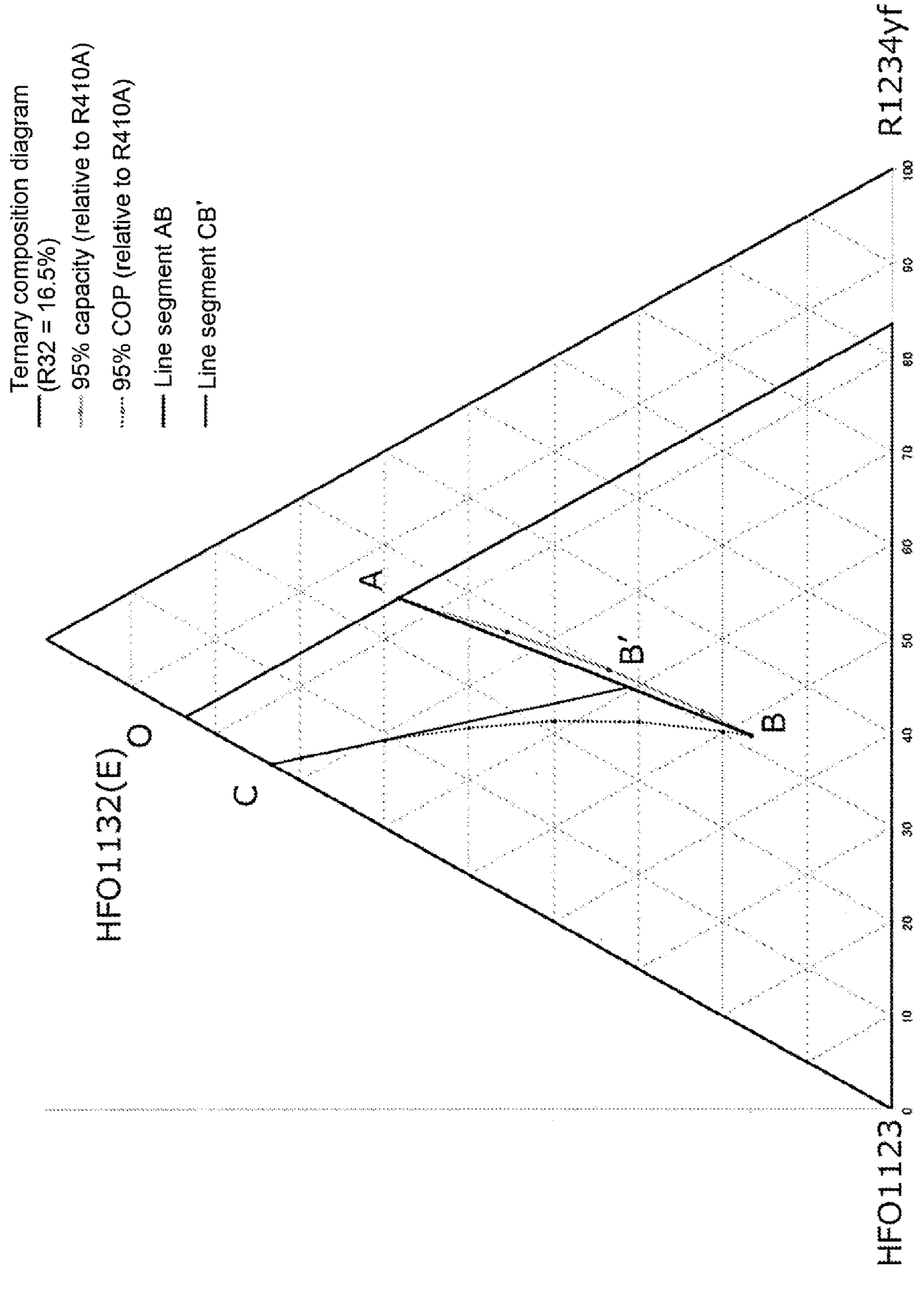
FIG. 1G is a diagram showing points A to C, B' and O, and line segments that connect these points to each other in a ternary composition diagram in which the sum of HFO-1132 (E), HFO-1123, and R1234yf is 83.5 mass % (R32 content is 16.5 mass %).
Figure 1H:
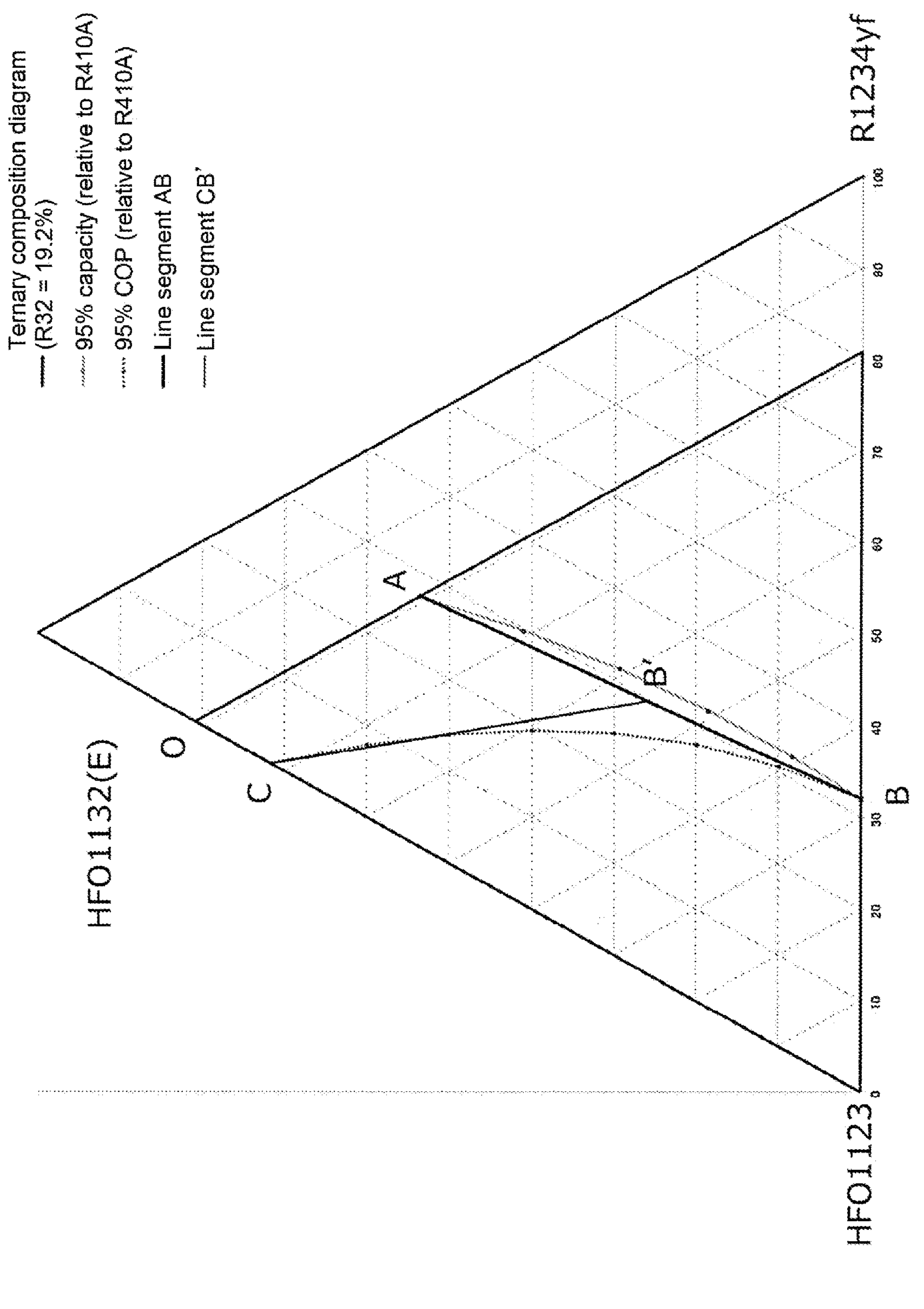
FIG. 1H is a diagram showing points A to C, B' and O, and line segments that connect these points to each other in a ternary composition diagram in which the sum of HFO-1132 (E), HFO-1123, and R1234yf is 80.8 mass % (R32 content is 19.2 mass %).
Figure 1I:
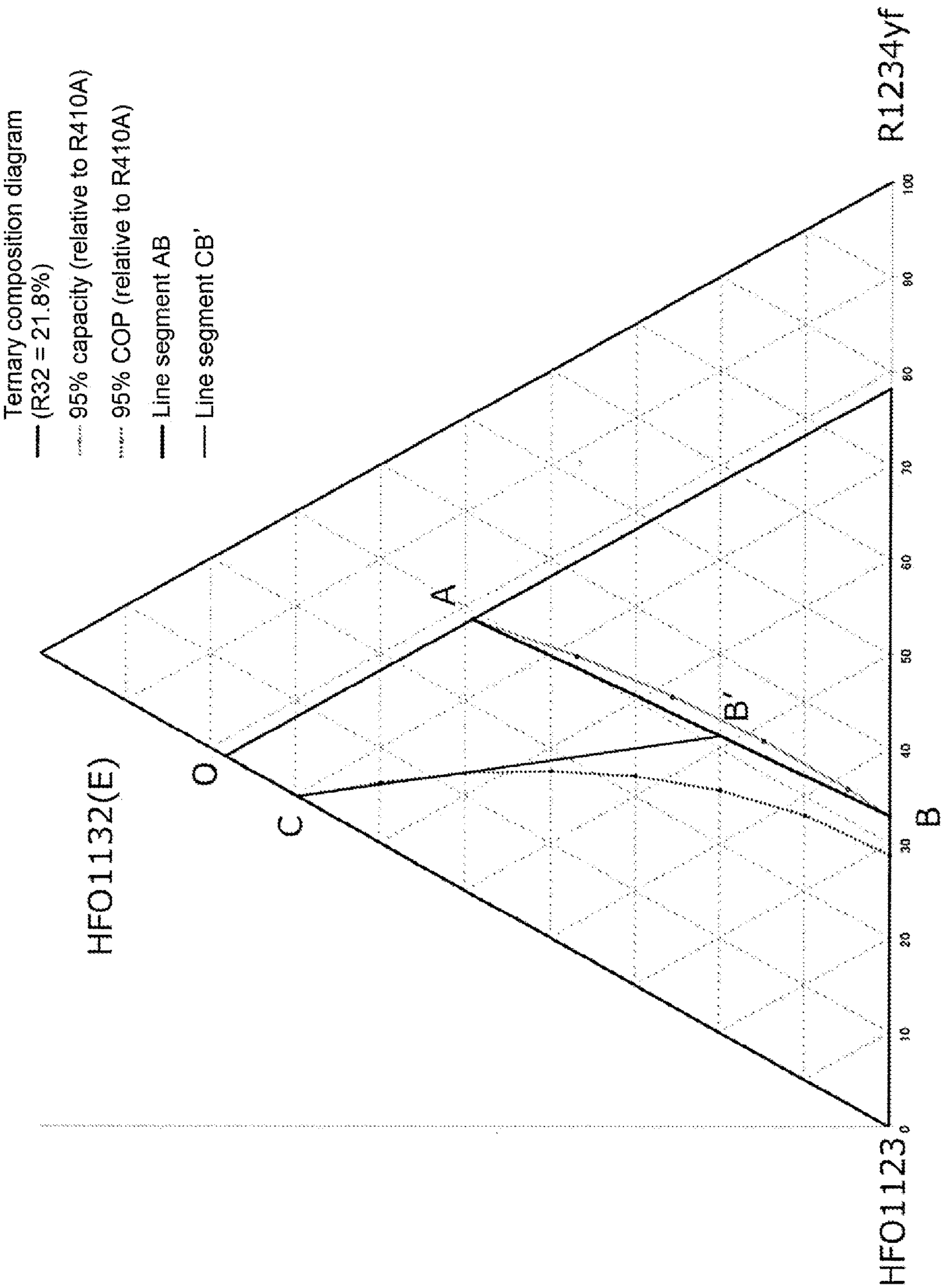
FIG. 1I is a diagram showing points A to C, B' and O, and line segments that connect these points to each other in a ternary composition diagram in which the sum of HFO-1132 (E), HFO-1123, and R1234yf is 78.2 mass % (R32 content is 21.8 mass %).
Figure 1J:
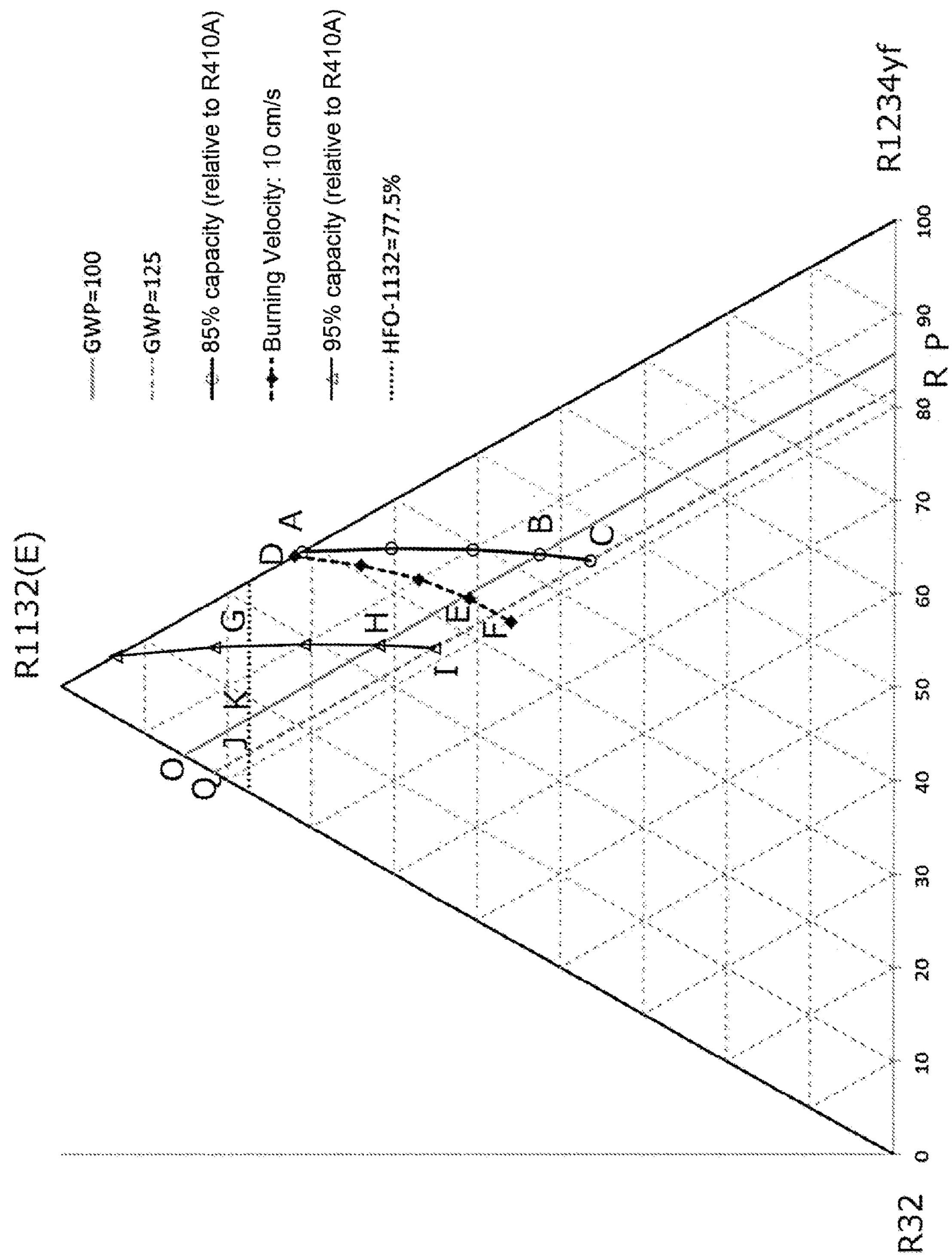
FIG. 1J is a diagram showing points A to K and O to R, and line segments that connect these points to each other in a ternary composition diagram in which the sum of HFO-1132(E), R32, and R1234yf is 100 mass %.

The results indicate that under the condition that the mass % of HFO-1132(E), R32, and R1234yf based on their sum is respectively represented by x, y, and z, when coordinates (x,y,z) in the ternary composition diagram shown in FIG. 1J in which the sum of HFO-1132(E), R32, and R1234yf is 100 mass % are on the line segments that connect the 5 points shown in Table 18 or on the right side of the line segments, the refrigerant has a lower flammability (Class 2L) according to the ASHRAE standard.

This is because R1234yf is known to have a lower burning velocity than HFO-1132(E) and R32.

Mixed refrigerants were prepared by mixing HFO-1132 (E), R32, and R1234yf in amounts (mass %) shown in. Tables 19 to 23 based on the sum of HFO-1132(E), R32, and R1234yf. The coefficient of performance (COP) ratio and the refrigerating capacity ratio relative to those of R410A of the mixed refrigerants shown in Tables 19 to 23 were determined. The conditions for calculation were as described below.

Evaporating temperature: 5° C.

Condensation temperature: 45° C.

Degree of superheating: 1 K

Degree of subcooling: 5 K $E_{comp}$ (compressive modulus): 0.7 kWh

Tables 19 to 23 show these values together with the GWP of each mixed refrigerant.

TABLE 19

| Item | Unit | Comp. Ex. 1 | Comp. Ex. 2 A | Example 1 | Example 2 | Example 3 B | Example 4 C |
|---|---|---|---|---|---|---|---|
| HFO-1132E | Mass % | R410A | 71.1 | 60.4 | 50.6 | 42.6 | 36.5 |
| R32 | Mass % | | 0.0 | 5.0 | 10.0 | 14.5 | 18.2 |
| R1234yf | Mass % | | 28.9 | 34.6 | 39.4 | 42.9 | 45.3 |
| GWP | — | 2088 | 2 | 36 | 70 | 100 | 125 |
| COP Ratio | % (relative to R410A) | 100 | 98.9 | 98.7 | 98.7 | 98.9 | 99.1 |
| Refrigerating Capacity Ratio | % (relative to R410A) | 100 | 85.0 | 85.0 | 85.0 | 85.0 | 85.0 |

TABLE 20

| Item | Unit | Comp. Ex. 3 O | Comp. Ex. 4 P | Comp. Ex. 5 Q | Comp. Ex. 6 R |
|---|---|---|---|---|---|
| HFO-1132E | Mass % | 85.3 | 0.0 | 81.6 | 0.0 |
| R32 | Mass % | 14.7 | 14.3 | 18.4 | 18.1 |
| R1234yf | Mass % | 0 | 85.7 | 0.0 | 81.9 |
| GWP | — | 100 | 100 | 125 | 125 |
| COP Ratio | % (relative to R410A) | 96.2 | 103.4 | 95.9 | 103.4 |
| Refrigerating Capacity Ratio | % (relative to R410A) | 105.7 | 57.3 | 107.4 | 60.9 |

TABLE 21

| Item | Unit | Comp. Ex. 7 D | Example 5 | Example 6 | Example 7 E | Example 8 | Example 9 F | Comp. Ex. 8 |
|---|---|---|---|---|---|---|---|---|
| HFO-1132E | Mass % | 72.0 | 64.0 | 57.0 | 51.4 | 51.0 | 47.6 | 46.0 |
| R32 | Mass % | 0.0 | 5.0 | 10.0 | 14.6 | 15.0 | 18.3 | 20.0 |
| R1234yf | Mass % | 28.0 | 31.0 | 33.0 | 34.0 | 34.0 | 34.1 | 34.0 |
| GWP | — | 1.84 | 36 | 69 | 100 | 103 | 125 | 137 |
| COP Ratio | % (relative to R410A) | 98.8 | 98.5 | 98.2 | 98.1 | 98.1 | 98.0 | 98.0 |
| Refrigerating Capacity Ratio | % (relative to R410A) | 85.4 | 86.8 | 88.3 | 89.8 | 90.0 | 91.2 | 91.8 |

TABLE 22

| Item | Unit | Comp. Ex. 9 | Comp. Ex. 10 | Example 10 | Example 11 H | Example 12 I |
|---|---|---|---|---|---|---|
| HFO-1132E | Mass % | 93.4 | 81.6 | 70.8 | 61.8 | 55.1 |
| R32 | Mass % | 0.0 | 5.0 | 10.0 | 14.6 | 18.3 |
| R1234yf | Mass % | 6.6 | 13.4 | 19.2 | 23.6 | 26.6 |
| GWP | — | 1 | 35 | 69 | 100 | 125 |
| COP Ratio | % (relative to R410A) | 98.0 | 97.6 | 97.4 | 97.3 | 97.4 |
| Refrigerating Capacity Ratio | % (relative to R410A) | 95.0 | 95.0 | 95.0 | 95.0 | 95.0 |

TABLE 23

| Item | Unit | Comp. Ex. 11 | Example 13 J | Example 14 K | Example 15 G | Comp. Ex. 12 |
|---|---|---|---|---|---|---|
| HFO-1132E | Mass % | 77.5 | 77.5 | 77.5 | 77.5 | 77.5 |
| R32 | Mass % | 22.5 | 18.4 | 14.6 | 6.9 | 0.0 |
| R1234yf | Mass % | 0.0 | 4.1 | 7.9 | 15.6 | 22.5 |
| GWP | — | 153 | 125 | 100 | 48.0 | 2 |
| COP Ratio | % (relative to R410A) | 95.8 | 96.1 | 96.5 | 97.5 | 98.6 |
| Refrigerating Capacity Ratio | % (relative to R410A) | 109.1 | 105.6 | 102.3 | 95.0 | 88.0 |

The results indicate that under the condition that the mass % of HFO-1132(E), R32, and R1234yf based on their sum is respectively represented by x, y, and z, when coordinates (x,y,z) in the ternary composition diagram in which the sum of HFO-1132(E), R32, and R1234yf is 100 mass % are within the range of a figure (FIG. 1J) surrounded by line segments AC, CF, FD, and DA that connect the following 4 points:

point A (71.1, 0.0, 28.9),
point C (36.5, 18.2, 45.3),
point F (47.6, 18.3, 34.1), and
point D (72.0, 0.0, 28.0),
or on these line segments,
the refrigerant has a refrigerating capacity ratio of 85% or more relative to that of R410A, a GWP of 125 or less, and a lower flammability (Class 2L) according to the ASHRAE standard.

Likewise, the results indicate that when coordinates (x,y,z) are within the range of a figure (FIG. 1J) surrounded by line segments AB, BE, ED, and DA that connect the following 4 points:

point A (71.1, 0.0, 28.9),
point B (42.6, 14.5, 42.9),
point E (51.4, 14.6, 34.0), and
point D (72.0, 0.0, 28.0),
or on these line segments,
the refrigerant has a refrigerating capacity ratio of 85% or more relative to that of R410A, a GWP of 100 or less, and a lower flammability (Class 2L) according to the ASHRAE standard.

Likewise, the results indicate that when coordinates (x,y,z) are within the range of a figure (FIG. 1J) surrounded by line segments GI, IJ, and JG that connect the following 3 points:

point G (77.5, 6.9, 15.6),
point I (55.1, 18.3, 26.6), and
point J (77.5, 18.4, 4.1),
or on these line segments,
the refrigerant has a refrigerating capacity ratio of 95% or more relative to that of R410A and a GWP of 125 or less, undergoes fewer or no changes such as polymerization or decomposition, and also has excellent stability.

Likewise, the results indicate that when coordinates (x,y,z) are within the range of a figure (FIG. 1J) surrounded by line segments GH, HK, and KG that connect the following 3 points:

point G (77.5, 6.9, 15.6),
point H (61.8, 14.6, 23.6), and
point K (77.5, 14.6, 7.9),
or on these line segments,
the refrigerant has a refrigerating capacity ratio of 95% or more relative to that of R410A and a GWP of 100 or less, undergoes fewer or no changes such as polymerization or decomposition, and also has excellent stability.

(1-5-4) Refrigerant 1D (5-4) Refrigerant 1D

Refrigerant 1D according to the present disclosure is a mixed refrigerant comprising HFO-1132(E), HFO-1123, and R32.

The refrigerant 1D according to the present disclosure has various properties that are desirable as an R410A-alternative refrigerant, i.e., a coefficient of performance equivalent to that of R410A and a sufficiently low GWP.

The refrigerant 1D according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments OC', C'D', D'E', E'A', and A'O that connect the following 5 points:

point O (100.0, 0.0, 0.0),
point C' (56.7, 43.3, 0.0),
point D' (52.2, 38.3, 9.5),
point E' (41.8, 39.8, 18.4), and
point A' (81.6, 0.0, 18.4),
or on the line segments C'D', D'E', and E'A' (excluding the points C' and A');

the line segment C'D' is represented by coordinates $(-0.0297z^2-0.1915z+56.7,\ 0.0297z^2-1.1915z+43.3,\ z)$, the line segment D'E' is represented by coordinates $(-0.0535z^2+0.3229z+53.957,\ 0.0535z^2-0.6771z+46.043,\ z)$, and the line segments OC', E'A', and A'O are straight lines. When the requirements above are satisfied, the refrigerant 1D according to the present disclosure has a COP ratio of 92.5% or more relative to that of R410A, and a GWP of 125 or less.

The refrigerant 1D according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DE, EA', and A'O that connect the following 5 points:

point O (100.0, 0.0, 0.0),
point C (77.7, 22.3, 0.0),
point D (76.3, 14.2, 9.5),
point E (72.2, 9.4, 18.4), and
point A' (81.6, 0.0, 18.4),
or on the line segments CD, DE, and EA' (excluding the points C and A');

the line segment CDE is represented by coordinates $(-0.017z^2+0.0148z+77.684,\ 0.017z^2+0.9852z+22.316,\ z)$, and the line segments OC, EA', and A'O are straight lines. When the requirements above are satisfied, the refrigerant 1D according to the present disclosure has a COP ratio of 95% or more relative to that of R410A, and a GWP of 125 or less.

The refrigerant 1D according to the present disclosure is preferably a refrigerant wherein when the mass % of HFO-1132(E), HFO-1123, and R32 based on their sum is respectively represented by x; y, and z, coordinates (x,y,z) in a ternary composition diagram in which the sum of HFO-1132(E), HFO-1123, and R32 is 100 mass % are within the range of a figure surrounded by line segments OC', C'D', D'A, and AO that connect the following 4 points:

point O (100.0, 0.0, 0.0),
point C' (56.7, 43.3, 0.0),
point D' (52.2, 38.3, 9.5), and
point A (90.5, 0.0, 9.5),
or on the line segments C'D' and D'A (excluding the points C' and A);

the line segment C'D' is represented by coordinates $(-0.0297z^2-0.1915z+56.7,\ 0.0297z^2+1.1915z+43.3,\ z)$, and the line segments OC', D'A, and AO are straight lines. When the requirements above are satisfied, the refrigerant 1D according to the present disclosure has a COP ratio of 93.5% or more relative to that of R410A, and a GWP of 65 or less.

The refrigerant 1D according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments OC, CD, DA, and AO that connect the following 4 points:

point O (100.0, 0.0, 0.0),
point C (77.7, 22.3, 0.0),
point D (76.3, 14.2, 9.5), and
point (90.5, 0.0, 9.5), or on the line segments CD and DA (excluding the points C and A);

the line segment CD is represented by coordinates ($-0.017z^2+0.0148z+77.684$, $0.017z^2+0.9852z+22:316$, z), and the line segments OC, DA, and AO are straight lines. When the requirements above are satisfied, the refrigerant 1D according to the present disclosure has a COP ratio of 95% or more relative to that of R410A, and a GWP of 65 or less.

The refrigerant 1D according to the present disclosure may further comprise other additional refrigerants in addition to HFO-1132(E), HFO-1123, and R32, as long as the above properties and effects are not impaired. In this respect; the refrigerant 1D according to the present disclosure preferably comprises HFO-1132(E), HFO-1123, and R32 in a total amount of 99.5 mass % or more, more preferably 99.75 mass % or more, and even more preferably 99.9 mass % or more, based on the entire refrigerant 1D.

Such additional refrigerants are not limited, and can be selected from a wide range of refrigerants. The mixed refrigerant may comprise a single additional refrigerant, or two or more additional refrigerants.

The refrigerant 1D according to the present disclosure is suitable for use as an alternative refrigerant for R410A.

Examples of Refrigerant 1D

The refrigerant 1D is described in more detail below with reference to Examples. However, the refrigerant 1D according to the present disclosure is not limited to the Examples.

Mixed refrigerants were prepared by mixing HFO-1132 (E), HFO-1123, and R32 at mass % based on their sum shown in Tables 24 to 26.

The COP ratio and the refrigerating capacity (which may be referred to as "cooling capacity" or "capacity") ratio relative to those of R410 of the mixed refrigerants were determined.

The conditions for calculation were as described below.

Evaporating temperature: 5° C.
Condensation temperature: 45° C.
Degree of superheating: 1K
Degree of subcooling: 5K
$E_{comp}$(compressive modulus): 0.7 kWh.

Tables 24 to 26 show these values together with the GWP of each mixed refrigerant.

TABLE 24

| Item | Unit | Comp. Ex. 1 | Comp. Ex. 2 C | Example 1 | Example 2 D | Example 3 | Example 4 E | Comp. Ex. 3 O |
|---|---|---|---|---|---|---|---|---|
| HFO-1132(E) | mass % | R410A | 77.7 | 77.3 | 76.3 | 74.6 | 72.2 | 100.0 |
| HFO-1123 | mass % | | 22.3 | 17.7 | 14.2 | 11.4 | 9.4 | 0.0 |
| R32 | mass % | | 0.0 | 5.0 | 9.5 | 14.0 | 18.4 | 0.0 |
| GWP | — | 2088 | 1 | 35 | 65 | 95 | 125 | 1 |
| COP ratio | % (relative to R410A) | 100.0 | 95.0 | 95.0 | 95.0 | 95.0 | 95.0 | 97.8 |
| Refrigerating capacity ratio | % (relative to R410A) | 100.0 | 102.5 | 104.4 | 106.0 | 107.6 | 109.1 | 97.8 |

TABLE 25

| Item | Unit | Comp. Ex. 4 C' | Example 5 | Example 6 D' | Example 7 | Example 8 E' | Comp. Ex. 5 A | Comp. Ex. 6 B |
|---|---|---|---|---|---|---|---|---|
| HFO-1132(E) | mass % | 56.7 | 55.0 | 52.2 | 48.0 | 41.8 | 90.5 | 0.0 |
| HFO-1123 | mass % | 43.3 | 40.0 | 38.3 | 38.0 | 39.8 | 0.0 | 90.5 |
| R32 | mass % | 0.0 | 5.0 | 9.5 | 14.0 | 18.4 | 9.5 | 9.5 |
| GWP | — | 1 | 35 | 65 | 95 | 125 | 65 | 65 |
| COP ratio | % (relative to R410A) | 92.5 | 92.5 | 92.5 | 92.5 | 92.5 | 96.6 | 90.8 |
| Refrigerating capacity ratio | % (relative to R410A) | 105.8 | 107.9 | 109.7 | 111.5 | 113.2 | 103.2 | 111.0 |

TABLE 26

| Item | Unit | Comp. Ex. 7 A' | Comp. Ex. 8 B' | Example 9 | Example 10 | Example 11 | Comp. Ex. 9 | Comp. Ex. 10 |
|---|---|---|---|---|---|---|---|---|
| HFO-1132(E) | mass % | 81.6 | 0.0 | 85.0 | 65.0 | 70.0 | 50.0 | 20.0 |
| HFO-1123 | mass % | 0.0 | 81.6 | 10.0 | 30.0 | 15.0 | 20.0 | 20.0 |
| R32 | mass % | 18.4 | 18.4 | 5.0 | 5.0 | 15.0 | 30.0 | 60.0 |
| GWP | — | 125 | 125 | 35 | 35 | 102 | 203 | 405 |
| COP ratio | % (relative to R410A) | 95.9 | 91.9 | 95.9 | 93.6 | 94.6 | 94.3 | 97.6 |
| Refrigerating capacity ratio | % (relative to R410A) | 107.4 | 113.8 | 102.9 | 106.5 | 108.7 | 114.6 | 117.6 |

Figure 1K:
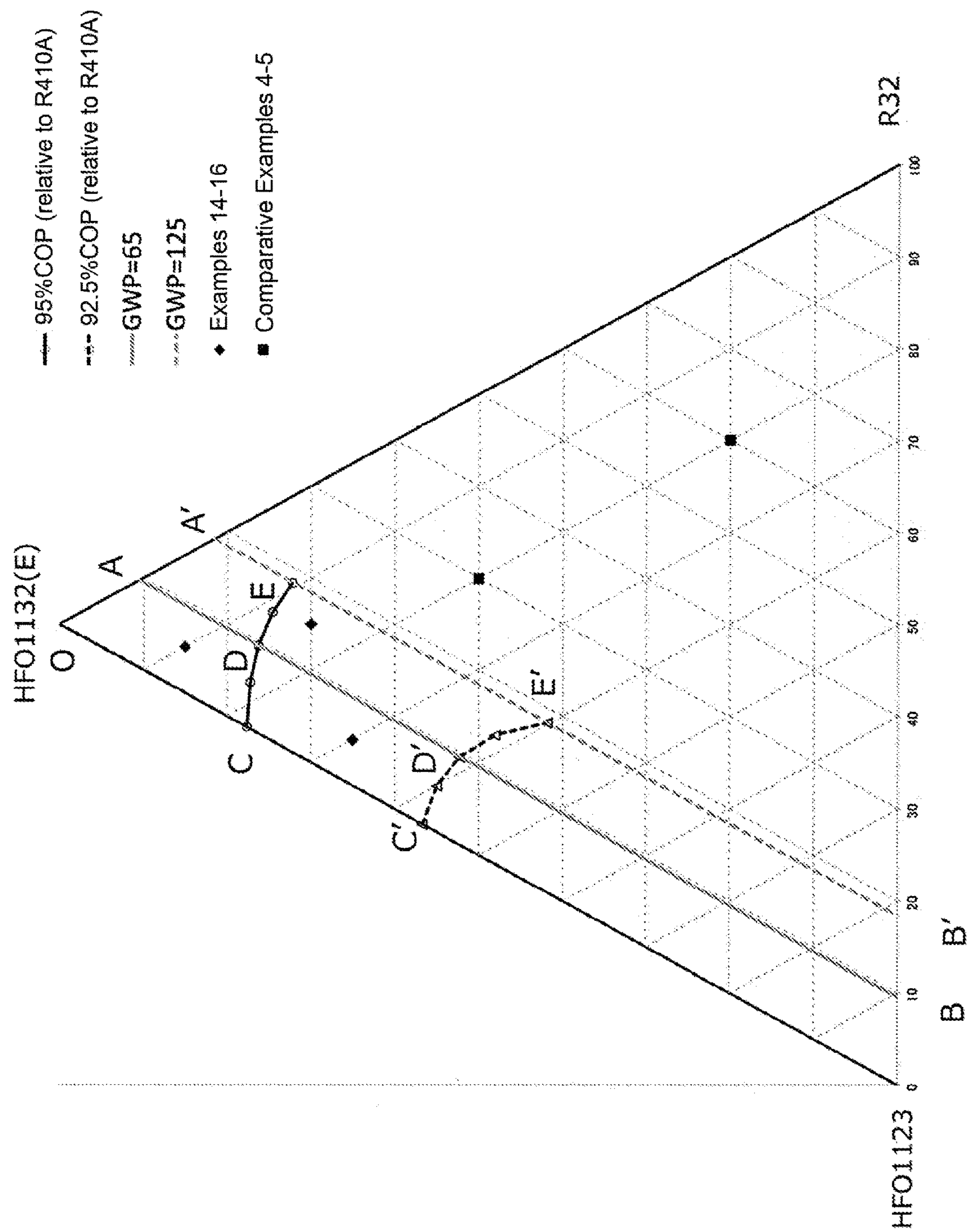
FIG. 1K is a diagram showing points A to D, A' to D', and O, and line segments that connect these points to each other in a ternary composition diagram in which the sum of HFO-1132(E), HFO-1123, and R32 is 100 mass %.
Figure 1L:
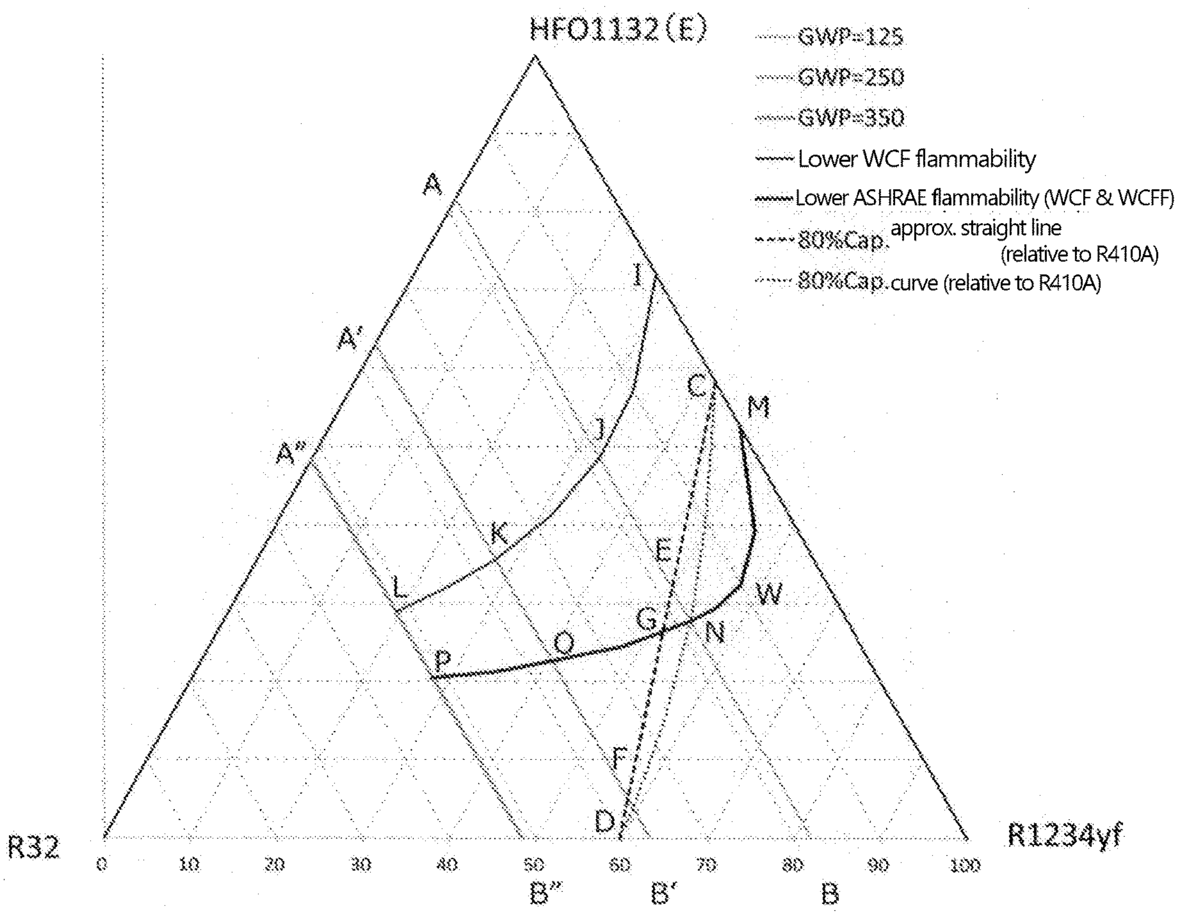
FIG. 1L is a ternary composition diagram in which the sum of the concentrations of R32, HFO-1132(E), and R1234yf is 100 mass %, the diagram showing points and line segments defining the refrigerant according to the present disclosure.
Figure 1M:
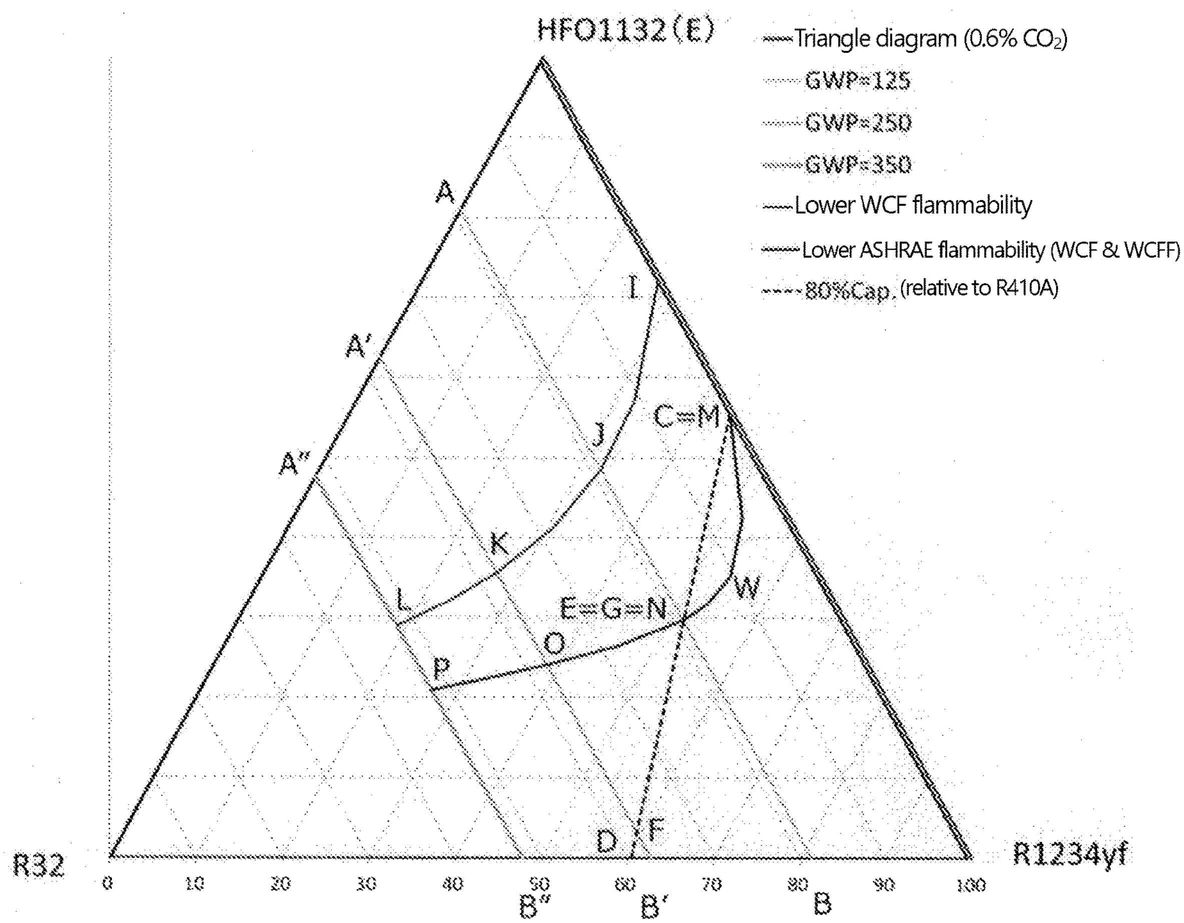
FIG. 1M is a ternary composition diagram in which the sum of the concentrations of R32, HFO-1132(E), and R1234yf is 99.4 mass % (CO2 content is 0.6 mass %), the diagram showing points and line segments defining the refrigerant according to the present disclosure.
Figure 1N:
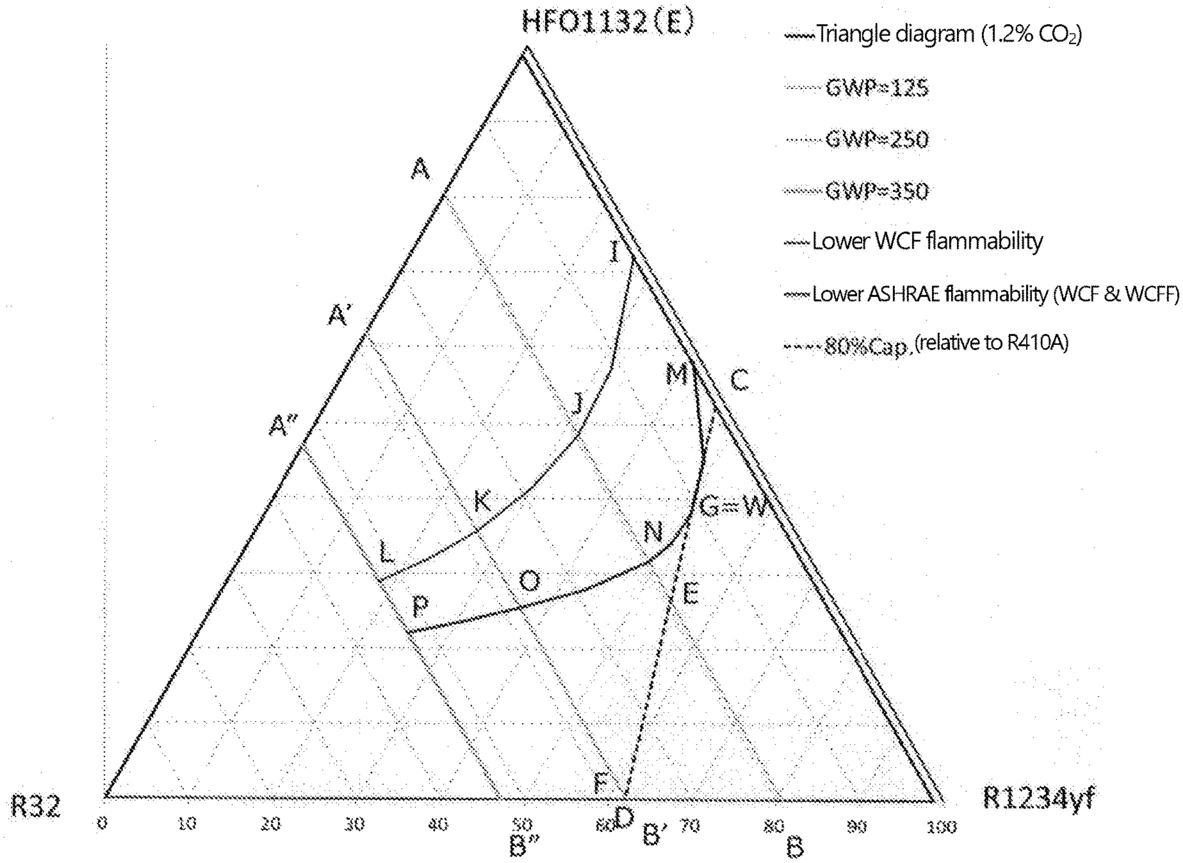
FIG. 1N is a ternary composition diagram in which the sum of the concentrations of R32, HFO-1132(E), and R1234yf is 98.8 mass % (CO2 content is 12 mass %), the diagram showing points and line segments defining the refrigerant according to the present disclosure.

The results indicate that under the condition that the mass % of HFO-1132(E), HFO-1123, and R32 based on their sum is respectively represented by x, y, and z, when coordinates (x,y,z) in a ternary composition diagram in which the sum of HFO-1132(E), HFO-1123, and R32 is 100 mass % are within the range of a figure (FIG. 1K) surrounded by line segments OC', C'D', D'E', E'A', and A'O that connect the following 5 points:

point O (100.0, 0.0, 0.0),
point C' (56.7, 43.3, 0.0),
point D' (52.2, 38.3, 9.5),
point E' (41.8, 39.8, 18.4), and
point A' (81.6, 0.0, 18.4), or on the line segments C'D', D'E', and E'A' (excluding the points C' and A'), the refrigerant has a COP ratio of 92.5% or more relative to that of R410A, and a GWP of 125 or less.

The results also indicate that when coordinates (x,y,z) are within the range of a figure (FIG. 1K) surrounded byline segments OC, CD, DE, EA', and A'O that connect the following 5 points:

point O (100.0, 0.0, 0.0),
point C (77.7, 22.3, 0.0),
point D (76.3, 14.2, 9.5),
point E (72.2, 9.4, 18.4), and
point A' (81.6, 0.0, 18.4), or on the line segments CD, DE, and EA' (excluding the points C and A'), the refrigerant has a COP ratio of 95% or more relative to that of R410A, and a GWP of 125 or less.

The results also indicate that when coordinates (x,y,z) are within the range of a figure (FIG. 1K) surrounded by line segments OC', C'D', D'A, and AO that connect the following 4 points:

point O (100.0, 0.0, 0.0),
point C' (56.7, 43.3, 0.0),
point D' (52.2, 38.3, 9.5), and
point A (90.5, 0.0, 9.5), or on the line segments C'D' and D'A (excluding the points C' and A), the refrigerant has a COP ratio of 92.5% or more relative to that of R410A, and a GWP of 65 or less.

The results also indicate that when coordinates (x,y,z) are within the range of a figure (FIG. 1K) surrounded by line segments OC, CD, DA, and AO that connect the following 4 points:

point O (100.0, 0.0, 0.0),
point C (77.7, 22.3, 0.0),
point D (76.3, 14.2, 9.5), and
point (90.5, 0.0, 9.5), or on the line segments CD and DA (excluding the points C and A), the refrigerant has a COP ratio of 95% or more relative to that of R410A, and a GWP of 65 or less.

In contrast, as shown in Comparative Examples 2, 3, and 4, when R32 is not contained, the concentrations of HFO-1132(E) and HFO-1123, which have a double bond, become relatively high; this undesirably leads to deterioration, such as decomposition, or polymerization in the refrigerant compound.

Moreover, as shown in Comparative Examples 3, 5, and 7, when HFO-1123 is not contained, the combustion-inhibiting effect thereof cannot be obtained; thus, undesirably, a composition having lower flammability cannot be obtained.

(1-5-5) Refrigerant 1E (5-5) Refrigerant 1E

Refrigerant 1E according to the present disclosure is a mixed refrigerant containing $CO_2$ and R32, HFO-1132(E), and R1234yf.

Refrigerant 1E according to the present disclosure has various properties that are desirable as an R410A-alternative refrigerant, i.e., a refrigerating capacity equivalent to that of R410A, a sufficiently low GWP, and lower flammability. Refrigerant 1E according to the present disclosure is a refrigerant wherein when the mass % of $CO_2$, R32, HFO-1132(E), and R1234yf based on their sum in the refrigerant is respectively represented by w, x, y, and z, if $0<w\leq1.2$, coordinates (x,y,z) in a ternary composition diagram in which the sum of R32, HFO-1132(E), and R1234yf is (100−w) mass % are within the range of a figure surrounded by curve IJ, curve JK, curve KL, straight line LB", straight line BM, straight line DC, and straight line CI that connect the following 7 points or on these line segments (excluding points on straight line B"D and straight line CI):

point I (0.0, 72.0, 28.0−w)

point J (18.3, 48.5, 33.2−w)

point K (36.8, 35.6, 27.6−w)

point L (51.7, 28.9, 19.4−w)

point B" ($-1.5278w^2+2.75w+50.5$, 0.0, 1.5278w−2.3.75w+49.5)

point D (−2.9167w+40.317, 0.0, 1.9167w+59.683)

point C (0.0, −4.9167w+58.317, 3.9167w+41.683);

if $1.2<w\leq4.0$, coordinates (x,y,z) in the ternary composition diagram are within the range of a figure surrounded by curve IJ, curve JK, curve KL, straight line LB", straight line B"D, straight line DC, and straight line CI that connect the following 7 points or on these line segments (excluding the points on straight line B'D and straight line CI):

point I (0.0, 72.0, 28.0−w)

point J (18.3, 48.5, 33.2−w)

point K (36.8, 35.6, 27.6−w)

point L (51.7, 28.9, 19.4−w)

point B" (51.6, 0.0, 48.4−w)

point D (−2.8226w+40.211, 0.0, 1.8226w+59.789)

point C (0.0, $0.1081w^2$−5.169w+58.447, $-0.1081w^2$+4.169w+41.553); and if 4.0<w≤7.0, coordinates (x,y,z) in the ternary composition diagram are within the range of a figure surrounded by curve IJ, curve JK, curve KL, straight line LB", straight line B"D, straight line DC, and straight line CI that connect the following 7 points or on these line segments (excluding points on straight line B"D and straight line CI):

point I (0.0, 72.0, 28.0−w)

point J (18.3, 48.5, 33.2−w)

point K (36.8, 35.6, 27.6−w)

point L (51.7, 28.9, 19.4−w)

point B" (51.6, 0.0, 48.4−w)

point D (−2.8w+40.1, 0.0, 1.8w+59.9)

point C (0.0, $0.0667w^2$−4.9667w+58.3, $-0.0667w^2$+3.9667w+41.7), and curve IJ is represented by coordinates (x, $0.0236x^2$ 1.716x+72, $-0.0236x^2$+0.716x+28−w), curve JK is represented by coordinates (x, $0.0095x^2$−1.2222x+67.676, $-0.0095x^2$+0.2222x+32.324−w), and curve KL is represented by coordinates (x, $0.0049x^2$−0.8842x+61.488, $-0.0049x^2$−0.1158x+38.512).

Refrigerant 1E according to the present disclosure has a refrigerating capacity ratio of 80% or more relative to R410A, a GWP of 350 or less, and a lower WCF flammability.

Refrigerant 1E according to the present disclosure is preferably a refrigerant wherein when the mass % of $CO_2$, R32, HFO-1132(E), and R1234yf based on their sum in the refrigerant is respectively represented by w, x, y, and z, if 0<w≤1.2, coordinates (x,y,z) in a ternary composition diagram in which the sum of R32, HFO-1132(E), and R1234yf is (100−w) mass % are within the range of a figure surrounded by curve IJ, curve JK, straight line KF, straight line FC, and straight line CI that connect the following 5 points or on these line segments (excluding points on straight line CI):

point I (0.0, 72.0, 28.0−w)

point J (18.3, 48.5, 33.2−w)

point K (36.8, 35.6, 27.6−w)

point F (−0.0833w+36.717, −4.0833w+5.1833, 3.1666w+58.0997)

point C (0.0, −4.9167w+58.317, 3.9167w+41.683);

if 1.2<w≤1.3, coordinates (x,y,z) in the ternary composition diagram are within the range of a figure surrounded by curve IJ, curve JK, straight line KF, straight line FC, and straight line CI that connect the following 5 points or on these line segments (excluding points on straight line CI):

point I (0.0, 72.0, 28.0−w)

point J (18.3, 48.5, 33.2−w)

point K (36.8, 35.6, 27.6−w)

point F (36.6, −3w+3.9, 2w+59.5)

point C (0.0, $0.1081w^2$−5.169w+58.447, $-0.1081w^2$+4.169w+41.553);

if 1.3<w≤_4.0, coordinates (x,y,z) in the ternary composition diagram are within the range of a figure surrounded by curve IJ, curve JK, straight line KB', straight line B'D, straight line DC, and straight line CI that connect the following 6 points or on these line segments (excluding points on straight line CI):

point I (0.0, 72.0, 28.0−w)

point J (18.3, 48.5, 33.2−w)

point K (36.8, 35.6, 27.6−w)

point B'(36.6, 0.0, −w+63.4)

point D (−2.8226w+40.211, 0.0, 1.8226w+59.789)

point C (0.0, $0.1081w^2$−5.169w+58.447, $-0.1081w^2$+4.169w+41.553); and if 4.0<w≤7.0, coordinates (x,y,z) in the ternary composition diagram are within the range of a figure surrounded by curve IJ, curve JK, straight line KB', straight line B'D, straight line DC, and straight line CI that connect the following 6 points or on these line segments (excluding points on straight line CI):

point I (0.0, 72.0, 28.0−w)

point J (18.3, 48.5, 33.2−w)

point K (36.8, 35.6, 27.6−w)

point B' (36.6, 0.0, −w+63.4)

point D (−2.8w+40.1, 0.0, 1.8w+59.9)

point C (0.0, $0.0667w^2$−4.9667w+58.3, $-0.0667w^2$+3.9667w+41.7), and curve IJ is represented by coordinates (x, $0.0236x^2$−1.716x+72, $-0.0236x^2$+0.716x+28−w), and curve JK is represented by coordinates (x, $0.0095x^2$−1.2222x+67.676, $-0.0095x^2$+0.2222x+32.324−w).

When the requirements above are satisfied, refrigerant 1E according to the present disclosure has a refrigerating capacity ratio of 80% or more relative to R410A, a GWP of 250 or less, and a lower WCF flammability.

Refrigerant 1E according to the present disclosure is preferably a refrigerant wherein when the mass % of $CO_2$, R32, HFO-1132(E), and R1234yf based on their sum in the refrigerant is respectively represented by w, x, y, and z, if 0<w≤1.2, coordinates (x,y,z) in a ternary composition diagram in which the sum of R32, HFO-1132(E), and R1234yf is (100−w) mass % are within the range of a figure surrounded by curve IJ, curve JK, straight line KF, straight line FC, and straight line CI that connect the following 4 points or on these line segments (excluding points on straight line CI):

point I (0.0, 72.0, 28.0−w)

point J (18.3, 48.5, 33.2−w)

point E (18.2, $-1.1111w^2$−3.1667w+31.9, $1.1111w^2$+2.1667w+49.9)

point C (0.0, −4.9167w+58.317, 3.9167w+41.683);

if 1.2<w≤4.0, coordinates (x,y,z) in the ternary composition diagram are within the range of a figure surrounded by curve IJ, curve JK, straight line KF, straight line FC, and straight line CI that connect the following 4 points or on these line segments (excluding points on straight line CI):

point I (0.0, 72.0, 28.0−w)

point J (18.3, 48.5, 33.2−w)

point E (−0.0365w+18.26, $0.0623w^2$−4.5381w+31.856, $-0.0623w^2$+3.5746w+49.884)

point C (0.0, $0.1081w^2$−5.169w+58.447, $0.1081w^2$+4.169w+41.553); and if 4.0<w≤7.0, coordinates (x,y,z) in the ternary composition diagram are within the range of a figure surrounded by curve IJ, curve JK, straight line KF, straight line FC, and straight line CI that connect the following 4 points or on these line segments (excluding points on straight line CI):

point I (0.0, 72.0, 28.0−w)

point J (18.3, 48.5, 33.2−w)

point E (18.1, $0.0444w^2$−4.3556w+31.411, $-0.0444w^2$+3.3556w+50.489)

point C (0.0, $0.0667w^2$−4.9667w+58.3, $-0.0667w^2$+3.9667w+41.7), and curve IJ is represented by coordinates (x, $0.0236x^2$−1.716x+72, −0.023 $6x^2$+0.716x+28−w).

When the requirements above are satisfied, refrigerant 1E according to the present disclosure has a refrigerating capacity ratio of 80% or more relative to R410A, a GWP of 125 or less, and a lower WCF flammability.

Refrigerant 1E according to the present disclosure is preferably a refrigerant wherein when the mass % of $CO_2$, R32, HFO-1132(E), and R1234yf based on their sum in the refrigerant is respectively represented by w, x, y, and z, if 0<w≤0.6, coordinates (x,y,z) in a ternary composition diagram in which the sum of R32, HFO-1132(E), and R1234yf is (100−w) mass % are within the range of a figure surrounded by curve GO, curve OP, straight line PB", straight line B"D, and straight line DG that connect the following 5 points or on these line segments (excluding points on straight line B"D):

point G ($-5.8333w^2$−3.1667w+22.2, $7.0833w^2$+1.4167w+26.2, $-1.25w^2$+0.75w+51.6)

point O (36.8, $0.8333w^2$+1.8333w+22.6, $-0.8333w^2$−2.8333w+40.6)

point P (51.7, $1.1111w^2$+20.5, $-1.1111w^2$−w+27.8)

point B" ($-1.5278w^2$+2.75w+50.5, 0.0, $1.5278w^2$−3.75w+49.5)

point D (−2.9167w+40.317, 0.0, 1.9167w+59.683); and if 0.6<w≤1.2, coordinates (x,y,z) in the ternary composition diagram are within the range of a figure surrounded by curve GN, curve NO, curve OP, straight line PB", straight line B"D, and straight line DG that connect the following 6 points or on these line segments (excluding the points on straight line B"D):

point G ($-5.8333w^2$−3.1667w+22.2, $7.0833w^2$+1.4167w+26.2, $-1.25w^2$+0.75w+51.6)

point N (18.2, $0.2778w^2$+3w+27.7, $-0.2778w^2$−4w+54.1)

point O (36.8, $0.8333w^2$+1.8333w+22.6, $0.8333w^2$−2.8333w+40.6)

point P (51.7, $1.1111w^2$+20.5, $-1.1111w^2$−w+27.8)

point B" ($-1.5278w^2$+2.75w+50.5, 0.0, $1.5278w^2$−3.75w+49.5)

point D (−2.9167w+40.317, 0.0, 1.9167w+59.683); and when 0<w≤0.6, curve GO is represented by coordinates (x, $(0.00487w^2$ $0.0059w+0.0072)x^2$+$(-0.279w^2$+0.2844w−0.6701)x+$3.7639w^2$−0.2467w+37.512, 100−w−x−y);

when 0.6<w≤1.2, curve GN is represented by coordinates (x, $(0.0122w^2-0.0113w+0.0313)x^2$+$(-0.3582w^2$+0.1624w−1.4551)x+$2.7889w^2$+3.7417w+43.824, 100−w−x 100−w−x−y);

when 0.6<w≤<1.2, curve NO is represented by coordinates (x, $(0.00487w^2$ $0.0059w+0.0072)x^2$+$(-0.279w^2$+0.2844w−0.6701)x+$3.7639w^2$−0.2467w+37.512, 100−w−x−y); and when 0<w≤1.2, curve OP is represented by coordinates (x, $(0.0074w^2-0.0133w+0.0064)x^2$+$(-0.5839w^2$+1.0268w−0.7103)x+$11.472w^2$−17.455w+40.07, 100−w−x−y);

if 1.2<w≤4.0, coordinates (x,y,z) in the ternary composition diagram are within the range of a figure surrounded by curve MW, curve WN, curve NO, curve OP, straight line PB", straight line B"D, straight line DC, and straight line CM that connect the following 8 points or on these line segments (excluding points on straight line B'D and straight line CM):

point M (0.0, $-0.3004w^2$+2.419w+55.53, $0.3004w^2$−3.419w+44.47)

point W (10.0, $-0.3645w^2$+3.5024w+44.422, $0.3645w^2$−4.5024w+55.57)

point N (18.2, $-0.3773w^2$+3.319w+28.26, $0.3773w^2$−4.319w+53.54)

point O (36.8, $-0.1392w^2$+1.4381w+24.475, $0.1392w^2$−2.4381w+38.725)

point P (51.7, $-0.2381w^2$+1.881w+20.186, $0.2381w^2$−2.881w+28.114)

point B" (51.6, 0.0, −w+48.4)

point D (−2.8226w+40.211, 0.0, 1.8226w+59.789)

point C (0.0, $0.1081w^2$−5.169w+58.447, $-0.1081w^2$+4.169w+41.553), and curve MW is represented by coordinates (x, $(0.0043w^2-0.0359w+0.1509)x^2$+$(-0.0493w^2$+0.4669w−3.6193)x−$0.3004w^2$+2.419w+55.53, 100−w−x−y), curve WN is represented by coordinates (x, $(0.0055w^2-0.0326w+0.0665)x^2$+$(-0.1571w^2$+0.8981w−2.6274)x+$0.6555w^2$−2.2153w+54.044, 100−w−x−y), curve NO is represented by coordinates (x, $(-0.00062w^2+0.0036w+0.0037)x^2$+$(0.0375w^2$−0.239w−0.4977)x−$0.8575w^2$+6.4941w+36.078, 100−w−x−y), and curve OP is represented by coordinates (x, $(-0.000463w^2+0.0024w-0.0011)x^2$+$(0.0457w^2$−0.2581w−0.075)x−$1.355w^2$+8.749w+27.096, 100−w−x−y); and if 4.0<w≤7.0, coordinates (x,y,z) in the ternary composition diagram are within the range of a figure surrounded by curve MW, curve WN, curve NO, curve OP, straight line PB", straight line B"D, straight line DC, and straight line CM that connect the following 8 points or on these line segments (excluding points on straight line B'D and straight line CM):

point M (0.0, $-0.0667w^2$+0.8333w+58.133, $0.0667w^2$−1.8333w+41.867)

point W (10.0, $-0.0667w^2$+1.1w+39.267, $0.0667w^2$−2.1w+50.733)

point N (18.2, $-0.0889w^2$+1.3778w+31.411, $0.0889w^2$−2.3778w+50.389)

point O (36.8, $-0.0444w^2$+0.6889w+25.956, $0.0444w^2$−1.6889w+37.244)

point P (51.7, $-0.0667w^2$+0.8333w+21.633, $0.0667w^2$−1.8333w+26.667)

point B" (51.6, 0.0, −w+48.4)

point D (−2.8w+40.1, 0.0, 1.8w+59.9)

point C (0.0, $0.0667w^2$−4.9667w+58.3, $-0.0667w^2$+3.9667w+41.7), and curve MW is represented by coordinates (x, $(0.00357w^2-0.0391w+0.1756)x^2$+$(-0.0356w^2$+0.4178w−3.6422)x−$0.0667w^2$+0.8333w+58.103, 100−w−x−y), curve WN is represented by coordinates (x, $(-0.002061w^2+0.0218w-0.0301)x^2$+$(0.0556w^2$−0.5821w−0.1108)x−$0.4158w^2$+4.7352w+43.383, 100−w−x−y), curve NO is represented by coordinates (x, $0.0082x^2$+$(0.0022w^2$−0.0345w−0.7521)x−$0.1307w^2$+2.0247w+42.327, 100−w−x−y), and curve OP is represented by coordinates (x, $(-0.0006258w^2+0.0066w-0.0153)x^2$+$(0.0516w^2$−0.5478w+0.9894)x−$1.074w^2$+11.651w+10.992, 100−w−x−y).

When the requirements above are satisfied, refrigerant 1E according to the present disclosure has a refrigerating capacity ratio of 80% or more relative to R410A, a GWP of 350 or less, and a lower ASHRAE flammability.

Refrigerant 1E according to the present disclosure is preferably a refrigerant wherein when the mass % of $CO_2$, R32, HFO-1132(E), and R1234yf based on their sum in the refrigerant is respectively represented by w, x, y, and z, if 0<w≤0.6, coordinates (x,y,z) in a ternary composition diagram in which the sum of R32, HFO-1132(E), and R1234yf is (100−w) mass % are within the range of a figure surrounded by curve GO, straight line OF, and straight line FG that connect the following 3 points or on these line segments:

point G ($-5.8333w^2-3.1667w+22.2$, $7.0833w^2-1.4167w+26.2$, $-1.25w^2+3.5834w+51.6$)

point O (36.8, $0.8333w^2+1.8333w+22.6$, $-0.8333w^2-2.8333w+40.6$)

point F ($-0.0833w+36.717$, $-4.0833w+5.1833$, $3.1666w+58.0997$), and curve GO is represented by coordinates (x, $(0.00487w^2-0.0059w+0.0072)x^2+(-0.279w^2+0.2844w-0.6701)x+3.7639w^2-0.2467w+37.512$, 100−w−x−y);

if 0.6<w≤1.2, coordinates (x,y,z) in the ternary composition diagram are within the range of a figure surrounded by curve GN, curve NO, straight line OF, and straight line FG that connect the following 4 points or on these line segments:

point G ($-5.8333w^2-3.1667w+22.2$, $7.0833w^2-1.4167w+26.2$, $-1.25w^2+3.5834w+51.6$)

point N (18.2, $0.2778w^2+3.0w+27.7$, $-0.2.778w^2-4.0w+54.1$)

point O (36.8, $0.8333w^2+1.8333w+22.6$, $-0.8333w^2-2.8333w+40.6$)

point F ($-0.0833w+36.717$, $-4.0833w+5.1833$, $3.1666w+58.0997$), and when 0.6<w≤1.2, curve GN is represented by coordinates (x, $(0.0122w^2-0.0113w+0.0313)x^2+(-0.3582w^2+0.1624w-1.4551)x+2.7889w^2+30.7417w+43.824$, 100−w−x−y), and when 0.6<w≤1.2, curve NO is represented by coordinates (x, $(0.00487w^2-0.0059w+0.0072)x^2+(-0.279w^2+0.2844w-0.6701)x+3.7639w^2-0.2467w+37.512$, 100−w−x−y); and if 1.2<w≤1.3, coordinates (x,y,z) in the ternary composition diagram are within the range of a figure surrounded by curve MW curve WN, curve NO, straight line OF, straight line FC, and straight line CM that connect the following 6 points or on these line segments (excluding points on straight line CM):

point M (0.0, $-0.3004w^2+2.419w+55.53$, $0.3004w^2-3.419w+44.47$)

point W (10.0, $-0.3645w^2+3.5024w-34.422$, $0.3645w^2-4.5024w+55.578$)

point N (18.2, $-0.3773w^2+3.319w+28.26$, $0.3773w^2-4.319w+53.54$)

point O (36.8, $-0.1392w^2+1.4381w+24.475$, $0.1392w^2-2.4381w+38.725$)

point F (36.6, $-3w+3.9$, $2w+59.5$)

point C ($0.1081w^2-5.169w+58.447$, 0.0, $-0.1081w^2+4.169w+41.553$), and curve MW is represented by coordinates (x, $(0.0043w^2-0.0359w+0.1509)x^2+(-0.0493w^2+0.4669w-3.6193)x-0.3004w^2+2.419w+55.53$, 100−w−x−y), curve WN is represented by coordinates (x, $(0.0055w^2-0.0326w+0.0665)x^2+(-0.1571w^2+0.8981w-2.6274)x+0.6555w^2-2.2153w+54.044$, 100−w−x−y), and curve NO is represented by coordinates (x, $(-0.00062w^2+0.0036w+0.0037)x^2+(0.0375w^2$ $0.239w-0.4977)x-0.8575w^2+6.4941w+36.078$, 100−w−x−y);

if 1.3<w≤4.0, coordinates (x,y,z) in the ternary composition diagram are within the range of a figure surrounded by curve MW, curve WN, curve NO, straight line OB', straight line B'D, straight line. DC, and straight line CM that connect the following 7 points or on these line segments (excluding points on straight line CM):

point M (0.0, $-0.3004w^2+2.419w+55.53$, $0.3004w^2-3.419w+44.47$)

point W (10.0, $-0.3645w^2+3.5024w+34.422$, $0.3645w^2-4.5024w+55.578$)

point N (18.2, $-0.3773w^2+3.319w+28.26$, $0.3773w^2-4.319w+53.54$)

point O (36.8, $-0.1392w^2+1.4381w+24.475$, $0.1392w^2-2.4381w+38.725$)

point B'(36.6, 0.0, $-w+63.4$)

point D ($-2.8226w+40.211$, 0.0, $1.8226w+59.789$)

point C (0.0, $0.1081w^2-5.169w+58.447$, $-0.1081w^2+4.169w+41.553$), and curve MW is represented by coordinates (x, $(0.0043w^2-0.0359w+0.1509)x^2+(-0.0493w^2+0.4669w-3.6193)x-0.3004w^2+2.419w+55.53$, 100−w−x−y), curve WN is represented by coordinates (x, $(0.0055w^2-0.0326w+0.0665)x^2+(0.1571w^2+0.8981w-2.6274)x+0.6555w^2-2.2153w+54.044$, 100−w−x−y), and curve NO is represented by coordinates (x, $(-0.00062w^2+0.0036w+0.0037)x^2+(0.0457w^2-0.2581w-0.075)x-1.355w^2+8.749w+27.096$, 100−w−x−y); and if 4.0<w≤7.0, coordinates (x,y,z) in the ternary composition diagram are within the range of a figure surrounded by curve MW, curve WN, curve NO, straight line OB', straight line B'D, straight line DC, and straight line CM that connect the following 7 points or on these line segments (excluding points on straight line CM):

point M (0.0, $-0.0667w^2+0.8333w-58.133$, $0.0667w^2-1.8333w+41.867$)

point W (10.0, $-0.0667w^2+1.1w+39.267$, $0.0667w^2-2.1w+50.733$)

point N (18.2, $-0.0889w^2+1.3778w+31.411$, $0.0889w^2-2.3778w+50.389$)

point O (36.8, $-0.0444w^2+0.6889w+25.956$, $0.0444w^2-1.6889w+37.244$)

point B' (36.6, 0.0, $-w+63.4$)

point D ($-2.8w+40.1$, 0.0, $1.8w+59.9$)

point C (0.0, $0.0667w^2-4.9667w+58.3$, $-0.0667w^2+3.9667w+41.7$), and curve MW is represented by coordinates (x, $(0.00357w^2-0.0391w+0.1756)x^2+(-0.0356w^2+0.4178w-3.6422)x-0.0667w^2+0.8333w+58.103$, 100−w−x−y), curve WN is represented by coordinates (x, $(-0.002061w^2+0.0218w-0.0301)x^2+(0.0556w^2-0.5821w-0.1108)x-0.4158w^2+4.7352w+43.383$, 100−w−x−y), and curve NO is represented by coordinates (x, $(0.0082x^2+(0.0022w^2-0.0345w$ $0.7521)x-0.1307w^2+2.0247w+42.327$, 100−w−x−y).

When the requirements above are satisfied, refrigerant 1E according to the present disclosure has a refrigerating capacity ratio of 80% or more relative to R410A, a GWP of 250 or less, and a lower ASHRAE flammability.

Refrigerant 1E according to the present disclosure is preferably a refrigerant wherein when the mass % of $CO_2$, R32, HFO-1132(E), and R1234yf based on their sum in the refrigerant is respectively represented by w, x, y, and z, if $1.2<w\leq4.0$, coordinates (x,y,z) in a ternary composition diagram in which the sum of R32, HFO-1132(E), and R1234yf is (100−w) mass % are within the range of a figure surrounded by curve MW, curve WN, straight line NE, straight line EC, and straight line CM that connect the following 5 points or on these line segments (excluding points on straight line CM):

point M (0.0, $-0.3004w^2+2.419w+55.53$, $0.3004w^2-3.419w+44.47$)

point W (10.0, $-0.3645w^2+3.5024w+34.422$, $0.3645w^2-4.5024w+55.578$)

point N (18.2, $-0.3773w^2+3.319w+28.26$, $0.3773w^2-4.319w+53.54$)

point E ($-0.0365w+18.26$, $0.0623w^2-4.5381w+31.856$, $-0.0623w^2+3.5746w+49.884$)

point C (0.0, $0.1081w^2-5.169w+58.447$, $-0.1081w^2+4.169w+41.553$), and curve MW is represented by coordinates (x, $(0.0043w^2-0.0359w+0.1509)x^2+(-0.0493w^2+0.4669w-3.6193)x-0.3004w^2+2.419w+55.53$, $100-w-x-y$), and curve WN is represented by coordinates (x, $(0.0055w^2-0.0326w+0.0665)x^2+(-0.1571w^2+0.8981w\ 2.6274)x+0.6555w^2-2.2153w+54.044$, $1100-w-x-y$); and if $4.0<w\leq7.0$, coordinates (x,y,z) in the ternary composition diagram are within the range of a figure surrounded by curve MW, curve WN, straight line NE, straight line EC, and straight line CM that connect the following 5 points or on these line segments (excluding points on straight line CM):

point M (0.0, $-0.0667w^2+0.8333w+58.133$, $0.0667w^2-1.8333w+41.867$)

point W (10.0, $-0.0667w^2+1.1w+39.267$, $0.0667w^2-2.1w+50.733$)

point N (18.2, $-0.0889w^2+1.3778w+31.411$, $0.0889w^2-2.3778w+50.389$)

point E (18.1, $0.01'14w^2-4.3556w+31.411$, $-0.0444w^2+3.3556w+50.489$)

point C (0.0, $0.0667w^2-4.9667w+58.3$, $-0.0667w^2+3.9667w+41.7$), and curve MW is represented by coordinates (x; $(0.00357w^2-0.0391w+0.1756)x^2+(-0.0356w^2+0.4178w\ 3.6422)x-0.0667w^2+0.8333w+58.103$, $100-w-x-y$), and curve WN is represented by coordinates (x, $(-0.002061w^2+0.0218w-0.0301)x^2+(0.0556w^2-0.5821w-0.1108)x-0.4158w^2+4.7352w+43.383$, $100-w-x-y$).

When the requirements above are satisfied, refrigerant 1E according to the present disclosure has a refrigerating capacity ratio of 80% or more relative to R410A, a GWP of 125 or less, and a lower ASH RAE flammability.

Refrigerant 1E may further comprise an additional refrigerant in addition to $CO_2$, R32, HFO-1132(E), and R1234yf, as long as the above characteristics and effects of the refrigerant are not impaired. From this viewpoint, refrigerant 1E according to the present disclosure preferably comprises R32, HFO-1132(E), and R1234yf in a total amount of 99.5 mass % or more, more preferably 99.75 mass % or more, and even more preferably 99.9 mass % or more, of the entire refrigerant.

The additional refrigerant is not limited, and can be selected from a wide range of refrigerants. The mixed refrigerant may comprise a single additional refrigerant, or two or more additional refrigerants.

Refrigerant 1E according to the present disclosure can be preferably used as a working fluid in a refrigerating machine.

The composition according to the present disclosure is suitable for use as an alternative refrigerant for R410A.

Examples of Refrigerant 1E

The present disclosure is described in more detail below with reference to Examples. However, refrigerant 1E according to the present disclosure is not limited to the Examples.

The burning velocity of each of the mixed refrigerants of $CO_2$, R32, HFO-1132(E), and R1234yf was measured in accordance with the ANSI/ASHRAE Standard 34-2013. While changing the concentration of $CO_2$, a formulation that shows a burning velocity of 10 cm/s was found. Tables 27 to 29 show the formulations found.

A burning velocity test was performed using the apparatus shown in FIG. 1A in the following manner. First, the mixed refrigerants used had a purity of 99.5% or more and were degassed by repeating a cycle of freezing, pumping, and thawing until no traces of air were observed on the vacuum gauge. The burning velocity was measured by using a closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two acrylic light transmission windows was used as the sample cell, and a xenon lamp was used as the light source. Schlieren images of the flame were recorded with a high-speed digital video camera at a frame rate of 600 fps and stored on a PC.

The WCFF concentration was obtained by using the WCF concentration as the initial concentration and performing leak simulation using NIST Standard Reference Database REFLEAK Version 4.0.

TABLE 27

| | | 0% $CO_2$ | | | | | | |
|---|---|---|---|---|---|---|---|---|
| Item | Unit | Comp. Ex. 13 I | Comp. Ex. 14 | Comp. Ex.15 J | Comp. Ex. 16 | Comp. Ex. 17 K | Comp. Ex. 18 | Comp. Ex. 19 L |
| HFO-1132(E) | mass % | 72.0 | 57.2 | 48.5 | 41.2 | 35.6 | 32.0 | 28.9 |
| R32 | mass % | 0.0 | 10.0 | 18.3 | 27.6 | 36.8 | 44.2 | 51.7 |
| R1234yf | mass % | 28.0 | 32.8 | 33.2 | 31.2 | 27.6 | 23.8 | 19.4 |

TABLE 27-continued

| | | | | | | | | |
|---|---|---|---|---|---|---|---|---|
| $CO_2$ | mass % | 0.0 | 0.0 | 0.0 | 0.0 | 0.0 | 0.0 | 0.0 |
| Burning velocity (WCF) | cm/s | 10 | 10 | 10 | 10 | 10 | 10 | 10 |

0.6% $CO_2$

| Item | Unit | Example 3 I | Example 4 | Example 5 J | Example 6 | Example 7 K | Example 8 | Example 9 L |
|---|---|---|---|---|---|---|---|---|
| HFO-1132(E) | mass % | 72.0 | 57.2 | 48.5 | 41.2 | 35.6 | 32.0 | 28.9 |
| R32 | mass % | 0.0 | 10.0 | 18.3 | 27.6 | 36.8 | 44.2 | 51.7 |
| R1234yf | mass % | 27.4 | 32.6 | 32.6 | 30.6 | 27.0 | 23.3 | 10.8 |
| $CO_2$ | mass % | 0.6 | 0.6 | 0.6 | 0.6 | 0.6 | 0.6 | 0.6 |
| Burning velocity (WCF) | cm/s | 10 | 10 | 10 | 10 | 10 | 10 | 10 |

1.2% $CO_2$

| Item | Unit | Comp. Ex. 48 I | Example 17 | Example 18 J | Example 19 | Example 20 K | Example 21 | Example 22 L |
|---|---|---|---|---|---|---|---|---|
| HFO-1132(E) | mass % | 72.0 | 57.2 | 48.5 | 41.2 | 35.6 | 32.0 | 28.9 |
| R32 | mass % | 0.0 | 10.0 | 18.3 | 27.6 | 36.8 | 44.2 | 51.7 |
| R1234yf | mass % | 26.8 | 31.6 | 32.0 | 30.0 | 26.4 | 22.7 | 18.2 |
| $CO_2$ | mass % | 1.2 | 1.2 | 1.2 | 1.2 | 1.2 | 1.2 | 1.2 |
| Burning velocity (WCF) | cm/s | 10 | 10 | 10 | 10 | 10 | 10 | |

1.3% $CO_2$

| Item | Unit | Comp. Ex. 59 I | Example 29 | Example 30 J | Example 31 | Example 32 K | Example 33 | Example 34 L |
|---|---|---|---|---|---|---|---|---|
| HFO-1132(E) | mass % | 72.0 | 57.2 | 48.5 | 41.2 | 35.6 | 32.0 | 28.9 |
| R32 | mass % | 0.0 | 10.0 | 18.3 | 27.6 | 36.8 | 44.2 | 51.7 |
| R1234yf | mass % | 26.7 | 31.5 | 31.9 | 29.9 | 26.3 | 22.6 | 18.1 |
| $CO_2$ | mass % | 1.3 | 1.3 | 1.3 | 1.3 | 1.3 | 1.3 | 1.3 |
| Burning velocity (WCF) | cm/s | 10 | 10 | 10 | 10 | 10 | 10 | 10 |

2.5% $CO_2$

| Item | Unit | Comp Ex. 69 I | Example 44 | Example 45 J | Example 46 | Example 47 K | Example 48 | Example 49 L |
|---|---|---|---|---|---|---|---|---|
| HFO-1132(E) | mass % | 72.0 | 57.2 | 48.5 | 41.2 | 35.6 | 32.0 | 28.9 |
| R32 | mass % | 0.0 | 10.0 | 18.3 | 27.6 | 36.8 | 44.2 | 51.7 |
| R1234yf | mass % | 25.5 | 30.3 | 30.7 | 28.7 | 25.1 | 21.3 | 16.9 |
| $CO_2$ | mass % | 2.5 | 2.5 | 2.5 | 2.5 | 2.5 | 2.5 | 2.5 |
| Burning velocity (WCF) | cm/s | 10 | 10 | 10 | 10 | 10 | 10 | 10 |

4.0 $CO_2$

| Item | Unit | Comp. Ex. 79 I | Example 59 | Example 60 J | Example 61 | Example 62 K | Example 63 | Example 64 L |
|---|---|---|---|---|---|---|---|---|
| HFO-1132(E) | mass % | 72.0 | 57.2 | 48.5 | 41.2 | 35.6 | 32.0 | 28.9 |
| R32 | mass % | 0.0 | 10.0 | 18.3 | 27.6 | 36.8 | 44.2 | 51.7 |
| R1234yf | mass % | 24.0 | 28.8 | 29.2 | 27.2 | 23.6 | 19.8 | 15.4 |
| $CO_2$ | mass % | 4.0 | 4.0 | 4.0 | 4.0 | 4.0 | 4.0 | 4.0 |
| Burning velocity (WCF) | cm/s | 10 | 10 | 10 | 10 | 10 | 10 | 10 |

5.5 $CO_2$

| Item | Unit | Comp Ex. 89 I | Example 74 | Example 75 J | Example 76 | Example 77 K | Example 78 | Example 79 L |
|---|---|---|---|---|---|---|---|---|
| HFO-1132(E) | mass % | 72.0 | 57.2 | 48.5 | 41.2 | 35.6 | 32.0 | 28.9 |
| R32 | mass % | 0.0 | 10.0 | 18.3 | 27.6 | 36.8 | 44.2 | 51.7 |
| R1234yf | mass % | 22.5 | 27.3 | 27.7 | 25.7 | 22.1 | 18.3 | 13.9 |
| $CO_2$ | mass % | 5.5 | 5.5 | 5.5 | 5.5 | 5.5 | 5.5 | 5.5 |
| Burning velocity | cm/s | 10 | 10 | 10 | 10 | 10 | 10 | 10 |

TABLE 27-continued (WCF)

| 7.0 $CO_2$ | | | | | | | | |
|---|---|---|---|---|---|---|---|---|
| Item | Unit | Comp. Ex. 99 I | Example 89 | Example 90 J | Example 91 | Example 92 K | Example 93 | Example 94 L |
| HFO-1132(E) | mass % | 72.0 | 57.2 | 48.5 | 41.2 | 35.6 | 32.0 | 28.9 |
| R32 | mass % | 0.0 | 10.0 | 18.3 | 27.6 | 36.8 | 44.2 | 51.7 |
| R1234yf | mass % | 21.0 | 25.8 | 26.2 | 24.2 | 20.6 | 16.8 | 12.4 |
| $CO_2$ | mass % | 7.0 | 7.0 | 7.0 | 7.0 | 7.0 | 7.0 | 7.0 |
| Burning velocity (WCF) | cm/s | 10 | 10 | 10 | 10 | 10 | 10 | 10 |

TABLE 28

| Item | | | Comp. Ex. 20 M | Comp. Ex. 21 | Comp. Ex. 22 W | Comp. Ex. 23 | Comp. Ex. 24 N | Comp. Ex. 25 | Comp. Ex. 26 O | Comp. Ex. 27 | Comp. Ex. 28 P |
|---|---|---|---|---|---|---|---|---|---|---|---|
| 0% CO2 | | | | | | | | | | | |
| WCF | HFO-1132(E) | mass % | 52.6 | 39.2 | 32.4 | 29.3 | 27.7 | 24.5 | 22.6 | 21.2 | 20.5 |
| | R32 | mass % | 0.0 | 5.0 | 10.0 | 14.5 | 18.2 | 27.6 | 36.8 | 44.2 | 51.7 |
| | R1234yf | mass % | 47.4 | 55.8 | 57.6 | 56.2 | 54.1 | 47.9 | 40.6 | 34.6 | 27.8 |
| | $CO_2$ | mass % | 0.0 | 0.0 | 0.0 | 0.0 | 0.0 | 0.0 | 0.0 | 0.0 | 0.0 |
| Leak conditions to make WCFF | | | Storage/transport, −40° C., 0%, at release, gas phase side | Storage/transport, −40° C., 0%, at release, gas phase side | Storage/transport, −40° C., 0%, at release, gas phase side | Storage/transport, −40° C., 0%, at release, gas phase side | Storage/transport, −40° C., 0%, at release, gas phase side | Storage/transport, −40° C., 0%, at release, gas phase side | Storage/transport, −40° C., 0%, at release, gas phase side | Storage/transport, −40° C., 0%, at release, gas phase side | Storage/transport, −40° C., 0%, at release, gas phase side |
| WCFF | HFO-1132(E) | mass % | 72.0 | 57.8 | 48.7 | 43.6 | 40.6 | 34.9 | 31.4 | 29,2 | 27.1 |
| | R32 | mass % | 0.0 | 9.5 | 17.9 | 24.2 | 28.7 | 38.1 | 45.7 | 51.1 | 56.4 |
| | R1234yf | mass % | 28.0 | 32.7 | 33.4 | 32.2 | 30.7 | 27.0 | 23.0 | 19.7 | 16.5 |
| | $CO_2$ | mass % | 0.0 | 0.0 | 0.0 | 0.0 | 0.0 | 0.0 | 0.0 | 0.0 | 0.0 |
| Burning velocity (WCF) | | cm/s | 58 | 8 | 58 | 58 | 58 | 58 | 58 | 8 | 58 |
| Burning velocity (WCFF) | | cm/s | 10 | 10 | 10 | 10 | 10 | 10 | 10 | 10 | 10 |

| Item | | | Comp. Ex. 35 C═M | Comp. Ex. 37 | Comp. Ex. 38 W | Comp. Ex. 39 | Example 1 N(═E═G) | Example 10 | Example 11 O | Example 12 | Example 13 P |
|---|---|---|---|---|---|---|---|---|---|---|---|
| 0.6% $CO_2$ | | | | | | | | | | | |
| WCF | HFO-1132(E) | mass % | 55.4 | 42.4 | 35.1 | 31.6 | 29.6 | 26.3 | 24.0 | 22.4 | 20.9 |
| | R32 mass % | | 0.0 | 5.0 | 10.0 | 14.5 | 18.2 | 27.6 | 36.8 | 44.0 | 51.7 |
| | R1234yf | mass % | 44.0 | 52.0 | 54.3 | 53.3 | 51.6 | 45.5 | 38.6 | 33.0 | 26.8 |
| | $CO_2$ mass % | | 0.6 | 0.6 | 0.6 | 0.6 | 0.6 | 0.6 | 0.6 | 0.6 | 0.6 |
| Leak conditions to make WCFF | | | Storage/transport, −40° C., 0%, at release, gas phase side | Storage/transport, −40° C., 0%, at release, gas phase side | Storage/transport, −40° C., 0%, at release, liquid phase side | Storage/transport, −40° C., 0%, at release, liquid phase side | Storage/transport, −40° C., 0%, at release, gas phase side | Storage/transport, −40° C., 0%, at release, gas phase side | Storage/transport, −40° C., 0%, at release, liquid phase side | Storage/transport, −40° C., 0%, at release, liquid phase side | Storage/transport, −40° C., 0%, at release, liquid phase side |
| WCFF | HFO-1132(E) | mass % | 72.0 | 58.6 | 49.7 | 44.5 | 41.3 | 35.8 | 32.1 | 29.8 | 27.8 |
| | R32 | mass % | 0.0 | 8.9 | 16.9 | 23.0 | 27.4 | 36.6 | 44.1 | 49.4 | 54.7 |
| | R1234yf | mass % | 2.7 | 29.1 | 30.2 | 29.4 | 28.3 | 24.8 | 21.1 | 18.2 | 14.9 |
| | $CO_2$ | mass % | 3.3 | 3.4 | 3.2 | 3.1 | 3.0 | 2.8 | 2.7 | 2.6 | 2.6 |
| Burning velocity (WCF) | | cm/s | 58 | 58 | 58 | 58 | 58 | 58 | 58 | 58 | 58 |
| Burning velocity (WCFF) | | cm/s | 10 | 10 | 10 | 10 | 10 | 10 | 10 | 10 | 10 |

| Item | | | Comp. Ex.49 M | Comp. Ex.50 | Example 16 G═W | Example 23 | Example 24 N | Example 25 | Example 26 O | Example 27 | Example 28 P |
|---|---|---|---|---|---|---|---|---|---|---|---|
| 1.2% $CO_2$ | | | | | | | | | | | |
| WCF | HFO-1132(E) | mass % | 58.0 | 45.2 | 38.1 | 34.0 | 31.7 | 27.9 | 25.4 | 23.7 | 22.1 |
| | R32 | mass % | 0.0 | 5.0 | 10.0 | 14.4 | 18.2 | 27.6 | 36.8 | 44.0 | 51.7 |

TABLE 28-continued

| | | | | | | | | | | | |
|---|---|---|---|---|---|---|---|---|---|---|---|
| | R1234yf | mass % | 40.8 | 48.6 | 50.7 | 48.9 | 48.9 | 43.3 | 36.0 | 31.1 | 25.0 |
| | $CO_2$ | mass % | 1.2 | 1.2 | 1.2 | 1.2 | 1.2 | 1.2 | 1.2 | 1.2 | 1.2 |
| Leak conditions to make WCFF | | | Storage/transport, −40° C., 0%, release, gas phase side | Storage/transport, −40° C., 6%, at release, gas phase side | Storage/transport, −40° C., 6%, at release, liquid phase side | Storage/transport, −40° C., 4%, at release, liquid phase side | Storage/transport, −40° C., 4%, at release, liquid phase side | Storage/transport, −40° C., 4%, at release, liquid phase side | Storage/transport, −40° C., 4%, at release, liquid phase side | Storage/transport, −40° C., 4%, at release, liquid phase side | Storage/transport, −40° C., 4%, at release, liquid phase side |
| WCFF | HFO-1132(E) | mass % | 72.0 | 59.3 | 50.9 | 45.6 | 42.2 | 36.4 | 32.7 | 30.3 | 28.3 |
| | R32 | mass % | 0.0 | 8.3 | 15.8 | 21.7 | 26.2 | 35.3 | 42.8 | 48.1 | 53.4 |
| | R1234yf | mass % | 24.8 | 28.0 | 28.5 | 27.7 | 26.7 | 23.6 | 20.0 | 17.1 | 13.9 |
| | $CO_2$ | mass % | 3.2 | 4.4 | 4.8 | 5.0 | 4.9 | 4.7 | 4.5 | 4.5 | 4.4 |
| Burning velocity (WCF) | | cm/s | 58 | 58 | 58 | <8 | 58 | 58 | 58 | 58 | 58 |
| Burning velocity (WCFF) | | cm/s | 10 | 10 | 10 | 10 | 10 | 10 | 10 | 10 | 10 |

1.3% $CO_2$

| Item | | | Comp. Ex.60 M | Example 35 | Example 36 W | Example 37 | Example 38 N | Example 39 | Example 40 O | Example 41 | Example 42 P |
|---|---|---|---|---|---|---|---|---|---|---|---|
| WCF | HFO-1132(E) | mass % | 58.2 | 45.5 | 38.4 | 34.3 | 31.9 | 28.1 | 25.6 | 23.9 | 22.3 |
| | R32 | mass % | 0.0 | 5.0 | 10.0 | 14.4 | 18.2 | 27.6 | 36.8 | 44.0 | 51.7 |
| | R1234yf | mass % | 40.5 | 48.2 | 50.3 | 50.0 | 48.6 | 43.0 | 36.3 | 30.8 | 24.7 |
| | $CO_2$ | mass % | 1.3 | 1.3 | 1.3 | 1.3 | 1.3 | 1.3 | 1.3 | 1.3 | 1.3 |
| Leak conditions to make WCFF | | | Storage/transport, −40° C., 0%, release, gas phase side | Storage/transport, −40° C., 8%, release, gas phase side | Storage/transport, −40° C., 6%, at release, liquid phase side | Storage/transport, −40° C.,6%, at release, liquid phase side | Storage/transport, −40° C., 6%, at release, liquid phase side | Storage/transport, −40° C., 4%, at release, liquid phase side | Storage/transport, −40° C., 4%, at release, liquid phase side | Storage/transport, −40° C., 4%, at release, liquid phase side | Storage/transport, −40° C., 4%, at release, liquid phase side |
| WCFF | HFO-1132(E) | mass % | 72.0 | 59.4 | 51.0 | 45.7 | 42.2 | 36.5 | 32.8 | 30.4 | 28.4 |
| | R32 | mass % | 0.0 | 8.2 | 15.8 | 21.5 | 26.0 | 35.1 | 42.6 | 47.9 | 53.2 |
| | R1234yf | mass % | 25.0 | 27.6 | 28.1 | 27.8 | 26.9 | 26.3 | 19.7 | 16.9 | 13.6 |
| | $CO_2$ | mass % | 3.0 | 4.8 | 5.1 | 5.0 | 4.9 | 5.1 | 4.9 | 4.8 | 4.8 |
| Burning velocity (WCF) | | cm/s | 58 | 58 | 58 | 58 | 58 | 58 | 58 | 58 | 58 |
| Burning velocity (WCFF) | | cm/s | 10 | 10 | 10 | 10 | 10 | 10 | 10 | 10 | 10 |

TABLE 29

| 2.5% $CO_2$ | | | | | | | | | | | |
|---|---|---|---|---|---|---|---|---|---|---|---|
| Item | | | Comp. Ex. 70 M | Example 50 | Example 51 W | Example 52 | Example 53 N | Example 54 | Example 55 O | Example 56 | Example 57 P |
| WCF | HFO-1132(E) | mass % | 59.7 | 48.1 | 40.9 | 36.9 | 34.2 | 29.9 | 27.2 | 25.2 | 23.4 |
| | R32 | mass % | 0.0 | 5.0 | 10.0 | 14.4 | 18.2 | 27.6 | 36.8 | 44.0 | 51.7 |
| | R1234yf | mass % | 37.8 | 44.4 | 46.6 | 46.2 | 45.1 | 40.0 | 33.5 | 28.1 | 22.4 |
| | $CO_2$ | mass % | 2.5 | 2.5 | 2.5 | 2.5 | 2.5 | 2.5 | 2.5 | 2.5 | 2.5 |
| Leak conditions to make WCFF | | | Storage/transport, −40° C., 26%, at release, gas phase side | Storage/transport, −40° C., 20%, at release, gas phase side | Storage/transport, −40° C., 20%, at release, gas phase side | Storage/transport, −40° C., 20%, at release, gas phase side | Storage/transport, −40° C., 18% at release, liquid phase side | Storage/transport, −40° C., 18% at release, liquid phase side | Storage/transport, −40° C., 18% at release, liquid phase side | Storage/transport, −40° C., 20%, at release, gas phase side | Storage/transport, −40° C., 22%, at release, gas phase side |
| WCFF | HFO-1132(E) | mass % | 72.0 | 60.3 | 52.1 | 46.9 | 43.2 | 37.1 | 33.2 | 30.6 | 28.3 |
| | R32 | mass % | 0.0 | 7.5 | 14.6 | 20.2 | 24.7 | 34.1 | 41.8 | 47.6 | 53.4 |
| | R1234yf | mass % | 24.9 | 27.4 | 28.4 | 28.0 | 26.7 | 23.4 | 19.7 | 16.9 | 13.8 |
| | $CO_2$ | mass % | 3.1 | 4.8 | 4.9 | 4.9 | 5.4 | 5.4 | 5.4 | 4.9 | 4.5 |
| Burning velocity (WCF) | | cm/s | 8 | ≤8 | 58 | 58 | 58 | 58 | 58 | 58 | 58 |
| Burning velocity (WCFF) | | cm/s | 10 | 10 | 10 | 10 | 10 | 10 | 10 | 10 | 10 |

| 4.0% $CO_2$ | | | | | | | | | | | |
|---|---|---|---|---|---|---|---|---|---|---|---|
| Item | | | Comp. Ex. 80 M | Example 65 | Example 66 W | Example 67 | Example 68 N | Example 69 | Example 70 O | Example 71 | Example 72 P |
| WCF | HFO-1132 (E) | mass % | 60.4 | 49.6 | 42.6 | 38.3 | 35.5 | 31.0 | 28.0 | 25.9 | 23.9 |
| | R32 | mass % | 0.0 | 5.0 | 10.0 | 14.4 | 18.2 | 27.6 | 36.8 | 44.0 | 51.7 |
| | R1234yf | mass % | 35.6 | 41.4 | 43.4 | 43.3 | 42.3 | 37.4 | 31.2 | 26.1 | 20.4 |
| | $CO_2$ | mass % | 4.0 | 4.0 | 4.0 | 4.0 | 4.0 | 4.0 | 4.0 | 4.0 | 4.0 |
| Leak conditions to make WCFF | | | Storage/transport, −40° C., 32%, at release, gas phase side | Storage/transport, −40° C., 28%, at release, gas phase side | Storage/transport, −40° C., 28%, at release, gas phase side | Storage/transport, −40° C., 28% at release, gas phase side | Storage/transport, −40° C., 28%, at release, gas phase side | Storage/transport, −40° C., 28%, at release, gas phase side | Storage/transport, −40° C., 32%, at release, gas phase side | Storage/transport, -40° C., 32%, at release, gas phase side | Storage/transport, −40° C., 32% at release, gas phase side |
| WCFF | HFO-1132 (E) | mass % | 72.0 | 60.9 | 52.9 | 47.5 | 43.8 | 37.4 | 33.1 | 30.5 | 28.1 |
| | R32 | mass % | 0.0 | 7.1 | 13.9 | 19.4 | 23.9 | 33.5 | 41.7 | 47.6 | 53.6 |
| | R1234yf | mass % | 24.5 | 27.0 | 28.0 | 27.8 | 26.9 | 23.6 | 20.5 | 17.2 | 13.5 |
| | $CO_2$ | mass % | 3.5 | 5.0 | 5.2 | 5.3 | 5.4 | 5.5 | 4.7 | 4.7 | 4.8 |
| Burning velocity (WCF) | | cm/s | 58 | 58 | 58 | 8 | 58 | 58 | 58 | 58 | 58 |
| Burning velocity (WCFF) | | cm/s | 10 | 10 | 10 | 10 | 10 | 10 | 10 | 10 | 10 |

| 5.5% $CO_2$ | | | | | | | | | | | |
|---|---|---|---|---|---|---|---|---|---|---|---|
| Item | | | Comp. Ex. 90 M | Example 80 | Example 81 W | Example 82 | Example 83 N | Example 84 | Example 85 O | Example 86 | Example 87 P |
| WCF | HFO-1132 (E) | mass % | 60.7 | 50.3 | 43.3 | 39.0 | 36.3 | 31.6 | 28.4 | 26.2 | 24.2 |
| | R32 | mass % | 0.0 | 5.0 | 10.0 | 14.4 | 18.2 | 27.6 | 36.8 | 44.0 | 51.7 |

TABLE 29-continued

| | | | | | | | | | | | |
|---|---|---|---|---|---|---|---|---|---|---|---|
| | R1234yf | mass % | 33.8 | 39.2 | 41.2 | 41.1 | 40.0 | 35.3 | 29.3 | 24.3 | 18.6 |
| | $CO_2$ | mass % | 5.5 | 5.5 | 5.5 | 5.5 | 5.5 | 5.5 | 5.5 | 5.5 | 5.5 |
| Leak conditions to make WCFF | | | Storage/transport, −40° C., 36%, at release, gas phase side | Storage/transport, -40° C., 34%, at release, gas phase side | Storage/transport, −40° C., 34%, at release, gas phase side | Storage/transport, −40° C., 32%, at release, gas phase side | Storage/transport, −40° C., 34%, at release, gas phase side | Storage/transport, −40° C., 36%, at release, gas phase side | Storage/transport, −40° C., 38% at release, gas phase side | Storage/transport, -40° C., 40%, at release, gas phase side | Storage/transport, 40°° C., 40%, at release, gas phase side |
| WCFF | HFO-1132 (E) | mass % | 72.0 | 61.2 | 53.2 | 47.8 | 44.2 | 37.6 | 33.2 | 30.3 | 27.9 |
| | R32 | mass % | 0.0 | 6.8 | 13.5 | 19.0 | 23.4 | 33.2 | 41.7 | 47.9 | 54.2 |
| | R1234yf | mass % | 24.5 | 27.0 | 28.1 | 27.7 | 26.8 | 23.9 | 20.2 | 17.3 | 13.3 |
| | $CO_2$ | mass % | 3.5 | 5.0 | 5.2 | 5.5 | 5.6 | 5.3 | 4.9 | 4.5 | 4.6 |
| Burning velocity (WCF) | | cm/s | 58 | 58 | ≤8 | 58 | 58 | 58 | 58 | 58 | 58 |
| Burning velocity (WCFF) | | cm/s | 10 | 10 | 10 | 10 | 10 | 10 | 10 | 10 | 10 |

7.0% $CO_2$

| Item | | | Comp. Ex. 100 M | Example 95 | Example 96 W | Example 97 | Example 98 N | Example 99 | Example 100 O | Example 101 | Example 102 P |
|---|---|---|---|---|---|---|---|---|---|---|---|
| WCF | HFO-1132(E) | mass % | 60.7 | 50.3 | 43.7 | 39.5 | 36.7 | 31.9 | 28.6 | 26.4 | 24.2 |
| | R32 | mass % | 0.0 | 5.0 | 10.0 | 14.4 | 18,2 | 27.6 | 36.8 | 44.0 | 51.7 |
| | R1234yf | mass % | 32.3 | 37.7 | 39.3 | 39.1 | 38.1 | 33.5 | 27.6 | 22.6 | 17.1 |
| | $CO_2$ | mass % | 7.0 | 7.0 | 7.0 | 7.0 | 7.0 | 7.0 | 7.0 | 7.0 | 7.0 |
| Leak conditions to make WCFF | | | Storage/transport, −40° C., 42%, at release, gas phase side | Storage/transport, −40° C., 34%, at release, gas phase side | Storage/transport, −40° C., 38%, at release, gas phase side | Storage/transport, −40° C., 40%, at release, gas phase side | Storage/transport, -40° C., 40%, at release, gas phase side | Storage/transport, −40° C., 42%, at release, gas phase side | Storage/transport, −40° C., 42%, at release, gas phase side | Storage/transport, −40° C., 42%, at release, gas phase side | Storage/transport, -40° C., 44%, at release, gas phase side |
| WCFF | HFO-1132(E) | mass % | 72.0 | 61.2 | 53.4 | 48.1 | 44.4 | 37.7 | 33.2 | 30.4 | 27.8 |
| | R32 | mass % | 0.0 | 6.8 | 13.3 | 18.7 | 23.2 | 33.1 | 41.7 | 47.9 | 54.6 |
| | R1234yf | mass % | 24.4 | 27.0 | 27.8 | 28.1 | 27.1 | 24.1 | 19.8 | 16.3 | 12.7 |
| | $CO_2$ | mass % | 3.6 | 5.0 | 5.5 | 5.1 | 5.3 | 5.1 | 5.3 | 5.4 | 4.9 |
| Burning velocity (WCF) | | cm/s | 58 | 8 | 58 | 58 | 58 | 58 | 58 | 58 | 58 |
| Burning velocity (WCFF) | | cm/s | 10 | 10 | 10 | 10 | 10 | 10 | 10 | 10 | 10 |

These results indicate that when the mass % of $CO_2$, R32, HFO-1132(E), and R1234yf based on their sum is respectively represented by w, x, y, and z, the mixed refrigerant has a lower WCF flammability when coordinates (x,y,z) in the ternary composition diagram shown in FIGS. 1B to 1I, in which the sum of R32, HFO-1132(E), and R1234yf is (100−w) mass %, are on the line segments that connect point I, point J, point K, and point L, or below these line segments.

The results further indicate that the refrigerant has a lower ASHRAE flammability when coordinates (x,y,z) in the ternary composition diagram shown in FIG. 1B are on the line segments that connect point M, point N, point, 0, and point P, or below these line segments.

Mixed refrigerants were prepared by mixing R32, HFO-1132(E), and R1234yf in amounts in terms of mass % shown in Tables 30 to 40, based on their sum. The coefficient of performance (COP) ratio and the refrigerating capacity ratio of the mixed refrigerants shown in Tables 30 to 37 relative to those of R410 were determined.

The GWP of compositions comprising a mixture of R410A (R32=50%/R125=50%) and R1234yf was evaluated based on the value stated in the Intergovernmental Panel on Climate Change (IPCC), fourth report. The GWP of HFO-1132(E), which is not stated in the report; was assumed to be 1 from HFO-1132a (GWP=1 or less) and HFO-1123 (GWP=03, described in PTL 1). The refrigerating capacity of R4 t 0A and that of compositions comprising a mixture of HFO-1132(E), HFO-1123, and R1234yf were determined by performing theoretical refrigeration cycle calculations for mixed refrigerants using the National Institute of Science and Technology (NIST) Reference Fluid Thermodynamic and Transport Properties Database (Refprop 9.0) under the following conditions.

Evaporating temperature: 5° C.

Condensation temperature: 45° C.

Superheating temperature: 1 K

Supercooling temperature: 5 K $E_{comp}$ (compressive modulus): 0.7 kWh

Tables 30 to 37 show these values together with the GWP of each mixed refrigerant. Tables 30 to 37 show cases at a $CO_2$ concentration of 0 mass %, 0.6 mass %, 1.2 mass %, 1.3 mass %, 2.5 mass %, 4 mass %, 5.5 mass %, and 7 mass %, respectively.

TABLE 30

0% $CO_2$

| Item | Unit | Comp. Ex. 1 | Comp. Ex. 2 A | Comp. Ex. 3 B | Comp. Ex. 4 A' | Comp. Ex. 5 B' | Comp. Ex. 6 A" | Comp. Ex. 7 B" | Comp. Ex. 8 C | Comp. Ex. 9 D |
|---|---|---|---|---|---|---|---|---|---|---|
| HFO-1132(E) | mass % | R410A | 81.6 | 0.0 | 63.1 | 0.0 | 48.2 | 0.0 | 58.3 | 0.0 |
| R32 | mass % | | 18.4 | 18.1 | 36.9 | 36.7 | 51.8 | 51.5 | 0.0 | 40.3 |
| R1234yf | mass % | | 0.0 | 81.9 | 0.0 | 63.3 | 0.0 | 49.5 | 41.7 | 59.7 |
| $CO_2$ | mass % | | 0.0 | 0.0 | 0.0 | 0.0 | 0.0 | 0.0 | 0.0 | 0.0 |
| GWP | — | 2088 | 125 | 125 | 250 | 250 | 350 | 350 | 2 | 274 |
| COP ratio | % (relative to R410A) | 100 | 98.7 | 103.6 | 98.7 | 102.3 | 99.2 | 102.1 | 100.3 | 102.2 |
| Refrigerating capacity ratio | % (relative to R410A) | 100 | 105.3 | 62.5 | 109.9 | 77.5 | 112.1 | 87.0 | 80.0 | 80.0 |
| Condensation glide | ° C. | 0.1 | 0.3 | 6.8 | 0.1 | 4.5 | 0.0 | 2.7 | 2.9 | 4.0 |

| Item | Unit | Comp. Ex. 10 E | Comp. Ex. 11 F | Comp. Ex. 12 G | Comp. Ex. 13 I | Comp. Ex. 14 | Comp. Ex. 15 J | Comp. Ex. 16 | Comp. Ex. 17 K | Comp. Ex. 18 |
|---|---|---|---|---|---|---|---|---|---|---|
| HFO-1132(E) | mass % | 31.9 | 5.2 | 26.2 | 72.0 | 57.2 | 48.5 | 41.2 | 35.6 | 32.0 |
| R32 | mass % | 18.2 | 36.7 | 22.2 | 0.0 | 10.0 | 18.3 | 27.6 | 36.8 | 44.2 |
| R1234yf | mass % | 49.9 | 58.1 | 51.6 | 28.0 | 32.8 | 33.2 | 31.2 | 27.6 | 23.8 |
| $CO_2$ | mass % | 0.0 | 0.0 | 0.0 | 0.0 | 0.0 | 0.0 | 0.0 | 0.0 | 0.0 |
| GWP | — | 125 | 250 | 152 | 2 | 69 | 125 | 188 | 250 | 300 |
| COP ratio | % (relative to R410A) | 100.3 | 101.8 | 100.5 | 99.9 | 99.5 | 99.4 | 99.5 | 99.6 | 99.8 |
| Refrigerating capacity ratio | % (relative to R410A) | 82.3 | 80.8 | 82.4 | 86.6 | 88.4 | 90.9 | 94.2 | 97.7 | 100.5 |
| Condensation glide | ° C. | 4.4 | 4.3 | 4.5 | 1.7 | 2.6 | 2.7 | 2.4 | 1.9 | 1.6 |

| Item | Unit | Comp. Ex. 19 L | Comp. Ex. 20 M | Comp. Ex. 21 | Comp. Ex. 22 W | Comp. Ex. 23 | Comp. Ex. 24 N | Comp. Ex. 25 | Comp. Ex. 26 O | Comp. Ex. 27 | Ex. 28 P |
|---|---|---|---|---|---|---|---|---|---|---|---|
| HFO-1132(E) | mass % | 28.9 | 52.6 | 39.2 | 32.4 | 29.3 | 27.7 | 24.5 | 22.6 | 21.2 | 20.5 |
| R32 | mass % | 51.7 | 0.0 | 5.0 | 10.0 | 14.5 | 18.2 | 27.6 | 36.8 | 44.2 | 51.7 |
| R1234yf | mass % | 19.4 | 47.4 | 55.8 | 57.6 | 56.2 | 54.1 | 47.9 | 40.6 | 34.6 | 27.8 |
| $CO_2$ | mass % | 0.0 | 0.0 | 0.0 | 0.0 | 0.0 | 0.0 | 0.0 | 0.0 | 0.0 | 0.0 |
| GWP | — | 350 | 2 | 36 | 70 | 100 | 125 | 188 | 250 | 300 | 350 |
| COP ratio | % (relative to R410A) | 100.1 | 100.5 | 100.9 | 100.9 | 100.8 | 100.7 | 100.4 | 100.4 | 100.5 | 100.6 |
| Refrigerating capacity ratio | % (relative to R410A) | 103.3 | 77.1 | 74.8 | 75.6 | 77.8 | 80.0 | 85.5 | 91.0 | 95.0 | 99.1 |
| Condensation glide | ° C. | 1.2 | 3.4 | 4.7 | 5.2 | 5.1 | 4.9 | 4.0 | 3.0 | 2.3 | 1.7 |

TABLE 31

0.6% $CO_2$

| Item | Unit | Comp. Ex. 29 A | Comp. Ex. 30 B | Comp. Ex. 31 A' | Comp. Ex. 32 B' | Comp. Ex. 33 A" | Comp. Ex. 34 B" | Comp. Ex. 35 C=M | Comp. Ex. 36 D | Example 1 E=G=N |
|---|---|---|---|---|---|---|---|---|---|---|
| HFO-1132(E) | mass % | 81.0 | 0.0 | 62.5 | 0.0 | 47.6 | 0.0 | 55.4 | 0.0 | 29.6 |
| R32 | mass % | 18.4 | 18.1 | 36.9 | 36.7 | 51.8 | 51.6 | 0.0 | 38.6 | 18.2 |
| R1234yf | mass % | 0.0 | 81.3 | 0.0 | 62.7 | 0.0 | 47.8 | 44.0 | 60.8 | 51.6 |
| $CO_2$ | mass % | 0.6 | 0.6 | 0.6 | 0.6 | 0.6 | 0.6 | 0.6 | 0.6 | 0.6 |
| GWP | — | 125 | 125 | 250 | 250 | 350 | 350 | 2 | 263 | 125 |
| COP ratio | % (relative to R410A) | 98.4 | 103.4 | 98.4 | 102.1 | 99.0 | 102.0 | 100.1 | 102.1 | 100.2 |
| Refrigerating capacity ratio | % (relative to R410A) | 106.5 | 63.7 | 111.1 | 78.7 | 113.1 | 88.6 | 80.0 | 80.0 | 82.4 |
| Condensation glide | ° C. | 0.7 | 7.5 | 0.4 | 4.9 | 0.3 | 3.0 | 3.9 | 4.7 | 5.2 |

| Item | Unit | Example 2 F | Example 3 I | Example 4 | Example 5 J | Example 6 | Example 7 K | Example 8 | Example 9 L | Comp. Ex. 37 |
|---|---|---|---|---|---|---|---|---|---|---|
| HFO-1132(E) | mass % | 2.7 | 72.0 | 57.2 | 48.5 | 41.2 | 35.6 | 32.0 | 28.9 | 42.4 |
| R32 | mass % | 36.7 | 0.0 | 10.0 | 18.3 | 27.6 | 36.8 | 44.2 | 51.7 | 5.0 |
| R1234yf | mass % | 60.0 | 27.4 | 32.6 | 32.6 | 30.6 | 27.0 | 23.3 | 10.8 | 52.0 |
| $CO_2$ | mass % | 0.6 | 0.6 | 0.6 | 0.6 | 0.6 | 0.6 | 0.6 | 0.6 | 0.6 |
| GWP | — | 250 | 2 | 69 | 125 | 188 | 250 | 300 | 350 | 36 |
| COP ratio | % (relative to R410A) | 101.8 | 99.5 | 99.2 | 99.1 | 99.2 | 99.4 | 99.6 | 99.7 | 100.3 |
| Refrigerating capacity ratio | % (relative to R410A) | 80.4 | 88.1 | 89.7 | 92.3 | 95.5 | 99.0 | 101.7 | 108.2 | 77.9 |
| Condensation glide | ° C. | 4.8 | 5.2 | 2.4 | 3.2 | 3.1 | 2.8 | 2.3 | 1.9 | 3.9 |

| Item | Unit | Comp. Ex. 38 W | Comp. Ex. 39 | Example 10 | Example 11 O | Example 12 | Example 13 P |
|---|---|---|---|---|---|---|---|
| HFO-1132(E) | mass % | 35.1 | 31.6 | 26.3 | 24.0 | 22.4 | 20.9 |
| R32 | mass % | 10.0 | 14.5 | 27.6 | 36.8 | 44.0 | 51.7 |
| R1234yf | mass % | 54.3 | 53.3 | 45.5 | 38.6 | 33.0 | 26.8 |
| $CO_2$ | mass % | 0.6 | 0.6 | 0.6 | 0.6 | 0.6 | 0.6 |
| GWP | — | 70 | 100 | 188 | 250 | 299 | 350 |
| COP ratio | % (relative to R410A) | 100.4 | 100.3 | 100.1 | 100.1 | 100.2 | 100.4 |
| Refrigerating capacity ratio | % (relative to R410A) | 78.5 | 80.4 | 87.8 | 93.0 | 96.8 | 100.5 |
| Condensation glide | ° C. | 5.1 | 5.5 | 5.4 | 5.1 | 4.2 | 3.2 |

TABLE 32

1.2% $CO_2$

| Item | Unit | Comp. Ex. 40 A | Comp. Ex. 41 B | Comp. Ex. 42 A' | Comp. Ex. 43 B' | Comp. Ex. 44 A" | Comp. Ex. 45 B" | Comp. Ex. 46 C | Comp. Ex. 47 D | Example 14 E |
|---|---|---|---|---|---|---|---|---|---|---|
| HFO-1132(E) | mass % | 80.4 | 0.0 | 61.9 | 0.0 | 47.0 | 0.0 | 52.4 | 0.0 | 26.5 |
| R32 | mass % | 18.4 | 18.1 | 36.9 | 36.6 | 51.8 | 51.6 | 0.0 | 36.8 | 18.2 |
| R1234yf | mass % | 0.0 | 80.7 | 0.0 | 62.2 | 0.0 | 46.9 | 46.4 | 62.0 | 54.1 |
| $CO_2$ | mass % | 1.2 | 1.2 | 1.2 | 1.2 | 1.2 | 1.2 | 1.2 | 1.2 | 1.2 |
| GWP | — | 125 | 125 | 250 | 250 | 350 | 350 | 2 | 251 | 125 |
| COP ratio | % (relative to R410A) | 98.1 | 103.2 | 98.2 | 101.9 | 98.7 | 101.7 | 99.9 | 101.9 | 100.2 |
| Refrigerating capacity ratio | % (relative to R410A) | 107.7 | 65.0 | 112.2 | 79.8 | 114.2 | 89.9 | 80.0 | 80.0 | 82.0 |
| Condensation glide | ° C. | 1.2 | 8.1 | 0.8 | 5.4 | 0.6 | 3.4 | 4.9 | 5.3 | 6.0 |

| Item | Unit | Example 15 F | Example 16 G=W | Comp. Ex. 48 I | Example 17 | Example 18 J | Example 19 | Example 20 K | Example 21 | Example 22 L |
|---|---|---|---|---|---|---|---|---|---|---|
| HFO-1132(E) | mass % | 0.3 | 38.1 | 72.0 | 57.2 | 48.5 | 41.2 | 35.6 | 32.0 | 28.9 |
| R32 | mass % | 36.6 | 10.0 | 0.0 | 10.0 | 18.3 | 27.6 | 36.8 | 44.2 | 51.7 |
| R1234yf | mass % | 61.9 | 50.7 | 26.8 | 31.6 | 32.0 | 30.0 | 26.4 | 22.7 | 18.2 |
| $CO_2$ | mass % | 1.2 | 1.2 | 1.2 | 1.2 | 1.2 | 1.2 | 1.2 | 1.2 | 1.2 |

TABLE 32-continued 1.2% $CO_2$

| | | | | | | | | | | |
|---|---|---|---|---|---|---|---|---|---|---|
| GWP | — | 250 | 70 | 2 | 69 | 125 | 188 | 250 | 300 | 350 |
| COP ratio | % (relative to R410A) | 101.9 | 99.9 | 99.2 | 98.9 | 98.8 | 98.9 | 99.1 | 99.4 | 99.6 |
| Refrigerating capacity ratio | % (relative to R410A) | 80.0 | 81.6 | 89.7 | 91.3 | 93.7 | 96.9 | 100.3 | 103.0 | 105.8 |
| Condensation glide | ° C. | 5.4 | 5.7 | 3.1 | 3.6 | 3.6 | 3.2 | 2.6 | 2.2 | 1.8 |

| Item | Unit | Comp. Ex. 49 M | Comp. Ex. 50 | Example 23 | Example 24 N | Example 25 | Example 26 O | Example 27 | Example 28 P |
|---|---|---|---|---|---|---|---|---|---|
| HFO-1132(E) | mass % | 58.0 | 45.2 | 34.0 | 31.7 | 27.9 | 25.4 | 23.7 | 22.1 |
| R32 | mass % | 0.0 | 5.0 | 14.4 | 18.2 | 27.6 | 36.8 | 44.0 | 51.7 |
| R1234yf | mass % | 40.8 | 48.6 | 48.9 | 48.9 | 43.3 | 36.0 | 31.1 | 25.0 |
| $CO_2$ | mass % | 1.2 | 1.2 | 1.2 | 1.2 | 1.2 | 1.2 | 1.2 | 1.2 |
| GWP | — | 2 | 36 | 100 | 125 | 188 | 250 | 298 | 350 |
| COP ratio | % (relative to R410A) | 99.6 | 99.8 | 99.8 | 99.8 | 99.7 | 99.7 | 99.9 | 100.0 |
| Refrigerating capacity ratio | % (relative to R410A) | 82.9 | 80.9 | 83.6 | 84.9 | 90.0 | 95.3 | 98.7 | 102.4 |
| Condensation glide | ° C. | 4.3 | 5.4 | 5.6 | 5.4 | 4.4 | 3.4 | 2.8 | 2.2 |

TABLE 33

1.3% $CO_2$

| Item | Unit | Comp. Ex. 51 A | Comp. Ex. 52 B | Comp. Ex. 53 A' | Comp. Ex. 54 B'=D=F | Comp. Ex. 55 A" | Comp. Ex. 56 B" | Comp. Ex. 57 C | Comp. Ex. 58 E | Comp. Ex. 59 I |
|---|---|---|---|---|---|---|---|---|---|---|
| HFO-1132(E) | mass % | 80.3 | 0.0 | 61.8 | 0.0 | 46.9 | 0.0 | 51.9 | 26.1 | 72.0 |
| R32 | mass % | 18.4 | 18.1 | 36.9 | 36.6 | 51.8 | 51.6 | 0.0 | 18.2 | 0.0 |
| R1234yf | mass % | 0.0 | 80.6 | 0.0 | 62.1 | 0.0 | 47.1 | 46.8 | 54.4 | 26.7 |
| $CO_2$ | mass % | 1.3 | 1.3 | 1.3 | 1.3 | 1.3 | 1.3 | 1.3 | 1.3 | 1.3 |
| GWP | — | 125 | 125 | 250 | 250 | 350 | 350 | 2 | 125 | 2 |
| COP ratio | % (relative to R410A) | 98.0 | 103.2 | 98.1 | 101.9 | 98.7 | 101.7 | 99.8 | 100.2 | 99.1 |
| Refrigerating capacity ratio | % (relative to R410A) | 107.9 | 65.2 | 112.3 | 80.0 | 114.3 | 90.0 | 80.0 | 82.0 | 89.9 |
| Condensation glide | ° C. | 1.2 | 8.2 | 0.8 | 5.4 | 0.7 | 3.4 | 5.1 | 6.1 | 3.2 |

| Item | Unit | Example 29 | Example 30 J | Example 31 | Example 32 K | Example 33 | Example 34 L | Comp. Ex. 60 M | Example 35 | Example 36 W |
|---|---|---|---|---|---|---|---|---|---|---|
| HFO-1132 (E) | mass % | 57.2 | 48.5 | 41.2 | 35.6 | 32.0 | 28.9 | 58.2 | 45.5 | 38.4 |
| R32 | mass % | 10.0 | 18.3 | 27.6 | 36.8 | 44.2 | 51.7 | 0.0 | 5.0 | 10.0 |
| R1234yf | mass % | 31.5 | 31.9 | 29.9 | 26.3 | 22.6 | 18.1 | 40.5 | 48.2 | 50.3 |
| $CO_2$ | mass % | 1.3 | 1.3 | 1.3 | 1.3 | 1.3 | 1.3 | 1.3 | 1.3 | 1.3 |
| GWP | — | 69 | 125 | 188 | 250 | 300 | 350 | 2 | 36 | 70 |
| COP ratio | % (relative to R410A) | 98.9 | 98.8 | 98.9 | 99.1 | 99.3 | 99.6 | 99.5 | 99.8 | 99.8 |
| Refrigerating capacity ratio | % (relative to R410A) | 91.5 | 93.9 | 97.1 | 100.5 | 103.2 | 106.0 | 83.3 | 81.3 | 82.0 |
| Condensation glide | ° C. | 3.7 | 3.6 | 3.2 | 2.7 | 2.3 | 1.8 | 4.4 | 5.4 | 5.8 |

| Item | Unit | Example 37 | Example 38 N | Example 39 | Example 40 O | Example 41 | Example 42 P |
|---|---|---|---|---|---|---|---|
| HFO-1132(E) | mass % | 34.3 | 31.9 | 28.1 | 25.6 | 23.9 | 22.3 |
| R32 | mass % | 14.4 | 18.2 | 27.6 | 36.8 | 44.0 | 51.7 |
| R1234yf | mass % | 50.0 | 48.6 | 43.0 | 36.3 | 30.8 | 24.7 |
| $CO_2$ | mass % | 1.3 | 1.3 | 1.3 | 1.3 | 1.3 | 1.3 |
| GWP | — | 100 | 125 | 188 | 250 | 298 | 350 |
| COP ratio | % (relative to R410A) | 99.8 | 99.8 | 99.6 | 99.7 | 99.8 | 100.0 |
| Refrigerating capacity ratio | % (relative to R410A) | 83.5 | 85.2 | 90.3 | 95.4 | 99.0 | 102.7 |
| Condensation glide | ° C. | 6 | 5.4 | 4.5 | 3.5 | 2.9 | 2.3 |

TABLE 34

| 2.5% $CO_2$ | | | | | | | | | | |
|---|---|---|---|---|---|---|---|---|---|---|
| Item | Unit | Comp. Ex. 61 A | Comp. Ex. 62 B | Comp. Ex. 63 A' | Comp. Ex. 64 B' | Comp. Ex. 65 A" | Comp. Ex. 66 B" | Comp. Ex. 67 C | Comp. Ex. 68 D | Example 43 E |
| HFO-1132(E) | mass % | 79.1 | 0.0 | 60.6 | 0.0 | 45.7 | 0.0 | 46.2 | 0.0 | 20.9 |
| R32 | mass % | 18.4 | 18.1 | 36.9 | 36.6 | 51.8 | 51.6 | 0.0 | 33.2 | 18.2 |
| R1234yf | mass % | 0.0 | 79.4 | 0.0 | 60.9 | 0.0 | 45.9 | 51.3 | 64.3 | 58.4 |
| $CO_2$ | mass % | 2.5 | 2.5 | 2.5 | 2.5 | 2.5 | 2.5 | 2.5 | 2.5 | 2.5 |
| GWP | — | 125 | 125 | 250 | 250 | 350 | 350 | 3 | 227 | 125 |
| COP ratio | % (relative to R410A) | 97.4 | 102.7 | 97.6 | 101.5 | 98.3 | 101.3 | 99.6 | 101.6 | 100.2 |
| Refrigerating capacity ratio | % (relative to R410A) | 110.3 | 67.8 | 114.5 | 82.5 | 116.4 | 92.5 | 80.0 | 80.0 | 81.7 |
| Condensation glide | ° C. | 2.0 | 9.5 | 1.5 | 6.3 | 1.3 | 4.1 | 7.1 | 6.9 | 7.6 |
| Item | Unit | Comp. Ex. 69 I | Example 44 | Example 45 J | Example 46 | Example 47 K | Example 48 | Example 49 L | Comp. Ex. 70 M | Example 50 |
| HFO-1132(E) | mass % | 72.0 | 57.2 | 48.5 | 41.2 | 35.6 | 32.0 | 28.9 | 59.7 | 48.1 |
| R32 | mass % | 0.0 | 10.0 | 18.3 | 27.6 | 36.8 | 44.2 | 51.7 | 0.0 | 5.0 |
| R1234yf | mass % | 25.5 | 30.3 | 30.7 | 28.7 | 25.1 | 21.3 | 16.9 | 37.8 | 44.4 |
| $CO_2$ | mass % | 2.5 | 2.5 | 2.5 | 2.5 | 2.5 | 2.5 | 2.5 | 2.5 | 2.5 |
| GWP | — | 2 | 69 | 125 | 188 | 250 | 300 | 350 | 2 | 36 |
| COP ratio | % (relative to R410A) | 98.4 | 98.2 | 98.2 | 98.4 | 98.6 | 98.9 | 99.1 | 98.8 | 99.0 |
| Refrigerating capacity ratio | % (relative to R410A) | 93.1 | 94.5 | 96.7 | 99.8 | 103.1 | 105.9 | 108.6 | 87.1 | 85.7 |
| Condensation glide | ° C. | 4.4 | 4.7 | 4.5 | 3.9 | 3.3 | 2.8 | 2.4 | 5.6 | 6.3 |

| Item | Unit | Example 51 W | Example 52 | Example 53 N | Example 54 | Example 55 O | Example 56 | Example 57 P |
|---|---|---|---|---|---|---|---|---|
| HFO-1132(E) | mass % | 40.9 | 36.9 | 34.2 | 29.9 | 27.2 | 25.2 | 23.4 |
| R32 | mass % | 10.0 | 14.4 | 18.2 | 27.6 | 36.8 | 44.0 | 51.7 |
| R1234yf | mass % | 46.6 | 46.2 | 45. | 40.0 | 33.5 | 28.1 | 22.4 |
| $CO_2$ | mass % | 2.5 | 2.5 | 2.5 | 2.5 | 2.5 | 2.5 | 2.5 |
| GWP | — | 70 | 99 | 125 | 188 | 250 | 298 | 350 |
| COP ratio | % (relative to R410A) | 99.1 | 99.1 | 99.1 | 99.0 | 99.1 | 99.3 | 99.5 |
| Refrigerating capacity ratio | % (relative to R410A) | 86.2 | 87.7 | 89.2 | 94.0 | 98.8 | 102.4 | 105.8 |
| Condensation glide | ° C. | 6 | 6.3 | 6.0 | 5.0 | 4.0 | 3.4 | 2.8 |

TABLE 35

| 4% $CO_2$ | | | | | | | | | | |
|---|---|---|---|---|---|---|---|---|---|---|
| Item | Unit | Comp. Ex. 71 A | Comp. Ex. 72 B | Comp. Ex. 73 A' | Comp. Ex. 74 B' | Comp. Ex. 75 A" | Comp. Ex. 76 B" | Comp. Ex. 77 C | Comp. Ex. 78 D | Example 58 E |
| HFO-1132(E) | mass % | 77.6 | 0.0 | 59.1 | 0.0 | 44.2 | 0.0 | 39.5 | 0.0 | 14.7 |
| R32 | mass % | 18.4 | 18.1 | 36.9 | 36.6 | 51.8 | 51.6 | 0.0 | 28.9 | 18.1 |
| R1234yf | mass % | 0.0 | 77.9 | 0.0 | 59.4 | 0.0 | 44.4 | 56.5 | 67.1 | 63.2 |
| $CO_2$ | mass % | 4.0 | 4.0 | 4.0 | 4.0 | 4.0 | 4.0 | 4.0 | 4.0 | 4.0 |
| GWP | — | 125 | 125 | 250 | 249 | 350 | 350 | 3 | 198 | 125 |
| COP ratio | % (relative to R410A) | 96.7 | 102.2 | 97.0 | 101.0 | 97.7 | 100.8 | 99.4 | 101.3 | 100.4 |
| Refrigerating capacity ratio | % (relative to R410A) | 113.3 | 71.2 | 117.3 | 85.7 | 118.9 | 95.6 | 80.0 | 80.0 | 81.2 |
| Condensation glide | ° C. | 3.0 | 10.9 | 2.2 | 7.2 | 2.0 | 5.0 | 9.6 | 8.7 | 9.6 |
| Item | Unit | Comp. Ex. 79 I | Example 59 | Example 60 J | Example 61 | Example 62 K | Example 63 | Example 64 L | Comp. Ex. 80 M | Example 65 |
| HFO-1132(E) | mass % | 72.0 | 57.2 | 48.5 | 41.2 | 35.6 | 32.0 | 28.9 | 60.4 | 49.6 |
| R32 | mass % | 0.0 | 10.0 | 18.3 | 27.6 | 36.8 | 44.2 | 51.7 | 0.0 | 5.0 |
| R1234yf | mass % | 24.0 | 28.8 | 29.2 | 27.2 | 23.6 | 19.8 | 15.4 | 35.6 | 41.4 |
| $CO_2$ | mass % | 4.0 | 4.0 | 4.0 | 4.0 | 4.0 | 4.0 | 4.0 | 4.0 | 4.0 |
| GWP | — | 2 | 69 | 125 | 188 | 250 | 300 | 350 | 2 | 36 |

TABLE 35-continued

4% $CO_2$

| | | | | | | | | | | |
|---|---|---|---|---|---|---|---|---|---|---|
| COP ratio | % (relative to R410A) | 97.6 | 97.5 | 97.5 | 97.7 | 98.0 | 98.3 | 98.6 | 98.0 | 98.2 |
| Refrigerating capacity ratio | % (relative to R410A) | 97.0 | 98.1 | 100.2 | 103.2 | 106.5 | 109.1 | 111.8 | 91.3 | 90.2 |
| Condensation glide | ° C. | 5.8 | 5.8 | 5.4 | 4.7 | 4.0 | 3.5 | 3.1 | 6.9 | 7.4 |

| Item | Unit | Example 66 W | Example 67 | Example 68 N | Example 69 | Example 70 O | Example 71 | Example 72 P |
|---|---|---|---|---|---|---|---|---|
| HFO-1132(E) | mass % | 42.6 | 38.3 | 35.5 | 31.0 | 28.0 | 25.9 | 23.9 |
| R32 | mass % | 10.0 | 14.4 | 18.2 | 27.6 | 36.8 | 44.0 | 51.7 |
| R1234yf | mass % | 43.4 | 43.3 | 42.3 | 37.4 | 31.2 | 26.1 | 20.4 |
| $CO_2$ | mass % | 4.0 | 4.0 | 4.0 | 4.0 | 4.0 | 4.0 | 4.0 |
| GWP | — | 70 | 99 | 125 | 188 | 250 | 298 | 350 |
| COP ratio | % (relative to R410A) | 98.3 | 98.3 | 98.3 | 98.3 | 98.5 | 98.7 | 98.9 |
| Refrigerating capacity ratio | % (relative toR410A) | 90.7 | 92.0 | 93.4 | 97.9 | 102.5 | 105.9 | 109.3 |
| Condensation glide | ° C. | 7 | 7.2 | 6.9 | 5.8 | 4.7 | 4.0 | 3.4 |

TABLE 36

5.5% $CO_2$

| Item | Unit | Comp. Ex. 81 A | Comp. Ex. 82 B | Comp. Ex. 83 A' | Comp. Ex. 84 B' | Comp. Ex. 85 A" | Comp. Ex. 86 B" | Comp. Ex. 87 C | Comp. Ex. 88 D | Example 73 E |
|---|---|---|---|---|---|---|---|---|---|---|
| HFO-1132(E) | mass % | 76.1 | 0.0 | 57.6 | 0.0 | 42.7 | 0.0 | 33.0 | 0.0 | 8.8 |
| R32 | mass % | 18.4 | 18.1 | 36.9 | 36.6 | 51.8 | 51.6 | 0.0 | 24.7 | 18.1 |
| R1234yf | mass % | 0.0 | 76.4 | 0.0 | 57.9 | 0.0 | 42.9 | 61.5 | 69.8 | 67.6 |
| $CO_2$ | mass % | 5.5 | 5.5 | 5.5 | 5.5 | 5.5 | 5.5 | 5.5 | 5.5 | 5.5 |
| GWP | — | 125 | 125 | 250 | 249 | 350 | 350 | 3 | 170 | 125 |
| COP ratio | % (relative to R410A) | 96.0 | 101.8 | 96.4 | 100.5 | 97.2 | 100.3 | 99.4 | 101.2 | 100.6 |
| Refrigerating capacity ratio | % (relative to R410A) | 116.2 | 74.6 | 119.9 | 88.9 | 121.5 | 98.7 | 80.0 | 80.0 | 80.8 |
| Condensation glide | ° C. | 3.7 | 12.3 | 2.9 | 8.2 | 2.6 | 5.8 | 12.1 | 10.8 | 11.5 |

| Item | Unit | Comp. Ex. 89 I | Example 74 | Example 75 J | Example 76 | Example 77 K | Example 78 | Example 79 L | Comp. Ex. 90 M | Example 80 |
|---|---|---|---|---|---|---|---|---|---|---|
| HFO-1132(E) | mass % | 72.0 | 57.2 | 48.5 | 41.2 | 35.6 | 32.0 | 28.9 | 60.7 | 50.3 |
| R32 | mass % | 0.0 | 10.0 | 18.3 | 27.6 | 36.8 | 44.2 | 51.7 | 0.0 | 5.0 |
| R1234yf | mass % | 22.5 | 27.3 | 27.7 | 25.7 | 22.1 | 18.3 | 13.9 | 33.8 | 39.2 |
| $CO_2$ | mass % | 5.5 | 5.5 | 5.5 | 5.5 | 5.5 | 5.5 | 5.5 | 5.5 | 5.5 |
| GWP | — | 2 | 69 | 125 | 188 | 250 | 299 | 350 | 2 | 36 |
| COP ratio | % (relative to R410A) | 96.8 | 96.8 | 96.9 | 97.1 | 97.4 | 97.7 | 98.0 | 97.2 | 97.4 |
| Refrigerating capacity ratio | % (relative to R410A) | 100.9 | 101.8 | 103.8 | 106.6 | 109.8 | 112.4 | 115.0 | 95.4 | 94.3 |
| Condensation glide | ° C. | 6.9 | 6.7 | 6.2 | 5.4 | 4.7 | 4.1 | 3.7 | 8.1 | 8.5 |

| Item | Unit | Example 81 W | Example 82 | Example 83 N | Example 84 | Example 85 O | Example 86 | Example 87 P |
|---|---|---|---|---|---|---|---|---|
| HFO-1132(E) | mass % | 43.3 | 39.0 | 36.3 | 31.6 | 28.4 | 26.2 | 24.2 |
| R32 | mass % | 10.0 | 14.4 | 18.2 | 27.6 | 36.8 | 44.0 | 51.7 |
| R1234yf | mass % | 41.2 | 41.1 | 40.0 | 35.3 | 29.3 | 24.3 | 18.6 |
| $CO_2$ | mass % | 5.5 | 5.5 | 5.5 | 5.5 | 5.5 | 5.5 | 5.5 |
| GWP | — | 70 | 99 | 125 | 188 | 250 | 298 | 350 |
| COP ratio | % (relative to R410A) | 97.5 | 97.6 | 97.6 | 97.7 | 97.9 | 98.1 | 98.3 |
| Refrigerating capacity ratio | % (relative to R410A) | 94.7 | 95.9 | 97.4 | 101.6 | 106.1 | 109.3 | 112.6 |
| Condensation glide | ° C. | 8 | 8.1 | 7.6 | 6.5 | 5.4 | 4.7 | 4.0 |

TABLE 37

| 7% $CO_2$ | | | | | | | | | | |
|---|---|---|---|---|---|---|---|---|---|---|
| Item | Unit | Comp. Ex. 91 A | Comp. Ex. 92 B | Comp. Ex. 93 A' | Comp. Ex. 94 B' | Comp. Ex. 95 A" | Comp. Ex. 96 B" | Comp. Ex. 97 C | Comp. Ex. 98 D | Example 88 E |
| HFO-1132(E) | mass % | 74.6 | 0.0 | 56.1 | 0.0 | 41.2 | 0.0 | 26.8 | 0.0 | 3.1 |
| R32 | mass % | 18.4 | 18.1 | 36.9 | 36.6 | 51.8 | 51.6 | 0.0 | 20.5 | 18.1 |
| R1234yf | mass % | 0.0 | 74.9 | 0.0 | 56.4 | 0.0 | 41.4 | 66.2 | 72.5 | 71.8 |
| $CO_2$ | mass % | 7.0 | 7.0 | 7.0 | 7.0 | 7.0 | 7.0 | 7.0 | 7.0 | 7.0 |
| GWP | — | 125 | 125 | 250 | 249 | 350 | 350 | 3 | 141 | 125 |
| COP ratio | % (relative to R410A) | 95.3 | 101.3 | 95.8 | 100.0 | 96.7 | 99.8 | 99.5 | 101.1 | 100.9 |
| Refrigerating capacity ratio | % (relative to R410A) | 119.0 | 78.0 | 122.6 | 92.2 | 124.0 | 101.9 | 80.0 | 80.0 | 80.3 |
| Condensation glide | ° C. | 4.4 | 13.6 | 3.4 | 9.0 | 3.1 | 6.5 | 14.6 | 13.0 | 13.3 |
| Item | Unit | Comp. Ex. 99 I | Example 89 | Example 90 J | Example 91 | Example 92 K | Example 93 | Example 94 L | Comp. Ex. 100 M | Example 95 |
| HFO-1132(E) | mass % | 72.0 | 57.2 | 48.5 | 41.2 | 35.6 | 32.0 | 28.9 | 60.7 | 50.3 |
| R32 | mass % | 0.0 | 10.0 | 18.3 | 27.6 | 36.8 | 44.2 | 51.7 | 0.0 | 5.0 |
| R1234yf | mass % | 21.0 | 25.8 | 26.2 | 24.2 | 20.6 | 16.8 | 12.4 | 32.3 | 37.7 |
| $CO_2$ | mass % | 7.0 | 7.0 | 7.0 | 7.0 | 7.0 | 7.0 | 7.0 | 7.0 | 7.0 |
| GWP | — | 2 | 69 | 125 | 188 | 250 | 299 | 350 | 2 | 36 |
| COP ratio | % (relative to R410A) | 96.0 | 96.1 | 96.2 | 96.5 | 96.8 | 97.1 | 97.5 | 96.5 | 96.7 |
| Refrigerating capacity ratio | % (relative to R410A) | 104.7 | 105.5 | 107.3 | 110.0 | 113.1 | 115.6 | 118.2 | 99.2 | 98.0 |
| Condensation glide | ° C. | 7.9 | 7.5 | 6.9 | 6.0 | 5.3 | 4.7 | 4.2 | 9.2 | 9.4 |

| Item | Unit | Example 96 W | Example 97 | Example 98 N | Example 99 | Example 100 O | Example 101 | Example 102 P |
|---|---|---|---|---|---|---|---|---|
| HFO-1132(E) | mass % | 43.7 | 39.5 | 36.7 | 31.9 | 28.6 | 26.4 | 24.2 |
| R32 | mass % | 10.0 | 14.4 | 18.2 | 27.6 | 36.8 | 44.0 | 51.7 |
| R1234yf | mass % | 39.3 | 39.1 | 38.1 | 33.5 | 27.6 | 22.6 | 17.1 |
| $CO_2$ | mass % | 7.0 | 7.0 | 7.0 | 7.0 | 7.0 | 7.0 | 7.0 |
| GWP | — | 70 | 99 | 125 | 188 | 250 | 298 | 350 |
| COP ratio | % (relative to R410A) | 96.9 | 96.9 | 97.0 | 97.1 | 97.3 | 97.5 | 97.8 |
| Refrigerating capacity ratio | % (relative to R410A) | 98.6 | 99.7 | 101.1 | 105.2 | 109.5 | 112.7 | 115.8 |
| Condensation glide | ° C. | 9 | 8.8 | 8.4 | 7.1 | 6.0 | 5.2 | 4.6 |

TABLE 38

| Item | Unit | Comp. Ex. 101 | Comp. Ex. 102 | Comp. Ex. 103 | Example 103 | Example 104 | Comp. Ex. 104 | Comp. Ex. 105 | Comp. Ex. 106 |
|---|---|---|---|---|---|---|---|---|---|
| HFO-1132(E) | mass % | 10.0 | 10.0 | 10.0 | 10.0 | 10.0 | 10.0 | 10.0 | 10.0 |
| R32 | mass % | 78.8 | 68.8 | 58.8 | 48.8 | 38.8 | 28.8 | 18.8 | 8.8 |
| R1234yf | mass % | 10.0 | 20.0 | 30.0 | 40.0 | 50.0 | 60.0 | 70.0 | 80.0 |
| $CO_2$ | mass % | 1.2 | 1.2 | 1.2 | 1.2 | 1.2 | 1.2 | 1.2 | 1.2 |
| GWP | — | 532 | 465 | 398 | 331 | 264 | 197 | 130 | 63 |
| COP ratio | % (relative to R410A) | 101.3 | 101.2 | 101.1 | 101.0 | 101.0 | 101.3 | 102.0 | 102.8 |
| Refrigerating capacity ratio | % (relative to R410A) | 108.5 | 104.1 | 99.2 | 93.6 | 87.2 | 80.1 | 72.2 | 63.1 |
| Condensation glide | ° C. | 1.1 | 1.6 | 2.2 | 3.1 | 4.3 | 5.8 | 7.4 | 8.4 |
| Item | Unit | Comp. Ex. 107 | Comp. Ex. 108 | Example 105 | Example 106 | Example 107 | Comp. Ex. 109 | Comp. Ex. 110 | Comp. Ex. 111 |
| HFO-1132(E) | mass % | 20.0 | 20.0 | 20.0 | 20.0 | 20.0 | 20.0 | 20.0 | 30.0 |
| R32 | mass % | 68.8 | 58.8 | 48.8 | 38.8 | 28.8 | 18.8 | 8.8 | 58.8 |
| R1234yf | mass % | 10.0 | 20.0 | 30.0 | 40.0 | 50.0 | 60.0 | 70.0 | 10.0 |
| $CO_2$ | mass % | 1.2 | 1.2 | 1.2 | 1.2 | 1.2 | 1.2 | 1.2 | 1.2 |
| GWP | — | 465 | 398 | 331 | 264 | 197 | 130 | 62 | 398 |
| COP ratio | % (relative to R410A) | 100.6 | 100.5 | 100.4 | 100.3 | 100.4 | 100.9 | 101.8 | 100.0 |

TABLE 38-continued

| | | | | | | | | | |
|---|---|---|---|---|---|---|---|---|---|
| Refrigerating capacity ratio | % (relative to R410A) | 108.6 | 103.9 | 98.6 | 92.6 | 85.8 | 78.2 | 69.6 | 108.3 |
| Condensation glide | ° C. | 1.1 | 1.7 | 2.5 | 3.5 | 4.8 | 6.4 | 7.7 | 1.2 |

| Item | Unit | Example 108 | Example 109 | Example 110 | Example 111 | Comp. Ex. 112 | Comp. Ex. 113 | Comp. Ex. 114 | Example 112 |
|---|---|---|---|---|---|---|---|---|---|
| HFO-1132(E) | mass % | 30.0 | 30.0 | 30.0 | 30.0 | 30.0 | 40.0 | 40.0 | 40.0 |
| R32 | mass % | 48.8 | 38.8 | 28.8 | 18.8 | 8.8 | 48.8 | 38.8 | 28.8 |
| R1234yf | mass % | 20.0 | 30.0 | 40.0 | 50.0 | 60.0 | 10.0 | 20.0 | 30.0 |
| $CO_2$ | mass % | 1.2 | 1.2 | 1.2 | 1.2 | 1.2 | 1.2 | 1.2 | 1.2 |
| GWP | — | 331 | 263 | 196 | 129 | 62 | 330 | 263 | 196 |
| COP ratio | % (relative to R410A) | 99.9 | 99.8 | 99.8 | 100.1 | 100.8 | 99.4 | 99.3 | 99.3 |
| Refrigerating capacity ratio | % (relative to R410A) | 103.2 | 97.5 | 91.0 | 83.7 | 75.6 | 107.5 | 102.0 | 95.8 |
| Condensation glide | ° C. | 1.8 | 2.7 | 3.8 | 5.2 | 6.6 | 1.3 | 2.0 | 2.9 |

| Item | Unit | Example 113 | Example 114 | Comp. Ex. 115 | Comp. Ex. 116 | Comp. Ex. 117 | Example 115 | Comp. Ex. 118 | Comp. Ex. 119 |
|---|---|---|---|---|---|---|---|---|---|
| HFO-1132(E) | mass % | 40.0 | 40.0 | 50.0 | 50.0 | 50.0 | 50.0 | 60.0 | 60.0 |
| R32 | mass % | 18.8 | 8.8 | 38.8 | 28.8 | 18.8 | 8.8 | 28.8 | 18.8 |
| R1234yf | mass % | 40.0 | 50.0 | 10.0 | 20.0 | 30.0 | 40.0 | 10.0 | 20.0 |
| $CO_2$ | mass % | 1.2 | 1.2 | 1.2 | 1.2 | 1.2 | 1.2 | 1.2 | 1.2 |
| GWP | — | 129 | 62 | 263 | 196 | 129 | 62 | 195 | 128 |
| COP ratio | % (relative to R410A) | 99.5 | 100.0 | 99.0 | 98.9 | 99.0 | 99.4 | 98.7 | 98.7 |
| Refrigerating capacity ratio | % (relative to R410A) | 88.9 | 81.1 | 106.2 | 100.3 | 93.7 | 86.2 | 104.5 | 98.2 |
| Condensation glide | ° C. | 4.1 | 5.4 | 1.4 | 2.2 | 3.2 | 4.3 | 1.5 | 2.4 |

| Item | Unit | Comp. Ex. 120 | Comp. Ex. 121 | Comp. Ex. 122 | Comp. Ex. 123 | Example 116 | Example 117 | Example 118 | Example 119 |
|---|---|---|---|---|---|---|---|---|---|
| HFO-1132(E) | mass % | 60.0 | 70.0 | 70.0 | 80.0 | 15.0 | 15.0 | 15.0 | 15.0 |
| R32 | mass % | 8.8 | 18.8 | 8.8 | 8.8 | 48.8 | 46.3 | 43.8 | 41.3 |
| R1234yf | mass % | 30.0 | 10.0 | 20.0 | 10.0 | 35.0 | 37.5 | 40.0 | 42.5 |
| $CO_2$ | mass % | 1.2 | 1.2 | 1.2 | 1.2 | 1.2 | 1.2 | 1.2 | 1.2 |
| GWP | — | 61 | 128 | 61 | 61 | 331 | 314 | 297 | 281 |
| COP ratio | % (relative to R410A) | 99.0 | 98.5 | 98.8 | 98.6 | 100.7 | 100.7 | 100.6 | 100.6 |
| Refrigerating capacity ratio | % (relative to R410A) | 91.0 | 102.4 | 95.5 | 99.7 | 96.1 | 94.7 | 93.1 | 91.6 |
| Condensation glide | ° C. | 3.3 | 1.7 | 2.5 | 1.9 | 2.8 | 3.0 | 3.3 | 3.6 |

| Item | Unit | Example 120 | Example 121 | Example 122 | Example 123 | Example 124 | Example 125 | Example 126 | Example 127 |
|---|---|---|---|---|---|---|---|---|---|
| HFO-1132(E) | mass % | 15.0 | 15.0 | 15.0 | 15.0 | 15.0 | 17.5 | 17.5 | 17.5 |
| R32 | mass % | 38.8 | 36.3 | 33.8 | 31.3 | 28.8 | 48.8 | 46.3 | 43.8 |
| R1234yf | mass % | 45.0 | 47.5 | 50.0 | 52.5 | 55.0 | 32.5 | 35.0 | 37.5 |
| $CO_2$ | mass % | 1.2 | 1.2 | 1.2 | 1.2 | 1.2 | 1.2 | 1.2 | 1.2 |
| GWP | — | 264 | 247 | 230 | 214 | 197 | 331 | 314 | 297 |
| COP ratio | % (relative to R410A) | 100.6 | 100.7 | 100.7 | 100.7 | 100.8 | 100.5 | 100.5 | 100.5 |
| Refrigerating capacity ratio | % (relative to R410A) | 89.9 | 88.3 | 86.6 | 84.8 | 83.0 | 97.4 | 95.9 | 94.4 |
| Condensation glide | ° C. | 3.9 | 4.2 | 4.6 | 4.9 | 5.3 | 2.6 | 2.9 | 3.1 |

TABLE 39

| Item | Unit | Example 128 | Example 129 | Example 130 | Example 131 | Example 132 | Example 133 | Example 134 | Example 135 |
|---|---|---|---|---|---|---|---|---|---|
| HFO-1132(E) | mass % | 17.5 | 17.5 | 17.5 | 17.5 | 17.5 | 17.5 | 17.5 | 20.0 |
| R32 | mass % | 41.3 | 38.8 | 36.3 | 33.8 | 31.3 | 28.8 | 26.3 | 46.3 |
| R1234yf | mass % | 40.0 | 42.5 | 45.0 | 47.5 | 50.0 | 52.5 | 55.0 | 32.5 |
| $CO_2$ | mass % | 1.2 | 1.2 | 1.2 | 1.2 | 1.2 | 1.2 | 1.2 | 1.2 |
| GWP | — | 281 | 264 | 247 | 230 | 213 | 197 | 180 | 314 |
| COP ratio | % (relative to R410A) | 100.5 | 100.5 | 100.5 | 100.5 | 100.6 | 100.6 | 100.7 | 100.4 |
| Refrigerating capacity ratio | % (relative to R410A) | 92.9 | 91.3 | 89.6 | 87.9 | 86.2 | 84.4 | 82.6 | 97.1 |
| Condensation glide | ° C. | 3.4 | 3.7 | 4.0 | 4.3 | 4.7 | 5.1 | 5.4 | 2.7 |

TABLE 39-continued

| Item | Unit | Example 136 | Example 137 | Example 138 | Example 139 | Example 140 | Example 141 | Example 142 | Example 143 |
|---|---|---|---|---|---|---|---|---|---|
| HFO-1132(E) | mass % | 20.0 | 20.0 | 20.0 | 20.0 | 20.0 | 20.0 | 22.5 | 22.5 |
| R32 | mass % | 43.8 | 41.3 | 36.3 | 33.8 | 31.3 | 26.3 | 46.3 | 43.8 |
| R1234yf | mass % | 35.0 | 37.5 | 42.5 | 45.0 | 47.5 | 52.5 | 30.0 | 32.5 |
| $CO_2$ | mass % | 1.2 | 1.2 | 1.2 | 1.2 | 1.2 | 1.2 | 1.2 | 1.2 |
| GWP | — | 297 | 280 | 247 | 230 | 213 | 180 | 314 | 297 |
| COP ratio | % (relative to R410A) | 100.3 | 100.3 | 100.3 | 100.3 | 100.4 | 100.5 | 100.2 | 100.2 |
| Refrigerating capacity ratio | % (relative to R410A) | 95.7 | 94.1 | 90.9 | 89.3 | 87.5 | 84.0 | 98.4 | 96.9 |
| Condensation glide | ° C. | 2.9 | 3.2 | 3.8 | 4.1 | 4.4 | 5.2 | 2.5 | 2.7 |

| Item | Unit | Example 144 | Example 145 | Example 146 | Example 147 | Example 148 | Example 149 | Example 150 | Example 151 |
|---|---|---|---|---|---|---|---|---|---|
| HFO-1132(E) | mass % | 22.5 | 22.5 | 22.5 | 22.5 | 22.5 | 22.5 | 22.5 | 22.5 |
| R32 | mass % | 41.3 | 38.8 | 36.3 | 33.8 | 31.3 | 28.8 | 26.3 | 23.8 |
| R1234yf | mass % | 35.0 | 37.5 | 40.0 | 42.5 | 45.0 | 47.5 | 50.0 | 52.5 |
| $CO_2$ | mass % | 1.2 | 1.2 | 1.2 | 1.2 | 1.2 | 1.2 | 1.2 | 1.2 |
| GWP | — | 280 | 264 | 247 | 230 | 213 | 197 | 180 | 163 |
| COP ratio | % (relative to R410A) | 100.2 | 100.2 | 100.2 | 100.2 | 100.2 | 100.3 | 100.3 | 100.4 |
| Refrigerating capacity ratio | % (relative to R410A) | 95.4 | 93.8 | 92.2 | 90.6 | 88.9 | 87.1 | 85.3 | 83.5 |
| Condensation glide | ° C. | 3.0 | 3.3 | 3.6 | 3.9 | 4.2 | 4.5 | 4.9 | 5.3 |

| Item | Unit | Example 152 | Example 153 | Example 154 | Example 155 | Example 156 | Example 157 | Example 158 | Example 159 |
|---|---|---|---|---|---|---|---|---|---|
| HFO-1132(E) | mass % | 25.0 | 25.0 | 25.0 | 25.0 | 25.0 | 25.0 | 27.5 | 27.5 |
| R32 | mass % | 33.8 | 31.3 | 28.8 | 26.3 | 23.8 | 21.3 | 21.9 | 21.9 |
| R1234yf | mass % | 40.0 | 42.5 | 45.0 | 47.5 | 50.0 | 52.5 | 45.0 | 47.5 |
| $CO_2$ | mass % | 1.2 | 1.2 | 1.2 | 1.2 | 1.2 | 1.2 | 1.2 | 1.2 |
| GWP | — | 230 | 213 | 196 | 180 | 163 | 146 | 150 | 150 |
| COP ratio | % (relative to 410A) | 100.0 | 100.0 | 100.1 | 100.1 | 100.2 | 100.3 | 100.0 | 100.1 |
| Refrigerating capacity ratio | % (relative to 410A) | 91.8 | 90.2 | 88.4 | 86.7 | 84.8 | 83.0 | 86.3 | 85.4 |
| Condensation glide | ° C. | 3.6 | 4.0 | 4.3 | 4.7 | 5.0 | 5.4 | 4.8 | 4.9 |

| Item | Unit | Example 160 | Example 161 | Example 162 | Example 163 | Example 164 |
|---|---|---|---|---|---|---|
| HFO-1132(E) | mass % | 27.5 | 27.5 | 30.0 | 32.0 | 34.0 |
| R32 | mass % | 21.9 | 21.9 | 21.9 | 21.9 | 13.8 |
| R1234yf | mass % | 50.0 | 52.5 | 52.5 | 51.0 | 51.0 |
| $CO_2$ | mass % | 1.2 | 1.2 | 1.2 | 1.2 | 1.2 |
| GWP | — | 150 | 150 | 150 | 150 | 96 |
| COP ratio | % (relative to R410A) | 100.1 | 100.2 | 100.1 | 100.0 | 100.1 |
| Refrigerating capacity ratio | % (relative to R410A) | 84.5 | 83.7 | 84.2 | 85.1 | 82.0 |
| Condensation glide | ° C. | 5.1 | 5.2 | 5.0 | 4.9 | 5.5 |

TABLE 40

| Item | Unit | Comp. Ex. 125 | Comp. Ex. 126 | Comp. Ex. 127 | Example 166 | Example 167 | Example 168 | Comp. Ex. 128 | Comp. Ex. 129 |
|---|---|---|---|---|---|---|---|---|---|
| HFO-1132(E) | mass % | 10.0 | 10.0 | 10.0 | 10.0 | 10.0 | 10.0 | 10.0 | 10.0 |
| R32 | mass % | 77.5 | 67.5 | 57.5 | 47.5 | 37.5 | 27.5 | 17.5 | 7.5 |
| R1234yf | mass % | 10.0 | 20.0 | 30.0 | 40.0 | 50.0 | 60.0 | 70.0 | 80.0 |
| $CO_2$ | mass % | 2.5 | 2.5 | 2.5 | 2.5 | 2.5 | 2.5 | 2.5 | 2.5 |
| GWP | — | 524 | 457 | 389 | 322 | 255 | 188 | 121 | 54 |
| COP ratio | % (relative to R410A) | 100.9 | 100.8 | 100.6 | 100.5 | 100.5 | 100.9 | 101.6 | 102.4 |
| Refrigerating capacity ratio | % (relative to R410A) | 110.6 | 106.2 | 101.2 | 95.5 | 89.1 | 81.9 | 74.0 | 64.8 |
| Condensation glide | ° C. | 1.8 | 2.3 | 3.0 | 4.0 | 5.3 | 7.0 | 8.8 | 10.1 |

| Item | Unit | Comp. Ex. 130 | Comp. Ex. 131 | Example 169 | Example 170 | Example 171 | Comp. Ex. 132 | Comp. Ex. 133 | Comp. Ex. 134 |
|---|---|---|---|---|---|---|---|---|---|
| HFO-1132(E) | mass % | 20.0 | 20.0 | 20.0 | 20.0 | 20.0 | 20.0 | 20.0 | 30.0 |
| R32 | mass % | 67.5 | 57.5 | 47.5 | 37.5 | 27.5 | 17.5 | 7.5 | 57.5 |

TABLE 40-continued

| | | | | | | | | | |
|---|---|---|---|---|---|---|---|---|---|
| R1234yf | mass % | 10.0 | 20.0 | 30.0 | 40.0 | 50.0 | 60.0 | 70.0 | 10.0 |
| $CO_2$ | mass % | 2.5 | 2.5 | 2.5 | 2.5 | 2.5 | 2.5 | 2.5 | 2.5 |
| GWP | — | 456 | 389 | 322 | 255 | 188 | 121 | 54 | 389 |
| COP ratio | % (relative to R410A) | 100.1 | 100.0 | 99.9 | 99.8 | 100.0 | 100.5 | 101.3 | 99.5 |
| Refrigerating capacity ratio | % (relative to R410A) | 110.7 | 106.0 | 100.6 | 94.5 | 87.7 | 80.1 | 71.5 | 110.4 |
| Condensation glide | ° C. | 1.8 | 2.5 | 3.3 | 4.4 | 5.9 | 7.7 | 9.3 | 1.9 |

| Item | Unit | Example 172 | Example 173 | Example 174 | Example 175 | Comp. Ex. 135 | Comp. Ex. 136 | Comp. Ex. 137 | Example 176 |
|---|---|---|---|---|---|---|---|---|---|
| HFO-1132(E) | mass % | 30.0 | 30.0 | 30.0 | 30.0 | 30.0 | 40.0 | 40.0 | 40.0 |
| R32 | mass % | 47.5 | 37.5 | 27.5 | 17.5 | 7.5 | 47.5 | 37.5 | 27.5 |
| R1234yf | mass % | 20.0 | 30.0 | 40.0 | 50.0 | 60.0 | 10.0 | 20.0 | 30.0 |
| $CO_2$ | mass % | 2.5 | 2.5 | 2.5 | 2.5 | 2.5 | 2.5 | 2.5 | 2.5 |
| GWP | — | 322 | 255 | 188 | 120 | 53 | 321 | 254 | 187 |
| COP ratio | % (relative to R410A) | 99.3 | 99.2 | 99.3 | 99.6 | 100.3 | 98.9 | 98.8 | 98.7 |
| Refrigerating capacity ratio | % (relative to R410A) | 105.3 | 99.5 | 93.0 | 85.7 | 77.5 | 109.6 | 104.1 | 97.9 |
| Condensation glide | ° C. | 2.6 | 3.6 | 4.8 | 6.4 | 8.1 | 2.0 | 2.8 | 3.9 |

| Item | Unit | Example 177 | Example 178 | Comp. Ex. 138 | Comp. Ex. 139 | Comp. Ex. 140 | Example 179 | Comp. Ex. 141 | Comp. Ex. 142 |
|---|---|---|---|---|---|---|---|---|---|
| HFO-1132(E) | mass % | 40.0 | 40.0 | 50.0 | 50.0 | 50.0 | 50.0 | 60.0 | 60.0 |
| R32 | mass % | 17.5 | 7.5 | 37.5 | 27.5 | 17.5 | 7.5 | 27.5 | 17.5 |
| R1234yf | mass % | 40.0 | 50.0 | 10.0 | 20.0 | 30.0 | 40.0 | 10.0 | 20.0 |
| $CO_2$ | mass % | 2.5 | 2.5 | 2.5 | 2.5 | 2.5 | 2.5 | 2.5 | 2.5 |
| GWP | — | 120 | 53 | 254 | 187 | 120 | 53 | 187 | 120 |
| COP ratio | % (relative to R410A) | 98.9 | 99.4 | 98.4 | 98.3 | 98.4 | 98.8 | 98.0 | 98.1 |
| Refrigerating capacity ratio | % (relative to R410A) | 91.0 | 83.1 | 108.4 | 102.5 | 95.9 | 88.4 | 106.8 | 100.4 |
| Condensation glide | ° C. | 5.3 | 6.8 | 2.2 | 3.1 | 4.3 | 5.6 | 2.4 | 3.4 |

| Item | Unit | Example 180 | Comp. Ex. 143 | Comp. Ex. 144 | Comp. Ex. 145 | Example 181 | Example 182 | Example 183 | Example 184 |
|---|---|---|---|---|---|---|---|---|---|
| HFO-1132 (E) | mass % | 60.0 | 70.0 | 70.0 | 80.0 | 15.0 | 15.0 | 15.0 | 15.0 |
| R32 | mass % | 7.5 | 17.5 | 7.5 | 7.5 | 50.0 | 47.5 | 45.0 | 42.5 |
| R1234yf | mass % | 30.0 | 10.0 | 20.0 | 10.0 | 32.5 | 35.0 | 37.5 | 40.0 |
| $CO_2$ | mass % | 2.5 | 2.5 | 2.5 | 2.5 | 2.5 | 2.5 | 2.5 | 2.5 |
| GWP | — | 52 | 119 | 52 | 52 | 339 | 322 | 305 | 289 |
| COP ratio | % (relative to R410A) | 98.4 | 97.9 | 98.1 | 98.0 | 100.2 | 100.2 | 100.2 | 100.2 |
| Refrigerating capacity ratio | % (relative to R410A) | 93.3 | 104.7 | 97.8 | 102.1 | 99.6 | 98.1 | 96.6 | 95.1 |
| Condensation glide | ° C. | 4.6 | 2.7 | 3.8 | 3.0 | 3.4 | 3.6 | 3.9 | 4.2 |

| Item | Unit | Example 185 | Example 186 | Example 187 | Example 188 | Example 189 | Example 190 | Example 191 | Example 192 |
|---|---|---|---|---|---|---|---|---|---|
| HFO-1132(E) | mass % | 15.0 | 15.0 | 15.0 | 15.0 | 15.0 | 15.0 | 15.0 | 17.5 |
| R32 | mass % | 40.0 | 37.5 | 35.0 | 32.5 | 30.0 | 27.5 | 25.0 | 50.0 |
| R1234yf | mass % | 42.5 | 45.0 | 47.5 | 50.0 | 52.5 | 55.0 | 57.5 | 30.0 |
| $CO_2$ | mass % | 2.5 | 2.5 | 2.5 | 2.5 | 2.5 | 2.5 | 2.5 | 2.5 |
| GWP | — | 272 | 255 | 238 | 222 | 205 | 188 | 171 | 339 |
| COP ratio | % (relative to R410A) | 100.2 | 100.2 | 100.2 | 100.2 | 100.3 | 100.4 | 100.5 | 100.1 |
| Refrigerating capacity ratio | % (relative to R410A) | 93.5 | 91.9 | 90.2 | 88.5 | 86.7 | 84.9 | 83.0 | 100.8 |
| Condensation glide | ° C. | 4.5 | 4.8 | 5.2 | 5.6 | 6.0 | 6.4 | 6.9 | 3.2 |

TABLE 41

| Item | Unit | Example 193 | Example 194 | Example 195 | Example 196 | Example 197 | Example 198 | Example 199 | Example 200 |
|---|---|---|---|---|---|---|---|---|---|
| HFO-1132(E) | mass % | 17.5 | 17.5 | 17.5 | 17.5 | 17.5 | 17.5 | 17.5 | 17.5 |
| R32 | mass % | 47.5 | 45.0 | 42.5 | 40.0 | 37.5 | 35.0 | 32.5 | 30.0 |
| R1234yf | mass % | 32.5 | 35.0 | 37.5 | 40.0 | 42.5 | 45.0 | 47.5 | 50.0 |
| $CO_2$ | mass % | 2.5 | 2.5 | 2.5 | 2.5 | 2.5 | 2.5 | 2.5 | 2.5 |
| GWP | — | 322 | 305 | 289 | 272 | 255 | 238 | 221 | 205 |
| COP ratio | % (relative to R410A) | 100.0 | 100.0 | 100.0 | 100.0 | 100.0 | 100.0 | 100.0 | 100.1 |

TABLE 41-continued

| | | | | | | | | | |
|---|---|---|---|---|---|---|---|---|---|
| Refrigerating capacity ratio | % (relative to R410A) | 99.4 | 97.9 | 96.4 | 94.8 | 93.2 | 91.5 | 89.8 | 88.1 |
| Condensation glide | ° C. | 3.5 | 3.7 | 4.0 | 4.3 | 4.6 | 5.0 | 5.3 | 5.7 |

| Item | Unit | Example 201 | Example 202 | Example 203 | Example 204 | Example 205 | Example 206 | Example 207 | Example 208 |
|---|---|---|---|---|---|---|---|---|---|
| HFO-1132(E) | mass % | 17.5 | 17.5 | 17.5 | 20.0 | 20.0 | 20.0 | 20.0 | 20.0 |
| R32 | mass % | 27.5 | 25.0 | 22.5 | 50.0 | 45.0 | 42.5 | 40.0 | 35.0 |
| R1234yf | mass % | 52.5 | 55.0 | 57.5 | 27.5 | 32.5 | 35.0 | 37.5 | 42.5 |
| $CO_2$ | mass % | 2.5 | 2.5 | 2.5 | 2.5 | 2.5 | 2.5 | 2.5 | 2.5 |
| GWP | — | 188 | 171 | 154 | 339 | 305 | 289 | 272 | 238 |
| COP ratio | % (relative to R410A) | 100.2 | 100.3 | 100.4 | 99.9 | 99.9 | 99.8 | 99.8 | 99.8 |
| Refrigerating capacity ratio | % (relative to R410A) | 86.3 | 84.4 | 82.6 | 102.0 | 99.2 | 97.7 | 96.1 | 92.9 |
| Condensation glide | ° C. | 6.2 | 6.6 | 7.0 | 3.1 | 3.5 | 3.8 | 4.1 | 4.7 |

| Item | Unit | Example 209 | Example 210 | Example 211 | Example 212 | Example 213 | Example 214 | Example 215 | Example 216 |
|---|---|---|---|---|---|---|---|---|---|
| HFO-1132(E) | mass % | 20.0 | 20.0 | 20.0 | 20.0 | 20.0 | 22.5 | 22.5 | 22.5 |
| R32 | mass % | 32.5 | 30.0 | 25.0 | 22.5 | 20.0 | 50.0 | 47.5 | 45.0 |
| R1234yf | mass % | 45.0 | 47.5 | 52.5 | 55.0 | 57.5 | 25.0 | 27.5 | 30.0 |
| $CO_2$ | mass % | 2.5 | 2.5 | 2.5 | 2.5 | 2.5 | 2.5 | 2.5 | 2.5 |
| GWP | — | 221 | 205 | 171 | 154 | 138 | 339 | 322 | 305 |
| COP ratio | % (relative to R410A) | 99.8 | 99.9 | 100.0 | 100.2 | 100.3 | 99.8 | 99.7 | 99.7 |
| Refrigerating capacity ratio | % (relative to R410A) | 91.2 | 89.5 | 85.9 | 84.0 | 82.1 | 103.2 | 101.8 | 100.4 |
| Condensation glide | ° C. | 5.1 | 5.5 | 6.3 | 6.7 | 7.2 | 2.9 | 3.1 | 3.4 |

| Item | Unit | Example 217 | Example 218 | Example 219 | Example 220 | Example 221 | Example 222 | Example 223 | Example 224 |
|---|---|---|---|---|---|---|---|---|---|
| HFO-1132(E) | mass % | 22.5 | 22.5 | 22.5 | 22.5 | 22.5 | 22.5 | 22.5 | 22.5 |
| R32 | mass % | 42.5 | 40.0 | 37.5 | 35.0 | 32.5 | 30.0 | 27.5 | 25.0 |
| R1234yf | mass % | 32.5 | 35.0 | 37.5 | 40.0 | 42.5 | 45.0 | 47.5 | 50.0 |
| $CO_2$ | mass % | 2.5 | 2.5 | 2.5 | 2.5 | 2.5 | 2.5 | 2.5 | 2.5 |
| GWP | — | 288 | 272 | 255 | 238 | 221 | 205 | 188 | 171 |
| COP ratio | % (relative to R410A) | 99.7 | 99.7 | 99.7 | 99.7 | 99.7 | 99.7 | 99.8 | 99.8 |
| Refrigerating capacity ratio | % (relative to R410A) | 98.9 | 97.4 | 95.8 | 94.2 | 92.5 | 90.8 | 89.0 | 87.2 |
| Condensation glide | ° C. | 3.6 | 3.9 | 4.2 | 4.5 | 4.9 | 5.2 | 5.6 | 6.0 |

| Item | Unit | Example 225 | Example 226 | Example 227 | Example 228 | Example 229 | Example 230 | Example 231 | Example 232 |
|---|---|---|---|---|---|---|---|---|---|
| HFO-1132(E) | mass % | 22.5 | 22.5 | 22.5 | 25.0 | 25.0 | 25.0 | 25.0 | 25.0 |
| R32 | mass % | 22.5 | 20.0 | 17.5 | 40.0 | 37.5 | 35.0 | 32.5 | 30.0 |
| R1234yf | mass % | 52.5 | 55.0 | 57.5 | 32.5 | 35.0 | 37.5 | 40.0 | 42.5 |
| $CO_2$ | mass % | 2.5 | 2.5 | 2.5 | 2.5 | 2.5 | 2.5 | 2.5 | 2.5 |
| GWP | — | 154 | 137 | 121 | 272 | 255 | 238 | 221 | 204 |
| COP ratio | % (relative to R410A) | 99.9 | 100.1 | 100.2 | 99.5 | 99.5 | 99.5 | 99.5 | 99.5 |
| Refrigerating capacity ratio | % (relative to R410A) | 85.4 | 83.5 | 81.5 | 98.6 | 97.1 | 95.5 | 93.8 | 92.1 |
| Condensation glide | ° C. | 6.5 | 6.9 | 7.3 | 3.7 | 4.0 | 4.3 | 4.6 | 5.0 |

| Item | Unit | Example 233 | Example 234 | Example 235 | Example 236 | Example 237 | Example 238 | Example 239 | Example 240 |
|---|---|---|---|---|---|---|---|---|---|
| HFO-1132(E) | mass % | 25.0 | 25.0 | 25.0 | 25.0 | 25.0 | 27.5 | 27.5 | 27.5 |
| R32 | mass % | 27.5 | 25.0 | 22.5 | 20.0 | 17.5 | 32.5 | 30.0 | 27.5 |
| R1234yf | mass % | 45.0 | 47.5 | 50.0 | 52.5 | 55.0 | 37.5 | 40.0 | 42.5 |
| $CO_2$ | mass % | 2.5 | 2.5 | 2.5 | 2.5 | 2.5 | 2.5 | 2.5 | 2.5 |
| GWP | — | 188 | 171 | 154 | 137 | 121 | 221 | 204 | 188 |
| COP ratio | % (relative to R410A) | 99.6 | 99.6 | 99.7 | 99.9 | 100.0 | 99.4 | 99.4 | 99.4 |
| Refrigerating capacity ratio | % (relative to R410A) | 90.4 | 88.6 | 86.8 | 84.9 | 83.0 | 95.1 | 93.4 | 91.7 |
| Condensation glide | ° C. | 5.4 | 5.7 | 6.2 | 6.6 | 7.0 | 4.4 | 4.7 | 5.1 |

TABLE 42

| Item | Unit | Example 241 | Example 242 | Example 243 | Example 244 | Example 245 | Example 246 | Example 247 | Example 248 |
|---|---|---|---|---|---|---|---|---|---|
| HFO-1132(E) | mass % | 27.5 | 27.5 | 27.5 | 27.5 | 27.5 | 30.0 | 30.0 | 30.0 |
| R32 | mass % | 25.0 | 22.5 | 20.0 | 17.5 | 15.0 | 25.0 | 22.5 | 20.0 |
| R1234yf | mass % | 45.0 | 47.5 | 50.0 | 52.5 | 55.0 | 42.5 | 45.0 | 47.5 |
| $CO_2$ | mass % | 2.5 | 2.5 | 2.5 | 2.5 | 2.5 | 2.5 | 2.5 | 2.5 |
| GWP | — | 171 | 154 | 137 | 121 | 104 | 171 | 154 | 137 |
| COP ratio | % (relative to R410A) | 99.5 | 99.5 | 99.6 | 99.8 | 99.9 | 99.3 | 99.4 | 99.5 |
| Refrigerating capacity ratio | % (relative to R410A) | 89.9 | 88.1 | 86.3 | 84.3 | 82.4 | 91.3 | 89.5 | 87.6 |
| Condensation glide | ° C. | 5.5 | 5.9 | 6.3 | 6.7 | 7.2 | 5.2 | 5.6 | 6.0 |

| Item | Unit | Example 249 | Example 250 | Example 251 | Example 252 | Example 253 | Example 254 | Example 255 | Example 256 |
|---|---|---|---|---|---|---|---|---|---|
| HFO-1132(E) | mass % | 30.0 | 30.0 | 32.5 | 32.5 | 32.5 | 32.5 | 35.0 | 35.0 |
| R32 | mass % | 15.0 | 12.5 | 20.0 | 17.5 | 15.0 | 12.5 | 15.0 | 12.5 |
| R1234yf | mass % | 52.5 | 55.0 | 45.0 | 47.5 | 50.0 | 52.5 | 47.5 | 50.0 |
| $CO_2$ | mass % | 2.5 | 2.5 | 2.5 | 2.5 | 2.5 | 2.5 | 2.5 | 2.5 |
| GWP | — | 104 | 87 | 137 | 120 | 104 | 87 | 104 | 87 |
| COP ratio | % (relative to R410A) | 99.7 | 99.9 | 99.3 | 99.4 | 99.5 | 99.7 | 99.3 | 99.5 |
| Refrigerating capacity ratio | % (relative to R410A) | 83.8 | 81.8 | 88.9 | 87.1 | 85.1 | 83.1 | 86.5 | 84.5 |
| Condensation glide | ° C. | 6.8 | 7.3 | 5.7 | 6.1 | 6.5 | 7.0 | 6.2 | 6.6 |

| Item | Unit | Example 257 | Example 258 | Example 259 | Example 260 | Example 261 | Example 262 | Example 263 | Example 264 |
|---|---|---|---|---|---|---|---|---|---|
| HFO-1132(E) | mass % | 35.0 | 37.5 | 37.5 | 37.5 | 40.0 | 40.0 | 42.5 | 42.5 |
| R32 | mass % | 10.0 | 12.5 | 10.0 | 7.5 | 10.0 | 5.0 | 7.5 | 5.0 |
| R1234yf | mass % | 52.5 | 47.5 | 50.0 | 52.5 | 47.5 | 52.5 | 47.5 | 50.0 |
| $CO_2$ | mass % | 2.5 | 2.5 | 2.5 | 2.5 | 2.5 | 2.5 | 2.5 | 2.5 |
| GWP | — | 70 | 87 | 70 | 53 | 70 | 36 | 53 | 36 |
| COP ratio | % (relative to R410A) | 99.6 | 99.3 | 99.4 | 99.6 | 99.3 | 99.6 | 99.3 | 99.4 |
| Refrigerating capacity ratio | % (relative to R410A) | 82.5 | 85.8 | 83.8 | 81.8 | 85.2 | 81.0 | 845 | 82.4 |
| Condensation glide | ° C. | 7.1 | 6.3 | 6.7 | 7.1 | 6.4 | 7.2 | 6.5 | 6.9 |

| Item | Unit | Example 265 | Example 266 | Example 267 | Example 268 | Example 269 | Example 270 | Example 271 |
|---|---|---|---|---|---|---|---|---|
| HFO-1132(E) | mass % | 45.0 | 45.0 | 47.5 | 47.5 | 50.0 | 52.5 | 55.0 |
| R32 | mass % | 5.0 | 2.5 | 4.0 | 1.5 | 2.5 | 1.5 | 1.0 |
| R1234yf | mass % | 47.5 | 50.0 | 46.0 | 48.5 | 45.0 | 43.5 | 41.5 |
| $CO_2$ | mass % | 2.5 | 2.5 | 2.5 | 2.5 | 2.5 | 2.5 | 2.5 |
| GWP | — | 36 | 19 | 29 | 13 | 19 | 12 | 9 |
| COP ratio | % (relative to R410A) | 99.3 | 99.4 | 99.2 | 99.3 | 99.1 | 99.1 | 99.0 |
| Refrigerating capacity ratio | % (relative to R410A) | 83.7 | 81.6 | 84.2 | 82.0 | 84.2 | 84.7 | 85.6 |
| Condensation glide | ° C. | 6.6 | 6.9 | 6.4 | 6.7 | 6.3 | 6.2 | 5.9 |

TABLE 43

| Item | Unit | Comp. Ex. 146 | Comp. Ex. 147 | Comp. Ex. 148 | Example 272 | Example 273 | Example 274 | Comp. Ex. 149 | Comp. Ex. 150 |
|---|---|---|---|---|---|---|---|---|---|
| HFO-1132(E) | mass % | 10.0 | 10.0 | 10.0 | 10.0 | 10.0 | 10.0 | 10.0 | 10.0 |
| R32 | mass % | 76.0 | 66.0 | 56.0 | 46.0 | 36.0 | 26.0 | 16.0 | 6.0 |
| R1234yf | mass % | 10.0 | 20.0 | 30.0 | 40.0 | 50.0 | 60.0 | 70.0 | 80.0 |
| $CO_2$ | mass % | 4.0 | 4.0 | 4.0 | 4.0 | 4.0 | 4.0 | 4.0 | 4.0 |

TABLE 43-continued

| | | | | | | | | | |
|---|---|---|---|---|---|---|---|---|---|
| GWP | — | 514 | 446 | 379 | 312 | 245 | 178 | 111 | 44 |
| COP ratio | % (relative to R410A) | 100.3 | 100.2 | 100.1 | 100.0 | 100.0 | 100.4 | 101.2 | 102.0 |
| Refrigerating capacity ratio | % (relative to R410A) | 113.0 | 108.6 | 103.5 | 97.8 | 91.3 | 84.1 | 76.1 | 66.8 |
| Condensation glide | ° C. | 2.5 | 3.1 | 3.9 | 5.0 | 6.4 | 8.3 | 10.4 | 12.2 |

| Item | Unit | Comp. Ex. 146 | Comp. Ex. 147 | Example 275 | Example 276 | Example 277 | Example 278 | Comp. Ex. 153 | Comp. Ex. 154 |
|---|---|---|---|---|---|---|---|---|---|
| HFO-1132(E) | mass % | 20.0 | 20.0 | 20.0 | 20.0 | 20.0 | 20.0 | 20.0 | 30.0 |
| R32 | mass % | 66.0 | 56.0 | 46.0 | 36.0 | 26.0 | 16.0 | 6.0 | 56.0 |
| R1234yf | mass % | 10.0 | 20.0 | 30.0 | 40.0 | 50.0 | 60.0 | 70.0 | 10.0 |
| $CO_2$ | mass % | 4.0 | 4.0 | 4.0 | 4.0 | 4.0 | 4.0 | 4.0 | 4.0 |
| GWP | — | 446 | 379 | 312 | 245 | 178 | 111 | 44 | 379 |
| COP ratio | % (relative to R410A) | 99.6 | 99.5 | 99.3 | 99.2 | 99.4 | 100.0 | 100.9 | 98.9 |
| Refrigerating capacity ratio | % (relative to R410A) | 113.1 | 108.4 | 103.0 | 96.8 | 89.9 | 82.3 | 73.7 | 112.9 |
| Condensation glide | ° C. | 2.6 | 3.3 | 4.2 | 5.5 | 7.1 | 9.2 | 11.2 | 2.7 |

| Item | Unit | Example 279 | Example 280 | Example 281 | Example 282 | Comp. Ex. 155 | Comp. Ex. 156 | Comp. Ex. 157 | Example 283 |
|---|---|---|---|---|---|---|---|---|---|
| HFO-1132(E) | mass % | 30.0 | 30.0 | 30.0 | 30.0 | 30.0 | 40.0 | 40.0 | 40.0 |
| R32 | mass % | 46.0 | 36.0 | 26.0 | 16.0 | 6.0 | 46.0 | 36.0 | 26.0 |
| R1234yf | mass % | 20.0 | 30.0 | 40.0 | 50.0 | 60.0 | 10.0 | 20.0 | 30.0 |
| $CO_2$ | mass % | 4.0 | 4.0 | 4.0 | 4.0 | 4.0 | 4.0 | 4.0 | 4.0 |
| GWP | — | 312 | 245 | 177 | 110 | 43 | 311 | 244 | 177 |
| COP ratio | % (relative to R410A) | 98.7 | 98.6 | 98.7 | 99.0 | 99.8 | 98.3 | 98.1 | 98.1 |
| Refrigerating capacity ratio | % (relative to R410A) | 107.7 | 101.9 | 95.4 | 88.0 | 79.9 | 112.1 | 106.6 | 100.4 |
| Condensation glide | ° C. | 3.5 | 4.6 | 6.0 | 7.8 | 9.8 | 2.8 | 3.8 | 5.0 |

| Item | Unit | Example 284 | Example 285 | Comp. Ex. 158 | Comp. Ex. 159 | Example 286 | Example 287 | Comp. Ex. 160 | Comp. Ex. 161 |
|---|---|---|---|---|---|---|---|---|---|
| HFO-1132(E) | mass % | 40.0 | 40.0 | 50.0 | 50.0 | 50.0 | 50.0 | 60.0 | 60.0 |
| R32 | mass % | 16.0 | 6.0 | 36.0 | 26.0 | 16.0 | 6.0 | 26.0 | 16.0 |
| R1234yf | mass % | 40.0 | 50.0 | 10.0 | 20.0 | 30.0 | 40.0 | 10.0 | 20.0 |
| $CO_2$ | mass % | 4.0 | 4.0 | 4.0 | 4.0 | 4.0 | 4.0 | 4.0 | 4.0 |
| GWP | — | 110 | 43 | 244 | 177 | 110 | 43 | 177 | 109 |
| COP ratio | % (relative to R410A) | 98.3 | 98.8 | 97.7 | 97.7 | 97.8 | 98.2 | 97.3 | 97.4 |
| Refrigerating capacity ratio | % (relative to R410A) | 93.4 | 85.6 | 110.9 | 105.0 | 98.4 | 90.9 | 109.3 | 103.0 |
| Condensation glide | ° C. | 6.6 | 8.4 | 3.1 | 4.1 | 5.5 | 7.1 | 3.4 | 4.6 |

| Item | Unit | Example 288 | Comp. Ex. 162 | Comp. Ex. 163 | Comp. Ex. 164 | Example 289 | Example 290 | Example 291 | Example 292 |
|---|---|---|---|---|---|---|---|---|---|
| HFO-1132(E) | mass % | 60.0 | 70.0 | 70.0 | 80.0 | 15.0 | 15.0 | 15.0 | 15.0 |
| R32 | mass % | 6.0 | 16.0 | 6.0 | 6.0 | 48.5 | 46.0 | 43.5 | 41.0 |
| R1234yf | mass % | 30.0 | 10.0 | 20.0 | 10.0 | 32.5 | 35.0 | 37.5 | 40.0 |
| $CO_2$ | mass % | 4.0 | 4.0 | 4.0 | 4.0 | 4.0 | 4.0 | 4.0 | 4.0 |
| GWP | — | 42 | 109 | 42 | 42 | 329 | 312 | 295 | 279 |
| COP ratio | % (relative to R410A) | 97.7 | 97.2 | 97.4 | 97.2 | 99.7 | 99.6 | 99.6 | 99.6 |
| Refrigerating capacity ratio | % (relative to R410A) | 95.9 | 107.3 | 100.5 | 104.9 | 101.9 | 100.4 | 98.9 | 97.4 |
| Condensation glide | ° C. | 6.0 | 3.8 | 5.1 | 4.3 | 4.3 | 4.6 | 4.9 | 5.2 |

TABLE 43-continued

| Item | Unit | Example 293 | Example 294 | Example 295 | Example 296 | Example 297 | Example 298 | Example 299 | Example 300 |
|---|---|---|---|---|---|---|---|---|---|
| HFO-1132(E) | mass % | 15.0 | 15.0 | 15.0 | 15.0 | 15.0 | 15.0 | 15.0 | 15.0 |
| R32 | mass % | 38.5 | 36.0 | 33.5 | 31.0 | 28.5 | 26.0 | 23.5 | 21.0 |
| R1234yf | mass % | 42.5 | 45.0 | 47.5 | 50.0 | 52.5 | 55.0 | 57.5 | 60.0 |
| $CO_2$ | mass % | 4.0 | 4.0 | 4.0 | 4.0 | 4.0 | 4.0 | 4.0 | 4.0 |
| GWP | — | 262 | 245 | 228 | 211 | 195 | 178 | 161 | 144 |
| COP ratio | % (relative to R410A) | 99.6 | 99.6 | 99.6 | 99.7 | 99.8 | 99.9 | 100.0 | 100.2 |
| Refrigerating capacity ratio | % (relative to R410A) | 95.8 | 94.1 | 92.4 | 90.7 | 88.9 | 87.1 | 85.2 | 83.3 |
| Condensation glide | ° C. | 5.6 | 5.9 | 6.3 | 6.8 | 7.2 | 7.7 | 8.2 | 8.7 |

TABLE 44

| Item | Unit | Example 301 | Example 302 | Example 303 | Example 304 | Example 305 | Example 306 | Example 307 | Example 308 |
|---|---|---|---|---|---|---|---|---|---|
| HFO-1132(E) | mass % | 15.0 | 17.5 | 17.5 | 17.5 | 17.5 | 17.5 | 17.5 | 17.5 |
| R32 | mass % | 18.5 | 48.5 | 46.0 | 43.5 | 41.0 | 38.5 | 36.0 | 33.5 |
| R1234yf | mass % | 62.5 | 30.0 | 32.5 | 35.0 | 37.5 | 40.0 | 42.5 | 45.0 |
| $CO_2$ | mass % | 4.0 | 4.0 | 4.0 | 4.0 | 4.0 | 4.0 | 4.0 | 4.0 |
| GWP | — | 128 | 329 | 312 | 295 | 278 | 262 | 245 | 228 |
| COP ratio | % (relative to R410A) | 100.4 | 99.5 | 99.5 | 99.4 | 99.4 | 99.4 | 99.4 | 99.4 |
| Refrigerating capacity ratio | % (relative to R410A) | 81.3 | 103.1 | 101.7 | 100.2 | 98.7 | 97.1 | 95.5 | 93.8 |
| Condensation glide | ° C. | 9.3 | 4.1 | 4.4 | 4.7 | 5.0 | 5.3 | 5.7 | 6.1 |

| Item | Unit | Example 309 | Example 310 | Example 311 | Example 312 | Example 313 | Example 314 | Example 315 | Example 316 |
|---|---|---|---|---|---|---|---|---|---|
| HFO-1132(E) | mass % | 17.5 | 17.5 | 17.5 | 17.5 | 17.5 | 17.5 | 20.0 | 20.0 |
| R32 | mass % | 31.0 | 28.5 | 26.0 | 23.5 | 21.0 | 18.5 | 48.5 | 43.5 |
| R1234yf | mass % | 47.5 | 50.0 | 52.5 | 55.0 | 57.5 | 60.0 | 27.5 | 32.5 |
| $CO_2$ | mass % | 4.0 | 4.0 | 4.0 | 4.0 | 4.0 | 4.0 | 4.0 | 4.0 |
| GWP | — | 211 | 195 | 178 | 161 | 144 | 127 | 329 | 295 |
| COP ratio | % (relative to R410A) | 99.5 | 99.5 | 99.6 | 99.8 | 99.9 | 100.1 | 99.3 | 99.3 |
| Refrigerating capacity ratio | % (relative to R410A) | 92.1 | 90.3 | 88.5 | 86.7 | 84.8 | 82.8 | 104.4 | 101.5 |
| Condensation glide | ° C. | 6.5 | 7.0 | 7.4 | 7.9 | 8.4 | 9.0 | 4.0 | 4.5 |

| Item | Unit | Example 317 | Example 318 | Example 319 | Example 320 | Example 321 | Example 322 | Example 323 | Example 324 |
|---|---|---|---|---|---|---|---|---|---|
| HFO-1132(E) | mass % | 20.0 | 20.0 | 20.0 | 20.0 | 20.0 | 20.0 | 20.0 | 20.0 |
| R32 | mass % | 41.0 | 38.5 | 33.5 | 31.0 | 28.5 | 23.5 | 21.0 | 18.5 |
| R1234yf | mass % | 35.0 | 37.5 | 42.5 | 45.0 | 47.5 | 52.5 | 55.0 | 57.5 |
| $CO_2$ | mass % | 4.0 | 4.0 | 4.0 | 4.0 | 4.0 | 4.0 | 4.0 | 4.0 |
| GWP | — | 278 | 262 | 228 | 211 | 195 | 161 | 144 | 127 |
| COP ratio | % (relative to R410A) | 99.3 | 99.2 | 99.3 | 99.3 | 99.3 | 99.5 | 99.6 | 99.8 |
| Refrigerating capacity ratio | % (relative to R410A) | 100.0 | 98.4 | 95.2 | 93.5 | 91.7 | 88.1 | 86.2 | 84.3 |
| Condensation glide | ° C. | 4.8 | 5.1 | 5.8 | 6.2 | 6.7 | 7.6 | 8.1 | 8.6 |

| Item | Unit | Example 325 | Example 326 | Example 327 | Example 328 | Example 329 | Example 330 | Example 331 | Example 332 |
|---|---|---|---|---|---|---|---|---|---|
| HFO-1132(E) | mass % | 22.5 | 22.5 | 22.5 | 22.5 | 22.5 | 22.5 | 22.5 | 22.5 |
| R32 | mass % | 48.5 | 46.0 | 43.5 | 41.0 | 38.5 | 36.0 | 33.5 | 31.0 |
| R1234yf | mass % | 25.0 | 27.5 | 30.0 | 32.5 | 35.0 | 37.5 | 40.0 | 42.5 |
| $CO_2$ | mass % | 4.0 | 4.0 | 4.0 | 4.0 | 4.0 | 4.0 | 4.0 | 4.0 |

TABLE 44-continued

| | | | | | | | | | |
|---|---|---|---|---|---|---|---|---|---|
| GWP | — | 329 | 312 | 295 | 278 | 262 | 245 | 228 | 211 |
| COP ratio | % (relative to R410A) | 99.2 | 99.2 | 99.1 | 99.1 | 99.1 | 99.1 | 99.1 | 99.1 |
| Refrigerating capacity ratio | % (relative to R410A) | 105.6 | 104.2 | 102.7 | 101.3 | 99.7 | 98.1 | 96.5 | 94.8 |
| Condensation glide | ° C. | 3.8 | 4.0 | 4.3 | 4.6 | 4.3 | 5.2 | 5.6 | 6.0 |

| Item | Unit | Example 333 | Example 334 | Example 335 | Example 336 | Example 337 | Example 338 | Example 339 | Example 340 |
|---|---|---|---|---|---|---|---|---|---|
| HFO-1132(E) | mass % | 22.5 | 22.5 | 22.5 | 22.5 | 22.5 | 22.5 | 22.5 | 25.0 |
| R32 | mass % | 28.5 | 26.0 | 23.5 | 21.0 | 18.5 | 16.0 | 13.5 | 43.5 |
| R1234yf | mass % | 45.0 | 47.5 | 50.0 | 52.5 | 55.0 | 57.5 | 60.0 | 27.5 |
| $CO_2$ | mass % | 4.0 | 4.0 | 4.0 | 4.0 | 4.0 | 4.0 | 4.0 | 4.0 |
| GWP | — | 194 | 178 | 161 | 144 | 127 | 111 | 94 | 295 |
| COP ratio | % (relative to R410A) | 99.1 | 99.2 | 99.3 | 99.4 | 99.5 | 99.7 | 99.9 | 99.0 |
| Refrigerating capacity ratio | % (relative to R410A) | 93.1 | 91.3 | 89.5 | 87.7 | 85.8 | 83.8 | 81.8 | 104.0 |
| Condensation glide | ° C. | 6.4 | 6.8 | 7.3 | 7.8 | 8.3 | 8.8 | 9.3 | 4.1 |

| Item | Unit | Example 341 | Example 342 | Example 343 | Example 344 | Example 345 | Example 346 | Example 347 | Example 348 |
|---|---|---|---|---|---|---|---|---|---|
| HFO-1132(E) | mass % | 25.0 | 25.0 | 25.0 | 25.0 | 25.0 | 25.0 | 25.0 | 25.0 |
| R32 | mass % | 41.0 | 38.5 | 36.0 | 33.5 | 31.0 | 28.5 | 26.0 | 23.5 |
| R1234yf | mass % | 30.0 | 32.5 | 35.0 | 37.5 | 40.0 | 42.5 | 45.0 | 47.5 |
| $CO_2$ | mass % | 4.0 | 4.0 | 4.0 | 4.0 | 4.0 | 4.0 | 4.0 | 4.0 |
| GWP | — | 278 | 261 | 245 | 228 | 211 | 194 | 178 | 161 |
| COP ratio | % (relative to R410A) | 98.9 | 98.9 | 98.9 | 98.9 | 98.9 | 99.0 | 99.0 | 99.1 |
| Refrigerating capacity ratio | % (relative to R410A) | 102.5 | 101.0 | 99.4 | 97.8 | 96.1 | 94.4 | 92.7 | 90.9 |
| Condensation glide | ° C. | 4.4 | 4.7 | 5.0 | 5.4 | 5.7 | 6.1 | 6.5 | 7.0 |

TABLE 45

| Item | Unit | Example 349 | Example 350 | Example 351 | Example 352 | Example 353 | Example 354 | Example 355 | Example 356 |
|---|---|---|---|---|---|---|---|---|---|
| HFO-1132(E) | mass % | 25.0 | 25.0 | 25.0 | 25.0 | 27.5 | 27.5 | 27.5 | 27.5 |
| R32 | mass % | 21.0 | 18.5 | 16.0 | 13.5 | 35.0 | 31.0 | 28.5 | 26.0 |
| R1234yf | mass % | 50.0 | 52.5 | 55.0 | 57.5 | 35.0 | 37.5 | 40.0 | 42.5 |
| $CO_2$ | mass % | 4.0 | 4.0 | 4.0 | 4.0 | 4.0 | 4.0 | 4.0 | 4.0 |
| GWP | — | 144 | 127 | 110 | 94 | 238 | 211 | 194 | 178 |
| COP ratio | % (relative to R410A) | 99.2 | 99.3 | 99.5 | 99.7 | 98.8 | 98.8 | 98.3 | 98.8 |
| Refrigerating capacity ratio | % (relative to R410A) | 89.1 | 87.2 | 85.2 | 83.2 | 99.4 | 97.4 | 95.8 | 94.0 |
| Condensation glide | ° C. | 7.5 | 8.0 | 8.5 | 9.0 | 5.0 | 5.5 | 5.9 | 6.3 |

| Item | Unit | Example 357 | Example 358 | Example 359 | Example 360 | Example 361 | Example 362 | Example 363 | Example 364 |
|---|---|---|---|---|---|---|---|---|---|
| HFO-1132(E) | mass % | 27.5 | 27.5 | 27.5 | 27.5 | 27.5 | 27.5 | 30.0 | 30.0 |
| R32 | mass % | 23.5 | 21.0 | 18.5 | 16.0 | 13.5 | 11.0 | 23.5 | 21.0 |
| R1234yf | mass % | 45.0 | 47.5 | 50.0 | 52.5 | 55.0 | 57.5 | 42.5 | 45.0 |
| $CO_2$ | mass % | 4.0 | 4.0 | 4.0 | 4.0 | 4.0 | 4.0 | 4.0 | 4.0 |
| GWP | — | 161 | 144 | 127 | 110 | 94 | 77 | 161 | 144 |
| COP ratio | % (relative to R410A) | 98.9 | 99.0 | 99.1 | 99.2 | 99.4 | 99.6 | 98.7 | 98.8 |

TABLE 45-continued

| | | | | | | | | | |
|---|---|---|---|---|---|---|---|---|---|
| Refrigerating capacity ratio | % (relative to R410A) | 92.3 | 90.4 | 88.6 | 86.7 | 84.7 | 82.6 | 93.6 | 91.8 |
| Condensation glide | ° C. | 6.7 | 7.2 | 7.6 | 8.1 | 8.7 | 9.2 | 6.4 | 6.9 |

| Item | Unit | Example 365 | Example 366 | Example 367 | Example 368 | Example 369 | Example 400 | Example 401 | Example 402 |
|---|---|---|---|---|---|---|---|---|---|
| HFO-1132(E) | mass % | 30.0 | 30.0 | 30.0 | 30.0 | 32.5 | 32.5 | 32.5 | 32.5 |
| R32 | mass % | 18.5 | 13.5 | 11.0 | 8.5 | 21.0 | 18.5 | 16.0 | 35.0 |
| R1234yf | mass % | 47.5 | 52.5 | 55.0 | 57.5 | 42.5 | 45.0 | 47.5 | 50.0 |
| $CO_2$ | mass % | 4.0 | 4.0 | 4.0 | 4.0 | 4.0 | 4.0 | 4.0 | 4.0 |
| GWP | — | 127 | 94 | 77 | 60 | 144 | 127 | 110 | 239 |
| COP ratio | % (relative to R410A) | 98.9 | 99.2 | 99.3 | 99.5 | 98.6 | 98.7 | 98.8 | 99.1 |
| Refrigerating capacity ratio | % (relative to R410A) | 89.9 | 86.1 | 84.1 | 82.0 | 93.1 | 91.3 | 89.4 | 94.0 |
| Condensation glide | ° C. | 7.3 | 8.3 | 8.8 | 9.3 | 6.6 | 7.0 | 7.5 | 5.5 |

| Item | Unit | Example 403 | Example 404 | Example 405 | Example 406 | Example 407 | Example 408 | Example 409 | Example 410 |
|---|---|---|---|---|---|---|---|---|---|
| HFO-1132(E) | mass % | 32.5 | 32.5 | 32.5 | 35.0 | 35.0 | 35.0 | 35.0 | 35.0 |
| R32 | mass % | 11.0 | 8.5 | 6.0 | 16.0 | 13.5 | 11.0 | 8.5 | 6.0 |
| R1234yf | mass % | 52.5 | 55.0 | 57.5 | 45.0 | 47.5 | 50.0 | 52.5 | 55.0 |
| $CO_2$ | mass % | 4.0 | 4.0 | 4.0 | 4.0 | 4.0 | 4.0 | 4.0 | 4.0 |
| GWP | — | 77 | 60 | 43 | 110 | 93 | 77 | 60 | 43 |
| COP ratio | % (relative to R410A) | 99.1 | 99.3 | 99.5 | 98.6 | 98.7 | 98.9 | 99.1 | 99.3 |
| Refrigerating capacity ratio | % (relative to R410A) | 85.5 | 83.4 | 81.3 | 90.8 | 88.8 | 86.9 | 84.8 | 82.8 |
| Condensation glide | ° C. | 8.5 | 9.0 | 9.5 | 7.2 | 7.6 | 8.1 | 8.6 | 9.1 |

| Item | Unit | Example 411 | Example 412 | Example 413 | Example 414 | Example 415 | Example 416 | Example 417 | Example 418 |
|---|---|---|---|---|---|---|---|---|---|
| HFO-1132(E) | mass % | 37.5 | 37.5 | 37.5 | 37.5 | 37.5 | 40.0 | 40.0 | 40.0 |
| R32 | mass % | 13.5 | 11.0 | 8.5 | 6.0 | 3.5 | 11.0 | 8.5 | 3.5 |
| R1234yf | mass % | 45.0 | 47.5 | 50.0 | 52.5 | 55.0 | 45.0 | 47.5 | 52.5 |
| $CO_2$ | mass % | 4.0 | 4.0 | 4.0 | 4.0 | 4.0 | 4.0 | 4.0 | 4.0 |
| GWP | — | 93 | 77 | 60 | 43 | 26 | 76 | 60 | 26 |
| COP ratio | % (relative to R410A) | 98.6 | 98.7 | 98.9 | 99.0 | 99.2 | 98.5 | 98.7 | 99.0 |
| Refrigerating capacity ratio | % (relative to R410A) | 90.2 | 88.2 | 86.2 | 84.2 | 82.0 | 89.6 | 87.6 | 83.4 |
| Condensation glide | ° C. | 7.3 | 7.8 | 8.3 | 8.8 | 9.2 | 7.5 | 7.9 | 8.9 |

| Item | Unit | Example 419 | Example 420 | Example 421 | Example 422 | Example 423 | Example 424 | Example 425 | Example 426 |
|---|---|---|---|---|---|---|---|---|---|
| HFO-1132(E) | mass % | 40.0 | 42.5 | 42.5 | 42.5 | 42.5 | 45.0 | 45.0 | 45.0 |
| R32 | mass % | 1.0 | 8.5 | 35.0 | 3.5 | 1.0 | 6.0 | 3.5 | 1.0 |
| R1234yf | mass % | 55.0 | 45.0 | 47.5 | 50.0 | 52.5 | 45.0 | 47.5 | 50.0 |
| $CO_2$ | mass % | 4.0 | 4.0 | 4.0 | 4.0 | 4.0 | 4.0 | 4.0 | 4.0 |
| GWP | — | 9 | 60 | 239 | 26 | 9 | 43 | 26 | 9 |
| COP ratio | % (relative to R410A) | 99.2 | 98.5 | 98.8 | 98.8 | 99.0 | 98.5 | 98.6 | 98.8 |
| Refrigerating capacity ratio | % (relative to R410A) | 81.2 | 88.9 | 95.6 | 84.8 | 82.6 | 88.3 | 86.2 | 84.0 |
| Condensation glide | ° C. | 9.3 | 7.6 | 5.0 | 8.5 | 9.0 | 7.8 | 8.2 | 8.7 |

TABLE 46

| Item | Unit | Example 427 | Example 428 | Example 429 | Example 430 | Example 431 | Example 432 |
|---|---|---|---|---|---|---|---|
| HFO-1132(E) | mass % | 47.5 | 47.5 | 50.0 | 50.0 | 52.5 | 55.0 |
| R32 | mass % | 4.5 | 2.0 | 3.5 | 1.0 | 2.0 | 1.0 |
| R1234yf | mass % | 44.0 | 46.5 | 42.5 | 45.0 | 41.5 | 40.0 |
| $CO_2$ | mass % | 4.0 | 4.0 | 4.0 | 4.0 | 4.0 | 4.0 |
| GWP | — | 33 | 16 | 26 | 9 | 16 | 9 |
| COP ratio | % (relative to R410A) | 98.4 | 98.6 | 98.3 | 98.5 | 98.3 | 98.2 |
| Refrigerating capacity ratio | % (relative to R410A) | 88.4 | 86.3 | 88.9 | 86.8 | 88.9 | 89.4 |
| Condensation glide | ° C. | 7.7 | 8.1 | 7.6 | 8.0 | 7.5 | 7.4 |

These results indicate that when the mass % of $CO_2$, R32, HFO-1132(E), and R1234yf based on their sum is respectively represented by w, x, y, and z, the mixed refrigerant has a GWP of 350 when coordinates (x,y,z) are on straight line A"B" in the ternary composition diagrams shown in FIGS. 1B to 1I, in which the sum of R32, and R1234yf, and HFO-1132(E) is (100−w) mass %, and the mixed refrigerant has a GWP of less than 350 when coordinates (x,y,z) in the ternary composition diagrams are located to the right of straight line A"B". The results further indicate that the mixed refrigerant has a GWP of 250 when coordinates (x,y,z) are on straight line A'B' in the ternary composition diagrams shown in FIGS. 1B to 1I, and the mixed refrigerant has a GWP of less than 125 when coordinates (x,y,z) in the ternary composition diagrams are located to the right of straight line A'B'. The results further show that the mixed refrigerant has a GWP of 125 when coordinates (x,y,z) are on straight line segment AB in the ternary composition diagrams shown in FIGS. 1B to 1I, and the mixed refrigerant has a GWP of less than 125 when coordinates (x,y,z) in the ternary composition diagrams are located to the right of straight line segment AB.

The straight line that connects point D and point C is found to be roughly located slightly to the left of the curve that connect points where the mixed refrigerant has a refrigerating capacity ratio of 80% relative to R410A. Accordingly, the results show that when coordinates (x, y, z) are located on the left side of the straight line that connects point D and point C, the mixed refrigerant has a refrigerating capacity ratio of 80% or more relative to R410A.

The coordinates of point A and point B, point A' and point B', and point A" and point B" were determined by obtaining approximate formulas based on the points shown in the above table. Specifically, the calculation was performed as shown in Table 47 (point A and point B), Table 48 (point A' and point B'), and Table 49 (point A" and point B").

TABLE 47

| Item | $1.2 \geq CO_2 > 0$ | | | $4.0 \geq CO_2 \geq 1.2$ | | | $7.0 \geq CO_2 \geq 4.0$ | | |
|---|---|---|---|---|---|---|---|---|---|
| | | | | Point A | | | | | |
| $CO_2$ | 0.0 | 0.6 | 1.2 | 1.2 | 2.5 | 4.0 | 4.0 | 5.5 | 7.0 |
| E-HFO-1132 | 81.6 | 81.0 | 80.4 | 80.4 | 79.1 | 77.6 | 77.6 | 76.1 | 74.6 |
| R32 | 18.4 | 18.4 | 18.4 | 18.4 | 18.4 | 18.4 | 18.4 | 18.4 | 18.4 |
| R1234yf | 0.0 | 0.0 | 0.0 | 0.0 | 0.0 | 0.0 | 0.0 | 0.0 | 0.0 |
| $CO_2$ | | W | | | w | | | w | |
| Approximate formula of HFO-1132 (E) | | −w + 81.6 | | | −w + 81.6 | | | −w + 81.6 | |
| Approximate formula of R32 | | 18.4 | | | 18.4 | | | 18.4 | |
| Approximate formula of R1234yf | | 0.0 | | | 0.0 | | | 0.0 | |
| | | | | Point B | | | | | |
| $CO_2$ | 0.0 | 0.6 | 1.2 | 1.2 | 2.5 | 4.0 | 4.0 | 5.5 | 7.0 |
| E-HFO-1132 | 0.0 | 0.0 | 0.0 | 0.0 | 0.0 | 0.0 | 0.0 | 0.0 | 0.0 |
| R32 | 18.1 | 18.1 | 18.1 | 18.1 | 18.1 | 18.1 | 18.1 | 18.1 | 18.1 |
| R1234yf | 81.9 | 81.3 | 80.7 | 80.7 | 79.4 | 77.9 | 77.9 | 76.4 | 74.9 |
| $CO_2$ | | w | | | w | | | W | |
| Approximate formula of HFO-1132 (E) | | 0.0 | | | 0.0 | | | 0.0 | |

TABLE 47-continued

| Item | 1.2 ≥ $CO_2$ > 0 | 4.0 ≥ $CO_2$ ≥ 1.2 | 7.0 ≥ $CO_2$ ≥ 4.0 |
|---|---|---|---|
| Approximate formula of R32 | 18.1 | 18.1 | 18.1 |
| Approximate formula of R1234yf | −w + 81.9 | −w + 81.9 | −w + 81.9 |

TABLE 48

| Item | 1.2 ≥ $CO_2$ > 0 | | | 4.0 ≥ $CO_2$ ≥ 1.2 | | | 7.0 ≥ $CO_2$ ≥ 4.0 | | |
|---|---|---|---|---|---|---|---|---|---|
| Point A' | | | | | | | | | |
| $CO_2$ | 0.0 | 0.6 | 1.2 | 1.2 | 2.5 | 4.0 | 4.0 | 5.5 | 7.0 |
| E-HFO-1132 | 63.1 | 62.5 | 61.9 | 61.9 | 60.6 | 59.1 | 59.1 | 57.6 | 56.1 |
| R32 | 36.9 | 36.9 | 36.9 | 36.9 | 36.9 | 36.9 | 36.9 | 36.9 | 36.9 |
| R1234yf | 0.0 | 0.0 | 0.0 | 0.0 | 0.0 | 0.0 | 0.0 | 0.0 | 0.0 |
| $CO_2$ | w | | | w | | | w | | |
| Approximate formula of HFO-1132 (E) | −w + 63.1 | | | −w + 63.1 | | | −w + 63.1 | | |
| Approximate formula of R32 | 36.9 | | | 36.9 | | | 36.9 | | |
| Approximate formula of R1234yf | 0.0 | | | 0.0 | | | 0.0 | | |
| Point B' | | | | | | | | | |
| $CO_2$ | 0.0 | 0.6 | 1.2 | 1.2 | 2.5 | 4.0 | 4.0 | 5.5 | 7.0 |
| E-HFO-1132 | 0.0 | 0.0 | 0.0 | 0.0 | 0.0 | 0.0 | 0.0 | 0.0 | 0.0 |
| R32 | 36.7 | 36.7 | 36.6 | 36.6 | 36.6 | 36.6 | 36.6 | 36.6 | 36.6 |
| R1234yf | 63.3 | 62.7 | 62.2 | 62.2 | 60.9 | 59.4 | 59.4 | 57.9 | 56.4 |
| $CO_2$ | w | | | w | | | w | | |
| Approximate formula of HFO-1132 (E) | 0 | | | 0.0 | | | 0.0 | | |
| Approximate formula of R32 | 100-R1234yf-$CO_2$ | | | 36.6 | | | 36.6 | | |
| Approximate formula of R1234yf | −0.9167w + 63.283 | | | −w + 63.4 | | | −w + 63.4 | | |

TABLE 49

| Item | 1.2 ≥ $CO_2$ > 0 | | | 4.0 ≥ $CO_2$ ≥ 1.2 | | | 7.0 ≥ $CO_2$ ≥ 4.0 | | |
|---|---|---|---|---|---|---|---|---|---|
| Point A'' | | | | | | | | | |
| $CO_2$ | 0.0 | 0.6 | 1.2 | 1.2 | 2.5 | 4.0 | 4.0 | 5.5 | 7.0 |
| E-HFO-1132 | 48.2 | 47.6 | 47.0 | 47.0 | 45.7 | 44.2 | 44.2 | 42.7 | 41.2 |
| R32 | 51.8 | 51.8 | 51.θ | 51.8 | 51.8 | 51.8 | 51.8 | 51.8 | 51.8 |
| R1234yf | 0.0 | 0.0 | 0.0 | 0.0 | 0.0 | 0.0 | 0.0 | 0.0 | 0.0 |
| $CO_2$ | W | | | w | | | w | | |
| Approximate formula of HFO-1132 (E) | −w + 48.2 | | | −w + 48.2 | | | −w + 48.2 | | |
| Approximate formula of R32 | 51.8 | | | 51.8 | | | 51.8 | | |
| Approximate formula of R1234yf | 0.0 | | | 0.0 | | | 0.0 | | |
| Point B'' | | | | | | | | | |
| $CO_2$ | 0.0 | 0.6 | 1.2 | 1.2 | 2.5 | 4.0 | 4.0 | 5.5 | 7.0 |
| E-HFO-1132 | 0.0 | 0.0 | 0.0 | 0.0 | 0.0 | 0.0 | 0.0 | 0.0 | 0.0 |
| R32 | 51.5 | 51.6 | 51.6 | 51.6 | 51.6 | 51.6 | 51.6 | 51.6 | 51.6 |

TABLE 49-continued

| Item | $1.2 \geq CO_2 > 0$ | | | $4.0 \geq CO_2 \geq 1.2$ | | | $7.0 \geq CO_2 \geq 4.0$ | | |
|---|---|---|---|---|---|---|---|---|---|
| R1234yf | 49.5 | 47.8 | 47.2 | 47.2 | 45.9 | 44.4 | 44.4 | 42.9 | 41.4 |
| $CO_2$ | | W | | | w | | | w | |
| Approximate formula of HFO-1132 (E) | | 0.0 | | | 0.0 | | | 0.0 | |
| Approximate formula of R32 | | $100-R1234yf-CO_2$ | | | 51.6 | | | 51.6 | |
| Approximate formula of R1234yf | | $1.5278W^2 - 3.75w + 49.5$ | | | $-w + 48.4$ | | | $-w + 48.4$ | |

The coordinates of points C to G were determined by obtaining approximate formulas based on the points shown in the above table. Specifically, the calculation was performed as shown in Tables 50 and 51.

TABLE 50

| Item | $1.2 \geq CO_2 > 0$ | | | $4.0 \geq CO_2 \geq 1.2$ | | | $7.0 \geq CO_2 \geq 4.0$ | | |
|---|---|---|---|---|---|---|---|---|---|
| | | | | | Point C | | | | |
| $CO_2$ | 0.0 | 0.6 | 1.2 | 1.2 | 2.5 | 4.0 | 4.0 | 5.5 | 7.0 |
| E-HFO-1132 | 58.3 | 55.4 | 52.4 | 52.4 | 46.2 | 39.5 | 39.5 | 33.0 | 26.8 |
| R32 | 0.0 | 0.0 | 0.0 | 0.0 | 0.0 | 0.0 | 0.0 | 0.0 | 0.0 |
| R1234yf | 41.7 | 44.0 | 46.4 | 46.4 | 51.3 | 56.5 | 56.5 | 61.5 | 66.2 |
| $CO_2$ | | w | | | w | | | w | |
| Approximate formula of HFO-1132 (E) | | $-4.9167w + 58.317$ | | | $0.1081w^2 - 5.169w + 58.447$ | | | $0.0667w^2 - 4.9667w + 58.3$ | |
| Approximate formula of R32 | | 0.0 | | | 0.0 | | | 0.0 | |
| Approximate formula of R1234yf | | $100-E-HFO-1132-CO_2$ | | | $100-E-HFO-1132-CO_2$ | | | $100-E-HFO-1132-CO_2$ | |
| | | | | | Point D | | | | |
| $CO_2$ | 0.0 | 0.6 | 1.2 | 1.2 | 2.5 | 4.0 | 4.0 | 5.5 | 7.0 |
| E-HFO-1132 | 0.0 | 0.0 | 0.0 | 0.0 | 0.0 | 0.0 | 0.0 | 0.0 | 0.0 |
| R32 | 40.3 | 38.6 | 36.8 | 36.8 | 33.2 | 28.9 | 28.9 | 24.7 | 20.5 |
| R1234yf | 59.7 | 60.8 | 62.0 | 62.0 | 64.3 | 67.1 | 67.1 | 69.8 | 72.5 |
| $CO_2$ | | w | | | W | | | w | |
| Approximate formula of HFO-1132 (E) | | 0.0 | | | 0.0 | | | 0.0 | |
| Approximate formula of R32 | | $-2.9167w + 40.317$ | | | $-2.8226w + 40.211$ | | | $-2.8w + 40.1$ | |
| Approximate formula of R1234yf | | $100-R32-CO_2$ | | | $100-R32-CO_2$ | | | $100-R32-CO_2$ | |
| | | | | | Point E | | | | |
| $CO_2$ | 0.0 | 0.6 | 1.2 | 1.2 | 2.5 | 4.0 | 4.0 | 5.5 | 7.0 |
| E-HFO-1132 | 31.9 | 29.6 | 26.5 | 26.5 | 20.9 | 14.7 | 14.7 | 8.8 | 3.1 |
| R32 | 18.2 | 18.2 | 18.2 | 18.2 | 18.2 | 18.1 | 18.1 | 18.1 | 18.1 |
| R1234yf | 49.9 | 51.6 | 54.1 | 54.1 | 58.4 | 63.2 | 63.2 | 67.6 | 71.8 |
| $CO_2$ | | w | | | W | | | W | |
| Approximate formula of HFO-1132 (E) | | $-1.1111w^2 - 3.1667w + 31.9$ | | | $0.0623w^2 - 4.5381w + 31.856$ | | | $0.0444w^2 - 4.3556w + 31.411$ | |
| Approximate formula of R32 | | 18.2 | | | $-0.0365w + 18.26$ | | | 18.1 | |
| Approximate formula of R1234yf | | $100-E-HFO-1132-R32-CO_2$ | | | $100-E-HFO-1132-R32-CO_2$ | | | $100-E-HFO-1132-R32-CO_2$ | |

| Item | $1.2 \geq CO_2 > 0$ | | | $1.3 \geq CO_2 > 1.2$ | |
|---|---|---|---|---|---|
| | | | Point F | | |
| $CO_2$ | 0.0 | 0.6 | 1.2 | 1.2 | 1.3 |
| E-HFO-1132 | 5.2 | 2.7 | 0.3 | 0.3 | 0 |

TABLE 50-continued

| | | | | | |
|---|---|---|---|---|---|
| R32 | 36.7 | 36.7 | 36.6 | 36.6 | 36.6 |
| R1234yf | 58.1 | 60.0 | 61.9 | 61.9 | 62.1 |
| $CO_2$ | | W | | w | |
| Approximate formula of HFO-1132 (E) | | −4.0833w + 5.1833 | | −3w + 3.9 | |
| Approximate formula of R32 | | −0.0833w + 36.717 | | 36.6 | |
| Approximate formula of R1234yf | | 100-E-HFO-1132-R32-$CO_2$ | | 100-E-HFO-1132-R32-$CO_2$ | |

| Item | | 1.2 ≥ $CO_2$ ≥ 0 | |
|---|---|---|---|
| | | Point G | |
| $CO_2$ | 0.0 | 0.6 | 1.2 |
| E-HFO-1132 | 26.2 | 29.6 | 38.1 |
| R32 | 22.2 | 18.2 | 10.0 |
| R1234yf | 51.6 | 51.6 | 50.7 |
| $CO_2$ | | w | |
| Approximate formula of HFO-1132 (E) | | $7.0833w^2$ + 1.4167w + 26.2 | |
| Approximate formula of R32 | | $-5.8333w^2$ − 3.1667w + 22.2 | |
| Approximate formula of R1234yf | | 100-E-HFO-1132-R32-$CO_2$ | |

TABLE 51

| Item | 1.2 ≥ $CO_2$ > 0 | | | 4.0 ≥ $CO_2$ ≥ 1.2 | | | 7.0 ≥ $CO_2$ ≥ 4.0 | | |
|---|---|---|---|---|---|---|---|---|---|
| Point M | | | | | | | | | |
| $CO_2$ | 0.0 | 0.6 | 1.2 | 1.2 | 2.5 | 4.0 | 4.0 | 5.5 | 7.0 |
| E-HFO-1132 | 52.6 | 55.4 | 58.0 | 58.0 | 59.7 | 60.4 | 0.0 | 33.0 | 26.8 |
| R32 | 0.0 | 0.0 | 0.0 | 0.0 | 0.0 | 0.0 | 0.0 | 0.0 | 0.0 |
| R1234yf | 47.4 | 44.0 | 40.8 | 40.8 | 37.8 | 35.6 | 56.5 | 61.5 | 66.2 |
| $CO_2$ | | w | | | w | | | w | |
| Approximate formula of HFO-1132 (E) | | 100-E-HFO-1132-R1234yf-$CO_2$ | | | 100-E-HFO-1132-R1234yf-$CO_2$ | | | 100-E-HFO-1132-R1234yf-$CO_2$ | |
| Approximate formula of R32 | | 0.0 | | | 0.0 | | | 0.0 | |
| Approximate formula of R1234yf | | $0.2778w^2$ − 5.8333w + 47.4 | | | $0.3004w^2$ − 3.419w + 44.47 | | | $0.0667w^2$ − 1.8333w + 41.867 | |
| Point W | | | | | | | | | |
| $CO_2$ | 0.0 | 0.6 | 1.2 | 1.2 | 2.5 | 4.0 | 4.0 | 5.5 | 7.0 |
| E-HFO-1132 | 32.4 | 35.1 | 38.1 | 38.1 | 40.9 | 42.6 | 42.6 | 43.3 | 43.7 |
| R32 | 10.0 | 10.0 | 10.0 | 10.0 | 10.0 | 10.0 | 10.0 | 10.0 | 10.0 |
| R1234yf | 57.6 | 54.3 | 50.7 | 50.7 | 46.6 | 43.4 | 43.4 | 41.2 | 39.3 |
| $CO_2$ | | W | | | w | | | w | |
| Approximate formula of HFO-1132 (E) | | 100-R32-R1234yf-$CO_2$ | | | 100-R32-R1234yf-$CO_2$ | | | 100-R32-R1234yf-$CO_2$ | |
| Approximate formula of R32 | | 10.0 | | | 10.0 | | | 10.0 | |
| Approximate formula of R1234yf | | $-0.4167w^2$ − 5.25w + 57.6 | | | $0.3645w^2$ − 4.5024w + 55.578 | | | $0.0667w^2$ − 2.1w + 50.733 | |
| Point N | | | | | | | | | |
| $CO_2$ | 0.0 | 0.6 | 1.2 | 1.2 | 2.5 | 4.0 | 4.0 | 5.5 | 7.0 |
| E-HFO-1132 | 27.7 | 29.6 | 31.7 | 31.7 | 34.2 | 35.5 | 35.5 | 36.3 | 36.7 |
| R32 | 18.2 | 18.2 | 18.2 | 18.2 | 18.2 | 18.2 | 18.2 | 18.2 | 18.2 |
| R1234yf | 54.1 | 51.6 | 48.9 | 48.9 | 45.1 | 42.3 | 42.3 | 40.0 | 38.1 |
| $CO_2$ | | w | | | w | | | w | |
| Approximate formula of HFO-1132 (E) | | 100-R32-R1234yf-$CO_2$ | | | 100-R32-R1234yf-$CO_2$ | | | 100-R32-R1234yf-$CO_2$ | |

TABLE 51-continued

| Item | $1.2 \geq CO_2 > 0$ | | | $4.0 \geq CO_2 \geq 1.2$ | | | $7.0 \geq CO_2 \geq 4.0$ | | |
|---|---|---|---|---|---|---|---|---|---|
| Approximate formula of R32 | | 18.2 | | | 18.2 | | | 18.2 | |
| Approximate formula of R1234yf | | $-0.2778w^2 - 4w + 54.1$ | | | $0.3773w^2 - 4.319w + 53.54$ | | | $0.0889w^2 - 2.3778w + 50.389$ | |
| Point O | | | | | | | | | |
| $CO_2$ | 0.0 | 0.6 | 1.2 | 1.2 | 2.5 | 4.0 | 4.0 | 5.5 | 7.0 |
| E-HFO-1132 | 22.6 | 24.0 | 25.4 | 25.4 | 27.2 | 28.0 | 28.0 | 28.4 | 28.6 |
| R32 | 36.8 | 36.8 | 36.8 | 36.8 | 36.8 | 36.8 | 36.8 | 36.8 | 36.8 |
| R1234yf | 40.6 | 38.6 | 36.0 | 36.0 | 33.5 | 31.2 | 31.2 | 29.3 | 27.6 |
| $CO_2$ | | w | | | w | | | w | |
| Approximate formula of HFO-1132 (E) | | 100-R32-R1234yf-$CO_2$ | | | 100-R32-R1234yf-$CO_2$ | | | 100-R32-R1234yf-$CO_2$ | |
| Approximate formula of R32 | | 36.8 | | | 36.8 | | | 36.8 | |
| Approximate formula of R1234yf | | $-0.8333w^2 - 2.8333w + 40.6$ | | | $0.1392w^2 - 2.4381w + 38.725$ | | | $0.0444w^2 - 1.6889w + 37.244$ | |
| Point P | | | | | | | | | |
| $CO_2$ | 0.0 | 0.6 | 1.2 | 1.2 | 2.5 | 4.0 | 4.0 | 5.5 | 7.0 |
| E-HFO-1132 | 20.5 | 20.9 | 22.1 | 22.1 | 23.4 | 23.9 | 23.9 | 24.2 | 24.2 |
| R32 | 51.7 | 51.7 | 51.7 | 51.7 | 51.7 | 51.7 | 51.7 | 51.7 | 51.7 |
| R1234yf | 27.8 | 26.8 | 25.0 | 25.0 | 22.4 | 20.4 | 20.4 | 18.6 | 17.1 |
| $CO_2$ | | W | | | w | | | w | |
| Approximate formula of HFO-1132 (E) | | 100-R32-R1234yf-$CO_2$ | | | 100-R32-R1234yf-$CO_2$ | | | 100-R32-R1234yf-$CO_2$ | |
| Approximate formula of R32 | | 51.7 | | | 51.7 | | | 51.7 | |
| Approximate formula of R1234yf | | $-1.1111w^2 - w + 27.8$ | | | $0.2381w^2 - 2.881w + 28.114$ | | | $0.0667w^2 - 1.8333w + 26.667$ | |

The coordinates of points on curve IJ, curve JK, and curve KL were determined by obtaining approximate formulas based on the points shown in the above table. Specifically, the calculation was performed as shown in Table 52.

TABLE 52

| Refrigerant type | | I | Example | J | J | Example | K | K | Example | L |
|---|---|---|---|---|---|---|---|---|---|---|
| $CO_2$ | R32 | 0.0 | 10.0 | 18.3 | 18.3 | 27.6 | 36.8 | 36.8 | 44.2 | 51.7 |
| 0.0 | E-HFO-1132 | 72.0 | 57.2 | 48.5 | 48.5 | 41.2 | 35.6 | 35.6 | 32.0 | 28.9 |
| | R1234yf | 28.0 | 32.8 | 33.2 | 33.2 | 31.2 | 27.6 | 27.6 | 23.8 | 19.4 |
| 0.6 | E-HFO-1132 | 72.0 | 57.2 | 48.5 | 48.5 | 41.2 | 35.6 | 35.6 | 32.0 | 28.9 |
| | R1234yf | 27.4 | 32.2 | 32.6 | 32.6 | 30.6 | 27.0 | 27.0 | 23.2 | 18.8 |
| 1.2 | E-HFO-1132 | 72.0 | 57.2 | 48.5 | 48.5 | 41.2 | 35.6 | 35.6 | 32.0 | 28.9 |
| | R1234yf | 26.8 | 31.6 | 32.0 | 32.0 | 30.0 | 26.4 | 26.4 | 22.6 | 18.2 |
| 2.5 | E-HFO-1132 | 72.0 | 57.2 | 48.5 | 48.5 | 41.2 | 35.6 | 35.6 | 32.0 | 28.9 |
| | R1234yf | 25.5 | 30.3 | 30.7 | 30.7 | 28.7 | 25.1 | 25.1 | 21.3 | 16.9 |
| 4.0 | E-HFO-1132 | 72.0 | 57.2 | 48.5 | 48.5 | 41.2 | 35.6 | 35.6 | 32.0 | 28.9 |
| | R1234yf | 24.0 | 28.8 | 29.2 | 29.2 | 27.2 | 23.6 | 23.6 | 19.8 | 15.4 |
| 5.5 | E-HFO-1132 | 72.0 | 57.2 | 48.5 | 48.5 | 41.2 | 35.6 | 35.6 | 32.0 | 28.9 |
| | R1234yf | 22.5 | 27.3 | 27.7 | 27.7 | 25.7 | 22.1 | 22..1 | 18.3 | 13.9 |
| 7.0 | E-HFO-1132 | 72.0 | 57.2 | 48.5 | 48.5 | 41.2 | 35.6 | 35.6 | 32.0 | 28.9 |
| | R1234yf | 21.0 | 25.8 | 26.2 | 26.2 | 24.2 | 20.6 | 20.6 | 16.8 | 12.4 |
| w = $CO_2$ | Approximate formula of E-HFO-1132 when x = R32 | | $0.0236x^2 - 1.716x + 72$ | | | $0.0095x^2 - 1.2222x + 67.676$ | | | $0.0049x^2 - 0.8842x + 61.488$ | |
| | R1234yf | | 100-E-HFO-1132-x-w | | | 100-E-HFO-1132-x-w | | | 100-E-HFO-1132-x-w | |

The coordinates of points on curve MW and curve WM were determined by obtaining approximate formulas based on the points shown in the above table. Specifically, calculation was performed as shown in Table 53 (when 0 mass %<$CO_2$ concentration≤1.2 mass %), Table 54 (when 1.2 mass %<$CO_2$ concentration≤4.0 mass %), and Table 55 (4.0 mass %<$CO_2$ concentration≤7.0 mass %).

TABLE 53

| 1.2 ≥ $CO_2$ > 0 | | | | | | |
|---|---|---|---|---|---|---|
| Item | M 0.0 | Example 5.0 | W 10.0 | W 10.0 | Example 14.5 | N 18.2 |
| $CO_2$ = 0 mass % | 52.6 | 39.2 | 32.4 | 32.4 | 29.3 | 27.7 |
| Approximate formula of E-HFO-1132 when x = R32 | | $0.132x^2 - 3.34x + 52.6$ | | | $0.0313x^2 - 1.4551x + 43.824$ | |
| $CO_2$ = 0.6 mass % | 55.4 | 42.4 | 35.1 | 35.1 | 31.6 | 29.6 |
| Approximate formula of E-HFO-1132 when x = R32 | | $0.114x^2 - 3.17x + 55.4$ | | | $0.0289x^2 - 1.4866x + 47.073$ | |
| $CO_2$ = 1.2 mass % | 58.0 | 45.2 | 38.1 | 38.1 | 34.0 | 31.7 |
| Approximate formula of E-HFO-1132 when x = R32 | | $0.114x^2 - 3.13x + 58.0$ | | | $0.0353x^2 - 1.776x + 52.330$ | |
| In $ax^2 + bx + c$, which is the approximate formula of E-HFO-1132, approximate formulas of coefficients a, b, and c when w = $CO_2$ concentration | | | | | | |
| Approximate formula of coefficient a | | $0.025w^2 - 0.045w + 0.132$ | | | $0.0122w^2 - 0.0113w + 0.0313$ | |
| Approximate formula of coefficient b | | $-0.1806w^2 + 0.3917w - 3.34$ | | | $-0.3582w^2 + 0.1624w - 1.4551$ | |
| Approximate formula of coefficient c | | $-0.2778w^2 + 4.8333w + 52.6$ | | | $2.7889w^2 + 3.7417w + 43.824$ | |
| Approximate formula of E-HFO-1132 when x = R32, w = $CO_2$, and 1.2 ≥ w > 0 | | $(0.025w^2 - 0.045w + 0.132)x^2 + (-0.1806w^2 + 0.3917w - 3.34)x + (-0.2778w^2 + 4.8333w + 52.6)$ | | | $(0.0122w^2 - 0.0113w + 0.0313)x^2 + (-0.3582w^2 + 0.1624w - 1.4551)x + (2.7889w^2 + 3.7417w + 43.824)$ | |
| R1234yf | | 100-E-HFO-1132-R32-$CO_2$ | | | 100-E-HFO-1132-R32-$CO_2$ | |

TABLE 54

| 4.0 ≥ $CO_2$ ≥ 1.2 | | | | | | |
|---|---|---|---|---|---|---|
| Item | M 0.0 | Example 5.0 | W 10.0 | W 10.0 | Example 14.5 | N 18.2 |
| $CO_2$ = 1.2 mass % | 58 | 45.2 | 38.1 | 38.1 | 34 | 31.7 |
| Approximate formula of E-HFO-1132 when x = R32 | | $0.114x^2 - 3.13x + 58.0$ | | | $0.0353x^2 - 1.776x + 52.330$ | |
| $CO_2$ = 2.5 mass % | 59.7 | 48.1 | 40.9 | 40.9 | 36.9 | 34.2 |
| Approximate formula of E-HFO-1132 when x = R32 | | $0.088x^2 - 2.76x + 59.7$ | | | $0.0194x^2 - 1.3644x + 52.603$ | |
| $CO_2$ = 4.0 mass % | 60.4 | 49.6 | 42.6 | 42.6 | 38.3 | 35.5 |
| Approximate formula of E-HFO-1132 when x = R32 | | $0.076x^2 - 2.54x + 60.4$ | | | $0.0242x^2 - 1.5495x + 55.671$ | |
| In the approximate formula of E-HFO-1132 $ax^2 + bx + c$, approximate formulas of coefficients a, b, and c when w = $CO_2$ concentration | | | | | | |
| Approximate formula of coefficient a | | $0.0043w^2 - 0.0359w + 0.1509$ | | | $0.0055w^2 - 0.0326w + 0.0665$ | |
| Approximate | | $-0.0493w^2 +$ | | | $-0.1571w^2 +$ | |

TABLE 54-continued

| 4.0 ≥ $CO_2$ ≥ 1.2 | | | | | | |
|---|---|---|---|---|---|---|
| Item | M 0.0 | Example 5.0 | W 10.0 | W 10.0 | Example 14.5 | N 18.2 |
| formula of coefficient b | | 0.4669w − 3.6193 | | | 0.8981w − 2.6274 | |
| Approximate formula of coefficient c | | $-0.3004w^2$ + 2.419w + 55.53 | | | $0.6555w^2$ − 2.2153w + 54.044 | |
| Approximate formula of E-HFO-1132 when x = R32, w = $CO_2$, and 4.0 ≥ w ≥ 1.2 | | ($0.0043w^2$ − 0.0359w + 0.1509)x2 + ($-0.0493w^2$ + 0.4669w − 3.6193)x + (−0.3004w2 + 2.419w + 55.53) | | | ($0.0055w^2$ − 0.0326w + 0.0665)x2 + ($-0.1571w^2$ + 0.8981w − 2.6274)x + (0.6555w2 − 2.2153w + 54.044) | |
| R1234yf | | 100-E-HFO-1132-R32-$CO_2$ | | | 100-E-HFO-1132-R32-$CO_2$ | |

TABLE 55

| 7.0 ≥ $CO_2$ ≥ 4.0 | | | | | | |
|---|---|---|---|---|---|---|
| Item | M 0.0 | Example 5.0 | W 10.0 | W 10.0 | Example 14.5 | N 18.2 |
| $CO_2$ = 4.0 mass % | 60.4 | 49.6 | 42.6 | 42.6 | 38.3 | 35.5 |
| Approximate formula of E-HFO-1132 when x = R32 | | $0.076x^2$ − 2.54x + 60.4 | | | $0.0242x^2$ − 1.5495x + 55.671 | |
| $CO_2$ = 5.5 mass % | 60.7 | 50.3 | 43.3 | 43.3 | 39 | 36.3 |
| Approximate formula of E-HFO-1132 when x = R32 | | $0.068x^2$ − 2.42x + 60.7 | | | $0.0275x^2$ − 1.6303x + 56.849 | |
| $CO_2$ = 7.0 mass % | 60.7 | 50.3 | 43.7 | 43.7 | 39.5 | 36.7 |
| Approximate formula of E-HFO-1132 when x = R32 | | $0.076x^2$ − 2.46x + 60.7 | | | $0.0215x^2$ − 1.4609x + 56.156 | |
| In $ax^2 + bx + c$, which is the approximate formula of E-HFO-1132, approximate formulas of coefficients a, b, and c when w = $CO_2$ concentration | | | | | | |
| Approximate formula of coefficient a | | $0.00357w^2$ − 0.0391w + 0.1756 | | | $-0.002061w^2$ + 0.0218w − 0.0301 | |
| Approximate formula of coefficient b | | $-0.0356w^2$ + 0.4178w − 3.6422 | | | $0.0556w^2$ − 0.5821w − 0.1108 | |
| Approximate formula of coefficient c | | $-0.0667w^2$ + 0.8333w + 58.103 | | | $-0.4158w^2$ + 4.7352w + 43.383 | |
| Approximate formula of E-HFO-1132 when x = R32, w = $CO_2$, and 7.0 ≥ w ≥ 4.0 | | ($0.00357w^2$ − 0.0391w + 0.1756)$x^2$ + ($-0.0356w^2$ + 0.4178w − 3.6422)x + ($-0.0667w^2$ + 0.8333w + 58.103) | | | ($-0.002061w^2$ + 0.0218w − 0.0301)$x^2$ + ($0.0556w^2$− 0.5821w − 0.1108)x + ($-0.4158w^2$ + 4.7352w + 43.383) | |
| R1234yf | | 100-E-HFO-1132-R32-$CO_2$ | | | 100-E-HFO-1132-R32-$CO_2$ | |

The coordinates of points on curve NO and curve OP were determined by obtaining approximate formulas based on the points shown in the above table. Specifically, calculation was performed as shown in Table 56 (when 0 mass %<$CO_2$ concentration≤1.2 mass %), Table 57 (when 1.2 mass %<$CO_2$ concentration≤4.0 mass %), and Table 58 (4.0 mass %<$CO_2$ concentration≤7.0 mass %).

TABLE 56

| 1.2 ≥ $CO_2$ > 0 | | | | | | |
|---|---|---|---|---|---|---|
| Item | N 18.2 | Example 27.6 | O 36.8 | O 36.8 | Example 44.2 | P 51.7 |
| $CO_2$ = 0 mass % | 27.7 | 24.5 | 22.6 | 22.6 | 21.2 | 20.5 |
| Approximate formula of E-HFO-1132 when x = R32 | | $0.0072x^2 - 0.6701x + 37.512$ | | | $0.0064x^2 - 0.7103x + 40.07$ | |
| $CO_2$ = 0.6 mass % | 29.6 | 26.3 | 24 | 24 | 22.4 | 20.9 |
| Approximate formula of E-HFO-1132 when x = R32 | | $0.0054x^2 - 0.5999x + 38.719$ | | | $0.0011x^2 - 0.3044x + 33.727$ | |
| $CO_2$ = 1.2 mass % | 31.7 | 27.9 | 25.4 | 25.4 | 23.7 | 22.1 |
| Approximate formula of E-HFO-1132 when x = R32 | | $0.0071x^2 - 0.7306x + 42.636$ | | | $0.0011x^2 - 0.3189x + 35.644$ | |
| In $ax^2 + bx + c$, which is the approximate formula of E-HFO-1132, approximate formulas of coefficients a, b, and c when w = $CO_2$ concentration | | | | | | |
| Approximate formula of coefficient a | | $0.00487w^2 - 0.0059w + 0.0072$ | | | $0.0074w^2 - 0.0133w + 0.0064$ | |
| Approximate formula of coefficient b | | $-0.279w^2 + 0.2844w - 0.6701$ | | | $-0.5839w^2 + 1.0268w - 0.7103$ | |
| Approximate formula of coefficient c | | $3.7639w^2 - 0.2467w + 37.512$ | | | $11.472w^2 - 17.455w + 40.07$ | |
| Approximate formula of E-HFO-1132 when x = R32, w = $CO_2$, and 1.2 ≥ w > 0 | | $(0.00487w^2 - 0.0059w + 0.0072)x^2 + (-0.279w^2 + 0.2844w - 0.6701)x + (3.7639w^2 - 0.2467w + 37.512)$ | | | $(0.0074w^2 - 0.0133w + 0.0064)x^2 + (-0.5839w^2 + 1.0268w - 0.7103)x + (11.472w^2 - 17.455w + 40.07)$ | |
| R1234yf | | 100-E-HFO-1132-R32-$CO_2$ | | | 100-E-HFO-1132-R32-$CO_2$ | |

TABLE 57

| 4.0 ≥ $CO_2$ ≥ 1.2 | | | | | | |
|---|---|---|---|---|---|---|
| Item | N 18.2 | Example 27.6 | O 36.8 | O 36.8 | Example 44.2 | P 51.7 |
| $CO_2$ = 1.2 mass % | 31.7 | 27.9 | 25.4 | 25.4 | 23.7 | 22.1 |
| Approximate formula of E-HFO-1132 when x = R32 | | $0.0071x^2 - 0.7306x + 42.636$ | | | $0.0011x^2 - 0.3189x + 35.644$ | |
| $CO_2$ = 2.5 mass % | 34.2 | 29.9 | 27.2 | 27.2 | 25.2 | 23.4 |
| Approximate formula of E-HFO-1132 when x = R32 | | $0.0088x^2 - 0.8612x + 46.954$ | | | $0.002x^2 - 0.4348x + 40.5$ | |
| $CO_2$ = 4.0 mass % | 35.5 | 31 | 28 | 28 | 25.9 | 23.9 |
| Approximate formula of E-HFO-1132 when x = R32 | | $0.0082x^2 - 0.8546x + 48.335$ | | | $0.0011x^2 - 0.3768x + 40.412$ | |
| In $ax^2 + bx + c$, which is the approximate formula of E-HFO-1132, approximate formulas of coefficients a, b, and c when w = $CO_2$ concentration | | | | | | |
| Approximate formula of coefficient a | | $-0.00062w^2 + 0.0036w + 0.0037$ | | | $-0.000463w^2 + 0.0024w - 0.0011$ | |

TABLE 57-continued

| 4.0 ≥ $CO_2$ ≥ 1.2 | | | | | | |
|---|---|---|---|---|---|---|
| Item | N 18.2 | Example 27.6 | O 36.8 | O 36.8 | Example 44.2 | P 51.7 |
| Approximate formula of coefficient b | | $0.0375w^2 - 0.239w - 0.4977$ | | | $0.0457w^2 - 0.2581w - 0.075$ | |
| Approximate formula of coefficient c | | $-0.8575w^2 + 6.4941w + 36.078$ | | | $-1.355w^2 + 8.749w + 27.096$ | |
| Approximate formula of E-HFO-1132 when x = R32, w = $CO_2$, and 4.0 ≥ w ≥ 1.2 | | $(-0.00062w^2 + 0.0036w + 0.0037)x2 + (0.0375w^2 - 0.239w - 0.4977)x + (-0.8575w2 + 6.4941w + 36.078)$ | | | $(-0.000463w^2 + 0.0024w - 0.0011)x^2 + (0.0457w2 - 0.2581w - 0.075)x + (-1.355w^2 + 8.749w + 27.096)$ | |
| R1234yf | | 100-E-HFO-1132-R32-$CO_2$ | | | 100-E-HFO-1132-R32-$CO_2$ | |

TABLE 58

| 7.0 ≥ $CO_2$ ≥ 4.0 | | | | | | |
|---|---|---|---|---|---|---|
| Item | N 18.2 | Example 27.6 | O 36.8 | O 36.8 | Example 44.2 | P 51.7 |
| $CO_2$ = 4.0 mass % | 35.5 | 31.0 | 28.0 | 28.0 | 25.9 | 23.9 |
| Approximate formula of E-HFO-1132 when x = R32 | | $0.0082x^2 - 0.8546x + 48.335$ | | | $0.0011x^2 - 0.3768x + 40.412$ | |
| $CO_2$ = 5.5 mass % | 36.3 | 31.6 | 28.4 | 28.4 | 26.2 | 24.2 |
| Approximate formula of E-HFO-1132 when x = R32 | | $0.0082x^2 - 0.8747x + 49.51$ | | | $0.0021x^2 - 0.4638x + 42.584$ | |
| $CO_2$ = 7.0 mass % | 36.7 | 31.9 | 28.6 | 28.6 | 26.4 | 24.2 |
| Approximate formula of E-HFO-1132 when x = R32 | | $0.0082x^2 - 0.8848x + 50.097$ | | | $0.0003x^2 - 0.3188x + 39.923$ | |
| In $ax^2 + bx + c$, which is the approximate formula of E-HFO-1132, approximate formulas of coefficients a, b, and c when w = $CO_2$ concentration | | | | | | |
| Approximate formula of coefficient a | | 0.0082 | | | $-0.0006258w2 + 0.0066w - 0.0153$ | |
| Approximate formula of coefficient b | | $0.0022w^2 - 0.0345w - 0.7521$ | | | $0.0516w^2 - 0.5478w + 0.9894$ | |
| Approximate formula of coefficient c | | $-0.1307w^2 + 2.0247w + 42.327$ | | | $-1.074w^2 + 11.651w + 10.992$ | |
| Approximate formula of E-HFO-1132 when x = R32, w = $CO_2$, and 7.0 ≥ w ≥ 4.0 | | $0.0082x^2 + (0.0022w^2 - 0.0345w - 0.7521)x + (-0.1307w^2 + 2.0247w + 42.327)$ | | | $(-0.0006258w^2 + 0.0066w - 0.0153)x^2 + (0.0516w2 - 0.5478w + 0.9894)x + (-1.074w^2 + 11.651w + 10.992)$ | |
| R1234yf | | 100-E-HFO-1132-R32-$CO_2$ | | | 100-E-HFO-1132-R32-$CO_2$ | |

(1-6) Various Refrigerants 2

Hereinafter, the refrigerant 2A to the refrigerant 2E that are each the refrigerant for use in the present disclosure will be described in detail.

The following respective descriptions of the refrigerant 2A, refrigerant 2B, refrigerant 2C, refrigerant 2D and refrigerant 2E are independent, and alphabets representing points and/or line segments, and numbers of Examples and numbers of Comparative Examples are all independent among the refrigerant 2A, refrigerant 2B, refrigerant 2C, refrigerant 2D and refrigerant 2E. For example, Example 1 of the refrigerant 2A and Example 1 of the refrigerant 2B represent respective Examples about embodiments different from each other.

(1-6-1) Refrigerant 2A

Examples of the refrigerant 2A include a "refrigerant 2A1" and a "refrigerant 2A2". Hereinafter, the refrigerant 2A1 and the refrigerant 2A2 will be each described. In the present disclosure, the refrigerant 2A1 and the refrigerant 2A2 are each a mixed refrigerant.

(1-6-1-1) Refrigerant 2A1

The refrigerant 2A1 is a mixed refrigerant including HFO-1132(E), HFC-32 and HFO-1234yf as essential components. Hereinafter, HFO-1132(E), HFC-32 and HFO-1234yf are also referred to as "three components", in the present section.

The total concentration of the three components in the entire refrigerant 2A1 is 99.5 mass % or more. In other words, the refrigerant 2A1 includes 99.5 mass % or more of the three components in terms of the sum of the concentrations of these components.

The mass ratio of the three components in the refrigerant 2A1 is within the range of a region surrounded by a figure passing through four points:

point A (HFO-1132(E)/HFC-32/HFO-1234yf=51.8/1.0/472 mass %), point B (HFO-1132(E)/FHFC-32/HFO-1234yf=35.3/1.0/63.7 mass %), point C (HFO-1132(E)/HFC-32/HFO-1234yf=10.1/18.0/71.9 mass %) and point D (HFO-1132(E)/HFC-32/HFO-1234yf=27.8/18.0/54.2 mass %);

in a ternary composition diagram with the three components as respective apexes.

Figure 2A:
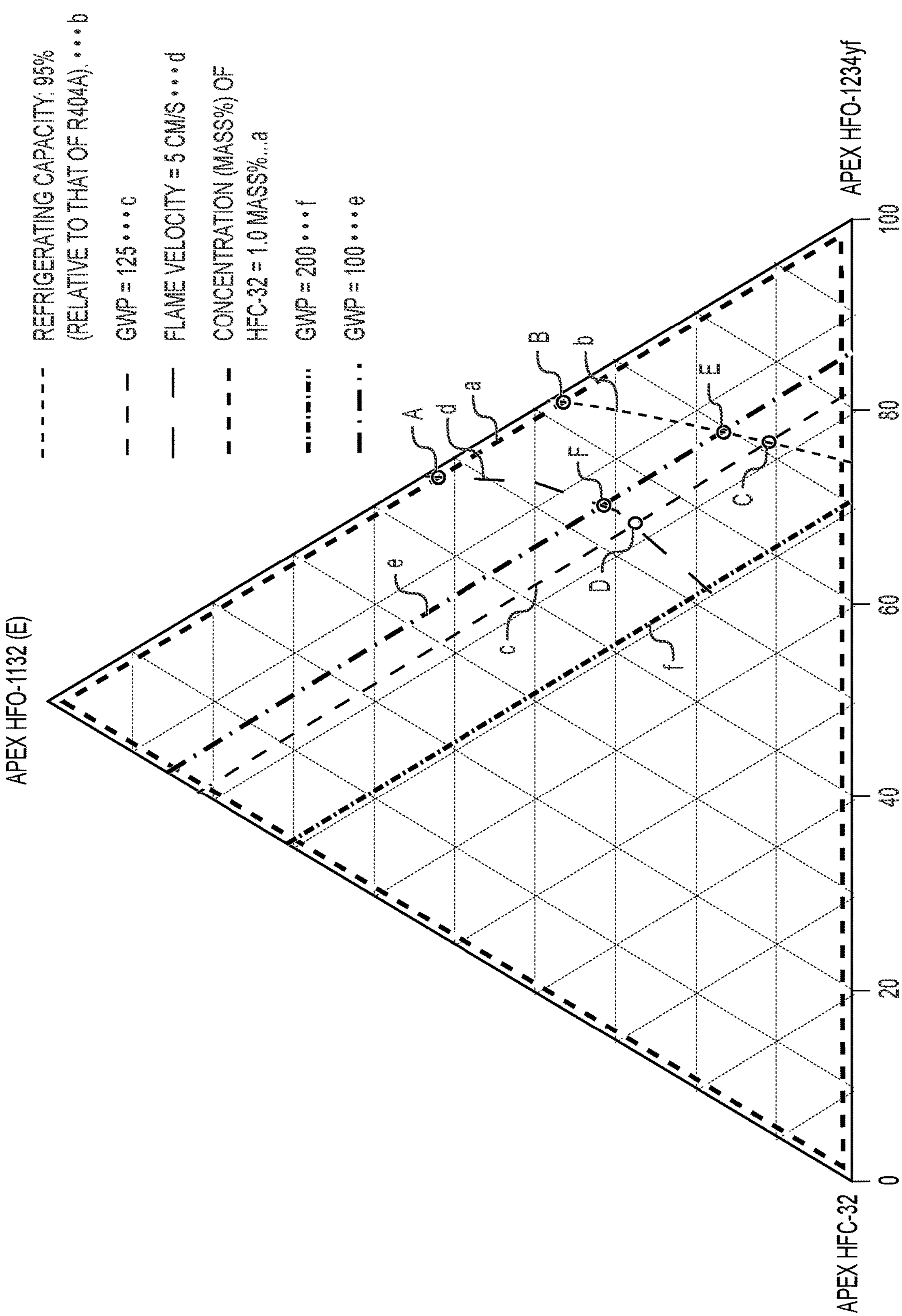
FIG. 2A is a diagram representing the mass ratio (a region surrounded by a figure passing through four points of points A, B, C and D, and a region surrounded by a figure passing through four points of points A, B, E and F) of trans-1,2-difluoroethylene (HFO-1132(E)), difluoromethane (HFC-32) and 2,3,3,3-tetrafluoropropene (HFO-1234yf) contained in a refrigerant A1, in a ternary composition diagram with HFO-1132(E), HFC-32 and HFO-1234yf.

In other words, the mass ratio of the three components in the refrigerant 2A1 is within the range of a region surrounded by a straight line a, a curve b, a straight line c and a curved that connect four points:

point A (HFO-1132(E)/HFC-32/HFO-1234yf=51.8/1.0/47.2 mass %), point B (HFO-1132(E)/HFC-32/HFO-1234yf=35.3/1.0/63.7 mass %), point C (HFO-1132(E)/HFC-32/HFO-1234yf=10.1/18.0/71.9 mass %) and point D (HFO-1132(E)/HFC-32/HFO-1234yf=27.8/18.0/54.2 mass %);

indicated in a ternary composition diagram of FIG. 2A, with the three components as respective apexes.

In the present section, the ternary composition diagram with the three components as respective apexes means a three-component composition diagram where the three components (HFO-1132(E), HFC-32 and HFO-1234yf) are assumed as respective apexes and the sum of the concentrations of HFO-1132(E), HFC-32 and HFO-1234yf is 100 mass %, as represented in FIG. 2A.

The refrigerant 2A1, which has such a configuration, thus has various characteristics of (1) a sufficiently low GWP (125 or less), (2) a refrigerating capacity and a coefficient of performance (COP) equivalent to or more than those of R404A when used as an alternative refrigerant of R404A, and (3) a flame velocity of 5 cm/s or less as measured according to ANSI/ASHRAE Standard 34-2013.

In the present section, the coefficient of performance (COP) equivalent to or more than that of R404A means that the COP ratio relative to that of R404A is 100% or more (preferably 102% or more, more preferably 103% or more), and the refrigerating capacity equivalent to or more than that of R404A means that the refrigerating capacity ratio relative to that of R404A is 95% or more (preferably 100% or more, more preferably 102 or more, most preferably 103% or more). A sufficiently low GWP means a GWP of 125 or less, preferably 110 or less, more preferably 100 or less, further preferably 75 or less.

The point A, the point B, the point C and the point D in FIG. 2A are each a point that is represented by a white circle (○) and that has the above coordinates.

The technical meanings of the points A, B, C and D are as follows. The concentration (mass %) at each of the points is the same as any value determined in Examples described below.

A: any mass ratio providing a flame velocity of 5 cm/s as measured according to ANSI/ASHRAE Standard 34-2013 and a concentration (mass %) of HFC-32 of 1.0 mass %

B: any mass ratio providing a concentration (mass %) of HFC-32 of 1.0 mass % and a refrigerating capacity relative to that of R404A of 95%

C: any mass ratio providing a refrigerating capacity relative to that of R404A of 95% and a GWP of 125

D: any mass ratio providing a GWP of 125 and a flame velocity of 5 cm/s as measured according to ANSI/ASHRAE Standard 34-2013

A "flame velocity of 5 cm/s as measured according to ANSI/ASHRAE Standard 34-2013" corresponds to any numerical value half the flame velocity (10 cm/s) as a reference for classification as Class 2L (lower flammability) according to ANSI/ASHRAE Standard 34-2013, and a refrigerant having such a flame velocity means a relatively safe refrigerant, among refrigerants prescribed in Class 2L. Specifically, a refrigerant having such "any numerical value half the flame velocity (10 cm/s)" is relatively safe in that flame hardly propagates even in the case of ignition by any chance. Hereinafter, such a flame velocity as measured according to ANSI/ASHRAE Standard 342013 is also simply referred to as "flame velocity".

The flame velocity of the mixed refrigerant of the three components in the refrigerant 2A1 is preferably more than 0 to 4.5 cm/s, more preferably more than 0 to 4 cm/s, further preferably more than 0 to 3.5 cm/s, particularly preferably more than 0 to 3 cm/s.

Both the points A and B are on the straight line a That is, a line segment AB is a part of the straight line a. The straight line a is a straight line indicating any mass ratio providing a concentration (mass %) of HFC-32 of 1.0 mass %. The mixed refrigerant of the three components has a concentration of HFC-32 of more than 1 mass % in a region close to the apex HFC-32 with respect to the straight line a in the ternary composition diagram.

The refrigerating capacity is unexpectedly high in a region close to the apex HFC-32 with respect to the straight line a in the ternary composition diagram.

In a case where the mass % of HFO-1132(E), the mass % of HFC-32 and the mass % of HFO-1234yf are represented by x, y and z, respectively, in FIG. 2A, a line segment indicating any mass ratio providing a concentration of HFC-32 of 1.0 mass % is approximated to a line segment represented by the following expressions.

The line segment indicating any mass ratio providing a concentration of HFC-32 of 1.0 mass % is a part of the straight line a that connects two points of the point A and the point B (line segment AB in FIG. 2A)

$$y=1.0$$

$$z=100-x-y.$$

$$35.3 \leq x \leq 51.8$$

Both the points B and C are on the curve b. The curve b is a curve indicating any mass ratio providing a refrigerating capacity relative to that of R404A of 95%. The mixed refrigerant of the three components has a refrigerating capacity relative to that of R404A of more than 95% in a region close to the apex HFO-1132(E) and the apex HFC-32 with respect to the curvet in the ternary composition diagram.

The curve b is determined as follows.

Table 201 represents respective four points where the refrigerating capacity ratio relative to that of R404A is 95% in a case where the mass % of HFO-1132(E) corresponds to 1.0, 10.1, 20.0 and 35.3. The curve b is indicated by a line that connects the four points, and the curve b is approximated by the expressions in Table 201, according to a least-squares method, in a case where the mass % of HFO-1132(E), the mass % of HFC-32 and the mass % of HFO-1234yf are represented by x, y and z, respectively.

TABLE 201

| Item | Unit | $b_{HFO\text{-}1132(E)=}$ | $b_{HFO\text{-}1132(E)=}$ | $b_{HFO\text{-}1132(E)=}$ | $b_{HFO\text{-}1132(E)=}$ |
|---|---|---|---|---|---|
| HFO-1132(E) | mass % | 1.0 | 10.1 | 20.0 | 35.3 |
| HFC-32 | mass % | 24.8 | 18.0 | 11.0 | 1.0 |
| HFO-1234yf | mass % | 74.2 | 71.9 | 69.0 | 63.7 |
| Refrigerating capacity | relative to that of R404A (%) | 95.0 | 95.0 | 95.0 | 95.0 |
| x = HFO-1132(E) | mass % | Expressions of curve b | | | |
| y = HFC-32 | mass % | y = 0.1603x2 − 0.7552x + 0.2562 | | | |
| z = HFO-1234yf | mass % | z = 100 − x − y | | | |

Both the points C and D are on the straight line c. That is, a line segment CD is a part of the straight line c. The straight line c is a straight line indicating any mass ratio providing a GWP of 125. The mixed refrigerant of the three components has a GWP of less than 125 in a region close to the apex. HFO-1132(E) and the apex HFO-1234yf with respect to the straight line c in the ternary composition diagram.

In a case where the mass % of HFO-1132(E), the mass % of HFC-32 and the mass % of HFO-1234yf are represented by x, y and z, respectively, in FIG. 2A, a line segment indicating any mass ratio providing a GWP of 125 is approximated to a line segment represented by the following expressions.

The line segment indicating any mass ratio providing a GWP of 125 is a part of the straight line c that connects two points of the point C and the point D (line segment CD in FIG. 2A)

$$y=18.0$$

$$z=100-x-y$$

$$10.1\leq x\leq 7.8$$

Both the points A and D are on the curve d. The curved is a curve indicating any mass ratio providing a flame velocity of 5 cm/s. The mixed refrigerant of the three components has a flame velocity of less than 5.0 cm/s in a region close to the apex HFO-1234yf with respect to the curve d in the ternary composition diagram.

The curve d is determined as follows.

Table 202 represents respective four points where WCF lower flammability is exhibited in a case where the mass % of HFO-1132(E) corresponds to 18.0, 30.0, 40.0 and 53.5 mass %. The curve d is indicated by a line that connects the four points, and the curve d is approximated by the expressions in Table 202, according to a least-squares method, in a case where the mass % of HFO-1132(E), the mass % of HFC-32 and the mass % of HFO-1234yf are represented by x, y and z, respectively.

TABLE 202

| Item | Unit | $d_{HFO\text{-}1132(E)=}$ | $d_{HFO\text{-}1132(E)=}$ | $d_{HFO\text{-}1132(E)=}$ | $d_{HFO\text{-}1132(E)=}$ |
|---|---|---|---|---|---|
| HFO-1132(E) | mass % | 18.0 | 30.0 | 40.0 | 53.5 |
| HFC-32 | mass % | 30.0 | 15.5 | 7.5 | 0.0 |
| HFO-1234yf | mass % | 52.0 | 54.5 | 52.5 | 46.5 |
| Flame velocity | cm/s | 5.0 | 5.0 | 5.0 | 5.0 |
| x = HFO-1132(E) | mass % | Expressions of curve d | | | |
| y = HFC-32 | mass % | y = 1.4211x2 − 1.8563x + 0.5871 | | | |
| z = HFO-1234yf | mass % | z = 100 − x − y | | | |

A ternary mixed refrigerant of HFO-1132(E), HFC-32 and HFO-1234yf has a GWP of 125 or less, a refrigerating capacity ratio relative to that of R404A of 95% or more, and a flame velocity of 5 cm/s or less, at any mass ratio within the range of a region (ABCD region) surrounded by lines that connect four points of the points A, B, C and D.

The mass ratio of the three components in the refrigerant 2A1 is preferably within the range of a region surrounded by a figure passing through four points:

point A (HEO-1132(E)/HFC-32/HFO-1234yf=51.8/1.0/47.2 mass %), point B (HFO-1132(E)/HFC-32/HFO-1234yf=35.3/1.0/63.7 mass %), point E (HFO-1132(E)/HFC-32/HFO-1234yf=15.2/14.3/70.5 mass %) and point F (HFO-1132(E)/HFC-32/HFO-1234yf=31.1/14.3/54.6 mass %);

in a ternary composition diagram with the three components as respective apexes.

In other words, the mass ratio of the three components in the refrigerant 2A1 is preferably within the range of a region surrounded by a straight line a, a curve b, a straight line e and a curve d that connect four points:

point A (HFO-1132(E)/HFC-32/HFO-1234yf=51.8/1.0/47.2 mass %), point B (HFO-1132(E)/f FC-32/HFO-1234yf=35.3/1.0/63.7 mass %), point E (HFO-1132(E)/HFC-32/HFO-1234yf=15.2/14.3/70.5 mass %) and point F (HFO-1132(E)/HFC-32/HFO-1234yf=31.1/143/54.6 mass %);

indicated in a ternary composition diagram of FIG. 2A, with the three components as respective apexes.

The ternary composition diagram with the three components as respective apexes is as described above.

The point A, the point B, the point E and the point F in FIG. 2A are each a point that is represented by a white circle (○) and that has the above coordinates.

The technical meanings of the points A and B are as described above.

The technical meanings of the points E and F are as follows. The concentration (mass %) at each of the points is the same as any value determined in Examples described below.

E: any mass ratio providing a refrigerating capacity relative to that of R404A of 95% and a GWP of 100

F: any mass ratio (GWP=100) providing a GWP of 100 and a flame velocity of 5 cm/s as measured according to ANSI/ASHRAE Standard 34-2013

The straight line a and the curve b are as described above. The point E is on the curve b.

Both the points E and F are on the straight line e. That is, a line segment EF is a part of the straight line e. The straight line e is a straight line indicating any mass ratio providing a GWP of 100. The mixed refrigerant of the three components has a GWP of less than 100 in a region close to the apex HFO-1132(E) and the apex HFO-1234yf with respect to the straight line e in the ternary composition diagram.

In a case where the mass % of HFO-1132(E), the mass % of HFC-32 and the mass % of HFO-1234yf are represented by x, y and z, respectively, in FIG. 2A, a line segment indicating any mass ratio providing a GWP of 100 is approximated to a line segment represented by the following expressions.

The line segment indicating any mass ratio providing a GWP of 100 is a part of the straight line e that connects two points of the point E and the point F (line segment EF in FIG. 2A)

$$y=14.3$$

$$z=100-x-y$$

$$15.2\leq x\leq 1.1$$

Both the points A and F on the curve d. The curved is as described above.

A ternary mixed refrigerant of HFO-1132(E), HFC-32 and HFO-1234yf has a GWP of 100 or less, a refrigerating capacity ratio relative to that of R404A of 95% or more, and a flame velocity of 5.0 cm/s or less, at any mass ratio within the range of a region (ABEF region) surrounded by lines that connect four points of the points A, B, E and F.

The refrigerant 2A1 includes 99.5 mass % or more of HFO-1132(E), HFC-32 and HFO-1234yf in terms of the sum of the concentrations of these components, and in particular, the total amount of HFO-1132(E), HFC-32 and HFO-1234yf in the entire refrigerant 2A1 is preferably 99.7 mass % or more, more preferably 99.8 mass % or more, further preferably 99.9 mass % or more.

The refrigerant 2A1 can further include other refrigerant, in addition to HFO-1132(E), ITC-32 and HFO-1234yf, as long as the above characteristics are not impaired. In such a case, the content rate of such other refrigerant in the entire refrigerant 2A1 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art Such other refrigerant may be included singly or in combinations of two or more kinds thereof in the refrigerant 2A1.

The refrigerant 2A1 particularly preferably consists only of HFO-1132(E), HFC-32 and HFO-1234yf. In other words, the refrigerant 2A1 particularly preferably includes HFO-1132(E), HFC-32 and HFO-1234yf at a total concentration of 100 mass % in the entire refrigerant A1.

In a case where the refrigerant 2A1 consists only of HFO-1132(E), HFC-32 and HFO-1234yf, the mass ratio of the three components is preferably within the range of a region surrounded by a figure passing through four points:

point A (HFO-1132(E)/HFC-32/HFO-1234yf=51.8/1.0/47.2 mass %), point B (HFO-1132(E)/HFC-32/HFO-1234yf=35.3/1.0/63.7 mass %), point C (HFO-1132(E)/H C-32/HFO-1234yf=10.1/18.0/71.9 mass %) and point D (HFO-1132(E)/HFC-32/FIFO-1234yf=27.8/18.0/54.2 mass %);

in the ternary composition diagram with the three components as respective apexes.

The technical meanings of the points A, B, C and D are as described above. The region surrounded by a figure passing through four points of the points A, B, C and D is as described above.

In such a case, a ternary mixed refrigerant of HFO-1132(E), HFC-32 and HFO-1234yf has a GWP of 125 or less, a refrigerating capacity ratio relative to that of R404A of 95% or more, and a flame, velocity of 5.0 cm/s or less, at any mass ratio within the range of a region (ABCD region) surrounded by lines that connect four points of the points A, B, C and D.

In a case where the refrigerant 2A1 consists only of HFO-1132(E), HFC-32 and HFO-1234yf, the mass ratio of the three components is more preferably within the range of a region surrounded by a figure passing through four points:

point A (HFO-1132(E)/HFC-32/HFO-1234yf=51.8/1.0/47.2 mass %), point B (HFO-1132(E)/HFC-32/HFO-1234yf=35:3/1.0/63.7 mass %), point E (HFO-1132(E)/HFC-32/HFO-1234yf=15.2/14.3/70.5 mass %) and point F (HFO-1132(E)/HFC-32/HFO-1234yf=31.1/14.3/54.6 mass %);

in the ternary composition diagram with the three components as respective apexes.

The technical meanings of the points A, B, E and F are as described above. The region surrounded by a figure passing through four points of the points A, B, E and F is as described above.

In such a case, a ternary mixed refrigerant of HFO-1132 (E), HFC-32 and HFO-1234yf has a GWP of 100 or less, a refrigerating capacity ratio relative to that of R404A of 95% or more, and a flame velocity of 5.0 cm/s or less, at any mass ratio within the range of a region (ABEF region) surrounded by lines that connect four points of the points A, B, E and E The refrigerant 2A1 has a GWP of 125 or less, and thus can remarkably suppress the environmental load from the viewpoint of global warming as compared with other general-purpose refrigerants.

(1-6-1-2) Refrigerant 2A2

The refrigerant 2A2 is a mixed refrigerant including HFO-1132(E), HFC-32 and HFO-1234yf as essential components. Hereinafter, HFO-1132(E), HFC-32 and HFO-1234yf are also referred to as "three components", in the present section.

The total concentration of the three components in the entire refrigerant 2A2 is 99.5 mass % or more. In other words, the refrigerant 2A2 includes 99.5 mass % or more of the three components in terms of the sum of the concentrations of these components.

A composition in which the mass ratio of the three components in the refrigerant 2A2 is within the range of a region surrounded by a figure passing through five points:

point P (HFO-1132(E)/HFC 32/HFO-1234yf=45.6/1.0/53.4 mass %), point B (HFO-1132(E)/HFC-32/UFO-1234yf=35.3/1.0/63.7 mass %), point Q (HFO-1132(E)/HFC-32/HFO-1234yf=1.0/24.8/74.2 mass %), point R (HFO-1132(E)/HFC-32/HFO-1234yf=1.0/29.2/69.8 mass %) and point S (HFO-1132(E)/HFC-32/HFO-1234yf=6.5/29.2/64.3 mass %);

in a ternary composition diagram with the three components as respective apexes.

Figure 2B:
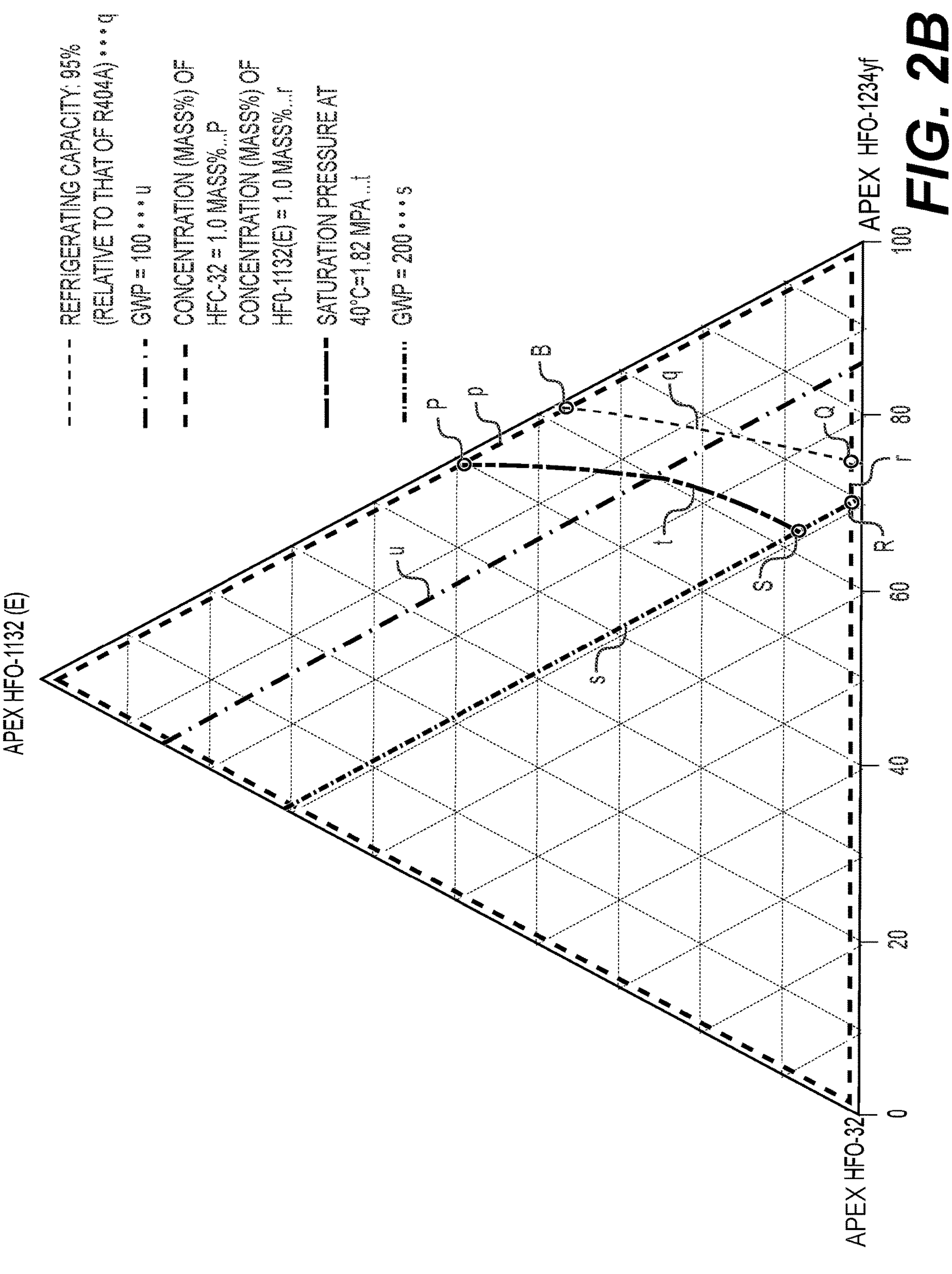
FIG. 2B is a diagram representing the mass ratio (a region surrounded by a figure passing through five points of points P, B, Q, R and S) of HFO-1132(E), HFC-32 and HFO-1234yf contained in a refrigerant A2, in a ternary composition diagram with HFO-1132(E), HFC-32 and HFO-1234yf.

In other words, the mass ratio of the three components in the refrigerant 2A2 is within the range of a region surrounded by a straight line p, a curve q, a straight liner, a straight lines and a curve t that connect five points:

point P (HFO-1132(E)/HFC-32/HFO-1234yf=45.6/1.0/53.4 mass %), point B (HFO-1132(E)/HFC-32/HFO-1234yf=35.3/1.0/63.7 mass %), point Q (HFO-1132(E)/HFC-32/HFO-1234yf=1.0/24.8/74.2 mass %), point R (HFO-1132(E)/HFC-32/HFO-1234yf=1.0/29.2/69.8 mass %) and point S (HFO-1132(E)/HFC-32/HFO-1234yf=6.5/29.2/64.3 mass %);

indicated in a ternary composition diagram of FIG. 2B, with the three components as respective apexes.

In the present section, the ternary composition diagram with the three components as respective apexes means a three-component composition diagram where the three components (HFO-1132(E), HFC-32 and HFO-1234yf) are assumed as respective apexes and the sum of the concentrations of HFO-1132(E), HFC-32 and HFO-1234yf is 100 mass %, as represented in FIG. 2B.

The refrigerant 2A2, which has such a configuration, thus has various characteristics of (1) a sufficiently low GWP (200 or less), (2) a refrigerating capacity and a coefficient of performance (COP) equivalent to or more than those of R404A when used as an alternative refrigerant of R404A, and (3) a pressure at 40° C. of 1.85 MPa or less.

In the present section, the coefficient of performance (COP) equivalent to or more than that of R404A means that the COP ratio relative to that of R404A is 100% or more (preferably 102% or more, more preferably 103% or more). The refrigerating capacity equivalent to or more than that of R404A means that the refrigerating capacity ratio relative to that of R404A is 95% or more (preferably 100% or more, more preferably 102 or more, most preferably 103% or more). A sufficiently low GWP means a GWP of 200 or less, preferably 150 or less, more preferably 125 or less, further preferably 100 or less.

The point P, the point B, the point Q, the point R and the point S in FIG. 2 are each a point that is represented by a white circle (○) and that has the above coordinates.

The technical meanings of the point P, the point B, the point Q, the point R and the point S are as follows. The concentration (mass %) at each of the points is the same as any value determined in Examples described below P: any mass ratio providing a pressure at 40° C. of 1.85 MPa and a concentration (mass %) of HFC-32 of 1.0 mass %

B: any mass ratio providing a concentration (mass %) of HFC-32 of 1.0 mass % and a refrigerating capacity relative to that of R404A of 95%

Q: any mass ratio providing a refrigerating capacity relative to that of R404A of 95% and a concentration (mass %) of HFO-1132(E) of 1.0 mass %

R any mass ratio providing a concentration (mass %) of HFO-1132(E) of 1.0 mass % and a GWP of 200

S: any mass ratio providing a GWP of 200 and a pressure at 40° C. of 1.85 MPa

Such "any mass ratio providing a pressure at 40° C. of 1.85 MPa" means any mass ratio providing a saturation pressure at a temperature of 40(° C.) of 1.85 MPa.

In a case where the mixed refrigerant of the three components in the refrigerant 2A2 has a saturation pressure at 40° C. of more than 1.85 MPa, there is a need for the change in design from a refrigerating apparatus for R404A. The mixed refrigerant of the three components preferably has a saturation pressure at 40° C. of 1.50 to 1.85 MPa, more preferably 1.60 to 1.85 MPa, further preferably 1.70 to 1.85 MPa, particularly preferably 1.75 to 1.85 MPa.

Both the points P and B are on the straight line p. That is, a line segment PB is a part of the straight line p. The straight line p is a straight line indicating any mass ratio providing a concentration (mass %) of HFC-32 of 1.0 mass %. The mixed refrigerant of the three components has a concentration of HFC-32 of more than 1.0 mass % in a region close to the apex HFC-32 with respect to the straight line p in the ternary composition diagram. The refrigerating capacity is unexpectedly high in a region close to the apex HFC-32 with respect to the straight line p in the ternary composition diagram.

In a case where the mass % of HFO-1132(E), the mass % of HFC-32 and the mass % of HFO-1234yf are represented by x, y and z, respectively, in FIG. 2B, a line segment indicating any mass ratio providing a concentration of HFC-32 of 1.0 mass % is approximated to a line segment represented by the following expressions.

The line segment indicating any mass ratio providing a concentration (mass %) of HFC-32 of 1.0 mass % is a part of the straight line p that connects two points of the point P and the point B (line segment PB in FIG. 2B)

$$y=1.0$$

$$z=100-x-y$$

$$35.3\leq x\leq 45.6$$

Both the points B and Q are on the curve q. The curve q is a curve indicating any mass ratio providing a refrigerating capacity relative to that of R404A of 95%. The mixed refrigerant of the three components has a refrigerating capacity relative to that of R404A of more than 95% in a region close to the apex HFO-1132(E) and the apex HFC-32 with respect to the curve q in the ternary composition diagram.

The curve q is determined as follows.

Table 203 represents respective four points where the refrigerating capacity ratio relative to that of R404A is 95% in a case where the mass % of HFO-1132(E) corresponds to 1.0, 10.1, 20.0 and 35.3. The curve q is indicated by a line that connects the four points, and the curve q is approximated by the expressions in Table 203, according to a least-squares method, in a case where the mass % of HFO-1132(E), the mass % of HFC-32 and the mass % of HFO-1234yf are represented by x, y and z, respectively.

TABLE 203

| Item | Unit | $q_{HFO\text{-}1132(E)=}$ | $q_{HFO\text{-}1132(E)=}$ | $q_{HFO\text{-}1132(E)=}$ | $q_{HFO\text{-}1132(E)=}$ |
|---|---|---|---|---|---|
| HFO-1132(E) | mass % | 1.0 | 10.1 | 20.0 | 35.3 |
| HFC-32 | mass % | 24.8 | 18.0 | 11.0 | 1.0 |
| HFO-1234yf | mass % | 74.2 | 71.9 | 69.0 | 63.7 |
| Refrigerating capacity | relative to that of R404A (%) | 95 | 95 | 95 | 95 |
| x = HFO-1132(E) | mass % | Expressions of curve q | | | |
| y = HFC-32 | mass % | y = 0.1603x2 − 0.7552x + 0.2562 | | | |
| z = HFO-1234yf | mass % | z = 100 − x − y | | | |

Both the points Q and R are on the straight liner. That is, a line segment QR is a part of the straight liner. The straight line r is a straight line indicating any mass ratio providing a concentration (mass %) of HFO-1132(E) of 1.0 mass %. The mixed refrigerant of the three components has a concentration of HFO-1132(E) of more than 1.0 mass % in a region close to the apex HFO-1132(E) with respect to the straight liner in the ternary composition diagram. The refrigerating capacity is unexpectedly high in a region close to the apex HFO-1132(E) with respect to the straight liner in the ternary composition diagram.

In a case where the mass % of HFO-1132(E), the mass % of HFC-32 and the mass % of HFO-1234yf are represented by x, y and z, respectively, in FIG. 2B, a line segment indicating any mass ratio providing a concentration of HFO-1132(E) of 1.0 mass % is approximated to a line segment represented by the following expressions.

The line segment indicating any mass ratio providing a concentration (mass %) of HFO-1132(E) of 1.0 mass % is a part of the straight liner that connects two points of the point Q and the point R (line segment QR in FIG. 2B)

$$x=1.0$$

$$z=100-x-y$$

$$24.8 \le y \le 29.2$$

Both the points R and S are on the straight line s. That is, a line segment RS is a part of the straight line s. The straight line s is a straight line indicating any mass ratio providing a GWP of 200. The mixed refrigerant of the three components has a GWP of less than 200 in a region close to the apex HFO-1132(E) and the apex HFO-1234yf with respect to the straight lines in the ternary composition diagram.

In a case where the mass % of HFO-1132(E), the mass % of HFC-32 and the mass % of HFO-1234yf are represented by x, y and z, respectively, in FIG. 2B, a line segment indicating any mass ratio providing a GWP of 200 is approximated to a line segment represented by the following expressions.

The line segment indicating any mass ratio providing a GWP of 200 is a part of the straight lines that connects two points of the point R and the point S (line segment RS in FIG. 2B)

$$y=29.2$$

$$z=100-x-y$$

$$1.0 \le x \le 6.5$$

Both the points P and S are on the curve t. The curve t is a curve indicating any mass ratio providing a pressure at 40° C. of 1.85 MPa. The mixed refrigerant of the three components has a pressure at 40° C. of less than 1.85 MPa in a region close to the apex HFO-1234yf with respect to the curve t in the ternary composition diagram.

The curve t is determined as follows.

Table 204 represents respective four points where the pressure at 40° C. is 1.85 MPa in a case where the mass % of HFO-1132(E) corresponds to 5.95, 18.00, 32.35 and 47.80. The curve t is indicated by a line that connects the four points, and the curve t is approximated by the expressions in Table 204, according to a least-squares method, in a case where the mass % of HFO-1132(E), the mass % of HFC-32 and the mass % of HFO-1234yf are represented by x, y and z, respectively.

TABLE 204

| Item | Unit | $t_{HFO\text{-}1132(E)=}$ | $t_{HFO\text{-}1132(E)=}$ | $t_{HFO\text{-}1132(E)=}$ | $t_{HFO\text{-}1132(E)=}$ |
|---|---|---|---|---|---|
| HFO-1132(E) | mass % | 5.6 | 17.0 | 30.7 | 45.6 |
| HFC-32 | mass % | 30.0 | 20.0 | 10.0 | 1.0 |
| HFO-1234yf | mass % | 64.4 | 63.0 | 59.3 | 53.4 |

TABLE 204-continued

| Item | Unit | $t_{HFO\text{-}1132(E)=}$ | $t_{HFO\text{-}1132(E)=}$ | $t_{HFO\text{-}1132(E)=}$ | $t_{HFO\text{-}1132(E)=}$ |
|---|---|---|---|---|---|
| Pressure at 40° C. | Mpa | 1.850 | 1.850 | 1.850 | 1.850 |
| x = HFO-1132(E) | mass % | Expressions of curve t | | | |
| y = HFC-32 | mass % | y = 0.5016x2 − 0.9805x + 0.3530 | | | |
| z = HFO-1234yf | mass % | z = 100 − x − y | | | |

A ternary mixed refrigerant of HFO-1132(E), HFC-32 and HFO-1234yf has a GWP of 200 or less, a refrigerating capacity ratio relative to that of R404A of 95% or more, and a pressure at 40° C. of 1.85 MPa or less, at any mass ratio within the range of a region (PBQRS region) surrounded by lines that connect five points of the points P, B, Q, R and S.

The refrigerant 2A2 includes 99.5 mass % or more of HFO-1132(E), HFC-32 and HFO-1234yf in terms of the sum of the concentrations of these components, and in particular, the total amount of HFO-1132(E), HFC-32 and HFO-1234yf in the entire refrigerant 2A2 is preferably 99.7 mass % or more, more preferably 99.8 mass % or more, further preferably 99.9 mass % or more.

The refrigerant 2A2 can further include other refrigerant, in addition to HFO-1132(E), HFC-32 and HFO-1234yf, as long as the above characteristics are not impaired. In such a case, the content rate of such other refrigerant in the entire refrigerant 2A2 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 2A2.

The refrigerant 2A2 particularly preferably consists only of HFO-1132(E), HFC-32 and HFO-1234yf. In other words, the refrigerant 2A2 particularly preferably includes HFO-1132(E), HFC-32 and HFO-1234yf at a total concentration of 100 mass % in the entire refrigerant 2A2.

In a case where the refrigerant 2A2 consists only of HFO-1132(E), HFC-32 and HFO-1234yf, the mass ratio of the three components is preferably within the range of a region surrounded by a figure passing through five points:

point P (HFO-1132(E)/HFC-32/HFO-1234yf=45.6/1.0/53.4 mass %), point B (HFO-1132(E)/IBC-32/HFO-1234yf=35.3/1.0/63.7 mass %), point Q (HFO-1132(E)/HFC-32/HFO-1234yf=1.0/24.8/74.2 mass %), point R (HFO-1132(E)/HFC-32/HFO-1234yf=1.0/29.2/69.8 mass %) and point S (HFO-1132(E)/HFC-32/HFO-1234yf=6.5/29.2/64.3 mass %);

in the ternary composition diagram with the three components as respective apexes.

The technical meanings of the point P, the point B, the point Q, the point R and the point S are as described above. The region surrounded by a figure passing through five points of the point P, the point B, the point Q, the point R and the point S is as described above.

In such a case, a ternary mixed refrigerant of HFO-1132(E), HFC-32 and HFO-1234yf has a GWP of 300 or less, a refrigerating capacity ratio relative to that of R404A of 95% or more, and a pressure at 40° C. of 1.85 MPa, at any mass ratio within the range of a region (PBQRS region) surrounded by lines that connect five points of the points P, B, Q, R and S.

The refrigerant 2A2 has a GWP of 200 or less, and thus can remarkably suppress the environmental load from the viewpoint of global warming as compared with other general-purpose refrigerants.

Examples of Refrigerant 2A

Hereinafter, the refrigerant 2A will be described with reference to Examples in more detail. It is noted that the present disclosure is not limited to such Examples.

Test Example 1

The GWP of each mixed refrigerant represented in Examples 1-1 to 1-11, Comparative Examples 1-1 to 1-6 and Reference Example 1-1 (R404A) was evaluated based on the value in the fourth report of IPCC (Intergovernmental Panel on Climate Change).

The COP, the refrigerating capacity and the saturation pressure at 40° C. of such each mixed refrigerant were determined by performing theoretical refrigeration cycle calculation with respect to such each mixed refrigerant under the following conditions by using National Institute of Science and Technology (NISI), and Reference Fluid Thermodynamic and Transport Properties Database (Refprop 9.0).

Evaporating temperature −40° C.
Condensation temperature 40° C.
Superheating temperature 20 K
Subcooling temperature 0 K
Compressor efficiency 70%

The results in Test Example 1 are shown in Table 205 and Table 206. Tables 205 and 206 show Examples and Comparative Examples of the refrigerant 2A1 of the present disclosure. In Tables 205 and 206, the "COP ratio (relative to that of R404A)" and the "Refrigerating capacity ratio (relative to that of R404A)" each represent the proportion (%) relative to that of R404A. In Tables 205 and 206, the "saturation pressure (40° C.)" represents the saturation pressure at a saturation temperature of 40° C.

The coefficient of performance (COP) was determined according to the following expression.

COP=(Refrigerating capacity or heating capacity)/Power consumption

The flammability of such each mixed refrigerant was determined by defining the mixed composition of such each mixed refrigerant as the WCF concentration, and measuring the flame velocity according to ANSI/ASHRAE Standard 34-2013.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any, flame was recorded by a high-speed digital video camera at a frame rate of 600 fps, and stored in a PC. Any case where the flame velocity was unmeasurable (0 cm/s) was rated as "NA (non-flammability)".

The flammable range of the mixed refrigerant was measured by using a measurement apparatus (see FIG. 1T) based on ASTM E681-09. Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)

Test temperature: 60° C.±3° C.

Pressure: 101.3 kPa±0.7 kPa

Water content: 0.0088 g±0.0005 g per gram of dry air (water content at a relative humidity of 50% at 23° C.)

Mixing ratio of refrigerant composition/air: ±0.2 vol. % by 1 vol. %

Mixing of refrigerant composition: ±0.1 mass %

Ignition method: AC discharge, voltage 15 kV, current 30 mA, neon transformer

Electrode interval: 6.4 mm (¼ inches)

Spark: 0.4 seconds±0.05 seconds

Criteria for determination:

A case where any flame was spread at more than 90 degrees around the ignition point flame propagation (flammability)

A case where any flame was spread at 90 degrees or less around the ignition point: no flame propagation (non-flammability)

TABLE 205

| Item | | Unit | Reference Example 1-1 (R404A) | Comparative Example 1-1 | Comparative Example 1-2 | Comparative Example 1-3 | Comparative Example 14 | Comparative Example 1-5 |
|---|---|---|---|---|---|---|---|---|
| Composition proportions | HFO-1132(E) | mass % | 0% | 40.0% | 30.0% | 20.0% | 10.0% | 10.0% |
| | HFC-32 | mass % | 0% | 10.0% | 20.0% | 10.0% | 10.0% | 30.0% |
| | HFO-1234yf | mass % | 0% | 50.0% | 50.0% | 70.0% | 80.0% | 60.0% |
| | HFC-125 | mass % | 44.0% | 0% | 0% | 0% | 0% | 0% |
| | HFC-143a | mass % | 52.0% | 0% | 0% | 0% | 0% | 0% |
| | HFC-134a | mass % | 4.0% | 0% | 0% | 0% | 0% | 0% |
| GWP | | — | 3922 | 74 | 140 | 72 | 72 | 206 |
| COP ratio (relative to that of R404A) | | % | 100 | 105.2 | 105.8 | 106.1 | 106.6 | 107.5 |
| Refrigerating capacity ratio (relative to that of R404A) | | % | 100 | 116.0 | 121.4 | 93.3 | 81.3 | 113.9 |
| Saturation pressure (40° C.) | | MPa | 1.822 | 1.982 | 2.044 | 1.684 | 1.513 | 1.922 |
| Flame velocity | | cm/s | NA (non-flammability) | 5.7 | 5.8 | 2.8 | 2.2 | 3.8 |

| Item | | Unit | Comparative Example 1-6 | Example 1-1 | Example 1-2 | Example 1-3 | Example 1-4 | Example 1-5 |
|---|---|---|---|---|---|---|---|---|
| Composition proportions | HFO-1132(E) | mass % | 14.0% | 43.0% | 35.0% | 30.0% | 24.0% | 20.0% |
| | HFC-32 | mass % | 21.0% | 2.0% | 7.0% | 10.0% | 14.0% | 15.0% |
| | HFO-1234yf | mass % | 65.0% | 55.0% | 58.0% | 60.0% | 62.0% | 65.0% |
| | HFC-125 | mass % | 0% | 0% | 0% | 0% | 0% | 0% |
| | HFC-143a | mass % | 0% | 0% | 0% | 0% | 0% | 0% |
| | HFC-134a | mass % | 0% | 0% | 0% | 0% | 0% | 0% |
| GWP | | — | 146 | 20 | 53 | 73 | 100 | 106 |
| COP ratio (relative to that of R404A) | | % | 106.8 | 105.1 | 105.4 | 105.6 | 106.0 | 106.3 |
| Refrigerating capacity ratio (relative to that of R404A) | | % | 104.6 | 105.3 | 105.3 | 104.8 | 104.8 | 101.8 |
| Saturation pressure (40° C.) | | MPa | 1.821 | 1.839 | 1.845 | 1.839 | 1.836 | 1.795 |
| Flame velocity | | cm/s | 3.5 | 4.1 | 4.0 | 3.9 | 4.1 | 3.5 |

TABLE 206

| Item | | Unit | Reference Example 1-1 (R404A) | Example 1-6 A | Example 1-7 B | Example 1-8 C | Example 1-9 D | Example 1-10 E | Example 1-11 F |
|---|---|---|---|---|---|---|---|---|---|
| Composition proportions | HFO-1132(E) | mass % | 0% | 51.8% | 35.3% | 10.1% | 27.8% | 15.2% | 31.1% |
| | HFC-32 | mass % | 0% | 1.0% | 1.0% | 18.0% | 18.0% | 14.3% | 14.3% |
| | HFO-1234yf | mass % | 0% | 47.2% | 63.7% | 71.9% | 54.2% | 70.5% | 54.6% |
| | HFC-125 | mass % | 44.0% | 0% | 0% | 0% | 0% | 0% | 0% |
| | HFC-143a | mass % | 52.0% | 0% | 0% | 0% | 0% | 0% | 0% |
| | HFC-134a | mass % | 4.0% | 0% | 0% | 0% | 0% | 0% | 0% |
| GWP | | — | 3922 | 14 | 13 | 125 | 125 | 100 | 100 |
| COP ratio (relative to that of R404A) | | % | 100 | 105.0 | 105.3 | 107.0 | 105.9 | 106.5 | 105.7 |
| Refrigerating capacity ratio (relative to that of R404A) | | % | 100 | 113.0 | 95.0 | 95.0 | 115.7 | 95.0 | 113.4 |
| Saturation pressure (40° C.) | | MPa | 1.822 | 1.933 | 1.701 | 1.696 | 1.974 | 1.702 | 1.948 |
| Flame velocity | | cm/s | NA (non-flammability) | 5.0 | 2.5 | 3.0 | 5.0 | 3.0 | 5.0 |

Test Example 2

The GWP of each mixed refrigerant represented in Examples 2-1 to 2-11, Comparative Examples 2-1 to 2-5 and Reference Example 2-1 (R404A) was evaluated based on the value in the fourth report of IPCC.

The COP, the refrigerating capacity and the saturation pressure at 40° C. of such each mixed refrigerant were determined by performing theoretical refrigeration cycle calculation with respect to such each mixed refrigerant under the following conditions by using National Institute of Science and Technology (NISI), and Reference Fluid Thermodynamic and Transport Properties Database (Refprop 9.0).

Evaporating temperature −40° C.
Condensation temperature 40° C.
Superheating temperature 20 K
Subcooling temperature 0 K
Compressor efficiency 70%

The results in Test Example 2 are shown in Tables 207 and 208. Tables 207 and 208 show Examples and Comparative Examples of the refrigerant 2A2 of the present disclosure. In Tables 207 and 208, the meaning of each of the terms is the same as in Test Example 1.

The coefficient of performance (COP) was determined according to the following expression.

COP=(Refrigerating capacity or heating capacity)/Power consumption

The flammability of such each mixed refrigerant was determined in the same manner as in Test Example 1. The flame velocity test was performed in the same manner as in Test Example 1.

The flammable range of the mixed refrigerant was measured by using a measurement apparatus (see FIG. 1T) based on ASTM E681-09, with the same method and test conditions as in Test Example 1.

TABLE 207

| Item | | Unit | Reference Example 2-1 (R404A) | Comparative Example 2-1 | Comparative Example 2-2 | Comparative Example 2-3 | Comparative Example 2-4 | Comparative Example 2-5 |
|---|---|---|---|---|---|---|---|---|
| Composition proportions | HFO-1132(E) | mass % | 0% | 40.0% | 30.0% | 20.0% | 10.0% | 10.0% |
| | HFC-32 | mass % | 0% | 10.0% | 20.0% | 10.0% | 10.0% | 30.0% |
| | HFO-1234yf | mass % | 0% | 50.0% | 50.0% | 70.0% | 80.0% | 60.0% |
| | HFC-125 | mass % | 44.0% | 0% | 0% | 0% | 0% | 0% |
| | HFC-143a | mass % | 52.0% | 0% | 0% | 0% | 0% | 0% |
| | HFC-134a | mass % | 4.0% | 0% | 0% | 0% | 0% | 0% |
| GWP | | — | 3922 | 74 | 140 | 72 | 72 | 206 |
| COP ratio (relative to that of R404A) | | % | 100 | 105.2 | 105.8 | 106.1 | 106.6 | 107.5 |
| Refrigerating capacity ratio (relative to that of R404A) | | % | 100 | 116.0 | 121.4 | 93.3 | 81.3 | 113.9 |
| Saturation pressure (40° C.) | | MPa | 1.822 | 1.982 | 2.044 | 1.684 | 1.513 | 1.922 |
| Flame velocity | | cm/s | NA (non-flammability) | 5.7 | 5.8 | 2.8 | 2.2 | 3.8 |

| Item | | Unit | Example 2-1 | Example 2-2 | Example 2-3 | Example 24 | Example 2-5 | Example 2-6 |
|---|---|---|---|---|---|---|---|---|
| Composition proportions | HFO-1132(E) | mass % | 43.0% | 35.0% | 30.0% | 24.0% | 14.0% | 20.0% |
| | HFC-32 | mass % | 2.0% | 7.0% | 10.0% | 14.0% | 21.0% | 15.0% |
| | HFO-1234yf | mass % | 55.0% | 58.0% | 60.0% | 62.0% | 65.0% | 65.0% |
| | HFC-125 | mass % | 0% | 0% | 0% | 0% | 0% | 0% |
| | HFC-143a | mass % | 0% | 0% | 0% | 0% | 0% | 0% |
| | HFC-134a | mass % | 0% | 0% | 0% | 0% | 0% | 0% |

TABLE 207-continued

| | | | | | | | |
|---|---|---|---|---|---|---|---|
| GWP | — | 20 | 53 | 73 | 100 | 146 | 106 |
| COP ratio (relative to that of R404A) | % | 105.1 | 105.4 | 105.6 | 106.0 | 106.8 | 106.3 |
| Refrigerating capacity ratio (relative to that of R404A) | % | 105.3 | 105.3 | 104.8 | 104.8 | 104.6 | 101.8 |
| Saturation pressure (40° C.) | MPa | 1.839 | 1.845 | 1.839 | 1.836 | 1.821 | 1.795 |
| Flame velocity | cm/s | 4.1 | 4.0 | 3.9 | 4.1 | 3.5 | 3.5 |

TABLE 208

| Item | | Unit | Reference Example 2-1 (R404A) | Example 2-7 P | Example 2-8 B | Example 2-9 Q | Example 2-10 R | Example 2-11 S |
|---|---|---|---|---|---|---|---|---|
| Composition proportions | HFO-1132(E) | mass % | 0% | 45.6% | 35.3% | 1.0% | 1.0% | 6.5% |
| | HFC-32 | mass % | 0% | 1.0% | 1.0% | 24.8% | 29.2% | 29.2% |
| | HFO-1234yf | mass % | 0% | 53.4% | 63.7% | 74.2% | 69.8% | 64.3% |
| | HFC-125 | mass % | 44.0% | 0% | 0% | 0% | 0% | 0% |
| | HFC-143a | mass % | 52.0% | 0% | 0% | 0% | 0% | 0% |
| | HFC-134a | mass % | 4.0% | 0% | 0% | 0% | 0% | 0% |
| GWP | | — | 3922 | 14 | 13 | 170 | 200 | 200 |
| COP ratio (relative to that of R404A) | | % | 100 | 105.1 | 105.3 | 108.0 | 108.2 | 107.7 |
| Refrigerating capacity ratio (relative to that of R404A) | | % | 100 | 106.4 | 95.0 | 95.0 | 101.8 | 108.5 |
| Saturation pressure (40° C.) | | MPa | 1.822 | 1.850 | 1.701 | 1.674 | 1.757 | 1.850 |
| Flame velocity | | cm/s | NA (non-flammability) | 4.3 | 2.5 | 2.7 | 2.9 | 3.4 |

(1-6-2) Refrigerant 2B

The refrigerant 2B is a mixed refrigerant including HFO-1132(E), HFO-1123 and HFO-1234yf as essential components. Hereinafter, HFO-1132(E), HFO-1123 and HFO-1234yf are also referred to as "three components", in the present section.

The total concentration of the three components in the entire refrigerant 2B is 99.5 mass % or more. In other words, the refrigerant 2B includes 99.5 mass % or more of the three components in terms of the sum of the concentrations of these components.

The mass ratio of the three components in the refrigerant 2B is within the range of a region surrounded by a figure passing through five points:

point A (HFO-1132(E)/HFO-1123/HFO-1234yf=42.5/1.0/56.5 mass %), point B (HFO-1132(E)/HFO-1123/HFO-1234yf=27.1/1.0/71.9 mass %), point C (HFO-1132(E)/HFO-1123/HFO-1234yf=1.0/30.4/68.6 mass %), point D (HFO-1132(E)/HFO-1123/HFO-1234yf=1.0/57.0/42.0 mass %) and point E (HFO-1132(E)/HFO-1123/HFO-1234yf=42.5/24.1/33.4 mass %);

in a ternary composition diagram with the three components as respective apexes.

Figure 2C:
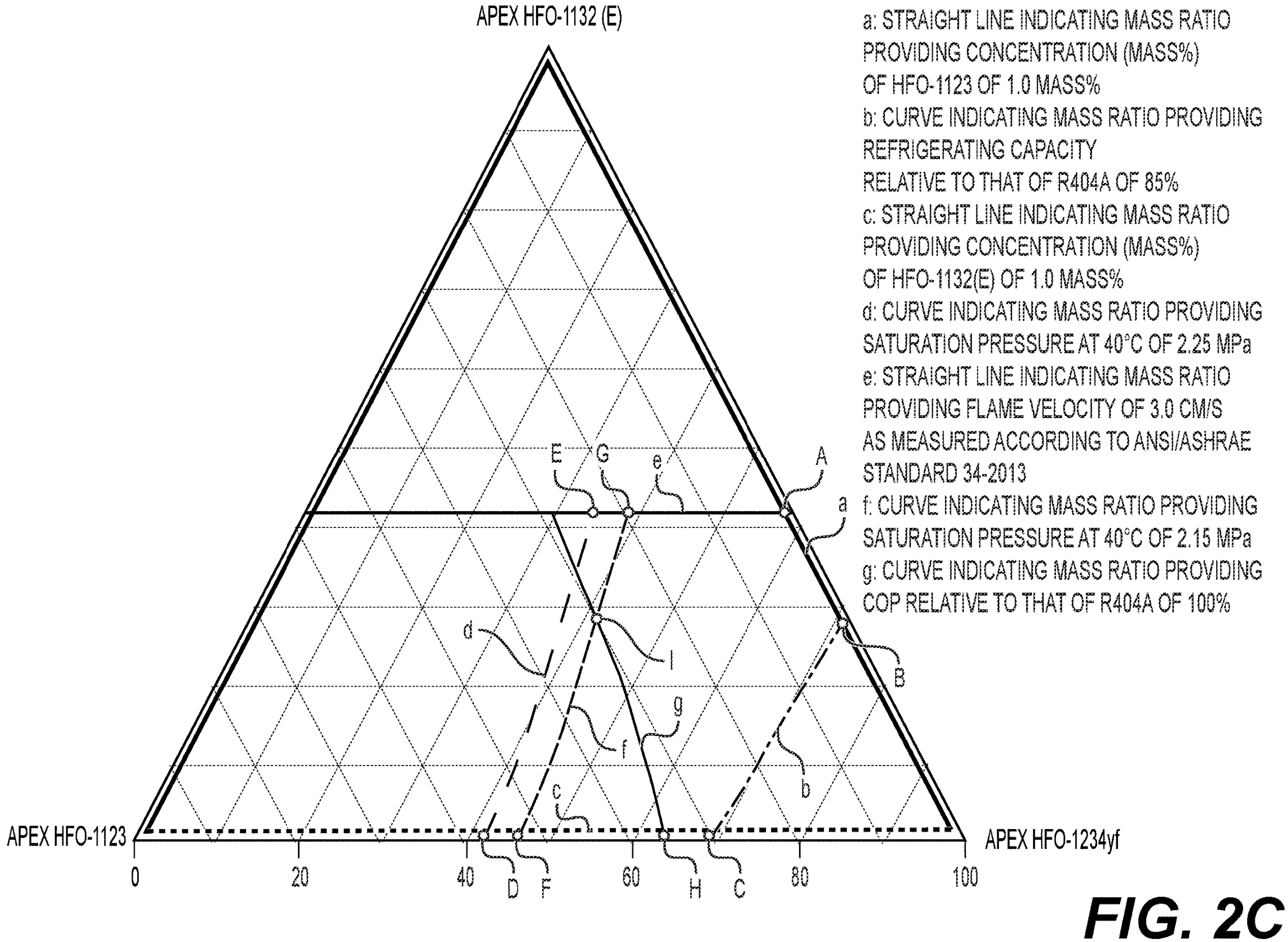
FIG. 2C is a diagram representing the mass ratio (a region surrounded by a figure passing through five points of points A, B, C, D and E, a region surrounded by a figure passing through five points of points A, B, C, F and G, and a region surrounded by figure passing through six points of points A, B, C, H, I and G) of HFO-1132(E), HFO-1123 and HFO-1234yf contained in a refrigerant 1B, in a ternary composition diagram with HFO-1132(E), HFO-1123 and HFO-1234yf.
Figure 2D:
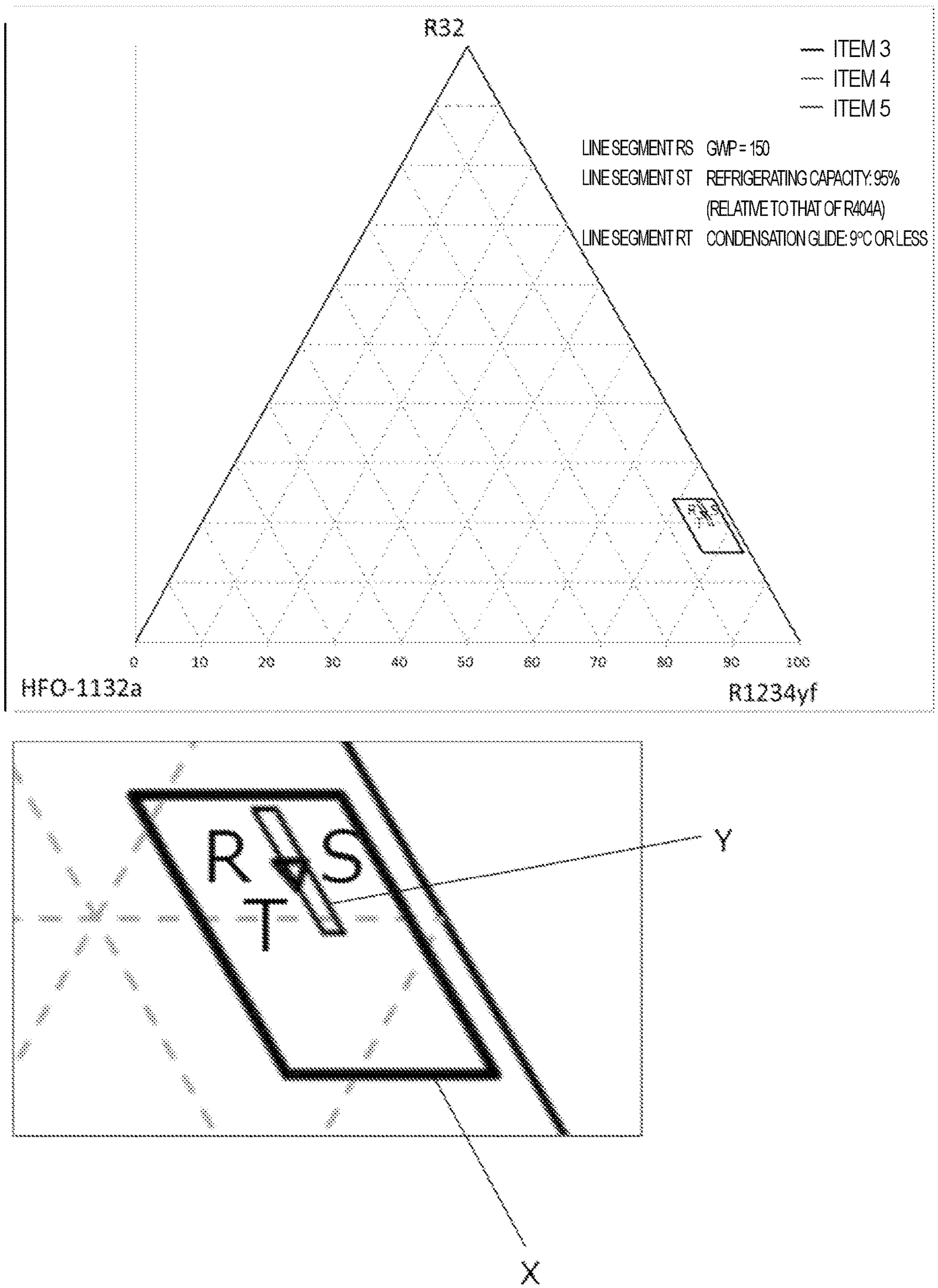
FIG. 2Da is a three-component composition diagram for explaining the composition of any refrigerant 2D according to a first aspect and a second aspect of the present disclosure. In an enlarged view of FIG. 1A, the maximum composition of the refrigerant 2D according to the fast aspect is within the range of a quadrangle indicated by X or is on line segments of the quadrangle. In the enlarged view of FIG. 2A, a preferable composition of the refrigerant of the first aspect is within the range of a quadrangle indicated by Y or is on line segments of the quadrangle. In the enlarged view of FIG. 2A, the composition of the refrigerant 2D of the second aspect is within the range of a triangle surrounded by line segments RS, ST and TR or is on the line segments.
Figure 2D:
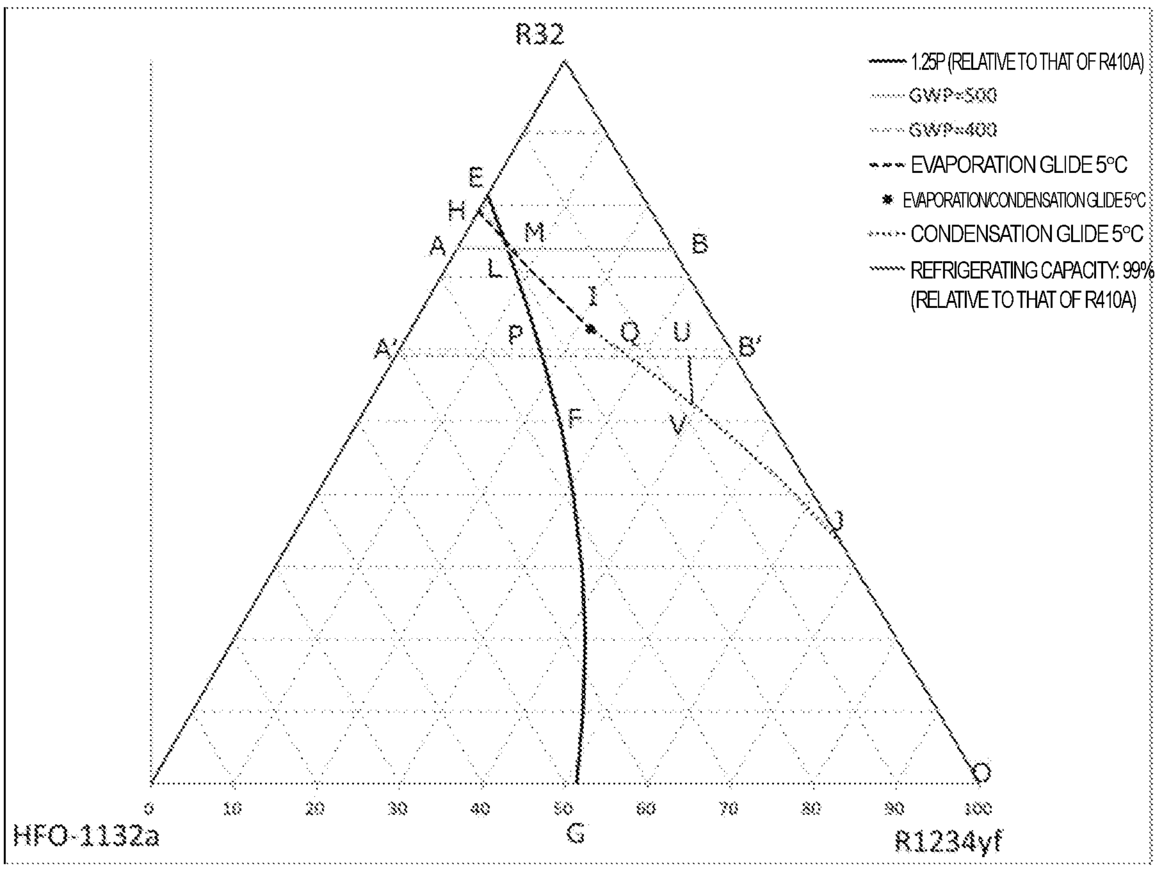
Figure 2E:
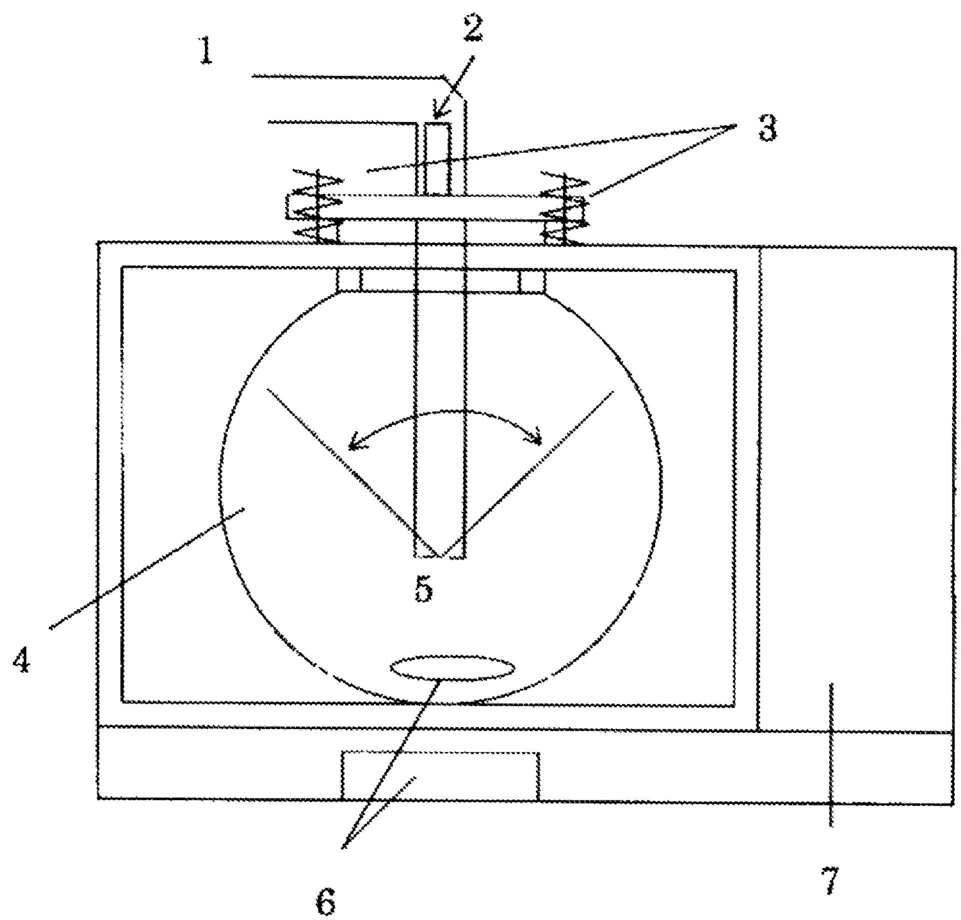
FIG. 2E is a schematic view of an apparatus for use in a flammability test.
Figure 2F:
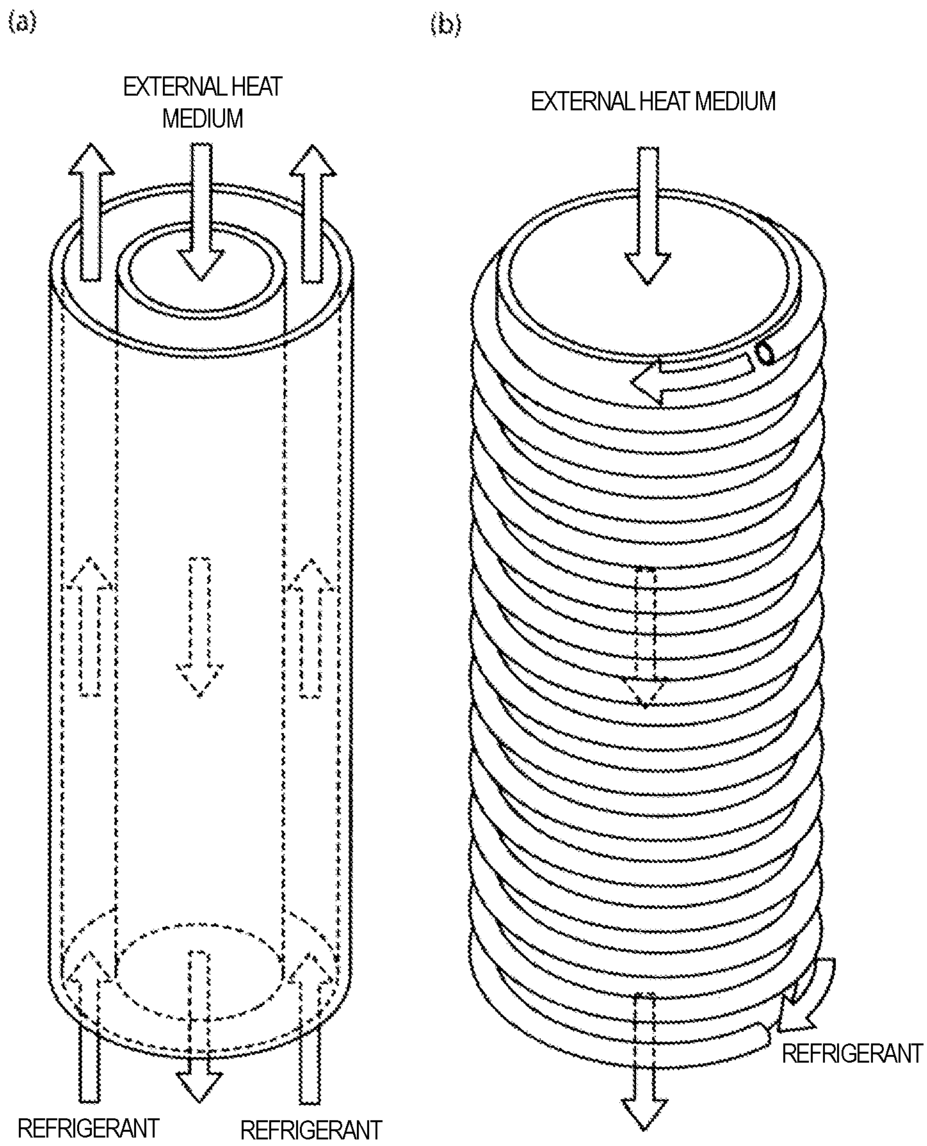
FIG. 2F is a schematic view illustrating one example of a countercurrent heat exchanger.
Figure 2G:
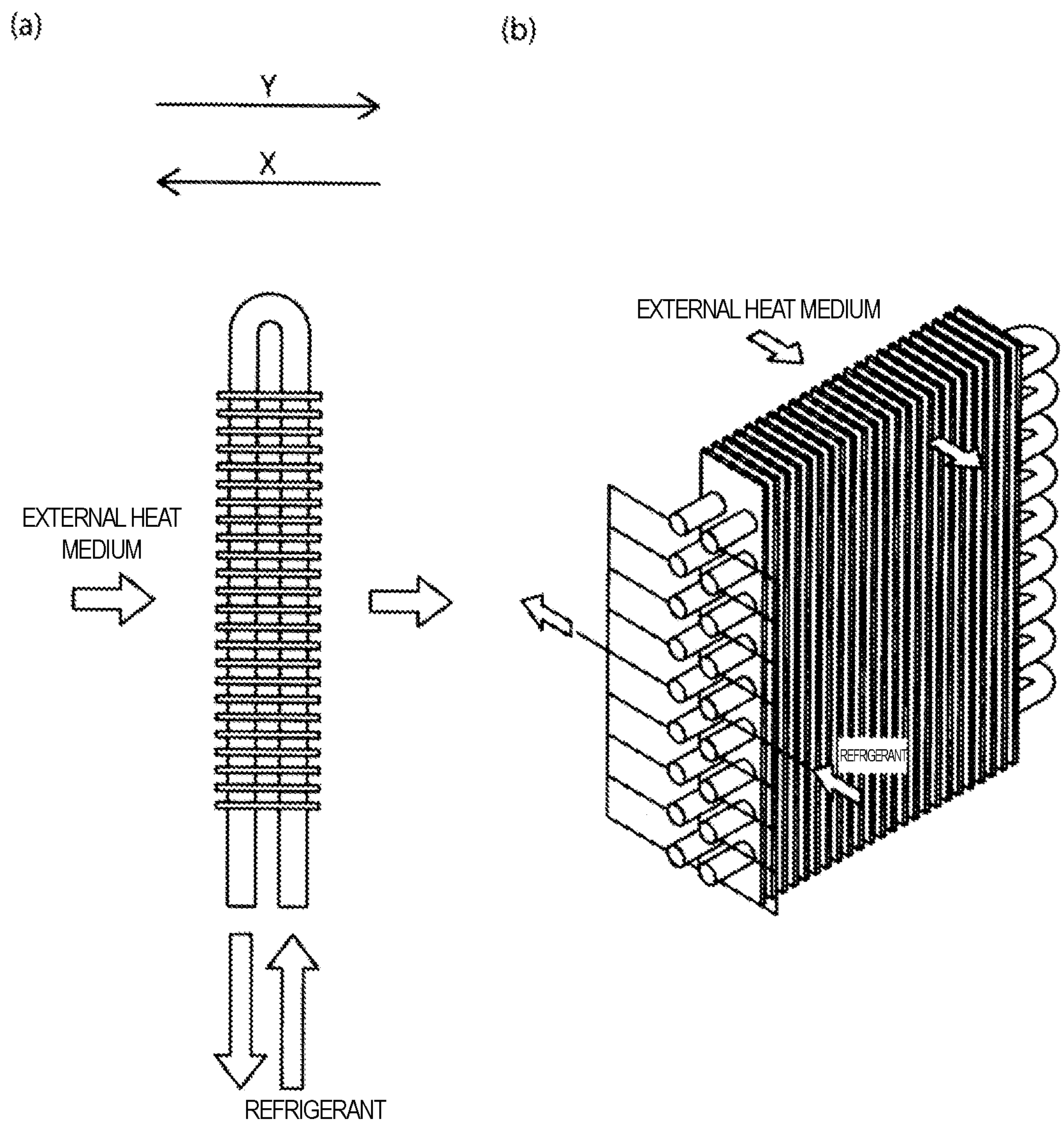
FIG. 2G are schematic views each illustrating one example of a countercurrent heat exchanger, and (a) is a plan view and (b) is a perspective view.
Figure 2H:
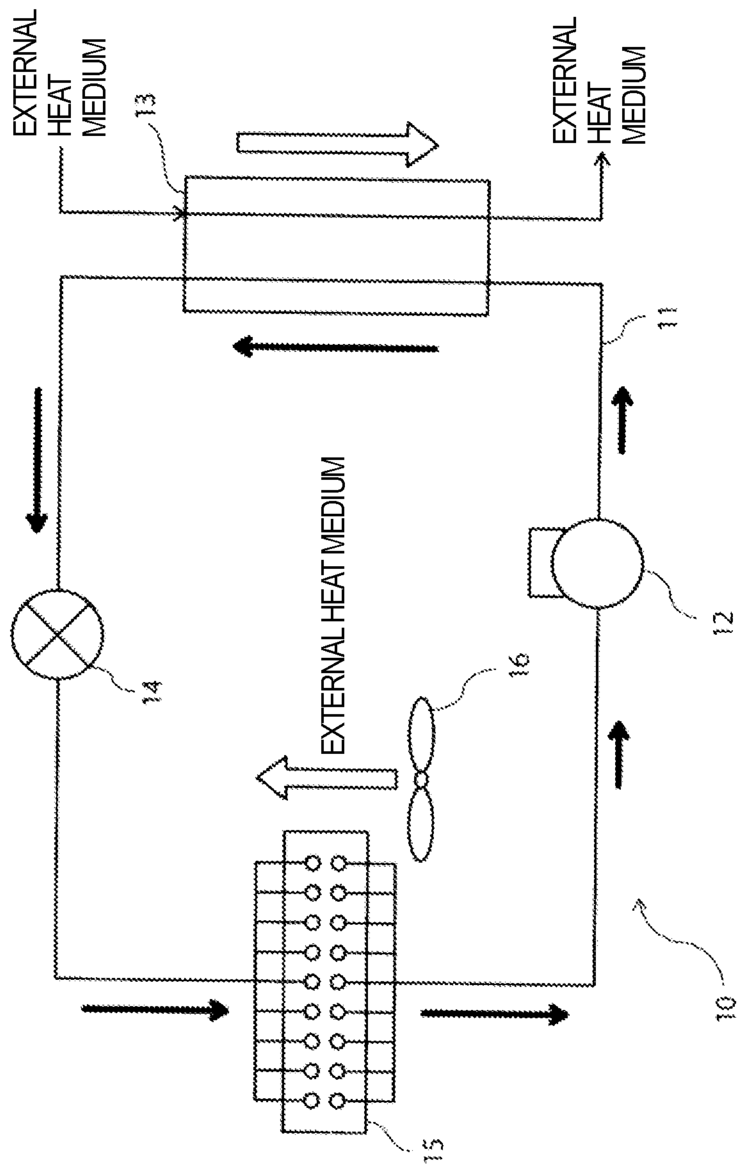
FIG. 2H is a schematic view illustrating one aspect of a refrigerant circuit in a refrigerator of the present disclosure.
Figure 2I:
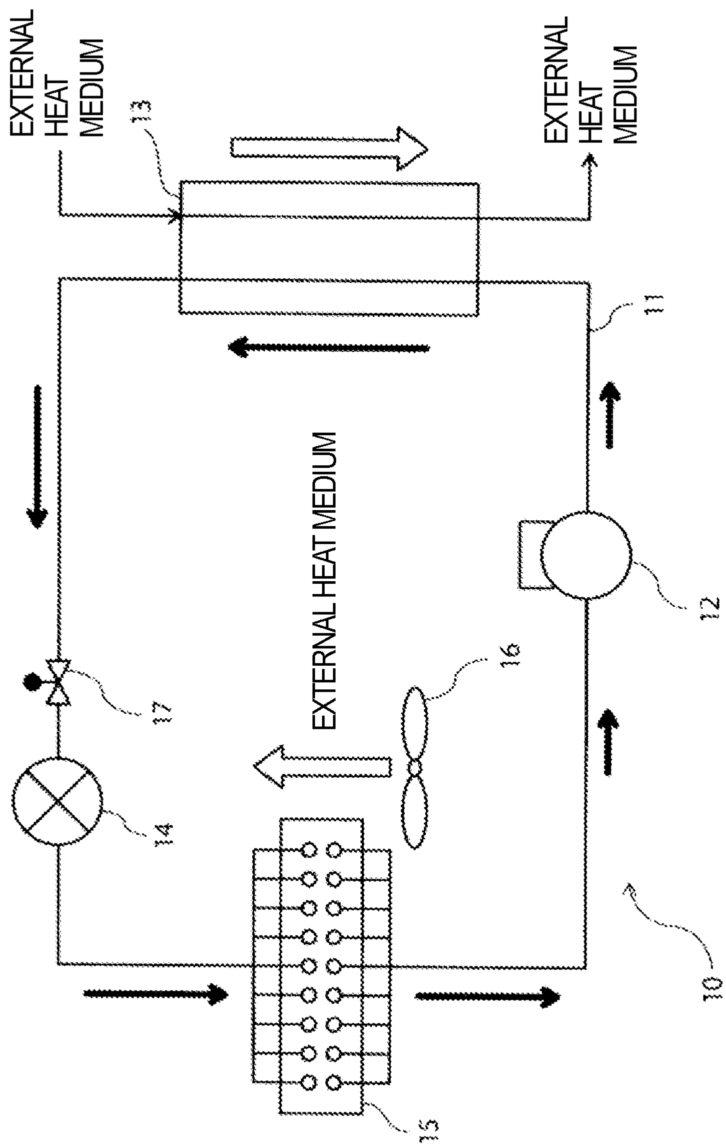
FIG. 2I is a schematic view illustrating a variant of the refrigerant circuit in FIG. 2H.
Figure 2J:
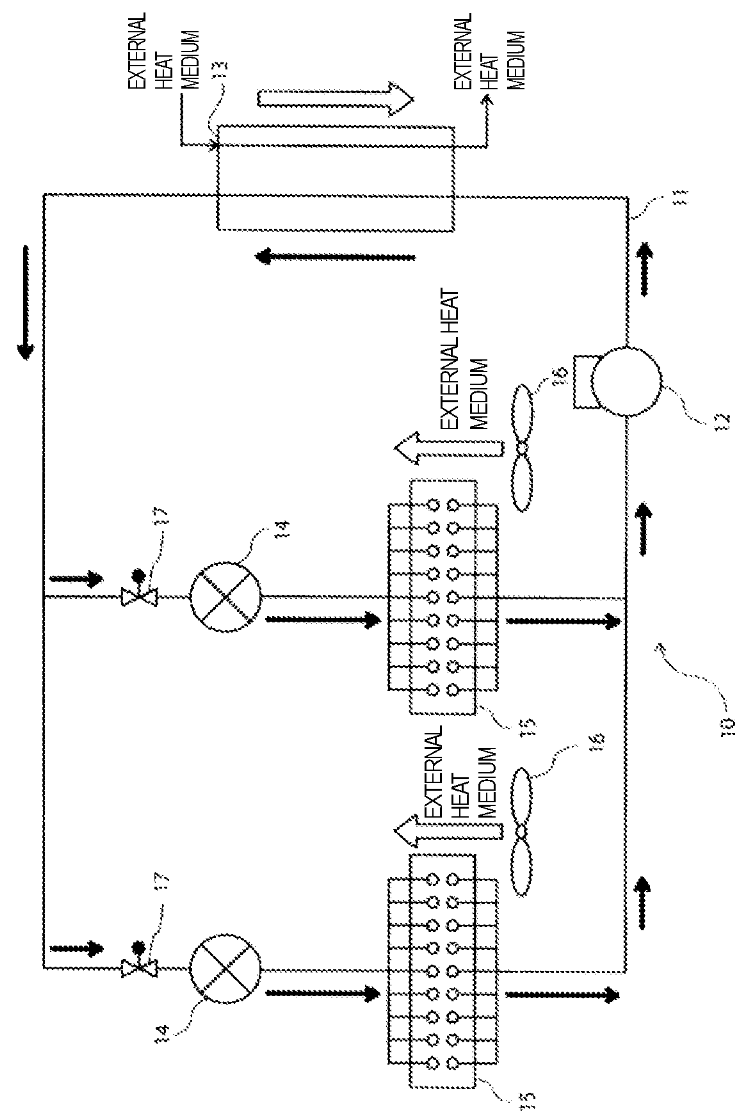
FIG. 2J is a schematic view illustrating a variant of the refrigerant circuit in FIG. 2H.
Figure 2K:
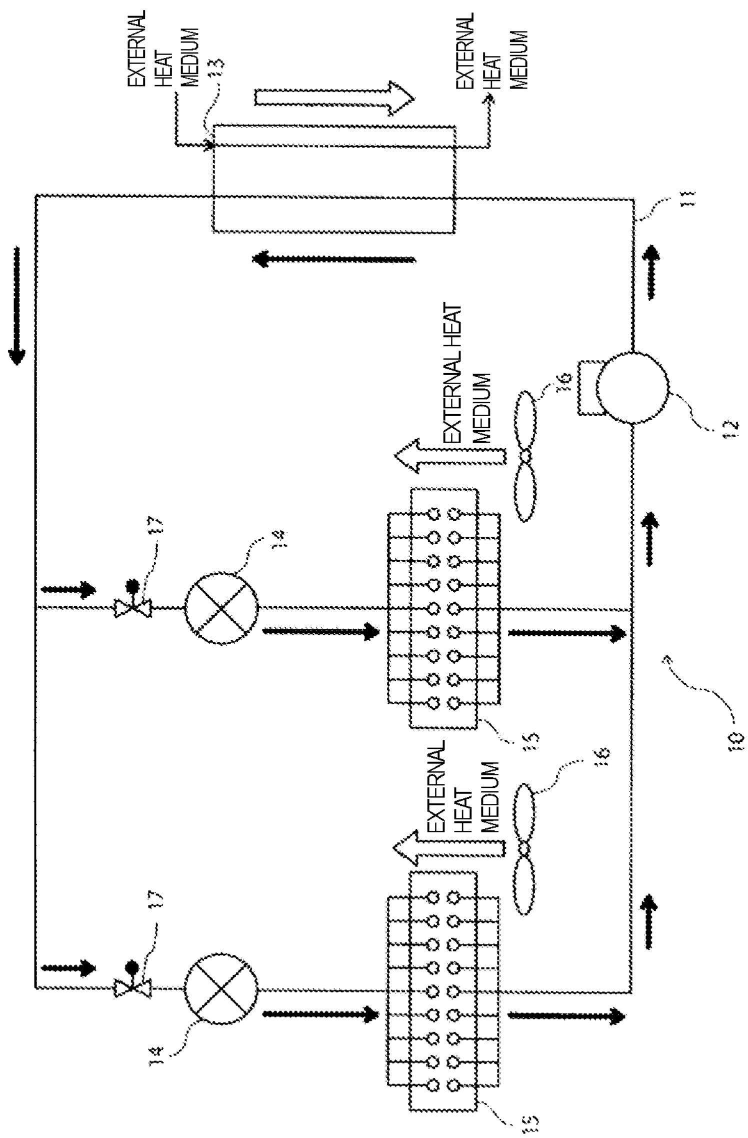
FIG. 2K is a schematic view illustrating a variant of the refrigerant circuit in FIG. 2H.
Figure 2L:
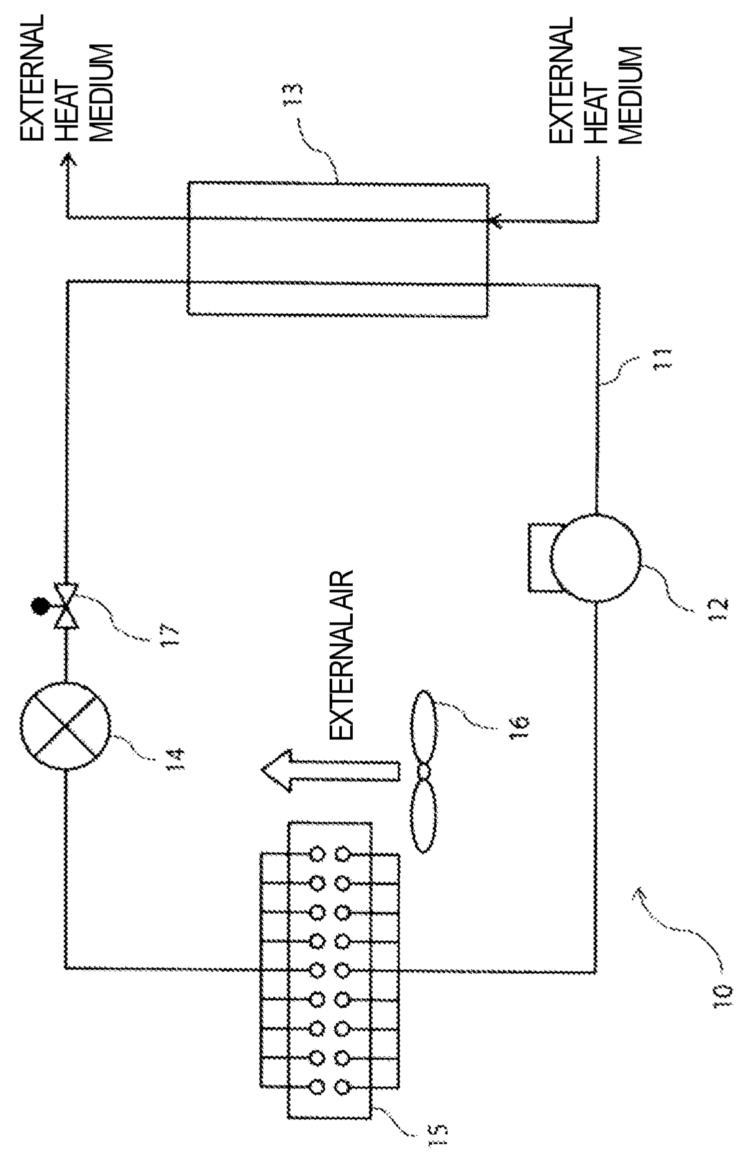
FIG. 2L is a schematic view for explaining an off-cycle defrost.
Figure 2M:
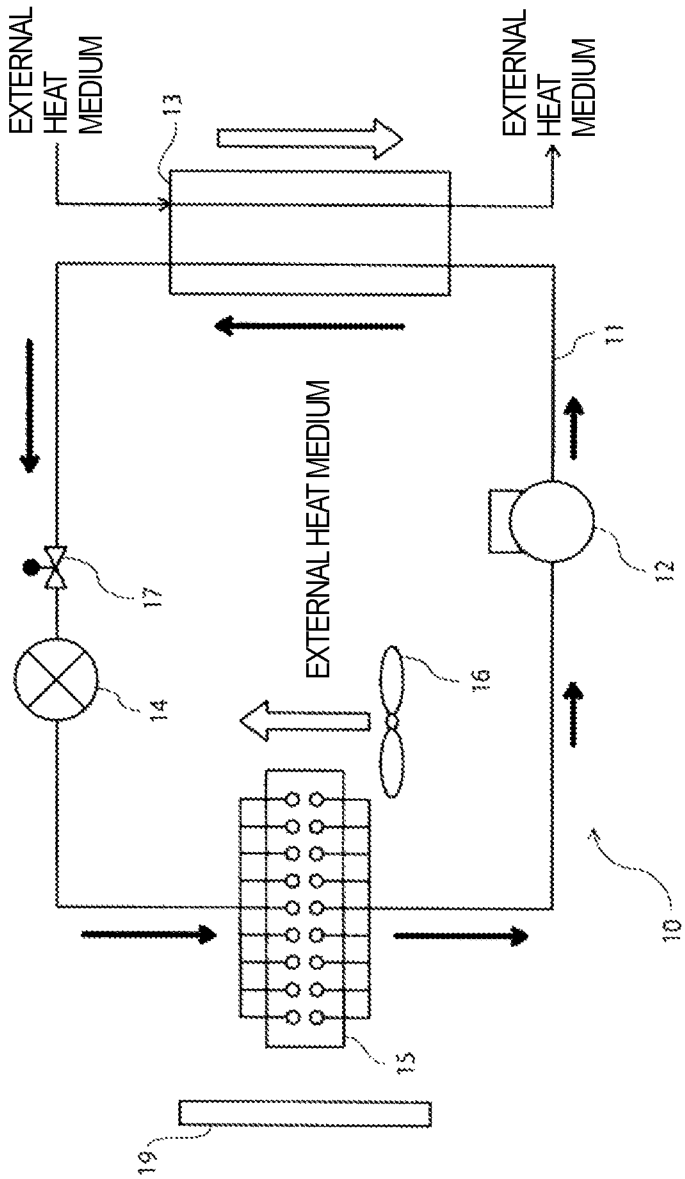
FIG. 2M is a schematic view for explaining a heating defrost.
Figure 2N:
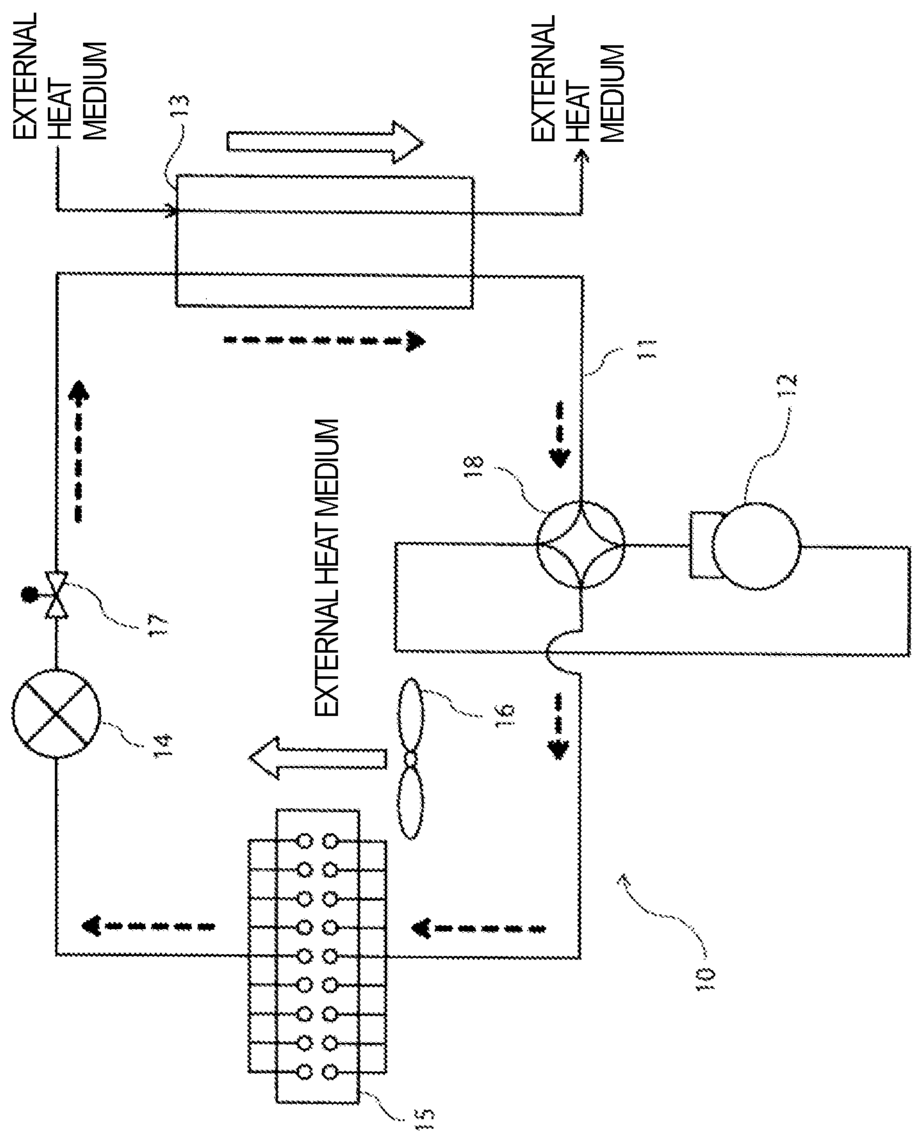
FIG. 2N is a schematic view for explaining a reverse cycle hot gas defrost.
Figure 20:
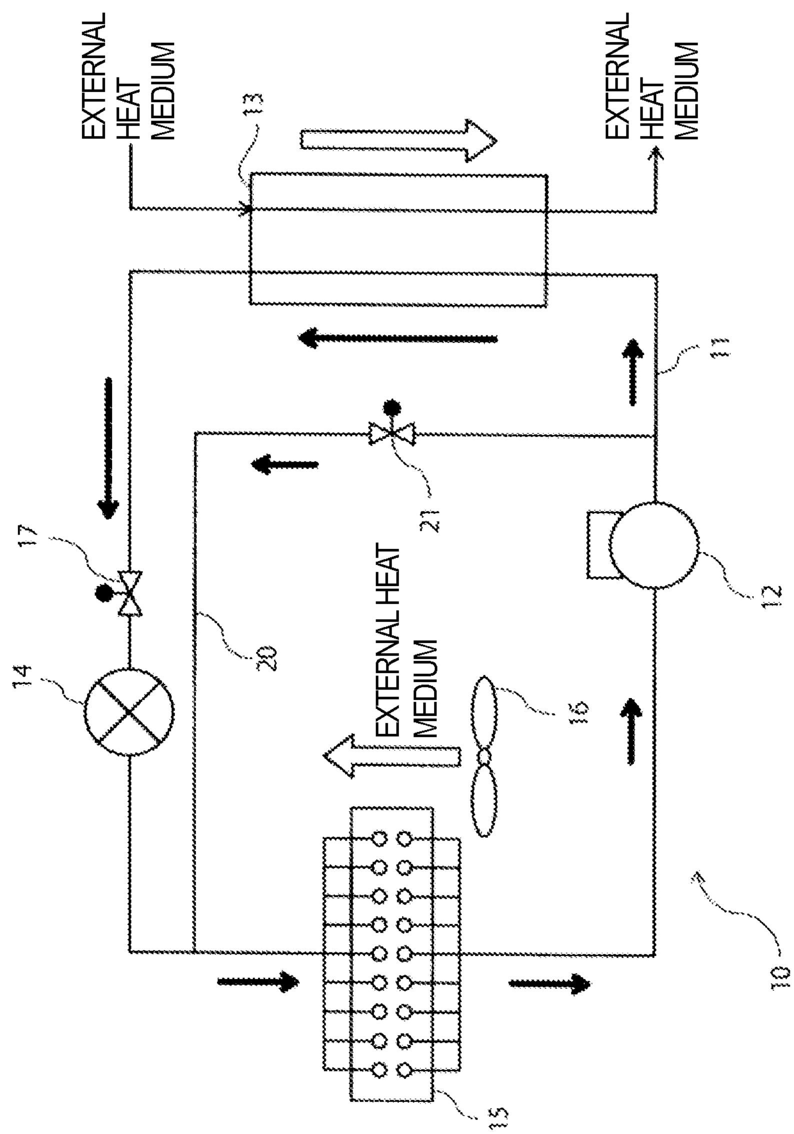
Figure 2P:
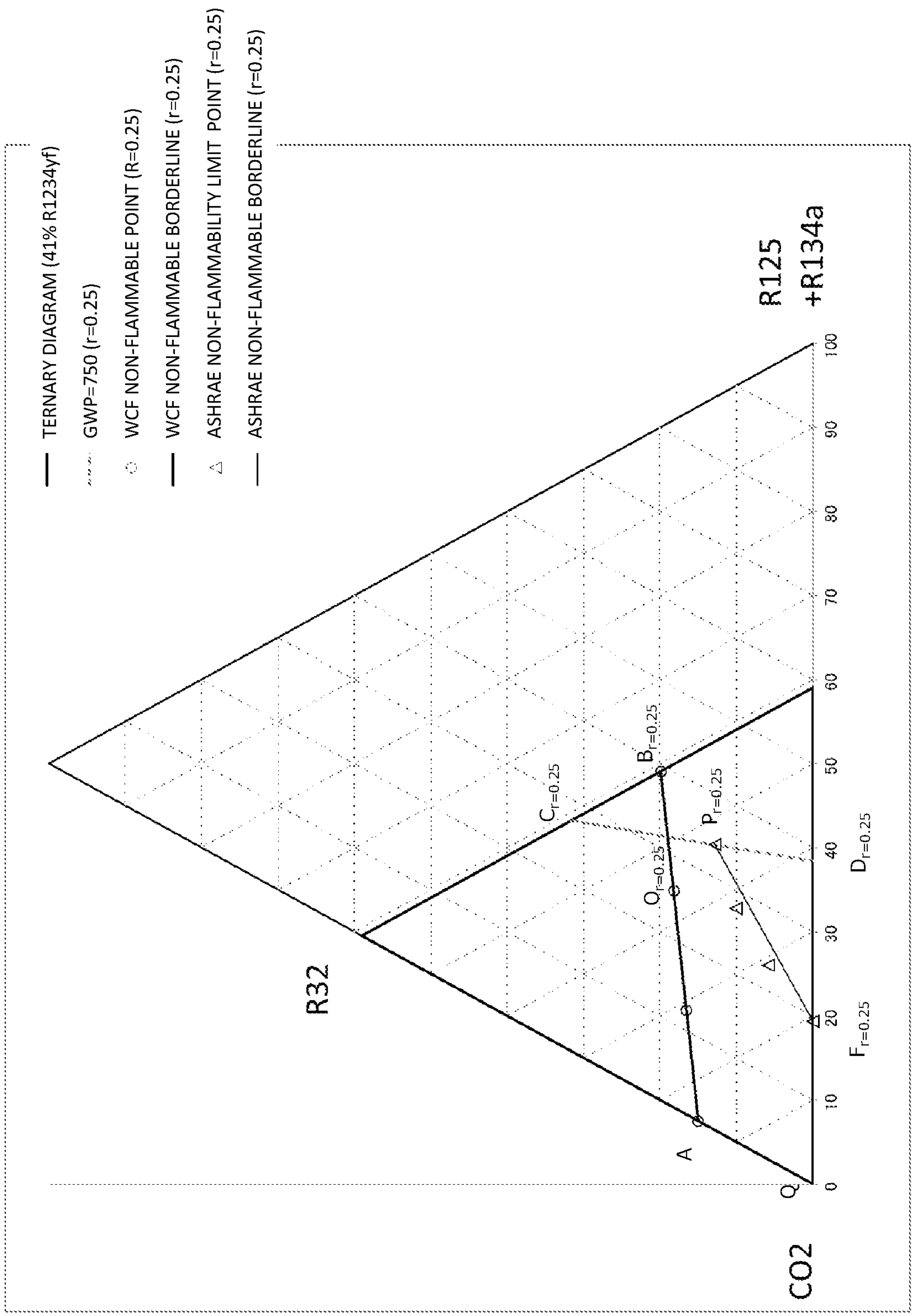
FIG. 2P is a diagram representing a straight line Fr=0.25Pr=0.25 that connects any non-flammability limit point in ASHRAE represented in Tables 206 to 209, the point Fr=0.25 and the point Pr=0.25 in a three-component composition diagram with, as respective apexes, a point where R32 occupies (100−x) mass %, a point where CO2 occupies (100−x) mass % and a point where the total of R125 and R134a occupies (100−x) mass %, with respect to a refrigerant 2E.
Figure 2Q:
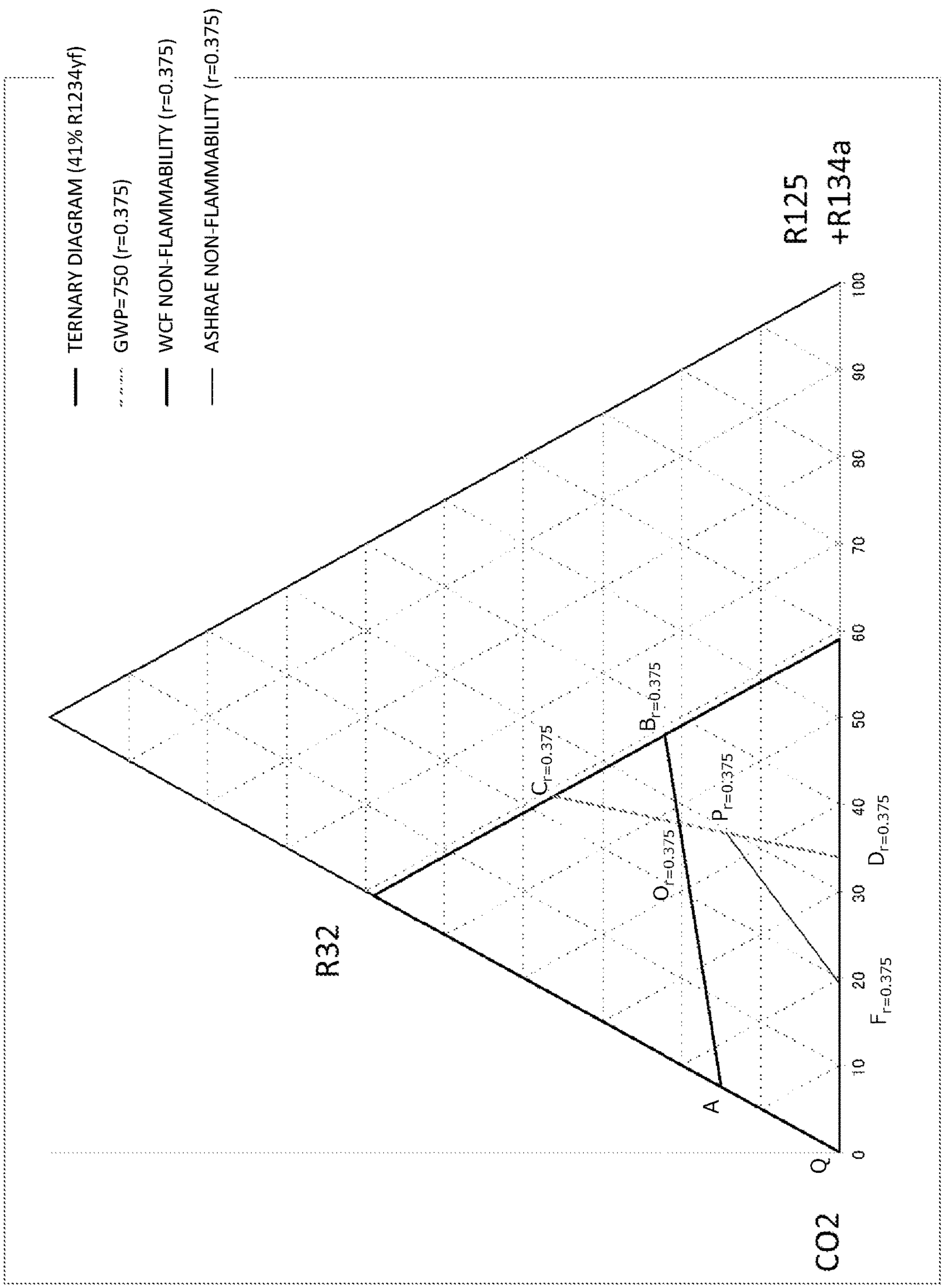
FIG. 2Q is a diagram representing a straight line Fr=0.375Pr=0.375 that connects any non-flammability limit point in ASHRAE represented in Tables 206 to 209, the point Fr=0.375 and the point Pr=0.375 in a three-component composition diagram with, as respective apexes, a point where R32 occupies (100−x) mass %, a point where CO2 occupies (100−x) mass % and a point where the total of R125 and R134a occupies (100−x) mass %, with respect to a refrigerant 2E.
Figure 2R:
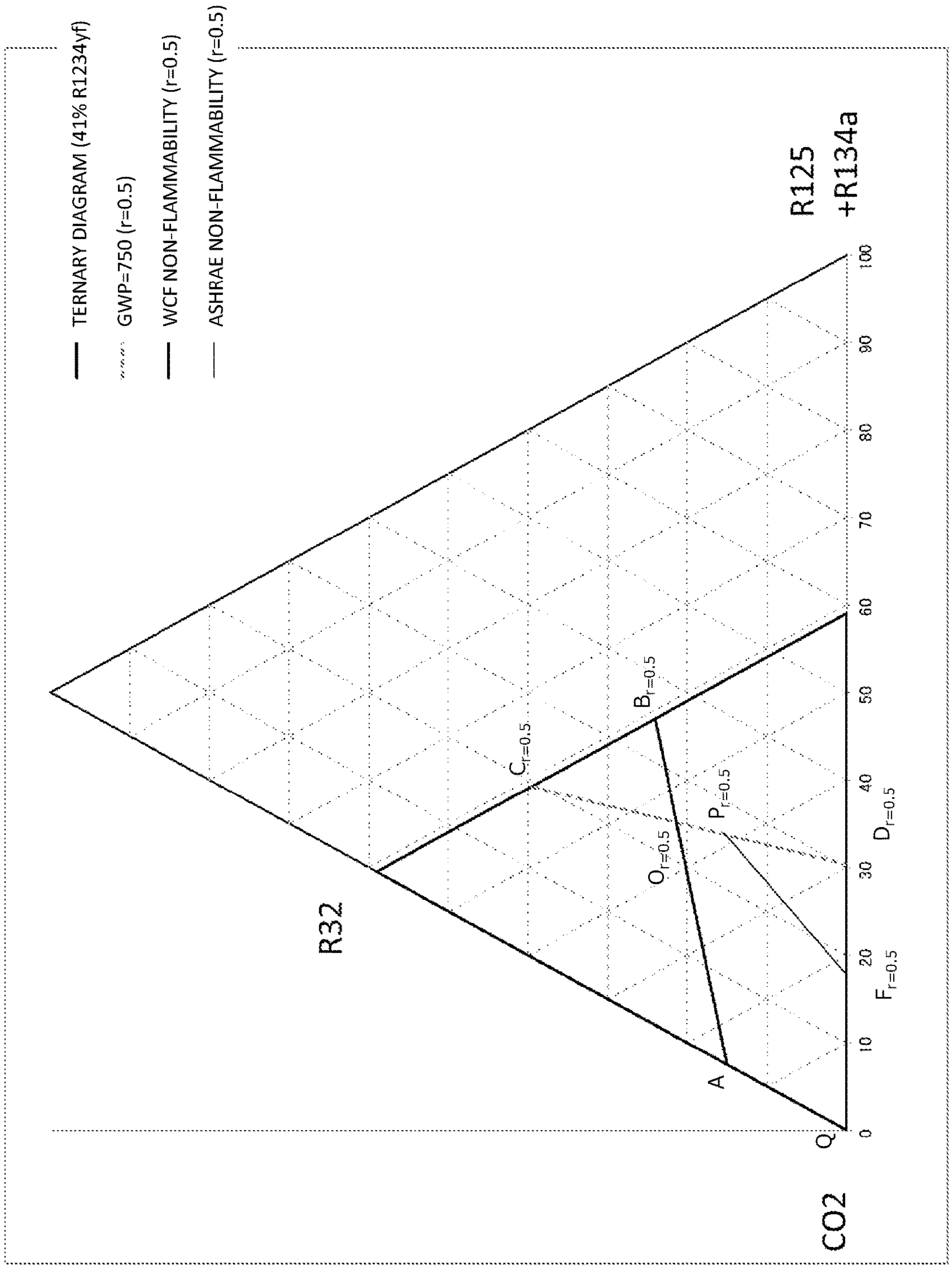
FIG. 2R is a diagram representing a straight line Fr=0.5Pr=0.5 that connects any non-flammability limit point in ASHRAE represented in Tables 206 to 209, the point Fr=0.5 and the point Pr=0.5 in a three-component composition diagram with, as respective apexes, a point where R32 occupies (100−x) mass %, a point where CO2 occupies (100−x) mass % and a point where the total of R125 and R134a occupies (100−x) mass %, with respect to a refrigerant 2E.
Figure 2S:
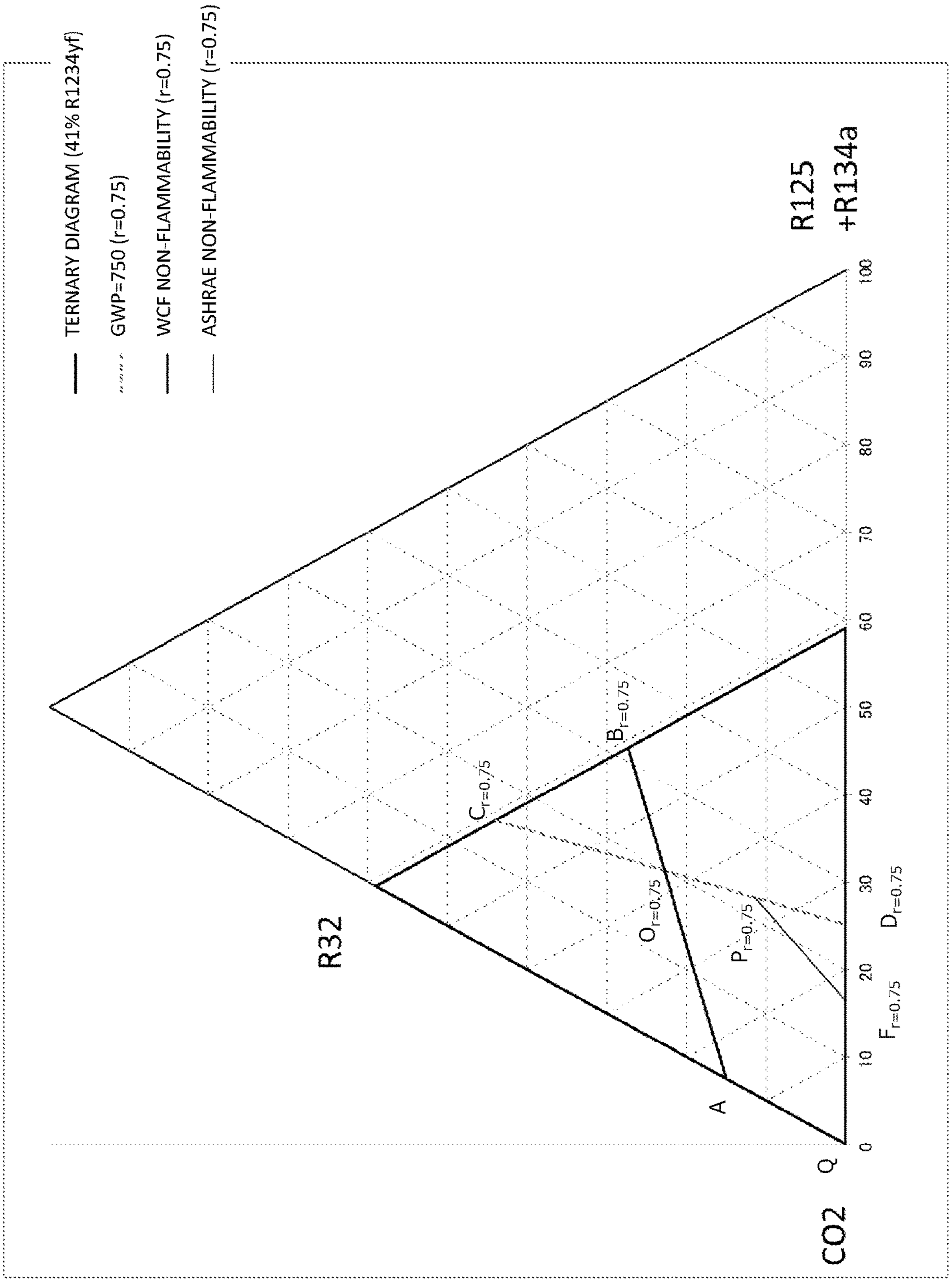
FIG. 2S is a diagram representing a straight line Fr=0.75Pr=0.75 that connects any non-flammability limit point in ASHRAE represented in Tables 206 to 209, the point Fr=0.75 and the point Pr=0.75 in a three-component composition diagram with, as respective apexes, a point where R32 occupies (100−x) mass %, a point where CO2 occupies (100−x) mass % and a point where the total of R125 and R134a occupies (100−x) mass %, with respect to a refrigerant 2E.
Figure 2T:
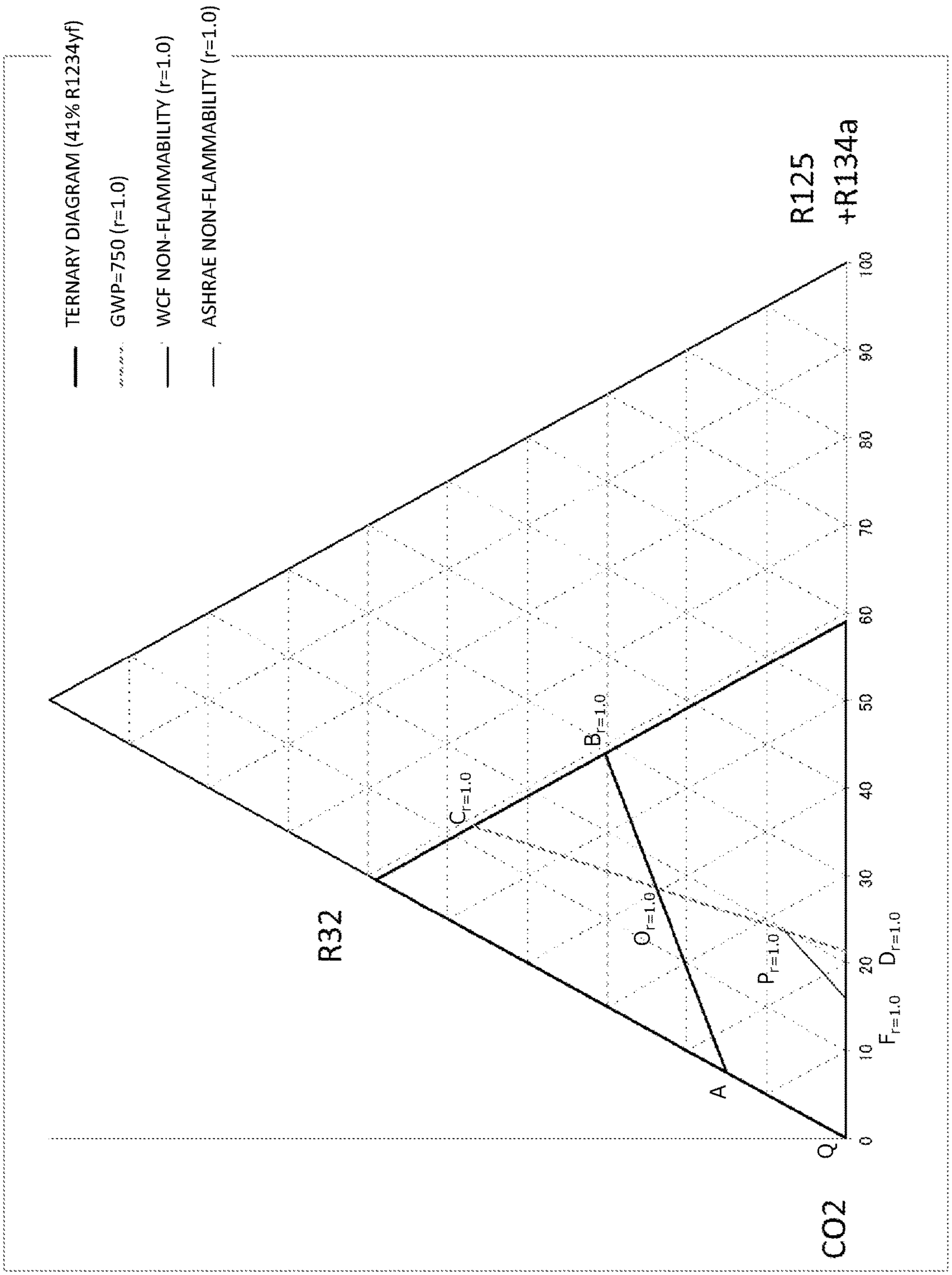
FIG. 2T is a diagram representing a straight line Fr=1.0Pr=1.0 that connects any non-flammability limit point in ASHRAE represented in Tables 206 to 209, the point Fr=1.0 and the point Pr=1.0 in a three-component composition diagram with, as respective apexes, a point where R32 occupies (100−x) mass %, a point where CO2 occupies (100−x) mass % and a point where the total of R125 and R134a occupies (100−x) mass %, with respect to a refrigerant 2E.
Figure 2U:
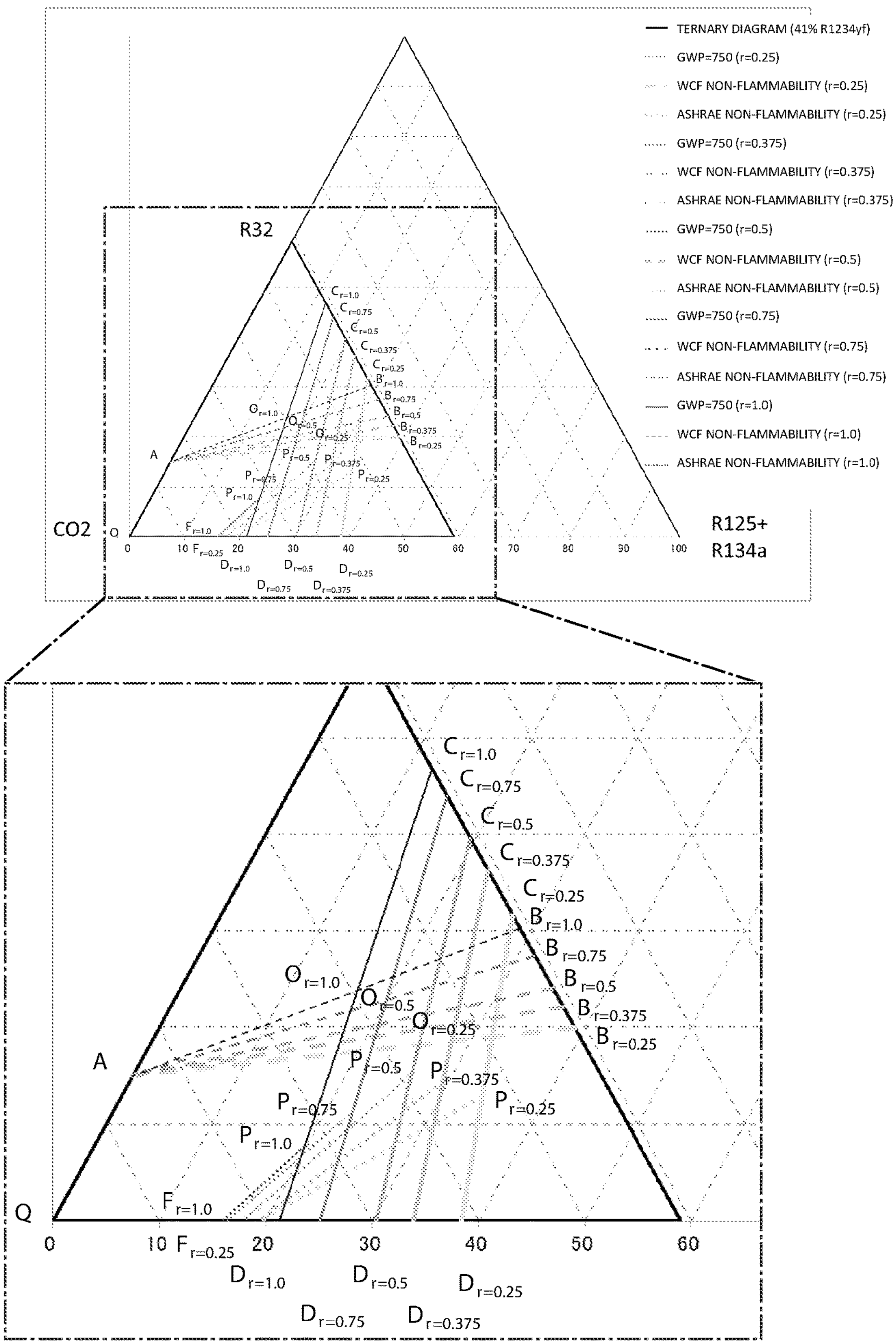
FIG. 2U is a ternary diagram representing points A, Or=0.25 to 1, Dr=0.25 to 1, Cr=0.25 to 1, Fr=0.25 to 1, Pr=0.25 to 1 and Q at a concentration of R1234yf of 41 mass % in a refrigerant 2E.
Figure 2V:
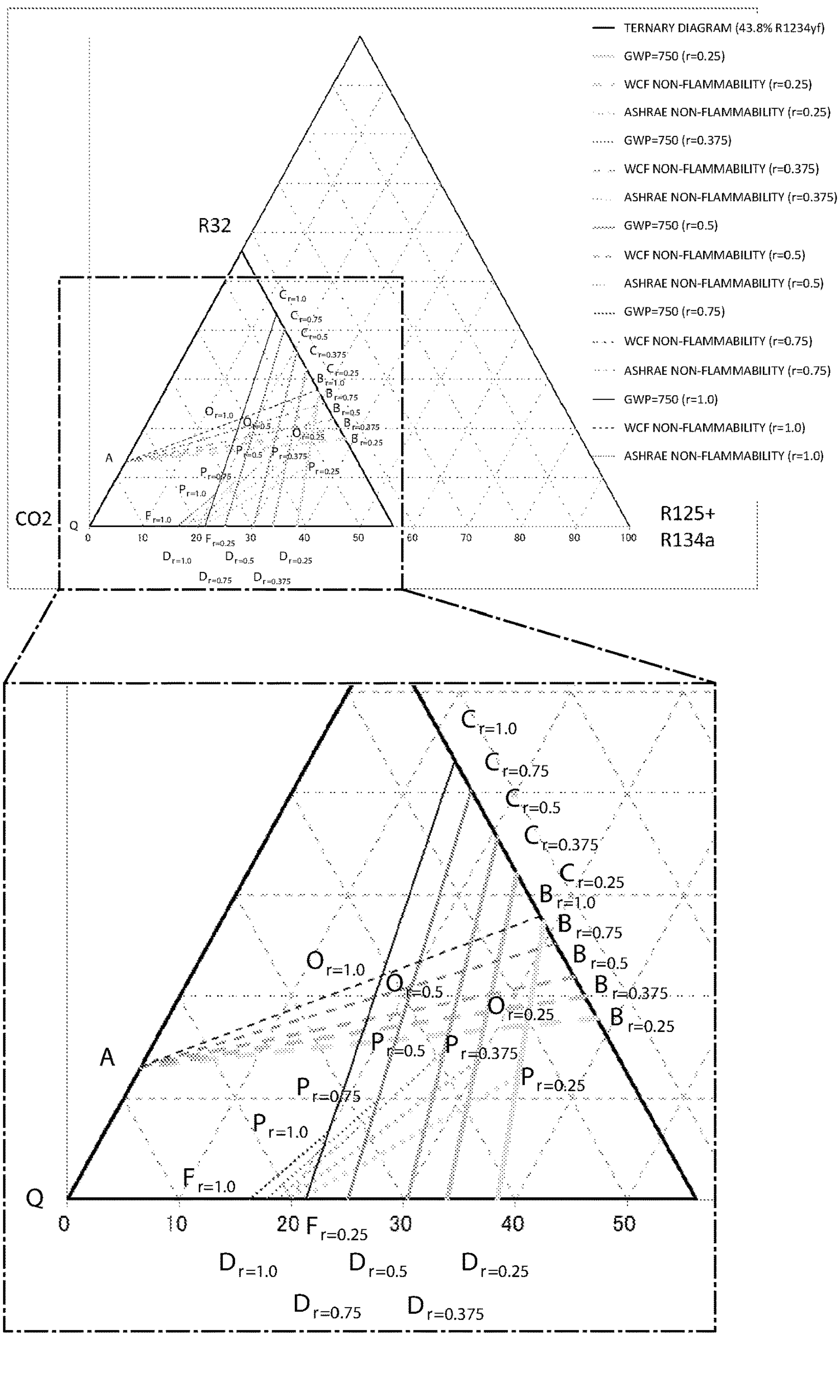
FIG. 2V is a ternary diagram representing points A, Or=0.25 to 1, Dr=0.25 to 1, Cr=0.25 to 1, Fr=0.25 to 1, Pr=0.25 to 1 and Q at a concentration of R1234yf of 43.8 mass % in a refrigerant 2E.
Figure 2W:
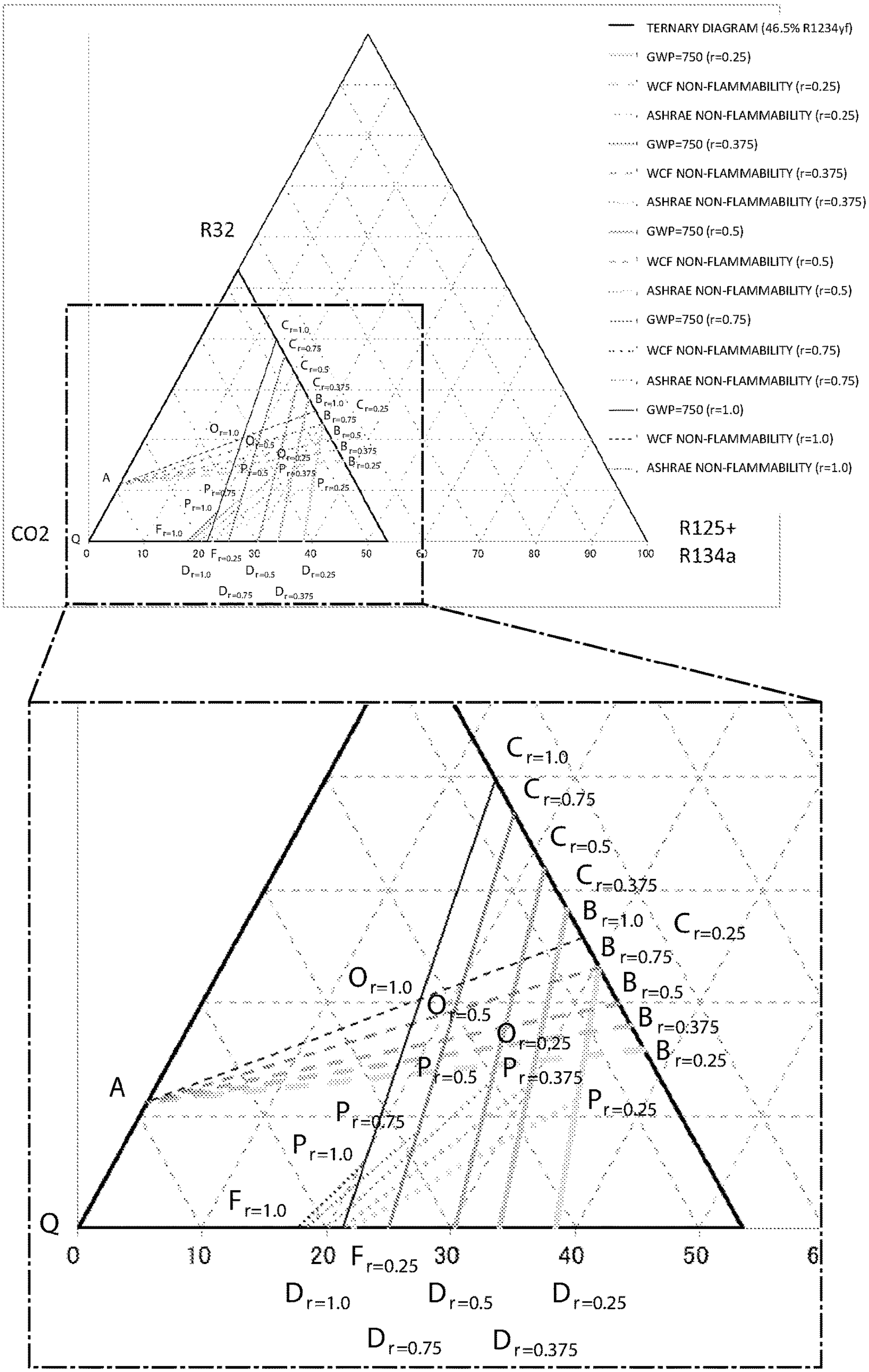
FIG. 2W is a ternary diagram representing points A, Or=0.25 to 1, Dr=0.25 to 1, Cr=0.25 to 1, Fr=0.25 to 1, Pr=0.25 to 1 and Q at a concentration of R1234yf of 46.5 mass % in a refrigerant 2E.
Figure 2X:
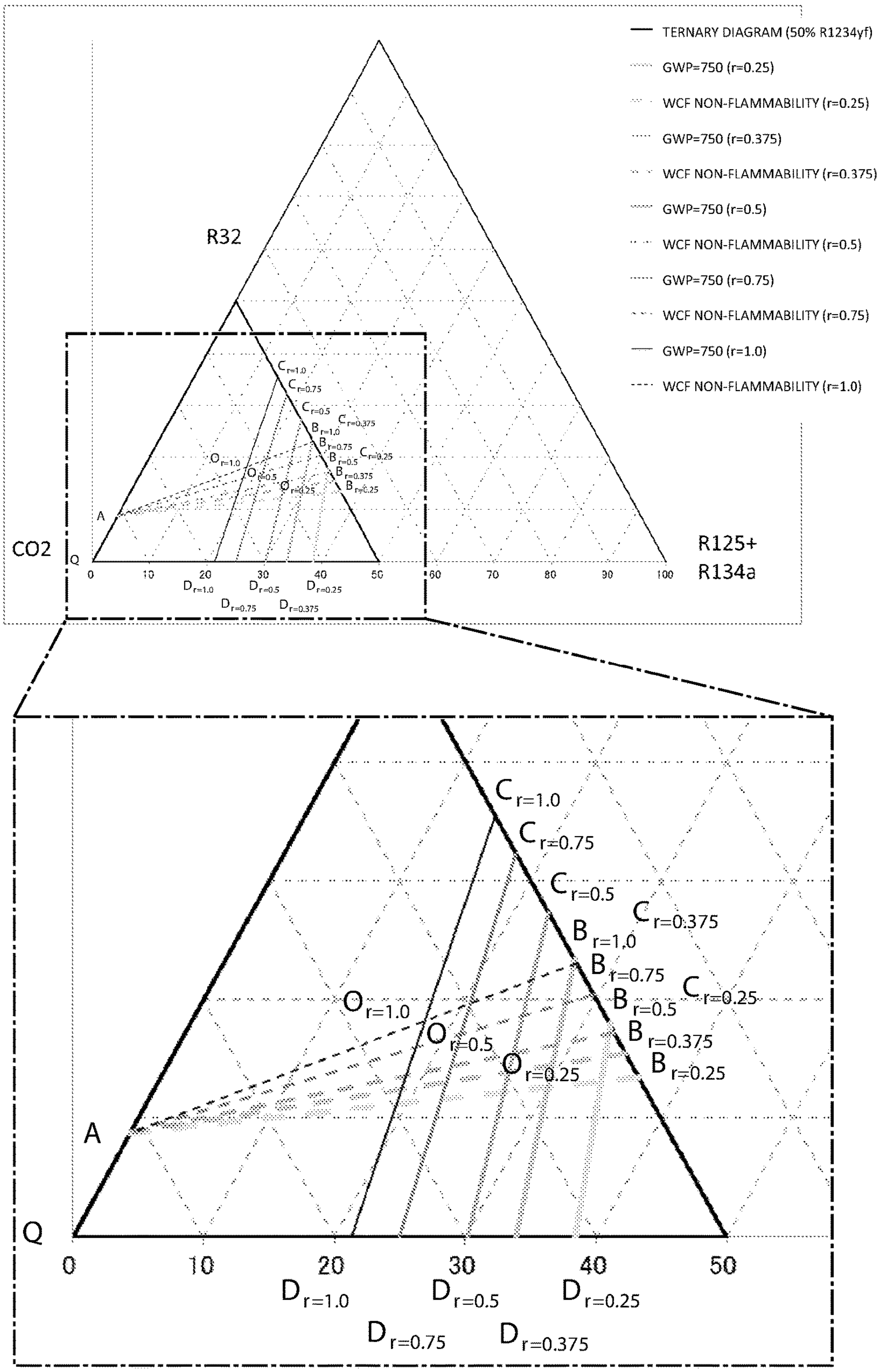
FIG. 2X is a ternary diagram representing points A, Or=0.25 to 1, Dr=0.25 to 1, Cr=0.25 to 1, Pr=0.25 to 1 and Q at a concentration of R1234yf of 50.0 mass % in a refrigerant 2E.
Figure 2Y:
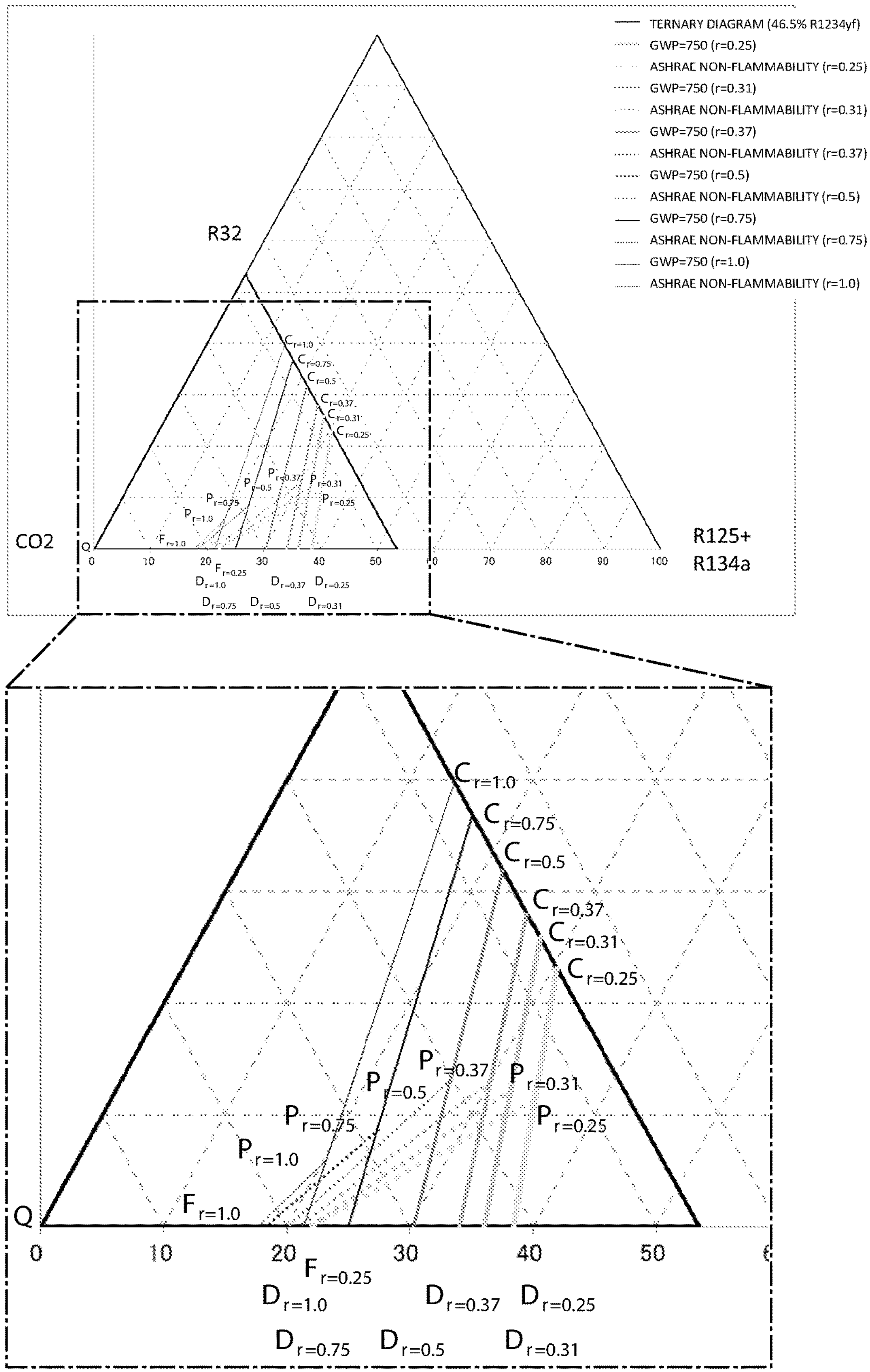
FIG. 2Y is a ternary diagram representing points Dr=0.25 to 1, Cr=0.25 to 1, Fr=0.25 to 0.37, Fr=0.5 to 1, Pr=0.25 to 0.37, Pr=0.50 to 1 and Q at a concentration of R1234yf of 46.5 mass % in a refrigerant 2E.
Figure 2Z:
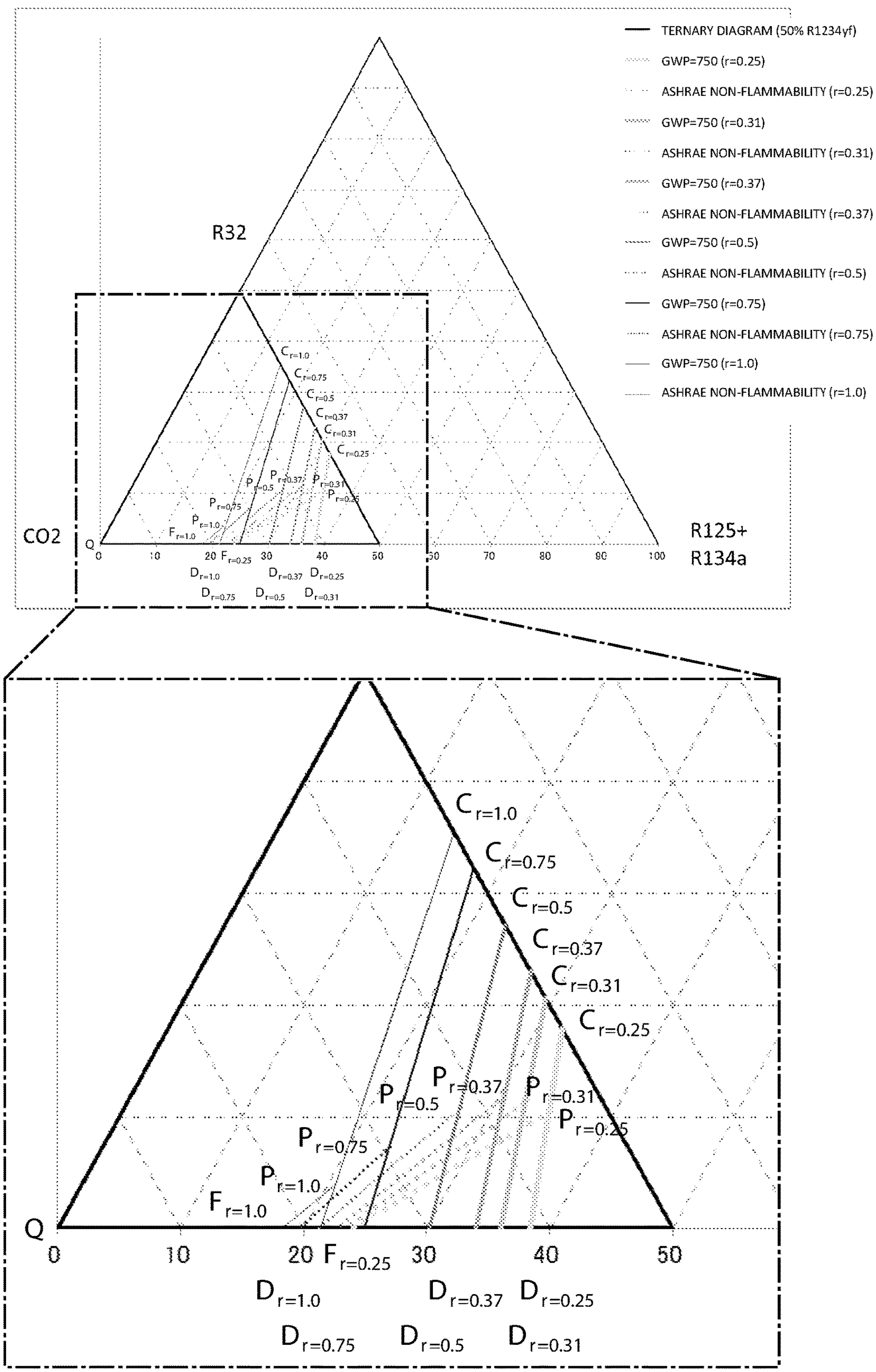
FIG. 2Z is a ternary diagram representing points Dr=0.25 to 1, Cr=0.25 to 1, Fr=0.25 to 0.37, Fr=0.37 to 1, Pr=0.25 to 0.37, Pr=0.37 to 1 and Q at a concentration of R1234yf of 50.0 mass % in a refrigerant 2E.

In other words, the mass ratio of the three components in the refrigerant 2B is within the range of a region surrounded by a straight line a, a curve b, a straight line c, a curve d and a straight line e that connect five points:

point A (HFO-1132(E)/HFO-1123/HFO-1234yf=42.5/1.0/56.5 mass %), point B (HFO-1132(E)/HFO-1123/HFO-1234yf=27.1/1.0/71.9 mass %), point C (HFO-1132(E)/HFO-1123/HFO-1234yf=1.0/30.4/68.6 mass %), point D (HFO-1132(E)/HFO-1123/HFO-1234yf=1.0/57.0/42.0 mass %) and point E (HFO-1132(E)/HFO-1123/HFO-1234yf=42.5/24.1/33.4 mass %);

indicated in a ternary composition diagram of FIG. 2C, with the three components as respective apexes.

In the present section, the ternary composition diagram with the three components as respective apexes means a three-component composition diagram where the three components (HFO-1132(E), HFO-1123 and HFO-1234yf) are assumed as respective apexes and the sum of the concentrations of HFO 1132(E), HFO-1123 and HFO-1234yf is 100 mass %, as represented in FIG. 2C.

The refrigerant 2B, which has such a configuration, thus has various characteristics of (1) a sufficiently low GWP (125 or less), (2) a refrigerating capacity equivalent to or more than that of R404A when used as an alternative refrigerant of R404A, (3) a coefficient of performance (COP) equivalent to or more than that of R404A, and (4) a flame velocity of 5 cm/s or less as measured according to ANSI/ASHRAE Standard 34-2013.

In the present disclosure, the coefficient of performance (COP) equivalent to or more than that of R404A means that the COP ratio relative to that of R404A is 100% or more (preferably 101% or more, more preferably 102% or more, particularly preferably 103% or more).

In the present disclosure, the refrigerating capacity equivalent to or more than that of R404A means that the refrigerating capacity ratio relative to that of R404A is 85% or more (preferably 90% or more, more preferably 95% or more, further preferably 100% or more, particularly preferably 102% or more).

In the present disclosure, a sufficiently low GWP means a GWP of 125 or less, preferably 110 or less, more preferably 100 or less, particularly preferably 75 or less.

The point A, the point B, the point C, the point D and the point E in FIG. 2C are each a point that is represented by a white circle (○) and that has the above coordinates.

The technical meanings of the points A, B, C, D and E are as follows. The concentration (mass %) at each of the points is the same as any value determined in Examples described below A: any mass ratio providing a flame velocity of 3.0 cm/s as measured according to ANSI/ASHRAE Standard 34-2013 and a concentration (mass %) of HFO-1123 of 1.0 mass %

B: any mass ratio providing a concentration (mass %) of HFO-1123 of 1.0 mass % and a refrigerating capacity relative to that of R404A of 85%

C: any mass ratio providing a refrigerating capacity relative to that of R404A of 85% and a concentration (mass %) of HFO-1132(E) of 1.0 mass %

D: any mass ratio providing a concentration (mass %) off-WO-1132(E) of 1.0 mass % and a saturation pressure at 40° C. of 2.25 MPa E: any mass ratio providing a saturation pressure at 40° C. of 2.25 MPa and a flame velocity of 3.0 cm/s as measured according to ANSI/ASHRAE Standard 34-2013

A "flame velocity of 3.0 cm/s as measured according to ANSI/ASHRAE Standard 34-2013" corresponds to any numerical value less than half the flame velocity (10 cm/s) as a reference for classification as Class 2L (lower flammability) according to ANSI/ASHRAE Standard 34-2013, and a refrigerant having such a flame velocity means a relatively safe refrigerant, among refrigerants prescribed in Class 2L.

Specifically, a refrigerant having such "any numerical value less than the half the flame velocity (10 cm/s)" is relatively safe in that flame hardly propagates even in the case of ignition by any chance. Hereinafter, such a flame velocity as measured according to ANSI/ASHRAE Standard 34-2013 is also simply referred to as "flame velocity".

The flame velocity of the mixed refrigerant of the three components in the refrigerant 2B is preferably more than 0 and 2.5 cm/s or less, more preferably more than 0 and 2.0 cm/s or less, further preferably more than 0 and 1.5 cm/s or less.

Both the points A and B are on the straight line a That is, a line segment AB is a part of the straight line a. The straight line a is a straight line indicating any mass ratio providing a concentration (mass %) of HFO-1123 of 1.0 mass %. The mixed refrigerant of the three components has a concentration of HFO-1123 of more than 1.0 mass % in a region close to the apex HFO-1123 with respect to the straight line a in the ternary composition diagram.

In a case where the mass % of HFO-1132(E), the mass % of HFO-1123 and the mass % of HFO-1234yf are represented by x, y and z, respectively, in FIG. 2C, a line segment indicating any mass ratio providing a concentration of HFO-1123 of 1.0 mass % is approximated to a line segment represented by the following expressions.

The line segment indicating any mass ratio providing a concentration (mass %) of HFO-1123 of 1.0 mass % is a part of the straight line c that connects of two points of the point A and the point B (line segment AB in FIG. 2C)

$$y=1.0$$

$$z=100-x-y$$

$$27.1 \leq x \leq 42.5$$

Both the points B and C are on the curve b. The curve b is a curve indicating any mass ratio providing a refrigerating capacity relative to that of R404A of 85%. The mixed refrigerant of the three components has a refrigerating capacity relative to that of R404A of more than 85% in a region close to the apex HFO-1132(E) and the apex HFO-1123 with respect to the curve b in the ternary composition diagram.

The curve b is determined as follows.

Table 209 represents respective three points where the refrigerating capacity ratio relative to that of R404A is 85% in a case where the mass % of HFO-1132(E) corresponds to 1.0, 15.0 and 27.1. The curve b is indicated by a line that connects the three points, and the curve b is approximated by the expressions in Table 209, according to a least-squares method, in a case where the mass % of HFO-1132(E), the mass % of HFO-1123 and the mass % of HFO-1234yf are represented by x, y and z, respectively.

TABLE 209

| Item | Unit | $b_{HFO\text{-}1132(E)=}$ | $b_{HFO\text{-}1132(E)=}$ | $b_{HFO\text{-}1132(E)=}$ |
|---|---|---|---|---|
| HFO-1132(E) | mass % | 1.0 | 15.0 | 27.1 |
| HFO-1123 | mass % | 30.4 | 14.2 | 1.0 |
| HFO-1234yf | mass % | 68.6 | 70.8 | 71.9 |
| Refrigerating capacity | relative to that of R404A (%) | 85.0 | 85.0 | 85.0 |
| x = HFO-1132(E) | mass % | Expressions of curve b | | |
| y = HFC-1123 | mass % | y = 0.2538x2 − 1.1977x + 0.3160 | | |
| z = HFO-1234yf | mass % | z = 100 − x − y | | |

Both the points C and D are on the straight line c. That is, a line segment CD is a part of the straight line c. The straight line c is a straight line indicating any mass ratio providing a concentration (mass %) of HFO-1132(E) of 1.0 mass %. The mixed refrigerant of the three components has a concentration of HFO-1132(E) of more than 1.0 mass % in a region close to the apex HFO-1132(E) with respect to the straight line c in the ternary composition diagram.

In a case where the mass % of HFO-1132(E), the mass % of HFO-1123 and the mass % of HFO-1234yf are represented by x, y and z, respectively, in FIG. 2C, a line segment indicating any mass ratio providing a concentration (mass %) of HFO-1132(E) of 1.0 mass % is approximated to a line segment represented by the following expressions.

The line segment indicating any ratio providing a concentration (mass %) of HFO-1132(E) of 1.0 mass % is a part of the straight line c that connects of two points of the point C and the point D (line segment CD in FIG. 2C)

$$x=1.0$$

$$z=100-x-y$$

$$30.4 \leq y \leq 57.0$$

Both the points D and E are on the curved. The curve d is a curve indicating any mass ratio providing a saturation pressure at 40° C. of 2.25 MPa. The mixed refrigerant of the three components has a saturation pressure at 40° C. of less than 2.25 MPa in a region close to the apex HFO-1234yf with respect to the curve d in the ternary composition diagram.

The curve d is determined as follows.

Table 210 represents respective three points where the saturation pressure at 40° C. is 2.25 MPa in a case where the mass % of HFO-1132(E) corresponds to 1.0, 20.0 and 42.5. The curve d is indicated by a line that connects the three points, and the curve d is approximated by the expressions in Table 210, according to a least-squares method, in a case where the mass % of HFO-1132(E), the mass % off-TO-1123 and the mass % of HFO-1234yf are represented by x, y and z, respectively.

TABLE 210

| Item | Unit | $b_{HFO\text{-}1132(E)}$= | $b_{HFO\text{-}1132(E)}$= | $b_{HFO\text{-}1132(E)}$= |
|---|---|---|---|---|
| HFO-1132(E) | mass % | 1.0 | 20.0 | 42.5 |
| HFO-1123 | mass % | 57.0 | 40.7 | 24.1 |
| HFO-1234yf | mass % | 42.0 | 39.3 | 33.4 |
| Saturation pressure at 40° C. | MPa | 2.25 | 2.25 | 2.25 |
| x = HFO-1132(E) | mass % | Expressions of curve d | | |
| y = HFC-1123 | mass % | y = 0.2894x2 − 0.9187x + 0.5792 | | |
| z = HFO-1234yf | mass % | z = 100 − x − y | | |

Both the points A and E are on the straight line e. The straight line e is a straight line indicating any mass ratio providing a flame velocity of 3.0 cm/s. The mixed refrigerant of the three components has a flame velocity of less than 3.0 cm/s in a region close to the apex HFO-1234yf and the apex HFO-1123 with respect to the straight line e in the ternary composition diagram.

In a case where the mass % of HFO-1132(E), the mass % of HFO-1123 and the mass % of HFO-1234yf are represented by, x, y and z, respectively, in FIG. 2C, any mass ratio providing a flame velocity of 3.0 cm/s is approximated to a line segment represented by the following expressions.

The line segment indicating any mass ratio providing a flame velocity of 3.0 cm/s is a part of the straight line e that connects of two points of the point A and the point E (line segment AE in FIG. 2C)

$$x=42.5$$

$$z=100-x-y$$

$$1.0\leq y\leq 24.1$$

A ternary mixed refrigerant of HFO-1132(E), HFO-1123 and HFO-1234yf has various characteristics of (1) a GWP of 125 or less, (2) a refrigerating capacity ratio relative to that of R404A of 85% or more, (3) a saturation pressure at 40° C. of 2.25 MPa or less, and (4) a flame velocity of 3.0 cm/s or less, at any mass ratio within the range of a region (ABCDE region) surrounded by lines that connect five points of the points A, B, C, D and E.

The mass ratio of the three components in the refrigerant 2B is preferably within the range of a region surrounded by a figure passing through five points:

point A (HFO-1132(E)/HFO-1123/HFO-1234yf=42.5/1.0/56.5 mass %), point B (HFO-1132(E)/HFO-1123/HFO-1234yf=27.1/1.0/71.9 mass %), point C (HFO-1132(E)/HFO-1123/HFO-1234yf=1.0/30.4/68.6 mass %), point F (HFO-1132(E)/HFO-1123/HFO-1234yf=1.0/52.2/46.8 mass %) and point G (HFO-1132(E)/HFO-1123/HFO-1234yf=42.5/18.9/38.6 mass %);

in a ternary composition diagram with the three components as respective apexes.

In other words, the mass ratio of the three components in the refrigerant 2B is preferably within the range of a region surrounded by a straight line a, a curve b, a straight line c, a curve f and a straight line e that connect five points:

point A (HFO-1132(E)/HFO-1123/HFO-1234yf=42.5/1.0/56.5 mass %), point B (HFO-1132(E)/HFO-1123/HFO-1234yf=27.1/1.0/71.9 mass %), point C (HFO-1132(E)/HFO-1123/HFO-1234yf=1.0/30.4/68.6 mass %), point F (HFO-1132(E)/HFO-1123/HFO-1234yf=1.0/52.2/46.8 mass %) and point G (HFO-1132(E)/HFO-1123/HFO-1234yf=42.5/18.9/38.6 mass %);

indicated in a ternary composition diagram of FIG. 2C, with the three components as respective apexes:

The ternary composition diagram with the three components as respective apexes is as described above.

The point A, the point B, the point C, the point F and the point G in FIG. 2C are each a point that is represented by a white circle (○) and that has the above coordinates.

The technical meanings of the points A, B and C are as described above.

The technical meanings of the points F and G are as follows. The concentration (mass %) at each of the points is the same as any value determined in Examples described below.

F: any mass ratio providing a concentration (mass %) of HFO-1132(E) of 1.0 mass % and a saturation pressure at 40° C. of 2.15 MPa G: any mass ratio providing a saturation pressure at 40° C. of 2.15 MPa and a flame velocity of 3.0 cm/s as measured according to ANSI/ASHRAE Standard 34-2013

The straight line a, the curve b, the straight line c and the straight line e are as described above. The Point F is on the straight line c and the point G is on the straight line e.

Both the points F and G are on the curve f. The curve f is a curve indicating any mass ratio providing a saturation pressure at 40° C. of 2.15 MPa. The mixed refrigerant of the three components has a saturation pressure at 40° C. of less than 2.15 MPa in a region close to the apex HFO-1234yf with respect to the curve fin the ternary composition diagram.

The curve f is determined as follows.

Table 211 represents respective three points where the saturation pressure at 40° C. is 2.25 MPa in a case where the mass % of HFO-1132(E) corresponds to 1.0, 20.0 and 42.5. The curve f is indicated by a line that connects the three points, and the curve f is approximated by the expressions in Table 211, according to a least-squares method, in a case where the mass % of HFO-1132(E), the mass % of HFO-1123 and the mass % of HFO-1234yf are represented by x, y and z, respectively.

TABLE 211

| Item | Unit | $b_{HFO\text{-}1132(E)}$= | $b_{HFO\text{-}1132(E)}$= | $b_{HFO\text{-}1132(E)}$= |
|---|---|---|---|---|
| HFO-1132(E) | mass % | 1.0 | 20.0 | 42.5 |
| HFO-1123 | mass % | 52.2 | 35.7 | 18.9 |
| HFO-1234yf | mass % | 46.8 | 44.3 | 38.6 |
| Saturation pressure at 40° C. | MPa | 2.15 | 2.15 | 2.15 |
| x = HFO-1132(E) | mass % | Expressions of curve f | | |
| y = HFC-1123 | mass % | y = 0.2934x2 − 0.9300x + 0.5313 | | |
| z = HFO-1234yf | mass % | z = 100 − x − y | | |

A ternary mixed refrigerant of HFO-1132(E), HFO-1123 and HFO-1234yf has various characteristics of (1) a GWP of 125 or less, (2) a refrigerating capacity ratio relative to that of R404A of 85% or more, (3) a saturation pressure at 40° C. of 2.15 MPa or less, and (4) a flame velocity of 3.0 cm/s or less, at any mass ratio within the range of a region (ABCFG region) surrounded by lines that connect five points of the points A, B, C, F and G.

The mass ratio of the three components in the refrigerant 2B is preferably within the range of a region surrounded by a figure passing through six points:

point A (HFO-1132(E)/HFO-1123/HFO-1234yf=42.5/1.0/56.5 mass %),
point B (HFO-1132(E)/HFO-1123/HFO-1234yf=271/1.0/71.9 mass %),
point C (HFO-1132(E)/HFO-1123/HFO-1234yf=1.0/30.4/68.6 mass %),
point H (HFO-1132(E)/HFO-1123/HFO-1234yf=1.0/35.2/63.8 mass %),
point I (HFO-1132(E)/HID-1123/HEO-1234yf=27.4/29.8/42.8 mass %) and
point G (HFO-1132(E)/HFO-1123/HFO-1234yf=42.5/18.9/38.6 mass %);
in a ternary composition diagram with the three components as respective apexes.

In other words, the mass ratio of the three components in the refrigerant 2B is preferably within the range of a region surrounded by a straight line a, a curve b, a straight line c, a curve g, a curve f and a straight line e that connect six points:
point A (HFO-1132(E)/HFO-1123/HFO-1234yf=2.5/1.0/56.5 mass %),
point B (HFO-1132(E)/HFO-1123/HFO-1234yf=27.1/1.0/71.9 mass %),
point C (HFO-1132(E)/HFO-1123/HFO-1234yf=1.0/30.4/68.6 mass %),
point H (HFO-1132(E)/HFO-1123/HFO-1234yf=1.0/35.2/63.8 mass %),
point I (HFO-1132(E)/HFO-1123/HFO-1234yf=27.4/29.8/42.8 mass %) and
point G (HFO 1132(E)/HFO-1123/HFO-1234yf=42.5/18.9/38.6 mass %);
indicated in a ternary composition diagram of FIG. 2C, with the three components as respective apexes.

The ternary composition diagram with the three components as respective apexes is as described above.

The point A, the point B, the point C, the point G, the point H and the point I in FIG. 2C are each a point that is represented by a white circle (○) and that has the above coordinates.

The technical meanings of the points A, B, C and G are as described above.

The technical meanings of the points H and I are as follows. The concentration (mass %) at each of the points is the same as any value determined in Examples described below.

H: any mass ratio providing a concentration (mass %) of HFO-1132(E) of 1.0 mass % and a COP relative to that of R404A of 100%

I: any mass ratio providing a COP relative to that of R404A of 100% and a saturation pressure at 40° C. of 2.15 MPa The straight line a, the curve b, the straight line c, the straight line e and the curve fare as described above. The point H is on the straight line c and the point I is on the curve f.

Both the points H and fare on the curve g. The curve g is a curve indicating any mass ratio providing a COP relative to that of R404A of 100%. The mixed refrigerant of the three components has a COP relative to that of R404A of less than 100% in a region close to the apex HFO-1132(E) and the apex HFO-1234yf with respect to the curve g in the ternary composition diagram.

The curve g is determined as follows.

Table 212 represents respective three points where the saturation pressure at 40° C. is 2.25 MPa in a case where the mass % of HFO-1132(E) corresponds to 1.0, 20.0 and 42.5. The curve f is indicated by a line that connects the three points, and the curve f is approximated by the expressions in Table 212, according to a least-squares method, in a case where the mass % of HFO-1132(E), the mass % of HFO-1123 and the mass % of HFO-1234yf are represented by x, y and z, respectively.

TABLE 212

| Item | Unit | $b_{HFO\text{-}1132(E)}$= | $b_{HFO\text{-}1132(E)}$= | $b_{HFO\text{-}1132(E)}$= |
|---|---|---|---|---|
| HFO-1132(E) | mass % | 1.0 | 20.0 | 42.5 |
| HFO-1123 | mass % | 35.2 | 30.9 | 28.7 |
| HFO-1234yf | mass % | 63.8 | 49.1 | 28.8 |
| COP | relative to that of R404A (%) | 100.0 | 100.0 | 100.0 |
| x = HFO-1132(E) | mass % | Expressions of curve g | | |
| y = HFC-1123 | mass % | y = 0.3097x2 − 0.2914x + 0.3549 | | |
| z = HFO-1234yf | mass % | z = 100 − x − y | | |

A ternary mixed refrigerant of HFO-1132(E), HFO-1123 and HFO-1234yf has various characteristics of (1) a GWP of 125 or less, (2) a refrigerating capacity ratio relative to that of R404A of 85% or more, (3) a COP ratio relative to that of R404A of 100% or more, (4) a saturation pressure at 40° C. of 2.15 MPa or less, and (5) a flame velocity of 3.0 cm/s or less, at any mass ratio within the range of a region (ABCHIG region) surrounded by lines that connect six points of the points A, B, C, H, I and G.

The refrigerant 2B includes 99.5 mass % or more of HFO-1132(E), HFO-1123 and HFO-1234yf in terms of the sum of the concentrations of these components, and in particular, the total amount of HFO-1132(E), HFO-1123 and HFO-1234yf in the entire refrigerant 2B is preferably 99.7 mass % or more, more preferably 99.8 mass % or more, further preferably 99.9 mass % or more.

The refrigerant 2B can further include other refrigerant, in addition to HFO-1132(E), HFO-1123 and HFO-1234yf, as long as the above characteristics are not impaired. In such a case, the content rate of such other refrigerant in the entire refrigerant 2B is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 2B.

The refrigerant 2B particularly preferably consists only of HFO-1132(E), HFO-1123 and HFO-1234yf. In other words, the refrigerant 2B particularly preferably includes HFO-1132(E), HFO-1123 and HFO-1234yf at a total concentration of 100 mass % in the entire refrigerant 2B.

In a case where the refrigerant 2B consists only of HFO-1132(E), HFO-1123 and HFO-1234yf, the mass ratio of the three components is preferably within the range of a region surrounded by a figure passing through five points:
point A (HFO-1132(E)/HFO-1123/HFO-1234yf=42.5/1.0/56.5 mass %),
point B (HFO-1132(E)/HFO-1123/HFO-1234yf=27.1/1.0/71.9 mass %),
point C (HFO-1132(E)/HFO-1123/HFO-1234y=1.0/30.4/68.6 mass %),
point D (HFO-1132(E)/HFO-1123/HFO-1234yf=1.0/57.0/42.0 mass %) and
point E (HFO-1132(E)/HFO-1123/HFO-1234yf=42.5/24.1/33.4 mass %);
in the ternary composition diagram with the three components as respective apexes.

The technical meanings of the points A, B, C, D and E are as described above. The region surrounded by a figure passing through five points of the points A, B, C, D and E is as described above.

In such a case, a ternary mixed refrigerant of HFO-1132 (E), HFO-1123 and HFO-1234yf has various characteristics of (1) a GWP of 125 or less, (2) a refrigerating capacity ratio relative to that of R404A of 85% or more, (3) a saturation pressure at 40° C. of 2.25 MPa or less, and (4) a flame velocity of 3.0 cm/s or less, at any mass ratio within the range of a region (ABCDE region) surrounded by lines that connect five points of the points A, B, C, D and E.

In a case where the refrigerant 2B consists only of HFO-1132(E), HFO-1123 and HFO-1234yf, the mass ratio of the three components is more preferably within the range of a region surrounded by a figure passing through five points:

point A (HFO-1132(E)/HFO-1123/HFO-1234yf=42.5/1.0/56.5 mass %), point B (HFO-1132(E)/HFO-1123/HFO-1234yf=27.1/1.0/71.9 mass %), point C (HFO-1132(E)/HFO-1123/HFO-1234yf=1.0/30.4/68.6 mass %), point F (HFO-1132(E)/HFO-1123/HFO-1234yf=1.0/52.2/46.8 mass %) and point G (HFO-1132(E)/HFO-1123/HFO-1234yf=42.5/18.9/38.6 mass %);

in the ternary composition diagram with the three components as respective apexes.

The technical meanings of the points A, B, C, F and G are as described above. The region surrounded by a figure passing through five points of the points A, B, C, F and G is as described above.

In such a case, a ternary mixed refrigerant of HFO-1132 (E), HFO-1123 and HFO-1234yf has various characteristics of (1) a GWP of 125 or less, (2) a refrigerating capacity ratio relative to that of R404A of 85% or more, (3) a saturation pressure at 40° C. of 2.15 MPa or less, and (4) a flame velocity of 3.0 cm/s or less, at any mass ratio within the range of a region (ABCFG region) surrounded by lines that connect five points of the points A, B, C, F and G.

In a case where the refrigerant 2B consists only of HFO-1132(E), HFO-1123 and HFO-1234yf, the mass ratio of the three components is further preferably within the range of a region surrounded by a figure passing through six points:

point A (HFO-1132(E)/HFO-1123/HFO-1234yf=42.5/1.0/56.5 mass %), point B (HFO-1132(E)/HFO-1123/HFO-1234yf=27.1/1.0/71.9 mass %), point C (HFO-1132(E)/HFO-1123/HFO-1234yf=1.0/30.4/68.6 mass %), point H (HFO-1132(E)/HFO-1123/HFO-1234yf=1.0/35.2/63.8 mass %), point I (HFO-1132(E)/HFO-1123/HFO-1234yf=27.4/29.8/42.8 mass %) and, point G (HFO-1132(E)/HFO-1123/HFO-1234yf=42.5/18.9/38.6 mass %);

in the ternary composition diagram with the three components as respective apexes.

The technical meanings of the points A, B, C, G, H and I are as described above. The region surrounded by a figure passing through six points of the points A, B, C, H, I and G is as described above.

In such a case, a ternary mixed refrigerant of HFO-1132 (E), HFO-1123 and HFO-1234yf has various characteristics of (1) a GWP of 125 or less, (2) a refrigerating capacity ratio relative to that of R404A of 85% or more, (3) a COP ratio relative to that of R404A of 100% or more, (4) a saturation pressure at 40° C. of 2.15 MPa or less, and (5) a flame velocity of 3.0 cm/s or less, at any mass ratio within the range of a region (ABCHIG region) surrounded by lines that connect six points of the points A, B, C, H, I and G.

The refrigerant 2B has a GWP of 125 or less, and thus can remarkably suppress the environmental load from the viewpoint of global warming as compared with other general-purpose refrigerants.

Examples of Refrigerant 2B

Hereinafter, the refrigerant 2B will be described with reference to Examples in more detail. It is noted that the present disclosure is not limited to such Examples.

Test Example 1

The GWP of each mixed refrigerant represented in Examples 1 to 38, Comparative Examples 1 to 9 and Reference Example 1 (R404A) was evaluated based on the value in the fourth report of IPCC (Intergovernmental Panel on Climate Change).

The COP, the refrigerating capacity and the saturation pressure at 40° C. of such each mixed refrigerant were determined by performing theoretical refrigeration cycle calculation with respect to such each mixed refrigerant under the following conditions by using National Institute of Science and Technology (NIST), and Reference Fluid Thermodynamic and Transport Properties Database (Refprop 9.0).

Evaporating temperature −40° C.

Condensation temperature 40° C.

Superheating temperature 20 K

Subcooling temperature 0 K

Compressor efficiency 70%

The results in Test Example 1 are shown in Tables 213 to 216. In Tables 213 to 216, the "COP ratio (relative to that of R404A)" and the "Refrigerating capacity ratio (relative to that of R404A)" each represent the proportion (%) relative to that of R404A. In Tables 213 to 216, the "Saturation pressure (40° C.)" represents the saturation pressure at a saturation temperature of 40° C.

The coefficient of performance (COP) was determined according to the following expression.

COP=(Refrigerating capacity or heating capacity)/Power consumption

The flammability of such each mixed refrigerant was determined by defining the mixed composition of such each mixed refrigerant as the WCF concentration, and measuring the flame velocity according to ANSI/ASHRAE Standard 34-2013.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any flame was recorded by a high-speed digital video camera at a frame rate of 600 fps, and stored in a PC. Any case where the flame velocity was unmeasurable (0 cm/s) was rated as "NA (non-flammability)".

The flammable range of the mixed refrigerant was measured by using a measurement apparatus (see FIG. 1T) based on ASTM E681-09. Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)

Test temperature: 60° C.±3° C.

Pressure: 101.3 kPa±0.7 kPa

Water content 0.0088 g±0.0005 g per gram of dry air (water content at a relative humidity of 50% at 23° C.)

Mixing ratio of refrigerant composition/air: ±02 vol. % by 1 vol. %

Mixing of refrigerant composition: ±0.1 mass %

Ignition method: AC discharge, voltage 15 kV, current 30 mA, neon transformer

Electrode interval: 6.4 mm (¼ inches)

Spark: 0.4 seconds±0.05 seconds

Criteria for determination:

A case where any flame was spread at more than 90 degrees around the ignition point: flame propagation (flammability)

A case where any flame was spread at 90 degrees or less around the ignition point: no flame propagation (non-flammability)

TABLE 213

| Item | | Unit | Reference Example 1 (R404A) | Example 1 | Example 2 | Example 3 | Example 4 | Example 5 | Example 6 | Example 7 |
|---|---|---|---|---|---|---|---|---|---|---|
| Composition proportions | HFO-1132(E) | mass % | 0% | 40.0% | 40.0% | 40.0% | 35.0% | 35.0% | 35.0% | 35.0% |
| | HFO-1123 | mass % | 0% | 5.0% | 10.0% | 15.0% | 5.0% | 10.0% | 15.0% | 20.0% |
| | HFO-1234yf | mass % | 0% | 55.0% | 50.0% | 45.0% | 60.0% | 55.0% | 50.0% | 45.0% |
| | HFC-125 | mass % | 44.0% | 0% | 0% | 0% | 0% | 0% | 0% | 0% |
| | HFC-143a | mass % | 52.0% | 0% | 0% | 0% | 0% | 0% | 0% | 0% |
| | HFC-134a | mass % | 4.0% | 0% | 0% | 0% | 0% | 0% | 0% | 0% |
| GWP | | — | 3922 | 6 | 6 | 6 | 6 | 6 | 6 | 6 |
| COP ratio (relative to that of R404A) | | % | 100.0 | 104.3 | 103.4 | 102.4 | 104.4 | 103.5 | 102.5 | 101.6 |
| Refrigerating capacity ratio (relative to that of R404A) | | % | 100.0 | 104.0 | 109.7 | 115.5 | 98.4 | 104.1 | 109.8 | 115.6 |
| Saturation pressure (40° C.) | | MPa | 1.822 | 1.845 | 1.943 | 2.041 | 1.771 | 1.871 | 1.970 | 2.068 |
| Flame velocity | | cm/s | NA (non-flammability) | 2.6 | 2.6 | 2.6 | 2.0 | 2.0 | 2.0 | 2.0 |

| Item | | Unit | Example 8 | Example 9 | Example 10 | Example 11 | Example 12 | Example 13 | Example 14 | Example 15 |
|---|---|---|---|---|---|---|---|---|---|---|
| Composition proportions | HFO-1132(E) | mass % | 30.0% | 30.0% | 30.0% | 30.0% | 30.0% | 25.0% | 25.0% | 25.0% |
| | HFO-1123 | mass % | 5.0% | 10.0% | 15.0% | 20.0% | 25.0% | 5.0% | 10. 0% | 15.0% |
| | HFO-1234yf | mass % | 65.0% | 60.0% | 55.0% | 50.0% | 45.0% | 70.0% | 65.0% | 60.0% |
| | HFC-125 | mass % | 0% | 0% | 0% | 0% | 0% | 0% | 0% | 0% |
| | HFC-143a | mass % | 0% | 0% | 0% | 0% | 0% | 0% | 0% | 0% |
| | HFC-134a | mass % | 0% | 0% | 0% | 0% | 0% | 0% | 0% | 0% |
| GWP | | — | 6 | 6 | 5 | 5 | 5 | 5 | 5 | 5 |
| COP ratio (relative to that of R404A) | | % | 104.6 | 103.6 | 102.7 | 101.7 | 100.8 | 104.7 | 103.8 | 102.8 |
| Refrigerating capacity ratio (relative to that of R404A) | | % | 92.7 | 98.3 | 104.0 | 109.7 | 115.6 | 86.9 | 92.4 | 98.0 |
| Saturation pressure (40° C.) | | MPa | 1.694 | 1.795 | 1.895 | 1.994 | 2.093 | 1.613 | 1.715 | 1.816 |
| Flame velocity | | cm/s | 1.6 | 1.6 | 1.6 | 1.6 | 1.6 | 1.5 | 1.5 | 1.5 |

TABLE 214

| Item | | Unit | Reference Example 1 (R404A) | Example 16 | Example 17 | Example 18 | Example 19 | Example 20 | Example 21 | Example 22 |
|---|---|---|---|---|---|---|---|---|---|---|
| Composition proportions | HFO-1132(E) | mass % | 0% | 25.0% | 25.0% | 25.0% | 20.0% | 20.0% | 20.0% | 20.0% |
| | HFO-1123 | mass % | 0% | 20.0% | 25.0% | 30.0% | 10.0% | 15.0% | 20.0% | 25.0% |
| | HFO-1234yf | mass % | 0% | 55.0% | 50.0% | 45.0% | 70.0% | 65.0% | 60.0% | 55.0% |
| | HFC-125 | mass % | 44.0% | 0% | 0% | 0% | 0% | 0% | 0% | 0% |
| | HFC-143a | mass % | 52.0% | 0% | 0% | 0% | 0% | 0% | 0% | 0% |
| | HFC-134a | mass % | 4.0% | 0% | 0% | 0% | 0% | 0% | 0% | 0% |

TABLE 214-continued

| | | | | | | | | | |
|---|---|---|---|---|---|---|---|---|---|
| GWP | — | 3922 | 5 | 5 | 5 | 5 | 5 | 5 | 4 |
| COP ratio (relative to that of R404A) | % | 100.0 | 101.9 | 100.9 | 100.0 | 103.9 | 103.0 | 102.1 | 101.1 |
| Refrigerating capacity ratio (relative to that of R404A) | % | 100.0 | 103.7 | 109.5 | 115.4 | 86.4 | 92.0 | 97.6 | 103.4 |
| Saturation pressure (40° C.) | MPa | 1.822 | 1.917 | 2.017 | 2.117 | 1.632 | 1.734 | 1.835 | 1.936 |
| Flame velocity | cm/s | NA (non-flammability) | 1.5 | 1.5 | 1.5 | 1.5 | 1.5 | 1.5 | 1.5 |

| Item | | Unit | Example 23 | Example 24 | Example 25 | Example 26 | Example 27 | Example 28 | Example 29 |
|---|---|---|---|---|---|---|---|---|---|
| Composition proportions | HFO-1132(E) | mass % | 20.0% | 15.0% | 15.0% | 15.0% | 15.0% | 30.0% | 20.0% |
| | HFO-1123 | mass % | 30.0% | 15.0% | 20.0% | 25.0% | 30.0% | 30.0% | 40.0% |
| | HFO-1234yf | mass % | 50.0% | 70.0% | 65.0% | 60.0% | 55.0% | 40.0% | 40.0% |
| | HFC-125 | mass % | 0% | 0% | 0% | 0% | 0% | 0% | 0% |
| | HFC-143a | mass % | 0% | 0% | 0% | 0% | 0% | 0% | 0% |
| | HFC-134a | mass % | 0% | 0% | 0% | 0% | 0% | 0% | 0% |
| GWP | | — | 4 | 4 | 4 | 4 | 4 | 5 | 4 |
| COP ratio (relative to that of R404A) | | % | 100.2 | 103.2 | 102.3 | 101.3 | 100.4 | 99.9 | 98.3 |
| Refrigerating capacity ratio (relative to that of R404A) | | % | 109.2 | 85.8 | 91.4 | 97.1 | 102.9 | 121.5 | 121.2 |
| Saturation pressure (40° C.) | | MPa | 2.037 | 1.648 | 1.750 | 1.851 | 1.953 | 2.192 | 2.237 |
| Flame velocity | | cm/s | 1.5 | 1.5 | 1.5 | 1.5 | 1.5 | 1.6 | 1.5 |

TABLE 215

| Item | | Unit | Reference Example 1 (R404A) | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|
| Composition proportions | HFO-1132(E) | mass % | 0% | 45% | 15% | 0% | 30% | 20% | 10% | 0% | 100% | 0% |
| | HFO-1123 | mass % | 0% | 10% | 10% | 30% | 40% | 45% | 50% | 60% | 0% | 0% |
| | HFO-1234yf | mass % | 0% | 45% | 75% | 70% | 30% | 35% | 40% | 40% | 0% | 100% |
| | HFC-125 | mass % | 44.0% | 0% | 0% | 0% | 0% | 0% | 0% | 0% | 0% | 0% |
| | HFC-143a | mass % | 52.0% | 0% | 0% | 0% | 0% | 0% | 0% | 0% | 0% | 0% |
| | HFC-134a | mass % | 4.0% | 0% | 0% | 0% | 0% | 0% | 0% | 0% | 0% | 0% |
| GWP | | — | 3922 | 7 | 6 | 6 | 8 | 8 | 8 | 7.6 | 10 | 4 |
| COP ratio (relative to that of R404A) | | % | 100.0 | 103.3 | 104.1 | 101.0 | 98.1 | 97.4 | 100.0 | 98.6 | 105.4 | 106.2 |
| Refrigerating capacity ratio (relative to that of R404A) | | % | 100.0 | 115.3 | 80.4 | 83.2 | 133.6 | 127.4 | 100.0 | 98.8 | 155.3 | 52.9 |
| Saturation pressure (40° C.) | | MPa | 1.822 | 2.012 | 1.545 | 1.675 | 2.387 | 2.336 | 2.271 | 2.292 | 2.412 | 1.018 |
| Flame velocity | | cm/s | NA (non-flammability) | 5.4 | 1.5 | 1.5 | 1.6 | 1.5 | 1.5 | 1.5 | 21 | 1.5 |

TABLE 216

| Item | | Unit | Reference Example 1 (R404A) | Example 30 A | Example 31 B | Example 32 C | Example 33 D |
|---|---|---|---|---|---|---|---|
| Composition proportions | HFO-1132(E) | mass % | 0% | 42.5% | 27.1% | 1.0% | 1.0% |
| | HFO-1123 | mass % | 0% | 1.0% | 1.0% | 30.4% | 57.0% |
| | HFO-1234yf | mass % | 0% | 56.5% | 71.9% | 68.6% | 42.0% |
| | HFC-125 | mass % | 44.0% | 0% | 0% | 0% | 0% |

TABLE 216-continued

| | | | | | | | |
|---|---|---|---|---|---|---|---|
| | HFC-143a | mass % | 52.0% | 0% | 0% | 0% | 0% |
| | HFC-134a | mass % | 4.0% | 0% | 0% | 0% | 0% |
| GWP | | — | 3922 | 7 | 6 | 6 | 7 |
| COP ratio (relative to that of R404A) | | % | 100.0 | 105.0 | 105.4 | 100.9 | 95.9 |
| Refrigerating capacity ratio (relative to that of R404A) | | % | 100.0 | 102.3 | 85.0 | 85.0 | 116.6 |
| Saturation pressure (40° C.) | | MPa | 1.822 | 1,801 | 1,565 | 1.703 | 2.25 |
| Flame velocity | | cm/s | NA (non-flammability) | 3.0 | 1.7 | 1.5 | 1.5 |

| Item | | Unit | Example 34 E | Example 35 F | Example 36 G | Example 37 H | Example 38 I |
|---|---|---|---|---|---|---|---|
| Composition proportions | HFO-1132(E) | mass % | 42.5% | 1.0% | 42.5% | 1.0% | 27.4% |
| | HFO-1123 | mass % | 24.1% | 52.2% | 18.9% | 35.2% | 29.8% |
| | HFO-1234yf | mass % | 33.4% | 46.8% | 38.6% | 63.8% | 42.8% |
| | HFC-125 | mass % | 0% | 0% | 0% | 0% | 0% |
| | HFC-143a | mass % | 0% | 0% | 0% | 0% | 0% |
| | HFC-134a | mass % | 0% | 0% | 0% | 0% | 0% |
| GWP | | — | 8 | 7 | 8 | 6 | 7 |
| COP ratio (relative to that of R404A) | | % | 100.8 | 96.8 | 101.7 | 100.0 | 100.0 |
| Refrigerating capacity ratio (relative to that of R404A) | | % | 128.9 | 110.6 | 122.8 | 90.4 | 118.1 |
| Saturation pressure (40° C.) | | MPa | 2.25 | 2.15 | 2.15 | 1.802 | 2.15 |
| Flame velocity | | cm/s | 3.0 | 1.5 | 3.0 | 1.5 | 1.7 |

(1-6-3) Refrigerant 2C

The refrigerant 2C includes, in one aspect, HFO-1132(E) and HFO-1234yf, and the content rate of HFO-1132(E) is 35.0 to 65.0 mass % and the content rate of HFO-1234yf is 65.0 to 35.0 mass % based on the total mass of HFO-1132(E) and HFO-1234yf. The refrigerant is sometimes referred to as "refrigerant 2C1".

(1-6-3-1) Refrigerant 2C1

The refrigerant 2C1, which has such a configuration, thus has various characteristics of (1) a sufficiently low GWP (100 or less), (2) a COP equivalent to or more than that of R404A, and (3) a refrigerating capacity equivalent to or more than that of R404A.

The content rate of HFO-1132(E) is 35.0 mass % or more based on the total mass of HFO-1132(E) and HFO-1234yf in the refrigerant 2C1, thereby allowing the refrigerating capacity equivalent to or more than that of R404A to be obtained.

The content rate of HFO-1132(E) is 65.0 mass % or less based on the total mass of HFO-1132(E) and HFO-1234yf in the refrigerant 2C1, thereby enabling the saturation pressure at a saturation temperature of 40° C., in the refrigeration cycle of the refrigerant 2C1, to be kept in a suitable range (in particular, 2.10 Mpa or less).

The refrigerating capacity relative to that of R404A, of the refrigerant 2C1, may be 95% or more, and is preferably 98% or more, more preferably 100% or more, further preferably 101% or more, particularly preferably 102% or more.

The refrigerant 2C1 has a GWP of 100 or less, and thus can remarkably suppress the environmental load from the viewpoint of global warming as compared with other general-purpose refrigerants.

The refrigerant 2C1 is preferably high in ratio of the driving force consumed in the refrigeration cycle and the refrigerating capacity (coefficient of performance (COP)), relative to that of R404A, from the viewpoint of energy consumption efficiency, and specifically, the COP relative to that of R404A is preferably 98% or more, more preferably 100% or more, particularly preferably 102% or more.

Preferably, the content rate of HFO-1132(E) is 40.5 to 59.0 mass % and the content rate of HFO-1234yf is 59.5 to 41.0 mass % based on the total mass of HFO-1132(E) and HFO-1234yf in the refrigerant 2C1. In such a case, the refrigerant 2C1 has a GWP of 100 or less, a COP relative to that of R404A of 101% or more, and a refrigerating capacity relative to that of R404A of 99% or more. Furthermore, in such a case, the refrigerant 2C1 has a saturation pressure at a saturation temperature of 40° C., of 1.75 MPa or more and 2.00 MPa or less, and can be applied to a commercially available refrigerating apparatus for R404A without any significant change in design.

More preferably, the content rate of HFO-1132(E) is 41.3 to 59.0 mass % and the content rate of HFO-1234yf is 58.7 to 41.0 mass % based on the total mass of HFO-1132(E) and HFO-1234yf in the refrigerant 2C1. In such a case, the refrigerant 2C1 has a GWP of 100 or less, a COP relative to that of R404A of 101% or more, and a refrigerating capacity relative to that of R404A of 99.5% or more. Furthermore, in such a case, the refrigerant 2C1 has a saturation pressure at a saturation temperature of 40° C., of 1.76 MPa or more and 2.00 MPa or less, and can be applied to a commercially available refrigerating apparatus for R404A without any significant change in design.

Further preferably, the content rate of HFO-1132(E) is 41.3 to 55.0 mass % and the content rate of HFO-1234yf is 58.7 to 45.0, mass % based on the total mass of HFO-1132 (E) and HFO-1234yf in the refrigerant 2C1. In such a case, the refrigerant 2C1 has a GWP of 100 or less, a COP relative to that of R404A of 101% or more, and a refrigerating capacity relative to that of R404A of 99.5% or more. Furthermore, in such a case, the refrigerant 2C1 has a saturation pressure at a saturation temperature of 40° C., of 1.76 MPa or more and 1.95 MPa or less, and can be applied to a commercially available refrigerating apparatus for R404A without any significant change in design.

Particularly preferably, the content rate of HFO-1132(E) is 41.3 to 53.5 mass % and the content rate of HFO-1234yf is 583 to 46.5 mass % based on the total mass of HFO-1132

(E) and HFO-1234yf in the refrigerant 2C1. In such a case, the refrigerant 2C1 has various characteristics of a GWP of, 100 or less, a COP relative to that of R404A of 102% or more and a refrigerating capacity relative to that of R404A of 99.5% or more, and lower flammability (Class 2L) according to ASHRAE Standard. Furthermore, in such a case, the refrigerant 2C1 has a saturation pressure at a saturation temperature of 40° C., of 1.76 MPa or more and 1.94 MPa or less, and can be applied to a commercially available refrigerating apparatus for R404A without any significant change in design.

Extremely preferably, the content rate of HFO-1132(E) is 41.3 to 51.0 mass % and the content rate of HFO-1234yf is 58.7 to 49.0 mass % based on the total mass of HFO-1132(E) and HFO-1234yf in the refrigerant 2C1. In such a case, the refrigerant 2C1 has various characteristics of a GWP of 100 or less, a COP relative to that of R404A of 102% or more and a refrigerating capacity relative to that of R404A of 99% or more, and lower flammability (Class 2L) according to ASHRAE Standard. Furthermore, in such a case, the refrigerant 2C1 has a saturation pressure at a saturation temperature of 40° C., of 1.76 MPa or more and 1.90 MPa or less, and can be applied to a commercially available refrigerating apparatus for R404A without any significant change in design.

Most preferably, the content rate of HFO-1132(E) is 41.3 to 49.2 mass % and the content rate of HFO-1234yf is 58.7 to 50.8 mass % based on the total mass of HFO-1132(E) and HFO-1234yf in the refrigerant 2C1. In such a case, the refrigerant 2C1 has various characteristics of a GWP of 100 or less, a COP relative to that of R404A of 102% or more and a refrigerating capacity, relative to that of R404A of 99.5% or more, and lower flammability (Class 2L) according to ASHRAE Standard. Furthermore, in such a case, the refrigerant 2C1 has a saturation pressure at a saturation temperature of 40° C., of 1.76 MPa or more and 1.88 MPa or less, and can be applied to a commercially available refrigerating apparatus for R404A without any significant change in design.

The refrigerant 2C1 usually has a saturation pressure at a saturation temperature of 40° C., of 2.10 MPa or less, preferably 2.00 MPa or less, more preferably 1.95 MPa or less, further preferably 1.90 MPa or less, particularly preferably 1.88 MPa or less. The refrigerant 2C1, which has a saturation pressure at a saturation temperature of 40° C. within such a range, thus can be applied to a commercially available refrigerating apparatus for R404A without any significant change in design.

The refrigerant 2C1 usually has a saturation pressure at a saturation temperature of 40° C., of 1.70 MPa or more, preferably 1.73 MPa or more, more preferably 1.74 MPa or more, further preferably 1.75 MPa or more, particularly preferably 1.76 MPa or more. The refrigerant 2C1, which has a saturation pressure at a saturation temperature of 40° C. within such a range, thus can be applied to a commercially available refrigerating apparatus for R404A without any significant change in design.

In a case where the refrigerant 2C1 is used for operating the refrigeration cycle, in the present disclosure, the discharge temperature is preferably 150° C. or less, more preferably 140° C. or less, further preferably 130° C. or less, particularly preferably 120° C. or less from the viewpoint that the life of any member of a commercially available refrigerating apparatus for R404A is extended.

The refrigerant 2C1 is used for operating a refrigeration cycle at an evaporating temperature of −75 to −5° C., and thus, an advantage is that the refrigerating capacity equivalent to or more than that of R404A is obtained.

In a case where the evaporating temperature is more than −5° C. in the refrigeration cycle where the refrigerant 2C1 of the present disclosure is used, the compression ratio is less than 2.5 to cause the efficiency of the refrigeration cycle to be deteriorated. In a case where the evaporating temperature is less than −75° C. in the refrigeration cycle where the refrigerant 2C1 of the present disclosure is used, the evaporating pressure is less than 0.02 MPa to cause suction of the refrigerant into a compressor to be difficult. The compression ratio can be determined by the following expression.

Compression ratio Condensation pressure (Mpa)/Evaporating pressure (Mpa)

The evaporating temperature in the refrigeration cycle where the refrigerant 2C1 of the present disclosure is used is preferably −7.5° C. or less, more preferably −10° C. or less, further preferably −35° C. or less.

The evaporating temperature in the refrigeration cycle where the refrigerant 2C1 of the present disclosure is used is preferably −65° C. or more, more preferably −60° C. or more, further preferably −55° C. or more, particularly preferably −50° C. or more.

The evaporating temperature in the refrigeration cycle where the refrigerant 2C1 of the present disclosure is used is preferably −65° C. or more and −5° C. or less, more preferably −60° C. or more and −5° C. or less, further preferably −55° C. or more and −7.5° C. or less, particularly preferably −50° C. or more and −10° C. or less.

The evaporating pressure in the refrigeration cycle where the refrigerant 2C1 of the present disclosure is used is preferably 0.02 MPa or more, more preferably 0.03 MPa or more, further preferably 0.04 MPa or more, particularly preferably 0.05 MPa or more, from the viewpoint that suction of the refrigerant into a compressor is enhanced.

The compression ratio in the refrigeration cycle where the refrigerant 2C1 of the present disclosure is used is preferably 2.5 or more, more preferably 3.0 or more, further preferably 3.5 or more, particularly preferably 4.0 or more, from the viewpoint that the efficiency of the refrigeration cycle is enhanced. The compression ratio in the refrigeration cycle where the refrigerant 2C1 of the present disclosure is used is preferably 200 or less, more preferably 150 or less, further preferably 100 or less, particularly preferably 50 or less, from the viewpoint that the efficiency of the refrigeration cycle is enhanced.

The refrigerant 2C1 may usually include 99.5 mass % or more of HFO-1132(E) and HFO-1234yf in terms of the sum of the concentrations of these components. In the present disclosure, the total amount of HFO-1132(E) and HFO-1234yf in the entire refrigerant 2C1 is preferably 99.7 mass % or more, more preferably 99.8 mass % or more, further preferably 99.9 mass % or more.

The refrigerant 2C1 can further include other refrigerant, in addition to HFO-1132(E) and HFO-1234yf, as long as the above characteristics are not impaired. In such a case, the content rate of such other refrigerant in the entire refrigerant 2C1 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 2C1.

The refrigerant 2C1 particularly preferably consists only of HFO-1132(E) and HFO-1234yf. In other words, the refrigerant 2C1 particularly preferably includes HFO-1132 (E) and HFO-1234yf at a total concentration of 100 mass % in the entire refrigerant 2C1.

In a case where the refrigerant 2C1 consists only of HFO-1132(E) and HFO-1234yf, the content rate of HFO-1132(E) is usually 35.0 to 65.0 mass % and the content rate of HFO-1234yf is usually 65.0 to 35.0 mass % based on the total mass of HFO-1132(E) and HFO-1234yf. The refrigerant 2C1, which has such a configuration, thus has various characteristics of (1) a sufficiently low GWP (100 or less), (2) a COP equivalent to or more than that of R404A, and (3) a refrigerating capacity equivalent to or more than that of R404A.

In a case where the refrigerant 2C1 consists only of HFO-1132(E) and HFO-1234yf, preferably, the content rate of HFO-1132(E) is 40.5 to 59.0 mass % and the content rate of HFO-1234yf is 59.5 to 41.0 mass % based on the total mass of HFO-1132(E) and HFO-1234yf. In such a case, the refrigerant 2C1 has a GWP of 100 or less, a COP relative to that of R404A of 101% or more, and a refrigerating capacity relative to that of R404A of 99% or more. Furthermore, in such a case, the refrigerant 2C1 has a saturation pressure at a saturation temperature of 40° C., of 1.75 MPa or more and 2.00 MPa or less, and can be applied to a commercially available refrigerating apparatus for R404A without any significant change in design.

In a case where the refrigerant 2C1 consists only of HFO-1132(E) and HFO-1234yf, more preferably, the content rate of HFO-1132(E) is 41.3 to 59.0 mass % and the content rate of HFO-1234yf is 58.7 to 41.0 mass % based on the total mass of HFO-1132(E) and HFO-1234yf. In such a case, the refrigerant 2C1 has a GWP of 100 or less, a COP relative to that of R404A of 101% or more, and a refrigerating capacity relative to that of R404A of 99.5% or more. Furthermore, in such a case, the refrigerant 2C1 has a saturation pressure at a saturation temperature of 40° C., of 1.76 MPa or more and 2.00 MPa or less, and can be applied to a commercially available refrigerating apparatus for R404A without any significant change in design.

In a case where the refrigerant 2C1 consists only of HFO-1132(E) and HFO-1234yf, further preferably, the content rate of HFO-1132(E) is 41.3 to 55.0 mass % and the content rate of HFO-1234yf is 58.7 to 45.0 mass % based on the total mass of HFO-1132(E) and HFO-1234yf. In such a case, the refrigerant 2C1 has a GWP of 100 or less, a COP relative to that of R404A of 101% or more, and a refrigerating capacity relative to that of R404A of 99.5% or more. Furthermore, in such a case, the refrigerant 2C1 has a saturation pressure at a saturation temperature of 40° C., of 1.76 MPa or more and 1.95 MPa or less, and can be applied to a commercially available refrigerating apparatus for R404A without any significant change in design.

In a case where the refrigerant 2C1 consists only of HFO-1132(E) and HFO-1234yf, particularly preferably, the content rate of HFO 1132(E) is 41.3 to 53.5 mass % and the content rate of HFO-1234yf is 58.7 to 46.5 mass % based on the total mass of HFO-1132(E) and HFO-1234yf. In such a case, the refrigerant 2C1 has various characteristics of a GWP of 100 or less, a COP relative to that of R404A of 102% or more and a refrigerating capacity relative to that of R404A of 99.5% or more, and lower flammability (Class 2L) according to ASHRAE Standard. Furthermore, in such a case, the refrigerant 2C1 has a saturation pressure at a saturation temperature of 40° C., of 1.76 MPa or more and 1.94 MPa or less, and can be applied to a commercially available refrigerating apparatus for R404A without any significant change in design.

In a case where the refrigerant 2C1 consists only of HFO-1132(E) and HFO-1234yf, extremely preferably, the content rate of HFO-1132(E) is 41.3 to 51.0 mass % and the content rate of HFO-1234yf is 58.7 to 49.0 mass % based on the total mass of HFO-1132(E) and HFO-1234yf. In such a case, the refrigerant 2C1 has various characteristics of a GWP of 100 or less, a COP relative to that of R404A of 102% or more and a refrigerating capacity relative to that of R404A of 99% or more, and lower flammability (Class 2L) according to ASHRAE Standard. Furthermore, in such a case, the refrigerant 2C1 has a saturation pressure at a saturation temperature of 40° C., of 1.76 MPa or more and 1.90 MPa or less, and can be applied to a commercially available refrigerating apparatus for R404A without any significant change in design.

In a case where the refrigerant 2C1 consists only of HFO-1132(E) and HFO-1234yf, most preferably, the content rate of HFO-1132(E) is 41.3 to 49.2 mass % and the content rate of HFO-1234yf is 58.7 to 50.8 mass % based on the total mass off-TO-1132(E) and HFO-1234yf. In such a case, the refrigerant 2C1 has various characteristics of a GWP of 100 or less, a COP relative to that of R404A of 102% or more and a refrigerating capacity relative to that of R404A of 99.5% or more, and lower flammability (Class 2L) according to ASHRAE Standard. Furthermore, in such a case, the refrigerant 2C1 has a saturation pressure at a saturation temperature of 40° C., of 1.76 MPa or more and 1.88 MPa or less, and can be applied to a commercially available refrigerating apparatus for R404A without any significant change in design.

(1-6-3-2) Refrigerant 2C2

Refrigerant 2C2 The refrigerant included in the composition of the present disclosure includes, in one aspect, HFO-1132(E) and HFO-1234yf, and the content rate of HFO-1132(E) is 40.5 to 492 mass % and the content rate of HFO-1234yf is 59.5 to 50.8 mass % based on the total mass of HFO-1132(E) and HFO-1234yf. The refrigerant is sometimes referred to as "refrigerant 2C2".

The refrigerant 2C2, which has such a configuration, thus has various characteristics of (1) a sufficiently low GWP (100 or less), (2) a COP equivalent to or more than that of R404A, (3) a refrigerating capacity equivalent to or more than that of R404A, and (4) lower flammability (Class 2L) according to ASHRAE Standard. Furthermore, in such a case, the refrigerant 2C2 has a saturation pressure at a saturation temperature of 40° C., of 1.75 MPa or more and 1.88 MPa or less, and can be applied to a commercially available refrigerating apparatus for R404A without any significant change in design.

The content rate of HFO-1132(E) is 40.5 mass % or more based on the total mass of HFO-1132(E) and HFO-1234yf in the refrigerant 2C2, thereby allowing the refrigerating capacity equivalent to or more than that of R404A to be obtained.

The content rate of HFO-1132(E) is 49.2 mass % or less based on the total mass of HFO-1132(E) and HFO-1234yf in the refrigerant 2C2, thereby enabling the saturation pressure at a saturation temperature of 40° C., in the refrigeration cycle of the refrigerant 2C2, to be kept in a suitable range (in particular, 2.10 Mpa or less).

The refrigerating capacity relative to that of R404A, of the refrigerant 2C2, may be 99% or more, and is preferably 100% or more, more preferably 101% or more, further preferably 102% or more, particularly preferably 103% or more.

The refrigerant 2C2 has a GWP of 100 or less, and thus can remarkably suppress the environmental load from the viewpoint of global warming as compared with other general-purpose refrigerants.

The refrigerant 2C2 is preferably high in ratio of the driving force consumed in the refrigeration cycle and the refrigerating capacity (coefficient of performance (COP)), relative to that of R404A, from the viewpoint of energy consumption efficiency, and specifically, the COP relative to that of R404A is preferably 98% or more, more preferably 100% or more, further preferably 101% or more, particularly preferably 102% or more.

Preferably, the content rate of HFO-1132(E) is 41.3 to 49.2 mass % and the content rate of HFO-1234yf is 58.7 to 50.8 mass % based on the total mass of HFO-1132(E) and HFO-1234yf in the refrigerant 2C2. In such a case, the refrigerant 2C2 has various characteristics of a GWP of 100 or less, a COP relative to that of R404A of 102% or more, a refrigerating capacity relative to that of R404A of 99.5% or more, and lower flammability (Class 2L) according to ASHRAE Standard. Furthermore, in such a case, the refrigerant 2C2 has a saturation pressure at a saturation temperature of 40° C., of 1.76 MPa or more and 1.88 MPa or less, and can be applied to a commercially available refrigerating apparatus for R404A without any significant change in design.

More preferably, the content rate of HFO-1132(E) is 43.0 to 49.2 mass % and the content rate of HFO-1234yf is 57.0 to 50.8 mass % based on the total mass of HFO-1132(E) and HFO-1234yf in the refrigerant 2C2. In such a case, the refrigerant 2C2 has various characteristics of a GWP of 100 or less, a COP relative to that of R404A of 102% or more, a refrigerating capacity relative to that of R404A of 101% or more, and lower flammability (Class 2L) according to ASHRAE Standard. Furthermore, in such a case, the refrigerant 2C2 has a saturation pressure at a saturation temperature of 40° C., of 1.78 MPa or more and 1.88 MPa or less, and can be applied to a commercially available refrigerating apparatus for R404A without any significant change in design.

Further preferably, the content rate of HFO-1132(E) is 44.0 to 49.2 mass % and the content rate of HFO-1234yf is 56.0 to 50.8 mass % based on the total mass of HFO-1132(E) and HFO-1234yf in the refrigerant 2C2. In such a case, the refrigerant 2C2 has various characteristics of a GWP of 100 or less, a COP relative to that of R404A of 102% or more, a refrigerating capacity relative to that of R404A of 101% or more, and lower flammability (Class 2L) according to ASHRAE Standard. Furthermore, in such a case, the refrigerant 2C2 has a saturation pressure at a saturation temperature of 40° C., of 1.80 MPa or more and 1.88 MPa or less, and can be applied to a commercially available refrigerating apparatus for R404A without any significant change in design.

Particularly preferably, the content rate of HFO-1132(E) is 45.0 to 49.2 mass % and the content rate of HFO-1234yf is 55.0 to 50.8 mass % based on the total mass of HFO-1132(E) and HFO-1234yf in the refrigerant 2C2. In such a case, the refrigerant 2C2 has various characteristics of a GWP of 100 or less, a COP relative to that of R404A of 102% or more, a refrigerating capacity relative to that of R404A of 102% or more, and lower flammability (Class 2L) according to ASHRAE Standard. Furthermore, in such a case, the refrigerant 2C2 has a saturation pressure at a saturation temperature of 40° C., of 1.81 MPa or more and 1.88 MPa or less, and can be applied to a commercially available refrigerating apparatus for R404A without any significant change in design.

Extremely preferably, the content rate of HFO-1132(E) is 45.0 to 48.0 mass % and the content rate of HFO-1234yf is 55.0 to 52.0 mass % based on the total mass of HFO-1132(E) and HFO-1234yf in the refrigerant 2C2. In such a case, the refrigerant 2C2 has various characteristics of a GWP of 100 or less, a COP relative to that of R404A of 102.5% or more, a refrigerating capacity relative to that of R404A of 102.5% or more, and lower flammability (Class 2L) according to ASHRAE Standard. Furthermore, in such a case, the refrigerant 2C2 has a saturation pressure at a saturation temperature of 40° C., of 1.81 MPa or more and 1.87 MPa or less, and can be applied to a commercially available refrigerating apparatus for R404A without any significant change in design.

Most preferably, the content rate of HFO-1132(E) is 45.0 to 47.0 mass % and the content rate of HFO-1234yf is 55.0 to 53.0 mass % based on the total mass of HFO-1132(E) and HFO-1234yf in the refrigerant 2C2. In such a case, the refrigerant 2C2 has various characteristics of a GWP of 100 or less, a COP relative to that of R404A of 102.5% or more, a refrigerating capacity relative to that of R404A of 102.5% or more, and lower flammability (Class 2L) according to ASHRAE Standard. Furthermore, in such a case, the refrigerant 2C2 has a saturation pressure at a saturation temperature of 40° C., of 1.81 MPa or more and 1.85 MPa or less, and can be applied to a commercially available refrigerating apparatus for R404A without any significant change in design.

The refrigerant 2C2 usually has a saturation pressure at a saturation temperature of 40° C., of 2.10 MPa or less, preferably 2.00 MPa or less, more preferably 1.95 MPa or less, further preferably 1.90 MPa or less, particularly preferably 1.88 MPa or less. The refrigerant 2C2, which has a saturation pressure at a saturation temperature of 40° C. within such a range, thus can be applied to a commercially available refrigerating apparatus for R404A without any significant change in design.

The refrigerant 2C2 usually has a saturation pressure at a saturation temperature of 40° C., of 1.70 MPa or more, preferably 1.73 MPa or more, more preferably 1.74 MPa or more, further preferably 1.75 MPa or more, particularly preferably 1.76 MPa or more. The refrigerant 2C2, which has a saturation pressure at a saturation temperature of 40° C. within such a range, thus can be applied to a commercially available refrigerating apparatus for R404A without any significant change in design.

In a case where the refrigerant 2C2 is used for operating the refrigeration cycle, in the present disclosure, the discharge temperature is preferably 150° C. or less, more preferably 140° C. or less, further preferably 130° C. or less, particularly preferably 120° C. or less from the viewpoint that the life of any member of a commercially available refrigerating apparatus for R404A is extended.

The refrigerant 2C2 is preferably used for operating a refrigeration cycle at an evaporating temperature of −75 to 15° C. in the present disclosure, from the viewpoint that the refrigerating capacity equivalent to or more than that of R404A is obtained.

The evaporating temperature in the refrigeration cycle where the refrigerant 2C2 of the present disclosure is used is preferably 15° C. or less, more preferably 5° C. or less, further preferably 0° C. or less, particularly preferably −5° C. or less.

The evaporating temperature in the refrigeration cycle where the refrigerant 2C2 of the present disclosure is used is preferably −65° C. or more, more preferably −60° C. or more, further preferably −55° C. or more, particularly preferably −50° C. or more.

The evaporating temperature in the refrigeration cycle where the refrigerant 2C2 of the present disclosure is used is preferably −65° C. or more and 15° C. or less, more preferably −60° C. or more and 5° C. or less, further preferably −55° C. or more and 0° C. or less, particularly preferably −50° C. or more and −5° C. or less.

The evaporating pressure in the refrigeration cycle where the refrigerant 2C2 of the present disclosure is used is preferably 0.02 MPa or more, more preferably 0.03 MPa or more, further preferably 0.04 MPa or more, particularly preferably 0.05 MPa or more, from the viewpoint that suction of the refrigerant into a compressor is enhanced.

The compression ratio in the refrigeration cycle where the refrigerant 2C2 of the present disclosure is used is preferably 2.5 or more, more preferably 3.0 or more, further preferably 3.5 or more, particularly preferably 4.0 or more, from the viewpoint that the efficiency of the refrigeration cycle is enhanced.

The refrigerant 2C2 may usually include 99.5 mass % or more of HFO-1132(E) and HFO-1234yf in terms of the sum of the concentrations of these components. In the present disclosure, the total amount of HFO-1132(E) and HFO-1234yf in the entire refrigerant 2C2 is preferably 99.7 mass % or more, more preferably 99.8 mass % or more, further preferably 99.9 mass % or more.

The refrigerant 2C2 can further include other refrigerant, in addition to HFO-1132(E) and HFO-1234yf, as long as the above characteristics are not impaired. In such a case, the content rate of such other refrigerant in the entire refrigerant 2C2 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 2C2.

The refrigerant 2C2 particularly preferably consists only of HFO-1132(E) and HFO-1234yf. In other words, the refrigerant 2C2 particularly preferably includes HFO-1132(E) and HFO-1234yf at a total concentration of 100 mass % in the entire refrigerant 2C2.

In a case where the refrigerant 2C2 consists only of HFO-1132(E) and HFO-1234yf, the content rate of HFO-1132(E) is usually 40.5 to 49.2 mass % and the content rate of HFO-1234yf is usually 59.5 to 50.8 mass % based on the total mass of HFO-1132(E) and HFO-1234yf. The refrigerant 2C2, which has such a configuration, thus has various characteristics of (1) a sufficiently low GWP (100 or less), (2) a COP equivalent to or more than that of R404A, (3) a refrigerating capacity equivalent to or more than that of R404A, and (4) lower flammability (Class 2L) according to ASHRAE Standard. Furthermore, in such a case, the refrigerant 2C2 has a saturation pressure at a saturation temperature of 40° C., of 1.75 MPa or more and 1.88 MPa or less, and can be applied to a commercially available refrigerating apparatus for R404A without any significant change in design.

In a case where the refrigerant 2C2 consists only of HFO-1132(E) and HFO-1234yf, preferably, the content rate of HFO-1132(E) is 41.3 to 49.2 mass % and the content rate of HFO-1234yf is 58.7 to 50.8 mass % based on the total mass of HFO-1132(E) and HFO-1234yf. In such a case, the refrigerant 2C2 has various characteristics of a GWP of 100 or less, a COP relative to that of R404A of 102% or more, a refrigerating capacity relative to that of R404A of 99.5% or more, and lower flammability (Class 2L) according to ASHRAE Standard.

Furthermore, in such a case, the refrigerant 2C2 has a saturation pressure at a saturation temperature of 40° C., of 1.76 MPa or more and 1.88 MPa or less, and can be applied to a commercially available refrigerating apparatus for R404A without any significant change in design.

In a case where the refrigerant 2C2 consists only of HFO-1132(E) and HFO-1234yf, more preferably, the content rate of HFO-1132(E) is 43.0 to 492 mass % and the content rate of HFO-1234yf is 57.0 to 50.8 mass % based on the total mass of HFO-1132(E) and HFO-1234yf. In such a case, the refrigerant, 2C2 has various characteristics of a GWP of 100 or less, a COP relative to that of R404A of 102% or more, a refrigerating capacity relative to that of R404A of 101% or more, and lower flammability (Class 2L) according to ASHRAE Standard. Furthermore, in such a case, the refrigerant 2C2 has a saturation pressure at a saturation temperature of 40° C., of 1.78 MPa or more and 1.88 MPa or less, and can be applied to a commercially available refrigerating apparatus for R404A without any significant change in design.

In a case where the refrigerant 2C2 consists only of HFO-1132(E) and HFO-1234yf, further preferably, the content rate of HFO-1132(E) is 44.0 to 49.2 mass % and the content rate of HFO-1234yf is 56.0 to 50.8 mass % based on the total mass of HFO-1132(E) and HFO-1234yf. In such a case, the refrigerant 2C2 has various characteristics of a GWP of 100 or less, a COP relative to that of R404A of 102% or more, a refrigerating capacity relative to that of R404A of 101% or more, and lower flammability (Class 2L) according to ASHRAE Standard. Furthermore, in such a case, the refrigerant 2C2 has a saturation pressure at a saturation temperature of 40° C., of 1.80 MPa or more and 1.88 MPa or less, and can be applied to a commercially available refrigerating apparatus for R404A without any significant change in design.

In a case where the refrigerant 2C2 consists only of HFO-1132(E) and HFO-1234yf, particularly preferably, the content rate of HFO-1132(E) is 45.0 to 49.2 mass % and the content rate of HFO-1234yf is 55.0 to 50.8 mass % based on the total mass of HFO-1132(E) and HFO-1234yf. In such a case, the refrigerant 2C2 has various characteristics of a GWP of 100 or less, a COP relative to that of R404A of 102% or more, a refrigerating capacity relative to that of R404A of 102% or more, and lower flammability (Class 2L) according to ASHRAE Standard. Furthermore, in such a case, the refrigerant 2C2 has a saturation pressure at a saturation temperature of 40° C., of 1.81 MPa or more and 1.88 MPa or less, and can be applied to a commercially available refrigerating apparatus for R404A without any significant change in design.

In a case where the refrigerant 2C2 consists only of HFO-1132(E) and HFO-1234yf, extremely preferably, the content rate of HFO-1132(E) is 45.0 to 48.0 mass % and the content rate of HFO-1234yf is 55.0 to 52.0 mass % based on the total mass of HFO-1132(E) and HFO-1234yf. In such a case, the refrigerant 2C2 has various characteristics of a GWP of 100 or less, a COP relative to that of R404A of 102.5% or more, a refrigerating capacity relative to that of R404A of 102.5% or more, and lower flammability (Class 2L) according to ASHRAE Standard. Furthermore, in such a case, the refrigerant 2C2 has a saturation pressure at a saturation temperature of 40° C., of 1.81 MPa or more and 1.87 MPa or less, and can be applied to a commercially available refrigerating apparatus for R404A without any significant change in design.

(1-6-3-3) Refrigerant 2C3

The refrigerant included in the composition of the present disclosure includes, in one aspect, HFO-1132(E) and HFO-1234yf, and the content rate of HFO-1132(E) is 31.1 to 39.8 mass % and the content rate of HFO-1234yf is 68.9 to 60.2 mass % based on the total mass of HFO-1132(E) and HFO-1234yf. The refrigerant is sometimes referred to as "refrigerant 2C3".

The refrigerant 2C3, which has such a configuration, thus has various characteristics of (1) a sufficiently low GWP (100 or less), (2) a COP comparable with that of R134a, (3) a refrigerating capacity relative to that of R134a of 150% or more, and (4) a discharge temperature of 90° C. or less.

The content rate of HFO-1132(E) is 31.1 mass % or more based on the total amount of HFO-1132(E) and HFO-1234yf in the refrigerant 2C3, thereby allowing a refrigerating capacity relative to that of R134a of 150% or more to be obtained.

The content rate of HFO-1132(E) is 39.8 mass % or less based on the total amount of HFO-1132(E) and HFO-1234yf in the refrigerant 2C3, thereby enabling the discharge temperature in the refrigeration cycle of the refrigerant 2C3 to be kept at 90° C. or less, and enabling the life of any member of a refrigerating apparatus for R134a to be kept long.

The refrigerating capacity relative to that of R134a, of the refrigerant 2C3, may be 150% or more, and is preferably 151% or more, more preferably 152% or more, further preferably 153% or more, particularly preferably 154% or more.

The refrigerant 2C3 preferably has a discharge temperature in the refrigeration cycle of 90.0° C. or less, more preferably 89.7° C. or less, further preferably 89.4° C. or less, particularly preferably 89.0° C. or less.

The refrigerant 2C3 has a GWP of 100 or less, and thus can remarkably suppress the environmental load from the viewpoint of global warming as compared with other general-purpose refrigerants.

The refrigerant 2C3 is preferably high in ratio of the driving force consumed in the refrigeration cycle and the refrigerating capacity (coefficient of performance (COP)), relative to that of R134a, from the viewpoint of energy consumption efficiency, and specifically, the COP relative to that of R134a is preferably 90% or more, more preferably 91% or more, further preferably 91.5% or more, particularly preferably 92% or more.

The content rate of HFO-1132(E) is usually 31.1 to 39.8 mass % and the content rate of HFO-1234yf is usually 68.9 to 60.2 mass % based on the total mass of HFO-1132(E) and HFO-1234yf in the refrigerant 2C3.

The refrigerant 2C3, which has such a configuration, thus has various characteristics of (1) a sufficiently low GWP (100 or less), (2) a COP comparable with that of R134a, (3) a refrigerating capacity relative to that of R134a of 150% or more, and (4) a discharge temperature of 90.0° C. or less.

Preferably, the content rate of HFO-1132(E) is 31.1 to 37.9 mass % and the content rate of HFO-1234yf is 68.9 to 62.1 mass % based on the total mass of HFO-1132(E) and HFO-1234yf in the refrigerant 2C3. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 150% or more, (4) a discharge temperature of 90.0° C. or less, and (5) a critical temperature of 81° C. or more.

More preferably, the content rate of HFO-1132(E) is 32.0 to 37.9 mass % and the content rate of HFO-1234yf is 68.0 to 62.1 mass % based on the total mass of HFO-1132(E) and HFO-1234yf in the refrigerant 2C3. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 151% or more, (4) a discharge temperature of 90.0° C. or less, and (5) a critical temperature of 81° C. or more.

Still more preferably, the content rate of HFO-1132(E) is 33.0 to 37.9 mass % and the content rate of HFO-1234yf is 67.0 to 62.1 mass % based on the total mass of HFO-1132(E) and HFO-1234yf in the refrigerant 2C3. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 152% or more, (4) a discharge temperature of 90.0° C. or less, and (5) a critical temperature of 81° C. or more.

Further preferably, the content rate of HFO-1132(E) is 34.0 to 37.9 mass % and the content rate of HFO-1234yf is 66.0 to 62.1 mass % based on the total mass of HFO-1132(E) and HFO-1234yf in the refrigerant 2C3. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 153% or more, (4) a discharge temperature of 90.0° C. or less, and (5) a critical temperature of 81° C. or more.

Particularly preferably, the content rate of HFO-1132(E) is 35.0 to 37.9 mass % and the content rate of HFO-1234yf is 65.0 to 62.1 mass % based on the total mass of HFO-1132(E) and HFO-1234yf in the refrigerant 2C3. In such a case, the refrigerant 2C3, which has such a configuration, thus has various characteristics of (1) a sufficiently low GWP (100 or less), (2) a COP, relative to that of R134a of 92% or more, (3) a refrigerating capacity relative to that of R134a of 155% or more, (4) a discharge temperature of 90.0° C. or less, and (5) a critical temperature of 81° C. or more.

In a case where the refrigerant 2C3 is used for operating the refrigeration cycle, in the present disclosure, the discharge temperature is preferably 90.0° C. or less, more preferably 89.7° C. or less, further preferably 89.4° C. or less, particularly preferably 89.0° C. or less, from the viewpoint that the life of any member of a commercially available refrigerating apparatus for R134a is extended.

In a case where the refrigerant 2C3 is used for operating the refrigeration cycle, in the present disclosure, a process of liquefaction (condensation) of the refrigerant is required in the refrigeration cycle, and thus the critical temperature is required to be remarkably higher than the temperature of cooling water or cooling air for liquefying the refrigerant. The critical temperature in the refrigeration cycle where the refrigerant 2C3 of the present disclosure is used is preferably 80° C. or more, more preferably 81° C. or more, further preferably 81.5° C. or more, in particular, 82° C. or more, from such a viewpoint.

The refrigerant 2C3 is usually used for operating a refrigeration cycle at an evaporating temperature of −75 to 15° C. in the present disclosure, from the viewpoint that a refrigerating capacity relative to that of R134a of 150% or more is obtained.

The evaporating temperature in the refrigeration cycle where the refrigerant 2C3 of the present disclosure is used is preferably 15° C. or less, more preferably 5° C. or less, further preferably 0° C. or less, particularly preferably −5° C. or less.

The evaporating temperature in the refrigeration cycle where the refrigerant 2C3 of the present disclosure is used is preferably −65° C. or more, more preferably −60° C. or more, further preferably −55° C. or more, particularly preferably −50° C. or more.

The evaporating temperature in the refrigeration cycle where the refrigerant 2C3 of the present disclosure is used is preferably −65° C. or more and 15° C. or less, more preferably −60° C. or more and 5° C. or less, further preferably −55° C. or more and 0° C. or less, particularly preferably −50° C. or more and −5° C. or less.

The critical temperature of the refrigerant in the refrigeration cycle where the refrigerant 2C3 of the present disclosure is used is preferably 80° C. or more, more preferably 81° C. or more, further preferably 81.5° C. or more, particularly preferably 82° C. or more, from the viewpoint of an enhancement in performance.

The refrigerant 2C3 may usually include 99.5 mass % or more of HFO-1132(E) and HFO-1234yf in terms of the sum of the concentrations of these components. In the present disclosure, the total amount of HFO-1132(E) and HFO-1234yf in the entire refrigerant 2C3 is preferably 99.7 mass % or more, more preferably 99.8 mass % or more, further preferably 99.9 mass % or more.

The refrigerant 2C3 can further include other refrigerant, in addition to HFO-1132(E) and HFO-1234yf as long as the above characteristics are not impaired. In such a case, the content rate of such other refrigerant in the entire refrigerant 2C3 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 2C3.

The refrigerant 2C3 particularly preferably consists only of HFO-1132(E) and HFO-1234yf. In other words, the refrigerant 2C3 particularly preferably includes HFO-1132(E) and HFO-1234yf at a total concentration of 100 mass % in the entire refrigerant 2C3.

In a case where the refrigerant 2C3 consists only of HFO-1132(E) and HFO-1234yf, the content rate of HFO-1132(E) is usually 31.1 to 39.8 mass % and the content rate of HFO-1234yf is usually 68.9 to 60.2 mass % based on the total mass of HFO-1132(E) and HFO-1234yf. The refrigerant 2C3, which has such a configuration, thus has various characteristics of (1) a sufficiently low GWP (100 or less), (2) a COP comparable with that of R134a, (3) a refrigerating capacity relative to that of R134a of 150% or more, and (4) a discharge temperature of 90° C. or less.

In a case where the refrigerant 2C3 consists only of HFO-1132(E) and HFO-1234yf, preferably, the content rate of HFO-1132(E) is 31.1 to 37.9 mass % and the content rate of HFO-1234yf is 68.9 to 62.1 mass % based on the total mass of HFO-1132(E) and HFO-1234yf. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 150% or more, (4) a discharge temperature of 90.0° C. or less, and (5) a critical temperature of 81° C. or more.

In a case where the refrigerant 2C3 consists only of HFO-1132(E) and HFO-1234yf, more preferably, the content rate of HFO-1132(E) is 32.0 to 37.9 mass % and the content rate of HFO-1234yf is 68.0 to 62.1 mass % based on the total mass of HFO-1132(E) and HFO-1234yf. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 151% or more, (4) a discharge temperature of 90.0° C. or less, and (5) a critical temperature of 81° C. or more.

In a case where the refrigerant 2C3 consists only of HFO-1132(E) and HFO-1234yf, further preferably, the content rate of HFO-1132(E) is 33.0 to 37.9 mass % and the content rate of HFO-1234yf is 67.0 to 62.1 mass % based on the total mass of HFO-1132(E) and HFO-1234yf. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 152% or more, (4) a discharge temperature of 90.0° C. or less, and (5) a critical temperature of 81° C. or more.

In a case where the refrigerant 2C3 consists only of HFO-1132(E) and HFO-1234yf, further preferably, the content rate of HFO-1132(E) is 34.0 to 37.9 mass % and the content rate of HFO-1234yf is 66.0 to 62.1 mass % based on the total mass of HFO-1132(E) and HFO-1234yf. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 153% or more, (4) a discharge temperature of 90.0° C. or less, and (5) a critical temperature of 81° C. or more.

In a case where the refrigerant 2C3 consists only of HFO-1132(E) and HFO-1234yf, further preferably, the content rate of HFO-1132(E) is 35.0 to 37.9 mass % and the content rate of HFO-1234yf is 65.0 to 62.1 mass % based on the total mass of HFO-1132(E) and HFO-1234yf. In such a case, the refrigerant 2C3, which has such a configuration, thus has various characteristics of (1) a sufficiently low GWP (100 or less), (2) a COP relative to that of R134a of 92% or more, (3) a refrigerating capacity relative to that of R134a of 155% or more, (4) a discharge temperature of 90.0° C. or less, and (5) a critical temperature of 81° C. or more.

(1-6-3-4) Refrigerant 2C4

The refrigerant included in the composition of the present disclosure includes, in one aspect, HFO-1132(E) and HFO-1234yf, and the content rate of HFO-1132(E) is 21.0 to 28.4 mass % and the content rate of HFO-1234yf is 79.0 to 71.6 mass % based on the total mass of HFO-1132(E) and HFO-1234yf. The refrigerant is sometimes referred to as "refrigerant 2C4".

The refrigerant 2C4, which has such a configuration, thus has various characteristics of (1) a sufficiently low GWP (100 or less), (2) a COP comparable with that of R1234yf, and (3) a refrigerating capacity relative to that of R1234yf of 140% or more, and (4) lower flammability (Class 2L) according to ASHRAE Standard. Furthermore, in such a case, the refrigerant 2C4 has a saturation pressure at a saturation temperature of −10° C., of 0.380 MPa or more and 0.420 MPa or less, and can be applied to a commercially available refrigerating apparatus for R1234yf without any significant change in design.

The content rate of HFO-1132(E) is 21.0 mass % or more based on the total mass of HFO-1132(E) and HFO-1234yf in the refrigerant 2C4, thereby allowing a refrigerating capacity relative to that of R1234yf of 140% or more to be obtained. The content rate of HFO-1132(E) is 28.4 mass % or less based on the total mass of HFO-1132(E) and HFO-1234yf in the refrigerant 2C4, thereby allowing a critical temperature of 83.5° C. or more to be easily ensured.

The refrigerating capacity relative to that of R1234yf in the refrigerant 2C4 may be 140% or more, and is preferably 142% or more, more preferably 143% or more, further preferably 145% or more, particularly preferably 146% or more.

The refrigerant 2C4 has a GWP of 100 or less, and thus can remarkably suppress the environmental load from the viewpoint of global warming as compared with other general-purpose refrigerants.

The refrigerant 2C4 is preferably high in ratio of the driving force consumed in the refrigeration cycle and the refrigerating capacity (coefficient of performance (COP)), relative to that of R1234yf, from the viewpoint of energy consumption efficiency, and specifically, the COP relative to that of R1234yf is preferably 95% or more, more preferably 96% or more, further preferably 97% or more, particularly preferably 98% or more.

The content rate of HFO-1132(E) is preferably 21.5 to 28.0 mass % and the content rate of HFO-1234yf is preferably 78.5 to 72.0 mass % based on the total mass of HFO-1132(E) and HFO-1234yf in the refrigerant 2C4. In such a case, the refrigerant 2C4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 65.0° C. or less, and a critical temperature of 83.5° C. or more. Furthermore, in such a case, the refrigerant 2C4 has a saturation pressure at a saturation temperature of −10° C., of 0.383 MPa or more and 0.418 MPa or less, and can be applied to a commercially available refrigerating apparatus for R1234yf without any significant change in design.

The content rate of HFO-1132(E) is more preferably 22.0 to 27.7 mass % and the content rate of HFO-1234yf is more preferably 78.0 to 72.3 mass % based on the total mass of HFO-1132(E) and HFO-1234yf in the refrigerant 2C4. In such a case, the refrigerant 2C4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 65.0° C. or less, and a critical temperature of 83.5° C. or more. Furthermore, in such a case, the refrigerant 2C4 has a saturation pressure at a saturation temperature of −10° C., of 0.385 MPa or more and 0.417 MPa or less, and can be applied to a commercially available refrigerating apparatus for R1234yf without any significant change in design.

The content rate of HFO-1132(E) is further preferably 22.5 to 27.5 mass % and the content rate of HFO-1234yf is further preferably 77.5 to 72.5 mass % based on the total mass of HFO-1132(E) and HFO-1234yf in the refrigerant 2C4. In such a case, the refrigerant 2C4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 64.8° C. or less, and a critical temperature of 83.8° C. or more. Furthermore, in such a case, the refrigerant 2C4 has a saturation pressure at a saturation temperature of −10° C., of 0.388 MPa or more and 0.414 MPa or less, and can be applied to a commercially available refrigerating apparatus for R1234yf without any significant change in design.

The content rate of HFO-1132(E) is particularly preferably 23.0 to 27.2 mass % and the content rate of HFO-1234yf is particularly preferably 77.0 to 72.8 mass % based on the total mass of HFO-1132(E) and HFO-1234yf in the refrigerant 2C4. In such a case, the refrigerant 2C4 has various characteristics of a GWP of 100 or less, a COP relative to that of R1234yf of 98% or more, a refrigerating capacity relative to that of R1234yf of 141% or more, lower flammability (Class 2L) according to ASHRAE Standard, a discharge temperature of 64.8° C. or less, and a critical temperature of 83.8° C. or more. Furthermore, in such a case, the refrigerant 2C4 has a saturation pressure at a saturation temperature of −10° C., of 0.390 MPa or more and 0.414 MPa or less, and can be applied to a commercially available refrigerating apparatus for R1234yf without any significant change in design.

The content rate of HFO-1132(E) is extremely preferably 23.5 to 27.0 mass % and the content rate of HFO-1234yf is extremely preferably 76.5 to 73.0 mass % based on the total mass of HFO-1132(E) and HFO-1234yf in the refrigerant 2C4. In such a case, the refrigerant 2C4 has various characteristics of a GWP of 100 or less, a COP relative to that of R1234yf of 98% or more, a refrigerating capacity relative to that of R1234yf of 142% or more, lower flammability (Class 2L) according to ASHRAE Standard, a discharge temperature of 64.8° C. or less, and a critical temperature of 83.8° C. or more. Furthermore, in such a case, the refrigerant 2C4 has a saturation pressure at a saturation temperature of −10° C., of 0390 MPa or more and 0.414 MPa or less, and can be applied to a commercially available refrigerating apparatus for R1234yf without any significant change in design.

The content rate of HFO-1132(E) is most preferably 24.0 to 26.7 mass % and the content rate of HFO-1234yf is most preferably 76.0 to 73.3 mass % based on the total mass of HFO-1132(E) and HFO-1234yf in the refrigerant 2C4. In such a case, the refrigerant 2C4 has various characteristics of a GWP of 100 or less, a COP relative to that of R1234yf of 98% or more, a refrigerating capacity relative to that of R1234yf of 144% or more, lower flammability (Class 2L) according to ASHRAE Standard, a discharge temperature of 64.6° C. or less, and a critical temperature of 84.0° C. or more. Furthermore, in such a case, the refrigerant 2C4 has a saturation pressure at a saturation temperature of −10° C., of 0.396 MPa or more and 0.411 MPa or less, and can be applied to a commercially available refrigerating apparatus for R1234yf without any significant change in design.

The refrigerant 2C4 usually has a saturation pressure at a saturation temperature of −10° C., of 0.420 MPa or less, preferably 0.418 MPa or less, more preferably 0.417 MPa or less, further preferably 0.415 MPa or less, particularly preferably 0.413 MPa or less. Such a range enables the refrigerant 2C4 to be applied to a commercially available refrigerating apparatus for R1234yf without any significant change in design.

The refrigerant 2C4 usually has a saturation pressure at a saturation temperature of −10° C., of 0.380 MPa or more, preferably 0.385 MPa or more, more preferably 0.390 MPa or more, further preferably 0.400 MPa or more, particularly preferably 0.410 MPa or more. In such a case, the refrigerant 2C4 can be applied to a commercially available refrigerating apparatus for R1234yf without any significant change in design.

In a case where the refrigerant 2C4 is used for operating the refrigeration cycle, in the present disclosure, the discharge temperature is preferably 65° C. or less, more preferably 64.8° C. or less, further preferably 64.7° C. or less, particularly preferably 64.5° C. or less from the viewpoint that the life of any member of a commercially available refrigerating apparatus for R1234yf is extended.

The refrigerant 2C4 is preferably used for operating a refrigeration cycle at an evaporating temperature of −75 to 5° C. in the present disclosure, from the viewpoint that a refrigerating capacity relative to that of R1234yf of 140% or more is obtained.

The evaporating temperature in the refrigeration cycle where the refrigerant 2C4 of the present disclosure is used is preferably 5° C. or less, more preferably 0° C. or less, further preferably −5° C. or less, particularly preferably −10° C. or less, from the viewpoint that a refrigerating capacity relative to that of R1234yf of 140% or more is obtained.

The evaporating temperature in the refrigeration cycle where the refrigerant 2C4 of the present disclosure is used is preferably −75° C. or more, more preferably −60° C. or more, further preferably −55° C. or more, particularly preferably −50° C. or more, from the viewpoint that a refrigerating capacity relative to that of R1234yf of 140% or more is obtained.

The evaporating temperature in the refrigeration cycle where the refrigerant 2C4 of the present disclosure is used is preferably −65° C. or more and 0° C. or less, more preferably −60° C. or more and −5° C. or less, further preferably −55° C. or more and −7.5° C.; or less, particularly preferably −50° C. or more and −10° C. or less, from the viewpoint that a refrigerating capacity relative to that of R1234yf of 140% or more is obtained.

The discharge temperature in the refrigeration cycle where the refrigerant 2C4 of the present disclosure is used is preferably 65.0° C. or less, more preferably 64.9° C. or less, further preferably 64.8° C. or less, particularly preferably 64.7° C. or less, from the viewpoint that the life of any member of a commercially available refrigerating apparatus for R1234yf is extended.

In a case where the refrigerant 2C4 is used for operating the refrigeration cycle, in the present disclosure, a process of liquefaction (condensation) of the refrigerant is required in the refrigeration cycle, and thus the critical temperature is required to be remarkably higher than the temperature of cooling water or cooling air for liquefying the refrigerant. The critical temperature in the refrigeration cycle where the refrigerant 2C4 of the present disclosure is used is preferably 83.5° C. or more, more preferably 83.8° C. or more, further preferably 84.0° C. or more, particularly preferably 84.5° C. or more, from such a viewpoint.

The refrigerant 2C4 can further include other refrigerant, in addition to HFO-1132(E) and HFO-1234yf, as long as the above characteristics are not impaired. In such a case, the content rate of such other refrigerant in the entire refrigerant 2C4 is preferably 0.5 mass % or less, more preferably 0.3 mass % or less, further preferably 0.2 mass % or less, particularly preferably 0.1; mass % or less. Such other refrigerant is not limited, and can be selected from a wide range of known refrigerants widely used in the art Such other refrigerant may be included singly or in combinations of two or more kinds thereof in the refrigerant 2C4.

The refrigerant 2C4 particularly preferably consists only of HFO-1132(E) and HFO-1234yf. In other words, the refrigerant 2C4 particularly preferably includes HFO-1132 (E) and HFO-1234yf at a total concentration of 100 mass % in the entire refrigerant 2C4.

In a case where the refrigerant 2C4 consists only of HFO-1132(E) and HFO-1234yf, the content rate of HFO-1132(E) is usually 21.0 to 28.4 mass % and the content rate of HFO-1234yf is usually 79.0 to 71.6 mass % based on the total mass of HFO-1132(E) and HFO-1234yf. The refrigerant 2C4, which has such a configuration, thus has various characteristics of (1) a sufficiently low GWP (100 or less), (2) a COP comparable with that of R1234yf and (3) a refrigerating capacity relative to that of R1234yf of 140% or more, and (4) lower flammability (Class 2L) according to ASHRAE Standard. Furthermore, in such a case, the refrigerant 2C4 has a saturation pressure at a saturation temperature of −10° C., of 0.380 MPa or more and 0.420 MPa or less, and can be applied to a commercially available refrigerating apparatus for R1234yf without any significant change in design.

In a case where the refrigerant 2C4 consists only of HFO-1132(E) and HFO-1234yf, the content rate of HFO-1132(E) is preferably 21.5 to 28.0 mass % and the content rate of HFO-1234yf is preferably 78.5 to 72.0 mass % based on the total mass of HFO-1132(E) and HFO-1234yf. In such a case, the refrigerant 2C4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 65.0° C. or less, and a critical temperature of 83.5° C. or more. Furthermore, in such a case, the refrigerant 2C4 has a saturation pressure at a saturation temperature of −10° C., of 0.383 MPa, or more and 0.418 MPa or less, and can be applied to a commercially available refrigerating apparatus for R1234yf without any significant change in design.

In a case where the refrigerant 2C4 consists only of HFO-1132(E) and HFO-1234yf, the content rate of HFO-1132(E) is more preferably 22.0 to 27.7 mass % and the content rate of HFO-1234yf is more preferably 78.0 to 72.3 mass % based on the total mass of HFO-1132(E) and HFO-1234yf. In such a case, the refrigerant 2C4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 65.0° C. or less, and a critical temperature of 83.5° C. or more. Furthermore, in such a case, the refrigerant 2C4 has a saturation pressure at a saturation temperature of −10° C., of 0.385 MPa or more and 0.417 MPa or less, and can be applied to a commercially available refrigerating apparatus for R1234yf without any significant change in design.

In a case where the refrigerant 2C4 consists only of HFO-1132(E) and HFO-1234yf, the content rate of HFO-1132(E) is further preferably 22.5 to 27.5 mass % and the content rate of HFO-1234yf is further preferably 77.5 to 72.5 mass % based on the total mass of HFO-1132(E) and HFO-1234yf. In such a case, the refrigerant 2C4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 64.8° C. or less, and a critical temperature of 83.8° C. or more. Furthermore, in such a case, the refrigerant 2C4 has a saturation pressure at a saturation temperature of −10° C., of 0.388 MPa or more and 0.414 MPa or less, and can be applied to a commercially available refrigerating apparatus for R1234yf without any significant change in design.

In a case where the refrigerant 2C4 consists only of HFO-1132(E) and HFO-1234yf, the content rate of HFO-1132(E) is particularly preferably 23.0 to 27.2 mass % and the content rate of HFO-1234yf is particularly preferably 77.0 to 72.8 mass % based on the total mass of HFO-1132(E)

and HFO-1234yf. In such a case, the refrigerant 2C4 has various characteristics of a GWP of 100 or less, a COP relative to that of R1234yf of 98% or more, a refrigerating capacity relative to that of R1234yf of 141% or more, lower flammability (Class 2L) according to ASHRAE Standard, a discharge temperature of 64.8° C. or less, and a critical temperature of 83.8° C. or more. Furthermore, in such a case, the refrigerant 2C4 has a saturation pressure at a saturation temperature of −10° C., of 0.390 MPa or more and 0.414 MPa or less, and can be applied to a commercially available refrigerating apparatus for R1234yf without any significant change in design.

In a case where the refrigerant 2C4 consists only of HFO-1132(E) and HFO-1234yf, the content rate of HFO-1132(E) is extremely preferably 23.5 to 27.0 mass % and the content rate of HFO-1234yf is extremely preferably 76.5 to 73.0 mass % based on the total mass of HFO-1132(E) and HFO-1234yf. In such a case, the refrigerant 2C4 has various characteristics of a GWP of 100 or less, a COP relative to that of R1234yf of 98% or more, a refrigerating capacity relative to that of R1234yf of 142% or more, lower flammability (Class 2L) according to ASHRAE Standard, a discharge temperature of 64.8° C. or less, and a critical temperature of 83.8° C. or more. Furthermore, in such a case, the refrigerant 2C4 has a saturation pressure at saturation temperature of −10° C., of 0.390 MPa or more and 0.414 MPa or less, and can be applied to a commercially available refrigerating apparatus for R1234yf without any significant change in design.

In a case where the refrigerant 2C4 consists only of HFO-1132(E) and HFO-1234yf, the content rate of HFO-1132(E) is most preferably 24.0 to 26.7 mass % and the content rate of HFO-1234yf is most preferably 76.0 to 73.3 mass % based on the total mass of HFO-1132(E) and HFO-1234yf. In such a case, the refrigerant 2C4 has various characteristics of a GWP of 100 or less, a COP relative to that of R1234yf of 98% or more, a refrigerating capacity relative to that of R1234yf of 144% or more, lower flammability (Class 2L) according to ASHRAE Standard, a discharge temperature of 64.6° C. or less, and a critical temperature of 84.0° C. or more. Furthermore, in such a case, the refrigerant 2C4 has a saturation pressure at a saturation temperature of −10° C., of 0.396 MPa or more and 0.411 MPa or less, and can be applied to a commercially available refrigerating apparatus for R1234yf without any significant change in design.

(1-6-3-5) Refrigerant 2C5

The refrigerant included in the composition of the present disclosure includes, in one aspect, HFO-1132(E) and HFO-1234yf, and the content rate of HFO-1132(E) is 12.1 to 72.0 mass % and the content rate of HFO-1234yf is 87.9 to 28.0 mass % based on the total mass of HFO-1132(E) and HFO-1234yf. The refrigerant is sometimes referred to as "refrigerant 2C5".

In the present disclosure, the refrigerant 2C5 is used for in-car air conditioning equipment.

The refrigerant 2C5, which has such a configuration, thus has various characteristics of (1) a sufficiently low GWP (100 or less), (2) a COP comparable with that of R1234yf, (3) a refrigerating capacity relative to that of R1234yf of 128% or more, and (4) a flame velocity of less than 10.0 cm/s.

The content rate of HFO-1132(E) is 12.1 mass % or more based on the total mass of HFO-1132(E) and HFO-1234yf in the refrigerant 2C5, and thus a boiling point of −40° C. or less can be ensured which is favorable in a case where heating is made by using a heat pump in an electric car. Herein, a boiling point of −40° C. or less means that the saturation pressure at is equal to or more than atmospheric pressure, and such a lower boiling point of −40° C. or less is preferable in the above applications. The content rate of HFO1132(E) is 72.0 mass % or less based on the total mass of HFO-1132(E) and HFO-1234yf in the refrigerant 2C5, and thus a flame velocity of less than 10.0 cm/s can be ensured which contributes to safety in the case of use in in-car air conditioning equipment.

The refrigerating capacity relative to that of R1234yf in the refrigerant 2C5 may be 128% or more, and is preferably 130% or more, more preferably 140% or more, further preferably 150% or more, particularly preferably 160% or more.

The refrigerant 2C5 has a GWP of 5 or more and 100 or less, and thus can remarkably suppress the environmental load from the viewpoint of global warming as compared with other general-purpose refrigerants.

The ratio of the driving force consumed in the refrigeration cycle and the refrigerating capacity (coefficient of performance (COP)), relative to that of R1234yf, in the refrigerant 2C5 may be 100% or more from the viewpoint of energy consumption efficiency.

The refrigerant 2C5 is used in in-car air conditioning equipment, and thus an advantage is that heating can be made by a heat pump lower in consumption power as compared with an electric heater.

The air conditioning equipment with the refrigerant 2C5 is preferably for a gasoline-fueled car, a hybrid car, an electric car or a hydrogen-fueled car. In particular, the air conditioning equipment with the refrigerant 2C5 is particularly preferably for an electric car, from the viewpoint that not only heating in a vehicle interior is made by a heat pump, but also the travel distance of such a car is enhanced. That is, the refrigerant 2C5 is particularly preferably used in an electric car, in the present disclosure.

The refrigerant 2C5 is used in in-car air conditioning equipment, in the present disclosure. The refrigerant 2C5 is preferably used in air conditioning equipment of a gasoline-fueled car, air conditioning equipment of a hybrid car, air conditioning equipment of an electric car or air conditioning equipment of a hydrogen-fueled car, in the present disclosure. The refrigerant 2C5 is particularly preferably used in air conditioning equipment of an electric car, in the present disclosure.

Since a pressure equal to or more than atmospheric pressure at −40° C. is required in heating of a vehicle interior by a heat pump, the refrigerant 2C5 preferably has a boiling point of −51.2 to −40.0° C., more preferably-50.0 to −42.0° C., further preferably −48.0 to −44.0° C., in the present disclosure.

The content rate of HFO-1132(E) is preferably 15.0 to 65.0 mass % and the content rate of HFO-1234yf is preferably 85.0 to 35.0 mass % based on the total mass of HFO-1132(E) and HFO-1234yf in the refrigerant 2C5.

The content rate of HFO-1132(E) is more preferably 20.0 to 55.0 mass % and the content rate of HFO-1234yf is more preferably 80.0 to 45.0 mass % based on the total mass of HFO-1132(E) and HFO-1234yf in the refrigerant 2C5.

The content rate of HFO-1132(E) is further preferably 25.0 to 50.0 mass % and the content rate of HFO-1234yf is further preferably 75.0 to 50.0 mass % based on the total mass of HFO-1132(E) and HFO-1234yf in the refrigerant 2C5.

The content rate of HFO-1132(E) is particularly preferably 30.0 to 45.0 mass % and the content rate of HFO- 1234yf is particularly preferably 70.0 to 55.0 mass % based on the total mass of HFO-1132(E) and HFO-1234yf in the refrigerant 2C5.

The content rate of HFO-1132(E) is most preferably 35.0 to 40.0 mass % and the content rate of HFO-1234yf is most preferably 65.0 to 60.0 mass % based on the total mass of HFO-1132(E) and HFO-1234yf in the refrigerant 2C5.

The refrigerant 2C5 preferably has a flame velocity of less than 10.0 cm/s, more preferably less than 5.0 cm/s, further preferably less than 3.0 cm/s, particularly preferably 2.0 cm/s, in the present disclosure.

The refrigerant 2C5 is preferably used for operating a refrigeration cycle at an evaporating temperature of −40 to 10° C. in the present disclosure, from the viewpoint that a refrigerating capacity equivalent to or more than that of R1234yf is obtained.

In a case where the refrigerant 2C5 is used for operating the refrigeration cycle, in the present disclosure, the discharge temperature is preferably 79° C. or less, more preferably 75° C. or less, further preferably 70° C. or less, particularly preferably 67° C. or less.

The refrigerant 2C5 may usually include 99.5 mass % or more of HFO-1132(E) and HFO-1234yf in terms of the sum of the concentrations of these components. In the present disclosure, the total amount of HFO-1132(E) and HFO-1234yf in the entire refrigerant 2C5 is preferably 99.7 mass % or more, more preferably 99.8 mass % or more, further preferably 99.9 mass % or more.

The refrigerant 2C5 can further include other refrigerant, in addition to HFO-1132(E) and HFO-1234yf, as long as the above characteristics are not impaired. In such a case, the content rate of such other refrigerant in the entire refrigerant 2C5 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the ark Such other refrigerant may be included singly or in combinations of two or more kinds thereof in the refrigerant 2C5.

The refrigerant 2C5 particularly preferably consists only of HFO-1132(E) and HFO-1234yf. In other words, the refrigerant 2C5 particularly preferably includes HFO-1132 (E) and HFO-1234yf at a total concentration of 100 mass % in the entire refrigerant 2C5.

In a case where the refrigerant 2C5 consists only of HFO-1132(E) and HFO-1234yf, the content rate of HFO-1132(E) is usually 12.1 to 72.0 mass % and the content rate of HFO-1234yf is usually 87.9 to 28.0 mass % based on the total mass of HFO-1132(E) and HFO-1234yf.

In a case where the refrigerant 2C5 consists only of HFO-1132(E) and HFO-1234yf, the content rate of HFO-1132(E) is preferably 15.0 to 65.0 mass % and the content rate of HFO-1234yf is preferably 85.0 to 35.0 mass % based on the total mass of HFO-1132(E) and HFO-1234yf In a case where the refrigerant 2C5 consists only of HFO-1132(E) and HFO-1234yf, the content rate of HFO-1132(E) is more preferably 20.0 to 55.0 mass % and the content rate of HFO-1234yf is more preferably 80.0 to 45.0 mass % based on the total mass of HFO-1132(E) and HFO-1234yf.

In a case where the refrigerant 2C5 consists only of HFO-1132(E) and HFO-1234yf, the content rate of HFO-1132(E) is further preferably 25.0 to 50.0 mass % and the content rate of HFO-1234yf is further preferably 75.0 to 50.0 mass % based on the total mass of HFO-1132(E) and HFO-1234yf.

In a case where the refrigerant 2C5 consists only of HFO-1132(E) and HFO-1234yf, the content rate of HFO-1132(E) is particularly preferably 30.0 to 45.0 mass % and the content rate of HFO-1234yf is particularly preferably 70.0 to 55.0 mass % based on the total mass of HFO-1132(E) and HFO-1234yf.

In a case where the refrigerant 2C5 consists only of HFO-1132(E) and HFO-1234yf, the content rate of HFO-1132(E) is most preferably 35.0 to 40.0 mass % and the content rate of HFO-1234yf is most preferably 65.0 to 60.0 mass % based on the total mass of HFO-1132(E) and HFO-1234yf.

Examples of Refrigerant C

Hereinafter, the refrigerant C will be described with reference to Examples in more detail. It is noted that the present disclosure is not limited to such Examples.

Test Example 1-1

The GWP of each mixed refrigerant represented in Examples 1-1 to 1-13, Comparative Examples 1-1 to 1-2 and Reference Example 1-1 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using National Institute of Science and Technology (NISI) and Reference Fluid Thermodynamic and Transport Properties Database (Refprop 9.0).

Evaporating temperature −50° C.
Condensation temperature 40° C.
Superheating temperature 20 K
Subcooling temperature 0 K
Compressor efficiency 70%

An "evaporating temperature of −50° C." means that the evaporating temperature of such each mixed refrigerant in an evaporator included in a refrigerating apparatus is −50° C. A "condensation temperature of 40° C." means that the condensation temperature of such each mixed refrigerant in a condenser included in a refrigerating apparatus is 40° C.

The results in Test Example 1-1 are shown in Table 217. Table 217 shows Examples and Comparative Examples of the refrigerant 2C1 of the present disclosure. In Table 217, the "COP ratio" and the "Refrigerating capacity ratio" each represent the proportion (%) relative to that of R404A.

In Table 217, the "Saturation pressure (40° C.)" represents the saturation pressure at a saturation temperature of 40° C. In Table 217, the "Discharge temperature (° C.)" represents the temperature at which the highest temperature in the refrigeration cycle is achieved in theoretical refrigeration cycle calculation with respect to such each mixed refrigerant.

The coefficient of performance (COP) was determined according to the following expression.

$$\text{COP}=(\text{Refrigerating capacity or heating capacity})/\text{Power consumption}$$

The compression ratio was determined by the following expression.

$$\text{Compression ratio}=\text{Condensation pressure (Mpa)}/\text{Evaporating pressure (Mpa)}$$

The flammability of such each mixed refrigerant was determined by defining the mixed composition of such each mixed refrigerant as the WCF concentration, and measuring the flame velocity according to ANSI/ASHRAE Standard 34-2013. One having a flame velocity of 0 cm/s to 10 cm/s was rated as "Class 2L (lower flammability)", one having a flame velocity of more than 10 cm/s was rated as "Class 2 (low flammability)", and one causing no flame propagation was rated as "Class 1 (non-flammability)". In Table 217, the "ASHRAE flammability classification" shows each result based on the criteria for determination.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter 155 mm, length: 198 mm) equipped with two light-transmitting acrylic windows was used as the sample cell, and a xenon lamp was used as a light source. A schlieren image of any, flame was recorded by a high-speed digital camera at a frame rate of 600 fps, and stored in a PC.

The flammable range of the mixed refrigerant was measured by using an apparatus (see FIG. 1T) based on ASTM E681-09.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)

Test temperature: 60° C.±3° C.

Pressure: 101.3 kPa±0.7 kPa

Water content: 0.0088 g±0.0005 g per gram of dry air (water content at a humidity of 50% at 23° C.)

Mixing ratio of refrigerant composition/air: ±02 vol. % by 1 vol. %

Mixing of refrigerant composition: ±0.1 mass %

Ignition method: AC discharge, voltage 15 kV, current 30 mA, neon transformer

Electrode interval: 6.4 mm (¼ inches)

Spark: 0.4 seconds±0.05 seconds

Criteria for determination:

A case where any flame was spread at more than 90 degrees around the ignition point: flame propagation (flammability)

A case where any flame was spread at 90 degrees or less around the ignition point: no flame propagation (non-flammability)

TABLE 217

| Item | | Unit | Reference Example 1-1 (R404A) | Comparative Example 1-1 | Example 1-1 | Example 1-2 | Example 1-3 | Example 1-4 | Example 1-5 | Example 1-6 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 100.6 | 108.6 | 114.7 | 115.0 | 115.5 | 116.5 | 117.6 | 118.8 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.082 | 0.063 | 0.072 | 0.073 | 0.074 | 0.075 | 0.077 | 0.079 |
| Compression ratio | | — | 22.2 | 25.3 | 24.1 | 24.0 | 23.9 | 23.8 | 23.6 | 23.4 |
| COP ratio (relative to that of R404A) | | % | 100 | 106.2 | 106.2 | 106.2 | 106.2 | 106.2 | 106.2 | 106.2 |
| Refrigerating capacity ratio (relative to that of R404A) | | % | 100 | 86.2 | 98.5 | 99.1 | 100 | 102.1 | 104.5 | 106.9 |
| ASHRAE flammability classification | | — | Class 1 | Class 2L | Class 2L | Class 2L | Class 2L | Class 2L | Class 2L | Class 2L |

| Item | | Unit | Example 1-7 | Example 1-8 | Example 1-9 | Example 1-10 | Example 1-11 | Example 1-12 | Example 1-13 | Comparative Example 1-2 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |
| | HFC-125 | mass % | 0 | 0 | 0 | 0 | 0 | 0 | 0 | 0 |
| GWP (AR4) | | — | 7 | 7 | 7 | 7 | 7 | 8 | 8 | 8 |
| Discharge temperature | | ° C. | 120.0 | 121.0 | 122.4 | 123.3 | 124.4 | 125.5 | 126.0 | 131.7 |

TABLE 217-continued

| | | | | | | | | | |
|---|---|---|---|---|---|---|---|---|---|
| Saturation pressure (40° C.) | MPa | 1.874 | 1.898 | 1.931 | 1.950 | 1.975 | 2.000 | 2.012 | 2.128 |
| Evaporating pressure | MPa | 0.081 | 0.083 | 0.085 | 0.086 | 0.088 | 0.090 | 0.091 | 0.099 |
| Compression ratio | — | 23.1 | 23.0 | 22.8 | 22.6 | 22.5 | 22.3 | 22.2 | 21.6 |
| COP ratio (relative to that of R404A) | % | 106.2 | 106.3 | 106.3 | 106.3 | 106.3 | 106.4 | 106.4 | 106.7 |
| Refrigerating capacity ratio (relative to that of R404A) | % | 109.5 | 111.7 | 114.6 | 116.4 | 118.7 | 121 | 122.2 | 133.3 |
| ASHRAE flammability classification | — | Class 2L | Class 2L | Class 2L | Class 2 | Class 2 | Class 2 | Class 2 | Class 2 |

Test Example 1-2

The GWP of each mixed refrigerant represented in Examples 1-14 to 1-26, Comparative Examples 1-3 to 1-4 and Reference Example 1-2 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

Evaporating temperature −35° C.
Condensation temperature 40° C.
Superheating temperature 20 K
Subcooling temperature 0 K
Compressor efficiency 70%

The meaning of each of the above terms is the same as in Test Example 1-1.

The results in Test Example 1-2 are shown in Table 218. Table 218 shows Examples and Comparative Examples of the refrigerant 2C1 of the present disclosure. In Table 218, the meaning of each of the terms is the same as in Test Example 1-1.

The coefficient of performance (COP) and the compression ratio were determined in the same manner as in Test Example 1-1.

The flammability of such each mixed refrigerant was determined in the same manner as in Test Example 1-1. The flame velocity test was performed in the same manner as in Test Example 1-1.

The flammable range of the mixed refrigerant was measured by using a measurement apparatus (see FIG. 1T) based on ASTM E681-09, with the same method and test conditions as in Test Example 1-1.

TABLE 218

| Item | | Unit | Reference Example 1-2 (R404A) | Comparative Example 1-3 | Example 1-14 | Example 1-15 | Example 1-16 | Example 1-17 | Example 1-18 | Example 1-19 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0) | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 89.1 | 95.8 | 100.6 | 100.8 | 101.2 | 102.0 | 102.9 | 103.8 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.165 | 0.131 | 0.148 | 0.149 | 0.151 | 0.154 | 0.157 | 0.160 |
| Compression ratio | | — | 11.0 | 12.2 | 11.8 | 11.7 | 11.7 | 11.6 | 11.6 | 11.5 |
| COP ratio (relative to that of R404A) | | % | 100 | 105.1 | 104.8 | 104.7 | 104.7 | 104.7 | 104.6 | 104.5 |
| Refrigerating capacity ratio (relative to that of R404A) | | % | 100 | 87.7 | 98.5 | 99.0 | 99.8 | 101.6 | 103.7 | 105.7 |
| ASHRAE flammability classification | | — | Class 1 | Class 2L | Class 2L | Class 2L | Class 2L | Class 2L | Class 2L | Class 2L |

| Item | | Unit | Example 1-20 | Example 1-21 | Example 1-22 | Example 1-23 | Example 1-24 | Example 1-25 | Example 1-26 | Comparative Example 1-4 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |

TABLE 218-continued

| | | | | | | | | | |
|---|---|---|---|---|---|---|---|---|---|
| HFC-125 | mass % | 0 | 0 | 0 | 0 | 0 | 0 | 0 | 0 |
| GWP (AR4) | — | 7 | 7 | 7 | 7 | 7 | 8 | 8 | 8 |
| Discharge temperature | ° C. | 104.7 | 105.5 | 106.6 | 107.3 | 108.1 | 109.0 | 109.5 | 113.9 |
| Saturation pressure (40° C.) | MPa | 1.874 | 1.898 | 1.931 | 1.950 | 1.975 | 2.000 | 2.012 | 2.128 |
| Evaporating pressure | MPa | 0.164 | 0.167 | 0.171 | 0.174 | 0.177 | 0.180 | 0.181 | 0.196 |
| Compression ratio | — | 11.4 | 11.4 | 11.3 | 11.2 | 11.2 | 11.1 | 11.1 | 10.8 |
| COP ratio (relative to that of R404A) | % | 104,5 | 104.4 | 104.4 | 104.4 | 104.3 | 104.3 | 104.3 | 104.3 |
| Refrigerating capacity ratio (relative to that of R404A) | % | 108.0 | 109.8 | 112.3 | 113.8 | 115.7 | 117.7 | 118.6 | 128.0 |
| ASHRAE flammability classification | — | Class 2L | Class 2L | Class 2L | Class 2 | Class 2 | Class 2 | Class 2 | Class 2 |

Test Example 1-3

The GWP of each mixed refrigerant represented in Examples 1-27 to 1-39, Comparative Examples 1-5 to 1-6 and Reference Example 1-3 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

Evaporating temperature −10° C.
Condensation temperature 40° C.
Superheating temperature 20 K
Subcooling temperature 0 K
Compressor efficiency 70%

The meaning of each of the above terms is the same as in Test Example 1-1.

The results in Test Example 1-3 are shown in Table 219. Table 219 shows Examples and Comparative Examples of the refrigerant 2C1 of the present disclosure. In Table 219, the meaning of each of the terms is the same as in Test. Example 1-1.

The coefficient of performance (COP) and the compression ratio were determined in the same manner as in Test Example 1-1.

The flammability of such each mixed refrigerant was determined in the same manner as in Test Example 1-1. The flame velocity test was performed in the same manner as in Test Example 1-1.

The flammable range of the mixed refrigerant was measured by using a measurement apparatus (see FIG. 1T) based on ASTM E681-09, with the same method and test conditions as in Test Example 1-1.

TABLE 219

| Item | | Unit | Reference Example 1-3 (R404A) | Comparative Example 1-5 | Example 1-27 | Example 1-28 | Example 1-29 | Example 1-30 | Example 1-31 | Example 1-32 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0) |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 75.8 | 80.8 | 83.7 | 83.9 | 84.1 | 84.5 | 85.1 | 85.6 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.434 | 0.357 | 0.399 | 0.401 | 0.404 | 0.411 | 0.419 | 0.427 |
| Compression ratio | | — | 4.2 | 4.5 | 4.4 | 4.4 | 4.4 | 4.3 | 4.3 | 4.3 |
| COP ratio (relative to that of R404A) | | % | 100 | 103.8 | 102.9 | 102.9 | 102.8 | 102.7 | 102.5 | 102.4 |
| Refrigerating capacity ratio (relative to that of R404A) | | % | 100 | 89.8 | 98.7 | 99.1 | 99.8 | 101.2 | 102.8 | 104.5 |
| ASHRAE flammability classification | | — | Class 1 | Class 2L | Class 2L | Class 2L | Class 2L | Class 2L | Class 2L | Class 2L |

| Item | | Unit | Example 1-33 | Example 1-34 | Example 1-35 | Example 1-36 | Example 1-37 | Example 1-38 | Example 1-39 | Comparative Example 1-6 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |

TABLE 219-continued

| | | | | | | | | | |
|---|---|---|---|---|---|---|---|---|---|
| HFC-143a | mass % | 0 | 0 | 0 | 0 | 0 | 0 | 0 | 0 |
| HFC-125 | mass % | 0 | 0 | 0 | 0 | 0 | 0 | 0 | 0 |
| GWP (AR4) | — | 7 | 7 | 7 | 7 | 7 | 8 | 8 | 8 |
| Discharge temperature | ° C. | 86.2 | 86.6 | 87.3 | 87.7 | 88.2 | 88.7 | 88.9 | 91.5 |
| Saturation pressure (40° C.) | MPa | 1.874 | 1.898 | 1.931 | 1.950 | 1.975 | 2.000 | 2.012 | 2.128 |
| Evaporating pressure | MPa | 0.436 | 0.443 | 0.452 | 0.457 | 0.465 | 0.472 | 0.475 | 0.509 |
| Compression ratio | — | 4.3 | 4.3 | 4.3 | 4.3 | 4.3 | 4.2 | 4.2 | 4.2 |
| COP ratio (relative to that of R404A) | % | 102.2 | 102.1 | 102.0 | 101.9 | 101.8 | 101.7 | 101.6 | 101.3 |
| Refrigerating capacity ratio (relative to that of R404A) | % | 106.2 | 107.7 | 109.6 | 110.8 | 112.3 | 113.8 | 114.5 | 121.7 |
| ASHRAE flammability classification | — | Class 2L | Class 2L | Class 2L | Class 2 | Class 2 | Class 2 | Class 2 | Class 2 |

Test Example 1-4

The GWP of each mixed refrigerant represented in Comparative Examples 1-7 to 1-21 and Reference Example 1-4 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

Evaporating temperature −80° C.
Condensation temperature 40° C.
Superheating temperature 20 K
Subcooling temperature 0 K
Compressor efficiency 70%

The meaning of each of the above terms is the same as in Test Example 1-1.

The results in Test Example 1-4 are shown in Table 220. Table 220 shows Comparative Examples of the refrigerant 2C1 of the present disclosure. In Table 220, the meaning of each of the terms is the same as in Test Example 1-1.

The coefficient of performance (COP) and the compression ratio were determined in the same manner as in Test Example 1-1.

The flammability of such each mixed refrigerant was determined in the same manner as in Test Example 1-1. The flame velocity test was performed in the same manner as in Test Example 1-1.

The flammable range of the mixed refrigerant was measured by using a measurement apparatus (see FIG. 1T) based on ASTM E681-09, with the same method and test conditions as in Test Example 1-1.

TABLE 220

| Item | | Unit | Reference Example 1-4 (R404A) | Comparative Example 1-7 | Comparative Example 1-8 | Comparative Example 1-9 | Comparative Example 1-10 | Comparative Example 1-11 | Comparative Example 1-12 | Comparative Example 1-13 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 136.7 | 146.0 | 157.7 | 158.1 | 158.8 | 160.4 | 162.1 | 163.9 |
| Saturation pressure (40° C.) | | MPa | 1.822 | 1.592 | 1.745 | 1.752 | 1.764 | 1.788 | 1.817 | 1,844 |
| Evaporating pressure | | MPa | 0.014 | 0.011 | 0.012 | 0.012 | 0.012 | 0.012 | 0.013 | 0.013 |
| Compression ratio | | — | 134.6 | 149.1 | 150.8 | 150.2 | 149.3 | 147.2 | 145.0 | 142.8 |
| COP ratio (relative to that of R404A) | | % | 100 | 112.6 | 110.3 | 110.3 | 110.4 | 110.6 | 110.8 | 111.0 |
| Refrigerating capacity ratio (relative to that of R404A) | | % | 100 | 91.7 | 99.3 | 100.2 | 101.5 | 104.4 | 107.8 | 111.3 |
| ASHRAE flammability classification | | — | Class 1 | Class 2L | Class 2L | Class 2L | Class 2L | Class 2L | Class 2L | Class 2L |

TABLE 220-continued

| Item | | Unit | Comparative Example 1-14 | Comparative Example 1-15 | Comparative Example 1-16 | Comparative Example 1-17 | Comparative Example 1-18 | Comparative Example 1-19 | Comparative Example 1-20 | Comparative Example 1-21 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |
| | HFC-125 | mass % | 0 | 0 | 0 | 0 | 0 | 0 | 0 | 0 |
| GWP (AR4) | | — | 7 | 7 | 7 | 7 | 7 | 8 | 8 | 8 |
| Discharge temperature | | ° C. | 165.8 | 167.4 | 169.6 | 170.9 | 172.6 | 174.3 | 175.2 | 184.0 |
| Saturation pressure (40° C.) | | MPa | 1.874 | 1.898 | 1.931 | 1.950 | 1.975 | 2.000 | 2.012 | 2.128 |
| Evaporating pressure | | MPa | 0.013 | 0.014 | 0.014 | 0.014 | 0.015 | 0.015 | 0.015 | 0.017 |
| Compression ratio | | — | 140.5 | 138.7 | 136.3 | 134.9 | 133.2 | 131.5 | 130.7 | 123.8 |
| COP ratio (relative to that of R404A) | | % | 111.3 | 111.4 | 111.7 | 111.9 | 112.1 | 112.3 | 112.4 | 113.5 |
| Refrigerating capacity ratio (relative to that of R404A) | | % | 115.1 | 118.2 | 122.5 | 125.2 | 128.6 | 132.1 | 133.8 | 151.0 |
| ASHRAE flammability classification | | — | Class 2L | Class 2L | Class 2L | Class 2 | Class 2 | Class 2 | Class 2 | Class 2 |

Test Example 1-5

The GWP of each mixed refrigerant represented in Comparative Examples 1.22 to 1-36 and Reference Example 1-5 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

Evaporating temperature 10° C.
Condensation temperature 40° C.
Superheating temperature 20 K
Subcooling temperature 0 K
Compressor efficiency 70%

The meaning of each of the above terms is the same as in Test Example 1-1.

The results in Test Example 1-5 are shown in Table 221. Table 221 shows Comparative Examples of the refrigerant 2C1 of the present disclosure. In Table 221, the meaning of each of the terms is the same as in Test Example 1-1.

The coefficient of performance (COP) and the compression ratio were determined in the same manner as in Test Example 1-1.

The flammability of such each mixed refrigerant was determined in the same manner as in Test Example 1-1. The flame velocity test was performed in the same manner as in Test Example 1-1.

The flammable range of the mixed refrigerant was measured by using a measurement apparatus (see FIG. 1T) based on ASTM E681-09, with the same method and test conditions as in Test Example 1-1.

TABLE 221

| Item | | Unit | Reference Example 1-5 (R404A) | Comparative Example 1-22 | Comparative Example 1-23 | Comparative Example 1-24 | Comparative Example 1-25 | Comparative Example 1-26 | Comparative Example 1-27 | Comparative Example 1-28 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 68.5 | 72.4 | 74.0 | 74.1 | 74.2 | 74.4 | 74.7 | 74.9 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.820 | 0.694 | 0.768 | 0.772 | 0.777 | 0.789 | 0.803 | 0.817 |
| Compression ratio | | — | 2.2 | 2.3 | 2.3 | 2.3 | 2.3 | 2.3 | 2.3 | 2.3 |
| COP ratio (relative to that of R404A) | | % | 100.0 | 103.1 | 101.9 | 101.8 | 101.7 | 101.5 | 101.3 | 101.1 |

TABLE 221-continued

| | | | | | | | | | |
|---|---|---|---|---|---|---|---|---|---|
| Refrigerating capacity ratio (relative to that of R404A) | % | 100.0 | 91.2 | 98.9 | 99.3 | 99.8 | 101.0 | 102.5 | 103.8 |
| ASHRAE flammability classification | — | Class 1 | Class 2L | Class 2L | Class 2L | Class 2L | Class 2L | Class 2L | Class 2L |

| Item | | Unit | Comparative Example 1-29 | Comparative Example 1-30 | Comparative Example 1-31 | Comparative Example 1-32 | Comparative Example 1-33 | Comparative Example 1-34 | Comparative Example 1-35 | Comparative Example 1-36 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |
| | HFC-125 | mass % | 0 | 0 | 0 | 0 | 0 | 0 | 0 | 0 |
| GWP (AR4) | | — | 7 | 7 | 7 | 7 | 7 | 8 | 8 | 8 |
| Discharge temperature | | ° C. | 75.2 | 75.5 | 75.8 | 76.0 | 76.2 | 76.5 | 76,6 | 77.9 |
| Saturation pressure (40° C.) | | MPa | 1.874 | 1.898 | 1.931 | 1.950 | 1.975 | 2.000 | 2.012 | 2.128 |
| Evaporating pressure | | MPa | 0.832 | 0.844 | 0.860 | 0.870 | 0.882 | 0.895 | 0.901 | 0.959 |
| Compression ratio | | — | 2.3 | 2.2 | 2.2 | 2.2 | 2.2 | 2.2 | 2.2 | 2.2 |
| COP ratio (relative to that of R404A) | | % | 100.9 | 100.8 | 100.6 | 100.4 | 100.3 | 100.1 | 100.1 | 99.5 |
| Refrigerating capacity ratio (relative to that of R404A) | | % | 105.3 | 106.5 | 108.2 | 109.1 | 110.4 | 111.6 | 112.3 | 118.2 |
| ASHRAE flammability classification | | — | Class 2L | Class 2L | Class 2L | Class 2 | Class 2 | Class 2 | Class 2 | Class 2 |

Test Example 2-1

The GWP of each mixed refrigerant represented in Examples 2-1 to 2-6, Comparative Examples 2-1 to 2-9 and Reference Example 2-1 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

Evaporating temperature −50° C.
Condensation temperature 40° C.
Superheating temperature 20 K
Subcooling temperature 0 K
Compressor efficiency 70%

An “evaporating temperature of −50° C.” means that the evaporating temperature of such each mixed refrigerant in an evaporator included in a refrigerating apparatus is −50° C. A “condensation temperature of 40° C.” means that the condensation temperature of such each mixed refrigerant in a condenser included in a refrigerating apparatus is 40° C.

The results in Test Example 2-1 are shown in Table 222. Table 222 shows Examples and Comparative Examples of the refrigerant 2C2 of the present disclosure. In Table 222, the “COP ratio” and the “Refrigerating capacity ratio” each represent the proportion (%) relative to that of R404A.

In Table 222, the “Saturation pressure (40° C.)” represents the saturation pressure at a saturation temperature of 40° C. In Table 222, the “Discharge temperature (° C.)” represents the temperature at which the highest temperature in the refrigeration cycle is achieved in theoretical refrigeration cycle calculation with respect to such each mixed refrigerant.

The coefficient of performance (COP) was determined according to the following expression.

COP=(Refrigerating capacity or heating capacity)/Power consumption

The compression ratio was determined by the following expression.

Compression ratio/Condensation pressure (Mpa)/Evaporating pressure (Mpa)

The flammability of such each mixed refrigerant was determined by defining the mixed composition of such each mixed refrigerant as the WCF concentration, and measuring the flame velocity according to ANSI/ASHRAE Standard 34-2013. One having a flame velocity of 0 cm/s to 10 cm/s was rated as “Class 2L (lower flammability)”, one having a flame velocity of more than 10 cm/s was rated as “Class 2 (low flammability)”, and one causing no flame propagation was rated as “Class 1 (non-flammability)”. In Table 222, the “ASHRAE flammability classification” shows each result based on the criteria for determination.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm)

equipped with two light-transmitting acrylic windows was used as the sample cell, and a xenon lamp was used as a light source. A schlieren image of any flame was recorded by a high-speed digital video camera at a frame rate of 600 fps, and stored in a PC.

The flammable range of the mixed refrigerant was measured by using a measurement apparatus (see FIG. 1T) based on ASTM E681-09.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)

Test temperature: 60° C.±3° C.

Pressure: 101.3 kPa±0.7 kPa

Water content: 0.0088 g±0.0005 g per gram of dry air (water content at a relative humidity of 50% at 23° C.)

Mixing ratio of refrigerant composition/air: ±0.2 vol. % by 1 vol. %

Mixing of refrigerant composition: ±0.1 mass %

Ignition method: AC discharge, voltage 15 kV, current 30 mA, neon transformer

Electrode interval: 6.4 mm (¼ inches)

Spark: 0.4 seconds±0.05 seconds

Criteria for determination:

A case where any flame was spread at more than 90 degrees around the ignition point flame propagation (flammability)

A case where any flame was spread at 90 degrees or less around the ignition point: no flame propagation (non-flammability)

TABLE 222

| Item | | Unit | Reference Example 2-1 (R404A) | Comparative Example 2-1 | Comparative Example 2-2 | Example 2-1 | Example 2-2 | Example 2-3 | Example 2-4 | Example 2-5 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 100.6 | 108.6 | 114.7 | 115.0 | 115.5 | 116.5 | 117.6 | 118.8 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.082 | 0.063 | 0.072 | 0.073 | 0.074 | 0.075 | 0.077 | 0.079 |
| Compression ratio | | — | 22.2 | 25.3 | 24.1 | 24.0 | 23.9 | 23.8 | 23.6 | 23.4 |
| COP ratio (relative to that of R404A) | | % | 100 | 106.2 | 106.2 | 106.2 | 106.2 | 106.2 | 106.2 | 106.2 |
| Refrigerating capacity ratio (relative to that of R404A) | | % | 100 | 86.2 | 98,5 | 99.1 | 100 | 102.1 | 104.5 | 106.9 |
| ASHRAE flammability classification | | — | Class 1 | Class 2L | Class 2L | Class 2L | Class 2L | Class 2L | Class 2L | Class 2L |

| Item | | Unit | Example 2-6 | Comparative Example 2-3 | Comparative Example 2-4 | Comparative Example 2-5 | Comparative Example 2-6 | Comparative Example 2-7 | Comparative Example 2-8 | Comparative Example 2-9 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |
| | HFC-125 | mass % | 0 | 0 | 0 | 0 | 0 | 0 | 0 | 0 |
| GWP (AR4) | | — | 7 | 7 | 7 | 7 | 7 | 8 | 8 | 8 |
| Discharge temperature | | ° C. | 120.0 | 121.0 | 122.4 | 123.3 | 124.4 | 125.5 | 126.0 | 131.7 |
| Saturation pressure (40° C.) | | MPa | 1.874 | 1.898 | 1.931 | 1.950 | 1.975 | 2.000 | 2.012 | 2.128 |
| Evaporating pressure | | MPa | 0.081 | 0.083 | 0.085 | 0.086 | 0.088 | 0.090 | 0.091 | 0.099 |
| Compression ratio | | — | 23.1 | 23.0 | 22.8 | 22.6 | 22.5 | 22.3 | 22.2 | 21.6 |
| COP ratio (relative to that of R404A) | | % | 106.2 | 106.3 | 106.3 | 106.3 | 106.3 | 106.4 | 106.4 | 106.7 |
| Refrigerating capacity ratio (relative to that of R404A) | | % | 109.5 | 111.7 | 114.6 | 116.4 | 118.7 | 121 | 122.2 | 133.3 |
| ASHRAE flammability classification | | — | Class 2L | Class 2L | Class 2L | Class 2 | Class 2 | Class 2 | Class 2 | Class 2 |

Test Example 2-2

The GWP of each mixed refrigerant represented in Examples 2-7 to 2-12, Comparative Examples 2-10 to 2-18 and Reference Example 2-2 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

Evaporating temperature −35° C.
Condensation temperature 40° C.
Superheating temperature 20 K
Subcooling temperature 0 K
Compressor efficiency 70%

The meaning of each of the above terms is the same as in Test Example 2-1.

The results in Test Example 2-2 are shown in Table 223. Table 223 shows Examples and Comparative Examples of the refrigerant 2C2 of the present disclosure. In Table 223, the meaning of each of the terms is the same as in Test Example 2-1.

The coefficient of performance (COP) and the compression ratio were determined in the same manner as in Test Example 2-1.

The flammability of such each mixed refrigerant was determined in the same manner as in Test Example 2-1. The flame velocity test was performed in the same manner as in Test Example 2-1.

The flammable range of the mixed refrigerant was measured by using a measurement apparatus (see FIG. 1T) based on ASTM E681.09, with the same method and test conditions as in Test Example 2-1.

TABLE 223

| Item | | Unit | Reference Example 2-2 (R404A) | Comparative Example 2-10 | Comparative Example 2-11 | Example 2-7 | Example 2-8 | Example 2-9 | Example 2-10 | Example 2-11 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 89.1 | 95.8 | 100.6 | 100.8 | 101.2 | 102.0 | 102.9 | 103.8 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.165 | 0.131 | 0.148 | 0.149 | 0.151 | 0,154 | 0.157 | 0.160 |
| Compression ratio | | — | 11.0 | 12.2 | 11.8 | 11.7 | 11.7 | 11.6 | 11.6 | 11.5 |
| COP ratio (relative to that of R404A) | | % | 100 | 105.1 | 104.8 | 104.7 | 104.7 | 104.7 | 104.6 | 104.5 |
| Refrigerating capacity ratio (relative to that of R404A) | | % | 100 | 87.7 | 98,5 | 99.0 | 99.8 | 101.6 | 103.7 | 105.7 |
| ASHRAE flammability classification | | — | Class 1 | Class 2L | Class 2L | Class 2L | Class 2L | Class 2L | Class 2L | Class 2L |

| Item | | Unit | Example 2-12 | Comparative Example 2-12 | Comparative Example 2-13 | Comparative Example 2-14 | Comparative Example 2-15 | Comparative Example 2-16 | Comparative Example 2-17 | Comparative Example 2-18 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |
| | HFC-125 | mass % | 0 | 0 | 0 | 0 | 0 | 0 | 0 | 0 |
| GWP (AR4) | | — | 7 | 7 | 7 | 7 | 7 | 8 | 8 | 8 |
| Discharge temperature | | ° C. | 104.7 | 105.5 | 106.6 | 107.3 | 108.1 | 109.0 | 109.5 | 113.9 |
| Saturation pressure (40° C.) | | MPa | 1.874 | 1.898 | 1.931 | 1.950 | 1.975 | 2.000 | 2.012 | 2.128 |
| Evaporating pressure | | MPa | 0.164 | 0.167 | 0.171 | 0.174 | 0.177 | 0.180 | 0.181 | 0.196 |
| Compression ratio | | — | 11.4 | 11.4 | 11.3 | 11.2 | 11.2 | 11.1 | 11.1 | 10.8 |
| COP ratio (relative to that of R404A) | | % | 104.5 | 104.4 | 104.4 | 104.4 | 104.3 | 104.3 | 104.3 | 104.3 |
| Refrigerating capacity ratio (relative to that of R404A) | | % | 108.0 | 109.8 | 112.3 | 113.8 | 115.7 | 117.7 | 118.6 | 128.0 |
| ASHRAE flammability classification | | — | Class 2L | Class 2L | Class 2L | Class 2 | Class 2 | Class 2 | Class 2 | Class 2 |

Test Example 2-3

The GWP of each mixed refrigerant represented in Examples 2-13 to 2-18, Comparative Examples 2-19 to 2-27 and Reference Example 2-3 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

Evaporating temperature −10° C.
Condensation temperature 40° C.
Superheating temperature 20 K
Subcooling temperature 0 K
Compressor efficiency 70%

The meaning of each of the above terms is the same as in Test Example 2-1.

The results in Test Example 2-3 are shown in Table 224. Table 224 shows Examples and Comparative Examples of the refrigerant 2C2 of the present disclosure. In Table 224, the meaning of each of the terms is the same as in Test Example 2-1.

The coefficient of performance (COP) and the compression ratio were determined in the same manner as in Test Example 2-1.

The flammability of such each mixed refrigerant was determined in the same manner as in Test Example 2-1. The flame velocity test was performed in the same manner as in Test Example 2-1.

The flammable range of the mixed refrigerant was measured by using a measurement apparatus (see FIG. 1T) based on ASTM E681-09, with the same method and test conditions as in Test Example 2-1.

TABLE 224

| Item | | Unit | Reference Example 2-3 (R404A) | Comparative Example 2-19 | Comparative Example 2-20 | Example 2-13 | Example 2-14 | Example 2-15 | Example 2-16 | Example 2-17 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 75.8 | 80.8 | 83.7 | 83.9 | 84.1 | 84.5 | 85.1 | 85.6 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.434 | 0.357 | 0.399 | 0.401 | 0.404 | 0.411 | 0.419 | 0.427 |
| Compression ratio | | — | 4.2 | 4.5 | 4.4 | 4.4 | 4.4 | 4.3 | 4.3 | 4.3 |
| COP ratio (relative to that of R404A) | | % | 100 | 103.8 | 102.9 | 102.9 | 102.8 | 102.7 | 102.5 | 102.4 |
| Refrigerating 106.2 (relative to that of R404A) | | % | 100 | 89.8 | 98.7 | 99.1 | 99.8 | 101.2 | 102.8 | 104.5 |
| ASHRAE flammability classification | | — | Class 1 | Class 2L | Class 2L | Class 2L | Class 2L | Class 2L | Class 2L | Class 2L |

| Item | | Unit | Example 2-18 | Comparative Example 2-21 | Comparative Example 2-22 | Comparative Example 2-23 | Comparative Example 2-24 | Comparative Example 2-25 | Comparative Example 2-27 | Comparative Example 2-27 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |
| | HFC-125 | mass % | 0 | 0 | 0 | 0 | 0 | 0 | 0 | 0 |
| GWP (AR4) | | — | 7 | 7 | 7 | 7 | 7 | 8 | 8 | 8 |
| Discharge temperature | | ° C. | 86.2 | 86.6 | 87.3 | 87.7 | 88.2 | 88.7 | 88.9 | 91.5 |
| Saturation pressure (40° C.) | | MPa | 1.874 | 1.898 | 1.931 | 1.950 | 1.975 | 2.000 | 2.012 | 2.128 |
| Evaporating pressure | | MPa | 0.436 | 0.443 | 0.452 | 0.457 | 0.465 | 0.472 | 0.475 | 0.509 |
| Compression ratio | | — | 4.3 | 4.3 | 4.3 | 4.3 | 4.3 | 4.2 | 4.2 | 4.2 |
| COP ratio (relative to that of R404A) | | % | 102.2 | 102.1 | 102.0 | 101.9 | 101.8 | 101.7 | 101.6 | 101.3 |
| Refrigerating capacity ratio (relative to that of R404A) | | % | 106.2 | 107.7 | 109.6 | 110.8 | 112.3 | 113.8 | 114.5 | 121.7 |
| ASHRAE flammability classification | | — | Class 2L | Class 2L | Class 2L | Class 2 | Class 2 | Class 2 | Class 2 | Class 2 |

Test Example 2-4

The GWP of each mixed refrigerant represented in Examples 2-19 to 2-24, Comparative Examples 2-28 to 2-36 and Reference Example 2-4 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

Evaporating temperature −80° C.
Condensation temperature 40° C.
Superheating temperature 20 K
Subcooling temperature 0 K
Compressor efficiency 70%

The meaning of each of the above terms is the same as in Test Example 2-1.

The results in Test Example 2-4 are shown in Table 225. Table 225 shows Examples and Comparative Examples of the refrigerant 2C2 of the present disclosure. In Table 225, the meaning of each of the terms is the same as in Test Example 2-1.

The coefficient of performance (COP) and the compression ratio were determined in the same manner as in Test Example 2-1.

The flammability of such each mixed refrigerant was determined in the same manner as in Test Example 2-1. The flame velocity test was performed in the same manner as in Test Example 2-1.

The flammable range of the mixed refrigerant was measured by using a measurement apparatus (see FIG. 1T) based on ASTM E681-09, with the same method and test conditions as in Test Example 2-1.

TABLE 225

| Item | | Unit | Reference Example 2-3 (R404A) | Comparative Example 2-28 | Comparative Example 2-29 | Example 2-19 | Example 2-20 | Example 2-21 | Example 2-21 | Example 2-22 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 136.7 | 146.0 | 157.7 | 158.1 | 158.8 | 160.4 | 162.1 | 163.9 |
| Saturation pressure (40° C.) | | MPa | 1.822 | 1,592 | 1.745 | 1.752 | 1.764 | 1.788 | 1.817 | 1.844 |
| Evaporating pressure | | MPa | 0.014 | 0.011 | 0.012 | 0.012 | 0.012 | 0.012 | 0.013 | 0.013 |
| Compression ratio | | — | 134.6 | 149.1 | 150.8 | 150.2 | 149.3 | 147.2 | 145.0 | 142.8 |
| COP ratio (relative to that of R404A) | | % | 100 | 112.6 | 110.3 | 110.3 | 110.4 | 110.6 | 110.8 | 111.0 |
| Refrigerating 106.2 (relative to that of R404A) | | % | 100 | 91.7 | 99.3 | 100.2 | 101.5 | 104.4 | 107.8 | 111.3 |
| ASHRAE flammability classification | | — | Class 1 | Class 2L | Class 2L | Class 2L | Class 2L | Class 2L | Class 2L | Class 2L |

| Item | | Unit | Example 2-23 | Example 2-24 | Comparative Example 2-31 | Comparative Example 2-32 | Comparative Example 2-33 | Comparative Example 2-34 | Comparative Example 2-35 | Comparative Example 2-36 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |
| | HFC-125 | mass % | 0 | 0 | 0 | 0 | 0 | 0 | 0 | 0 |
| GWP (AR4) | | — | 7 | 7 | 7 | 7 | 7 | 8 | 8 | 8 |
| Discharge temperature | | ° C. | 165.8 | 167.4 | 169.6 | 170.9 | 172.6 | 174.3 | 175.2 | 184.0 |
| Saturation pressure (40° C.) | | MPa | 1.874 | 1.898 | 1.931 | 1.950 | 1.975 | 2.000 | 2.012 | 2.128 |
| Evaporating pressure | | MPa | 0.013 | 0.014 | 0.014 | 0.014 | 0.015 | 0.015 | 0.015 | 0.017 |
| Compression ratio | | — | 140.5 | 138.7 | 136.3 | 134.9 | 133.2 | 131.5 | 130.7 | 123.8 |
| COP ratio (relative to that of R404A) | | % | 111.3 | 111.4 | 111.7 | 111.9 | 112.1 | 112.3 | 112.4 | 113.5 |
| Refrigerating capacity ratio (relative to that of R404A) | | % | 115.1 | 118.2 | 122.5 | 125.2 | 128.6 | 132.1 | 133.8 | 151.0 |
| ASHRAE flammability classification | | — | Class 2L | Class 2L | Class 2L | Class 2 | Class 2 | Class 2 | Class 2 | Class 2 |

Test Example 2-5

The GWP of each mixed refrigerant represented in Examples 2-25 to 2-30, Comparative Examples 2-37 to 2-45 and Reference Example 2-5 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

Evaporating temperature 10° C.
Condensation temperature 40° C.
Superheating temperature 20 K
Subcooling temperature 0 K
Compressor efficiency 70%

The meaning of each of the above terms is the same as in Test Example 2-1.

The results in Test Example 2-5 are shown in Table 226. Table 226 shows Examples and Comparative Examples of the refrigerant 2C2 of the present disclosure. In Table 226, the meaning of each of the terms is the same as in Test Example 2-1.

The coefficient of performance (COP) and the compression ratio were determined in the same manner as in Test Example 2-1.

The flammability of such each mixed refrigerant was determined in the same manner as in Test Example 2-1. The flame velocity test was performed in the same manner as in Test Example 2-1.

The flammable range of the mixed refrigerant was measured by using a measurement apparatus (see FIG. 1T) based on ASTM E681-09, with the same method and test conditions as in Test Example 2-1.

TABLE 226

| | | Unit | Reference Example 2-5 (R404A) | Comparative Example 2-37 | Comparative Example 2-38 | Example 2-25 | Example 2-26 | Example 2-27 | Example 2-28 | Example 2-29 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | | 68.5 | 72.4 | 74.0 | 74.1 | 74.2 | 74.4 | 74.7 | 74.9 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.820 | 0.694 | 0.768 | 0.772 | 0.777 | 0.789 | 0.803 | 0.817 |
| Compression ratio | | — | 2.2 | 2.3 | 2.3 | 2.3 | 2.3 | 2.3 | 2.3 | 2,3 |
| COP ratio (relative to that of R404A) | | % | 100.0 | 103.1 | 101.9 | 101.8 | 101.7 | 101.5 | 101.3 | 101.1 |
| Refrigerating capacity ratio (relative to that of R404A) | | % | 100.0 | 91.2 | 98.9 | 99.3 | 99.8 | 101.0 | 102.5 | 103.8 |
| ASHRAE flammability classification | | — | Class 1 | Class 2L | Class 2L | Class 2L | Class 2L | Class 2L | Class 2L | Class 2L |

| | | Unit | Example 2-30 | Comparative Example 2-39 | Comparative Example 2-40 | Comparative Example 2-41 | Comparative Example 2-42 | Comparative Example 2-43 | Comparative Example 2-44 | Comparative Example 2-45 |
|---|---|---|---|---|---|---|---|---|---|---|
| Composition proportions | HFO-1132(E) | mass % | 49.2 | 51.0 | 53.5 | 55.0 | 57.0 | 59.0 | 60.0 | 70.0 |
| | HFO-1234yf | mass % | 50.8 | 49.0 | 46.5 | 45.0 | 43.0 | 41.0 | 40.0 | 30.0 |
| | HFC-134a | mass % | 0 | 0 | 0 | 0 | 0 | 0 | 0 | 0 |
| | HFC-143a | mass % | 0 | 0 | 0 | 0 | 0 | 0 | 0 | 0 |
| | HFC-125 | mass % | 0 | 0 | 0 | 0 | 0 | 0 | 0 | 0 |
| GWP (AR4) | | — | 7 | 7 | 7 | 7 | 7 | 8 | 8 | 8 |
| Discharge temperature | | | 75.2 | 75.5 | 75.8 | 76.0 | 76.2 | 76.5 | 76.6 | 77.9 |
| Saturation pressure (40° C.) | | MPa | 1.874 | 1.898 | 1.931 | 1.950 | 1.975 | 2.000 | 2.012 | 2.128 |
| Evaporating pressure | | MPa | 0.832 | 0.844 | 0.860 | 0.870 | 0.882 | 0.895 | 0.901 | 0.959 |
| Compression ratio | | — | 2.3 | 2,2 | 2.2 | 2.2 | 2.2 | 2.2 | 2.2 | 2.2 |
| COP ratio (relative to that of R404A) | | % | 100.9 | 100.8 | 100.6 | 100.4 | 100.3 | 100.1 | 100.1 | 99.5 |
| Refrigerating capacity ratio (relative to that of R404A) | | % | 105.3 | 106.5 | 108.2 | 109.1 | 110.4 | 111.6 | 112,3 | 118.2 |
| ASHRAE flammability classification | | — | Class 2L | Class 2L | Class 2L | Class 2 | Class 2 | Class 2 | Class 2 | Class 2 |

Test Example 3

The GWP of each mixed refrigerant represented in Examples 3-1 to 3-5, Comparative Examples 3-1 to 3-5, Reference Example 3-1 (R134a) and Reference Example 3-2 (R404A) was evaluated based on the value in the fourth report of IPCC.

The COP, the refrigerating capacity, the discharge temperature, the saturation pressure at a saturation temperature of 45° C., the condensation pressure and the evaporating pressure of such each mixed refrigerant were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

Evaporating temperature −10° C.
Condensation temperature 45° C.
Superheating temperature 20 K
Subcooling temperature 0 K
Compressor efficiency 70%

An "evaporating temperature of −10° C." means that the evaporating temperature of such each mixed refrigerant in an evaporator included in a refrigerating apparatus is −10° C. A "condensation temperature of 45° C." means that the condensation temperature of such each mixed refrigerant in an evaporator included in a refrigerating apparatus is 45° C.

The results in Test Example 3 are shown in Table 227. Table 227 shows Examples and Comparative Examples of the refrigerant 2C3 of the present disclosure. In Table 227, the "COP ratio" and the "Refrigerating capacity ratio" each represent the proportion (%) relative to that of R134a. In Table 227, the "Saturation pressure (45° C.)" represents the saturation pressure at a saturation temperature of 45° C. In Table 227, the "Discharge temperature (° C.)" represents the temperature at which the highest temperature in the refrigeration cycle is achieved in theoretical refrigeration cycle calculation with respect to such each mixed refrigerant.

The coefficient of performance (COP) was determined according to the following expression.

COP=(Refrigerating capacity or heating capacity)/Power consumption

The critical temperature was determined by performing calculation by using National Institute of Science and Technology (NISI) and Reference Fluid Thermodynamic and Transport Properties Database (Refprop 9.0).

The flammability of such each mixed refrigerant was determined by defining the mixed composition of such each mixed refrigerant as the WCF concentration, and measuring the flame velocity according to ANSI/ASHRAE Standard 34-2013. One having a flame velocity of 0 cm/s to 10 cm/s was rated as "Class 2L (lower flammability)", one having a flame velocity of more than 10 cm/s was rated as "Class 2 (low flammability)", and one causing no flame propagation was rated as "Class 1 (non-flammability)". In Table 227, the "ASHRAE flammability classification" shows each result based on the criteria for determination.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any flame was recorded by a high-speed digital video camera at a frame rate of 600 fps, and stored in a PC.

The flammable range of the mixed refrigerant was measured by using a measurement apparatus (see FIG. 1T) based on ASTM E681-09.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)
Test temperature: 60° C.±3° C.
Pressure: 101.3 kPa±0.7 kPa
Water content: 0.0088 g±0.0005 g per gram of dry air (water content at a relative humidity of 50% at 23° C.)
Mixing ratio of refrigerant composition/air: ±0.2 vol. % by 1 vol. %
Mixing of refrigerant composition: ±0.1 mass %
Ignition method: AC discharge, voltage 15 kV, current 30 mA, neon transformer
Electrode interval: 6.4 mm (¼ inches)
Spark: 0.4 seconds±0.05 seconds
Criteria for determination:

- A case where any flame was spread at more than 90 degrees around the ignition point flame propagation (flammability)
- A case where any flame was spread at 90 degrees or less around the ignition point: no flame propagation (non-flammability)

TABLE 227

| Item | | Unit | Reference Example 3-1 (R134a) | Comparative Example 3-1 | Example 3-2 Comparative | Example 3-1 | Example 3-2 | Example 3-3 |
|---|---|---|---|---|---|---|---|---|
| Composition proportions | HFO-1132(E) | mass % | 0 | 20.0 | 30.0 | 31.1 | 33.0 | 35.0 |
| | HFO-1234yf | mass % | 0 | 80.0 | 70.0 | 68.9 | 67.0 | 65.0 |
| | HFC-134a | mass % | 100.0 | 0 | 0 | 0 | 0 | 0 |
| | HFC-143a | mass % | 0 | 0 | 0 | 0 | 0 | 0 |
| | HFC-125 | mass % | 0 | 0 | 0 | 0 | 0 | 0 |
| GWP (AR4) | | — | 1430 | 5 | 6 | 6 | 6 | 6 |
| Discharge temperature | | ° C. | 86.9 | 86.3 | 86.9 | 87.2 | 87.9 | 88,5 |
| Saturation pressure (45° C.) | | MPa | 1.160 | 1.607 | 1.795 | 1.814 | 1.848 | 1.883 |

TABLE 227-continued

| | | | | | | | |
|---|---|---|---|---|---|---|---|
| Evaporating pressure | MPa | 0.201 | 0.311 | 0.355 | 0.360 | 0.368 | 0.376 |
| Critical temperature | ° C. | 101.1 | 84.6 | 83.0 | 82.7 | 82.2 | 81.7 |
| COP ratio (relative to that of R134a) | % | 100.0 | 93.6 | 92.7 | 92.6 | 92.4 | 92.2 |
| Refrigerating capacity ratio (relative to that of R134a) | % | 100.0 | 132.3 | 148.3 | 150.0 | 152.8 | 155.8 |
| ASHRAE flammability classification | — | Class 1 | Class 2L | Class 2L | Class 2L | Class 2L | Class 2L |

| Item | | Unit | Example 3-4 | Example 3-5 | Comparative Example 3-3 | Comparative Example 3-4 | Comparative Example 3-5 | Reference Example 3-2 (R404A) |
|---|---|---|---|---|---|---|---|---|
| Composition proportions | HFO-1132(E) | mass % | 37.9 | 39.8 | 40.0 | 50.0 | 0.0 | 0 |
| | HFO-1234yf | mass % | 62.1 | 60.2 | 60.0 | 50.0 | 100.0 | 0 |
| | HFC-134a | mass % | 0 | 0 | 0 | 0 | 0 | 4.0 |
| | HFC-143a | mass % | 0 | 0 | 0 | 0 | 0 | 52.0 |
| | HFC-125 | mass % | 0 | 0 | 0 | 0 | 0 | 44.0 |
| GWP (AR4) | | — | 6 | 6 | 6 | 7 | 4 | 3922 |
| Discharge temperature | | ° C. | 89.4 | 90.0 | 90.1 | 93.0 | 72.2 | 81.7 |
| Saturation pressure (45° C.) | | MPa | 1.930 | 1.963 | 1.966 | 2.123 | 1.154 | 2.052 |
| Evaporating pressure | | MPa | 0.388 | 0.397 | 0.397 | 0.437 | 0.222 | 0.434 |
| Critical temperature | | ° C. | 81.0 | 80.5 | 80.5 | 78.7 | 94.7 | 72.0 |
| COP ratio (relative to that of R134a) | | % | 92.0 | 91.8 | 91.8 | 91.0 | 95.7 | 88.6 |
| Refrigerating capacity ratio (relative to that of R134a) | | % | 159.8 | 162.7 | 162.9 | 176.6 | 96.2 | 164.4 |
| ASHRAE flammability classification | | — | Class 2L | Class 2L | Class 2L | Class 2L | Class 2L | Class 1 |

Test Example 4

The GWP of each mixed refrigerant represented in Examples 41 to 4-7 and Comparative Examples 4-1 to 4-5 was evaluated based on the value in the fourth report of IPCC.

The COP, the refrigerating capacity, the discharge temperature and the saturation pressure at a saturation temperature of −10° C. of such each mixed refrigerant were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

Evaporating temperature 5° C.
Condensation temperature 45° C.
Superheating temperature 5 K
Subcooling temperature 5 K
Compressor efficiency 70%

An "evaporating temperature of 5° C." means that the evaporating temperature of such each mixed refrigerant in an evaporator included in a refrigerating apparatus is 5° C. A "condensation temperature of 45° C." means that the condensation temperature of such each mixed refrigerant in a condenser included in a refrigerating apparatus is 45° C.

The results in Test Example 4 are shown in Table 228. Table 228 shows Examples and Comparative Examples of the refrigerant 2C4 of the present disclosure. In Table 228, the "COP ratio" and the "Refrigerating capacity ratio" each represent the proportion (%) relative to that of R1234yf. In Table 228, the "Saturation pressure (−10° C.)" represents the saturation pressure at a saturation temperature of −10° C., as a representative evaporating temperature value under refrigeration conditions. In Table 228, the "Discharge temperature (° C.)" represents the temperature at which the highest temperature in the refrigeration cycle is achieved in theoretical refrigeration cycle calculation with respect to such each mixed refrigerant.

The coefficient of performance (COP) was determined according to the following expression.

COP=(Refrigerating capacity or heating capacity)/Power consumption

The critical temperature was determined by performing calculation by using National Institute of Science and Technology (NIST) and Reference Fluid Thermodynamic and Transport Properties Database (Refprop 9.0).

The flammability of such each mixed refrigerant was determined by defining the mixed composition of such each mixed refrigerant as the WCF concentration, and measuring the flame velocity according to ANSI/ASHRAE Standard 34-2013. One having a flame velocity of 0 cm/s to 10 cm/s was rated as "Class 2L (lower flammability)", one having a flame velocity of more than 10 cm/s was rated as "Class 2 (low flammability)", and one causing no flame propagation was rated as "Class 1 (non-flammability)". In Table 228, the "ASHRAE flammability classification" shows each result based on the criteria for determination.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter 155 mm, length: 198 mm) equipped with two light-transmitting acrylic windows was used as the sample cell, and a xenon lamp was used as a light source. A schlieren image of any flame was recorded by a high-speed digital video camera at a frame rate of 600 fps, and stored in a PC.

The flammable range of the mixed refrigerant was measured by using a measurement apparatus (see FIG. 1T) based on ASTM E681-09.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)
Test temperature: 60° C.±3° C.
Pressure: 101.3 kPa±0.7 kPa
Water content: 0.0088 g±0.0005 g per gram of dry air (water content at a relative humidity of 50% at 23° C.)
Mixing ratio of refrigerant composition/air: ±0.2 vol. % by 1 vol. %
Mixing of refrigerant composition: ±0.1 mass %
Ignition method: AC discharge, voltage 15 kV, current 30 mA, neon transformer
Electrode interval: 6.4 mm (¼ inches)
Spark: 0.4 seconds±0.05 seconds
Criteria for determination:

A case where any flame was spread at more than 90 degrees around the ignition point: flame propagation (flammability)

A case where any flame was spread at 90 degrees or less around the ignition point: no flame propagation (non-flammability)

were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

Evaporating temperature −30° C.
Condensation temperature 30° C.
Superheating temperature 5 K
Subcooling temperature 5 K
Compressor efficiency 70%

An "evaporating temperature of −30° C." means that the evaporating temperature of such each mixed refrigerant in an evaporator included in a refrigerating apparatus is −30° C. A "condensation temperature of 30° C." means that the condensation temperature of such each mixed refrigerant in a condenser included in a refrigerating apparatus is 30° C.

The results in Test Example 5 are shown in Table 229. Table 229 shows Examples and Comparative Examples of the refrigerant 2C5 of the present disclosure. In Table 229, the "COP ratio" and the "Refrigerating capacity ratio" each represent the proportion (%) relative to that of R1234yf. In Table 229, the "Discharge temperature (° C.)" represents the temperature at which the highest temperature in the refrigeration cycle is achieved in theoretical refrigeration cycle calculation with respect to such each mixed refrigerant. In Table 229, the "Boiling point (° C.)" represents the temperature at which a liquid phase of such each mixed refrigerant is at atmospheric pressure (101.33 kPa). In Table 229,

TABLE 228

| Item | | Unit | Comparative Example 4-1 | Comparative Example 4-2 | Example 4-1 | Example 4-2 | Example 4-3 | Example 4-4 |
|---|---|---|---|---|---|---|---|---|
| Composition proportions | HFO-1132(E) | mass % | 0 | 15.0 | 21.0 | 23.6 | 24.3 | 25.1 |
| | HFO-1234yf | mass % | 100.0 | 85.0 | 79.0 | 76.4 | 75.7 | 74.9 |
| GWP (AR4) | | — | 4 | 5 | 5 | 5 | 5 | 6 |
| Discharge temperature | | ° C. | 54.4 | 61.3 | 63.1 | 63.8 | 64.0 | 64.2 |
| Saturation pressure (−10° C.) | | MPa | 0.222 | 0.350 | 0.383 | 0.396 | 0.400 | 0.403 |
| Critical temperature | | ° C. | 94.7 | 88.1 | 85.9 | 85.0 | 84.8 | 84.5 |
| COP ratio (relative to that of R1234yf) | | % | 100.0 | 99.1 | 98.8 | 98.6 | 98.5 | 98,4 |
| Refrigerating capacity ratio (relative to that of R1234yf) | | % | 100.0 | 129.8 | 140.0 | 144.2 | 145.4 | 146.6 |
| ASHRAE flammability classification | | — | Class 2L | Class 2L | Class 2L | Class 2L | Class 2L | Class 2L |

| Item | | Unit | Example 4-5 | Example 4-6 | Example 4-7 | Comparative Example 4-3 | Comparative Example 4-4 | Comparative Example 4-5 |
|---|---|---|---|---|---|---|---|---|
| Composition proportions | HFO-1132(E) | mass % | 26.7 | 27.5 | 28.4 | 30.0 | 40.0 | 50.0 |
| | HFO-1234yf | mass % | 73.3 | 72.5 | 71.6 | 70.0 | 60.0 | 50.0 |
| GWP (AR4) | | — | 6 | 6 | 6 | 6 | 6 | 7 |
| Discharge temperature | | ° C. | 64.6 | 64.8 | 65.0 | 65.4 | 67.5 | 69.4 |
| Saturation pressure (−10° C.) | | MPa | 0.411 | 0.414 | 0.418 | 0.425 | 0.461 | 0.492 |
| Critical temperature | | ° C. | 84.0 | 83.8 | 83.5 | 83.0 | 80.5 | 78.7 |
| COP ratio (relative to that of R1234yf) | | % | 98.3 | 98.2 | 98.2 | 98.0 | 97.2 | 96.6 |
| Refrigerating capacity ratio (relative to that of R1234yf) | | % | 149.1 | 150.3 | 151.7 | 154.1 | 168.2 | 181.3 |
| ASHRAE flammability classification | | — | Class 2L | Class 2L | Class 2L | Class 2L | Class 2L | Class 2L |

Test Example 5

The GWP of each mixed refrigerant represented in Examples 5-1 to 5-13, Comparative Examples 5-1 to 5-3 and Reference Example 5-1 (R134a) was evaluated based on the value in the fourth report of IPCC.

The COP, the refrigerating capacity, the boiling point and the discharge temperature of such each mixed refrigerant "Power consumption (%) of driving force" represents the electric energy used for traveling an electric car, and is represented by the ratio to the power consumption in the case of HFO-1234yf as the refrigerant. In Table 229, "Heating power consumption (%)" represents the electric energy used for operating heating by an electric car, and is represented by the ratio to the power consumption in the case of HFO-1234yf as the refrigerant. In Table 229, the "Mileage"

represents the relative proportion (%) of the mileage in traveling with heating when the mileage in travelling with no heating in an electric car in which a secondary battery having a certain electric capacitance is mounted is 100% (the consumption power in heating is 0).

The coefficient of performance (COP) was determined according to the following expression.

COP=(Refrigerating capacity or heating capacity)/Power consumption

The flammability of such each mixed refrigerant was determined by defining the mixed composition of such each mixed refrigerant as the WCF concentration, and measuring the flame velocity according to ANSI/ASHRAE Standard 34-2013. The flame velocity was measured as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any flame was recorded by a high-speed digital camera at a frame rate of 600 fps, and stored in a PC.

The heating method included using an electric heater system for heating in the case of any refrigerant having a boiling point of more than −40° C., or using a heat pump system for heating in the case of refrigerant having a boiling point of −40° C. or less.

The power consumption in use of heating was determined by the following expression.

Power consumption in use of heating=Heating capacity/Heating COP

Herein, the heating COP means "heating efficiency".

The heating efficiency means that the heating COP is 1 in the case of an electric heater, and an electrode comparable with a driving force is consumed in heating. In other words, the consumption power in heating is expressed by E=E/(1+COP). On the other hand, the heating COP in the case of a heat pump was determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

Evaporating temperature −30° C.

Condensation temperature 30° C.

Superheating temperature 5 K

Subcooling temperature 5 K

Compressor efficiency 70%

The mileage was determined by the following expression.

Mileage=(Battery capacitance)/(Power consumption of driving force+Heating power consumption)

TABLE 229

| Item | | Unit | Reference Example 5-1 | Comparative Example 5-1 | Comparative Example 5-2 | Example 5-1 | Example 5-2 | Example 5-3 | Example 5-4 | Example 5-5 | Example 5-6 |
|---|---|---|---|---|---|---|---|---|---|---|---|
| Composition proportions | HFO-1132(E) | mass % | 0.0 | 0 | 10.0 | 12.1 | 15.0 | 20.0 | 25.0 | 30.0 | 35.0 |
| | HFO-1234yf | mass % | 0.0 | 100.0 | 90.0 | 87.9 | 85.0 | 80.0 | 75.0 | 70.0 | 65.0 |
| | HFC-134a | mass % | 100.0 | 0.0 | 0.0 | 0.0 | 0.0 | 0.0 | 0.0 | 0.0 | 0.0 |
| GWP (AR4) | | — | 1430 | 4 | 5 | 5 | 5 | 5 | 6 | 6 | 6 |
| COP ratio (relative to that of R1234yf) | | % | 105 | 100 | 100 | 100 | 100 | 100 | 100 | 100 | 100 |
| Refrigerating capacity ratio (relative to that of R1234yf) | | % | 99 | 100 | 123 | 128 | 134 | 145 | 155 | 165 | 175 |
| Power consumption of driving force | | % | 100 | 100 | 100 | 100 | 100 | 100 | 100 | 100 | 100 |
| Heating power consumption | | % | 95 | 100 | 100 | 33 | 33 | 33 | 33 | 33 | 33 |
| Mileage (without heating) | | % | 100 | 100 | 100 | 100 | 100 | 100 | 100 | 100 | 100 |
| Mileage (with heating) | | % | 50 | 50 | 50 | 84 | 84 | 84 | 84 | 84 | 84 |
| Discharge temperature | | ° C. | 66.0 | 48.0 | 54.8 | 56.0 | 57.5 | 59.8 | 61.9 | 63.9 | 65.8 |
| Flame velocity | | cm/s | 0.0 | 1.5 | 1.5 | 1.5 | 1.5 | 1.5 | 1.5 | 1.5 | 2.0 |
| Boiling point | | ° C. | −26.1 | −29.5 | −38.8 | −40.0 | −41.4 | −43.3 | −44.7 | −45.9 | −46.9 |
| Saturation pressure at -40° C. | | kPaG | −50.1 | −39 | −4.4 | 0.9 | 7.5 | 17.2 | 25,3 | 32.3 | 38.4 |
| Heating method | | System | Electric heater | Electric heater | Electric heater | Heat pump | Heat pump | Heat pump | Heat pump | Heat pump | Heat pump |

| Item | | Unit | Example 5-7 | Example 5-8 | Example 5-9 | Example 5-10 | Example 5-11 | Example 5-12 | Example 5-13 | Comparative Example 5-3 |
|---|---|---|---|---|---|---|---|---|---|---|
| Composition proportions | HFO-1132(E) | mass % | 40.0 | 45.0 | 50.0 | 55.0 | 60.0 | 65.0 | 72.0 | 75.0 |
| | HFO-1234yf | mass % | 60.0 | 55.0 | 50.0 | 45.0 | 40.0 | 35.0 | 28.0 | 25.0 |
| | HFC-134a | mass % | 0.0 | 0.0 | 0.0 | 0.0 | 0.0 | 0.0 | 0.0 | 0.0 |
| GWP (AR4) | | — | 6 | 7 | 7 | 7 | 8 | 8 | 8 | 9 |
| COP ratio (relative to that of R1234yf) | | % | 100 | 100 | 100 | 100 | 100 | 100 | 100 | 100 |

TABLE 229-continued

| | | | | | | | | | |
|---|---|---|---|---|---|---|---|---|---|
| Refrigerating capacity ratio (relative to that of R1234yf) | % | 185 | 194 | 203 | 212 | 220 | 229 | 240 | 245 |
| Power consumption of driving force | % | 100 | 100 | 100 | 100 | 100 | 100 | 100 | 100 |
| Heating power consumption | % | 33 | 33 | 33 | 33 | 33 | 33 | 33 | 33 |
| Mileage (without heating) | % | 100 | 100 | 100 | 100 | 100 | 100 | 100 | 100 |
| Mileage (with heating) | % | 84 | 84 | 84 | 84 | 84 | 84 | 84 | 84 |
| Discharge temperature | 0° C. | 67.6 | 69.3 | 70.9 | 72.6 | 74.2 | 75.9 | 78,2 | 79.2 |
| Flame velocity | cm/s | 2.6 | 3.4 | 4.3 | 5.3 | 6.5 | 7.8 | 9.9 | 10.9 |
| Boiling point | 0 | −47.7 | −48.4 | −49.1 | −49.6 | −50.2 | −50.5 | −51.2 | −51.4 |
| Saturation pressure at -40° C. | kPaG | 43.9 | 48.8 | 53.4 | 57.5 | 61.4 | 65.0 | 69.6 | 71.5 |
| Heating method | System | Heat pump | Heat pump | Heat pump | Heat pump | Heat pump | Heat pump | Heat pump | Heat pump |

(1-6-4) Refrigerant 2D

Refrigerant 2D The refrigerant 2D of the present disclosure includes difluoromethane (HFC-32), 2,3,3,3-tetrafluoropropene (HFO-1234yf), and at least one of 1,1-difluoroethylene (HFO-1132a) and tetrafluoroethylene (FO-1114). The refrigerant 2D of the present disclosure, which has such a configuration, simultaneously has three performances of any coefficient of performance (COP) and refrigerating capacity (Cap) equivalent to or more than those of R404A and/or and R410A, and a sufficiently low GWP.

In the present disclosure, the coefficient of performance (COP) equivalent to or more than that of R404A means that the COP ratio relative to that of R404A is 100% or more (preferably 103% or more, more preferably 105% or more), and the refrigerating capacity (Cap) equivalent to or more than that of R404A means that the Cap ratio relative to that of R404A is 80% or more (preferably 90% or more, more preferably 95% or more, most preferably 100% or more).

The coefficient of performance (COP) equivalent to or more than that of R410A means that the COP ratio relative to that of R410A is 90% or more (preferably 93% or more, more preferably 95% or more, most preferably 100% or more), and the refrigerating capacity (Cap) equivalent to or more than that of R410A means that the Cap ratio relative to that of R410A is 80% or more (preferably 95% or more, more preferably 99% or more, most preferably 100% or more).

Furthermore, a sufficiently low GWP means a GWP of 500 or less, preferably 400 or less, more preferably 300 or less, and means a GWP of 200 or less, preferably 170 or less, more preferably 150 or less, further preferably 130 or less in the case of a refrigerant 2D according to a first aspect described below.

The refrigerant 2D of the present disclosure may include HFC-32, HFO-1234yf, and at least one of HFO-1132a and FO-1114, and the composition is not limited as long as the above performances are exhibited, and in particular, is preferably any composition so that the refrigerant has a GWP of 500 or less (in particular, 170 or less in the case of a refrigerant 2D according to a first aspect described below. While at least one of HFO-1132a and FO-1114, namely, any one or both thereof may be included, HFO-1132a is preferably included in the present disclosure.

Specifically, the refrigerant 2D of the present disclosure is preferably according to an aspect where HFC-32, HFO-1234yf and HFO-1132a are included, and is preferably a mixed refrigerant including HFO-1234yf, and 15.0 to 24.0 mass % of HFC-32 and 1.0 to 7.0 mass % of HFO-1132a when the total amount of the three components is 100 mass % (the refrigerant 2D according to the first aspect; there is within the range of a quadrangle represented by X or on line segments of the quadrangle in an enlarged view of FIG. 2A). In particular, a mixed refrigerant is preferable which includes HFO-1234yf, and 19.5 to 23.5 mass % of HFC-32 and 3.1 to 3.7 mass % of HFO-1132a (a preferable refrigerant 2D according to the first aspect; there is within the range of a quadrangle represented by Y or on line segments of the quadrangle in an enlarged view of FIG. 2A). Such a composition range allows the predetermined effects of the present disclosure to be easily exerted. Such a refrigerant 2D according to the first aspect is particularly useful as an alternative refrigerant of R404A.

The refrigerant 2D of the present disclosure (the refrigerant 2D according to the fast aspect) preferably has a condensation temperature glide of 12° C. or less, more preferably 10° C. or less, further preferably 9° C. or less. The compressor outlet pressure is preferably in the range from 1.60 to 2.00 MPa, more preferably in the range from 1.73 to 1.91 MPa. The refrigerant 2D of the present disclosure, when mixed with a known refrigerator oil described below, has the properties of good miscibility with the refrigerator oil.

The composition range of the refrigerant 2D according to the first aspect encompasses that of any refrigerant 2D according to a second aspect.

The refrigerant 2D of the present disclosure (the refrigerant 2D of the second aspect) includes HFC-32, HFO-1234yf and HFO-1132a, and when HFC-32, HFO-1132a and HFO-1234yf in terms of mass % based on their sum in the refrigerant are represented by x, y and z, respectively, coordinates (x,y,z) in a three-component composition diagram in which the sum of HFC-32, HFO-1132a and HFO-1234yf is 100 mass % are within the range of a triangle surrounded by line segments RS, ST and TR that connect three points:

point R (21.80, 3.95, 74.25), point S (21.80, 3.05, 75.15), and point T (20.95, 75.30, 3.75);

or are on the line segments (within the range of a triangle surrounded by line segments RS, ST and TR or are on the line segments in an enlarged view of FIG. 2A).

The refrigerant 2D of the present disclosure (the refrigerant 2D of the second aspect), when satisfies the above requirements, has a coefficient of performance (COP) equivalent to or more than that of R404A and a refrigerating capacity (Cap) of 95% or more, and a GWP of 150 or less and a condensation temperature glide of 9° C. or less.

The refrigerant 2D of the present disclosure encompasses not only such any refrigerant 2D according to the first aspect and the second aspect described above, but also any refrigerant 2D according to the following third aspect to seventh aspect. Such any refrigerant 2D according to the third aspect to the seventh aspect is useful as, in particular, an alternative refrigerant of R410A.

The refrigerant 2D of the present disclosure (the refrigerant 2D of the third aspect) includes HFC-32, HFO-1234yf and HFO-1132a, wherein when HFC-32, HFO-1132a and HFO-1234yf in terms of mass % based on their sum in the refrigerant are represented by x, y and z, respectively, coordinates (x,y,z) in a three-component composition diagram in which the sum of HFC-32, HFO-1132a and HFO-1234yf is 100 mass % are within the range of a figure surrounded by line segments LF, FG, GO, OB and BL that connect five points:

point L (74.0, 19.9, 6.1), point F (49.1, 25.9, 25.0), point G (0.0, 48.6, 51.4), point O (0.0, 0.0, 100), and point B (73.9, 0.0, 26.1);

or are on the line segments (but not on the line segments GO and OB), the line segment LF is represented by coordinate ($y=0.0021x^2-0.4975x+45.264$), the line segment FG is represented by coordinate ($y=0.0031x^2-0.6144x+48.6$), and the line segments GO, OB and BL are straight lines.

The refrigerant 2D of the present disclosure (the refrigerant 2D of the third aspect), when satisfies the above requirements, has any coefficient of performance (COP) and refrigerating capacity (Cap) equivalent to or more than those of R410A, and has a GWP of 500 or less, and a compressor outlet pressure based on that of R410A, of 1.25 times or less. The compressor outlet pressure is preferably 3.4 MPa or less, more preferably 3.0 MPa or less.

The line segment EF (including line segment LF and line segment PF) is obtained by determining an approximate curve from three points of the point E, that in Example 24 and the point F in the Tables herein and FIG. 2B, according to a least-squares method, and the line segment FG is obtained by determining an approximate curve from three points of the point F, that in Example 26 and the point G therein, according to a least-squares method.

The refrigerant 2D of the present disclosure (the refrigerant 2D according to the fourth aspect) includes HFC-32, HFO-1234yf and HFO-1132a, wherein when HFC-32, HFO-1132a and HFO-1234yf in terms of mass % based on their sum in the refrigerant are represented by x, y and z, respectively, coordinates (x,y,z) in a three-component composition diagram in which the sum of HFC-32, HFO-1132a and HFO-1234yf is 100 mass % are within the range of a figure surrounded by line segments PF, FG, GO, OB' and B'P that connect five points:

point P (59.1, 23.2, 17.7), point F (49.1, 25.9, 25.0), point G (0.0, 48.6, 51.4), point O (0.0, 0.0, 100) and point B' (59.0, 0.0, 40.2);

or are on the line segments (but not on the line segments GO and OB'), the line segment PF is represented by coordinate ($y=0.0021x^2-0.4975x+45.264$), the line segment FG is represented by coordinate ($y=0.0031x^2-0.6144x+48.6$), and the line segments GO, OB' and BP are straight lines.

The refrigerant 2D of the present disclosure (the refrigerant 2D according to the fourth aspect), when satisfies the above requirements, has any coefficient of performance (COP) and refrigerating capacity (Cap) equivalent to or more than those of R410A, and has a GWP of 400 or less, and a compressor outlet pressure based on that of R410A, of 1.25 times or less. The compressor outlet pressure is preferably 3.4 MPa or less, more preferably 3.0 MPa or less.

The refrigerant 2D of the present disclosure (the refrigerant 2D according to the fifth aspect) includes HFC-32, HFO-1234yf and HFO-1132a, wherein when HFC-32, HFO-1132a and HFO-1234yf in terms of mass % based on their sum in the refrigerant are represented by x, y and z, respectively, coordinates (x,y,z) in a three-component composition diagram in which the sum of HFC-32, HFO-1132a and HFO-1234yf is 100 mass % are within the range of a figure surrounded by line segments MI, IJ, JB and BM that connect four points:

point M (74.0, 19.5, 6.5), point I (62.9, 15.5, 21.6), point J (33.5, 0.0, 66.5), and point B (73.9, 0.0, 26.1), or are on the line segments (but not on the line segment JB), the line segment MI is represented by coordinate ($y=0.006x^2+1.1837x-35.264$), the line segment IJ is represented by coordinate ($y=0.0083x^2-0.2719x-0.1953$), and the line segments JB and BM are straight lines.

The refrigerant 2D of the present disclosure (the refrigerant 2D according to the fifth aspect), when satisfies the above requirements, has any coefficient of performance (COP) and refrigerating capacity (Cap) equivalent to or more than those of R410A, and has a GWP of 500 or less, and a compressor outlet pressure based on that of R410A, of 1.25 times or less, and the compressor outlet pressure is preferably 3.4 Mpa or less, more preferably 3.0 Mpa or less. The refrigerant has a condensation temperature glide and an evaporating temperature glide each being as low as 5° C. or less, and is particularly suitable as an alternative of R410A.

The line segment HI (including line segment MI) is obtained by determining an approximate curve from three points of the point H, that in Example 21 and the point I in the Tables herein and FIG. 2B, according to a least-squares method, and the line segment IJ is obtained by determining an approximate curve from three points of the point I, that in Example 23 and the point J herein, according to a least-squares method.

The refrigerant 2D of the present disclosure (the refrigerant 2D according to the sixth aspect) includes HFC-32, HFO-1234yf and HFO-1132a, wherein when HFC-32, HFO-1132a and HFO-1234yf in terms of mass % based on their sum in the refrigerant are represented by x, y and z, respectively, coordinates (x,y,z) in a three-component composition diagram in which the sum of HFC-32, HFO-1132a and HFO-1234yf is 100 mass % are within the range of a figure surrounded by line segments QJ, JB' and B'Q that connect three points:

point Q (59.1, 12.7, 28.2), point J (33.5, 0.0, 66.5), and point B' (59.0, 0.0, 40.2);

or are on the line segments (but not on the line segment 7B'), the line segment QJ is represented by coordinate ($y=0.0083x^2-0.2719x-0.1953$), and the line segments JB' and B'Q are straight lines.

The refrigerant 2D of the present disclosure (the refrigerant 2D according to the sixth aspect), when satisfies the above requirements, has any coefficient of performance (COP) and refrigerating capacity (Cap) equivalent to or more than those of R410A, and has a GWP of 400 or less, and a compressor outlet pressure based on that of R410A, of 1.25 times or less, and the compressor outlet pressure is preferably 3.4 Mpa or less, more preferably 3.0 Mpa or less. The refrigerant has an evaporating temperature glide of as low as 5° C. or less, preferably 4° C. or less, more preferably 3.5° C., or less, and is particularly suitable as an alternative of R410A.

The refrigerant 2D of the present disclosure (the refrigerant 2D according to the seventh aspect) includes HFC-32, HFO-1234yf and HFO-1132a, wherein when HFC-32, HFO-1132a and HFO-1234yf in terms of mass % based on their sum in the refrigerant are represented by x, y and z, respectively, coordinates (x,y,z) in a three-component composition diagram in which the sum of HFC-32, HFO-1132a and HFO-1234yf is 100 mass % are within the range of a figure surrounded by line segments QU, UV and VQ that connect three points:

point Q (59.1, 12.7, 28.2), point U (59.0, 5.5, 35.5), and point V (52.5, 8.4, 39.1);

or are on the line segments, the line segment VQ is represented by coordinate ($y=0.0083x^2-0.2719x-0.1953$), and the line segment UV is represented by coordinate ($y=0.0026x^2-0.7385x+39.946$), and the line segment QU is a straight line.

The refrigerant 2D of the present disclosure (the refrigerant 2D according to the seventh aspect), when satisfies the above requirements, has any coefficient of performance (COP) and refrigerating capacity (Cap) equivalent to or more than those of R410A (refrigerating capacity relative to that of R410A of 99% or more), and has a GWP of 400 or less, and a compressor outlet pressure based on that of R410A, of 1.25 times or less, and the compressor outlet pressure is preferably 3.4 Mpa or less, more preferably 3.0 Mpa or less. The refrigerant has an evaporating temperature glide of as low as 5° C. or less, preferably 4° C. or less, more preferably 3.5° C. or less, and is particularly suitable as an alternative of R410A.

The line segment UV is obtained by determining an approximate curve from three points of the point U, that in Example 28 and the point V in the Tables herein and FIG. 2B, according to a least-squares method.

The present disclosure has, for the first time, proposed an alternative refrigerant of conventional refrigerants using HFO-1132a, such as R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507 and R513A, as exemplified in the refrigerant 2D according to the first aspect to the seventh aspect, and the present disclosure encompasses, in the broadest sense, the invention of "a composition including a refrigerant, wherein the refrigerant is used as an alternative refrigerant of R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507 or R513A including 1,1-difluoroethylene (HFO-1132a)". In particular, the invention of "a composition including a refrigerant, wherein the refrigerant is used as an alternative refrigerant of R410A including 1,1-difluoroethylene (HFO-1132a)" is preferably included.

<Mixed Refrigerant Including Still Other Additional Refrigerant>

The refrigerant 2D of the present disclosure may be a mixed refrigerant including not only HFC-32, HFO-1234yf, and at least one of HFO-1132a and FO-1114, but also still other additional refrigerant, as long as the above characteristics and/or effects are not impaired. In such a case, the total amount of HFC-32, HFO-1234yf, and at least one of HFO-1132a and FO-1114 is preferably 99.5 mass % or more and less than 100 mass %, more preferably 99.75 mass % or more and less than 100 mass %, further preferably 99.9 mass % or more and less than 100 mass %, based on the entire refrigerant of the present disclosure. The additional refrigerant is not limited, and can be selected from a wide range of known refrigerants widely used in the art. The additional refrigerant may be included singly or in combinations of two or more kinds thereof in the mixed refrigerant.

Examples of Refrigerant 2D

Hereinafter, the refrigerant 2D will be described with reference to Examples in more detail. It is noted that the present disclosure is not limited to such Examples.

Examples 1 to 16 and Comparative Example 1 (corresponding to any refrigerant 2D according to first aspect and second aspect)

Examples 17 to 87 and Comparative Examples 2 to 18 (corresponding to any refrigerant 2D according to third aspect to seventh aspect)

The GWP of each mixed refrigerant represented in Examples and Comparative Examples, and those of R404A (R125/143a/R134a=44/52/4 weight %) and R410A (R32/R125=50/50 weight %) were evaluated based on the value in the fourth report of IPCC (Intergovernmental Panel on Climate Change).

The COP and the refrigerating capacity of each mixed refrigerant shown in Examples and Comparative Examples, and the COP and the refrigerating capacity of R404A were each determined by using National Institute of Science and Technology (NIST), and Reference Fluid Thermodynamic and Transport Properties Database (Refprop 9.0). Specifically, those in Examples 1 to 16 and Comparative Example 1 (corresponding to the refrigerant 2D according to the first aspect and the second aspect) were determined by performing theoretical refrigeration cycle calculation with respect to such each mixed refrigerant under the following conditions:

Evaporating temperature −40° C.
Condensation temperature 40° C.
Superheating temperature 20 K
Subcooling temperature 0 K
Compressor efficiency 70% and those in Examples 17 to 87 and Comparative Examples 2 to 18 (corresponding to the refrigerant 2D according to the third aspect to the seventh aspect) were determined by performing theoretical refrigeration cycle calculation with respect to such each mixed refrigerant under the following conditions.

Evaporating temperature 5° C.
Condensation temperature 45° C.
Superheating temperature 5 K
Subcooling temperature 5 K
Compressor efficiency 70%

The condensation temperature glide, the evaporating temperature glide and the compressor outlet pressure in the case of use of each mixed refrigerant represented in Examples and Comparative Examples were also determined by using Refprop 9.0.

The GWP, the COP and the refrigerating capacity, calculated based on the results, are shown in Table 30 and Table 231-1 to Table 231-12. The COP ratio and the refrigerating capacity ratio here shown are represented as respective proportions (%) relative to that of R404A in Examples 1 to 16 and Comparative Example 1, and are represented as respective proportions (%) relative to that of R410A in Examples 17 to 87 and Comparative Examples 2 to 18.

The coefficient of performance (COP) was determined according to the following expression.

COP=(Refrigerating capacity or heating capacity)/Power consumption

TABLE 230

| Example/ Comparative Example | Composition proportions (mass %) R32 | R1234yf | HFO-1132a | GWP | Evaluation results: COP ratio (%) (relative to that of R404A) | Refrigerating capacity ratio (%) (relative to that of R404A) | Condensation temperature glide (K) | Compressor outlet pressure (Mpa) |
|---|---|---|---|---|---|---|---|---|
| Comparative Example 1 | R404A | | | 3922 | 100 | 100 | 0.3 | 1.82 |
| Example 1 | 21.8 | 77.1 | 1.1 | 150 | 108 | 91 | 7.5 | 1.64 |
| Example 2 | 21.8 | 72.5 | 5.7 | 150 | 106 | 100 | 9.8 | 1.81 |
| Example 3 | 21.5 | 75.5 | 3 | 148 | 107 | 94 | 8.5 | 1.70 |
| Example 4 | 16.6 | 78.1 | 5.3 | 115 | 106 | 90 | 10.4 | 1.68 |
| Example 5 | 20 | 75 | 5 | 138 | 105 | 95 | 9.8 | 1.75 |
| Example 6 | 20 | 77.5 | 2.5 | 138 | 107 | 91 | 8.5 | 1.65 |
| Example 7 | 20 | 73 | 7 | 138 | 105 | 99 | 10.6 | 1.82 |
| Example 8 | 15 | 80 | 5 | 105 | 106 | 87 | 10.4 | 1.64 |
| Example 9 | 21.5 | 75 | 3.5 | 148 | 107 | 95 | 8.8 | 1.72 |
| Example 10 | 23.5 | 72.8 | 3.7 | 162 | 107 | 99 | 8.6 | 1.77 |
| Example 11 | 23.5 | 73.4 | 3.1 | 162 | 107 | 97 | 8.3 | 1.75 |
| Example 12 | 19.5 | 76.8 | 3.7 | 135 | 107 | 92 | 9.2 | 1.69 |
| Example 13 | 19.5 | 77.4 | 3.1 | 135 | 107 | 91 | 8.9 | 1.67 |
| Example 14 (Point S) | 21.80 | 75.15 | 3.05 | 150 | 107 | 95 | 8.5 | 1.71 |
| Example 15 (Point R) | 21.80 | 74.25 | 3.95 | 150 | 107 | 96 | 9.0 | 1.75 |
| Example 16 (Point T) | 20.95 | 75.30 | 3.75 | 144 | 107 | 95 | 9.0 | 1.72 |

As clear from the results in Table 230, it can be particularly seen that the refrigerant 2D according to the second aspect has a coefficient of performance (COP) equivalent to or more than that of R404A and a refrigerating capacity (Cap) of 95% or more, has a GWP of 150 or less and a condensation temperature glide of 9° C. or less, and is particularly excellent as an alternative refrigerant of R404A.

TABLE 231-1

| Item | Unit | Comparative Example 2 | Comparative Example 3 A | Example 17 L | Example 18 M | Comparative Example 4 B | Comparative Example 5 A' | Example 19 P |
|---|---|---|---|---|---|---|---|---|
| R32 | mass % | R410A | 74.0 | 74.0 | 74.0 | 73.9 | 59.2 | 59.1 |
| R1132a | mass % | | 26.0 | 19.9 | 19.5 | 0.0 | 40.8 | 23.2 |
| R1234yf | mass % | | 0.0 | 6.1 | 6.5 | 26.1 | 0.0 | 17.7 |
| GWP | — | 2088 | 500 | 500 | 500 | 500 | 400 | 400 |
| COP ratio | % (relative to that of R410A) | 100 | 95 | 97 | 97 | 102 | 89 | 95 |
| Refrigerating capacity ratio | % (relative to that of R410A) | 100 | 131 | 124 | 124 | 99 | 139 | 121 |
| Compressor outlet pressure ratio | % (relative to that of R410A) | 100 | 134 | 125 | 124 | 95 | 153 | 125 |
| Condensation glide | ° C. | 0 | 4.6 | 4.6 | 4.5 | 1.0 | 3.9 | 5.5 |
| Evaporation glide | ° C. | 0.1 | 5.6 | 5.1 | 5.0 | 0.8 | 6.1 | 6.1 |

TABLE 231-2

| Item | Unit | Example 20 Q | Comparative Example 6 B' | Comparative Example 7 H | Example 21 | Example 22 I | Example 23 | Comparative Example 8 J |
|---|---|---|---|---|---|---|---|---|
| R32 | mass % | 59.1 | 59.0 | 79.2 | 71.2 | 62.9 | 51.0 | 33.5 |
| R1132a | mass % | 12.7 | 0.0 | 20.8 | 18.6 | 15.5 | 7.5 | 0.0 |
| R1234yf | mass % | 28.2 | 40.2 | 0.0 | 10.0 | 21.6 | 41.5 | 66.5 |
| GWP | — | 400 | 400 | 535 | 481 | 426 | 346 | 229 |
| COP ratio | % (relative to that of R410A) | 99 | 102 | 97 | 97 | 98 | 100 | 102 |
| Refrigerating capacity ratio | % (relative to that of R410A) | 108 | 92 | 127 | 122 | 114 | 97 | 75 |
| Compressor outlet pressure ratio | % (relative to that of R410A) | 109 | 89 | 128 | 122 | 115 | 97 | 75 |
| Condensation glide | ° C. | 5.0 | 2.0 | 4.3 | 4.6 | 5.0 | 5.0 | 5.0 |
| Evaporation glide | ° C. | 4.8 | 1.8 | 5.0 | 5.0 | 5.0 | 4.6 | 4.8 |

TABLE 231-3

| Item | Unit | Comparative Example 9 E | Example 24 | Example 25 F | Example 26 | Comparative Example 10 G | Example 27 U | Example 28 | Example 29 V |
|---|---|---|---|---|---|---|---|---|---|
| R32 | mass % | 81.3 | 65.9 | 49.1 | 29.2 | 0.0 | 59.0 | 55.8 | 52.5 |
| R1132a | mass % | 18.7 | 21.6 | 25.9 | 33.3 | 48.6 | 5.5 | 6.9 | 8.4 |
| R1234yf | mass % | 0.0 | 12.5 | 25.0 | 37.5 | 51.4 | 35.5 | 37.3 | 39.1 |
| GWP | — | 549 | 446 | 333 | 199 | 2 | 400 | 378 | 36 |
| COP ratio | % (relative to that of R410A) | 97 | 96 | 94 | 92 | 90 | 101 | 100 | 100 |
| Refrigerating capacity ratio | % (relative to that of R410A) | 126 | 122 | 118 | 113 | 108 | 99 | 99 | 99 |
| Compressor outlet pressure ratio | % (relative to that of R410A) | 125 | 125 | 125 | 125 | 125 | 98 | 99 | 99 |
| Condensation glide | ° C. | 4.2 | 5.0 | 6.4 | 8.9 | 14.5 | 3.7 | 4.3 | 5.0 |
| Evaporation glide | ° C. | 4.7 | 5.6 | 7.1 | 10.3 | 16.7 | 3.3 | 3.9 | 4.6 |

TABLE 231-4

| Item | Unit | Example 30 | Example 31 | Example 32 | Example 33 | Example 34 | Comparative Example 11 | Example 35 | Example 36 |
|---|---|---|---|---|---|---|---|---|---|
| R32 | mass % | 30.0 | 40.0 | 50.0 | 60.0 | 70.0 | 80.0 | 30.0 | 40.0 |
| R1132a | mass % | 5.0 | 5.0 | 5.0 | 5.0 | 5.0 | 5.0 | 10.0 | 10.0 |
| R1234yf | mass % | 65.0 | 55.0 | 45.0 | 35.0 | 25.0 | 15.0 | 60.0 | 50.0 |
| GWP | — | 205 | 272 | 339 | 406 | 474 | 541 | 205 | 272 |
| COP ratio | % (relative to that of R410A) | 101 | 101 | 101 | 101 | 101 | 101 | 100 | 99 |
| Refrigerating capacity ratio | % (relative to that of R410A) | 79 | 86 | 93 | 99 | 104 | 109 | 86 | 93 |
| Compressor outlet pressure ratio | % (relative to that of R410A) | 80 | 87 | 93 | 97 | 101 | 105 | 88 | 95 |
| Condensation glide | ° C. | 7.6 | 5.9 | 4.5 | 3.5 | 2.8 | 2.2 | 8.9 | 7.0 |
| Evaporation glide | ° C. | 6.8 | 5.4 | 4.1 | 3.1 | 2.4 | 2.0 | 8.1 | 6.5 |

TABLE 231-5

| Item | Unit | Example 37 | Example 38 | Example 39 | Comparative Example 12 | Example 40 | Example 41 | Example 42 | Example 43 |
|---|---|---|---|---|---|---|---|---|---|
| R32 | mass % | 50.0 | 60.0 | 70.0 | 80.0 | 30.0 | 40.0 | 50.0 | 60.0 |
| R1132a | mass % | 10.0 | 10.0 | 10.0 | 10.0 | 15.0 | 15.0 | 15.0 | 15.0 |
| R1234yf | mass % | 40.0 | 30.0 | 20.0 | 10.0 | 55.0 | 45.0 | 35.0 | 25.0 |
| GWP | — | 339 | 406 | 473 | 541 | 205 | 272 | 339 | 406 |
| COP ratio | % (relative to that of R410A) | 99 | 99 | 99 | 100 | 98 | 98 | 98 | 98 |
| Refrigerating capacity ratio | % (relative to that of R410A) | 100 | 105 | 110 | 115 | 92 | 99 | 106 | 112 |
| Compressor outlet pressure ratio | % (relative to that of R410A) | 101 | 105 | 109 | 112 | 96 | 103 | 108 | 113 |
| Condensation glide | ° C. | 5.6 | 4.6 | 3.8 | 3.3 | 9.7 | 7.7 | 6.2 | 5.2 |
| Evaporation glide | ° C. | 5.2 | 4.2 | 3.6 | 3.2 | 9.1 | 7.4 | 6.1 | 5.1 |

TABLE 231-6

| Item | Unit | Example 44 | Comparative Example 13 | Example 45 | Example 46 | Example 47 | Example 48 | Example 49 | Example 50 |
|---|---|---|---|---|---|---|---|---|---|
| R32 | mass % | 70.0 | 80.0 | 30.0 | 40.0 | 50.0 | 60.0 | 70.0 | 30.0 |
| R1132a | mass % | 15.0 | 15.0 | 20.0 | 20.0 | 20.0 | 20.0 | 20.0 | 25.0 |
| R1234yf | mass % | 15.0 | 5.0 | 50.0 | 40.0 | 30.0 | 20.0 | 10.0 | 45.0 |
| GWP | — | 473 | 540 | 205 | 272 | 339 | 406 | 473 | 205 |
| COP ratio | % (relative to that of R410A) | 98 | 98 | 97 | 96 | 96 | 96 | 97 | 95 |
| Refrigerating capacity ratio | % (relative to that of R410A) | 117 | 121 | 98 | 106 | 112 | 118 | 122 | 104 |
| Compressor outlet pressure ratio | % (relative to that of R410A) | 116 | 119 | 104 | 111 | 116 | 120 | 124 | 112 |
| Condensation glide | ° C. | 4.5 | 3.9 | 9.9 | 7.9 | 6.4 | 5.5 | 4.8 | 9.7 |
| Evaporation glide | ° C. | 4.5 | 4.1 | 9.8 | 8.0 | 6.7 | 5.8 | 5.2 | 10.2 |

TABLE 231-7

| Item | Unit | Example 51 | Example 52 | Comparative Example 14 | Comparative Example 15 | Example 53 | Comparative Example 16 | Comparative Example 17 | Comparative Example 18 |
|---|---|---|---|---|---|---|---|---|---|
| R32 | mass % | 40.0 | 50.0 | 60.0 | 70.0 | 30.0 | 40.0 | 50.0 | 60.0 |
| R1132a | mass % | 25.0 | 25. | 25.0 | 25.0 | 30.0 | 30.0 | 30.0 | 30.0 |
| R1234yf | mass % | 35.0 | 25.0 | 15.0 | 5.0 | 40.0 | 30.0 | 20.0 | 10.0 |
| GWP | — | 272 | 339 | 406 | 473 | 204 | 272 | 339 | 406 |
| COP ratio | % (relative to that of R410A) | 95 | 95 | 95 | 95 | 93 | 93 | 93 | 93 |
| Refrigerating capacity ratio | % (relative to that of R410A) | 112 | 118 | 123 | 128 | 110 | 117 | 123 | 129 |
| Compressor outlet pressure ratio | % (relative to that of R410A) | 119 | 124 | 128 | 131 | 120 | 127 | 132 | 136 |
| Condensation glide | ° C. | 7.7 | 6.3 | 5.4 | 4.8 | 9.2 | 7.3 | 6.0 | 5.1 |
| Evaporation glide | ° C. | 8.3 | 7.0 | 6.2 | 5.7 | 10.3 | 8.4 | 7.1 | 6.4 |

TABLE 231-8

| Item | Unit | Example 54 | Example 55 | Example 56 | Example 57 | Example 58 | Example 59 | Example 60 | Example 61 |
|---|---|---|---|---|---|---|---|---|---|
| R32 | mass % | 39.0 | 41.0 | 43.0 | 45.0 | 47.0 | 49.0 | 51.0 | 53.0 |
| R1132a | mass % | 1.0 | 1.0 | 1.0 | 1.0 | 1.0 | 1.0 | 1.0 | 1.0 |
| R1234yf | mass % | 60.0 | 58.0 | 56.0 | 54.0 | 52.0 | 50.0 | 48.0 | 46.0 |
| GWP | — | 266 | 279 | 293 | 306 | 319 | 333 | 346 | 360 |
| COP ratio | % (relative to that of R410A) | 102 | 102 | 102 | 102 | 102 | 102 | 102 | 102 |
| Refrigerating capacity ratio | % (relative to that of R410A) | 80 | 82 | 83 | 85 | 86 | 87 | 88 | 90 |
| Compressor outlet pressure ratio | % (relative to that of R410A) | 80 | 81 | 83 | 84 | 85 | 86 | 87 | 88 |
| Condensation glide | ° C. | 4.6 | 4.3 | 4.1 | 3.8 | 3.6 | 3.3 | 3.1 | 2.9 |
| Evaporation glide | ° C. | 4.4 | 4.1 | 3.9 | 3.6 | 3.3 | 3.1 | 2.9 | 2.7 |

TABLE 231-9

| Item | Unit | Example 62 | Example 63 | Example 64 | Example 65 | Example 66 | Example 67 | Example 68 | Example 69 |
|---|---|---|---|---|---|---|---|---|---|
| R32 | mass % | 55.0 | 57.0 | 59.0 | 45.0 | 47.0 | 49.0 | 51.0 | 53.0 |
| R1132a | mass % | 1.0 | 1.0 | 1.0 | 3.0 | 3.0 | 3.0 | 3.0 | 3.0 |
| R1234yf | mass % | 44.0 | 42.0 | 40.0 | 52.0 | 50.0 | 48.0 | 46.0 | 44.0 |
| GWP | — | 373 | 386 | 400 | 306 | 319 | 333 | 346 | 360 |
| COP ratio | % (relative to that of R410A) | 102 | 102 | 102 | 101 | 101 | 101 | 101 | 101 |
| Refrigerating capacity ratio | % (relative to that of R410A) | 91 | 92 | 93 | 87 | 89 | 90 | 91 | 92 |
| Compressor outlet pressure ratio | % (relative to that of R410A) | 89 | 90 | 91 | 87 | 88 | 89 | 90 | 91 |
| Condensation glide | ° C. | 2.7 | 2.5 | 2.3 | 4.5 | 4.3 | 4.0 | 3.8 | 3.6 |
| Evaporation glide | ° C. | 2.5 | 2.3 | 2.1 | 4.2 | 3.9 | 3.7 | 3.4 | 3.2 |

TABLE 231-10

| Item | Unit | Example 70 | Example 71 | Example 72 | Example 73 | Example 74 | Example 75 | Example 76 | Example 77 |
|---|---|---|---|---|---|---|---|---|---|
| R32 | mass % | 55.0 | 57.0 | 59.0 | 47.0 | 49.0 | 51.0 | 53.0 | 55.0 |
| R1132a | mass % | 3.0 | 3.0 | 3.0 | 5.0 | 5.0 | 5.0 | 5.0 | 5.0 |
| R1234yf | mass % | 42.0 | 40.0 | 38.0 | 48.0 | 46.0 | 44.0 | 42.0 | 40.0 |
| GWP | — | 373 | 386 | 400 | 319 | 333 | 346 | 359 | 373 |
| COP ratio | % (relative to that of R410A) | 101 | 101 | 101 | 101 | 101 | 101 | 101 | 101 |
| Refrigerating capacity ratio | % (relative to that of R410A) | 93 | 95 | 96 | 91 | 92 | 94 | 95 | 96 |
| Compressor outlet pressure ratio | % (relative to that of R410A) | 92 | 93 | 94 | 91 | 92 | 93 | 94 | 95 |
| Condensation glide | ° C. | 3.4 | 3.2 | 3.0 | 4.9 | 4.6 | 4.4 | 4.2 | 3.9 |
| Evaporation glide | ° C. | 3.0 | 2.8 | 2.7 | 4.4 | 4.2 | 4.0 | 3.7 | 3.5 |

TABLE 231-11

| Item | Unit | Example 78 | Example 79 | Example 80 | Example 81 | Example 82 | Example 83 | Example 84 | Example 85 |
|---|---|---|---|---|---|---|---|---|---|
| R32 | mass % | 57.0 | 59.0 | 53.0 | 55.0 | 57.0 | 59.0 | 55.0 | 57.0 |
| R1132a | mass % | 5.0 | 5.0 | 7.0 | 7.0 | 7.0 | 7.0 | 9.0 | 9.0 |
| R1234yf | mass % | 38.0 | 36.0 | 40.0 | 38.0 | 36.0 | 34.0 | 36.0 | 34.0 |
| GWP | — | 386 | 400 | 359 | 373 | 386 | 400 | 373 | 386 |
| COP ratio | % (relative to that of R410A) | 101 | 101 | 100 | 100 | 100 | 100 | 100 | 100 |
| Refrigerating capacity ratio | % (relative to that of R410A) | 97 | 98 | 98 | 99 | 100 | 101 | 101 | 102 |
| Compressor outlet pressure ratio | % (relative to that of R410A) | 96 | 97 | 97 | 98 | 99 | 100 | 101 | 102 |
| Condensation glide | ° C. | 3.8 | 3.6 | 4.7 | 4.4 | 4.2 | 4.1 | 4.9 | 4.7 |
| Evaporation glide | ° C. | 3.4 | 3.2 | 4.2 | 4.0 | 3.8 | 3.7 | 4.5 | 4.3 |

TABLE 231-12

| Item | Unit | Example 86 | Example 87 |
|---|---|---|---|
| R32 | mass % | 59.0 | 59.0 |
| R1132a | mass % | 9.0 | 11.0 |
| R1234yf | mass % | 32.0 | 30.0 |
| GWP | — | 400 | 400 |
| COP ratio | % (relative to that of R410A) | 100 | 99 |
| Refrigerating capacity ratio | % (relative to that of R410A) | 104 | 106 |
| Compressor outlet pressure ratio | % (relative to that of R410A) | 103 | 106 |
| Condensation glide | ° C. | 4.5 | 4.8 |
| Evaporation glide | ° C. | 4.1 | 4.5 |

As clear from the results in Table 231-1 to Table 231-12, it can be seen that the refrigerant 2D of the third aspect, when satisfies predetermined requirements, has any coefficient of performance (COP) and refrigerating capacity (Cap) equivalent to or more than those of R410A, and has a GWP of 500 or less, and a compressor outlet pressure based on that of R410A, of 1.25 times or less. It can be seen that the refrigerant 2D according to the fourth aspect, when satisfies predetermined requirements, has any coefficient of performance (COP) and refrigerating capacity (Cap) equivalent to or more than those of R410A, and has a GWP of 400 or less, and a compressor outlet pressure based on that of R410A, of 1.25 times or less. It can be seen that the refrigerant 2D according to the fifth aspect, when satisfies predetermined requirements, has any coefficient of performance (COP) and refrigerating capacity (Cap) equivalent to or more than those of R410A, and has a GWP of 500 or less, and a compressor outlet pressure based on that of R410A, of 1.25 times or less, and also has a condensation temperature glide and an evaporating temperature glide each being as low as 5° C. or less. It can also be seen that the refrigerant 2D according to the sixth aspect, when satisfies predetermined requirements, has any coefficient of performance (COP) and refrigerating capacity (Cap) equivalent to or more than those of R410A, and has a GWP of 400 or less, and a compressor outlet pressure based on that of R410A, of 1.25 times or less, and also has an evaporating temperature glide being as low as of 5° C. or less. It can also be seen that the refrigerant 2D according to the seventh aspect, when satisfies predetermined requirements, has any coefficient of performance (COP) and refrigerating capacity (Cap) equivalent to or more than those of R410A (99% or more relative to that of R410A), and has a GWP of 400 or less, and a compressor outlet pressure based on that of R410A, of 1.25 times or less, and also has an evaporating temperature glide being as low as 5° C. or less. The refrigerants D according to the third aspect to the seventh aspect are each suitable as an alternative refrigerant of R410A, and in particular, the refrigerant 2D according to the fifth aspect or the sixth aspect, which is low in condensation temperature glide and/or evaporating temperature glide, is particularly suitable as an alternative refrigerant of R410A. Furthermore, the refrigerant 2D according to the seventh aspect, which is low in condensation temperature glide and/or evaporating temperature glide and which has any coefficient of performance (COP) and refrigerating capacity (Cap) equivalent to or more than those of R410A (99% or more relative to that of R410A), is further excellent as an alternative refrigerant of R410A.

(1-6-5) Refrigerant 2E

The refrigerant 2E of the present disclosure is a mixed refrigerant including R32, $CO_2$, R125, R134a and R1234yf.

The refrigerant 2E of the present disclosure has various characteristics usually demanded for an alternative refrigerant of R410A, of (1) a GWP of 750 or less, (2) WCF non-flammability or ASHRAE non-flammability, and (3) a COP and refrigerating capacity equivalent to those of R410A.

The refrigerant 2E of the present disclosure has not only the above, but also a temperature glide, and thus is used in a refrigerator having a heat exchanger with the flow of a refrigerant being opposite to the flow of an external heat medium, to thereby exert the effect of improving the energy efficiency and/or refrigerating capacity.

The refrigerant 2E of the present disclosure, when satisfies the following requirements 1-1-1 to 1-3-2, is preferable because of having a GWP of 750 or less and WCF non-flammability. Hereinafter, the mass % of R32 is defined as a, the mass % of $CO_2$ is defined as b, the mass % of R125 is defined as $c_1$, the mass % of R134a is defined as $c_2$, the mass % of the total of R125 and R134a is defined as c and the mass % of R1234yf is defined as x, and $c_1/(c_1+c_2)$ is defined as r based on the sum of R32, $CO_2$, R125, R134a and R1234yf.

Coordinates (a,b,c) in a three-component composition diagram with, as respective apexes, a point where R32 occupies (100−x) mass %, a point where $CO_2$ occupies (100−x) mass % and a point where the total of R125 and R134a occupies (100−x) mass % are:

Requirement 1-1-1)

with 43.8≥x≥41 and 0.5≥r≥0.25, within the range of a quadrangle surrounded by line segments that connect:

point A (−0.6902x+43.307, 100−a−x, 0.0), point $O_{r=0.25\ to\ 0.5}$((−2.2857x+87.314)$r^2$+(1.7143x−55.886)r+(−0.9643x+55.336), (2.2857x−112.91)$r^2$+(−1.7143 x+104.69)r+(−0.25x+11.05), 100−a−b−x), point $D_{r=0.25\ to\ 0.5}$ (0.0, 28.8$r^2$+54.0r+(−x+49.9), 100−b−x) and point Q (0.0, 100−x, 0.0)

or on the line segments (provided that any point on line segments $D_{r=0.25\ to\ 0.5}$Q and QA is excluded), or 1-1-2)

with 43.8≥x≥41 and 1.0≥r≥0.5, within the range of a quadrangle surrounded by line segments that connect:

point A (−0.6902x+43.307, 100−a−c, 0.0), point $O_{r=0.5\ to\ 1.0}$((−0.2857x+8.5143)$r^2$+(0.5x−10.9)+(−0.8571x+52.543), (−0.2857x+4.5143)$r^2$+(0.5x+0.9)r+(−0.7143x+33.586), 100−a−b−x), point $D_{r=0.5\ to\ 1.0}$ (0.0, (−0.5714x+12.229)$r^2$+(0.8571x−0.3429)r+(−1.2857x+66.814), 100−b−x) and point Q (0.0, 100−x, 0.0)

or on the line segments (provided that any point on line segments $D_{r=0.5\ to\ 1.0}$Q and QA is excluded), or 1-2-1)

with 46.5≥x≥43.8 and 0.5≥r≥0.25, within the range of a quadrangle surrounded by line segments that connect:

point A (−0.6902x+43.307, 100−a−x, 0.0), point $O_{r=0.25\ to\ 0.5}$ ((1.1852x−64.711)$r^2$+(−0.7407x+51.644)r+(=0.5556x+37.433), (−2.3704x+91.022)$r^2$+(2.0741 x−61.244)r+(−0.963x+42.278), 100−a−b−x), point to $D_{r=0.25\ to\ 0.5}$ (0.0, 28.8$r^2$+54.0r+(−x+49.9), 100−b−x) and point Q (0.0, 100−x, 0.0)

or on the line segments (provided that any point on line segments $D_{r=0.25\ to\ 0.5}$Q and QA is excluded), or Requirement 1-2-2)

with 46.5≥x≥43 and 1.0≥r≥0.5, within the range of a quadrangle surrounded by line segments that connect:

point A (−0.6902x+43.307, 100−a−x, 0.0), point $O_{r=0.5\ to\ 1.0}$ ((0.2963x−16.978)r2+(−0.3704x+27.222)r+(−0.5185x+37.711), −8.0r2+22.8r+(−0.5185x+25.011), 100−a−b−x), point $D_{r=0.5\ to\ 1.0}$ (0.0, 12.8$r^2$+37.2r+(−x+54.3), 100−b−x) and point Q (0.0, 100−x, 0.0)

or on the line segments (provided that any point on line segments $D_{r=0.5\ to\ 1.0}$Q and QA is excluded), or Requirement 1-3.1)

with 50≥x≥46.5 and 0.5≥r≥0.25, within the range of a quadrangle surrounded by line segments that connect:

point A (−0.6902x+43.307, 100−a−x, 0.0), point $O_{r=0.25\ to\ 0.5}$ (−9.6$r^2$+17.21+(−0.6571x+42.157); 19.2$r^2$+(0.2286x+24.571)r+(−0.6286x+26.729), 100−a−b−x), point $D_{r=0.25\ to\ 0.5}$(0.0, (0.9143x−71.314)$r^2$+(−0.5714x+80.571)+(−0.9143x+45.914), 100−b−x) and point Q (0.0, 100−x, 0.0)

or on the line segments (provided that any point on line segments $D_{r=0.25\ to\ 0.5}$Q and QA is excluded), or 1-3-2)

with 50≥x≥46.5 and 1.0≥r≥0.5, within the range of a quadrangle surrounded by line segments that connect:

point A (−0.6902x+43.307, 100−a−x, 0.0), point $O_{r=0.5\ to\ 1.0}$ ((−0.2286x+7.4286)$r^2$+(0.4x−8.6)r+(−0.8x+50.8), (0.2286x−18.629)$r^2$+(−0.2857x+36.086)r+(−0.4286x+20.829), 100−a−b−x), point $D_{r=0.5\ to\ 1.0}$(0.0, (0.2286x−23.429)$x^2$+(−0.4x+55.8)r+(−0.8286x+46.329), 100−b−x) and point Q (0.0, 100−x, 0.0)

or on the line segments (provided that any point on line segments $D_{r=0.5\ to\ 1.0}$Q and QA is excluded).

The refrigerant 2E of the present disclosure, when satisfies the following requirements 2-1-1 to 2-3-2, is preferable because of having a GWP of 750 or less and ASHRAE non-flammability.

The above coordinates are

Requirement 2-1-1)

with 43.8≥x≥41 and 0.5≥r≥0.25, within the range of a triangle surrounded by line segments that connect:

point $F_{r=0.25\ to\ 0.5}$ (0.0, (−1.1429x+37.257)$r^2$+(1.2857x−38.714)r-(−1.7143x+106.89), 100−b−x), point $P_{r=0.25\ to\ 0.5}$ ((−1.1429x+34.057)$r^2$+(1.0x−21.0)r+(−0.4643x+27.636), (2.2857x−119.31)$r^2$+(−2.0x+122.0)x+(−0.3929x+19.907), 100−a−b−x) and point $D_{r=0.25\ to\ 0.5}$ (0.0, 28.8$x^2$+54.0r+(−x+49.9), 100−b−x)

or on the line segments (provided that any point on line segment $D_{r=0.25\ to\ 0.5}F_{r=0.25\ to\ 0.5}$ is excluded), or 2-1-2) with 43.8≥x≥41 and 1.0≥r≥0.5, within the range of a triangle surrounded by line segments that connect:

point $F_{r=0.5\ to\ 1.0}$ (0.0, (3.7143x−159.49)$r^2$+(−5.0714x+222.53)r+(0.25x+25.45), 100−b−x), point $P_{r=0.5\ to\ 1.0}$((3.4286x−138.17)$r^2$+(−5.4286x+203.57)+(1.6071 x−41.593), (−2.8571x+106.74)$r^2$+(4.5714x−143.63)r+(−2.3929x+96.027), 100−a−b−x) and point $D_{r=0.5\ to\ 1.0}$(0.0, (−0.5714x+12.229)$r^2$+(0.8571x−0.3429)r+(−1.2857x+66.814), 100−b−x)

or on the line segments (provided that any point on line segment $D_{r=0.5\ to\ 1.0}F_{r=0.5\ to\ 1.0}$ is excluded), or 2-2-1) with 46.5≥x≥43 and 0.5≥r≥0.25, within the range of a triangle surrounded by line segments that connect:

point $F_{r=0.25\ to\ 0.5}$ (0.0, (9.4815x−428.09)$r^2$+(−7.1111 x+329.07)r+(−0.2593x+43.156), 100−b−x), point $P_{r=0.25\ to\ 0.5}$ ((−8.2963x+347.38)$r^2$+(4.8889x−191.33)r+(−0.963x+49.478), (7.1111x−330.67)$r^2$+(−4.1481x+216.09)r+(−0.2593x+14.056), 100−a−b−x) and point $D_{r=0.25\ to\ 0.5}$ (0.0, −28.8$r^2$+54.0r+(−x+49.9), 100−b−x)

or on the line segments (provided that any point on line segment $D_{r=0.25\ to\ 0.5}F_{r=0.25\ to\ 0.5}$ is excluded), or 2-2-2) with 46.5≥x≥43 and 1.0≥r≥0.5, within the range of a triangle surrounded by line segments that connect:

point $F_{r=0.25\ to\ 0.37}$(0.0, (−4.7407x+210.84)$r^2$+(6.963x−304.58)r+(−3.7407x+200.24), 100−b−x), point $P_{r=0.25\ to\ 0.37}$ ((0.2963x−0.9778)$r^2$+(0.2222x−43.933)r+(0.7778x+62.867), (0.2963x−5.4222)$r^2$+(−0.0741x+59.844)r+(−0.4444x+10.867), 100−a−b−x) and point $D_{r=0.5\ to\ 1.0}$(0.0; −12.8$r^2$+37.2r+(−x+54.3), 100−b−x)

or on the line segments (provided that any point on line segment $D_{r=0.5\ to\ 1.0}F_{r=0.5\ to\ 1.0}$ is excluded), or 2-3-1) with 50≥x≥46.5 and 0.37≥r≥0.25, within the range of a triangle surrounded by line segments that connect:

point $F_{r=0.25\ to\ 0.37}$(0.0, (−35.714x+1744.0)$r^2$+(23.333x−1128.3)r+(−5.144x+276.32), 100−b−x), point $P_{r=0.25\ to\ 0.37}$((11.905x−595.24)r2+(−7.6189x+392.61)r+(0.9322x−39.027), (−27.778x+1305.6)$r^2$+(17.46x−796.35)r+(−3.5147x+166.48), 100−a−b−x) and point $D_{r=0.25\ to\ 0.37}$(0.0, (0.9143x−71.314)$r^2$+(−0.5714x+80.571)+(−0.9143x+45.914), 100−b−x)

or on the line segments (provided that any point on line segment $D_{r=0.25\ to\ 0.37}F_{r=0.25\ to\ 0.37}$ is excluded), or 2-3-2) with 50≥x≥46.5 and 1.0≥r≥0.5, within the range of a triangle surrounded by line segments that connect:

point $F_{r=0.5\ to\ 1.0}$(0.0, (2.2857x−115.89)$r^2$+(−3.0857x+162.69)r+(−0.3714x+43.571), 100−b−x), point $P_{r=0.5\ to\ 1.0}$((−3.2x+161.6)$r^2$+(4.4571x−240.86)r+(−2.0857x+123.69), (2.5143x−136.11)$r^2$+(−3.3714x+213.17)r+(0.5429x−35.043), 100−a−b−x) and point $D_{r=0.5\ to\ 1.0}$(0.0, (0.2286x−23.429)$r^2$+(−0.4x+55.8)x+(−0.8286x+46.329), 100−b−x)

or on the line segments (provided that any point on line segment. $D_{r=0.5\ to\ 1.0}F_{r=0.5\ to\ 1.0}$ is excluded).

The refrigerant 2E of the present disclosure may include not only R32, $CO_2$, R125, R134a and R1234yf, but also still other additional refrigerant and/or unavoidable impurities, as long as the above characteristics and/or effects are not impaired. The refrigerant 2E of the present disclosure here preferably includes 99.5 mass % or more in total of R32, $CO_2$, R125, R134a and R1234yf based on the entire refrigerant 2E. The total content of such additional refrigerant and unavoidable impurities is here 0.5 mass % or less based on the entire refrigerant 2E. The refrigerant 2E more preferably includes 99.75 mass % or more, further preferably 99.9 mass % or more in total of R32, $CO_2$, R125, R134a and R1234yf based on the entire refrigerant 2E.

The additional refrigerant is not limited, and can be widely selected. The additional refrigerant may be included singly or in combinations of two or more kinds thereof in the mixed refrigerant.

Examples of Refrigerant 2E

Hereinafter, the refrigerant 2E will be described with reference to Examples in more detail. It is noted that the present disclosure is not limited to such Examples.

1. Calculation of WCF non-flammability limit and ASHRAE non-flammability limit (WCF & WCFF non-flammability)

The composition of a mixed refrigerant consisting only of R32, $CO_2$, R125, R134a and R1234yf is represented by as follows. That is, in a case where the mass % of R32 is defined as a, the mass % of $CO_2$ is defined as b, the mass % of R125 is defined as $c_1$, the mass % of R134a is defined as $c_2$, the mass % of the total of R125 and R134a is defined as c and the mass % of R1234yf is defined as x, and $c_1/(c_1+c_2)$ is defined as r based on the sum of R32, $CO_2$, R125, R134a and R1234yf in the refrigerant, the composition of the mixed refrigerant is specified by coordinates (a,b,c) in a three-component composition diagram with, as respective apexes, a point where R32 occupies (100−x) mass %, a point where $CO_2$ occupies (100−x) mass % and a point where the total of R125 and R134a occupies (100−x) mass %.

Hereinafter, the method for specifying the WCF non-flammability limit and the ASHRAE non-flammability limit in the case of x=41 mass % and r=0.25 will be described.

It is necessary for specifying the non-flammability limit in the three-component composition diagram to first determine the non-flammability limit of a binary mixed refrigerant of a flammable refrigerant (R32, 1234yf) and a non-flammable refrigerant ($CO_2$, R134a, R125). Hereinafter, the method for determining the non-flammability limit of the binary mixed refrigerant is shown.

[1] Non-Flammability Limit of Binary Mixed Refrigerant of Flammable Refrigerant (R32, 1234yf) and Non-Flammable Refrigerant ($CO_2$, R134a, R125)

The non-flammability limit of the binary mixed refrigerant was determined with a measurement apparatus (FIG. 2E) and a measurement method for the flammability test based on ASTM E681-2009.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom. The test conditions were as follows.

<Test Conditions>

Test container: spherical container of 280 mm in diameter (internal volume: 12 L)

Test temperature: 60° C.±3° C.

Pressure: 101.3 kPa±0.7 kPa

Water content: 0.0088 g+0.0005 g per gram of dry air

Mixing ratio of binary refrigerant composition/air: ±0.2 vol. % by 1 vol. %

Mixing of binary refrigerant composition: ±0.1 mass %

Ignition method: AC discharge, voltage 15 kV, current 30 mA, neon transformer

Electrode interval: 6.4 mm (¼ inch)

Spark: 0.4 seconds±0.05 seconds

Criteria for determination:

A case where any flame was spread at more than 90 degrees around the ignition point: flammability (propagation)

A case where any flame was spread at 90 degrees or less around the ignition point: no flame propagation (non-flammability)

Each combination of a flammable refrigerant and a non-flammable refrigerant 2 Described in Table 232 was subjected to the test. The non-flammable refrigerant was added to the flammable refrigerant in stages, and the flammability test was performed at each stage.

Consequently, no flame propagation was observed in a mixed refrigerant of a flammable refrigerant R32 and a non-flammable refrigerant R134a after the mass % of R32 reached 43.0 and the mass % of R134a reached 57.0, and such a composition here was defined as the non-flammability limit. Moreover, no flame propagation was observed: in a mixed refrigerant of a flammable refrigerant R32 and a non-flammable refrigerant R125 after the mass % of R32 reached 63.0 mass % and the mass % of R125 reached 37.0; in a mixed refrigerant of a flammable refrigerant R32 and a non-flammable refrigerant $CO_2$ after the mass % of R32 reached 43.5 and the mass % of $CO_2$ reached 56.5; in a mixed refrigerant of a flammable refrigerant 1234yf and a non-flammable refrigerant R134a after the mass % of 1234yf reached 62.0 and the mass % of R134a reached 38.0; in a mixed refrigerant of a flammable refrigerant 1234yf and a non-flammable refrigerant R125 after the mass % of 1234yf reached 79.0 and the mass % of R125 reached 21.0; and in a mixed refrigerant of a flammable refrigerant 1234yf and non-flammable refrigerant $CO_2$ after the mass % of 1234yf reached 63.0 and the mass % of $CO_2$ reached 37.0; and such each composition here was defined as the non-flammability limit. The results were summarized in Table 232.

TABLE 232

| Item | Flammable refrigerant | Non-flammable refrigerant |
|---|---|---|
| Binary mixed refrigerant combination | R32 | R134a |
| Non-flammability limit (weight %) | 43.0 | 57.0 |
| Binary mixed refrigerant combination | R32 | R125 |
| Non-flammability limit (weight %) | 63.0 | 37.0 |
| Binary mixed refrigerant combination | R32 | CO2 |
| Non-flammability limit (weight %) | 43.5 | 56.5 |
| Binary mixed refrigerant combination | 1234yf | R134a |
| Non-flammability limit (weight %) | 62.0 | 38.0 |
| Binary mixed refrigerant combination | 1234yf | R125 |
| Non-flammability limit (weight %) | 79.0 | 21.0 |

TABLE 232-continued

| Item | Flammable refrigerant | Non-flammable refrigerant |
|---|---|---|
| Binary mixed refrigerant combination | 1234yf | CO2 |
| Non-flammability limit (weight %) | 63.0 | 37.0 |

Next, the non-flammability limit in the case of x==41 mass % and r=0.25 was determined as follows, based on the non-flammability limit of the binary mixed refrigerant 2 Determined in [1].

1) Point A (a,b,0) in case of x=41 mass %, x=0.25 and c=0 mass %

In the case of a+b=59 mass %, whether or not the mixed composition was non-flammability limit composition was examined by the following procedure.

(1) Flammable refrigerant concentration in terms of R32=R32 concentration+R1234yf concentration×((21/79)×(63/37)+(38/62)×(43/57))/2

(2) Non-flammable refrigerant concentration in terms of R32 R125 concentration×(63/37)+R134a concentration×(43/57)+$CO_2$ concentration×(43.5/56.5)

The value where the value obtained by subtracting the flammable refrigerant composition in terms of R32 from the non-flammable refrigerant composition in terms of R32 exhibited the minimum value as a positive value was defined as the calculated non-flammability limit composition. The calculation results were shown in Table 233, and the point A (15.0, 44.0, 0) corresponded to the calculated non-flammability limit composition.

TABLE 233

| Composition example | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Flammability limit | 15.10 | 0.00 | 41.00 | 0.00 | 43.90 | 33.86 | 33.80 | −0.06 |
| Non-flammability limit | 15.00 | 0.00 | 41.00 | 0.00 | 44.00 | 33.76 | 33.88 | 0.12 |

2) Point (a,30,c) in case of x=41 mass %, r=0.25 and b=30 mass %

In the case of a+c=29 mass %, the non-flammability limit composition was determined under those conditions by the same procedure as described above. The results are shown in Table 234.

TABLE 234

| Composition example | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Flammability limit | 16.70 | 3.10 | 41.00 | 9.20 | 30.00 | 35.46 | 35.32 | −0.14 |
| Non-flammability limit | 16.60 | 3.10 | 41.00 | 9.30 | 30.00 | 35.36 | 35.39 | 0.03 |

3) Point (a,15,c) in case of x=41 mass %, r=0.25 and b=15 mass %

In the case of a+c=44 mass %, the non-flammability limit composition was determined under those conditions by the same procedure as described above. The results are shown in Table 235.

TABLE 235

| Composition example | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Flammability limit | 18.30 | 6.40 | 41.00 | 19.30 | 15.00 | 37.06 | 37.01 | −0.05 |
| Non-flammability limit | 18.20 | 6.50 | 41.00 | 19.30 | 15.00 | 36.96 | 37.18 | 0.22 |

4) Point $B_{r=0.25}$ (a,0,c) in case of x=41 mass %, r=0.25 and b=0 mass %

In the case of a+c=59 mass %, the non-flammability limit composition was determined under those conditions by the same procedure as described above. The results are shown in Table 236.

TABLE 236

| Composition example | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Flammability limit | 20.00 | 9.80 | 41.00 | 29.20 | 0.00 | 38.76 | 38.71 | −0.04 |
| Non-flammability limit | 19.90 | 9.80 | 41.00 | 29.30 | 0.00 | 38.66 | 38.79 | 0.13 |

The results obtained by examining the above calculated non-flammability limit composition are illustrated in a three-component composition diagram of FIG. 2O. Such points are connected to thereby form $AB_{r=0.25}$ in FIG. 2O.

[2] Verification according to flammability test, of WCF non-flammability limit point determined from non-flammability limit of binary mixed refrigerant obtained in [1]

The flammability test according to ASTM E681 represented in [1] was performed on the composition shown in Table 233:

Flammability limit composition-1-1) ($R32/CO_2/R125/R134a$)=(15.1/43.9/0.0/0.0), Non-flammability limit composition-1-2) ($R32/CO_2/R125/R134a$)=(15.0/44.0/0.0/0.0); and the composition shown in Table 235:

Flammability limit composition-2-1) ($R32/CO_2/R125/R134a$)=(18.3/15.0/6.4/19.3), Non-flammability limit composition-2-2) ($R32/CO_2/R125/R134a$)=(18.2/15.0/6.5/19.3);

and thus flame propagation was observed in the case of the composition-1-1) and the composition-2-1) and no flame propagation was observed in the case of the composition 1-1-2) and the composition-2-2). Accordingly, it can be said that the non-flammability limit of the mixed refrigerant 2 Determined from the non-flammability limit of the binary mixed refrigerant, represents an actual non-flammability limit The non-flammability limit composition of the mixed refrigerant 2 Determined from the non-flammability limit of the binary mixed refrigerant, is defined as the WCF non-flammability limit point. The WCF non-flammability limit point is on the line segment $AB_{r=0.25}$ as illustrated in FIG. 2O, and thus the line segment $AB_{r=0.25}$, determined from two points of the point A and the point $B_{r=0.25}$, is defined as the WCF non-flammable border line.

On the other hand, the ASHRAE non-flammability (WCF non-flammability and WCFF non-flammability) means non-flammability at the most flammable composition (WCFF) under the worst conditions in a case where the leak test in storage/transport, the leak test from an apparatus, and the leak/repacking test are performed with reference to the most flammable composition (WCF) and the WCF composition of the mixed refrigerant. Hereinafter, the WCFF concentration was determined by performing leak simulation under various conditions with KIST Standard Reference Data Base Refleak Version 4.0 (hereinafter, sometimes designated as "Refleak"). Whether or not the WCFF composition determined corresponded to the non flammability limit was confirmed by the method for determining the non-flammability limit of the mixed refrigerant from the non-flammability limit of the binary mixed refrigerant, represented as the WCF non-flammability limit.

The method for determining the ASHRAE non-flammability limit in the case of x=41 mass % and r=0.25 is described below.

5) Point 1325(0.0,b,c(c1+c2)) in case of x=41 mass %, r=0.25 and a=0 mass %

The leak test in storage/transport, the leak test from an apparatus, and the leak/repacking test were performed at Refleak, and thus the leak conditions in storage/transport were most flammable conditions and the conditions of leak at −40° C. were most flammable conditions. Accordingly, the ASHRAE non-flammability limit was determined according to the following procedure, by performing the leak test at −40° C. in storage/transport with leak simulation at Refleak. Table 237 shows each typical value serving as the flammability/non-flammability limit in leak simulation. In a case where the initial composition corresponded to (0.0, 39.5, 19.5(4.9+14.6)), atmospheric pressure was achieved in a release of 52% at −40° C. under transport and storage conditions, the liquid side concentration here was indicated by (0.0, 2.5, 30.5(6.1+24.4)) at x=67.0 mass %, and the non-flammability determination described above was made as the limit leading to non-flammability in a condition of atmospheric pressure. On the other hand, in a case where the initial composition corresponded to (0.0, 39.6, 19.4(4.9+14.5)), atmospheric pressure was achieved in a release of 52% at −40° C., the liquid side concentration here was indicated by (0.0, 2.6, 30.3(6.1+24.2)) at x=67.1%, and the non-flammability determination described above was made as flammability. Accordingly, in a case where an initial composition of (0.0, 39.5, 19.5(4.9+14.6)) was defined as the WCF composition, both the WCF composition and the WCFF composition were rated as non-flammability in terms of calculation, and thus a value of (0.0, 39.5, 19.5(4.9+14.6)) corresponded to the ASHRAE non-flammability limit composition.

TABLE 237

| Leak simulation in storage/ transport | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Initial composition (1) (=WCF) | 0.0 | 4.9 | 41.0 | 14.6 | 39.5 | 18.76 | 49.77 | 31.01 |
| Liquid side composition in release of 52% at −40° C. (atmospheric pressure achieved) (=WCFF) | 0.0 | 6.1 | 67.0 | 24.4 | 2.5 | 30.65 | 30.72 | 0.07 |
| Liquid side composition in release of 54% at −40° C. (atmospheric pressure or less) | 0.0 | 6.0 | 67.8 | 24.7 | 1.6 | 31.02 | 30.08 | −0.94 |
| Initial composition (2) | 0.0 | 4.9 | 41.0 | 14.5 | 39.6 | 18.76 | 49.77 | 31.01 |
| Liquid side composition in release of 52% at −40° C. (atmospheric pressure achieved) | 0.0 | 6.1 | 67.1 | 24.2 | 2.6 | 30.70 | 30.64 | −0.05 |
| Liquid side composition in release of 54% at −40° C. (atmospheric pressure or less) | 0.0 | 6.0 | 67.8 | 24.5 | 1.7 | 31.02 | 30.01 | −1.01 |

6) Point $P_{r=0.25}$(a, b, c(c1+c2)) in case of x=41 mass %, r=0.25, and GWP=750 at a mass %

A point where GWP=750 was achieved in a three-component composition diagram indicated by a+b+c=100−x=59 mass %, under conditions of X=41.0 mass % and r=0.25, was on the straight line $C_{r=0.25}D_{r=0.25}$ for connecting the point $C_{r=0.25}$ (31.6, 0.0, 27.4(6.9+20.5)) and the point $D_{r=0.25}$(0.0, 20.6, 38.4(9.6+28.8)), as illustrated in FIG. 2O, and the straight line was represented by c1=−0.085a+9.6. $P_{r=0.25}$(a, −0.085c1+9.6,c) where the ASHRAE non-flammability limit was achieved at a GWP of 750, was used for the initial composition and simulation was made at under storage/transport conditions at Refleak, and thus the ASHRAE non-flammability limit composition was determined as in Table 238.

TABLE 238

| Leak simulation in storage/ transport | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Initial composition (1) (=WCF) | 12.8 | 8.5 | 41.0 | 25.5 | 12.2 | 31.56 | 43.10 | 11.55 |
| Gas side composition in release of 38% at −40° C. (atmospheric pressure achieved) (=WCFF) | 21.8 | 12.4 | 40.1 | 20.6 | 5.1 | 40.15 | 40.58 | 0.44 |
| Gas side composition in release of 40% at −40° C. (atmospheric pressure or less) | 21.3 | 12.4 | 41.1 | 21.4 | 3.8 | 40.10 | 40.18 | 0.08 |
| Initial composition (2) | 12.9 | 8.5 | 41.0 | 25.5 | 12.1 | 31.66 | 43.03 | 11.37 |
| Gas side composition in release of 38% at −40° C. (atmospheric pressure achieved) | 21.4 | 12.4 | 41.1 | 21.3 | 3.8 | 40.20 | 40.11 | −0.10 |
| Gas side composition in release of 40% at −40° C. (atmospheric pressure or less) | 20.8 | 12.4 | 42.0 | 22.1 | 2.8 | 40.01 | 39.94 | −0.07 |

7) Point (a, b, c(c1+c2)) in case of x=41 mass %, %0.25, and a=10.0 mass %

The results obtained by examining in the same manner as described above are shown in Table

TABLE 239

| Leak simulation in storage/ transport | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Initial composition (1) (=WCF) | 10.0 | 7.0 | 41.0 | 20.8 | 21.2 | 28.76 | 43.93 | 15.18 |

TABLE 239-continued

| Leak simulation in storage/ transport | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Gas side composition in release of 46% at −40° C. (atmospheric pressure achieved) (=WCFF) | 18.3 | 11.2 | 44.6 | 19.5 | 6.4 | 38.70 | 38.71 | 0.004 |
| Gas side composition in release of 48% at −40° C. (atmospheric pressure or less) | 17.7 | 11.3 | 46.1 | 20.4 | 4.6 | 38.79 | 38.17 | −0.62 |
| Initial composition (2) | 10.0 | 6.9 | 41.0 | 20.8 | 21.3 | 28.76 | 43.84 | 15.08 |
| Gas side composition in release of 46% at −40° C. (atmospheric pressure achieved) | 18.3 | 11.1 | 44.6 | 19.5 | 6.5 | 38.70 | 38.61 | −0.09 |
| Gas side composition in release of 48% at −40° C. (atmospheric pressure or less) | 17.1 | 11.1 | 46.1 | 20.4 | 4.6 | 38.19 | 37.83 | −0.36 |

8) Point (a, b, c(c1+c2)) in case of x=41 mass %, r=0.25, and a=5.8 mass %

The results obtained by examining in the same manner as described above are shown in Table 240.

TABLE 240

| Leak simulation in storage/ transport | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| Initial composition (1) (=WCF) | 5.8 | 5.8 | 41.0 | 17.4 | 30.0 | 24.56 | 46.10 | 21.54 |
| Liquid side composition in release of 50% at −40° C. (atmospheric pressure achieved) (=WCFF) | 4.1 | 6.4 | 61.2 | 27.2 | 1.1 | 32.10 | 32.26 | 0.165 |
| Liquid side composition in release of 52% at −40° C. (atmospheric pressure or less) | 3.8 | 6.2 | 61.7 | 27.5 | 0.8 | 32.03 | 31.92 | −0.11 |
| Initial composition (2) | 5.8 | 5.8 | 41.0 | 17.3 | 30.1 | 24.56 | 46.10 | 21.54 |
| Liquid side composition in release of 50% at −40° C. (atmospheric | 4.1 | 6.4 | 61.4 | 27.0 | 1.1 | 32.19 | 32.11 | −0.08 |

TABLE 240-continued

| Leak simulation in storage/ transport | R32 (a) weight % | R125 (c1) weight % | R1234yf (x) weight % | R134a (c2) weight % | CO2 (b) weight % | Flammable refrigerant concentration in terms of R32 weight % | Non-flammable refrigerant concentration in terms of R32 weight % | Non-flammability-Flammability (positive: non-flammability) |
|---|---|---|---|---|---|---|---|---|
| pressure achieved) | | | | | | | | |
| Liquid side composition in release of 52% at −40° C. (atmospheric pressure or less) | 3.8 | 6.2 | 61.9 | 27.5 | 0.6 | 32.12 | 31.76 | −0.35 |

[2] Verification according to flammability test, of ASHRAE non-flammability limit point determined from non-flammability limit of binary mixed refrigerant obtained as described above The flammability test according to ASTM E681 represented in [1] was performed on the composition described below, and thus no flame propagation was observed in the case of the composition-3-1), the composition-4-1), and the composition-5-1), and flame propagation was observed in the case of the composition-3-2), the composition-4-2), and the composition-5-2). Accordingly, it can be said that the ASHRAE non-flammability limit represented by each calculation in Tables 237, 238 and 239 represents an actual non-flammability limit Composition 3-1)

Liquid side composition in a release of 52% at −40° C.: ($R32/CO_2/R125/R134a$)=(0.0/39.5/4.9/14.6) at x=41.0 mass % of R1234yf, ($R32/CO_2/R125/R134a$)=(0.0/2.5/6:1/24.4) at x=67.0% Composition 3-2)

Liquid side composition in a release of 52% at −40° C.: ($R32/CO_2/R125/R134a$)=(0.0/39.6/4.9/14.5) at x=41.0 mass % of R1234yf ($R32/CO_2/R125/R134a$)=(0.0/2.6/6:1/242) at x=67.1% Composition 4-1)

Gas side composition in a release of 38% at −40° C.: ($R32/CO_2/R125/R134a$)=(12.8/12.2/8.5/25.5) at x==41.0 mass % of R1234yf ($R32/CO_2/R125/R134a$)=(21.8/5.1/12.4/20.6) at x=40.1%, Composition 4-2)

Gas side composition in a release of 38% at −40° C.: ($R32/CO_2/R125/R134a$)=(12.9/12.1/8.5/25.5) at x=41.0 mass % of R1234yf ($R32/CO_2/R125/R134a$)=(21.4/3.8/12.4/21.3) at x=41.1%, Composition 5-1)

Liquid side composition in a release of 50% at −40° C.: ($R32/CO_2/R125/R134a$)=(5.8/30.0/5.8/17.4) at x=41.0 mass % of R1234yf, ($R32/CO_2/R125/R134a$) 4.1/1.1/6.4/27.2) at x=61.2%, Composition 5-2)

Liquid side composition in a release of 50% at −40° C.: ($R32/CO_2/R125/R134a$)=(5.8/30.1/5.8/17.3) at x=41.0 mass % of R1234y f ($R32/CO_2/R125/R134a$)=(4.1/1.1/6.4/27.0) at x=61.4%.

FIG. 2O illustrates each ASHRAE non-flammability limit point shown in Tables 237, 238, 239 and 40, and the straight line $F_{r=0.25}P_{r=0.25}$ that connects point $F_{r=0.25}$ and the point $P_{r=0.25}$. Such each ASHRAE non-flammability limit point is located closer to the flammable refrigerant R32 with respect to the straight line $F_{r=0.25}P_{r=0.25}$, as illustrated in FIG. 2O, and here the straight line $F_{r=0.25}P_{r=0.25}$, obtained by determining the point $F_{r=0.25}$ and the point $P_{=0.25}$, is here defined as the ASHRAE non flammable border line also in consideration of safety rate.

The WCF non-flammable border line, determined from the non-flammability limit of the binary mixed refrigerant, and the ASHRAE non-flammable border line, determined from the non-flammability limit of the binary mixed refrigerant based on the WCFF composition of determined from leak simulation at Refleak are each matched with an actual non-flammable border line, and, hereinafter, each non-flammability limit is determined according to the above method, the line segment ABr is defined as the WCF non-flammable border line and the line segment FrPr is defined as the ASHRAE non-flammable border line.

Table 241 to Table 244 each show the WCF non-flammability limit point of the mixed refrigerant 2 Determined from the non-flammability limit of the binary mixed refrigerant, and Table 245 to Table 248 each show the ASHRAE non-flammability limit point, determined from the leak simulation and the non-flammability limit of the binary mixed refrigerant

TABLE 241

| Item | | Unit | Comparative Example 2 A | Comparative Example 3 $B_{r=0.25}$ | Comparative Example 7 $B_{r=0.375}$ | Comparative Example 11 $B_{r=0.5}$ | Comparative Example 15 $B_{r=0.75}$ | Comparative Example 19 $B_{r=1.0}$ |
|---|---|---|---|---|---|---|---|---|
| WCF concentrations | R32 | mass % | 15.0 | 19.9 | 22.1 | 24.1 | 27.4 | 30.2 |
| | CO2 | mass % | 44.0 | 0.0 | 0.0 | 0.0 | 0.0 | 0.0 |
| | R125 | mass % | 0.0 | 9.8 | 13.8 | 17.5 | 23.7 | 28.8 |
| | R134a | mass % | 0.0 | 29.3 | 23.1 | 17.4 | 7.9 | 0.0 |
| | R1234yf | mass % | 41.0 | 41.0 | 41.0 | 41.0 | 41.0 | 41.0 |
| Non-flammability determination | | | Non-flammability | Non-flammability | Non-flammability | Non-flammability | Non-flammability | Non-flammability |

TABLE 242

| Item | | Unit | Comparative Example 23 A | Comparative Example 24 $B_{r=0.25}$ | Comparative Example 28 $B_{r=0.375}$ | Comparative Example 32 $B_{r=0.5}$ | Comparative Example 36 $B_{r=0.75}$ | Comparative Example 40 $B_{r=1.0}$ |
|---|---|---|---|---|---|---|---|---|
| WCF concentrations | R32 | mass % | 13.1 | 17.9 | 20.0 | 21.9 | 25.2 | 27.9 |
| | CO2 | mass % | 43.1 | 0.0 | 0.0 | 0.0 | 0.0 | 0.0 |
| | R125 | mass % | 0.0 | 9.6 | 13.6 | 17.2 | 23.3 | 28.3 |
| | R134a | mass % | 0.0 | 28.7 | 22.6 | 17.1 | 7.7 | 0.0 |
| | R1234yf | mass % | 43.8 | 43.8 | 43.8 | 43.8 | 43.8 | 43.8 |
| Non-flammability determination | | | Non-flammability | Non-flammability | Non-flammability | Non-flammability | Non-flammability | Non-flammability |

TABLE 243

| Item | | Unit | Comparative Example 44 A | Comparative Example 45 $B_{r=0.25}$ | Comparative Example 49 $B_{r=0.375}$ | Comparative Example 53 $B_{r=0.5}$ | Comparative Example 57 $B_{r=0.75}$ | Comparative Example 61 $B_{r=1.0}$ | Comparative Example 65 $B_{r=0.31}$ | Comparative Example 69 $B_{r=0.37}$ |
|---|---|---|---|---|---|---|---|---|---|---|
| WCF concentrations | R32 | mass % | 11.2 | 15.9 | 16.9 | 17.9 | 18.0 | 19.9 | 23.1 | 25.8 |
| | CO2 | mass % | 42.3 | 0.0 | 0.0 | 0.0 | 0.0 | 0.0 | 0.0 | 0.0 |
| | R125 | mass % | 0.0 | 9.4 | 11.3 | 13.2 | 13.3 | 16.8 | 22.8 | 27.7 |
| | R134a | mass % | 0.0 | 28.2 | 25.3 | 22.4 | 22.2 | 16.8 | 7.6 | 0.0 |
| | R1234yf | mass % | 46.5 | 46.5 | 46.5 | 46.5 | 46.5 | 46.5 | 46.5 | 46.5 |
| Non-flammability determination | | | Non-flammability | Non-flammability | Non-flammability | Non-flammability | Non-flammability | Non-flammability | Non-flammability | Non-flammability |

TABLE 244

| Item | | Unit | Comparative Example 73 A | Comparative Example 74 $B_{r=0.25}$ | Comparative Example 78 $B_{r=0.375}$ | Comparative Example 82 $B_{r=0.5}$ | Comparative Example 86 $B_{r=0.75}$ | Comparative Example 90 $B_{r=1.0}$ | Comparative Example 94 $B_{r=0.31}$ | Comparative Example 98 $B_{r=0.37}$ |
|---|---|---|---|---|---|---|---|---|---|---|
| WCF concentrations | R32 | mass % | 8.8 | 13.4 | 14.4 | 15.3 | 15.4 | 17.3 | 20.4 | 23.0 |
| | CO2 | mass % | 41.2 | 0.0 | 0.0 | 0.0 | 0.0 | 0.0 | 0.0 | 0.0 |
| | R125 | mass % | 0.0 | 9.2 | 11.0 | 12.8 | 13.0 | 16.4 | 22.2 | 27.0 |
| | R134a | mass % | 0.0 | 27.4 | 24.6 | 21.9 | 21.6 | 16.3 | 7.4 | 0.0 |
| | R1234yf | mass % | 50.0 | 50.0 | 50.0 | 50.0 | 50.0 | 50.0 | 50.0 | 50.0 |
| Non-flammability determination | | | Non-flammability | Non-flammability | Non-flammability | Non-flammability | Non-flammability | Non-flammability | Non-flammability | Non-flammability |

TABLE 245

| Item | | Unit | Comparative Example 6 $F_{r=0.25}$ | Example 2 $P_{r=0.25}$ | Comparative Example 10 $F_{r=0.375}$ | Example 4 $P_{r=0.375}$ | Comparative Example 14 $F_{r=0.5}$ | Example 6 $P_{r=0.5}$ | Comparative Example 18 $F_{r=0.75}$ | Example 8 $P_{r=0.75}$ | Comparative Example 22 $F_{r=1.0}$ | Example 10 $P_{r=1.0}$ |
|---|---|---|---|---|---|---|---|---|---|---|---|---|
| WCF concentrations | R32 | mass % | 0.0 | 12.8 | 0.0 | 14.3 | 0.0 | 15.4 | 0.0 | 11.4 | 0.0 | 7.7 |
| | CO2 | mass % | 39.5 | 12.2 | 40.5 | 15.2 | 41.2 | 17.4 | 42.6 | 25.1 | 43.1 | 31.5 |
| | R125 | mass % | 4.9 | 8.5 | 6.9 | 11.1 | 8.9 | 13.1 | 12.3 | 16.9 | 15.9 | 19.8 |
| | R134a | mass % | 14.6 | 25.5 | 11.6 | 18.4 | 8.9 | 13.1 | 4.1 | 5.6 | 0.0 | 0.0 |
| | R1234yf | mass % | 41.0 | 41.0 | 41.0 | 41.0 | 41.0 | 41.0 | 41.0 | 41.0 | 41.0 | 41.0 |
| Non-flammability determination | | | Non-flammability | Non-flammability | Non-flammability | Non-flammability | Non-flammability | Non-flammability | Non-flammability | Non-flammability | Non-flammability | Non-flammability |
| Leak conditions leading to WCFF | | | Storage/ transport, | Storage/ transport, | Storage/ transport, | Storage/ transport, | Storage/ transport, | Storage/ transport, | Storage/ transport, | Storage/ transport, | Storage/ transport, | Storage/ transport, |

TABLE 245-continued

| Item | | Unit | Comparative Example 6 $F_{r=0.25}$ | Example 2 $P_{r=0.25}$ | Comparative Example 10 $F_{r=0.375}$ | Example 4 $P_{r=0.375}$ | Comparative Example 14 $F_{r=0.5}$ | Example 6 $P_{r=0.5}$ | Comparative Example 18 $F_{r=0.75}$ | Example 8 $P_{r=0.75}$ | Comparative Example 22 $F_{r=1.0}$ | Example 10 $P_{r=1.0}$ |
|---|---|---|---|---|---|---|---|---|---|---|---|---|
| | | | −40° C. 52% leak, liquid phase | −40° C. 38% leak, gas phase | −40° C. 54% leak, liquid phase | −40° C. 48% leak, gas phase | −40° C. 56% leak, liquid phase | −40° C. 56% leak, gas phase | −40° C. 58% leak, liquid phase | −40° C. 62% leak, liquid phase | −40° C. 62% leak, liquid phase | −40° C. 64% leak, liquid phase |
| WCFF concentrations | R32 | mass % | 0.0 | 21.8 | 0.0 | 22.1 | 0.0 | 21.5 | 0.0 | 16.2 | 0.0 | 12.1 |
| | CO2 | mass % | 2.5 | 5.1 | 2.3 | 2.6 | 1.9 | 1.3 | 2.0 | 1.5 | 1.2 | 2.6 |
| | R125 | mass % | 6.1 | 12.4 | 8.7 | 16.0 | 11.3 | 18.7 | 16.2 | 26.3 | 20.5 | 33.7 |
| | R134a | mass % | 24.4 | 20.6 | 19.9 | 16.6 | 15.7 | 13.2 | 7.5 | 6.5 | 0.0 | 0.0 |
| | R1234yf | mass % | 67.0 | 40.1 | 69.1 | 42.7 | 71.1 | 45.3 | 74.3 | 49.5 | 78.3 | 51.6 |
| Non-flammability determination | | | Non-flammability | Non-flammability | Non-flammability | Non-flammability | Non-flammability | Non-flammability | Non-flammability | Non-flammability | Non-flammability | Non-flammability |

TABLE 246

| Item | | Unit | Comparative Example 27 $F_{r=0.25}$ | Example 12 $P_{r=0.25}$ | Comparative Example 31 $F_{r=0.375}$ | Example 14 $P_{r=0.375}$ | Comparative Example 35 $F_{r=0.5}$ | Example 16 $P_{r=0.5}$ | Comparative Example 39 $F_{r=0.75}$ | Example 18 $P_{r=0.75}$ | Comparative Example 43 $F_{r=1.0}$ | Example 20 $P_{r=1.0}$ |
|---|---|---|---|---|---|---|---|---|---|---|---|---|
| WCF concentrations | R32 | mass % | 0.0 | 12.0 | 0.0 | 13.6 | 0.0 | 14.7 | 0.0 | 9.9 | 0.0 | 6.6 |
| | CO2 | mass % | 35.4 | 10.1 | 36.6 | 12.9 | 37.4 | 15.1 | 38.5 | 23.5 | 40.0 | 29.6 |
| | R125 | mass % | 5.2 | 8.5 | 7.4 | 11.2 | 9.4 | 13.2 | 13.3 | 17.1 | 16.2 | 20.0 |
| | R134a | mass % | 15.6 | 25.6 | 12.2 | 18.5 | 9.4 | 13.2 | 4.4 | 5.7 | 0.0 | 0.0 |
| | R1234yf | mass % | 43.8 | 43.8 | 43.8 | 43.8 | 43.8 | 43.8 | 43.8 | 43.8 | 43.8 | 43.8 |
| Non-flammability determination | | | Non-flammability | Non-flammability | Non-flammability | Non-flammability | Non-flammability | Non-flammability | Non-flammability | Non-flammability | Non-flammability | Non-flammability |
| Leak conditions leading to WCFF | | | Storage/transport, −40° C. 48% leak, liquid phase | Storage/transport, −40° C. 36% leak, gas phase | Storage/transport, −40° C. 50% leak, liquid phase | Storage/transport, −40° C. 44% leak, gas phase | Storage/transport, −40° C. 52% leak, liquid phase | Storage/transport, −40° C. 52% leak, gas phase | Storage/transport, −40° C. 56% leak, liquid phase | Storage/transport, −40° C. 56% leak, liquid phase | Storage/transport, −40° C. 58% leak, liquid phase | Storage/transport, −40° C. 60% leak, liquid phase |
| WCFF concentrations | R32 | mass % | 0.0 | 20.5 | 0.0 | 21.5 | 0.0 | 21.1 | 0.0 | 5.4 | 0.0 | 3.5 |
| | CO2 | mass % | 2.4 | 4.3 | 2.3 | 3.0 | 2.1 | 1.6 | 1.4 | 0.4 | 1.5 | 0.4 |
| | R125 | mass % | 6.2 | 12.3 | 8.9 | 16.0 | 11.4 | 18.7 | 16.2 | 17.4 | 20.3 | 21.8 |
| | R134a | mass % | 24.3 | 20.7 | 19.6 | 15.9 | 15.4 | 12.6 | 7.6 | 9.3 | 0.0 | 0.0 |
| | R1234yf | mass % | 67.1 | 42.2 | 69.2 | 43.6 | 71.1 | 46.0 | 74.8 | 67.5 | 78.2 | 74.3 |
| Non-flammability determination | | | Non-flammability | Non-flammability | Non-flammability | Non-flammability | Non-flammability | Non-flammability | Non-flammability | Non-flammability | Non-flammability | Non-flammability |

TABLE 247

| Item | | Unit | Comparative Example 48 $F_{r=0.25}$ | Example 22 $P_{r=0.25}$ | Comparative Example 52 $F_{r=0.375}$ | Example 24 $P_{r=0.375}$ | Comparative Example 56 $F_{r=0.5}$ | Example 26 $P_{r=0.5}$ | Comparative Example 60 $F_{r=0.75}$ |
|---|---|---|---|---|---|---|---|---|---|
| WCF concentrations | R32 | mass % | 0.0 | 11.3 | 0.0 | 12.8 | 0.0 | 13.1 | 0.0 |
| | CO2 | mass % | 31.5 | 7.8 | 32.3 | 10.7 | 33.5 | 13.6 | 35.3 |
| | R125 | mass % | 5.5 | 8.6 | 8.2 | 11.3 | 10.0 | 13.4 | 13.7 |
| | R134a | mass % | 16.5 | 25.8 | 13.0 | 18.7 | 10.0 | 13.4 | 4.5 |
| | R1234yf | mass % | 46.5 | 46.5 | 46.5 | 46.5 | 46.5 | 46.5 | 46.5 |
| Non-flammability determination | | | Non-flammability | Non-flammability | Non-flammability | Non-flammability | Non-flammability | Non-flammability | Non-flammability |
| Leak conditions leading to WCFF | | | Storage/transport, −40° C. 44% leak, liquid phase | Storage/transport, −40° C. 32% leak, gas phase | Storage/transport, −40° C. 46% leak, liquid phase | Storage/transport, −40° C. 40% leak, gas phase | Storage/transport, −40° C. 48% leak, liquid phase | Storage/transport, −40° C. 48% leak, liquid phase | Storage/transport, −40° C. 52% leak, liquid phase |

TABLE 247-continued

| | | | | | | | | | |
|---|---|---|---|---|---|---|---|---|---|
| WCFF concentrations | R32 | mass % | 0.0 | 19.7 | 0.0 | 20.8 | 0.0 | 7.1 | 0.0 |
| | CO2 | mass % | 2.5 | 4.5 | 2.2 | 3.4 | 2.1 | 0.3 | 1.7 |
| | R125 | mass % | 6.2 | 12.4 | 9.4 | 15.9 | 11.6 | 12.2 | 16.2 |
| | R134a | mass % | 24.2 | 20.2 | 19.5 | 15.5 | 15.4 | 19.0 | 7.3 |
| | R1234yf | mass % | 67.1 | 43.2 | 68.9 | 44.4 | 70.9 | 61.4 | 74.8 |
| Non-flammability determination | | | Non-flamma-bility | Non-flamma-bility | Non-flamma-bility | Non-flamma-bility | Non-flamma-bility | Non-flamma-bility | Non-flamma-bility |

| Item | | Unit | Example 28 $P_{r=0.75}$ | Compar-ative Example 64 $F_{r=1.0}$ | Example 30 $P_{r=1.0}$ | Compar-ative Example 68 $F_{r=0.31}$ | Example 32 $P_{r=0.31}$ | Compar-ative Example 72 $F_{r=0.37}$ | Example 34 $P_{r=0.37}$ |
|---|---|---|---|---|---|---|---|---|---|
| WCF concentrations | R32 | mass % | 8.7 | 0.0 | 5.9 | 0.0 | 12.2 | 0.0 | 12.8 |
| | CO2 | mass % | 21.7 | 35.9 | 27.4 | 31.7 | 9.2 | 32.5 | 10.7 |
| | R125 | mass % | 17.3 | 17.6 | 20.2 | 6.8 | 10.0 | 7.8 | 11.1 |
| | R134a | mass % | 5.8 | 0.0 | 0.0 | 15.0 | 22.1 | 13.2 | 18.9 |
| | R1234yf | mass % | 46.5 | 46.5 | 46.5 | 46.5 | 46.5 | 46.5 | 46.5 |
| Non-flammability determination | | | Non-flamma-bility | Non-flamma-bility | Non-flamma-bility | Non-flamma-bility | Non-flamma-bility | Non-flamma-bility | Non-flamma-bility |
| Leak conditions leading to WCFF | | | Storage/transport, −40° C. 52% leak, liquid phase | Storage/transport, −40° C. 54% leak, liquid phase | Storage/transport, −40° C. 56% leak, liquid phase | Storage/transport, −40° C. 44% leak, liquid phase | Storage/transport, −40° C. 36% leak, gas phase | Storage/transport, −40° C. 46% leak, liquid phase | Storage/transport, −40° C. 40% leak, gas phase |
| WCFF concentrations | R32 | mass % | 4.9 | 0.0 | 3.2 | 0.0 | 20.5 | 0.0 | 20.8 |
| | CO2 | mass % | 0.5 | 1.6 | 0.6 | 1.9 | 3.9 | 2,3 | 3.3 |
| | R125 | mass % | 17.4 | 21.1 | 21.7 | 7.6 | 14.2 | 9.0 | 15.7 |
| | R134a | mass % | 8.9 | 0.0 | 0.0 | 22.3 | 17.7 | 19.8 | 15.7 |
| | R1234yf | mass % | 68.3 | 77.3 | 74.5 | 68.2 | 43.7 | 68.9 | 44.5 |
| Non-flammability determination | | | Non-flamma-bility | Non-flamma-bility | Non-flamma-bility | Non-flamma-bility | Non-flamma-bility | Non-flamma-bility | Non-flamma-bility |

TABLE 248

| Item | | Unit | Comparative Example 77 $F_{r=0.25}$ | Example 36 $P_{r=0.25}$ | Comparative Example 81 $F_{r=0.375}$ | Example 38 $P_{r=0.375}$ | Comparative Example 85 $F_{r=0.5}$ | Example 40 $P_{r=0.5}$ | Comparative Example 89 $F_{r=0.75}$ |
|---|---|---|---|---|---|---|---|---|---|
| WCF concentrations | R32 | mass % | 0.0 | 10.5 | 0.0 | 11.9 | 0.0 | 10.8 | 0.0 |
| | CO2 | mass % | 26.1 | 4.7 | 27.6 | 8.0 | 28.8 | 11.8 | 30.4 |
| | R125 | mass % | 6.0 | 8.7 | 8.5 | 11.3 | 10.6 | 13.7 | 14.7 |
| | R134a | mass % | 17.9 | 26.1 | 13.9 | 18.8 | 10.6 | 13.7 | 4.9 |
| | R1234yf | mass % | 50.0 | 50.0 | 50.0 | 50.0 | 50.0 | 50.0 | 50.0 |
| Non-flammability determination | | | Non-flammability | Non-flammability | Non-flammability | Non-flammability | Non-flammability | Non-flammability | Non-flammability |
| Leak conditions leading to WCFF | | | Storage/transport, −40° C., 40% leak, liquid phase | Storage/transport, −40° C., 32% leak, gas phase | Storage/transport, −40° C., 42% leak, liquid phase | Storage/transport, −40° C., 36% leak, gas phase | Storage/transport, 40° C., 44% leak, liquid phase | Storage/transport, −40° C., 42% leak, liquid phase | Storage/transport, −40° C., 48% leak, liquid phase |
| WCFF concentrations | R32 | mass % | 0 | 17.3 | 0 | 19.7 | 0 | 6.1 | 0 |
| | CO2 | mass % | 2 | 2.4 | 1.9 | 3.2 | 1.8 | 0.4 | 1.5 |
| | R125 | mass % | 6.4 | 12.3 | 9.2 | 15.9 | 11.6 | 12.4 | 16.2 |
| | R134a | mass % | 24.4 | 21.3 | 19.5 | 15.1 | 15.3 | 18.2 | 7.4 |
| | R1234yf | mass % | 67.2 | 46.7 | 69.4 | 46.1 | 71.3 | 62.9 | 74.9 |
| Non-flammability determination | | | Non-flammability | Non-flammability | Non-flammability | Non-flammability | Non-flammability | Non-flammability | Non-flammability |

TABLE 248-continued

| Item | | Unit | Example 42 $P_{r=0.75}$ | Comparative Example 93 $F_{r=1.0}$ | Example 44 $P_{r=1.0}$ | Comparative Example 97 $F_{r=0.31}$ | Example 46 $P_{r=0.31}$ | Comparative Example 101 $F_{r=0.37}$ | Example 48 $P_{r=0.37}$ |
|---|---|---|---|---|---|---|---|---|---|
| WCF concentrations | R32 | mass % | 7.3 | 0.0 | 3.9 | 0.0 | 11.2 | 0.0 | 11.9 |
| | CO2 | mass % | 19.3 | 31.8 | 25.5 | 27.0 | 6.5 | 27.6 | 7.7 |
| | R125 | mass % | 17.6 | 18.2 | 20.6 | 7.3 | 10.0 | 8.5 | 11.2 |
| | R134a | mass % | 5.8 | 0.0 | 0.0 | 15.7 | 22.3 | 13.9 | 19.2 |
| | R1234yf | mass % | 50.0 | 50.0 | 50.0 | 50.0 | 50.0 | 50.0 | 50.0 |
| Non-flammability determination | | | Non-flammability | Non-flammability | Non-flammability | Non-flammability | Non-flammability | Non-flammability | Non-flammability |
| Leak conditions leading to WCFF | | | Storage/transport, −40° C., 48% leak, liquid phase | Storage/transport, −40° C., 50% leak, liquid phase | Storage/transport, −40° C., 52% leak, liquid phase | Storage/transport, −40°C, 40% leak, liquid phase | Storage/transport, −40° C., 38% leak, gas phase | Storage/transport, −40° C., 42% leak, liquid phase | Storage/transport, −40° C., 34% leak, gas phase |
| WCFF concentrations | R32 | mass % | 4 | 0 | 2.1 | 0 | 17.2 | 0 | 20.2 |
| | CO2 | mass % | 0.5 | 1.6 | 0.7 | 2.3 | 1.7 | 1.9 | 3.9 |
| | R125 | mass % | 17.2 | 20.7 | 21.5 | 7.9 | 14 | 9.2 | 15.7 |
| | R134a | mass % | 8.4 | 0 | 0 | 21.7 | 19 | 19.5 | 15 |
| | R1234yf | mass % | 69.9 | 77.7 | 75.7 | 68.2 | 48.1 | 69.4 | 45.2 |
| Non-flammability determination | | | Non-flammability | Non-flammability | Non-flammability | Non-flammability | Non-flammability | Non-flammability | Non-flammability |

Examples 1 to 222 and Comparative Examples 1 to 206

The respective GWPs of R410A, and a composition including a mixture of R32, R125, R1234yf, R134a and $CO_2$ were evaluated based on the value in the fourth report of IPCC (Intergovernmental Panel on Climate Change). The respective refrigerating capacities of R410A, and the composition including a mixture of R32, R125, R1234yf, R134a and $CO_2$ were determined by performing theoretical refrigeration cycle calculation with respect to each mixed refrigerant under the following conditions by using National Institute of Science and Technology (MIST) Reference Fluid Thermodynamic and Transport Properties Database (Refprop 9.0).

Evaporating temperature −10° C.
Condensation temperature 45° C.
Superheating temperature 20 K
Subcooling temperature 5 K
Compressor efficiency 70%

The GWP, the COP and the refrigerating capacity, calculated based on the results, are shown in Tables 249 to 280. The COP and the refrigerating capacity are each represented as the proportion relative to that of R410A.

The coefficient of performance (COP) was determined according to the following expression.

COP=(Refrigerating capacity or heating capacity)/Power consumption

TABLE 249

| 41%R1234yf,r=0.25 | | | | | | | | | |
|---|---|---|---|---|---|---|---|---|---|
| Item | Unit | Comparative Example 1 | Comparative Example 2 A | Comparative Example 3 $B_{r=0.25}$ | Comparative Example 4 $C_{r=0.25}$ | Comparative Example 5 $D_{r=0.25}$ | Comparative Example 6 $F_{r=0.25}$ | Example 1 $O_{r=0.25}$ | Example 2 $P_{r=0.25}$ |
| R32 | mass % | R410A | 15.0 | 19.9 | 31.6 | 0.0 | 0.0 | 19.0 | 12.8 |
| CO2 | mass % | | 44.0 | 0.0 | 0.0 | 20.6 | 39.5 | 8.2 | 12.2 |
| R125 | mass % | | 0.0 | 9.8 | 6.9 | 9.6 | 4.9 | 7.9 | 8.5 |
| R134a | mass % | | 0.0 | 29.3 | 20.5 | 28.8 | 14.6 | 23.9 | 25.5 |
| R1234yf | mass % | | 41.0 | 41.0 | 41.0 | 41.0 | 41.0 | 41.0 | 41.0 |
| GWP | — | 2088 | 103 | 898 | 750 | 750 | 382 | 750 | 750 |
| COP ratio | % (relative to that of R410A) | 100 | 87.6 | 104.7 | 103.8 | 98.6 | 92.0 | 101.0 | 100.0 |
| Refrigerating capacity ratio | % (relative to that of R410A) | 100 | 157.7 | 63.8 | 72.8 | 94.9 | 139.9 | 80.6 | 84.9 |
| Condensation glide | ° C. | 0.1 | 17.6 | 4.9 | 4.5 | 25.5 | 25.0 | 13.2 | 17.3 |

TABLE 249-continued

| 41%R1234yf,r=0.375 | | | | | | | |
|---|---|---|---|---|---|---|---|
| Item | Unit | Comparative Example 7 $B_{r=0.375}$ | Comparative Example 8 $C_{r=0.375}$ | Comparative Example 9 $D_{r=0.375}$ | Comparative Example 10 $F_{r=0.375}$ | Example 3 $O_{r=0.375}$ | Example 4 $P_{r=0.375}$ |
| R32 | mass % | 22.1 | 36.2 | 0.0 | 0.0 | 20.3 | 14.3 |
| CO2 | mass % | 0.0 | 0.0 | 25.1 | 40.5 | 11.0 | 15.2 |
| R125 | mass % | 13.8 | 8.6 | 12.7 | 6.9 | 10.4 | 11.1 |
| R134a | mass % | 23.1 | 14.2 | 21.2 | 11.6 | 17.3 | 18.4 |
| R1234yf | mass % | 41.0 | 41.0 | 41.0 | 41.0 | 41.0 | 41.0 |
| GWP | — | 964 | 750 | 750 | 409 | 750 | 750 |
| COP ratio | % (relative to that of R410A) | 104.0 | 103.2 | 96.9 | 91.1 | 99.5 | 98.5 |
| Refrigerating capacity ratio | % (relative to that of R410A) | 67.0 | 77.1 | 107.4 | 142.7 | 89.2 | 94.3 |
| Condensation glide | ° C. | 4.8 | 4.0 | 25.6 | 24.3 | 14.2 | 17.8 |

| 41%R1234yf,r=0.5 | | | | | | | |
|---|---|---|---|---|---|---|---|
| Item | Unit | Comparative Example 11 $B_{r=0.5}$ | Comparative Example 12 $C_{r=0.5}$ | Comparative Example 13 $D_{r=0.5}$ | Comparative Example 14 $F_{r=0.5}$ | Example 5 $O_{r=0.5}$ | Example 6 $P_{r=0.5}$ |
| R32 | mass % | 24.1 | 39.5 | 0.0 | 0.0 | 21.4 | 15.4 |
| CO2 | mass % | 0.0 | 0.0 | 28.7 | 41.2 | 13.2 | 17.4 |
| R125 | mass % | 17.5 | 9.8 | 15.2 | 8.9 | 12.2 | 13.1 |
| R134a | mass % | 17.4 | 9.7 | 15.1 | 8.9 | 12.2 | 13.1 |
| R1234yf | mass % | 41.0 | 41.0 | 41.0 | 41.0 | 41.0 | 41.0 |
| GWP | — | 1026 | 750 | 750 | 441 | 750 | 750 |
| COP ratio | % (relative to that of R410A) | 103.4 | 102.7 | 95.2 | 90.3 | 98.3 | 97.3 |
| Refrigerating capacity ratio | % (relative to that of R410A) | 70.0 | 80.2 | 117.3 | 144.8 | 95.9 | 101.3 |
| Condensation glide | ° C. | 4.6 | 3.6 | 25.0 | 23.6 | 14.6 | 17.8 |

| 41%R1234yf,r=0.75 | | | | | | | |
|---|---|---|---|---|---|---|---|
| Item | Unit | Comparative Example 15 $B_{r=0.75}$ | Comparative Example 16 $C_{r=0.75}$ | Comparative Example 17 $D_{r=0.75}$ | Comparative Example 18 $F_{r=0.75}$ | Example 7 $O_{r=0.75}$ | Example 8 $P_{r=0.75}$ |
| R32 | mass % | 27.4 | 43.9 | 0.0 | 0.0 | 22.8 | 11.4 |
| CO2 | mass % | 0.0 | 0.0 | 33.9 | 42.6 | 16.3 | 25.1 |
| R125 | mass % | 23.7 | 11.3 | 18.8 | 12.3 | 14.9 | 16.9 |
| R134a | mass % | 7.9 | 3.8 | 6.3 | 4.1 | 5.0 | 5.6 |
| R1234yf | mass % | 41.0 | 41.0 | 41.0 | 41.0 | 41.0 | 41.0 |
| GWP | — | 1129 | 750 | 750 | 491 | 750 | 750 |
| COP ratio | % (relative to that of R410A) | 102.4 | 102.2 | 92.2 | 88.8 | 96.6 | 94.3 |
| Refrigerating capacity ratio | % (relative to that of R410A) | 75.1 | 84.4 | 131.0 | 148.8 | 105.5 | 118.1 |
| Condensation glide | ° C. | 4.0 | 2.9 | 23.4 | 22.2 | 14.6 | 19.4 |

| 41%R1234yf,r=1.0 | | | | | | | |
|---|---|---|---|---|---|---|---|
| Item | Unit | Comparative Example 19 $B_{r=1.0}$ | Comparative Example 20 $C_{r=1.0}$ | Comparative Example 21 $D_{r=1.0}$ | Comparative Example 22 $F_{r=1.0}$ | Example 9 $O_{r=1.0}$ | Example 10 $P_{r=1.0}$ |
| R32 | mass % | 30.2 | 46.7 | 0.0 | 0.0 | 23.8 | 7.7 |
| CO2 | mass % | 0.0 | 0.0 | 37.7 | 43.1 | 18.5 | 31.5 |
| R125 | mass % | 28.8 | 12.3 | 21.3 | 15.9 | 16.7 | 19.8 |
| R134a | mass % | 0.0 | 0.0 | 0.0 | 0.0 | 0.0 | 0.0 |
| R1234yf | mass % | 41.0 | 41.0 | 41.0 | 41.0 | 41.0 | 41.0 |
| GWP | — | 1213 | 750 | 750 | 559 | 750 | 750 |
| COP ratio | % (relative to that of R410A) | 101.5 | 101.9 | 89.7 | 87.8 | 95.4 | 91.6 |

TABLE 249-continued

| | | | | | | | |
|---|---|---|---|---|---|---|---|
| Refrigerating capacity ratio | % (relative to that of R410A) | 79.5 | 87.1 | 140.5 | 150.9 | 112.3 | 131.4 |
| Condensation glide | ° C. | 3.4 | 2.5 | 21.8 | 21.2 | 14.2 | 19.8 |

TABLE 250

43.8%R1234yf,r=0.25

| Item | Unit | Comparative Example 23 A | Comparative Example 24 $B_{r=0.25}$ | Comparative Example 25 $C_{r=0.25}$ | Comparative Example 26 $D_{r=0.25}$ | Comparative Example 27 $F_{r=0.25}$ | Example 11 $O_{r=0.25}$ | Example 12 $P_{r=0.25}$ |
|---|---|---|---|---|---|---|---|---|
| R32 | mass % | 13.1 | 17.9 | 27.3 | 0.0 | 0.0 | 17.1 | 12.0 |
| CO2 | mass % | 43.1 | 0.0 | 0.0 | 17.8 | 35.4 | 6.7 | 10.1 |
| R125 | mass % | 0.0 | 9.6 | 7.2 | 9.6 | 5.2 | 8.1 | 8.5 |
| R134a | mass % | 0.0 | 28.7 | 21.7 | 28.8 | 15.6 | 24.3 | 25.6 |
| R1234yf | mass % | 43.8 | 43.8 | 43.8 | 43.8 | 43.8 | 43.8 | 43.8 |
| GWP | — | 91 | 869 | 750 | 750 | 407 | 750 | 750 |
| COP ratio | % (relative to that of R410A) | 88.4 | 104.8 | 104.1 | 99.4 | 94.0 | 101.8 | 100.8 |
| Refrigerating capacity ratio | % (relative to that of R410A) | 154.6 | 62.2 | 69.6 | 87.7 | 130.7 | 75.7 | 79.3 |
| Condensation glide | ° C. | 18.9 | 5.0 | 4.8 | 24.7 | 26.3 | 12.3 | 16.2 |

43.8%R1234yf,r=0.375

| Item | Unit | Comparative Example 28 $B_{r=0.375}$ | Comparative Example 29 $C_{r=0.375}$ | Comparative Example 30 $D_{r=0.375}$ | Comparative Example 31 $F_{r=0.375}$ | Example 13 $O_{r=0.375}$ | Example 14 $P_{r=0.375}$ |
|---|---|---|---|---|---|---|---|
| R32 | mass % | 20.0 | 32.1 | 0.0 | 0.0 | 18.5 | 13.6 |
| CO2 | mass % | 0.0 | 0.0 | 22.3 | 36.6 | 9.4 | 12.9 |
| R125 | mass % | 13.6 | 9.0 | 12.7 | 7.4 | 10.6 | 11.2 |
| R134a | mass % | 22.6 | 15.1 | 21.2 | 12.2 | 17.7 | 18.5 |
| R1234yf | mass % | 43.8 | 43.8 | 43.8 | 43.8 | 43.8 | 43.8 |
| GWP | — | 936 | 750 | 750 | 436 | 750 | 750 |
| COP ratio | % (relative to that of R410A) | 104.2 | 103.4 | 97.8 | 93.1 | 100.3 | 99.4 |
| Refrigerating capacity ratio | % (relative to that of R410A) | 65.3 | 74.2 | 100.3 | 134.1 | 84.1 | 88.3 |
| Condensation glide | ° C. | 4.9 | 4.4 | 25.5 | 25.6 | 13.8 | 17.1 |

| Item | Unit | Comparative Example 32 $B_{r=0.5}$ | Comparative Example 33 $C_{r=0.5}$ | Comparative Example 34 $D_{r=0.5}$ | Comparative Example 35 $F_{r=0.5}$ | Example 15 $O_{r=0.5}$ | Example 16 $P_{r=0.5}$ |
|---|---|---|---|---|---|---|---|
| R32 | mass % | 21.9 | 35.6 | 0.0 | 0.0 | 19.5 | 14.7 |
| CO2 | mass % | 0.0 | 0.0 | 25.9 | 37.4 | 11.7 | 15.1 |
| R125 | mass % | 17.2 | 10.3 | 15.2 | 9.4 | 12.5 | 13.2 |
| R134a | mass % | 17.1 | 10.3 | 15.1 | 9.4 | 12.5 | 13.2 |
| R1234yf | mass % | 43.8 | 43.8 | 43.8 | 43.8 | 43.8 | 43.8 |
| GWP | — | 996 | 750 | 750 | 466 | 750 | 750 |
| COP ratio | % (relative to that of R410A) | 103.6 | 102.9 | 96.3 | 92.3 | 99.0 | 98.2 |
| Refrigerating capacity ratio | % (relative to that of R410A) | 68.2 | 77.6 | 110.3 | 136.6 | 91.0 | 95.3 |
| Condensation glide | ° C. | 4.8 | 3.9 | 25.4 | 24.9 | 14.5 | 17.4 |

43.8%R1234yf,r=0.75

| Item | Unit | Comparative Example 36 $B_{r=0.75}$ | Comparative Example 37 $C_{r=0.75}$ | Comparative Example 38 $D_{r=0.75}$ | Comparative Example 39 $F_{r=0.75}$ | Example 17 $O_{r=0.75}$ | Example 18 $P_{r=0.75}$ |
|---|---|---|---|---|---|---|---|
| R32 | mass % | 25.2 | 40.3 | 0.0 | 0.0 | 21.0 | 9.9 |
| CO2 | mass % | 0.0 | 0.0 | 31.2 | 38.5 | 14.9 | 23.5 |

TABLE 250-continued

| | | | | | | | |
|---|---|---|---|---|---|---|---|
| R125 | mass % | 23.3 | 11.9 | 18.8 | 13.3 | 15.2 | 17.1 |
| R134a | mass % | 7.7 | 4.0 | 6.2 | 4.4 | 5.1 | 5.7 |
| R1234yf | mass % | 43.8 | 43.8 | 43.8 | 43.8 | 43.8 | 43.8 |
| GWP | — | 1097 | 750 | 750 | 531 | 750 | 750 |
| COP ratio | % (relative to that of R410A) | 102.5 | 102.3 | 93.6 | 91.0 | 97.3 | 95.2 |
| Refrigerating capacity ratio | % (relative to that of R410A) | 73.2 | 82.0 | 124.6 | 140.2 | 100.9 | 113.1 |
| Condensation glide | ° C. | 4.3 | 3.3 | 24.3 | 23.7 | 14.8 | 20.2 |

43.8%R1234yf,r=1.0

| Item | Unit | Comparative Example 40 $B_{r=1.0}$ | Comparative Example 41 $C_{r=1.0}$ | Comparative Example 42 $D_{r=1.0}$ | Comparative Example 43 $F_{r=1.0}$ | Example 19 $O_{r=1.0}$ | Example 20 $P_{r=1.0}$ |
|---|---|---|---|---|---|---|---|
| R32 | mass % | 27.9 | 43.2 | 0.0 | 0.0 | 22.0 | 6.6 |
| CO2 | mass % | 0.0 | 0.0 | 34.9 | 40.0 | 17.1 | 29.6 |
| R125 | mass % | 28.3 | 13.0 | 21.3 | 16.2 | 17.1 | 20.0 |
| R134a | mass % | 0.0 | 0.0 | 0.0 | 0.0 | 0.0 | 0.0 |
| R1234yf | mass % | 43.8 | 43.8 | 43.8 | 43.8 | 43.8 | 43.8 |
| GWP | — | 1181 | 748 | 748 | 569 | 750 | 750 |
| COP ratio | % (relative to that of R410A) | 101.6 | 101.9 | 91.4 | 89.7 | 96.1 | 92.7 |
| Refrigerating capacity ratio | % (relative to that of R410A) | 77.4 | 84.8 | 134.2 | 144.4 | 107.7 | 126.2 |
| Condensation glide | ° C. | 3.7 | 2.8 | 23.0 | 22.6 | 14.6 | 20.8 |

TABLE 251

46.5%R1234yf,r=0.25

| Item | Unit | Comparative Example 44 A | Comparative Example 45 $B_{r=0.25}$ | Comparative Example 46 $C_{r=0.25}$ | Comparative Example 47 $D_{r=0.25}$ | Comparative Example 48 $F_{r=0.25}$ | Example 21 $O_{r=0.25}$ | Example 22 $P_{r=0.25}$ |
|---|---|---|---|---|---|---|---|---|
| R32 | mass % | 11.2 | 15.9 | 23.1 | 0.0 | 0.0 | 15.3 | 11.3 |
| CO2 | mass % | 42.3 | 0.0 | 0.0 | 15.1 | 31.5 | 5.1 | 7.8 |
| R125 | mass % | 0.0 | 9.4 | 7.6 | 9.6 | 5.5 | 8.3 | 8.6 |
| R134a | mass % | 0.0 | 28.2 | 22.8 | 28.8 | 16.5 | 24.8 | 25.8 |
| R1234yf | mass % | 46.5 | 46.5 | 46.5 | 46.5 | 46.5 | 46.5 | 46.5 |
| GWP | — | 78 | 841 | 750 | 750 | 431 | 750 | 750 |
| COP ratio | % (relative to that of R410A) | 89.1 | 104.9 | 104.3 | 100.0 | 95.7 | 102.5 | 101.7 |
| Refrigerating capacity ratio | % (relative to that of R410A) | 151.8 | 60.5 | 66.3 | 80.7 | 121.5 | 70.7 | 73.3 |
| Condensation glide | ° C. | 20.2 | 5.0 | 5.0 | 23.4 | 27.2 | 11.1 | 14.4 |

46.5%R1234yf,r=0.375

| Item | Unit | Comparative Example 49 $B_{r=0.375}$ | Comparative Example 50 $C_{r=0.375}$ | Comparative Example 51 $D_{r=0.375}$ | Comparative Example 52 $F_{r=0.375}$ | Example 23 $O_{r=0.375}$ | Example 24 $P_{r=0.375}$ |
|---|---|---|---|---|---|---|---|
| R32 | mass % | 18.0 | 28.3 | 0.0 | 0.0 | 16.7 | 12.8 |
| CO2 | mass % | 0.0 | 0.0 | 19.6 | 32.3 | 8.0 | 10.7 |
| R125 | mass % | 13.3 | 9.5 | 12.7 | 8.2 | 10.8 | 11.3 |
| R134a | mass % | 22.2 | 15.7 | 21.2 | 13.0 | 18.0 | 18.7 |
| R1234yf | mass % | 46.5 | 46.5 | 46.5 | 46.5 | 46.5 | 46.5 |
| GWP | — | 906 | 750 | 750 | 475 | 750 | 750 |
| COP ratio | % (relative to that of R410A) | 104.3 | 103.6 | 98.6 | 95.0 | 100.9 | 100.2 |
| Refrigerating capacity ratio | % (relative to that of R410A) | 63.6 | 71.4 | 93.3 | 124.3 | 79.4 | 82.4 |
| Condensation glide | ° C. | 5.0 | 4.7 | 25.0 | 26.5 | 13.2 | 16.1 |

TABLE 251-continued

| 46.5%R1234yf,r=0.5 | | | | | | | |
|---|---|---|---|---|---|---|---|
| Item | Unit | Comparative Example 53 $B_{r=0.5}$ | Comparative Example 54 $C_{r=0.5}$ | Comparative Example 55 $D_{r=0.5}$ | Comparative Example 56 $F_{r=0.5}$ | Example 25 $O_{r=0.5}$ | Example 26 $P_{r=0.5}$ |
| R32 | mass % | 19.9 | 31.9 | 0.0 | 0.0 | 17.3 | 13.1 |
| CO2 | mass % | 0.0 | 0.0 | 23.2 | 33.1 | 10.6 | 13.6 |
| R125 | mass % | 16.8 | 10.8 | 15.2 | 10.2 | 12.8 | 13.4 |
| R134a | mass % | 16.8 | 10.8 | 15.1 | 10.2 | 12.8 | 13.4 |
| R1234yf | mass % | 46.5 | 46.5 | 46.5 | 46.5 | 46.5 | 46.5 |
| GWP | — | 964 | 750 | 750 | 505 | 750 | 750 |
| COP ratio | % (relative to that of R410A) | 103.7 | 103.1 | 97.3 | 94.3 | 99.6 | 98.9 |
| Refrigerating capacity ratio | % (relative to that of R410A) | 66.4 | 74.9 | 103.4 | 126.8 | 86.7 | 90.4 |
| Condensation glide | ° C. | 4.9 | 4.3 | 25.4 | 26.0 | 14.5 | 17.3 |

| 46.5%R1234yf,r=0.75 | | | | | | | |
|---|---|---|---|---|---|---|---|
| Item | Unit | Comparative Example 57 $B_{r=0.75}$ | Comparative Example 58 $C_{r=0.75}$ | Comparative Example 59 $D_{r=0.75}$ | Comparative Example 60 $F_{r=0.75}$ | Example 27 $O_{r=0.75}$ | Example 28 $P_{r=0.75}$ |
| R32 | mass % | 23.1 | 36.8 | 0.0 | 0.0 | 19.3 | 8.7 |
| CO2 | mass % | 0.0 | 0.0 | 28.5 | 35.3 | 13.5 | 21.7 |
| R125 | mass % | 22.8 | 12.5 | 18.8 | 13.7 | 15.5 | 17.3 |
| R134a | mass % | 7.6 | 4.2 | 6.2 | 4.5 | 5.2 | 5.8 |
| R1234yf | mass % | 46.5 | 46.5 | 46.5 | 46.5 | 46.5 | 46.5 |
| GWP | — | 1064 | 750 | 750 | 546 | 750 | 750 |
| COP ratio | % (relative to that of R410A) | 102.7 | 102.4 | 94.9 | 92.7 | 97.9 | 96.1 |
| Refrigerating capacity ratio | % (relative to that of R410A) | 71.3 | 79.6 | 118.0 | 133.0 | 96.3 | 107.8 |
| Condensation glide | ° C. | 4.6 | 3.7 | 24.9 | 24.8 | 14.9 | 20.7 |

| 46.5%R1234yf,r=1.0 | | | | | | | |
|---|---|---|---|---|---|---|---|
| Item | Unit | Comparative Example 61 $B_{r=1.0}$ | Comparative Example 62 $C_{r=1.0}$ | Comparative Example 63 $D_{r=1.0}$ | Comparative Example 64 $F_{r=1.0}$ | Example 29 $O_{r=1.0}$ | Example 30 $P_{r=1.0}$ |
| R32 | mass % | 25.8 | 39.8 | 0.0 | 0.0 | 20.4 | 5.9 |
| CO2 | mass % | 0.0 | 0.0 | 32.2 | 35.9 | 15.7 | 27.4 |
| R125 | mass % | 27.7 | 13.7 | 21.3 | 17.6 | 17.4 | 20.2 |
| R134a | mass % | 0.0 | 0.0 | 0.0 | 0.0 | 0.0 | 0.0 |
| R1234yf | mass % | 46.5 | 46.5 | 46.5 | 46.5 | 46.5 | 46.5 |
| GWP | — | 1146 | 750 | 750 | 618 | 750 | 750 |
| COP ratio | % (relative to that of R410A) | 101.8 | 102.0 | 92.8 | 91.7 | 96.7 | 93.9 |
| Refrigerating capacity ratio | % (relative to that of R410A) | 75.4 | 82.6 | 127.8 | 135.5 | 103.2 | 120.4 |
| Condensation glide | ° C. | 4.1 | 3.2 | 23.9 | 23.9 | 14.8 | 21.6 |

TABLE 252

| 46.5%R1234yf,r=0.31 | | | | | | | |
|---|---|---|---|---|---|---|---|
| Item | Unit | Comparative Example 65 $B_{r=0.31}$ | Comparative Example 66 $C_{r=0.31}$ | Comparative Example 67 $D_{r=0.31}$ | Comparative Example 68 $F_{r=0.31}$ | Example 31 $O_{r=0.31}$ | Example 32 $P_{r=0.31}$ |
| R32 | mass % | 16.9 | 25.9 | 0.0 | 0.0 | 16.0 | 12.2 |
| CO2 | mass % | 0.0 | 0.0 | 17.5 | 31.6 | 6.6 | 9.2 |
| R125 | mass % | 11.3 | 8.6 | 11.2 | 5.5 | 9.6 | 10.0 |
| R134a | mass % | 25.3 | 19.0 | 24.8 | 16.4 | 21.3 | 22.1 |
| R1234yf | mass % | 46.5 | 46.5 | 46.5 | 46.5 | 46.5 | 46.5 |

TABLE 252-continued

| | | | | | | | |
|---|---|---|---|---|---|---|---|
| GWP | — | 873 | 750 | 750 | 429 | 750 | 750 |
| COP ratio | % (relative to that of R410A) | 104.6 | 103.9 | 99.3 | 95.7 | 101.7 | 100.9 |
| Refrigerating capacity ratio | % (relative to that of R410A) | 61.9 | 69.1 | 87.4 | 121.8 | 75.1 | 77.9 |
| Condensation glide | ° C. | 5.0 | 4.9 | 24.4 | 27.1 | 12.3 | 15.3 |

| 46.5%R1234yf,r=0.37 | | | | | | | |
|---|---|---|---|---|---|---|---|
| Item | Unit | Comparative Example 69 $B_{r=0.37}$ | Comparative Example 70 $C_{r=0.37}$ | Comparative Example 71 $D_{r=0.37}$ | Comparative Example 72 $F_{r=0.37}$ | Example 33 $O_{r=0.37}$ | Example 34 $P_{r=0.37}$ |
| R32 | mass % | 17.9 | 28.0 | 0.0 | 0.0 | 16.6 | 12.8 |
| CO2 | mass % | 0.0 | 0.0 | 19.5 | 31.7 | 8.0 | 10.7 |
| R125 | mass % | 13.2 | 9.4 | 12.6 | 6.8 | 10.7 | 11.1 |
| R134a | mass % | 22.4 | 16.1 | 21.4 | 15.0 | 18.2 | 18.9 |
| R1234yf | mass % | 46.5 | 46.5 | 46.5 | 46.5 | 46.5 | 46.5 |
| GWP | — | 905 | 750 | 750 | 455 | 750 | 750 |
| COP ratio | % (relative to that of R410A) | 104.3 | 103.6 | 98.6 | 95.5 | 101.0 | 100.2 |
| Refrigerating capacity ratio | % (relative to that of R410A) | 63.4 | 71.1 | 93.0 | 122.4 | 79.3 | 82.3 |
| Condensation glide | ° C. | 5.0 | 4.7 | 25.0 | 26.9 | 13.2 | 16.1 |

TABLE 253

| 50%R1234yf,r=0.25 | | | | | | | | |
|---|---|---|---|---|---|---|---|---|
| Item | Unit | Comparative Example 73 A | Comparative Example 74 $B_{r=0.25}$ | Comparative Example 75 $C_{r=0.25}$ | Comparative Example 76 $D_{r=0.25}$ | Comparative Example 77 $F_{r=0.25}$ | Example 35 $O_{r=0.25}$ | Example 36 $P_{r=0.25}$ |
| R32 | mass % | 8.8 | 13.4 | 17.9 | 0.0 | 0.0 | 13.0 | 10.5 |
| CO2 | mass % | 41.2 | 0.0 | 0.0 | 11.6 | 26.1 | 3.1 | 4.7 |
| R125 | mass % | 0.0 | 9.2 | 8.0 | 9.6 | 6.0 | 8.5 | 8.7 |
| R134a | mass % | 0.0 | 27.4 | 24.1 | 28.8 | 17.9 | 25.4 | 26.1 |
| R1234yf | mass % | 50.0 | 50.0 | 50.0 | 50.0 | 50.0 | 50.0 | 50.0 |
| GWP | — | 62 | 806 | 750 | 750 | 468 | 750 | 750 |
| COP ratio | % (relative to that of R410A) | 90.3 | 105.0 | 104.7 | 100.9 | 97.7 | 103.5 | 102.9 |
| Refrigerating capacity ratio | % (relative to that of R410A) | 148.0 | 58.3 | 62.1 | 71.8 | 108.2 | 64.3 | 65.5 |
| Condensation glide | ° C. | 22.0 | 4.9 | 5.1 | 20.7 | 27.5 | 9.1 | 11.2 |

| 50%R1234yf,r=0.375 | | | | | | | |
|---|---|---|---|---|---|---|---|
| Item | Unit | Comparative Example 78 $B_{r=0.375}$ | Comparative Example 79 $C_{r=0.375}$ | Comparative Example 80 $D_{r=0.375}$ | Comparative Example 81 $F_{r=0.375}$ | Example 37 $O_{r=0.375}$ | Example 38 $P_{r=0.375}$ |
| R32 | mass % | 15.4 | 23.3 | 0.0 | 0.0 | 14.4 | 11.9 |
| CO2 | mass % | 0.0 | 0.0 | 16.1 | 27.6 | 6.1 | 8.0 |
| R125 | mass % | 13.0 | 10.0 | 12.7 | 8.5 | 11.1 | 11.3 |
| R134a | mass % | 21.6 | 16.7 | 21.2 | 13.9 | 18.4 | 18.8 |
| R1234yf | mass % | 50.0 | 50.0 | 50.0 | 50.0 | 50.0 | 50.0 |
| GWP | — | 870 | 750 | 750 | 499 | 750 | 750 |
| COP ratio | % (relative to that of R410A) | 104.4 | 103.9 | 99.5 | 96.8 | 101.8 | 101.3 |
| Refrigerating capacity ratio | % (relative to that of R410A) | 61.2 | 67.5 | 84.1 | 112.7 | 73.1 | 75.2 |
| Condensation glide | ° C. | 5.1 | 5.0 | 23.7 | 27.2 | 12.1 | 14.3 |

TABLE 254

| 50%R1234yf,r=0.5 | | | | | | | |
|---|---|---|---|---|---|---|---|
| Item | Unit | Comparative Example 82 $B_{r=0.5}$ | Comparative Example 83 $C_{r=0.5}$ | Comparative Example 84 $D_{r=0.5}$ | Comparative Example 85 $F_{r=0.5}$ | Example 39 $O_{r=0.5}$ | Example 40 $P_{r=0.5}$ |
| R32 | mass % | 17.2 | 27.2 | 0.0 | 0.0 | 15.5 | 10.8 |
| CO2 | mass % | 0.0 | 0.0 | 19.8 | 28.8 | 8.5 | 11.8 |
| R125 | mass % | 16.4 | 11.4 | 15.1 | 10.6 | 13.0 | 13.7 |
| R134a | mass % | 16.4 | 11.4 | 15.1 | 10.6 | 13.0 | 13.7 |
| R1234yf | mass % | 50.0 | 50.0 | 50.0 | 50.0 | 50.0 | 50.0 |
| GWP | — | 926 | 748 | 747 | 525 | 748 | 750 |
| COP ratio | % (relative to that of R410A) | 103.9 | 103.3 | 98.3 | 96.1 | 100.6 | 99.7 |
| Refrigerating capacity ratio | % (relative to that of R410A) | 63.9 | 71.4 | 94.5 | 116.4 | 80.3 | 84.1 |
| Condensation glide | ° C. | 5.1 | 4.8 | 25.0 | 26.8 | 13.7 | 17.2 |

| 50%R1234yf,r=0.75 | | | | | | | |
|---|---|---|---|---|---|---|---|
| Item | Unit | Comparative Example 86 $B_{r=0.75}$ | Comparative Example 87 $C_{r=0.75}$ | Comparative Example 88 $D_{r=0.75}$ | Comparative Example 89 $F_{r=0.75}$ | Example 41 $O_{r=0.75}$ | Example 42 $P_{r=0.75}$ |
| R32 | mass % | 20.4 | 32.3 | 0.0 | 0.0 | 17.1 | 7.3 |
| CO2 | mass % | 0.0 | 0.0 | 25.0 | 30.4 | 11.7 | 19.3 |
| R125 | mass % | 22.2 | 13.3 | 18.8 | 14.7 | 15.9 | 17.6 |
| R134a | mass % | 7.4 | 4.4 | 6.2 | 4.9 | 5.3 | 5.8 |
| R1234yf | mass % | 50.0 | 50.0 | 50.0 | 50.0 | 50.0 | 50.0 |
| GWP | — | 1023 | 750 | 750 | 587 | 750 | 750 |
| COP ratio | % (relative to that of R410A) | 102.9 | 102.6 | 96.3 | 94.9 | 98.8 | 97.2 |
| Refrigerating capacity ratio | % (relative to that of R410A) | 68.7 | 76.4 | 109.1 | 121.6 | 90.3 | 100.7 |
| Condensation glide | ° C. | 4.9 | 4.2 | 25.3 | 25.9 | 14.8 | 21.1 |

| 50%R1234yf,r=1.0 | | | | | | | |
|---|---|---|---|---|---|---|---|
| Item | Unit | Comparative Example 90 $B_{r=1.0}$ | Comparative Example 91 $C_{r=1.0}$ | Comparative Example 92 $D_{r=1.0}$ | Comparative Example 93 $F_{r=1.0}$ | Example 43 $O_{r=1.0}$ | Example 44 $P_{r=1.0}$ |
| R32 | mass % | 23.0 | 35.5 | 0.0 | 0.0 | 18.2 | 3.9 |
| CO2 | mass % | 0.0 | 0.0 | 28.7 | 31.8 | 14.0 | 25.5 |
| R125 | mass % | 27.0 | 14.5 | 21.3 | 18.2 | 17.8 | 20.6 |
| R134a | mass % | 0.0 | 0.0 | 0.0 | 0.0 | 0.0 | 0.0 |
| R1234yf | mass % | 50.0 | 50.0 | 50.0 | 50.0 | 50.0 | 50.0 |
| GWP | — | 1102 | 750 | 750 | 639 | 750 | 750 |
| COP ratio | % (relative to that of R410A) | 102.0 | 102.1 | 94.5 | 93.7 | 97.5 | 95.1 |
| Refrigerating capacity ratio | % (relative to that of R410A) | 72.8 | 79.6 | 119.2 | 126.0 | 97.4 | 114.2 |
| Condensation glide | ° C. | 4.5 | 3.7 | 24.8 | 25.0 | 15.1 | 22.9 |

| 50%R1234yf,r=0.31 | | | | | | | |
|---|---|---|---|---|---|---|---|
| Item | Unit | Comparative Example 94 $B_{r=0.31}$ | Comparative Example 95 $C_{r=0.31}$ | Comparative Example 96 $D_{r=0.31}$ | Comparative Example 97 $F_{r=0.31}$ | Example 45 $O_{r=0.31}$ | Example 46 $P_{r=0.31}$ |
| R32 | mass % | 14.4 | 20.6 | 0.0 | 0.0 | 13.8 | 11.2 |
| CO2 | mass % | 0.0 | 0.0 | 14.0 | 27.0 | 4.6 | 6.5 |
| R125 | mass % | 11.0 | 9.1 | 11.2 | 7.3 | 9.8 | 10.0 |
| R134a | mass % | 24.6 | 20.3 | 24.8 | 15.7 | 21.8 | 22.3 |
| R1234yf | mass % | 50.0 | 50.0 | 50.0 | 50.0 | 50.0 | 50.0 |
| GWP | — | 836 | 750 | 750 | 482 | 750 | 750 |
| COP ratio | % (relative to that of R410A) | 104.7 | 104.3 | 100.2 | 97.2 | 102.6 | 102.0 |
| Refrigerating capacity ratio | % (relative to that of R410A) | 59.7 | 64.8 | 78.3 | 110.9 | 68.7 | 70.7 |
| Condensation glide | ° C. | 5.0 | 5.1 | 22.6 | 27.4 | 10.7 | 13.1 |

TABLE 254-continued

| 50%R1234yf,r=0.37 | | | | | | | |
|---|---|---|---|---|---|---|---|
| Item | Unit | Comparative Example 98 $B_{r=0.37}$ | Comparative Example 99 $C_{r=0.37}$ | Comparative Example 100 $D_{r=0.37}$ | Comparative Example 101 $F_{r=0.37}$ | Example 47 $O_{r=0.37}$ | Example 48 $P_{r=0.37}$ |
| R32 | mass % | 15.3 | 23.1 | 0.0 | 0.0 | 14.4 | 11.9 |
| CO2 | mass % | 0.0 | 0.0 | 16.0 | 27.6 | 6.0 | 7.7 |
| R125 | mass % | 12.8 | 10.0 | 12.6 | 8.5 | 11.0 | 11.2 |
| R134a | mass % | 21.9 | 16.9 | 21.4 | 13.9 | 18.6 | 19.2 |
| R1234yf | mass % | 50.0 | 50.0 | 50.0 | 50.0 | 50.0 | 50.0 |
| GWP | — | 866 | 750 | 749 | 499 | 750 | 749 |
| COP ratio | % (relative to that of R410A) | 104.5 | 103.9 | 99.6 | 96.8 | 101.9 | 101.4 |
| Refrigerating capacity ratio | % (relative to that of R410A) | 61.1 | 67.3 | 83.9 | 112.7 | 72.9 | 74.5 |
| Condensation glide | ° C. | 5.0 | 5.1 | 23.7 | 27.2 | 12.0 | 14.0 |

TABLE 255

| 41%R1234yf,r=0.25 | | | | | | | | | |
|---|---|---|---|---|---|---|---|---|---|
| Item | Unit | Example 49 | Example 50 | Example 51 | Example 52 | Example 53 | Comparative Example 102 | Example 54 | Example 55 |
| R32 | mass % | 7.0 | 7.0 | 7.0 | 7.0 | 7.0 | 7.0 | 9.0 | 9.0 |
| CO2 | mass % | 42.0 | 32.0 | 21.0 | 19.0 | 17.0 | 12.0 | 40.0 | 30.0 |
| R125 | mass % | 2.5 | 5.0 | 7.8 | 8.3 | 8.8 | 10.0 | 2.5 | 5.0 |
| R134a | mass % | 7.5 | 15.0 | 23.2 | 24.7 | 26.2 | 30.0 | 7.5 | 15.0 |
| R1234yf | mass % | 41.0 | 41.0 | 41.0 | 41.0 | 41.0 | 41.0 | 41.0 | 41.0 |
| GWP | — | 244 | 439 | 654 | 693 | 732 | 828 | 258 | 452 |
| COP ratio | % (relative to that of R410A) | 89.5 | 94.0 | 97.8 | 98.4 | 99.0 | 100.4 | 90.2 | 94.4 |
| Refrigerating capacity ratio | % (relative to that of R410A) | 149.0 | 127.2 | 101.4 | 96.5 | 91.7 | 79.7 | 145.9 | 123.9 |
| Condensation glide | ° C. | 21.3 | 23.2 | 22.8 | 22.3 | 21.5 | 18.8 | 21.0 | 22.6 |

| 41%R1234yf,r=0.25 | | | | | | | | | |
|---|---|---|---|---|---|---|---|---|---|
| Item | Unit | Example 56 | Example 57 | Comparative Example 103 | Example 58 | Example 59 | Example 60 | Comparative Example 104 | Example 61 |
| R32 | mass % | 9.0 | 9.0 | 9.0 | 11.0 | 11.0 | 11.0 | 11.0 | 15.0 |
| CO2 | mass % | 17.0 | 15.0 | 10.0 | 38.0 | 28.0 | 14.0 | 8.0 | 34.0 |
| R125 | mass % | 8.3 | 8.8 | 10.0 | 2.5 | 5.0 | 8.5 | 10.0 | 2.5 |
| R134a | mass % | 24.7 | 26.2 | 30.0 | 7.5 | 15.0 | 25.5 | 30.0 | 7.5 |
| R1234yf | mass % | 41.0 | 41.0 | 41.0 | 41.0 | 41.0 | 41.0 | 41.0 | 41.0 |
| GWP | — | 706 | 745 | 841 | 271 | 466 | 738 | 855 | 298 |
| COP ratio | % (relative to that of R410A) | 98.8 | 99.4 | 101.0 | 90.8 | 94.9 | 99.6 | 101.6 | 92.0 |
| Refrigerating capacity ratio | % (relative to that of R410A) | 93.3 | 88.5 | 76.7 | 142.8 | 120.6 | 87.7 | 73.7 | 136.6 |
| Condensation glide | ° C. | 20.9 | 20.0 | 16.7 | 20.6 | 21.9 | 18.9 | 14.6 | 19.8 |

TABLE 255-continued

| 41%R1234yf,r=0.25 | | | | | | | |
|---|---|---|---|---|---|---|---|
| Item | Unit | Example 62 | Example 63 | Comparative Example 105 | Comparative Example 106 | Comparative Example 107 | Comparative Example 108 |
| R32 | mass % | 15.0 | 15.0 | 15.0 | 25.0 | 25.0 | 25.0 |
| CO2 | mass % | 24.0 | 14.0 | 4.0 | 24.0 | 14.0 | 4.0 |
| R125 | mass % | 5.0 | 7.5 | 10.0 | 2.5 | 5.0 | 7.5 |
| R134a | mass % | 15.0 | 22.5 | 30.0 | 7.5 | 15.0 | 22.5 |
| R1234yf | mass % | 41.0 | 41.0 | 41.0 | 41.0 | 41.0 | 41.0 |
| GWP | — | 493 | 687 | 882 | 365 | 560 | 755 |
| COP ratio | % (relative to that of R410A) | 95.9 | 99.2 | 103.0 | 94.9 | 98.4 | 102.4 |
| Refrigerating capacity ratio | % (relative to that of R410A) | 114.1 | 90.8 | 68.2 | 120.8 | 98.1 | 76.1 |
| Condensation glide | ° C. | 20.2 | 17.7 | 9.9 | 16.9 | 14.9 | 8.8 |

| Item | Unit | Example 64 | Example 65 | Example 66 | Example 67 | Example 68 | Comparative Example 109 | Example 69 | Example 70 |
|---|---|---|---|---|---|---|---|---|---|
| R32 | mass % | 7.0 | 7.0 | 7.0 | 7.0 | 7.0 | 7.0 | 9.0 | 9.0 |
| CO2 | mass % | 42.0 | 32.0 | 25.0 | 23.0 | 21.0 | 12.0 | 40.0 | 30.0 |
| R125 | mass % | 3.8 | 7.5 | 10.1 | 10.9 | 11.6 | 15.0 | 3.8 | 7.5 |
| R134a | mass % | 6.2 | 12.5 | 16.9 | 18.1 | 19.4 | 25.0 | 6.2 | 12.5 |
| R1234yf | mass % | 41.0 | 41.0 | 41.0 | 41.0 | 41.0 | 41.0 | 41.0 | 41.0 |
| GWP | — | 271 | 490 | 644 | 689 | 733 | 932 | 284 | 504 |
| COP ratio | % (relative to that of R410A) | 89.3 | 93.6 | 96.1 | 96.7 | 97.3 | 100.0 | 89.9 | 94.1 |
| Refrigerating capacity ratio | % (relative to that of R410A) | 149.4 | 128.1 | 112.0 | 107.4 | 102.6 | 81.2 | 146.4 | 124.8 |
| Condensation glide | ° C. | 21.0 | 22.7 | 22.7 | 22.5 | 22.1 | 18.2 | 20.7 | 22.0 |

| 41%R1234yf,r=0.375 | | | | | | | | | |
|---|---|---|---|---|---|---|---|---|---|
| Item | Unit | Example 71 | Example 72 | Example 73 | Comparative Example 110 | Example 74 | Example 75 | Example 76 | Example 77 |
| R32 | mass % | 9.0 | 9.0 | 9.0 | 9.0 | 11.0 | 11.0 | 11.0 | 11.0 |
| CO2 | mass % | 23.0 | 21.0 | 19.0 | 10.0 | 38.0 | 28.0 | 20.0 | 18.0 |
| R125 | mass % | 10.1 | 10.9 | 11.6 | 15.0 | 3.8 | 7.5 | 10.5 | 11.3 |
| R134a | mass % | 16.9 | 18.1 | 19.4 | 25.0 | 6.2 | 12.5 | 17.5 | 18.7 |
| R1234yf | mass % | 41.0 | 41.0 | 41.0 | 41.0 | 41.0 | 41.0 | 41.0 | 41.0 |
| GWP | — | 658 | 703 | 746 | 945 | 298 | 517 | 694 | 739 |
| COP ratio | % (relative to that of R410A) | 96.5 | 97.1 | 97.7 | 100.5 | 90.6 | 94.5 | 97.2 | 97.9 |
| Refrigerating capacity ratio | % (relative to that of R410A) | 108.7 | 104.0 | 99.3 | 78.2 | 143.3 | 121.5 | 103.1 | 98.4 |
| Condensation glide | ° C. | 21.7 | 21.4 | 20.9 | 16.2 | 20.3 | 21.3 | 20.5 | 19.9 |

TABLE 255-continued

| 41%R1234yf,r=0.375 | | | | | | | | | |
|---|---|---|---|---|---|---|---|---|---|
| Item | Unit | Comparative Example 111 | Example 78 | Example 79 | Comparative Example 112 | Comparative Example 113 | Comparative Example 114 | Comparative Example 115 | Comparative Example 116 |
| R32 | mass % | 11.0 | 15.0 | 15.0 | 15.0 | 15.0 | 25.0 | 25.0 | 25.0 |
| CO2 | mass % | 8.0 | 34.0 | 24.0 | 14.0 | 4.0 | 24.0 | 14.0 | 4.0 |
| R125 | mass % | 15.0 | 3.8 | 7.5 | 11.3 | 15.0 | 3.8 | 7.5 | 11.3 |
| R134a | mass % | 25.0 | 6.2 | 12.5 | 18.7 | 25.0 | 6.2 | 12.5 | 18.7 |
| R1234yf | mass % | 41.0 | 41.0 | 41.0 | 41.0 | 41.0 | 41.0 | 41.0 | 41.0 |
| GWP | — | 958 | 325 | 544 | 766 | 985 | 392 | 612 | 833 |
| COP ratio | % (relative to that of R410A) | 101.1 | 91.8 | 95.5 | 98.8 | 102.6 | 94.7 | 98.2 | 102.0 |
| Refrigerating capacity ratio | % (relative to that of R410A) | 75.3 | 137.1 | 115.0 | 92.1 | 69.8 | 121.3 | 99.1 | 77.4 |
| Condensation glide | ° C. | 14.1 | 19.5 | 19.7 | 17.1 | 9.6 | 16.6 | 14.5 | 8.5 |

TABLE 256

| 41% R1234yf, r = 0.5 | | | | | | | | | |
|---|---|---|---|---|---|---|---|---|---|
| Item | Unit | Example 80 | Example 81 | Example 82 | Example 83 | Example 84 | Comparative Example 117 | Example 85 | Example 86 |
| R32 | mass % | 7.0 | 7.0 | 7.0 | 7.0 | 7.0 | 7.0 | 9.0 | 9.0 |
| CO2 | mass % | 42.0 | 32.0 | 29.0 | 27.0 | 25.0 | 12.0 | 40.0 | 30.0 |
| R125 | mass % | 5.0 | 10.0 | 11.5 | 12.5 | 13.5 | 20.0 | 5.0 | 10.0 |
| R134a | mass % | 5.0 | 10.0 | 11.5 | 12.5 | 13.5 | 20.0 | 5.0 | 10.0 |
| R1234yf | mass % | 41.0 | 41.0 | 41.0 | 41.0 | 41.0 | 41.0 | 41.0 | 41.0 |
| GWP | — | 296 | 542 | 616 | 665 | 715 | 1035 | 309 | 556 |
| COP ratio | % (relative to that of R410A) | 89.1 | 93.1 | 94.2 | 94.9 | 95.6 | 99.5 | 89.7 | 93.7 |
| Refrigerating capacity ratio | % (relative to that of R410A) | 149.8 | 128.9 | 122.2 | 117.7 | 113.2 | 82.8 | 146.8 | 125.6 |
| Condensation glide | ° C. | 20.7 | 22.2 | 22.3 | 22.2 | 22.1 | 17.5 | 20.4 | 21.5 |

| 41% R1234yf, r = 0.5 | | | | | | | | | |
|---|---|---|---|---|---|---|---|---|---|
| Item | Unit | Example 87 | Example 88 | Comparative Example 118 | Example 89 | Example 90 | Example 91 | Example 92 | Comparative Example 119 |
| R32 | mass % | 9.0 | 9.0 | 9.0 | 11.0 | 11.0 | 11.0 | 11.0 | 11.0 |
| CO2 | mass % | 25.0 | 23.0 | 10.0 | 38.0 | 28.0 | 23.0 | 21.0 | 8.0 |
| R125 | mass % | 12.5 | 13.5 | 20.0 | 5.0 | 10.0 | 12.5 | 13.5 | 20.0 |
| R134a | mass % | 12.5 | 13.5 | 20.0 | 5.0 | 10.0 | 12.5 | 13,5 | 20.0 |
| R1234yf | mass % | 41.0 | 41.0 | 41.0 | 41.0 | 41.0 | 41.0 | 41.0 | 41.0 |
| GWP | — | 679 | 728 | 1048 | 323 | 569 | 692 | 742 | 1062 |
| COP ratio | % (relative to that of R410A) | 95.4 | 96.0 | 100.0 | 90.4 | 94.2 | 95.9 | 96.5 | 100.7 |

TABLE 256-continued

| | | | | | | | | | |
|---|---|---|---|---|---|---|---|---|---|
| Refrigerating capacity ratio | % (relative to that of R410A) | 114.4 | 109.8 | 79.8 | 143.7 | 122.3 | 111.1 | 106.6 | 76.9 |
| Condensation glide | ° C. | 21.3 | 21.1 | 15.6 | 20.0 | 20.8 | 20.4 | 20.1 | 13.6 |

41% R1234yf, r = 0.5

| Item | Unit | Example 93 | Example 94 | Example 95 | Comparative Example 120 | Comparative Example 121 | Comparative Example 122 | Comparative Example 123 | Comparative Example 124 |
|---|---|---|---|---|---|---|---|---|---|
| R32 | mass % | 13.0 | 15.0 | 15.0 | 15.0 | 15.0 | 25.0 | 25.0 | 25.0 |
| CO2 | mass % | 20.0 | 34.0 | 24.0 | 14.0 | 4.0 | 24.0 | 14.0 | 4.0 |
| R125 | mass % | 13.0 | 5.0 | 10.0 | 15.0 | 20.0 | 5.0 | 10.0 | 15.0 |
| R134a | mass % | 13.0 | 5.0 | 10.0 | 15.0 | 20.0 | 5.0 | 10.0 | 15.0 |
| R1234yf | mass % | 41.0 | 41.0 | 41.0 | 41.0 | 41.0 | 41.0 | 41.0 | 41.0 |
| GWP | — | 730 | 350 | 596 | 843 | 1089 | 417 | 664 | 910 |
| COP ratio | % (relative to that of R410A) | 96.7 | 91.6 | 95.2 | 98.4 | 102.1 | 94.6 | 97.9 | 101.6 |
| Refrigerating capacity ratio | % (relative to that of R410A) | 105.6 | 137.5 | 115.8 | 93.4 | 71.4 | 121.7 | 100.0 | 78.7 |
| Condensation glide | ° C. | 19.2 | 19.2 | 19.2 | 16.5 | 9.2 | 16.4 | 14.1 | 8.1 |

41% R1234yf, r = 0.75

| Item | Unit | Example 96 | Example 97 | Example 98 | Comparative Example 125 | Example 99 | Example 100 | Comparative Example 126 | Example 101 |
|---|---|---|---|---|---|---|---|---|---|
| R32 | mass % | 7.0 | 7.0 | 7.0 | 7.0 | 9.0 | 9.0 | 9.0 | 11.0 |
| CO2 | mass % | 42.0 | 31.0 | 29.0 | 12.0 | 40.0 | 28.0 | 10.0 | 38.0 |
| R125 | mass % | 7.5 | 15.8 | 17.3 | 30.0 | 7.5 | 16.5 | 30.0 | 7.5 |
| R134a | mass % | 2.5 | 5.2 | 5.7 | 10.0 | 2.5 | 5.5 | 10.0 | 2.5 |
| R1234yf | mass % | 41.0 | 41.0 | 41.0 | 41.0 | 41.0 | 41.0 | 41.0 | 41.0 |
| GWP | — | 348 | 677 | 736 | 1242 | 361 | 719 | 1255 | 375 |
| COP ratio | % (relative to that of R410A) | 88.6 | 92.6 | 93.3 | 98.4 | 89.3 | 93.5 | 98.9 | 89.9 |
| Refrigerating capacity ratio | % (relative to that of R410A) | 150.6 | 128.4 | 124.1 | 86.1 | 147.6 | 123.0 | 83.1 | 144.5 |
| Condensation glide | ° C. | 20.1 | 21.1 | 21.0 | 16.2 | 19.8 | 20.4 | 14.4 | 19.4 |

41% R1234yf, r = 0.75

| Item | Unit | Example 102 | Comparative Example 127 | Example 103 | Example 104 | Comparative Example 128 | Comparative Example 129 | Comparative Example 130 | Comparative Example 131 | Comparative Example 132 |
|---|---|---|---|---|---|---|---|---|---|---|
| R32 | mass % | 11.0 | 11.0 | 15.0 | 15.0 | 15.0 | 15.0 | 25.0 | 25.0 | 25.0 |
| CO2 | mass % | 28.0 | 8.0 | 34.0 | 24.0 | 14.0 | 4.0 | 24.0 | 14.0 | 4.0 |
| R125 | mass % | 15.0 | 30.0 | 7.5 | 15.0 | 22.5 | 30.0 | 7.5 | 15.0 | 22.5 |
| R134a | mass % | 5.0 | 10.0 | 2.5 | 5.0 | 7.5 | 10.0 | 2.5 | 5.0 | 7.5 |
| R1234yf | mass % | 41.0 | 41.0 | 41.0 | 41.0 | 41.0 | 41.0 | 41.0 | 41.0 | 41.0 |
| GWP | — | 673 | 1269 | 401 | 700 | 998 | 1296 | 469 | 767 | 1065 |
| COP ratio | % (relative to that of R410A) | 93.4 | 99.6 | 91.2 | 94.5 | 97.5 | 101.0 | 94.2 | 97.3 | 100.8 |

TABLE 256-continued

| | | | | | | | | | | |
|---|---|---|---|---|---|---|---|---|---|---|
| Refrigerating capacity ratio | % (relative to that of R410A) | 124.0 | 80.2 | 138.4 | 117.6 | 96.0 | 74.6 | 122.7 | 101.9 | 81.4 |
| Condensation glide | ° C. | 19.8 | 12.5 | 18.7 | 18.2 | 15.4 | 8.5 | 15.8 | 13.3 | 7.5 |

TABLE 257

| 43% R1234yf, r = 0.25 | | | | | | | | | |
|---|---|---|---|---|---|---|---|---|---|
| Item | Unit | Example 105 | Example 106 | Example 107 | Example 108 | Example 109 | Comparative Example 133 | Example 110 | Example 111 |
| R32 | mass % | 7.0 | 7.0 | 7.0 | 7.0 | 7.0 | 7.0 | 9.0 | 9.0 |
| CO2 | mass % | 40.0 | 30.0 | 19.0 | 17.0 | 15.0 | 10.0 | 38.0 | 28.0 |
| R125 | mass % | 2.5 | 5.0 | 7.8 | 8.3 | 8.8 | 10.0 | 2.5 | 5.0 |
| R134a | mass % | 7.5 | 15.0 | 23.2 | 24.7 | 26.2 | 30.0 | 7.5 | 15.0 |
| R1234yf | mass % | 43.0 | 43.0 | 43.0 | 43.0 | 43.0 | 43.0 | 43.0 | 43.0 |
| GWP | — | 244 | 439 | 654 | 693 | 732 | 828 | 258 | 452 |
| COP ratio | % (relative to that of R410A) | 90.6 | 94.8 | 98.4 | 99.0 | 99.6 | 101.1 | 91.2 | 95.3 |
| Refrigerating capacity ratio | % (relative to that of R410A) | 144.7 | 122.6 | 96.5 | 91.6 | 86.8 | 74.9 | 141.6 | 119.3 |
| Condensation glide | ° C. | 22.1 | 23.6 | 22.4 | 21.7 | 20.7 | 17.3 | 21.7 | 22.8 |

| 43% R1234yf, r = 0.25 | | | | | | | | | |
|---|---|---|---|---|---|---|---|---|---|
| Item | Unit | Example 112 | Example 113 | Comparative Example 134 | Example 114 | Example 115 | Example 116 | Comparative Example 135 | Comparative Example 136 |
| R32 | mass % | 9.0 | 9.0 | 9.0 | 11.0 | 11.0 | 11.0 | 11.0 | 15.0 |
| CO2 | mass % | 15.0 | 13.0 | 8.0 | 36.0 | 26.0 | 12.0 | 6.0 | 32.0 |
| R125 | mass % | 8.3 | 8.8 | 10.0 | 2.5 | 5.0 | 8.5 | 10.0 | 2.5 |
| R134a | mass % | 24.7 | 26.2 | 30.0 | 7.5 | 15.0 | 25.5 | 30.0 | 7.5 |
| R1234yf | mass % | 43.0 | 43.0 | 43.0 | 43.0 | 43.0 | 43.0 | 43.0 | 43.0 |
| GWP | — | 706 | 745 | 842 | 271 | 466 | 738 | 855 | 298 |
| COP ratio | % (relative to that of R410A) | 99.4 | 100.0 | 101.7 | 91.8 | 95.7 | 100.2 | 102.4 | 92.9 |
| Refrigerating capacity ratio | % (relative to that of R410A) | 88.4 | 83.6 | 72.0 | 138.5 | 116.0 | 82.9 | 69.2 | 132.1 |
| Condensation glide | ° C. | 20.1 | 19.0 | 15.0 | 21.2 | 22.0 | 17.8 | 12.6 | 20.2 |

| 43% R1234yf, r = 0.25 | | | | | | | |
|---|---|---|---|---|---|---|---|
| Item | Unit | Example 117 | Example 118 | Comparative Example 137 | Comparative Example 138 | Comparative Example 139 | Comparative Example 140 |
| R32 | mass % | 15.0 | 15.0 | 15.0 | 25.0 | 25.0 | 25.0 |
| CO2 | mass % | 22.0 | 12.0 | 2.0 | 22.0 | 12.0 | 2.0 |
| R125 | mass % | 5.0 | 7.5 | 10.0 | 2.5 | 5.0 | 7.5 |
| R134a | mass % | 15.0 | 22.5 | 30.0 | 7.5 | 15.0 | 22.5 |
| R1234yf | mass % | 43.0 | 43.0 | 43.0 | 43.0 | 43.0 | 43.0 |
| GWP | — | 493 | 687 | 882 | 365 | 560 | 755 |
| COP ratio | % (relative to that of R410A) | 96.6 | 99.9 | 104.0 | 95.6 | 99.2 | 103.3 |

TABLE 257-continued

| | | | | | | | |
|---|---|---|---|---|---|---|---|
| Refrigerating capacity ratio | % (relative to that of R410A) | 109.4 | 86.1 | 63.9 | 116.2 | 93.6 | 71.9 |
| Condensation glide | ° C. | 20.1 | 16.7 | 7.5 | 16.8 | 14.1 | 6.9 |

| 43% R1234yf, r = 0.303 | | | | | | | | | |
|---|---|---|---|---|---|---|---|---|---|
| Item | Unit | Example 119 | Example 120 | Example 121 | Example 122 | Example 123 | Comparative Example 141 | Example 124 | Example 125 |
| R32 | mass % | 7.0 | 7.0 | 7.0 | 7.0 | 7.0 | 7.0 | 9.0 | 9.0 |
| CO2 | mass % | 40.0 | 30.0 | 21.0 | 19.0 | 17.0 | 10.0 | 38.0 | 28.0 |
| R125 | mass % | 3.0 | 6.1 | 8.8 | 9.4 | 10.0 | 12.1 | 3.0 | 6.1 |
| R134a | mass % | 7.0 | 13.9 | 20.2 | 21.6 | 23.0 | 27.9 | 7.0 | 13.9 |
| R1234yf | mass % | 43.0 | 43.0 | 43.0 | 43.0 | 43.0 | 43.0 | 43.0 | 43.0 |
| GWP | — | 254 | 462 | 646 | 687 | 728 | 872 | 268 | 475 |
| COP ratio | % (relative to that of R410A) | 90.5 | 94.7 | 97.7 | 98.3 | 98.8 | 100.9 | 91.1 | 95.1 |
| Refrigerating capacity ratio | % (relative to that of R410A) | 144.9 | 123.0 | 101.8 | 97.0 | 92.1 | 75.5 | 141.8 | 119.6 |
| Condensation glide | ° C. | 22.0 | 23.4 | 22.7 | 22.1 | 21.4 | 17.0 | 21.6 | 22.6 |

| 43% R1234yf, r = 0.303 | | | | | | | | | |
|---|---|---|---|---|---|---|---|---|---|
| Item | Unit | Example 126 | Example 127 | Example 128 | Comparative Example 142 | Example 129 | Example 130 | Example 131 | Comparative Example 143 |
| R32 | mass % | 9.0 | 9.0 | 9.0 | 9.0 | 11.0 | 11.0 | 11.0 | 11.0 |
| CO2 | mass % | 19.0 | 17.0 | 15.0 | 8.0 | 36.0 | 26.0 | 14.0 | 6.0 |
| R125 | mass % | 8.8 | 9.4 | 10.0 | 12.1 | 3.0 | 6.1 | 9.7 | 12.1 |
| R134a | mass % | 20.2 | 21.6 | 23.0 | 27.9 | 7.0 | 13.9 | 22.3 | 27.9 |
| R1234yf | mass % | 43.0 | 43.0 | 43.0 | 43.0 | 43.0 | 43.0 | 43.0 | 43.0 |
| GWP | — | 660 | 701 | 742 | 885 | 281 | 489 | 735 | 899 |
| COP ratio | % (relative to that of R410A) | 98.1 | 98.7 | 99.3 | 101.5 | 91.7 | 95.6 | 99.4 | 102.2 |
| Refrigerating capacity ratio | % (relative to that of R410A) | 98.5 | 93.7 | 89.0 | 72.6 | 138.6 | 116.3 | 88.2 | 69.8 |
| Condensation glide | ° C. | 21.4 | 20.7 | 19.8 | 14.8 | 21.1 | 21.8 | 18.7 | 12.4 |

| 43% R1234yf, r = 0.303 | | | | | | | | |
|---|---|---|---|---|---|---|---|---|
| Item | Unit | Example 132 | Example 133 | Example 134 | Comparative Example 144 | Comparative Example 145 | Comparative Example 146 | Comparative Example 147 |
| R32 | mass % | 15.0 | 15.0 | 15.0 | 15.0 | 25.0 | 25.0 | 25.0 |
| CO2 | mass % | 32.0 | 22.0 | 12.0 | 2.0 | 22.0 | 12.0 | 2.0 |
| R125 | mass % | 3.0 | 6.1 | 9.1 | 12.1 | 3.0 | 6.1 | 9.1 |
| R134a | mass % | 7.0 | 13.9 | 20.9 | 27.9 | 7.0 | 13.9 | 20.9 |
| R1234yf | mass % | 43.0 | 43.0 | 43.0 | 43.0 | 43.0 | 43.0 | 43.0 |
| GWP | — | 308 | 515 | 720 | 925 | 376 | 583 | 788 |
| COP ratio | % (relative to that of R410A) | 92.8 | 96.5 | 99.8 | 103.8 | 95.6 | 99.0 | 103.1 |
| Refrigerating capacity ratio | % (relative to that of R410A) | 132.3 | 109.8 | 86.6 | 64.5 | 116.4 | 94.0 | 72.4 |
| Condensation glide | ° C. | 20.1 | 19.9 | 16.5 | 7.4 | 16.7 | 13.9 | 6.8 |

TABLE 258

| 43% R1234yf, r = 0.355 | | | | | | | | | |
|---|---|---|---|---|---|---|---|---|---|
| Item | Unit | Example 135 | Example 136 | Example 137 | Example 138 | Example 139 | Comparative Example 148 | Example 140 | Example 141 |
| R32 | mass % | 7.0 | 7.0 | 7.0 | 7.0 | 7.0 | 7.0 | 9.0 | 9.0 |
| CO2 | mass % | 40.0 | 30.0 | 23.0 | 21.0 | 19.0 | 10.0 | 38.0 | 28.0 |
| R125 | mass % | 3.6 | 7.1 | 9.6 | 10.3 | 11.0 | 14.2 | 3.6 | 7.1 |
| R134a | mass % | 6.4 | 12.9 | 17.4 | 18.7 | 20.0 | 25.8 | 6.4 | 12.9 |
| R1234yf | mass % | 43.0 | 43.0 | 43.0 | 43.0 | 43.0 | 43.0 | 43.0 | 43.0 |
| GWP | — | 267 | 482 | 634 | 677 | 720 | 915 | 280 | 496 |
| COP ratio | % (relative to that of R410A) | 90.4 | 94.5 | 96.9 | 97.5 | 98.1 | 100.7 | 91.0 | 95.0 |
| Refrigerating capacity ratio | % (relative to that of R410A) | 145.1 | 123.3 | 107.0 | 102.3 | 97.5 | 76.1 | 142.0 | 120.0 |
| Condensation glide | ° C. | 21.8 | 23.2 | 22.8 | 22.4 | 21.9 | 16.8 | 21.4 | 22.4 |

| 43% R1234yf, r = 0.355 | | | | | | | | | |
|---|---|---|---|---|---|---|---|---|---|
| Item | Unit | Example 142 | Example 143 | Comparative Example 149 | Example 144 | Example 145 | Example 146 | Example 147 | Comparative Example 150 |
| R32 | mass % | 9.0 | 9.0 | 9.0 | 11.0 | 11.0 | 11.0 | 11.0 | 11.0 |
| CO2 | mass % | 19.0 | 17.0 | 8.0 | 36.0 | 26.0 | 17.0 | 15.0 | 6.0 |
| R125 | mass % | 10.3 | 11.0 | 14.2 | 3.6 | 7.1 | 10.3 | 11.0 | 14.2 |
| R134a | mass % | 18.7 | 20.0 | 25.8 | 6.4 | 12.9 | 18.7 | 20.0 | 25.8 |
| R1234yf | mass % | 43.0 | 43.0 | 43.0 | 43.0 | 43.0 | 43.0 | 43.0 | 43.0 |
| GWP | — | 691 | 734 | 928 | 294 | 509 | 704 | 747 | 942 |
| COP ratio | % (relative to that of R410A) | 97.9 | 98.5 | 101.3 | 91.6 | 95.4 | 98.3 | 98.9 | 102.0 |
| Refrigerating capacity ratio | % (relative to that of R410A) | 99.0 | 94.2 | 73.2 | 138.8 | 116.7 | 95.7 | 91.0 | 70.4 |
| Condensation glide | ° C. | 21.1 | 20.5 | 14.6 | 21.0 | 21.6 | 19.8 | 19.0 | 12.3 |

| 43% R1234yf, r = 0.355 | | | | | | | | |
|---|---|---|---|---|---|---|---|---|
| Item | Unit | Example 148 | Example 149 | Comparative Example 151 | Comparative Example 152 | Comparative Example 153 | Comparative Example 154 | Comparative Example 155 |
| R32 | mass % | 15.0 | 15.0 | 15.0 | 15.0 | 25.0 | 25.0 | 25.0 |
| CO2 | mass % | 32.0 | 22.0 | 12.0 | 2.0 | 22.0 | 12.0 | 2.0 |
| R125 | mass % | 3.6 | 7.1 | 10.7 | 14.2 | 3.6 | 7.1 | 10.7 |
| R134a | mass % | 6.4 | 12.9 | 19.3 | 25.8 | 6.4 | 12.9 | 19.3 |
| R1234yf | mass % | 43.0 | 43.0 | 43.0 | 43.0 | 43.0 | 43.0 | 43.0 |
| GWP | — | 321 | 536 | 754 | 969 | 388 | 604 | 821 |
| COP ratio | % (relative to that of R410A) | 92.7 | 96.3 | 99.6 | 103.6 | 95.5 | 98.9 | 103.0 |
| Refrigerating capacity ratio | % (relative to that of R410A) | 132.5 | 110.1 | 87.2 | 65.2 | 116.6 | 94.4 | 73.0 |
| Condensation glide | ° C. | 20.0 | 19.7 | 16.3 | 7.3 | 16.6 | 13.8 | 6.7 |

| 43% R1234yf, r = 0.375 | | | | | | | | | |
|---|---|---|---|---|---|---|---|---|---|
| Item | Unit | Example 150 | Example 151 | Example 152 | Example 153 | Example 154 | Comparative Example 156 | Example 155 | Example 156 |
| R32 | mass % | 7.0 | 7.0 | 7.0 | 7.0 | 7.0 | 7.0 | 9.0 | 9.0 |
| CO2 | mass % | 40.0 | 30.0 | 23.0 | 21.0 | 19.0 | 10.0 | 38.0 | 28.0 |
| R125 | mass % | 3.8 | 7.5 | 10.1 | 10.9 | 11.6 | 15.0 | 3.8 | 7.5 |
| R134a | mass % | 6.2 | 12.5 | 16.9 | 18.1 | 19.4 | 25.0 | 6.2 | 12.5 |
| R1234yf | mass % | 43.0 | 43.0 | 43.0 | 43.0 | 43.0 | 43.0 | 43.0 | 43.0 |
| GWP | — | 271 | 491 | 644 | 690 | 733 | 932 | 285 | 504 |
| COP ratio | % (relative to that of R410A) | 90.4 | 94.5 | 96.8 | 97.4 | 98.0 | 100.6 | 91.0 | 94.9 |

TABLE 258-continued

| | | | | | | | | | |
|---|---|---|---|---|---|---|---|---|---|
| Refrigerating capacity ratio | % (relative to that of R410A) | 145.2 | 123.4 | 107.2 | 102.4 | 97.7 | 76.4 | 142.0 | 120.1 |
| Condensation glide | ° C. | 21.8 | 23.1 | 22.7 | 22.3 | 21.8 | 16.7 | 21.4 | 22.3 |

43% R1234yf, r = 0.375

| Item | Unit | Example 157 | Example 158 | Example 159 | Comparative Example 157 | Example 160 | Example 161 | Example 162 | Comparative Example 158 |
|---|---|---|---|---|---|---|---|---|---|
| R32 | mass % | 9.0 | 9.0 | 9.0 | 9.0 | 11.0 | 11.0 | 11.0 | 11.0 |
| CO2 | mass % | 21.0 | 19.0 | 17.0 | 8.0 | 36.0 | 26.0 | 16.0 | 6.0 |
| R125 | mass % | 10.1 | 10.9 | 11.6 | 15.0 | 3.8 | 7.5 | 11.3 | 15.0 |
| R134a | mass % | 16.9 | 18.1 | 19.4 | 25.0 | 6.2 | 12.5 | 18.7 | 25.0 |
| R1234yf | mass % | 43.0 | 43.0 | 43.0 | 43.0 | 43.0 | 43.0 | 43.0 | 43.0 |
| GWP | — | 658 | 703 | 746 | 945 | 298 | 517 | 739 | 959 |
| COP ratio | % (relative to that of R410A) | 97.2 | 97.8 | 98.4 | 101.3 | 91.6 | 95.4 | 98.6 | 101.9 |
| Refrigerating capacity ratio | % (relative to that of R410A) | 103.9 | 99.2 | 94.4 | 73.5 | 138.9 | 116.8 | 93.6 | 70.7 |
| Condensation glide | ° C. | 21.6 | 21.0 | 20.4 | 14.5 | 20.9 | 21.5 | 19.3 | 12.2 |

43% R1234yf, r = 0.375

| Item | Unit | Example 163 | Example 164 | Comparative Example 159 | Comparative Example 160 | Comparative Example 161 | Comparative Example 162 | Comparative Example 163 |
|---|---|---|---|---|---|---|---|---|
| R32 | mass % | 15.0 | 15.0 | 15.0 | 15.0 | 25.0 | 25.0 | 25.0 |
| CO2 | mass % | 32.0 | 22.0 | 12.0 | 2.0 | 22.0 | 12.0 | 2.0 |
| R125 | mass % | 3.8 | 7.5 | 11.3 | 15.0 | 3.8 | 7.5 | 11.3 |
| R134a | mass % | 6.2 | 12.5 | 18.7 | 25.0 | 6.2 | 12.5 | 18.7 |
| R1234yf | mass % | 43.0 | 43.0 | 43.0 | 43.0 | 43.0 | 43.0 | 43.0 |
| GWP | — | 325 | 544 | 766 | 985 | 392 | 612 | 833 |
| COP ratio | % (relative to that of R410A) | 92.7 | 96.3 | 99.6 | 103.5 | 95.5 | 98.9 | 102.9 |
| Refrigerating capacity ratio | % (relative to that of R410A) | 132.6 | 110.3 | 87.4 | 65.4 | 116.7 | 94.5 | 73.2 |
| Condensation glide | ° C. | 19.9 | 19.7 | 16.2 | 7.3 | 16.5 | 13.7 | 6.7 |

TABLE 259

43% R1234yf, r = 0.5

| Item | Unit | Example 165 | Example 166 | Example 167 | Example 168 | Example 169 | Comparative Example 164 | Example 170 | Example 171 |
|---|---|---|---|---|---|---|---|---|---|
| R32 | mass % | 7.0 | 7.0 | 7.0 | 7.0 | 7.0 | 7.0 | 9.0 | 9.0 |
| CO2 | mass % | 40.0 | 30.0 | 27.0 | 25.0 | 23.0 | 10.0 | 38.0 | 28.0 |
| R125 | mass % | 5.0 | 10.0 | 11.5 | 12.5 | 13.5 | 20.0 | 5.0 | 10.0 |
| R134a | mass % | 5.0 | 10.0 | 11.5 | 12.5 | 13.5 | 20.0 | 5.0 | 10.0 |
| R1234yf | mass % | 43.0 | 43.0 | 43.0 | 43.0 | 43.0 | 43.0 | 43.0 | 43.0 |
| GWP | — | 296 | 542 | 616 | 665 | 715 | 1035 | 309 | 556 |
| COP ratio | % (relative to that of R410A) | 90.2 | 94.1 | 95.1 | 95.7 | 96.4 | 100.2 | 90.8 | 94.5 |
| Refrigerating capacity ratio | % (relative to that of R410A) | 145.5 | 124.2 | 117.5 | 112.9 | 108.3 | 77.9 | 142.4 | 120.9 |
| Condensation glide | ° C. | 21.5 | 22.6 | 22.5 | 22.4 | 22.1 | 16.2 | 21.1 | 21.8 |

TABLE 259-continued

| 43% R1234yf, r = 0.5 | | | | | | | | | |
|---|---|---|---|---|---|---|---|---|---|
| Item | Unit | Example 172 | Example 173 | Comparative Example 165 | Example 174 | Example 175 | Example 176 | Comparative Example 166 | Example 177 |
| R32 | mass % | 9.0 | 9.0 | 9.0 | 11.0 | 11.0 | 11.0 | 11.0 | 13.0 |
| CO2 | mass % | 23.0 | 21.0 | 8.0 | 36.0 | 26.0 | 20.0 | 6.0 | 18.0 |
| R125 | mass % | 12.5 | 13.5 | 20.0 | 5.0 | 10.0 | 13.0 | 20.0 | 13.0 |
| R134a | mass % | 12.5 | 13.5 | 20.0 | 5.0 | 10.0 | 13.0 | 20.0 | 13.0 |
| R1234yf | mass % | 43.0 | 43.0 | 43.0 | 43.0 | 43.0 | 43.0 | 43.0 | 43.0 |
| GWP | — | 679 | 728 | 1049 | 323 | 569 | 717 | 1062 | 731 |
| COP ratio | % (relative to that of R410A) | 96.2 | 96.8 | 100.8 | 91.4 | 95.0 | 96.9 | 101.5 | 97.4 |
| Refrigerating capacity ratio | % (relative to that of R410A) | 109.6 | 105.0 | 75.0 | 139.3 | 117.6 | 104.0 | 72.2 | 100.8 |
| Condensation glide | ° C. | 21.4 | 21.0 | 14.1 | 20.7 | 21.0 | 20.1 | 11.8 | 18.8 |

| 43% R1234yf, r = 0.5 | | | | | | | | |
|---|---|---|---|---|---|---|---|---|
| Item | Unit | Example 178 | Example 179 | Comparative Example 167 | Comparative Example 168 | Comparative Example 169 | Comparative Example 170 | Comparative Example 171 |
| R32 | mass % | 15.0 | 15.0 | 15.0 | 15.0 | 25.0 | 25.0 | 25.0 |
| CO2 | mass % | 32.0 | 22.0 | 12.0 | 2.0 | 22.0 | 12.0 | 2.0 |
| R125 | mass % | 5.0 | 10.0 | 15.0 | 20.0 | 5.0 | 10.0 | 15.0 |
| R134a | mass % | 5.0 | 10.0 | 15.0 | 20.0 | 5.0 | 10.0 | 15.0 |
| R1234yf | mass % | 43.0 | 43.0 | 43.0 | 43.0 | 43.0 | 43.0 | 43.0 |
| GWP | — | 350 | 596 | 843 | 1089 | 417 | 664 | 910 |
| COP ratio | % (relative to that of R410A) | 92.5 | 96.0 | 99.2 | 103.0 | 95.3 | 98.6 | 102.5 |
| Refrigerating capacity ratio | % (relative to that of R410A) | 133.0 | 111.1 | 88.6 | 67.0 | 117.2 | 95.4 | 74.4 |
| Condensation glide | ° C. | 19.7 | 19.2 | 15.7 | 7.1 | 16.3 | 13.3 | 6.5 |

| 43% R1234yf, r = 0.75 | | | | | | | | | |
|---|---|---|---|---|---|---|---|---|---|
| Item | Unit | Example 180 | Example 181 | Example 182 | Comparative Example 172 | Example 183 | Example 184 | Comparative Example 173 | Example 185 |
| R32 | mass % | 7.0 | 7.0 | 7.0 | 7.0 | 9.0 | 9.0 | 9.0 | 15.0 |
| CO2 | mass % | 40.0 | 29.0 | 27.0 | 10.0 | 38.0 | 26.0 | 8.0 | 32.0 |
| R125 | mass % | 7.5 | 15.8 | 17.3 | 30.0 | 7.5 | 16.5 | 30.0 | 7.5 |
| R134a | mass % | 2.5 | 5.2 | 5.7 | 10.0 | 2.5 | 5.5 | 10.0 | 2.5 |
| R1234yf | mass % | 43.0 | 43.0 | 43.0 | 43.0 | 43.0 | 43.0 | 43.0 | 43.0 |
| GWP | — | 348 | 677 | 736 | 1242 | 361 | 719 | 1256 | 402 |
| COP ratio | % (relative to that of R410A) | 89.7 | 93.6 | 94.2 | 99.1 | 90.3 | 94.4 | 99.7 | 92.1 |
| Refrigerating capacity ratio | % (relative to that of R410A) | 146.3 | 123.7 | 119.3 | 81.1 | 143.2 | 118.2 | 78.2 | 133.9 |
| Condensation glide | ° C. | 20.9 | 21.5 | 21.4 | 15.1 | 20.5 | 20.6 | 13.1 | 19.1 |

TABLE 259-continued

| 43% R1234yf, r = 0.75 | | | | | | | |
|---|---|---|---|---|---|---|---|
| Item | Unit | Example 186 | Comparative Example 174 | Comparative Example 175 | Comparative Example 176 | Comparative Example 177 | Example 187 |
| R32 | mass % | 15.0 | 15.0 | 15.0 | 25.0 | 25.0 | 25.0 |
| CO2 | mass % | 22.0 | 12.0 | 2.0 | 22.0 | 12.0 | 2.0 |
| R125 | mass % | 15.0 | 22.5 | 30.0 | 7.5 | 15.0 | 22.5 |
| R134a | mass % | 5.0 | 7.5 | 10.0 | 2.5 | 5.0 | 7.5 |
| R1234yf | mass % | 43.0 | 43.0 | 43.0 | 43.0 | 43.0 | 43.0 |
| GWP | — | 700 | 998 | 1296 | 469 | 767 | 1065 |
| COP ratio | % (relative to that of R410A) | 95.3 | 98.3 | 101.9 | 95.0 | 98.1 | 101.7 |
| Refrigerating capacity ratio | % (relative to that of R410A) | 112.9 | 91.2 | 70.1 | 118.1 | 97.3 | 77.0 |
| Condensation glide | ° C. | 18.2 | 14.6 | 6.7 | 15.8 | 12.6 | 6.0 |

TABLE 260

| 45% R1234yf, r = 0.25 | | | | | | | | | |
|---|---|---|---|---|---|---|---|---|---|
| Item | Unit | Example 188 | Example 189 | Example 190 | Example 191 | Example 192 | Comparative Example 178 | Example 193 | Example 194 |
| R32 | mass % | 7.0 | 7.0 | 7.0 | 7.0 | 7.0 | 7.0 | 9.0 | 9.0 |
| CO2 | mass % | 38.0 | 28.0 | 17.0 | 15.0 | 13.0 | 8.0 | 36.0 | 26.0 |
| R125 | mass % | 2.5 | 5.0 | 7.8 | 8.3 | 8.8 | 10.0 | 2.5 | 5.0 |
| R134a | mass % | 7.5 | 15.0 | 23.2 | 24.7 | 26.2 | 30.0 | 7.5 | 15.0 |
| R1234yf | mass % | 45.0 | 45.0 | 45.0 | 45.0 | 45.0 | 45.0 | 45.0 | 45.0 |
| GWP | — | 244 | 439 | 654 | 693 | 732 | 828 | 258 | 452 |
| COP ratio | % (relative to that of R410A) | 91.7 | 95.7 | 99.1 | 99.6 | 100.2 | 101.8 | 92.2 | 96.1 |
| Refrigerating capacity ratio | % (relative to that of R410A) | 140.4 | 117.9 | 91.5 | 86.7 | 81.9 | 70.1 | 137.2 | 114.5 |
| Condensation glide | ° C. | 22.8 | 23.9 | 21.8 | 20.8 | 19.6 | 15.4 | 22.3 | 23.0 |

| 45% R1234yf, r = 0.25 | | | | | | | | | |
|---|---|---|---|---|---|---|---|---|---|
| Item | Unit | Example 195 | Example 196 | Comparative Example 179 | Example 197 | Example 198 | Example 199 | Comparative Example 180 | Comparative Example 181 |
| R32 | mass % | 9.0 | 9.0 | 9.0 | 11.0 | 11.0 | 11.0 | 11.0 | 15.0 |
| CO2 | mass % | 13.0 | 11.0 | 6.0 | 34.0 | 24.0 | 10.0 | 4.0 | 30.0 |
| R125 | mass % | 8.3 | 8.8 | 10.0 | 2.5 | 5.0 | 8.5 | 10.0 | 2.5 |
| R134a | mass % | 24.7 | 26.2 | 30.0 | 7.5 | 15.0 | 25.5 | 30.0 | 7.5 |
| R1234yf | mass % | 45.0 | 45.0 | 45.0 | 45.0 | 45.0 | 45.0 | 45.0 | 45.0 |
| GWP | — | 706 | 745 | 842 | 271 | 466 | 738 | 855 | 298 |
| COP ratio | % (relative to that of R410A) | 100.1 | 100.7 | 102.5 | 92.7 | 96.5 | 100.9 | 103.2 | 93.8 |
| Refrigerating capacity ratio | % (relative to that of R410A) | 83.5 | 78.8 | 67.3 | 134.0 | 111.2 | 78.2 | 64.7 | 127.6 |
| Condensation glide | ° C. | 19.0 | 17.7 | 12.8 | 21.8 | 22.0 | 16.4 | 10.2 | 20.6 |

TABLE 260-continued

| 45% R1234yf, r = 0.25 | | | | | |
|---|---|---|---|---|---|
| Item | Unit | Comparative Example 182 | Example 200 | Comparative Example 183 | Comparative Example 184 |
| R32 | mass % | 15.0 | 15.0 | 25.0 | 25.0 |
| CO2 | mass % | 20.0 | 10.0 | 20.0 | 10.0 |
| R125 | mass % | 5.0 | 7.5 | 2.5 | 5.0 |
| R134a | mass % | 15.0 | 22.5 | 7.5 | 15.0 |
| R1234yf | mass % | 45.0 | 45.0 | 45.0 | 45.0 |
| GWP | — | 493 | 687 | 366 | 560 |
| COP ratio | % (relative to that of R410A) | 97.3 | 100.6 | 96.3 | 99.9 |
| Refrigerating capacity ratio | % (relative to that of R410A) | 104.6 | 81.4 | 111.6 | 89.1 |
| Condensation glide | ° C. | 19.9 | 15.4 | 16.6 | 13.1 |

| 45% R1234yf, r = 0.375 | | | | | | | | | |
|---|---|---|---|---|---|---|---|---|---|
| Item | Unit | Example 201 | Example 202 | Example 203 | Example 204 | Example 205 | Comparative Example 185 | Example 206 | Example 207 |
| R32 | mass % | 7.0 | 7.0 | 7.0 | 7.0 | 7.0 | 7.0 | 9.0 | 9.0 |
| CO2 | mass % | 38.0 | 28.0 | 21.0 | 19.0 | 17.0 | 8.0 | 36.0 | 26.0 |
| R125 | mass % | 3.8 | 7.5 | 10.1 | 10.9 | 11.6 | 15.0 | 3.8 | 7.5 |
| R134a | mass % | 6.2 | 12.5 | 16.9 | 18.1 | 19.4 | 25.0 | 6.2 | 12.5 |
| R1234yf | mass % | 45.0 | 45.0 | 45.0 | 45.0 | 45.0 | 45.0 | 45.0 | 45.0 |
| GWP | — | 271 | 491 | 644 | 690 | 733 | 932 | 285 | 504 |
| COP ratio | % (relative to that of R410A) | 91.4 | 95.3 | 97.5 | 98.1 | 98.7 | 101.4 | 92.0 | 95.7 |
| Refrigerating capacity ratio | % (relative to that of R410A) | 140.8 | 118.7 | 102.2 | 97.5 | 92.7 | 71.6 | 137.6 | 115.3 |
| Condensation glide | ° C. | 22.5 | 23.4 | 22.5 | 21.9 | 21.2 | 15.0 | 22.0 | 22.5 |

| 45% R1234yf, r = 0.375 | | | | | | | | | |
|---|---|---|---|---|---|---|---|---|---|
| Item | Unit | Example 208 | Example 209 | Comparative Example 186 | Example 210 | Example 211 | Example 212 | Comparative Example 187 | Comparative Example 188 |
| R32 | mass % | 9.0 | 9.0 | 9.0 | 11.0 | 11.0 | 11.0 | 11.0 | 15.0 |
| CO2 | mass % | 17.0 | 15.0 | 6.0 | 34.0 | 24.0 | 14.0 | 4.0 | 30.0 |
| R125 | mass % | 10.9 | 11.6 | 15.0 | 3.8 | 7.5 | 11.3 | 15.0 | 3.8 |
| R134a | mass % | 18.1 | 19.4 | 25.0 | 6.2 | 12.5 | 18.7 | 25.0 | 6.2 |
| R1234yf | mass % | 45.0 | 45.0 | 45.0 | 45.0 | 45.0 | 45.0 | 45.0 | 45.0 |
| GWP | — | 703 | 746 | 945 | 298 | 518 | 739 | 959 | 325 |
| COP ratio | % (relative to that of R410A) | 98.5 | 99.1 | 102.0 | 92.5 | 96.1 | 99.2 | 102.8 | 93.6 |
| Refrigerating capacity ratio | % (relative to that of R410A) | 94.2 | 89.5 | 68.8 | 134.4 | 112.0 | 88.7 | 66.1 | 128.0 |
| Condensation glide | ° C. | 20.5 | 19.6 | 12.5 | 21.5 | 21.5 | 18.5 | 10.0 | 20.3 |

TABLE 260-continued

| 45% R1234yf, r = 0.375 | | | | | |
|---|---|---|---|---|---|
| Item | Unit | Example 213 | Comparative Example 189 | Comparative Example 190 | Comparative Example 191 |
| R32 | mass % | 15.0 | 15.0 | 25.0 | 25.0 |
| CO2 | mass % | 20.0 | 10.0 | 20.0 | 10.0 |
| R125 | mass % | 7.5 | 11.3 | 3.8 | 7.5 |
| R134a | mass % | 12.5 | 18.7 | 6.2 | 12.5 |
| R1234yf | mass % | 45.0 | 45.0 | 45.0 | 45.0 |
| GWP | — | 545 | 766 | 392 | 612 |
| COP ratio | % (relative to that of R410A) | 97.0 | 100.3 | 96.2 | 99.6 |
| Refrigerating capacity ratio | % (relative to that of R410A) | 105.5 | 82.7 | 112.1 | 90.0 |
| Condensation glide | ° C. | 19.4 | 15.0 | 16.3 | 12.8 |

TABLE 261

| 45% R1234yf, r = 0.5 | | | | | | | | | |
|---|---|---|---|---|---|---|---|---|---|
| Item | Unit | Example 214 | Example 215 | Example 216 | Example 217 | Comparative Example 192 | Example 218 | Example 219 | Example 220 |
| R32 | mass % | 7.0 | 7.0 | 7.0 | 7.0 | 7.0 | 9.0 | 9.0 | 9.0 |
| CO2 | mass % | 38.0 | 28.0 | 23.0 | 21.0 | 8.0 | 36.0 | 26.0 | 21.0 |
| R125 | mass % | 5.0 | 10.0 | 12.5 | 13.5 | 20.0 | 5.0 | 10.0 | 12.5 |
| R134a | mass % | 5.0 | 10.0 | 12.5 | 13.5 | 20.0 | 5.0 | 10.0 | 12.5 |
| R1234yf | mass % | 45.0 | 45.0 | 45.0 | 45.0 | 45.0 | 45.0 | 45.0 | 45.0 |
| GWP | — | 296 | 542 | 666 | 715 | 1035 | 309 | 556 | 679 |
| COP ratio | % (relative to that of R410A) | 91.2 | 94.9 | 96.5 | 97.1 | 100.9 | 91.8 | 95.4 | 96.9 |
| Refrigerating capacity ratio | % (relative to that of R410A) | 141.2 | 119.5 | 108.0 | 103.3 | 73.1 | 138.0 | 116.1 | 104.7 |
| Condensation glide | ° C. | 22.2 | 22.9 | 22.4 | 21.9 | 14.5 | 21.7 | 22.0 | 21.2 |

| 45% R1234yf, r = 0.5 | | | | | | | | | |
|---|---|---|---|---|---|---|---|---|---|
| Item | Unit | Example 221 | Comparative Example 193 | Example 222 | Example 223 | Example 224 | Comparative Example 194 | Comparative Example 195 | Example 225 |
| R32 | mass % | 9.0 | 9.0 | 11.0 | 11.0 | 11.0 | 11.0 | 15.0 | 15.0 |
| CO2 | mass % | 19.0 | 6.0 | 34.0 | 24.0 | 18.0 | 4.0 | 30.0 | 20.0 |
| R125 | mass % | 13.5 | 20.0 | 5.0 | 10.0 | 13.0 | 20.0 | 5.0 | 10.0 |
| R134a | mass % | 13.5 | 20.0 | 5.0 | 10.0 | 13.0 | 20.0 | 5.0 | 10.0 |
| R1234yf | mass % | 45.0 | 45.0 | 45.0 | 45.0 | 45.0 | 45.0 | 45.0 | 45.0 |
| GWP | — | 728 | 1049 | 323 | 569 | 717 | 1062 | 350 | 596 |
| COP ratio | % (relative to that of R410A) | 97.5 | 101.6 | 92.3 | 95.8 | 97.6 | 102.3 | 93.4 | 96.7 |
| Refrigerating capacity ratio | % (relative to that of R410A) | 100.1 | 70.3 | 134.8 | 112.9 | 99.1 | 67.6 | 128.4 | 106.4 |
| Condensation glide | ° C. | 20.7 | 12.2 | 21.2 | 21.1 | 19.7 | 9.7 | 20.0 | 19.0 |

TABLE 261-continued

| 45% R1234yf, r = 0.5 | | | | |
|---|---|---|---|---|
| Item | Unit | Comparative Example 196 | Comparative Example 197 | Comparative Example 198 |
| R32 | mass % | 15.0 | 25.0 | 25.0 |
| CO2 | mass % | 10.0 | 20.0 | 10.0 |
| R125 | mass % | 15.0 | 5.0 | 10.0 |
| R134a | mass % | 15.0 | 5.0 | 10.0 |
| R1234yf | mass % | 45.0 | 45.0 | 45.0 |
| GWP | — | 843 | 417 | 664 |
| COP ratio | % (relative to that of R410A) | 99.9 | 96.0 | 99.4 |
| Refrigerating capacity ratio | % (relative to that of R410A) | 83.9 | 112.6 | 90.9 |
| Condensation glide | ° C. | 14.6 | 16.1 | 12.4 |

| 45% R1234yf, r = 0.75 | | | | | | | | | |
|---|---|---|---|---|---|---|---|---|---|
| Item | Unit | Example 226 | Example 227 | Comparative Example 199 | Comparative Example 200 | Example 228 | Example 229 | Example 230 | Example 231 |
| R32 | mass % | 7.0 | 7.0 | 7.0 | 7.0 | 9.0 | 9.0 | 15.0 | 15.0 |
| CO2 | mass % | 38.0 | 26.0 | 18.0 | 8.0 | 36.0 | 23.0 | 30.0 | 20.0 |
| R125 | mass % | 7.5 | 16.5 | 22.5 | 30.0 | 7.5 | 17.3 | 7.5 | 15.0 |
| R134a | mass % | 2.5 | 5.5 | 7.5 | 10.0 | 2.5 | 5.7 | 2.5 | 5.0 |
| R1234yf | mass % | 45.0 | 45.0 | 45.0 | 45.0 | 45.0 | 45.0 | 45.0 | 45.0 |
| GWP | — | 348 | 705 | 944 | 1242 | 361 | 750 | 402 | 700 |
| COP ratio | % (relative to that of R410A) | 90.8 | 94.8 | 97.0 | 99.9 | 91.4 | 95.5 | 93.0 | 96.1 |
| Refrigerating capacity ratio | % (relative to that of R410A) | 142.0 | 116.7 | 98.7 | 76.2 | 138.8 | 111.2 | 129.3 | 108.1 |
| Condensation glide | ° C. | 21.7 | 21.7 | 19.8 | 13.6 | 21.2 | 20.6 | 19.5 | 18.1 |

| 45% R1234yf, r = 0.75 | | | | |
|---|---|---|---|---|
| Item | Unit | Comparative Example 201 | Comparative Example 202 | Comparative Example 203 |
| R32 | mass % | 15.0 | 25.0 | 25.0 |
| CO2 | mass % | 10.0 | 20.0 | 10.0 |
| R125 | mass % | 22.5 | 7.5 | 15.0 |
| R134a | mass % | 7.5 | 2.5 | 5.0 |
| R1234yf | mass % | 45.0 | 45.0 | 45.0 |
| GWP | — | 998 | 469 | 767 |
| COP ratio | % (relative to that of R410A) | 99.1 | 95.7 | 98.8 |
| Refrigerating capacity ratio | % (relative to that of R410A) | 86.4 | 113.5 | 92.7 |
| Condensation glide | ° C. | 13.6 | 15.6 | 11.8 |

Method for determining approximate curves of point A, point Br, point Cr, point Dr, point Or, point Fr and point Pr in case of x with respect to R1234yf Point A The approximate expression with respect to the coordinates of the point A was determined as the function of the proportion (x) of R1234yf according to a least-squares method as follows, based on four compositions about the point A, revealed as described above. In other words, the coordinates (a,b,c) of the point A was found to be (−0.6902x+43.307, 100−a−x, 0.0).

TABLE 262

| | Point A | | | |
|---|---|---|---|---|
| R32 | 15.0 | 13.1 | 11.2 | 8.8 |
| CO2 | 44.0 | 43.1 | 42.3 | 41.2 |
| R125 + R134a | 0.0 | 0.0 | 0.0 | 0.0 |
| R1234yf | 41.0 | 43.8 | 46.5 | 50.0 |
| x = R1234yf Approximate expression for R32 | | −0.6902x + 43.307 | | |
| Approximate expression for CO2 | | 100 − R32 − x | | |

Point Br

The approximate expression with respect to the coordinates of the point Br was determined as the function of r and proportion (x) of R1234yf according to a least-squares method and calculation as follows, based on the compositions of the point $B_r$, revealed as described above.

TABLE 263

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Br | R32 | 19.9 | 22.1 | 24.1 | 17.9 | 20.0 | 21.9 | 24.1 | 27.4 | 30.2 | 21.9 | 25.2 | 27.9 |
| | CO2 | 0.0 | 0.0 | 0.0 | 0.0 | 0.0 | 0.0 | 0.0 | 0.0 | 0.0 | 0.0 | 0.0 | 0.0 |
| | R125 + R134a | 39.1 | 36.9 | 34.9 | 38.3 | 36.2 | 34.3 | 34.9 | 31.6 | 28.8 | 34.3 | 31.0 | 28.3 |
| | R1234yf | 41.0 | 41.0 | 41.0 | 43.8 | 43.8 | 43.8 | 41.0 | 41.0 | 41.0 | 43.8 | 43.8 | 43.8 |
| Approximate expressions for point Br | R32 | −6.4r2 + 21.6r + 14.9 | | | −6.4r2 + 20.8r + 13.1 | | | −4.0r2 + 18.2r + 16 | | | −4.8r2 + 19.2r + 13.5 | | |
| | CO2 | 0 | | | 0 | | | 0 | | | 0 | | |
| | R125 + R134a | 100 − R32 − x | | | 100 − R32 − x | | | 100 − R32 − x | | | 100 − R32 − x | | |
| Approximate expressions for R32, CO2, and R125 + R134a, represented by r and x | x = R1234yf | 41.0 | | | 43.8 | | | 41.0 | | | 43.8 | | |
| | a | −6.4 | | | −6.4 | | | −4.0 | | | −4.8 | | |
| | b | 21.6 | | | 20.8 | | | 18.2 | | | 19.2 | | |
| | c | 14.9 | | | 13.1 | | | 16.0 | | | 13.5 | | |
| | Approximate expression a | −6.4 | | | | | | −0.2857x + 7.7143 | | | | | |
| | Approximate expression b | −0.2857x + 33.314 | | | | | | 0.3571x + 3.5571 | | | | | |
| | Approximate expression c | −0.6429x + 41.257 | | | | | | −0.8929x + 52.607 | | | | | |
| | Approximate expression for R32 | −6.4r2 + (−0.2857x + 33.314)r + (−0.6429x + 41.257) | | | | | | (−0.2857x + 7.7143)r2 + (0.3571x−3.5571)r + (−0.8929x + 52.607) | | | | | |
| | CO2 | 0.0 | | | | | | 0.0 | | | | | |
| | R125 + R134a | 100 − R32 − x | | | | | | 100 − R32 − x | | | | | |

TABLE 264

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Br | R32 | 17.9 | 20.0 | 21.9 | 15.9 | 18.0 | 19.9 | 21.9 | 25.2 | 27.9 | 19.9 | 23.1 | 25.8 |
| | CO2 | 0.0 | 0.0 | 0.0 | 0.0 | 0.0 | 0.0 | 0.0 | 0.0 | 0.0 | 0.0 | 0.0 | 0.0 |
| | R125 + R134a | 38.3 | 36.2 | 34.3 | 37.6 | 35.5 | 33.6 | 34.3 | 31.0 | 28.3 | 33.6 | 30.4 | 27.7 |
| | R1234yf | 43.8 | 43.8 | 43.8 | 46.5 | 46.5 | 46.5 | 43.8 | 43.8 | 43.8 | 46.5 | 46.5 | 46.5 |

TABLE 264-continued

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Approximate expressions for point Br | R32 | −6.4r2 + 20.8r + 13.1 | | | −6.4r2 + 20.8r + 11.1 | | | −4.8r2 + 19.2r + 13.5 | | | −4.0r2 + 17.8r + 12.0 | | |
| | CO2 | 0 | | | 0 | | | 0 | | | 0 | | |
| | R125 + R134a | 100 − R32 − x | | | 100 − R32 − x | | | 100 − R32 − x | | | 100 − R32 − x | | |
| Approximate expressions for R32, CO2, and R125 + R134a, represented by r and x | x = R1234yf | 43.8 | | | 46.5 | | | 43.8 | | | 46.5 | | |
| | a | −6.4 | | | −6.4 | | | −4.8 | | | −4.0 | | |
| | b | 20.8 | | | 20.8 | | | 19.2 | | | 17.8 | | |
| | c | 13.1 | | | 11.1 | | | 13.5 | | | 12.0 | | |
| | Approximate expression a | −6.4 | | | | | | 0.2963x − 17.778 | | | | | |
| | Approximate expression b | 20.8 | | | | | | −0.5185x + 41.911 | | | | | |
| | Approximate expression c | −0.7407x + 45.544 | | | | | | −0.5556x + 37.833 | | | | | |
| | Approximate expression for R32 | −6.4r2 + 20.8r + (−0.7407x + 45.544) | | | | | | (0.2963x − 17.778)r2 + (−0.5185x + 41.911)r + (−0.5556x + 37.833) | | | | | |
| | CO2 | 0.0 | | | | | | 0.0 | | | | | |
| | R125 + R134a | 100 − R32 − x | | | | | | 100 − R32 − x | | | | | |

TABLE 265

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Br | R32 | 15.9 | 18.0 | 19.9 | 13.4 | 15.4 | 17.3 | 19.9 | 23.1 | 25.8 | 17.3 | 20.4 | 23.0 |
| | CO2 | 0.0 | 0.0 | 0.0 | 0.0 | 0.0 | 0.0 | 0.0 | 0.0 | 0.0 | 0.0 | 0.0 | 0.0 |
| | R125 + R134a | 37.6 | 35.5 | 33.6 | 36.6 | 34.6 | 32.7 | 33.6 | 30.4 | 27.7 | 32.7 | 29.6 | 27.0 |
| | R1234yf | 46.5 | 46.5 | 46.5 | 50.0 | 50.0 | 50.0 | 46.5 | 46.5 | 46.5 | 50.0 | 50.0 | 50.0 |
| Approximate expressions for point Br | R32 | −6.4r2 + 20.8r + 11.1 | | | −3.2r2 + 18.0r + 9.1 | | | −4.0r2 + 17.8r + 12.0 | | | −4.0r2 + 17.4r + 9.6 | | |
| | CO2 | 0 | | | 0 | | | 0 | | | 0 | | |
| | R125 + R134a | 100 − R32 − x | | | 100 − R32 − x | | | 100 − R32 − x | | | 100 − R32 − x | | |
| Approximate expressions for R32, CO2, and R125 + R134a, represented by r and x | x = R1234yf | 46.5 | | | 50.0 | | | 46.5 | | | 50.0 | | |
| | a | −6.4 | | | −3.2 | | | −4.0 | | | −4.0 | | |
| | b | 20.8 | | | 18.0 | | | 17.8 | | | 17.4 | | |
| | c | 11.1 | | | 9.1 | | | 12.0 | | | 9.6 | | |
| | Approximate expression a | 0.9143x − 48.914 | | | | | | −4.0 | | | | | |
| | Approximate expression b | −0.8x + 58.0 | | | | | | −0.1143x + 23.114 | | | | | |
| | Approximate expression c | −0.5714x + 37.671 | | | | | | −0.6857x + 43.886 | | | | | |
| | Approximate expression for R32 | (0.9143x − 48.914)r2 + (−0.8x + 58) + (−0.5714x + 37.671) | | | | | | −4.0r2 + (−0.1143x + 23.114)r + (−0.6857x + 43.886) | | | | | |
| | CO2 | 0.0 | | | | | | 0.0 | | | | | |
| | R125 + R134a | 100 − R32 − x | | | | | | 100 − R32 − x | | | | | |

Method for determining approximate curves of points $C_{r=0.25\ to\ 1.0}$ and $D_{r=0.25\ to\ 1.0}$ The respective approximate expressions with respect to the coordinates of the point $C_r$ and the point $D_r$ were each determined as the function of r and proportion (x) of R1234yf according to a least-squares method and calculation as follows, based on the compositions of the point $C_r$ and the point $D_r$, revealed as described above.

TABLE 266

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Cr | R32 | 31.6 | 36.2 | 39.5 | 27.3 | 32.1 | 35.6 | 39.5 | 43.9 | 46.7 | 35.6 | 40.3 | 43.2 |
| | CO2 | 0.0 | 0.0 | 0.0 | 0.0 | 0.0 | 0.0 | 0.0 | 0.0 | 0.0 | 0.0 | 0.0 | 0.0 |
| | R125 + R134a | 27.4 | 22.8 | 19.5 | 28.9 | 24.1 | 20.6 | 19.5 | 15.1 | 12.3 | 20.6 | 15.9 | 13.0 |
| | R1234yf | 41.0 | 41.0 | 41.0 | 43.8 | 43.8 | 43.8 | 41.0 | 41.0 | 41.0 | 43.8 | 43.8 | 43.8 |

TABLE 266-continued

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Approximate expressions for point Cr | R32 | −41.6r2 + 62.8r + 18.5 | | | −41.6r2 + 64.4r + 13.8 | | | −12.8r2 + 33.6r + 25.9 | | | −14.4r2 + 36.8r + 20.8 | | |
| | CO2 | 0 | | | 0 | | | 0 | | | 0 | | |
| | R125 + R134a | 100 − R32 − x | | | 100 − R32 − x | | | 100 − R32 − x | | | 100 − R32 − x | | |
| Approximate expressions for R32, CO2, and R125 + R134a, represented by r and x | x = R1234yf | 41.0 | | | 43.8 | | | 41.0 | | | 43.8 | | |
| | a | −41.6 | | | −41.6 | | | −12.8 | | | −14.4 | | |
| | b | 62.8 | | | 64.4 | | | 33.6 | | | 36.8 | | |
| | c | 18.5 | | | 13.8 | | | 25.9 | | | 20.8 | | |
| | Approximate expression a | −41.6 | | | | | | −0.5714x + 10.629 | | | | | |
| | Approximate expression b | 0.5714x + 39.371 | | | | | | 1.1429x − 13.257 | | | | | |
| | Approximate expression c | −1.6786x + 87.321 | | | | | | −1.8214x + 100.58 | | | | | |
| | Approximate expression for R32 | −41.6r2 + (0.5747x + 39.371)r + (−1.6786x + 87.321) | | | | | | (−0.5714x + 10.629)r2 + (1.1429x−13.257)r + (−1.8214x + 100.58) | | | | | |
| | CO2 | 0.0 | | | | | | 0.0 | | | | | |
| | R125 + R134a | 100 − R32 − x | | | | | | 100 − R32 − x | | | | | |

TABLE 267

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Cr | R32 | 27.3 | 32.1 | 35.6 | 23.1 | 28.3 | 31.9 | 35.6 | 40.3 | 43.2 | 31.9 | 36.8 | 39.8 |
| | CO2 | 0.0 | 0.0 | 0.0 | 0.0 | 0.0 | 0.0 | 0.0 | 0.0 | 0.0 | 0.0 | 0.0 | 0.0 |
| | R125 + R134a | 28.9 | 24.1 | 20.6 | 30.4 | 25.2 | 21.6 | 20.6 | 15.9 | 13.0 | 21.6 | 16.7 | 13.7 |
| | R1234yf | 43.8 | 43.8 | 43.8 | 46.5 | 46.5 | 46.5 | 43.8 | 43.8 | 43.8 | 46.5 | 46.5 | 46.5 |
| Approximate expressions for point Cr | R32 | −41.6r2 + 64.4r + 13.8 | | | −51.2r2 + 73.6r + 7.9 | | | −14.4r2 + 36.8r + 20.8 | | | −15.2r2 + 38.6r + 16.4 | | |
| | CO2 | 0 | | | 0 | | | 0 | | | 0 | | |
| | R125 + R134a | 100 − R32 − x | | | 100 − R32 − R1234yf | | | 100 − R32 − x | | | 100 − R32 − R1234yf | | |
| Approximate expressions for R32, CO2, and R125 + R134a, represented by r and x | x = R1234yf | 43.8 | | | 46.5 | | | 43.8 | | | 46.5 | | |
| | a | −41.6 | | | −51.2 | | | −14.4 | | | −15.2 | | |
| | b | 64.4 | | | 73.6 | | | 36.8 | | | 38.6 | | |
| | c | 13.8 | | | 7.9 | | | 20.8 | | | 16.4 | | |
| | Approximate expression a | −3.5556x + 114.13 | | | | | | −0.2963x − 1.4222 | | | | | |
| | Approximate expression b | 3.4074x − 84.844 | | | | | | 0.6667x + 7.6 | | | | | |
| | Approximate expression c | −2.1852x + 109.51 | | | | | | −1.6296x + 92.178 | | | | | |
| | Approximate expression for R32 | (−3.5556x + 114.13)r2 + (3.4074x − 84.844) + (−2.1852x + 109.51) | | | | | | (−0.2963x − 1.4222)r2 + (0.6667x + 7.6)r + (−1.6296x + 92.178) | | | | | |
| | CO2 | 0.0 | | | | | | 0.0 | | | | | |
| | R125 + R134a | 100 − R32 − x | | | | | | 100 − R32 − x | | | | | |

TABLE 268

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Cr | R32 | 23.1 | 28.3 | 31.9 | 17.9 | 23.3 | 27.2 | 31.9 | 36.8 | 39.8 | 27.2 | 32.3 | 35.5 |
| | CO2 | 0.0 | 0.0 | 0.0 | 0.0 | 0.0 | 0.0 | 0.0 | 0.0 | 0.0 | 0.0 | 0.0 | 0.0 |
| | R125 + R134a | 30.4 | 25.2 | 21.6 | 32.1 | 26.7 | 22.8 | 21.6 | 16.7 | 13.7 | 22.8 | 17.7 | 14.5 |
| | R1234yf | 46.5 | 46.5 | 46.5 | 50.0 | 50.0 | 50.0 | 46.5 | 46.5 | 46.5 | 50.0 | 50.0 | 50.0 |
| Approximate expressions for point Cr | R32 | −51.2r2 + 73.6r + 7.9 | | | −48.0r2 + 73.2r + 2.6 | | | −15.2r2 + 38.6r + 16.4 | | | −15.2r2 + 39.4r + 11.3 | | |
| | CO2 | 0 | | | 0 | | | 0 | | | 0 | | |
| | R125 + R134a | 100 − R32 − R1234yf | | | 100 − R32 − R1234yf | | | 100 − R32 − R1234yf | | | 100 − R32 − R1234yf | | |
| Approximate expressions for R32, CO2, and | x = R1234yf | 46.5 | | | 50.0 | | | 46.5 | | | 50.0 | | |
| | a | −51.2 | | | −48.0 | | | −15.2 | | | −15.2 | | |
| | b | 73.6 | | | 73.2 | | | 38.6 | | | 39.4 | | |
| | c | 7.9 | | | 2.6 | | | 16.4 | | | 11.3 | | |

TABLE 268-continued

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| R125 + R134a, represented by r and x | Approximate expression a | 0.9143x − 93.714 | | | | | | −15.2 | | | | | |
| | Approximate expression b | −0.1143x + 78.914 | | | | | | 0.2286x + 27.971 | | | | | |
| | Approximate expression c | −1.5143x + 78.314 | | | | | | −1.4571x + 84.157 | | | | | |
| | Approximate expression for R32 | (0.9143x − 93.714)r2 + (−0.1143x + 78.314) + (−1.5143x + 78.314) | | | | | | −15.2r2 + (0.2286x + 27.971)r + (−1.4571x + 84.157) | | | | | |
| | CO2 | 0.0 | | | | | | 0.0 | | | | | |
| | R125 + R134a | 100 − R32 − x | | | | | | 100 − R32 − x | | | | | |

TABLE 269

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Dr | R32 | 0.0 | 0.0 | 0.0 | 0.0 | 0.0 | 0.0 | 0.0 | 0.0 | 0.0 | 0.0 | 0.0 | 0.0 |
| | CO2 | 20.6 | 25.1 | 28.7 | 17.8 | 22.3 | 25.9 | 28.7 | 33.9 | 37.7 | 25.9 | 31.2 | 34.9 |
| | R125 + R134a | 38.4 | 33.9 | 30.3 | 38.4 | 33.9 | 30.3 | 30.3 | 25.1 | 21.3 | 30.3 | 25.0 | 21.3 |
| | R1234yf | 41.0 | 41.0 | 41.0 | 43.8 | 43.8 | 43.8 | 41.0 | 41.0 | 41.0 | 43.8 | 43.8 | 43.8 |
| Approximate expressions for point Dr | R32 | 0.0 | | | 0.0 | | | 0.0 | | | 0.0 | | |
| | CO2 | −28.8r2 + 54.0r + 8.9 | | | −28.8r2 + 54.0r + 6.1 | | | −11.2x2 + 34.8x + 14.1 | | | −12.8r2 + 37.2r + 10.5 | | |
| | R125 + R134a | 100 − CO2 − x | | | 100 − CO2 − x | | | 100 − CO2 − x | | | 100 − CO2 − x | | |
| Approximate expressions for R32, CO2, and | x = R1234yf | 41.0 | | | 43.8 | | | 41.0 | | | 43.8 | | |
| | a | −28.8 | | | −28.8 | | | −11.2 | | | −12.8 | | |
| | b | 54.0 | | | 54.0 | | | 34.8 | | | 37.2 | | |
| | c | 8.9 | | | 6.1 | | | 14.1 | | | 10.5 | | |
| R125 + R134a, represented by r and x | Approximate expression a | −28.8 | | | | | | −0.5714x + 12.229 | | | | | |
| | Approximate expression b | 54.0 | | | | | | 0.8571x − 0.3429 | | | | | |
| | Approximate expression c | −x + 49.9 | | | | | | −1.2857x + 66.814 | | | | | |
| | Approximate expression for R32 | 0.0 | | | | | | 0.0 | | | | | |
| | CO2 | −28.8r2 + 54.0r + (−x + 49.9) | | | | | | (−0.5714x + 12.229)r2 + (0.8571x − 0.3429)r + (−1.2857x + 66.814) | | | | | |
| | R125 + R134a | 100 − CO2 − x | | | | | | 100 − CO2 − x | | | | | |

TABLE 270

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Dr | R32 | 0.0 | 0.0 | 0.0 | 0.0 | 0.0 | 0.0 | 0.0 | 0.0 | 0.0 | 0.0 | 0.0 | 0.0 |
| | CO2 | 17.8 | 22.3 | 25.9 | 15.1 | 19.6 | 23.2 | 25.9 | 31.2 | 34.9 | 23.2 | 28.5 | 32.2 |
| | R125 + R134a | 38.4 | 33.9 | 30.3 | 38.4 | 33.9 | 30.3 | 30.3 | 25.0 | 21.3 | 30.3 | 25.0 | 21.3 |
| | R1234yf | 43.8 | 43.8 | 43.8 | 46.5 | 46.5 | 46.5 | 43.8 | 43.8 | 43.8 | 46.5 | 46.5 | 46.5 |
| Approximate expressions for point Dr | R32 | 0.0 | | | 0.0 | | | 0.0 | | | 0.0 | | |
| | CO2 | −28.8r2 + 54.0r + 6.1 | | | −28.8r2 + 54r + 3.4 | | | −12.8r2 + 37.2r + 10.5 | | | −12.8r2 + 37.2r + 7.8 | | |
| | R125 + R134a | 100 − CO2 − x | | | 100 − CO2 − x | | | 100 − CO2 − x | | | 100 − CO2 − x | | |
| Approximate expressions for R32, CO2, and | x = R1234yf | 43.8 | | | 46.5 | | | 43.8 | | | 46.5 | | |
| | a | −28.8 | | | −28.8 | | | −12.8 | | | −12.8 | | |
| | b | 54.0 | | | 54.0 | | | 37.2 | | | 37.2 | | |
| | c | 6.1 | | | 3.4 | | | 10.5 | | | 7.8 | | |
| R125 + R134a, represented by r and x | Approximate expression a | −28.8 | | | | | | −12.8 | | | | | |
| | Approximate expression b | 54.0 | | | | | | 37.2 | | | | | |
| | Approximate expression c | −x + 49.9 | | | | | | −x + 54.3 | | | | | |
| | Approximate expression for | 0.0 | | | | | | 0.0 | | | | | |

TABLE 270-continued

| Item | | r = R125/(R125 + R134a) 0.250 | 0.375 | 0.500 | 0.250 | 0.375 | 0.500 | 0.500 | 0.750 | 1.000 | 0.500 | 0.750 | 1.000 |
|---|---|---|---|---|---|---|---|---|---|---|---|---|---|
| | R32 | | | | | | | | | | | | |
| | CO2 | −28.8r2 + 54.0r + (−x + 49.9) | | | | | | −12.8r2 + 37.2r + (−x + 54.3) | | | | | |
| | R125 + R134a | 100 − CO2 − x | | | | | | 100 − CO2 − x | | | | | |

TABLE 271

| Item | | r = R125/(R125 + R134a) 0.250 | 0.375 | 0.500 | 0.250 | 0.375 | 0.500 | 0.500 | 0.750 | 1.000 | 0.500 | 0.750 | 1.000 |
|---|---|---|---|---|---|---|---|---|---|---|---|---|---|
| Point Dr | R32 | 0.0 | 0.0 | 0.0 | 0.0 | 0.0 | 0.0 | 0.0 | 0.0 | 0.0 | 0.0 | 0.0 | 0.0 |
| | CO2 | 15.1 | 19.6 | 23.2 | 11.6 | 16.1 | 19.8 | 23.2 | 28.5 | 32.2 | 19.8 | 25.0 | 28.7 |
| | R125 + R134a | 38.4 | 33.9 | 30.3 | 38.4 | 33.9 | 30.2 | 30.3 | 25.0 | 21.3 | 30.2 | 25.0 | 21.3 |
| | R1234yf | 46.5 | 46.5 | 46.5 | 50.0 | 50.0 | 50.0 | 46.5 | 46.5 | 46.5 | 50.0 | 50.0 | 50.0 |
| Approximate expressions for point Dr | R32 | 0.0 | | | 0.0 | | | 0.0 | | | 0.0 | | |
| | CO2 | −28.8r2 + 54r + 3.4 | | | −25.6r2 + 52.0r + 0.2 | | | −12.8r2 + 37.2r + 7.8 | | | −12.0r2 + 35.8r + 4.9 | | |
| | R125 + R134a | 100 − CO2 − x | | | 100 − CO2 − x | | | 100 − CO2 − x | | | 100 − CO2 − x | | |
| Approximate expressions for R32, CO2, and R125 + R134a, represented by r and x | x = R1234yf | 46.5 | | | 50.0 | | | 46.5 | | | 50.0 | | |
| | a | −28.8 | | | −25.6 | | | −12.8 | | | −12.0 | | |
| | b | 54.0 | | | 52.0 | | | 37.2 | | | 35.8 | | |
| | c | 3.4 | | | 0.2 | | | 7.8 | | | 4.9 | | |
| | Approximate expression a | 0.9143x − 71.314 | | | | | | 0.2286x − 23.429 | | | | | |
| | Approximate expression b | −0.5714x + 80.571 | | | | | | −0.4x + 55.8 | | | | | |
| | Approximate expression c | −0.9143x + 45.914 | | | | | | −0.8286x + 46.329 | | | | | |
| | Approximate expression for R32 | 0.0 | | | | | | 0.0 | | | | | |
| | CO2 | (0.9143x − 71.314)r2 + (−0.5714x + 80.571) + (−0.9143x + 45.914) | | | | | | (0.2286x − 23.429)r2 + (−0.4x + 55.8)r + (−0.8286x + 46.329) | | | | | |
| | R125 + R134a | 100 − CO2 − x | | | | | | 100 − CO2 − x | | | | | |

Method for Determining Approximate Curve of Point Or

The point $O_r$, as the intersection of the line segment ABr and the line segment CrDr was shown in Examples and Comparative Examples, and the approximate expression with respect to the coordinates of the point Or was determined as the function of r and proportion (x) of R1234yf according to a least-squares method and calculation as follows, based on the compositions of the point $O_r$.

TABLE 272

| Item | | r = R125/(R125 + R134a) 0.250 | 0.375 | 0.500 | 0.250 | 0.375 | 0.500 | 0.500 | 0.750 | 1.000 | 0.500 | 0.750 | 1.000 |
|---|---|---|---|---|---|---|---|---|---|---|---|---|---|
| Point Or | R32 | 19.0 | 20.3 | 21.4 | 17.1 | 18.5 | 19.5 | 21.4 | 22.8 | 23.8 | 19.5 | 21.0 | 22.0 |
| | CO2 | 8.2 | 11.0 | 13.2 | 6.7 | 9.4 | 11.7 | 13.2 | 16.3 | 18.5 | 11.7 | 14.9 | 17.1 |
| | R125 + R134a | 31.8 | 27.7 | 24.4 | 32.4 | 28.3 | 25.0 | 24.4 | 19.9 | 16.7 | 25.0 | 20.3 | 17.1 |
| | R1234yf | 41.0 | 41.0 | 41.0 | 43.8 | 43.8 | 43.8 | 41.0 | 41.0 | 41.0 | 43.8 | 43.8 | 43.8 |
| Approximate expressions for point Or | R32 | −6.4r2 + 14.4r + 15.8 | | | −12.8r2 + 19.2r + 13.1 | | | −3.2r2 + 9.6r + 17.4 | | | −4.0r2 + 11.0r + 15.0 | | |
| | CO2 | −19.2r2 + 34.4r + 0.8 | | | −12.8r2 + 29.6r + 0.1 | | | −7.2r2 + 21.4r + 4.3 | | | −8.0r2 + 22.8r + 2.3 | | |
| | R125 + R134a | 100 −R32 − CO2 − x | | | 100 − R32 − CO2 − x | | | 100 − R32 − CO2 − x | | | 100 − R32 − CO2 − x | | |
| Calculation of approximate expressions for R32, represented by r and x | x = R1234yf | 41.0 | | | 43.8 | | | 41.0 | | | 43.8 | | |
| | a | −6.4 | | | −12.8 | | | −3.2 | | | −4.0 | | |
| | b | 14.4 | | | 19.2 | | | 9.6 | | | 11.0 | | |
| | c | 15.8 | | | 13.1 | | | 17.4 | | | 15.0 | | |
| | Approximate expression a | −2.2857x + 87.314 | | | | | | −0.2857x + 8.5143 | | | | | |
| | Approximate expression b | 1.7143x − 55.886 | | | | | | 0.5x − 10.9 | | | | | |
| | Approximate expression c | −0.9643x + 55.336 | | | | | | −0.8571x + 52.543 | | | | | |

TABLE 272-continued

| Item | | r = R125/(R125 + R134a) 0.250 | 0.375 | 0.500 | 0.250 | 0.375 | 0.500 | 0.500 | 0.750 | 1.000 | 0.500 | 0.750 | 1.000 |
|---|---|---|---|---|---|---|---|---|---|---|---|---|---|
| Calculation of approximate expressions for CO2, represented by r and x | x = R1234yf | | 41.0 | | | 43.8 | | | 41.0 | | | 43.8 | |
| | a | | −19.2 | | | −12.8 | | | −7.2 | | | −8.0 | |
| | b | | 34.4 | | | 29.6 | | | 21.4 | | | 22.8 | |
| | c | | 0.8 | | | 0.1 | | | 4.3 | | | 2.3 | |
| | Approximate expression a | 2.2857x − 112.91 | | | | | | −0.2857x + 4.5143 | | | | | |
| | Approximate expression b | −1.7143x + 104.69 | | | | | | 0.5x + 0.9 | | | | | |
| | Approximate expression c | −0.25x + 11.05 | | | | | | −0.7143x + 33.586 | | | | | |
| Approximate expressions for O(r, x) | Approximate expression for R32 | (−2.2857x + 87.314)r2 + (1.7143x − 55.886)r + (−0.9643x + 55.336) | | | | | | (−0.2857x + 8.5143)r2 + (0.5x − 10.9) + (−0.8571x + 52.543) | | | | | |
| | Approximate expression c for CO2 | (2.2857x − 112.91)r2 + (−1.7143x + 104.69)r + (−0.25x + 11.05) | | | | | | (−0.2857x + 4.5143)r2 + (0.5x + 0.9)r + (−0.7143x + 33.586) | | | | | |
| | R125 + R134a | 100 − R32 − CO2 − x | | | | | | 100 − R32 − CO2 − x | | | | | |

TABLE 273

| Item | | r=R125/(R125+R134a) 0.250 | 0.375 | 0.500 | 0.250 | 0.375 | 0.500 | 0.500 | 0.750 | 1.000 | 0.500 | 0.750 | 1.000 |
|---|---|---|---|---|---|---|---|---|---|---|---|---|---|
| Point Or | R32 | 17.1 | 18.5 | 19.5 | 15.3 | 16.7 | 17.8 | 19.5 | 21.0 | 22.0 | 17.8 | 19.3 | 20.4 |
| | CO2 | 6.7 | 9.4 | 11.7 | 5.1 | 8.0 | 10.3 | 11.7 | 14.9 | 17.1 | 10.3 | 13.5 | 15.7 |
| | R125 + R134a | 32.4 | 28.3 | 25.0 | 33.1 | 28.8 | 25.4 | 25.0 | 20.3 | 17.1 | 25.4 | 20.7 | 17.4 |
| | R1234yf | 43.8 | 43.8 | 43.8 | 46.5 | 46.5 | 46.5 | 43.8 | 43.8 | 43.8 | 46.5 | 46.5 | 46.5 |
| Approximate expressions for point Or | R32 | −12.8r2 + 19.2r + 13.1 | | | −9.6r2 + 17.2r + 11.6 | | | −4.0r2 + 11.0r + 15.0 | | | −3.2r2 + 10.0r + 13.6 | | |
| | CO2 | −12.8r2 + 29.6r + 0.1 | | | −19.2r2 + 35.2r − 2.5 | | | −8.0r2 + 22.8r + 2.3 | | | −8.0r2 + 22.8r + 0.9 | | |
| | R125 + R134a | 100 − R32 − CO2 − x | | | 100 − R32 − CO2 − x | | | 100 − R32 − CO2 − x | | | 100 − R32 − CO2 − x | | |
| Calculation of approximate expressions for R32, represented by r and x | x = R1234yf | | 43.8 | | | 46.5 | | | 43.8 | | | 46.5 | |
| | a | | −12.8 | | | −9.6 | | | −4.0 | | | −3.2 | |
| | b | | 19.2 | | | 17.2 | | | 11.0 | | | 10.0 | |
| | c | | 13.1 | | | 11.6 | | | 15.0 | | | 13.6 | |
| | Approximate expression a | 1.1852x − 64.711 | | | | | | 0.2963x − 16.978 | | | | | |
| | Approximate expression b | −0.7407x + 51.644 | | | | | | −0.3704x + 27.222 | | | | | |
| | Approximate expression c | −0.5556x + 37.433 | | | | | | −0.5185x + 37.711 | | | | | |
| Calculation of approximate expressions for CO2, represented by r and x | x = R1234yf | | 43.8 | | | 46.5 | | | 43.8 | | | 46.5 | |
| | a | | −12.8 | | | −19.2 | | | −8.0 | | | −8.0 | |
| | b | | 29.6 | | | 35.2 | | | 22.8 | | | 22.8 | |
| | c | | 0.1 | | | −2.5 | | | 2.3 | | | 0.9 | |
| | Approximate expression a | −2.3704x + 91.022 | | | | | | −8.0 | | | | | |
| | Approximate expression b | 2.0741x − 61.244 | | | | | | 22.8 | | | | | |
| | Approximate expression c | −0.963x + 42.278 | | | | | | −0.5185x + 25.011 | | | | | |
| Approximate expressions for O(r, x) | Approximate expression for R32 | (1.1852x − 64.711)r2 + (−0.7407x + 51.644)r + (−0.5556x + 37.433) | | | | | | (0.2963x − 16.978)r2 + (−0.3704x + 27.222)r + (−0.5185x + 37.711) | | | | | |
| | Approximate expression c for CO2 | (−2.3704x + 91.022)r2 + (2.0741x − 61.244)r + (−0.963x + 42.278) | | | | | | −8.0r2 + 22.8r + (−0.5185x + 25.011) | | | | | |
| | R125 + R134a | 100 − R32 − CO2 − x | | | | | | 100 − R32 − CO2 − x | | | | | |

TABLE 274

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Or | R32 | 15.3 | 16.7 | 17.8 | 13.0 | 14.4 | 15.5 | 17.8 | 19.3 | 20.4 | 15.5 | 17.1 | 18.2 |
| | CO2 | 5.1 | 8.0 | 10.3 | 3.1 | 6.1 | 8.5 | 10.3 | 13.5 | 15.7 | 8.5 | 11.7 | 14.0 |
| | R125 + R134a | 33.1 | 28.8 | 25.4 | 33,9 | 29.5 | 26.0 | 25.4 | 20.7 | 17.4 | 26.0 | 21.2 | 17.8 |
| | R1234yf | 46.5 | 46.5 | 46.5 | 50.0 | 50.0 | 50.0 | 46.5 | 46.5 | 46.5 | 50.0 | 50.0 | 50.0 |
| Approximate expressions | R32 | −9.6r2 + 17.2r + 11.6 | | | −9.6r2 + 17.2r + 9.3 | | | −3.2r2 + 10.0r + 13.6 | | | −4.0r2 + 11.4r + 10.8 | | |
| for point Or | CO2 | −19.2r2 + 35.2r − 2.5 | | | −19.2r2 + 36.0r − 4.7 | | | −8.0r2 + 22.8r + 0.9 | | | −7.2r2 + 21.8r − 0.6 | | |
| | R125 + R134a | 100 − R32 − CO2 − x | | | 100 − R32 − CO2 − x | | | 100 − R32 − CO2 − x | | | 100 − R32 − CO2 − x | | |
| Calculation of | x = R1234yf | | 46.5 | | | 50.0 | | | 46.5 | | | 50.0 | |
| approximate | a | | −9.6 | | | −9.6 | | | −3.2 | | | −4.0 | |
| expressions | b | | 17.2 | | | 17.2 | | | 10.0 | | | 11.4 | |
| for R32, | c | | 11.6 | | | 9.3 | | | 13.6 | | | 10.8 | |
| represented | Approximate expression a | −9.6 | | | | | | −0.2286x + 7.4286 | | | | | |
| by r and x | Approximate expression b | 17.2 | | | | | | 0.4x − 8.6 | | | | | |
| | Approximate expression c | −0.6571x + 42.157 | | | | | | −0.8x + 50.8 | | | | | |
| Calculation of | x = R1234yf | | 46.5 | | | 50.0 | | | 46.5 | | | 50.0 | |
| approximate | a | | −19.2 | | | −19.2 | | | −8.0 | | | −7.2 | |
| expressions | b | | 35.2 | | | 36.0 | | | 22.8 | | | 21.8 | |
| for CO2, | c | | −2.5 | | | −4.7 | | | 0.9 | | | −0.6 | |
| represented | Approximate expression a | −19.2 | | | | | | 0.2286x − 18.629 | | | | | |
| by r and x | Approximate expression b | 0.2286x + 24.571 | | | | | | −0.2857x + 36.086 | | | | | |
| | Approximate expression c | −0.6286x + 26.729 | | | | | | −0.4286x + 20.829 | | | | | |
| Approximate expressions for O(r, x) | Approximate expression for R32 | −9.6r2 + 17.2r + (−0.6571x + 42.157) | | | | | | (−0.2286x + 7.4286)r2 + (0.4x − 8.6)r + (−0.8x + 50.8) | | | | | |
| | Approximate expression c for CO2 | −19.2r2 + (0.2286x + 24.571)r + (−0.6286x + 26.729) | | | | | | (0.2286x − 18.629)r2 + (−0.2857x + 36.086)r + (−0.4286x + 20.829) | | | | | |
| | R125 + R134a | 100 − R32 − CO2 − x | | | | | | 100 − R32 − CO2 − x | | | | | |

Method for Determining Approximate Curves of Points Fr and Pr

The point Fr and the point Pr were shown in Examples and Comparative Examples, and the respective approximate expressions with respect to the coordinates of the point $F_r$ and the point $P_r$ were each determined as the function of r and proportion (x) of R1234yf according to a least-squares method and calculation as follows, based on each composition.

TABLE 275

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Fr | R32 | 0.0 | 0.0 | 0.0 | 0.0 | 0.0 | 0.0 | 0.0 | 0.0 | 0.0 | 0.0 | 0.0 | 0.0 |
| | CO2 | 39.5 | 40.5 | 41.2 | 35.4 | 36.6 | 37.4 | 41.2 | 42.6 | 43.1 | 37.4 | 38.5 | 40.0 |
| | R125 + R134a | 19.5 | 18.5 | 17.8 | 20.8 | 19.6 | 18.8 | 17.8 | 16.4 | 15.9 | 18.8 | 17. | 16.2 |
| | R1234yf | 41.0 | 41.0 | 41.0 | 43.8 | 43.8 | 43.8 | 41.0 | 41.0 | 41.0 | 43.8 | 43.8 | 43.8 |
| Approximate | R32 | | 0.0 | | | 0.0 | | | 0.0 | | | 0.0 | |
| expressions | CO2 | −9.6r2 + 14.0r + 36.6 | | | −12.8r2 + 17.6r + 31.8 | | | −7.2x2 + 14.6x + 35.7 | | | 3.2r2 + 0.4r + 36.4 | | |
| for point Fr | R125 + R134a | 100 − CO2 − x | | | 100 − CO2 − x | | | 100 − CO2 − x | | | 100 − CO2 − x | | |
| Approximate | x = R1234yf | | 41.0 | | | 43.8 | | | 41.0 | | | 43.8 | |
| expressions | a | | −9.6 | | | −12.8 | | | −7.2 | | | 3.2 | |
| for R32, | b | | 14.0 | | | 17.6 | | | 14.6 | | | 0.4 | |
| CO2, and | c | | 36.6 | | | 31.8 | | | 35.7 | | | 36.4 | |
| R125 + R134a, | Approximate expression a | −1.1429x + 37.257 | | | | | | 3.7143x − 159.49 | | | | | |
| represented | Approximate expression b | 1.2857x − 38.714 | | | | | | −5.0714x + 222.53 | | | | | |
| by r and x | Approximate expression c | −1.7143x + 106.89 | | | | | | 0.25x + 25.45 | | | | | |

TABLE 275-continued

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| | Approximate expression for R32 | 0.0 | | | | | | 0.0 | | | | | |
| | CO2 | (−1.1429x + 37.257)r2 + (1.2857x − 38.714)r − (−1.7143x + 106.89) | | | | | | (3.7143x − 159.49)r2 + (−5.0714x + 222.53)r + (0.25x + 25.45) | | | | | |
| | R125 + R134a | 100 − CO2 − x | | | | | | 100 − CO2 − x | | | | | |

TABLE 276

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Fr | R32 | 0.0 | 0.0 | 0.0 | 0.0 | 0.0 | 0.0 | 0.0 | 0.0 | 0.0 | 0.0 | 0.0 | 0.0 |
| | CO2 | 35.4 | 36.6 | 37.4 | 31,5 | 32.3 | 33.5 | 37.4 | 38.5 | 40.0 | 33.5 | 35.3 | 35.9 |
| | R125 + R134a | 20.8 | 19.6 | 18.8 | 22.0 | 21.2 | 20.0 | 18.8 | 17.7 | 16.2 | 20.0 | 18.2 | 17.6 |
| | R1234yf | 43.8 | 43.8 | 43.8 | 46.5 | 46.5 | 46.5 | 43.8 | 43.8 | 43.8 | 46.5 | 46.5 | 46.5 |
| Approximate expressions for point Fr | R32 | 0.0 | | | 0.0 | | | 0.0 | | | 0.0 | | |
| | CO2 | −12.8r2 + 17.6r + 31.8 | | | 12.8r2 − 1.6r + 31.1 | | | 3.2r2 + 0.4r + 36.4 | | | −9.6r2 + 19.2r + 26.3 | | |
| | R125 + R134a | 100 − CO2 − x | | | 100 − CO2 − x | | | 100 − CO2 − x | | | 100 − CO2 − x | | |
| Approximate expressions for R32, CO2, and R125 + R134a, represented by r and x | x = R1234yf | 43.8 | | | 46.5 | | | 43.8 | | | 46.5 | | |
| | a | −12.8 | | | 12.8 | | | 3.2 | | | −9.6 | | |
| | b | 17.6 | | | −1.6 | | | 0.4 | | | 19.2 | | |
| | c | 31.8 | | | 31.1 | | | 36.4 | | | 26.3 | | |
| | Approximate expression a | 9.4815x − 428.09 | | | | | | −4.7407x + 210.84 | | | | | |
| | Approximate expression b | −7.1111x + 329.07 | | | | | | 6.963x − 304.58 | | | | | |
| | Approximate expression c | −0.2593x + 43.156 | | | | | | −3.7407x + 200.24 | | | | | |
| | Approximate expression for R32 | 0.0 | | | | | | 0.0 | | | | | |
| | CO2 | (9.4815x − 428.09)r2 + (−7.1111x + 329.07)r + (−0.2593x + 43.156) | | | | | | (−4.7407x + 210.84)r2 + (6.963x − 304.58)r + (−3.7407x + 200.24) | | | | | |
| | R125 + R134a | 100 − CO2 − x | | | | | | 100 − CO2 − x | | | | | |

TABLE 277

| Item | | r = R125/(R125 + R134a) | | | | | | | | | | | |
|---|---|---|---|---|---|---|---|---|---|---|---|---|---|
| | | 0.250 | 0.310 | 0.370 | 0.250 | 0.310 | 0.370 | 0.500 | 0.750 | 1.000 | 0.500 | 0.750 | 1.000 |
| Point Fr | R32 | 0.0 | 0.0 | 0.0 | 0.0 | 0.0 | 0.0 | 0.0 | 0.0 | 0.0 | 0.0 | 0.0 | 0.0 |
| | CO2 | 31.5 | 31.7 | 32.5 | 26.1 | 27.0 | 27.6 | 33.5 | 35.3 | 35.9 | 28.8 | 30.4 | 31.8 |
| | R125 + R134a | 22.0 | 21.8 | 21.0 | 23.9 | 23.0 | 22.4 | 20.0 | 18.2 | 17.6 | 21.2 | 19.6 | 18.2 |
| | R1234yf | 46.5 | 46.5 | 46.5 | 50.0 | 50.0 | 50.0 | 46.5 | 46.5 | 46.5 | 50.0 | 50.0 | 50.0 |
| Approximate expressions for point Fr | R32 | 0.0 | | | 0.0 | | | 0.0 | | | 0.0 | | |
| | CO2 | 83.333r2 − 43.333r + 37.125 | | | −41.667r2 + 38.333r + 19.121 | | | −9.6r2 + 19.2r + 26.3 | | | 1.612 + 8.4r + 25.0 | | |
| | R125 + R134a | 100 − CO2 − x | | | 100 − CO2 − x | | | 100 − CO2 − x | | | 100 − CO2 − x | | |
| Approximate expressions for R32, CO2, and R125 + R134a, represented by r and x | x = R1234yf | 46.5 | | | 50.0 | | | 46.5 | | | 50.0 | | |
| | a | 83.333 | | | −41.667 | | | −9.6 | | | −1.6 | | |
| | b | −43.333 | | | 38.333 | | | 19.2 | | | 8.4 | | |
| | c | 37.125 | | | 19.121 | | | 26.3 | | | 25.0 | | |
| | Approximate expression a | −35.714x + 1744.0 | | | | | | 2.2857x − 115.89 | | | | | |
| | Approximate expression b | 23.333x − 1128.3 | | | | | | −3.0857x + 162.69 | | | | | |
| | Approximate expression c | −5.144x + 276.32 | | | | | | −0.3714x + 43.571 | | | | | |
| | Approximate expression for R32 | 0.0 | | | | | | 0.0 | | | | | |

TABLE 277-continued

| Item | | r = R125/(R125 + R134a) | | | | | | | | | | | |
|---|---|---|---|---|---|---|---|---|---|---|---|---|---|
| | | 0.250 | 0.310 | 0.370 | 0.250 | 0.310 | 0.370 | 0.500 | 0.750 | 1.000 | 0.500 | 0.750 | 1.000 |
| | CO2 | (−35.714x + 1744.0)r2 + (23.333x − 1128.3)r + (−5.144x + 276.32) | | | | | | (2.2857x − 115.89)r2 + (−3.0857x + 162.69)r + (−0.3714x + 43.571) | | | | | |
| | R125 + R134a | 100 − CO2 − x | | | | | | 100 − CO2 − x | | | | | |

TABLE 278

| Item | | r = R125/(R12 5 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Pr | R32 | 12.8 | 14.3 | 15.4 | 12.0 | 13.6 | 14.7 | 15.4 | 11.4 | 7.7 | 14.7 | 9.9 | 6.6 |
| | CO2 | 12.2 | 15.2 | 17.4 | 10.1 | 12.9 | 15.1 | 17.4 | 25.1 | 31.5 | 15.1 | 23.5 | 29.6 |
| | R125 + R134a | 34.0 | 29.5 | 26.2 | 53.9 | 56.7 | 58.9 | 26.2 | 22.5 | 19.8 | 58.9 | 67.3 | 73.4 |
| | R1234yf | 41.0 | 41.0 | 41.0 | 43.8 | 43.8 | 43.8 | 41.0 | 41.0 | 41.0 | 43.8 | 43.8 | 43.8 |
| Approximate expressions for point Pr | R32 | −12.8r2 + 20.0r + 8.6 | | | −16.0r2 + 22.8r + 7.3 | | | 2.4r2 − 19.0r + 24.3 | | | 12.0r2 − 34.2r + 28.8 | | |
| | CO2 | −25.6r2 + 40.0r + 3.8 | | | −19.2r2 + 34.4r + 2.7 | | | −10.4r2 + 43.8r − 1.9 | | | −18.4r2 + 56.6r − 8.6 | | |
| | R125 + R134a | 100 − R32 − CO2 − x | | | 100 − R32 − CO2 − x | | | 100 − R32 − CO2 − x | | | 100 − R32 − CO2 − x | | |
| Calculation of approximate expressions for R32, represented by r and x | x = R1234yf | 41.0 | | | 43.8 | | | 41.0 | | | 43.8 | | |
| | a | −12.8 | | | −16.0 | | | 2.4 | | | 12.0 | | |
| | b | 20.0 | | | 22.8 | | | −19.0 | | | −34.2 | | |
| | c | 8.6 | | | 7.3 | | | 24.3 | | | 28.8 | | |
| | Approximate expression a | −1.1429x + 34.057 | | | | | | 3.4286x − 138.17 | | | | | |
| | Approximate expression b | 1.0x − 21.0 | | | | | | −5.4286x + 203.57 | | | | | |
| | Approximate expression c | −0.4643x + 27.636 | | | | | | 1.6071x − 41.593 | | | | | |
| Calculation of approximate expressions for CO2, represented by r and x | x = R1234yf | 41.0 | | | 43.8 | | | 41.0 | | | 43.8 | | |
| | a | −25.6 | | | −19.2 | | | −10.4 | | | −18.4 | | |
| | b | 40.0 | | | 34.4 | | | 43.8 | | | 56.6 | | |
| | c | 3.8 | | | 2.7 | | | −1.9 | | | −8.6 | | |
| | Approximate expression a | 2.2857x − 119.31 | | | | | | −2.8571x + 106.74 | | | | | |
| | Approximate expression b | −2.0x + 122.0 | | | | | | 4.5714x − 143.63 | | | | | |
| | Approximate expression c | −0.3929x + 19.907 | | | | | | −2.3929x + 96.207 | | | | | |
| Approximate expressions for P(r, x) | Approximate expression for R32 | (−1.1429x + 34.057)r2 + (1.0x − 21.0)r + (−0.4643x + 27.636) | | | | | | (3.4286x − 138.17)r2 + (−5.4286x + 203.57) + (1.6071x − 41.593) | | | | | |
| | Approximate expression c for CO2 | (2.2857x − 119.31)r2 + (−2.0x + 122.0)r + (−0.3929x + 19.907) | | | | | | (−2.8571x + 106.74)r2 + (4.5714x − 143.63)r + (−2.3929x + 96.027) | | | | | |
| | R125 + R134a | 100 − R32 − CO2 − x | | | | | | 100 − R32 − CO2 − x | | | | | |

TABLE 279

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| Point Pr | R32 | 12.0 | 13.6 | 14.7 | 11.3 | 12.8 | 13.1 | 14.7 | 9.9 | 6.6 | 13.1 | 8.7 | 5.9 |
| | CO2 | 10.1 | 12.9 | 15.1 | 7.8 | 10.7 | 13.6 | 15.1 | 23.5 | 29.6 | 13.6 | 21.7 | 27.4 |
| | R125 + R134a | 53.9 | 56.7 | 58.9 | 34.4 | 30.0 | 26.8 | 58.9 | 67.3 | 73.4 | 26.8 | 23.1 | 20.2 |
| | R1234yf | 43.8 | 43.8 | 43.8 | 46.5 | 46.5 | 46.5 | 43.8 | 43.8 | 43.8 | 46.5 | 46.5 | 46.5 |
| Approximate expressions for point Pr | R32 | −16.0r2 + 22.8r + 7.3 | | | −38.4r2 + 36.0r + 4.7 | | | 12.0r2 −34.2r + 28.8 | | | 12.8r2 − 33.6r + 26.7 | | |
| | CO2 | −19.2r2 + 34.4r + 2.7 | | | 23.2r + 2.0 | | | −18.4r2 + 56.6r − 8.6 | | | −19.2r2 + 56.4r − 9.8 | | |
| | R125 + R134a | 100 − R32 − CO2 − x | | | 100 − R32 − CO2 − x | | | 100 − R 32 − CO2 − x | | | 100 − R32 − CO2 − x | | |
| Calculation of approximate expressions | x = R1234yf | 43.8 | | | 46.5 | | | 43.8 | | | 46.5 | | |
| | a | −16.0 | | | −38.4 | | | 12.0 | | | 12.8 | | |
| | b | 22.8 | | | 36.0 | | | −34.2 | | | −33.6 | | |
| | c | 7.3 | | | 4.7 | | | 28.8 | | | 26.7 | | |

TABLE 279-continued

| Item | | r = R125/(R125 + R134a) | | | | | | | | | | | |
|---|---|---|---|---|---|---|---|---|---|---|---|---|---|
| | | 0.250 | 0.375 | 0.500 | 0.250 | 0.375 | 0.500 | 0.500 | 0.750 | 1.000 | 0.500 | 0.750 | 1.000 |
| for R32, represented by r and x | Approximate expression a | −8.2963x + 347.38 | | | | | | 0.2963x − 0.9778 | | | | | |
| | Approximate expression b | 4.8889x − 191.33 | | | | | | 0.2222x − 43.933 | | | | | |
| | Approximate expression c | −0.963x + 49.478 | | | | | | −0.7778x + 62.867 | | | | | |
| Calculation of approximate expressions for CO2, represented by r and x | x = R1234yf | | 43.8 | | | 46.5 | | | 43.8 | | | 46.5 | |
| | a | | −19.2 | | | 0.0 | | | −18.4 | | | −19.2 | |
| | b | | 34.4 | | | 23.2 | | | 56.6 | | | 56.4 | |
| | c | | 2.7 | | | 2.0 | | | −8.6 | | | −9.8 | |
| | Approximate expression a | 7.1111x − 330.67 | | | | | | −0.2963x − 5.4222 | | | | | |
| | Approximate expression b | −4.1481x + 216.09 | | | | | | −0.0741x + 59.844 | | | | | |
| | Approximate expression c | −0.2593x + 14.056 | | | | | | −0.4444x + 10.867 | | | | | |
| Approximate expressions for P(r, x) | Approximate expression for R32 | (−8.2963x + 347.38)r2 + (4.8889x − 191.33) r + (−0.963x + 49.478) | | | | | | (0.2963x − 0.9778)r2 + (0.2222x − 43.933) r + (−0.7778x + 62.867) | | | | | |
| | Approximate expression c for CO2 | (7.1111x − 330.67)r2 + (−4.1481x + 216.09) r + (−0.2593x + 14.056) | | | | | | (−0.2963x−5.4222)r2 + (−0.0741x + 59.844) r + (−0.4444x + 10.867) | | | | | |
| | R125 + R134a | 10 0− R32 − CO2 − x | | | | | | 100 − R32 − CO2 − x | | | | | |

TABLE 280

| Item | | r = R125/(R125 + R134a) | | | | | | | | | | | |
|---|---|---|---|---|---|---|---|---|---|---|---|---|---|
| | | 0.250 | 0.310 | 0.370 | 0.250 | 0.310 | 0.370 | 0.500 | 0.750 | 1.000 | 0.500 | 0.750 | 1.000 |
| Point Pr | R32 | 11.3 | 12.2 | 12.8 | 10.5 | 11.2 | 11.9 | 13.1 | 8.7 | 5.9 | 10.8 | 6.8 | 3.0 |
| | CO2 | 7.8 | 9.2 | 10.7 | 4.7 | 6.5 | 7.7 | 13.6 | 21.7 | 27.4 | 11.8 | 19.7 | 26.3 |
| | R125 + R134a | 34.4 | 32.1 | 30.0 | 34.8 | 32.3 | 30.4 | 26.8 | 23.1 | 20.2 | 27.4 | 23.5 | 20.7 |
| | R1234yf | 46.5 | 46.5 | 46.5 | 50.0 | 50.0 | 50.0 | 46.5 | 46.5 | 46.5 | 50.0 | 50.0 | 50.0 |
| Approximate expressions for point Pr | R32 | −41.667r2 + 38.333r + 4.3208 | | | 11.667r + 7.5833 | | | 12.8r2 − 33.6r + 26.7 | | | 1.6r2 − 18.0r + 19.4 | | |
| | CO2 | 13.889r2 + 15.556r + 3.0431 | | | −83.333r2 + 76.667r − 9.2583 | | | −19.2r2 + 56.4r − 9.8 | | | −10.4r2 + 44.6r − 7.9 | | |
| | R125 + R134a | 100 − R32 − CO2 − x | | | 100 − R32 − CO2 − x | | | 100 − R32 − CO2 − x | | | 100 − R32 − CO2 − x | | |
| Calculation of approximate expressions for R32, represented by r and x | x = R1234yf | | 46.5 | | | 50.0 | | | 46.5 | | | 50.0 | |
| | a | | −41.6670 | | | 0.0000 | | | 12.8 | | | 1.6 | |
| | b | | 38.3330 | | | 11.6670 | | | −33.6 | | | −18.0 | |
| | c | | 4.3206 | | | 7.5833 | | | 26.7 | | | 19.4 | |
| | Approximate expression a | 11.905x − 595.24 | | | | | | −3.2x + 161.6 | | | | | |
| | Approximate expression b | −7.6189x + 392.61 | | | | | | 4.4571x − 240.86 | | | | | |
| | Approximate expression c | −0.9322x − 39.027 | | | | | | −2.0857x + 123.69 | | | | | |
| Calculation of approximate expressions for CO2, represented by r and x | x = R1234yf | | 46.5 | | | 50.0 | | | 46.5 | | | 50.0 | |
| | a | | 13.889 | | | −83.333 | | | −19.2 | | | −10.4 | |
| | b | | 15.556 | | | 76.667 | | | 56.4 | | | 44.6 | |
| | c | | 3.043 | | | −9.258 | | | −9.8 | | | −7.9 | |
| | Approximate expression a | −27.778x + 1305.6 | | | | | | 2.5143x − 136.11 | | | | | |
| | Approximate expression b | 17.46x − 796.35 | | | | | | −3.3714x + 213.17 | | | | | |
| | Approximate expression c | −3.5147x + 166.48 | | | | | | 0.5429x − 35.043 | | | | | |
| Approximate expressions for P(r, x) | Approximate expression for R32 | (11.905x − 595.24)r2 + (−7.6189x + 392.61)r + (0.9322x − 39.027) | | | | | | (−3.2x + 161.6)r2 + (4.4571x − 240.86)r + (−2.0857x + 123.69) | | | | | |
| | Approximate expression c for CO2 | (−27.778x + 1305.6)r2 + (17.46x − 796.35)r + (−3.5147x + 166.48) | | | | | | (2.5143x − 136.11)r2 + (−3.3714x + 213.17)r + (0.5429x − 35.043) | | | | | |
| | R125 + R134a | 100 − R32 − CO2 − x | | | | | | 100 − R32 − CO2 − x | | | | | |

(1-7) Various Refrigerants 3

1. Composition

The composition of the present disclosure contains a refrigerant, and examples of the refrigerant include "refrigerant 3A" and "refrigerant 3B". Refrigerant 3A and refrigerant 3B will each be described below. As used herein, "the refrigerant of the present disclosure" means refrigerant 3A and refrigerant 3B.

(1-7-1) Refrigerant 3A

The refrigerant contained in the composition of the present disclosure contains HFO-1132(Z) and HFO-1234yf in one embodiment. This refrigerant may be sometimes referred to as "refrigerant 3A".

In refrigerant 3A, the content of HFO-1132(Z) is 53.0 to 59.5% by mass, and the content of HFO-1234yf is 47.0 to 40.5% by mass, based on the total mass of HFO-1132(Z) and HFO-1234yf.

Refrigerant 3A has such a configuration and thus refrigerant 3A has the following desired properties as an R134a alternative refrigerant: (1) having a sufficiently small GWP (100 or less), (2) having a COP equivalent to or more than that of R134a, (3) having a refrigerating capacity equivalent to or more than that of R134a, and (4) having a lower flammability (Class 2L) in the ASHRAE standard.

In the present items, the phrase "having a sufficiently small GWP" means to have a GWP of usually 100 or less, preferably 75 or less, more preferably 50 or less, and further preferably 25 or less.

When the content off-WO-1132(Z) based on the total mass of WO-1132(Z) and HFO-1234yf is more than 59.5% by mass in refrigerant 3A, a problem arises in that refrigerant 3A becomes weakly flammable.

Refrigerant 3A has a refrigerating capacity of usually 95% or more, preferably 98% or more, more preferably 99% or more, further preferably 100% or more, and particularly preferably 100.5% or more with respect to R134a, from the viewpoint of enabling reduction of power consumption during operation in comparison with a commercial R134a refrigeration apparatus.

Refrigerant 3A has a GWP of 100 or less and thus can significantly suppress the environmental load compared with other general-purpose refrigerants from the viewpoint of global warming.

Refrigerant 3A has a ratio between the power consumed in a refrigeration cycle and refrigerating capacity (coefficient of performance (COP)) of 100% or more with respect to R134a, and therefore refrigerant 3A can be applied to a commercial R134a refrigeration apparatus without a large design change.

Preferably, refrigerant 3A has a higher ratio between power consumed in a refrigeration cycle and refrigerating capacity (coefficient of performance (COP)) with respect to R134a in terms of energy consumption efficiency. Specifically, the COP with respect to R134a is preferably 98% or more, more preferably 99% or more, further preferably 100% or more, and particularly preferably 101% or more.

In refrigerant 3A, it is preferred that the content of HFO-11320 be 53.0 to 59.0% by mass, and the content of HFO-1234yf be 47.0 to 41.0% by mass, based on the total mass of HFO-1132(Z) and HFO-1234yf.

In refrigerant 3A, it is more preferred that the content of HFO-1132(Z) be 54.0 to 59.0% by mass, and the content of HFO-1234yf be 46.0 to 41.0% by mass, based on the total mass of HFO-1132(Z) and HFO-12343f.

In refrigerant 3A, it is further preferred that the content of HFO-1132(Z) be 55.0 to 59.0% by mass, and the content of HFO-1234yf be 45.0 to 41.0% by mass, based on the total mass of HFO-1132(Z) and HFO-12343f.

In refrigerant 3A, it is particularly preferred that the content of HFO-1132(Z) be 56.0 to 59.0% by mass, and the content of HFO-1234yf be 44.0 to 41.0% by mass, based on the total mass of HFO-1132(Z) and HFO-1234yf.

Refrigerant 3A may usually contain 99.5% by mass or more of HFO-1132(Z) and HFO-1234yf in terms of the sum of the concentrations of these. In the present disclosure, the total amount of HFO-1132(Z) and HFO-1234yf in the entire refrigerant 3A is preferably 99.7% by mass or more, more preferably 99.8% by mass or more, and further preferably 99.9% by mass or more.

Refrigerant 3A can further contain other refrigerants in addition to HFO-1132(Z) and HFO-1234yf within a range in which other refrigerants do not impair the above properties. In this case, the content of other refrigerants in the entire refrigerant 3A is preferably 0.5% by mass or less, more preferably 0.3% by mass or less, further preferably 0.2% by mass or less, and particularly preferably 0.1% by mass or less. Other refrigerants are not limited and can be widely selected from known refrigerants which are widely used in this field. Refrigerant 3A may comprise one other refrigerant alone or may comprise two or more other refrigerants.

In the present disclosure, refrigerant 3A is preferably used for operating a refrigeration cycle in which the evaporating temperature is −60 to 20° C., from the viewpoint of sufficiently cooling the interior of a room, and an object to be cooled.

In the refrigeration cycle in which refrigerant 3A is used, the evaporating temperature is more preferably 15° C. or lower, even more preferably 10° C. or lower, further preferably 5° C. or lower, and particularly preferably lower than 0° C. from the viewpoint of sufficiently cooling the interior of a room, and an object to be cooled.

In the refrigeration cycle in which refrigerant 3A is used, the evaporating temperature is preferably −55° C. or higher, more preferably −50° C. or higher, further preferably −45° C. or higher, and particularly preferably −40° C. or higher from the viewpoint of setting the evaporating pressure to 0.02 MPa or higher.

In the refrigeration cycle in which refrigerant 3A is used, the evaporating temperature is more preferably −55° C. or higher and 15° C. or lower, even more preferably −50° C. or higher and 10° C. or lower, further preferably −45° C. or higher and 5° C. or lower, and particularly preferably −40° C. or higher and lower than 0° C.

It is particularly preferred that refrigerant 3A consist of HFO-1132(Z) and HFO-1234yf. In other words, it is particularly preferred for refrigerant 3A that the total concentration of FIFO-1132(Z) and HFO-1234yf in the entire refrigerant 3A be 100% by mass.

When refrigerant 3A consists of HFO-1132(Z) and HFO-1234yf, it is preferred that the content of HFO-1132(Z) be 53.0 to 59.5% by mass, and the content of HFO-1234yf be 47.0 to 40.5% by mass, based on the total mass of HFO-1132(Z) and HFO-1234yf.

When refrigerant 3A consists of HFO-1132(Z) and HFO-1234yf, it is even more preferred that the content of HFO-1132(Z) be 54.0 to 59.0% by mass, and the content of HFO-1234yf be 46.0 to 41.0% by mass, based on the total mass of HFO-1132(Z) and HFO-1234yf When refrigerant 3A consists of HFO-1132(Z) and HFO-1234yf, it is further preferred that the content of HFO-1132 (Z) be 55.0 to 59.0% by mass, and the content of HFO-1234yf be 45.0 to 41.0% by mass, based on the total mass of HFO-1132(Z) and HFO-1234yf.

When refrigerant 3A consists of HFO-1132(Z) and HFO-1234yf, it is particularly preferred that the content of HFO-1132(Z) be 56.0 to 59.0% by mass, and the content of HFO-1234yf be 44.0 to 41.0% by mass, based on the total mass of HFO-1132(Z) and HFO-1234yf.

When refrigerant 3A consists of HFO-1132(Z) and HFO-1234yf, it is preferred that the content of HFO-1132(Z) be 53.0 to 59.5% by mass, and the content of HFO-1234yf be 47.0 to 40.5% by mass, based on the total mass of HFO-1132(Z) and HFO-1234yf, and refrigerant 3A be used for operating a refrigeration cycle in which the evaporating temperature is −55° C. to 15° C.

When refrigerant 3A consists of HFO-1132(Z) and HFO-1234yf, it is more preferred that the content of HFO-1132(Z) be 54.0 to 59.0% by mass, and the content of HFO-1234yf be 46.0 to 41.0% by mass, based on the total mass of HFO-1132(Z) and HFO-1234yf, and refrigerant 3A be used, for operating a refrigeration cycle in which the evaporating temperature is −50° C. to 10° C.

When refrigerant 3A consists of HFO-1132(Z) and HFO-1234yf, it is further preferred that the content of HFO-1132 (Z) be 55.0 to 59.0% by mass, and the content of HFO-1234yf be 45.0 to 41.0% by mass, based on the total mass of WO-1132(Z) and HFO-1234yf, and refrigerant 3A be used for operating a refrigeration cycle in which the evaporating temperature is −45° C. to 5° C.

When refrigerant 3A consists of HFO-1132(Z) and HFO-1234yf, it is particularly preferred that the content of HFO-1132(Z) be 56.0 to 59.0% by mass, and the content of HFO-1234yf be 44.0 to 41.0% by mass, based on the total mass of HFO-1132(Z) and HFO-1234yf, and refrigerant 3A be used for operating a refrigeration cycle in which the evaporating temperature is −40° C. or higher and less than 0° C.

(1-7-2) Refrigerant 3B 1.2 Refrigerant 3B

In one embodiment, the refrigerant contained in the composition of the present disclosure contains HFO-1132 (Z) and HFO-1234yf, and the content of HFO-1132(Z) is 41.0 to 49.2% by mass, and the content of HFO-1234yf is 59.0 to 50.8% by mass, based on the total mass of HFO-1132(Z) and HFO-1234y. This refrigerant is sometimes referred to as the "refrigerant 3B".

Refrigerant 3B has such a configuration and thus has the following desired properties as an R134a alternative refrigerant: (1) having a sufficiently small GWP (100 or less), (2) having a COP equivalent to or more than that of R134a, (3) having a refrigerating capacity equivalent to or more than that of R134a, and (4) having a lower flammability (Class 2L) in the ASHRAE standard.

In the present items, the phrase "having a sufficiently small GWP" means to have a GWP of usually 100 or less, preferably 75 or less, more preferably 50 or less, and further preferably 25 or less.

Refrigerant 3B has a GWP of 100 or less and thus can significantly suppress the environmental load compared with other general-purpose refrigerants from the viewpoint of global warming.

Refrigerant 3B has a refrigerating capacity of usually 95% or more, preferably 98% or more, more preferably 99% or more, further preferably 100% or more, and particularly preferably 101% or more with respect to R134a, from the viewpoint of enabling reduction of power consumption during operation in comparison a commercial R134a refrigeration apparatus.

Refrigerant 3B has a ratio between power consumed in a refrigeration cycle and refrigerating capacity (coefficient of performance (COP)) of 100% or more with respect to R134a, and therefore refrigerant 3B can be applied to a commercial R134a refrigeration apparatus without a large design change.

Preferably, refrigerant 3B has a higher ratio between power consumed in a refrigeration cycle and refrigerating capacity (coefficient of performance (COP)) with respect to R134a in terms of energy consumption efficiency. Specifically, the COP with respect to R134a is preferably 98% or more, more preferably 99% or more, further preferably 100% or more, and particularly preferably 101% or more.

In refrigerant 3B, it is preferred that the content of HFO-1132(Z) be 42.0 to 49.2% by mass, and the content of HFO-1234yf be 58.0 to 50.8% by mass, based on the total mass of HFO-1132(Z) and HFO-12343f.

In refrigerant 3B, it is more preferred that the content of HFO-1132(Z) be 43.0 to 49.2% by mass, and the content of HFO-1234yf be 57.0 to 50.8% by mass, based on the total mass of HFO-1132(2) and HFO-1234yf.

In refrigerant 3B, it is further preferred that the content of HFO-1132(Z) be 44.0 to 49.0% by mass, and the content of HFO-1234yf be 56.0 to 51.0% by mass, based on the total mass of HFO-1132(Z) and HFO-1234yf.

Refrigerant 3B may usually contain 99.5% by mass or more of HFO-1132(Z) and HFO-1234yf in terms of the sum of the concentrations of these. In the present disclosure, the total amount of HFO-1132(Z) and HFO-1234yf in the entire refrigerant 3B is preferably 99.7% by mass or more, more preferably 99.8% by mass or more, and further preferably 99.9% by mass or more.

Refrigerant 3B can further contain other refrigerants in addition to HFO-1132(Z) and HFO-1234yf within a range in which other refrigerants do not impair the above properties. In this case, the content of other refrigerants in the entire refrigerant 3B is preferably 0.5% by mass or less, more preferably 0.3% by mass or less, further preferably 0.2% by mass or less, and particularly preferably 0.1% by mass or less. Other refrigerants are not limited and can be widely selected from known refrigerants which are widely used in this field. Refrigerant 3B may comprise one other refrigerant alone or may comprise two or more other refrigerants.

In the present disclosure, refrigerant 3B is preferably used for operating a refrigeration cycle in which the evaporating temperature is −60 to 20° C., from the viewpoint of sufficiently cooling the interior of a room, and an object to be cooled.

In the refrigeration cycle in which refrigerant 3B is used, the evaporating temperature is more preferably 15° C. or lower, even more preferably 10° C. or lower, further preferably 5° C. or lower, and particularly preferably lower than 0° C. from the viewpoint of sufficiently cooling the interior of a room, and an object to be cooled.

In the refrigeration cycle in which refrigerant 3B is used, the evaporating temperature is preferably −55° C. or higher, more preferably −50° C. or higher, further preferably −45° C. or higher, and particularly preferably −40° C. or higher from the viewpoint of setting the evaporating pressure to 0.02 MPa or higher.

In the refrigeration cycle in which refrigerant 3B is used, the evaporating temperature is more preferably −55° C. or higher and 15° C. or lower, even more preferably −50° C. or higher and 10° C. or lower, further preferably −45° C. or higher and 5° C. or lower, and particularly preferably −40° C. or higher and lower than 0° C.

It is particularly preferred that refrigerant 3B consist of HFO-1132(Z) and HFO-1234yf. In other words, it is particularly preferred for refrigerant 3B that the total concentration of HFO-1132(Z) and HFO-1234yf in the entire refrigerant 3B be 100% by mass.

When refrigerant 3B consists of HFO-1132(Z) and HFO-1234yf it is preferred that the content of HFO-1132(Z) be 41.0 to 49.2% by mass, and the content of HFO-1234yf be 59.0 to 50.8% by mass, based on the total mass of HFO-1132(Z) and HFO-1234yf.

When refrigerant 3B consists of HFO-1132(Z) and HFO-1234yf, it is more preferred that the content of HFO-1132(Z) is 42.0 to 49.2% by mass, and the content of HFO-1234yf is 58.0 to 50.8% by mass, based on the total mass of HFO-1132(Z) and HFO-1234yf.

When refrigerant 3B consists of HFO-1132(Z) and HFO-1234yf, it is further preferred that the content of HFO-1132 (Z) be 43.0 to 49.2% by mass, and the content of HFO-1234yf be 57.0 to 50.8% by mass, based on the total mass of HFO-1132(Z) and HFO-1234yf.

When refrigerant 3B consists of HFO-1132(Z) and HFO-1234yf, it is particularly preferred that the content of HFO-1132(Z) be 44.0 to 49.0% by mass, and the content of HFO-1234yf be 56.0 to 51.0% by mass, based on the total mass of HFO-1132(Z) and HFO-1234yf.

When refrigerant 3B consists of HFO-1132(Z) and HFO-1234yf, it is preferred that the content of HFO-1132(Z) be 41.0 to 49.2% by mass, and the content of HFO-1234yf be 59.0 to 50.8% by mass, based on the total mass of HFO-1132(Z) and HFO-1234yf, and refrigerant 3B is used for operating a refrigeration cycle in which the evaporating temperature is −55° C. to 15° C.

When refrigerant 3B consists of HFO-1132(Z) and HFO-1234yf, it is more preferred that the content of HFO-1132(Z) be 42.0 to 49.2% by mass, and the content of HFO-1234yf be 58.0 to 50.8% by mass, based on the total mass of HFO-1132(Z) and HFO-1234y f, and refrigerant 3B be used for operating a refrigeration cycle in which the evaporating temperature is −50° C. to 10° C.

When refrigerant 3B consists of HFO-1132(Z) and HFO-1234yf, it is further preferred that the content of HFO-1132 (Z) is 43.0 to 49.2% by mass, and the content of HFO-1234yf is 57.0 to 50.8% by mass, based on the total mass of HFO-1132(Z) and HFO-1234yf, and refrigerant 3B be used for operating a refrigeration cycle in which the evaporating temperature is −45° C. to 5° C.

When refrigerant 3B consists of HFO-1132(Z) and HFO-1234yf, it is particularly preferred that the content of HFO-1132(Z) be 44.0 to 49.0% by mass, and the content of HFO-1234yf be 56.0 to 51.0% by mass, based on the total mass of HFO-1132(Z) and HFO-1234yf, and refrigerant 3B be used for operating a refrigeration cycle in which the evaporating temperature is −40° C. or higher and less than 0° C.

1.3 Applications

The composition containing a refrigerant according to the present disclosure can be widely used as a working fluid in existing applications of a refrigerant in 1) a refrigeration method comprising the step of operating a refrigeration cycle, 2) a method for operating a refrigeration apparatus operating a refrigeration cycle, and the like.

Here, the above-mentioned refrigeration cycle means circulating a refrigerant (refrigerant 3A and refrigerant 3B of the present disclosure) via a compressor through the interior of a refrigeration apparatus in a state of only the refrigerant or in a state of a refrigerant composition or a refrigerator oil-containing working fluid described below to convert energy.

The present disclosure also encompasses the use of the refrigerants (or compositions comprising them) of the present disclosure in a refrigeration method, the use of the refrigerants (or compositions comprising them) of the present disclosure in a method for operating a refrigeration apparatus or the like, and further refrigeration apparatuses having the refrigerants (or compositions comprising them) of the present disclosure, and the like.

The composition containing refrigerant 3A according to the present disclosure is preferably used for operating a refrigeration cycle in which the evaporating temperature is −60 to 20° C., from the viewpoint of sufficiently cooling the interior of a room, and an object to be cooled. In addition, by using the composition containing refrigerant 3A according to the present disclosure for operating the refrigeration cycle in which the evaporating temperature is −60 to 20° C., the COP during operation increases in comparison with a commercial R134a refrigeration apparatus, and therefore the power consumption can be reduced.

In the refrigeration cycle in which the composition containing refrigerant 3A is used, the evaporating temperature is more preferably 15° C. or lower, even more preferably 10° C. or lower, further preferably 5° C. or lower, and particularly preferably lower than 0° C. from the viewpoint of sufficiently cooling the interior of a room, and an object to be cooled.

In the refrigeration cycle in which the composition containing refrigerant 3A is used, the evaporating temperature is preferably −55° C. or higher, more preferably −50° C. or higher, further preferably −45° C. or higher, and particularly preferably −40° C. or higher from the viewpoint of setting the evaporating pressure to 0.02 MPa or higher.

In the refrigeration cycle in which the composition containing refrigerant 3A is used, the evaporating temperature is more preferably −55° C. or higher and 15° C. or lower, even more preferably −50° C. or higher and 10° C. or lower, further preferably −45° C. or higher and 5° C. or lower, and particularly preferably −40° C. or higher and lower than 0° C.

The composition containing refrigerant 3A is preferably used for operating a refrigeration cycle in which the condensation temperature is 0 to 70° C.

In the refrigeration cycle in which the composition containing refrigerant 3A is used, the condensation temperature is preferably 70° C. or lower, more preferably 60° C. or lower, further preferably 55° C. or lower, and particularly preferably 50° C. or lower from the viewpoint of extending the life of a refrigeration apparatus.

In the refrigeration cycle in which the composition containing refrigerant 3A is used, the condensation temperature is preferably 0° C. or higher, more preferably 5° C. or higher, further preferably 10° C. or higher, and particularly preferably 15° C. or higher from the viewpoint of preventing dew condensation on an outdoor unit.

The present disclosure can provide an apparatus constituting a refrigeration cycle in which the composition containing refrigerant 3A is circulated via a compressor.

The composition containing refrigerant 3B is preferably used for operating a refrigeration cycle in which the evaporating temperature is −60 to 20° C., from the viewpoint of sufficiently cooling the interior of a room, and an object to be cooled.

In the refrigeration cycle in which the composition containing refrigerant 3B is used, the evaporating temperature is more preferably 15° C. or lower, even more preferably 10° C. or lower, further preferably 5° C. or lower, and particularly preferably lower than 0° C. from the viewpoint of sufficiently cooling the interior of a room, and an object to be cooled.

In the refrigeration cycle in which the composition containing refrigerant 3B is used, the evaporating temperature is preferably −55° C. or higher, more preferably −50° C. or higher, further preferably −45° C. or higher, and particularly preferably −40° C. or higher from the viewpoint of setting the evaporating pressure to 0.02 MPa or higher.

In the refrigeration cycle in which the composition containing refrigerant 3B is used, the evaporating temperature is more preferably −55° C. or higher and 15° C. or lower, even more preferably −50° C. or higher and 10° C. or lower, further preferably −45° C. or higher and 5° C. or lower, and particularly preferably −40° C. or higher and lower than 0° C.

The composition containing refrigerant 3B is preferably used for operating a refrigeration cycle in which the condensation temperature is 0 to 70° C.

In the refrigeration cycle in which the composition containing refrigerant 3B is used, the condensation temperature is preferably 70° C. or lower, more preferably 60° C. or lower, further preferably 55° C. or lower, and particularly preferably 50° C. or lower from the viewpoint of extending the life of a refrigeration apparatus.

In the refrigeration cycle in which the composition containing refrigerant 3B is used, the condensation temperature is preferably 0° C. or higher, more preferably 5° C. or higher, further preferably 10° C. or higher, and particularly preferably 15° C. or higher from the viewpoint of preventing dew condensation on an outdoor unit.

The present disclosure can provide an apparatus constituting a refrigeration cycle in which the composition containing refrigerant 3B is circulated via a compressor.

Preferred examples of the refrigeration apparatus to which refrigerant 3A and refrigerant 3B (or compositions comprising them) of the present disclosure can be applied include at least one selected from the group consisting of air conditioning equipment, a cold storage chamber, a refrigeration chamber, a water cooler, an ice maker, a cold storage showcase, a refrigeration showcase, a refrigeration and cold storage unit, a refrigerator for a refrigeration and cold storage warehouse, in-car air conditioning equipment, a turbo refrigerator, and a screw refrigerator.

The composition of the present disclosure is suitable for use as an alternative refrigerant to R134a, R22, R12, R404A, R407A, R407C, R407F, R407H, R410A, R413A, R417A, R422A, R422B, R422C, R422D, R423A, R424A, R426A, R427A, R428A, R430A, R434A, R437A, R438A, R448A, R449A, R449B, R450A, R454A, R454C, R455A, R465A, R502, R507, R513A, R513B, R515A, or R515B. Among these, the composition of the present disclosure is particularly suitable for use as an alternative refrigerant to R134a because the composition of the present disclosure has the properties of having a coefficient of performance (COP) and a Capacity equivalent to or higher than those of R134a and having a sufficiently small GWP.

2. Refrigerant Composition

The refrigerant composition of the present disclosure comprises at least the refrigerant of the present disclosure and can be used for the same applications as the refrigerant of the present disclosure.

The refrigerant composition of the present disclosure can be further used for obtaining a working fluid for a refrigeration apparatus by being mixed with at least a refrigerator oil.

The refrigerant composition of the present disclosure further contains at least one other component in addition to the refrigerant of the present disclosure. The refrigerant composition of the present disclosure may contain at least one of the other components described below as needed.

As described above, when the refrigerant composition of the present disclosure is used as a working fluid in a refrigeration apparatus, it is usually used by being mixed with at least a refrigerator oil.

Here, the refrigerant composition of the present disclosure is preferably substantially free from a refrigerator oil. Specifically, in the refrigerant composition of the present disclosure, the content of a refrigerator oil based on the entire refrigerant composition is preferably 0 to 1% by mass, more preferably 0 to 0.5% by mass, further preferably 0 to 0.25% by mass, and particularly preferably 0 to 0.1% by mass.

2.1 Water

The refrigerant composition of the present disclosure may comprise a slight amount of water.

The water content in the refrigerant composition is preferably 0 to 0.1% by mass, more preferably 0 to 0.075% by mass, further preferably 0 to 0.05% by mass, and particularly preferably 0 to 0.025% by mass based on the entire refrigerant When the refrigerant composition comprises a slight amount of water, the intramolecular double bond of the unsaturated fluorocarbon-based compound that can be contained in the refrigerant is stabilized, and the oxidation of the unsaturated fluorocarbon-based compound is also less likely to occur, and therefore the stability of the refrigerant composition improves.

2.2 Tracer

A tracer is added to the refrigerant composition of the present disclosure at a detectable concentration so that when the refrigerant composition of the present disclosure is diluted or contaminated or undergoes some other change, the change can be traced.

The refrigerant composition of the present disclosure may contain one of the above tracer alone or may contain two or more of the above tracers.

The above tracer is not limited and can be appropriately selected from generally used tracers. Preferably, a compound that cannot be an impurity unavoidably mixed into the refrigerant of the present disclosure is selected as the tracer.

Examples of the above tracer include a hydrofluorocarbon, a hydrochlorofluorocarbon, a chlorofluorocarbon, a hydrochlorocarbon, a fluorocarbon, a deuterated hydrocarbon, a deuterated hydrofluorocarbon, a perfluorocarbon, a fluoroether, a brominated compound, an iodinated compound, an alcohol, an aldehyde, a ketone, and nitrous oxide ($N_2O$). Among these, a hydrofluorocarbon, a hydrochlorofluorocarbon, a chlorofluorocarbon, a hydrochlorocarbon, a fluorocarbon, and a fluoroether are preferred.

As the above tracer, specifically, the following compounds (hereinafter also referred to as tracer compounds) are more preferred:

HCC-40 (chloromethane, $CH_3Cl$),
HFC-41 (fluoromethane, $CH_3F$),
HFC-161 (fluoroethane, $CH_3CH_2F$),
HFC-245fa (1,1,1,3,3-pentafluoropropane, $CF_3CH_2CHF_2$),
HFC-236fa (1,1,1,3,3,3-hexafluoropropane, $CF_3CH_2CF_3$),
HFC-236ea (1,1,1,2,3,3-hexafluoropropane, $CF_3CHFCHF_2$),
HCFC-22 (chlorodifluoromethane, $CHClF_2$),
HCFC-31 (chlorofluoromethane, $CH_2ClF$),
CFC-1113 (chlorotrifluoroethylene, $CF_2{=}CClF$),
HFE-125 (trifluoromethyl-difluoromethyl ether, $CF_3OCHF_2$), HFE-134a (trifluoromethyl-fluoromethyl ether, $CF_3OCH_2F$), HFE-143a (trifluoromethyl-methyl ether, $CF_3OCH_3$), HFE-227ea (trifluoromethyl-tetrafluoroethyl ether, $CF_3OCHFCF_3$), and HFE-236fa (trifluoromethyl-trifluoroethyl ether, $CF_3OCH_2CF_3$).

The above tracer compound can be present in the refrigerant composition at a total concentration of 10 parts per million (ppm) by mass to 1,000 ppm. The above tracer compound is preferably present in the refrigerant composition at a total concentration of 30 ppm to 500 ppm, more preferably present in the refrigerant composition at total concentration of 50 ppm to 300 ppm, further preferably present in the refrigerant composition at a total concentration of 75 ppm to 250 ppm, and particularly preferably present in the refrigerant composition at a total concentration of 100 ppm to 200 ppm.

2.3 Ultraviolet Fluorescent Dye

The refrigerant composition of the present disclosure may contain one ultraviolet fluorescent dye alone or may contain two or more ultraviolet fluorescent dyes.

The above ultraviolet fluorescent dye is not limited and can be appropriately selected from generally used ultraviolet fluorescent dyes.

Examples of the above ultraviolet fluorescent dye include naphthalimide, coumarin, anthracene, phenanthrene, xanthene, thioxanthene, naphthoxanthene, and fluorescein, and derivatives thereof. Among these, naphthalimide and coumarin are preferred.

2.4 Stabilizer

The refrigerant composition of the present disclosure may contain one stabilizer alone or may contain two or more stabilizers.

The above stabilizer is not limited and can be appropriately selected from generally used stabilizers.

Examples of the above stabilizer include nitro compounds, ethers, and amines.

Examples of the nitro compounds include an aliphatic nitro compound such as nitromethane or nitroethane, and an aromatic nitro compound such as nitrobenzene or nitrostyrene.

Examples of the ethers include 1,4-dioxane.

Examples of the amines include 2,2,3,3,3-pentafluoropropylamine and diphenylamine.

Examples of the above stabilizer also include butylhydroxyxylene and benzotriazole in addition to the above nitro compounds, ethers, and amines.

The content of the above stabilizer is not limited and is usually 0.01 to 5% by mass, preferably 0.05 to 3% by mass, more preferably 0.1 to 2% by mass, further preferably 0.25 to 1.5% by mass, and particularly preferably 0.5 to 1% by mass based on the entire refrigerant.

The method for evaluating the stability of the refrigerant composition of the present disclosure is not limited, and the stability can be evaluated by a generally used method. One example of such a method includes a method of evaluating according to ASHRAE Standard 97-2007 using the amount of free fluorine ions as an indicator. Another example includes a method of evaluating using a total acid number as an indicator. This method can be performed, for example, according to ASTM D 974-06.

2.5 Polymerization Inhibitor

The refrigerant composition of the present disclosure may contain one polymerization inhibitor alone or may contain two or more polymerization inhibitors.

The above polymerization inhibitor is not limited and can be appropriately selected from generally used polymerization inhibitors.

Examples of the above polymerization inhibitor include 4-methoxy-1-naphthol, hydroquinone, hydroquinone methyl ether, dimethyl-t-butylphenol, 2,6-di-tert-butyl-p-cresol, and benzotriazole.

The content of the above polymerization inhibitor is not limited and is usually 0.01 to 5% by mass, preferably 0.05 to 3% by mass, more preferably 0.1 to 2% by mass, further preferably 0.25 to 1.5% by mass, and particularly preferably 0.5 to 1% by mass based on the entire refrigerant.

2.6 Other Components that can be Contained in Refrigerant Composition

In the refrigerant composition of the present disclosure, examples of a component that can be contained also include the following components.

For example, the refrigerant composition of the present disclosure can contain a fluorinated hydrocarbon which are different from the above-described refrigerant. The fluorinated hydrocarbon as another component is not limited, and examples thereof include at least one fluorinated hydrocarbon selected from the group consisting of HCFC-1122 and HCFC-124 and CFC-1113.

As the other components, the refrigerant composition of the present disclosure can contain at least one halogenated organic compound, for example, represented by formula (A): $C_mH_nX_p$ wherein X each independently represents a fluorine atom, a chlorine atom, or a bromine atom, m is 1 or 2, $2m+2 \geq n+p$, and $p \geq 1$. The above halogenated organic compound is not limited, and, for example, difluorochloromethane, chloromethane, 2-chloro-1,1,1,2,2-pentafluoroethane, 2-chloro-1,1,1,2-tetrafluoroethane, 2-chloro-1,1-difluoroethylene, and trifluoroethylene are preferred.

As the other component, the refrigerant composition of the present disclosure can contain at least one organic compound, for example, represented by formula (B): $C_mH_nX_p$ wherein X each independently represent an atom that is not a halogen atom, m is 1 or 2, $2m+2 \geq n+p$, and $p \geq 1$. The above organic compound is not limited, and, for example, propane and isobutane are preferred.

The content of the fluorinated hydrocarbon, halogenated organic compound represented by the above formula (A), and organic compound represented by the above formula (B) is not limited, but the total amount of these is preferably 0.5% by mass or less, more preferably 0.3% by mass or less, and particularly preferably 0.1% by mass or less based on the total amount of the refrigerant composition.

3. Refrigerator Oil-Containing Working Fluid

The refrigerator oil-containing working fluid of the present disclosure comprises at least the refrigerant or refrigerant composition of the present disclosure and a refrigerator oil and is used as a working fluid in a refrigeration apparatus. Specifically, the refrigerator oil-containing working fluid of the present disclosure is obtained by the mixing of a refrigerator oil used in the compressor of a refrigeration apparatus and the refrigerant or the refrigerant composition with each other.

The content of the above refrigerator oil is not limited and is usually 10 to 50% by mass, preferably 12.5 to 45% by mass, more preferably 15 to 40% by mass, further preferably 17.5 to 35% by mass, and particularly preferably 20 to 30% by mass based on the entire refrigerator oil-containing working fluid.

3.1 Refrigerator Oil

The composition of the present disclosure may contain one refrigerator oil alone or may contain two or more refrigerator oils.

The above refrigerator oil is not limited and can be appropriately selected from generally used refrigerator oils. At the time, a refrigerator oil which is superior in terms of miscibility with the mixture of refrigerants of the present disclosure (the mixed refrigerant of the present disclosure) and the function of improving the stability of the mixed refrigerant of the present disclosure and the like can be appropriately selected as needed.

As the base oil of the above refrigerator oil, for example, at least one selected from the group consisting of a polyalkylene glycol (PAG), a polyol ester (POE), and a polyvinyl ether (PVE) is preferred.

The above refrigerator oil may further comprise an additive in addition to the above base oil.

The above additive may be at least one selected from the group consisting of an antioxidant, an extreme pressure agent, an acid scavenger, an oxygen scavenger, a copper deactivator, a rust preventive, an oily agent, and an antifoaming agent.

As the above refrigerator oil, one having a kinematic viscosity of 5 to 400 cSt at 40° C. is preferred in terms of lubrication.

The refrigerator oil-containing working fluid of the present disclosure may further comprise at least one additive as needed. Examples of the additive include the following compatibilizing agent.

3.2 Compatibilizing Agent

The refrigerator oil-containing working fluid of the present disclosure may contain one compatibilizing agent alone or may contain two or more compatibilizing agents.

The above compatibilizing agent is not limited and can be appropriately selected from generally used compatibilizing agents.

Examples of the above compatibilizing agent include a polyoxyalkylene glycol ether, an amide, a nitrite, a ketone, a chlorocarbon, an ester, a lactone, an aryl ether, a fluoroether, and a 1,1,1-trifluoroalkane. Among these, a polyoxyalkylene glycol ether is preferred.

EXAMPLES

The present disclosure will be described in more detail below by giving Examples. However, the present disclosure is not limited to these Examples.

Test Example 1-1

The GWPs of the mixed refrigerants shown in Examples 1-1 to 1-3, Comparative Examples 1-1 to 1-6, and Reference Example 1-1 (R134a) were evaluated based on the values stated in the IPCC Fourth Report.

The COPs, refrigerating capacities, discharge temperatures, saturation pressures at saturation temperature of 40° C., condensation pressures, and evaporating pressures of these mixed refrigerants were obtained by carrying out the theoretical refrigeration cycle calculations for the mixed refrigerants under the following conditions using National Institute of Science and Technology (NIST) Reference Fluid Thermodynamic and Transport Properties Database (Refprop 9.0).

<Air Conditioning Conditions>

Evaporating temperature 10° C.

Condensation temperature 40° C.

Superheating temperature 20 K

Subcooling temperature 0 K

Compressor efficiency 70%

The term "Evaporating temperature 10° C." means that the evaporating temperature of each mixed refrigerant in an evaporator provided in a refrigeration apparatus is 10° C. The term "Condensation temperature 40° C." means that the condensation temperature of each mixed refrigerant in a condenser provided in a refrigeration apparatus is 40° C.

The results of Test Example 1-1 are shown in Table 401. Table 401 shows Examples and Comparative Examples of refrigerant 3A of the present disclosure. In Table 401, "COP ratio" and "Refrigerating capacity ratio" represent proportions (%) with respect to R134a. In Table 401, the term "Saturation pressure (40° C.)" represents saturation pressure at a saturation temperature of 40° C. In Table 401, the term "Discharge temperature (° C.)" represents the highest temperature during the refrigeration cycle in the above theoretical refrigeration cycle calculations of the mixed refrigerants.

The coefficient of performance (COP) was obtained by the following formula.

$$COP=(\text{refrigerating capacity or heating capacity})/\text{power consumption}$$

The compression ratio was obtained by the following formula.

$$\text{Compression ratio}=\text{condensation pressure (Mpa)}/\text{evaporating pressure (Mpa)}$$

The flammability of each mixed refrigerant was determined by considering the mixing composition of the mixed refrigerant as the WCF concentration and measuring the combustion rate according to the ANSI/ASHRAE 34-2013 standard. The flammability of R134a was determined by considering the composition of R134a as the WCF concentration and measuring the combustion rate according to the ANSI/ASHRAE 34-2013 standard.

A mixed refrigerant having a combustion rate of 0 cm/s to 10 cm/s was considered to be "Class 2L (slightly flammable)", and a mixed refrigerant having a combustion rate of more than 10 cm/s was considered to be "Class 2 (weakly flammable)". For R134a, no flame propagation occurred, and therefore R134a was considered to be "Class 1 (nonflammable)". In Table 401, "ASHRAE flammability classification" represents a result based on these determination criteria.

The combustion rate test was performed as follows. First, the mixed refrigerant used had a purity of 99.5% or more and was degassed by repeating the cycle of freezing, pumping, and thawing until no trace of air was observed on a vacuum gauge. The combustion rate was measured by a closed method. The initial temperature was ambient temperature. The ignition was performed by producing an electric spark between the electrodes at the center of a sample cell. The duration of the discharge was 1.0 to 9.9 ms, and the ignition energy was typically about 0.1 to 1.0 J. The spread of the flame was visualized using a schlieren photograph. A cylindrical container (inner diameter: 155 mm, length: 198 mm) equipped with two acrylic windows that transmitted light was used as the sample cell, and as the light source, a xenon lamp was used. A schlieren image of the flame was recorded at a framing rate of 600 fps by a high speed digital video camera and stored in a PC.

Figure 1P:
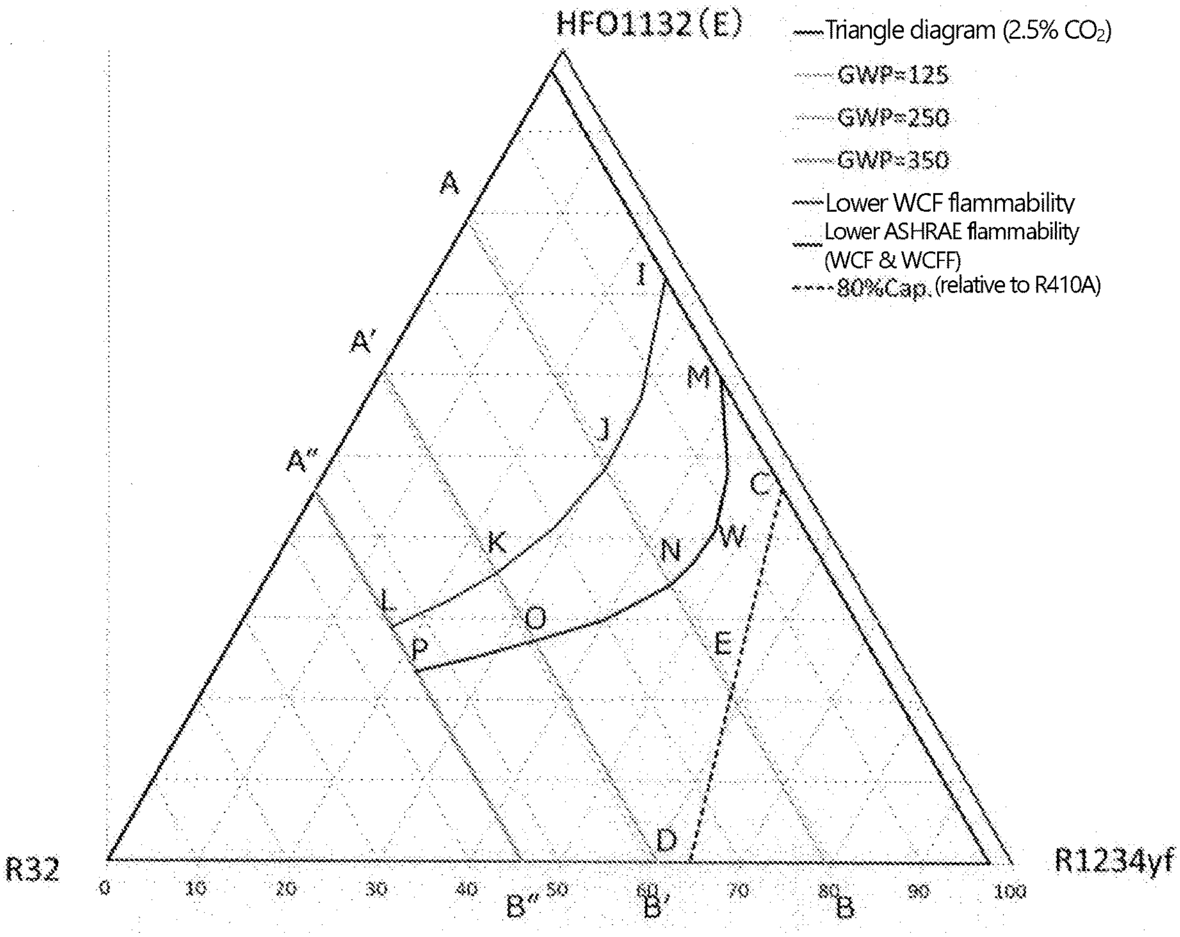
FIG. 1P is a ternary composition diagram in which the sum of the concentrations of R32, HFO-1132(E), and R1234yf is 97.5 mass % (CO2 content is 2.5 mass %), the diagram showing points and line segments defining the refrigerant according to the present disclosure.
Figure 1Q:
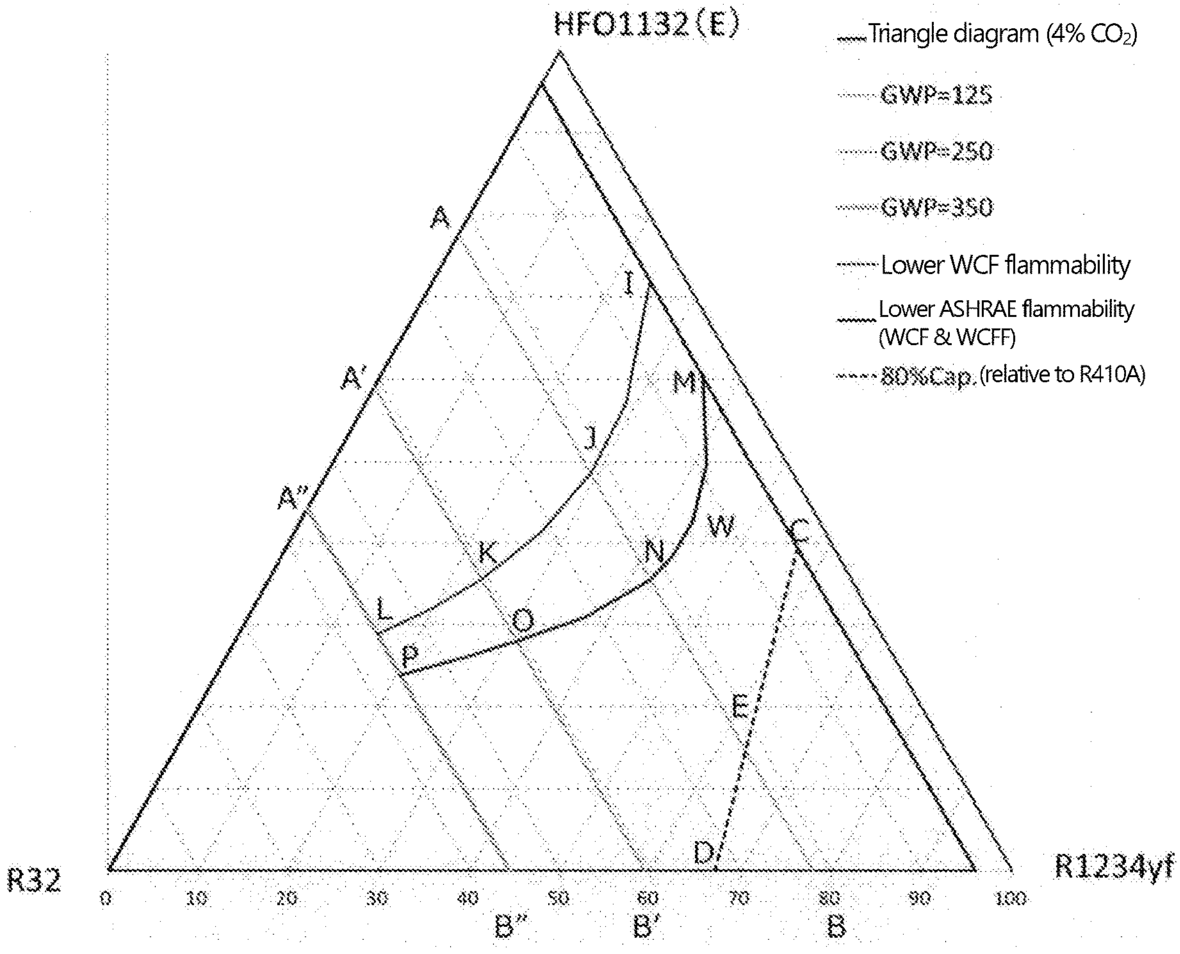
FIG. 1Q is a ternary composition diagram in which the sum of the concentrations of R32, HFO-1132(E), and R1234yf is 96 mass % (CO2 content is 4 mass %), the diagram showing points and line segments defining the refrigerant according to the present disclosure.
Figure 1R:
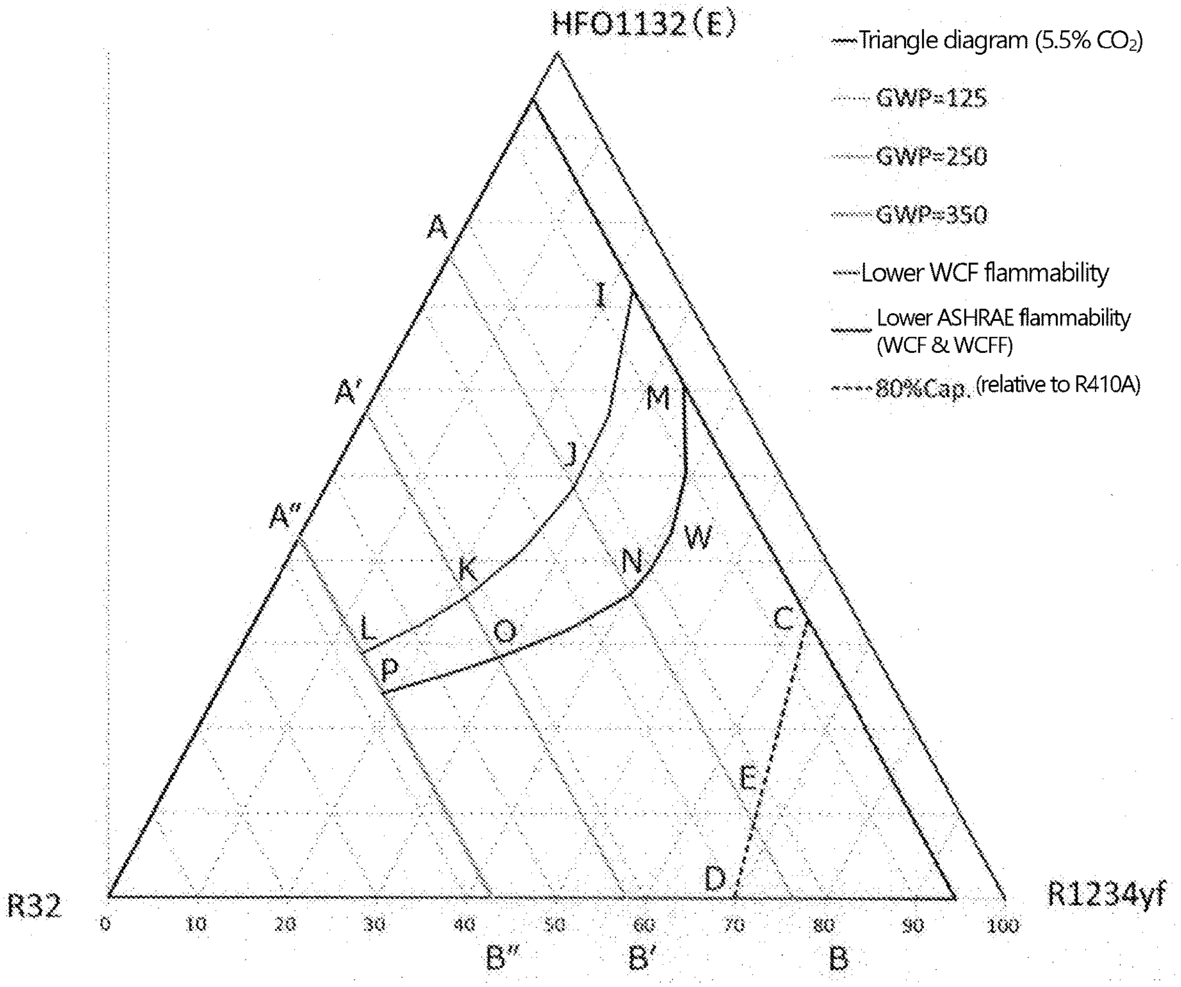
FIG. 1R is a ternary composition diagram in which the sum of the concentrations of R32, HFO-1132(E), and R1234yf is 94.5 mass % (CO2 content is 5.5 mass %), the diagram showing points and line segments defining the refrigerant according to the present disclosure.
Figure 1S:
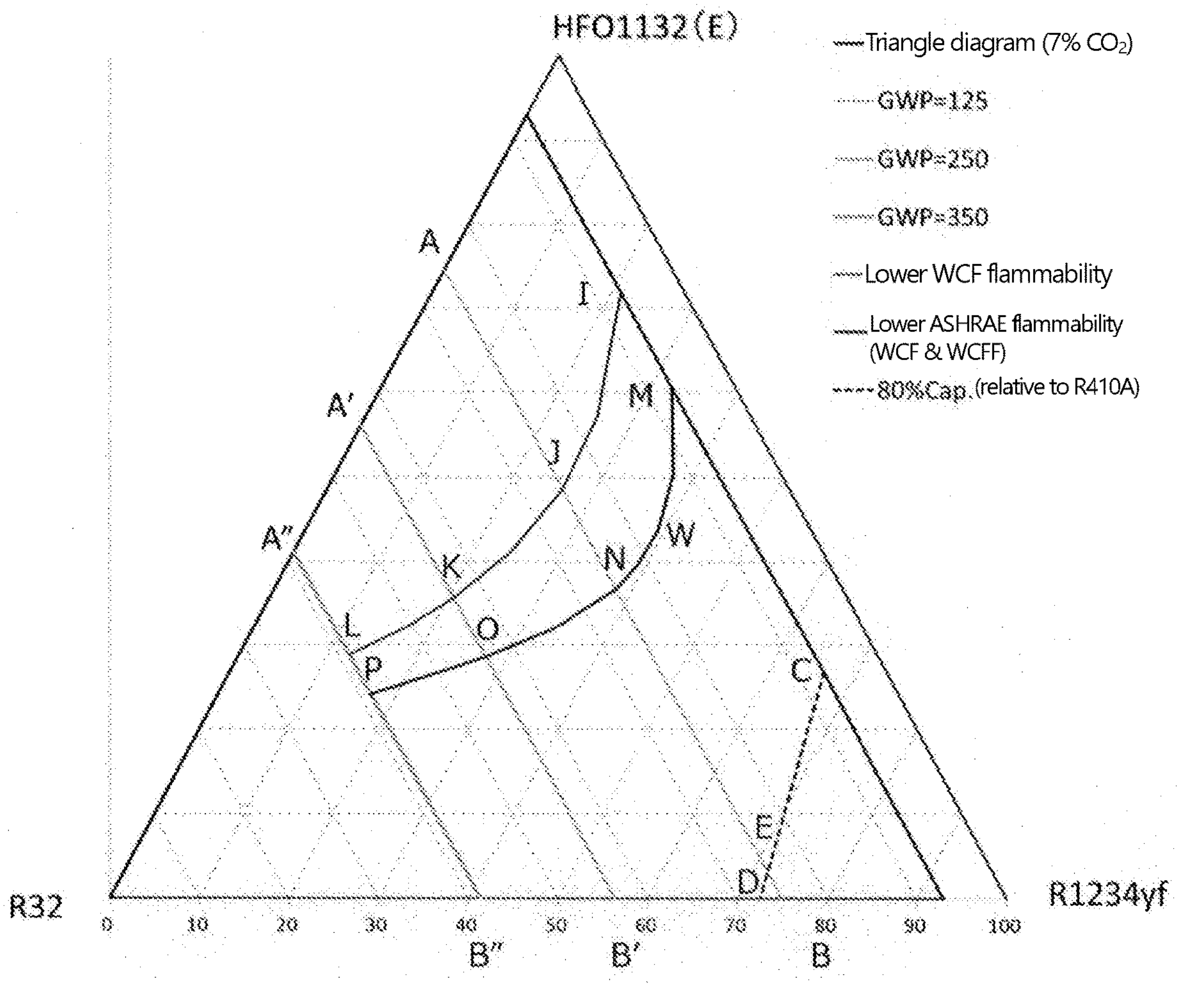
FIG. 1S is a ternary composition diagram in which the sum of the concentrations of R32, HFO-1132(E), and R1234yf is 93 mass % (CO2 content is 7 mass %), the diagram showing points and line segments defining the refrigerant according to the present disclosure.
Figure 1T:
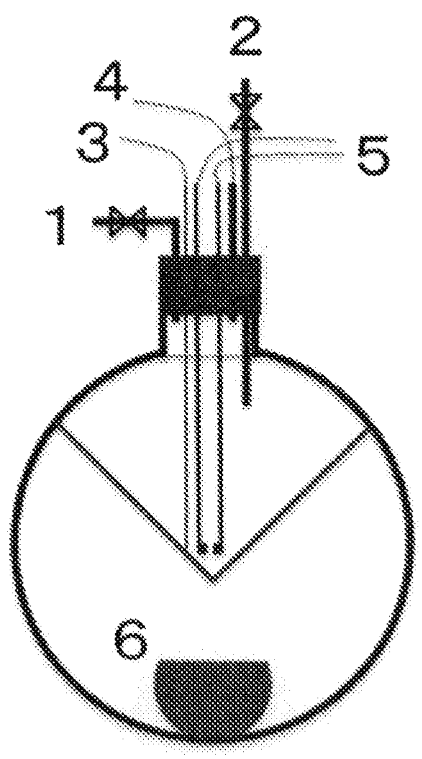
FIG. 1T is a schematic view of an experimental apparatus for determining flammability (flammability or non-flammability).

The flammable range of each mixed refrigerant was measured using a measuring apparatus based on ASTM E681-09 (see FIG. 1T).

Specifically, a spherical glass flask having an internal volume of 12 L was used so that the state of combustion could be visually observed and video-recorded, and the glass flask was adapted so that gas could be released from the upper lid when excessive pressure was generated by combustion. For the ignition method, a spark was generated by discharge from electrodes held at height of ⅓ from the bottom.

<Test Conditions>

Test container: 280 mm ϕ spherical shape (internal volume: 12 L)

Test temperature: 60° C.±3° C.

Pressure: 101.3 kPa±0.7 kPa

Water: 0.0088 g±0.0005 g per g of dry air (the amount of water at a relative humidity of 50% at 23° C.) Refrigerant composition/air mixing ratio: 1 vol. % increments±0.2 vol. %

Refrigerant composition mixture: ±0.1% by mass

Ignition method: alternating current discharge, voltage 15 kV, current 30 mA, neon transformer Electrode spacing: 6.4 mm (¼ inch)

Spark: 0.4 s±0.05 s

Determination criteria:

When the flame extended at an angle of 90° or more from the ignition point, it was evaluated as having flame propagation (flammable)

When the flame extended at an angle of 90° or less from the ignition point, it was evaluated as having no flame propagation (nonflammable)

TABLE 401

| Item | | Unit | Reference Example 1-1 (R134a) | Comparative Example 1-1 | Comparative Example 1-2 | Comparative Example 1-3 | Example 1-1 |
|---|---|---|---|---|---|---|---|
| Composition ratio | HFO-1132(Z) | % by mass | 0 | 30.0 | 40.0 | 51.0 | 53.0 |
| | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 70.7 | 70.7 | 73.4 | 76.3 | 76.9 |
| Saturation pressure (40° C.) | | MPa | 1.017 | 1.004 | 0.998 | 0.991 | 0.990 |
| Evaporating pressure | | MPa | 0.415 | 0.427 | 0.422 | 0.418 | 0.417 |
| Compression ratio | | — | 2.5 | 2.4 | 2.4 | 2.4 | 2.4 |
| COP ratio (to R134a) | | % | 100.0 | 100.0 | 100.2 | 100.3 | 100.4 |
| Refrigerating capacity ratio (to R134a) | | % | 100.0 | 98.0 | 98.1 | 98.3 | 98.3 |
| ASHRAE flammability classification | | — | Class 1 | Class 2L | Class 2L | Class 2L | Class 2L |

| Item | | Unit | Example 1-2 | Example 1-3 | Comparative Example 1-4 | Comparative Example 1-5 | Comparative Example 1-6 |
|---|---|---|---|---|---|---|---|
| Composition ratio | HFO-1132(Z) | % by mass | 56.0 | 59.0 | 60.0 | 70.0 | 100 |
| | HFO-1234yf | % by mass | 44.0 | 41.0 | 40.0 | 30.0 | 0 |
| | HFC-134a | % by mass | 0 | 0 | 0 | 0 | 0 |
| GWP(AR4) | | — | 7 | 8 | 8 | 8 | 10 |
| Discharge temperature | | ° C. | 77.7 | 78.5 | 78.8 | 81.6 | 90.3 |
| Saturation pressure (40° C.) | | MPa | 0.988 | 0.987 | 0.986 | 0.981 | 0.968 |
| Evaporating pressure | | MPa | 0.416 | 0.415 | 0.415 | 0.411 | 0.402 |
| Compression ratio | | — | 2.4 | 2.4 | 2.4 | 2.4 | 2.4 |
| COP ratio (to R134a) | | % | 100.4 | 100.4 | 100.4 | 100.5 | 100.4 |
| Refrigerating capacity ratio (to R134a) | | % | 98.3 | 98.3 | 98.3 | 98.4 | 98.5 |
| ASHRAE flammability classification | | — | Class 2L | Class 2L | Class 2 | Class 2 | Class 2 |

Test Example 1-2

The GWPs of the mixed refrigerants shown in Examples 1-4 to 1-6, Comparative Examples 1-7 to 1-12, and Reference Example 1-2 (R134a) were evaluated based on the values stated in the IPCC Fourth Report.

The COPs, refrigerating capacities, discharge temperatures, saturation pressures at a saturation temperature of 45° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature 5° C.

Condensation temperature 45° C.

Superheating temperature 5 K

Subcooling temperature 5 K

Compressor efficiency 70%

The meanings of the above terms are the same as in Test Example 1-1.

The results of Test Example 1-2 are shown in Table 402. Table 402 shows Examples and Comparative Examples of refrigerant 3A of the present disclosure. In Table 402, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test. Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1T).

TABLE 402

| Item | | Unit | Reference Example 1-2 (R134a) | Comparative Example 1-7 | Comparative Example 1-8 | Comparative Example 1-9 | Example 1-4 |
|---|---|---|---|---|---|---|---|
| Composition ratio | HFO-1132(Z) | % by mass | 0 | 30.0 | 40.0 | 51.0 | 53.0 |
| | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 63.8 | 63.9 | 67.3 | 71.2 | 71.9 |
| Saturation pressure (45° C.) | | MPa | 1.160 | 1.139 | 1.133 | 1.126 | 1.125 |
| Evaporating pressure | | MPa | 0.350 | 0.363 | 0.359 | 0.355 | 0.354 |

TABLE 402-continued

| Item | | Unit | | | | | |
|---|---|---|---|---|---|---|---|
| Compression ratio | | — | 3.3 | 3.1 | 3.2 | 3.2 | 3.2 |
| COP ratio (to R134a) | | % | 100.0 | 100.0 | 100.7 | 101.4 | 101.5 |
| Refrigerating capacity ratio (to R134a) | | % | 100.0 | 98.8 | 99.7 | 100.5 | 100.6 |
| ASHRAE flammability classification | | — | Class 1 | Class 2L | Class 2L | Class 2L | Class 2L |

| Item | | Unit | Example 1-5 | Example 1-6 | Comparative Example 1-10 | Comparative Example 1-11 | Comparative Example 1-12 |
|---|---|---|---|---|---|---|---|
| Composition ratio | HFO-1132(Z) | % by mass | 56.0 | 59.0 | 60.0 | 70.0 | 100 |
| | HFO-1234yf | % by mass | 44.0 | 41.0 | 40.0 | 30.0 | 0 |
| | HFC-134a | % by mass | 0 | 0 | 0 | 0 | 0 |
| GWP(AR4) | | — | 7 | 8 | 8 | 8 | 10 |
| Discharge temperature | | ° C. | 72.9 | 74.0 | 74.4 | 78.0 | 89.4 |
| Saturation pressure (45° C.) | | MPa | 1.123 | 1.121 | 1.121 | 1.115 | 1.101 |
| Evaporating pressure | | MPa | 0.353 | 0.352 | 0.352 | 0.349 | 0.340 |
| Compression ratio | | — | 3.2 | 3.2 | 3.2 | 3.2 | 3.2 |
| COP ratio (to R134a) | | % | 101.6 | 101.8 | 101.8 | 102.2 | 102.7 |
| Refrigerating capacity ratio (to R134a) | | % | 100.8 | 101.0 | 101.1 | 101.6 | 102.8 |
| ASHRAE flammability classification | | — | Class 2L | Class 2L | Class 2 | Class 2 | Class 2 |

Test Example 1-3

The GWPs of the mixed refrigerants shown in Examples 1-7 to 1-9, Comparative Examples 1-13 to 1-18, and Reference Example 1-3 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature −10° C.

Condensation temperature 40° C.

Superheating temperature 20 K

Subcooling temperature 0 K

Compressor efficiency 70%

The meanings of the above terms are the same as in Test Example 1-1.

The results of Test Example 1-3 are shown in Table 403. Table 403 shows Examples and Comparative Examples of refrigerant 3A of the present disclosure. In Table 403, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1T).

TABLE 403

| Item | | Unit | Reference Example 1-3 (R134a) | Comparative Example 1-13 | Comparative Example 1-14 | Comparative Example 1-15 | Example 1-7 |
|---|---|---|---|---|---|---|---|
| Composition ratio | HFO-1132(Z) | % by mass | 0 | 30.0 | 40.0 | 51.0 | 53.0 |
| | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 80.8 | 80.7 | 85.5 | 90.8 | 91.8 |
| Saturation pressure (40° C.) | | MPa | 1.017 | 1.004 | 0.998 | 0.991 | 0.990 |
| Evaporating pressure | | MPa | 0.201 | 0.215 | 0.212 | 0.209 | 0.208 |
| Compression ratio | | — | 5.1 | 4.7 | 4.7 | 4.7 | 4.7 |
| COP ratio (to R134a) | | % | 100.0 | 100.2 | 100.9 | 101.5 | 101.6 |
| Refrigerating capacity ratio (to R134a) | | % | 100.0 | 101.6 | 102.4 | 103.0 | 103.1 |
| ASHRAE flammability classification | | — | Class 1 | Class 2L | Class 2L | Class 2L | Class 2L |

| Item | | Unit | Example 1-8 | Example 1-9 | Comparative Example 1-16 | Comparative Example 1-17 | Comparative Example 1-18 |
|---|---|---|---|---|---|---|---|
| Composition ratio | HFO-1132(Z) | % by mass | 56.0 | 59.0 | 60.0 | 70.0 | 100 |
| | HFO-1234yf | % by mass | 44.0 | 41.0 | 40.0 | 30.0 | 0 |
| | HFC-134a | % by mass | 0 | 0 | 0 | 0 | 0 |
| GWP(AR4) | | — | 7 | 8 | 8 | 8 | 10 |
| Discharge temperature | | ° C. | 93.3 | 94.8 | 95.3 | 100.3 | 115.9 |
| Saturation pressure (40° C.) | | MPa | 0.988 | 0.987 | 0.986 | 0.981 | 0.968 |
| Evaporating pressure | | MPa | 0.208 | 0.207 | 0.207 | 0.204 | 0.198 |
| Compression ratio | | — | 4.8 | 4.8 | 4.8 | 4.8 | 4.9 |
| COP ratio (to R134a) | | % | 101.7 | 101.8 | 101.8 | 102.0 | 102.4 |
| Refrigerating capacity ratio (to R134a) | | % | 103.2 | 103.3 | 103.4 | 103.6 | 104.4 |
| ASHRAE flammability classification | | — | Class 2L | Class 2L | Class 2 | Class 2 | Class 2 |

Test Example 1-4

The GWPs of the mixed refrigerants shown in Examples 1-10 to 1-12, Comparative Examples 1-19 to 1-24, and Reference Example 1-4 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>
Evaporating temperature −35° C.
Condensation temperature 40° C.
Superheating temperature 20 K
Subcooling temperature 0 K
Compressor efficiency 70%

The meanings of the above terms are the same as in Test Example 1-1.

The results of Test Example 1-4 are shown in Table 404. Table 404 shows Examples and Comparative Examples of refrigerant 3A of the present disclosure. In Table 404, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1T).

TABLE 404

| Item | | Unit | Reference Example 1-4 (R134a) | Comparative Example 1-19 | Comparative Example 1-20 | Comparative Example 1-21 | Example 1-10 |
|---|---|---|---|---|---|---|---|
| Composition | HFO-1132(Z) | % by mass | 0 | 30.0 | 40.0 | 51.0 | 53.0 |
| ratio | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 99.1 | 98.5 | 106.5 | 115.5 | 117.2 |
| Saturation pressure (40° C.) | | MPa | 1.017 | 1.004 | 0.998 | 0.991 | 0.990 |
| Evaporating pressure | | MPa | 0.066 | 0.076 | 0.075 | 0.073 | 0.073 |
| Compression ratio | | — | 15.4 | 13.2 | 13.4 | 13.6 | 13.6 |
| COP ratio (to R134a) | | % | 100.0 | 100.7 | 102.2 | 100.2 | 100.4 |
| Refrigerating capacity ratio (to R134a) | | % | 100.0 | 108.8 | 110.4 | 100.2 | 100.4 |
| ASHRAE flammability classification | | — | Class 1 | Class 2L | Class 2L | Class 2L | Class 2L |

| Item | | Unit | Example 1-11 | Example 1-12 | Comparative Example 1-22 | Comparative Example 1-23 | Comparative Example 1-24 |
|---|---|---|---|---|---|---|---|
| Composition | HFO-1132(Z) | % by mass | 56.0 | 59.0 | 60.0 | 70.0 | 100 |
| ratio | HFO-1234yf | % by mass | 44.0 | 41.0 | 40.0 | 30.0 | 0.0 |
| | HFC-134a | % by mass | 0 | 0 | 0 | 0 | 0 |
| GWP(AR4) | | — | 7 | 8 | 8 | 8 | 10 |
| Discharge temperature | | ° C. | 119.7 | 122.2 | 123.1 | 131.5 | 157.8 |
| Saturation pressure (40° C.) | | MPa | 0.988 | 0.987 | 0.986 | 0.981 | 0.968 |
| Evaporating pressure | | MPa | 0.073 | 0.072 | 0.072 | 0.071 | 0.068 |
| Compression ratio | | — | 13.6 | 13.7 | 13.7 | 13.8 | 14.2 |
| COP ratio (to R134a) | | % | 100.6 | 100.8 | 100.9 | 100.0 | 100.7 |
| Refrigerating capacity ratio (to R134a) | | % | 100.6 | 100.9 | 100.9 | 100.0 | 101.3 |
| ASHRAE flammability classification | | — | Class 2L | Class 2L | Class 2 | Class 2 | Class 2 |

Test Example 1-5

The GWPs of the mixed refrigerants shown in Examples 1-13 to 1-15, Comparative Examples 1-25 to 1-30, and Reference Example 1-5 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature −50° C.

Condensation temperature 40° C.

Superheating temperature 20 K

Subcooling temperature 0 K

Compressor efficiency 70%

The meanings of the above terms are the same as in Test Example 1-1.

The results of Test Example 1-5 are shown in Table 405. Table 405 shows Examples and Comparative Examples of refrigerant 3A of the present disclosure. In Table 405, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1T).

TABLE 405

| Item | | Unit | Reference Example 1-5 (R134a) | Comparative Example 1-25 | Comparative Example 1-26 | Comparative Example 1-27 | Example 1-13 |
|---|---|---|---|---|---|---|---|
| Composition ratio | HFO-1132(Z) | % by mass | 0 | 30.0 | 40.0 | 51.0 | 53.0 |
| | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 114.6 | 113.5 | 123.8 | 135.6 | 137.7 |
| Saturation pressure (40° C.) | | MPa | 1.017 | 1.004 | 0.998 | 0.991 | 0.990 |
| Evaporating pressure | | MPa | 0.029 | 0.036 | 0.035 | 0.034 | 0.034 |
| Compression ratio | | — | 34.5 | 28.1 | 28.5 | 29.0 | 29.0 |
| COP ratio (to R134a) | | % | 100.0 | 101.2 | 103.2 | 100.3 | 100.5 |
| Refrigerating capacity ratio (to R134a) | | % | 100.0 | 115.2 | 117.5 | 100.2 | 100.5 |
| ASHRAE flammability classification | | — | Class 1 | Class 2L | Class 2L | Class 2L | Class 2L |

| Item | | Unit | Example 1-14 | Example 1-15 | Comparative Example 1-28 | Comparative Example 1-29 | Comparative Example 1-30 |
|---|---|---|---|---|---|---|---|
| Composition ratio | HFO-1132(Z) | % by mass | 56.0 | 59.0 | 60.0 | 70.0 | 100 |
| | HFO-1234yf | % by mass | 44.0 | 41.0 | 40.0 | 30.0 | 0.0 |
| | HFC-134a | % by mass | 0 | 0 | 0 | 0 | 0 |
| GWP(AR4) | | — | 7 | 8 | 8 | 8 | 10 |
| Discharge temperature | | ° C. | 141.0 | 144.2 | 145.3 | 156.4 | 190.6 |
| Saturation pressure (40° C.) | | MPa | 0.988 | 0.987 | 0.986 | 0.981 | 0.968 |
| Evaporating pressure | | MPa | 0.034 | 0.034 | 0.034 | 0.033 | 0.031 |
| Compression ratio | | — | 29.2 | 29.3 | 29.3 | 29.7 | 30.9 |
| COP ratio (to R134a) | | % | 100.8 | 101.1 | 101.2 | 100.0 | 101.0 |
| Refrigerating capacity ratio (to R134a) | | % | 100.8 | 101.1 | 101.2 | 100.0 | 101.6 |
| ASHRAE flammability classification | | — | Class 2L | Class 2L | Class 2 | Class 2 | Class 2 |

Test Example 1-6

The GWPs of the mixed refrigerants shown in Examples 1-16 to 1-18, Comparative Examples 1-31 to 1-36, and Reference Example 1-6 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature −65° C.
Condensation temperature 40° C.
Superheating temperature 20 K
Subcooling temperature 0 K
Compressor efficiency 70%

The meanings of the above terms are the same as in Test Example 1-1.

The results of Test Example 1-6 are shown in Table 406. Table 406 shows Examples and Comparative Examples of refrigerant 3A of the present disclosure. In Table 406, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1T).

TABLE 406

| Item | | Unit | Reference Example 1-6 (R134a) | Comparative Example 1-31 | Comparative Example 1-32 | Comparative Example 1-33 | Example 1-16 |
|---|---|---|---|---|---|---|---|
| Composition | HFO-1132(Z) | % by mass | 0 | 30.0 | 40.0 | 51.0 | 53.0 |
| ratio | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 134.8 | 132.8 | 146.1 | 161.0 | 163.8 |
| Saturation pressure (40° C.) | | MPa | 1.017 | 1.004 | 0.998 | 0.991 | 0.990 |
| Evaporating pressure | | MPa | 0.011 | 0.015 | 0.015 | 0.014 | 0.014 |
| Compression ratio | | — | 89.3 | 67.4 | 68.7 | 70.1 | 70.4 |
| COP ratio (to R134a) | | % | 100.0 | 101.9 | 104.5 | 106.6 | 106.9 |
| Refrigerating capacity ratio (to R134a) | | % | 100.0 | 124.4 | 127.4 | 129.9 | 130.3 |
| ASHRAE flammability classification | | — | Class 1 | Class 2L | Class 2L | Class 2L | Class 2L |

| Item | | Unit | Example 1-17 | Example 1-18 | Comparative Example 1-34 | Comparative Example 1-35 | Comparative Example 1-36 |
|---|---|---|---|---|---|---|---|
| Composition | HFO-1132(Z) | % by mass | 56.0 | 59.0 | 60.0 | 70.0 | 100 |
| ratio | HFO-1234yf | % by mass | 44.0 | 41.0 | 40.0 | 30.0 | 0.0 |
| | HFC-134a | % by mass | 0 | 0 | 0 | 0 | 0 |
| GWP(AR4) | | — | 7 | 8 | 8 | 8 | 10 |
| Discharge temperature | | ° C. | 168.0 | 172.1 | 173.5 | 187.7 | 231.5 |
| Saturation pressure (40° C.) | | MPa | 0.988 | 0.987 | 0.986 | 0.981 | 0.968 |
| Evaporating pressure | | MPa | 0.014 | 0.014 | 0.014 | 0.014 | 0.013 |
| Compression ratio | | — | 70.8 | 71.2 | 71.3 | 72.6 | 76.3 |
| COP ratio (to R134a) | | % | 107.4 | 107.8 | 107.9 | 108.9 | 110.2 |
| Refrigerating capacity ratio (to R134a) | | % | 130.8 | 131.3 | 131.4 | 132.7 | 134.9 |
| ASHRAE flammability classification | | — | Class 2L | Class 2L | Class 2 | Class 2 | Class 2 |

Test Example 2-1

The GWPs of the mixed refrigerants shown in Examples 2-1 to 2-4, Comparative Examples 2-1 to 2-6, and Reference Example 2-1 (R134a) were evaluated based on the values stated in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using National Institute of Science and Technology (NIST) Reference Fluid Thermodynamic and Transport Properties Database (Refprop 9.0).

<Air Conditioning Conditions>
Evaporating temperature 10° C.
Condensation temperature 40° C.
Superheating temperature 20 K
Subcooling temperature 0 K
Compressor efficiency 70%

The term "Evaporating temperature 10° C." means that the evaporating temperature of each mixed refrigerant in an evaporator provided in a refrigeration apparatus is 10° C. The term "Condensation temperature 40° C." means that the condensation temperature of each mixed refrigerant in a condenser provided in a refrigeration apparatus is 40° C.

The results of Test Example 2-1 are shown in Table 407. Table 407 shows Examples and Comparative Examples of refrigerant 3B of the present disclosure. In Table 407, the terms "COP ratio" and "refrigerating capacity ratio" represent proportions (%) with respect to R134a. In Table 407, The term "Saturation pressure (40° C.)" represents saturation pressure at a saturation temperature of 40° C. In Table 407, the terms "Discharge temperature (° C.)" represents the highest temperature during the refrigeration cycle in the above refrigeration cycle theoretical calculation of the mixed refrigerants.

The coefficient of performance (COP) was obtained by the following formula

COP=(refrigerating capacity or heating capacity)/power consumption

The compression ratio was obtained by the following formula

Compression ratio=condensation pressure (Mpa)/evaporating pressure (Mpa)

The flammability of each mixed refrigerant was determined by considering the mixing composition of the mixed refrigerant as the WCF concentration and measuring the combustion rate according to the ANSI/ASHRAE 34-2013 standard. The flammability of R134a was determined by considering the composition of R134a as the WCF concentration and measuring the combustion rate according to the ANSI/ASHRAE 34-2013 standard.

A mixed refrigerant having a combustion rate of 0 cm/s to 10 cm/s was considered to be "Class 2L (slightly flammable)", and a mixed refrigerant having a combustion rate of more than 10 cm/s was considered to be "Class 2 (weakly flammable)". For R134a, no flame propagation occurred, and therefore R134a was considered to be "Class 1 (nonflammable)". In Table 407, "ASHRAE flammability classification" represents a result based on these determination criteria.

The combustion rate test was performed as follows. First, the mixed refrigerant used had a purity of 99.5% or more and was degassed by repeating the cycle of freezing, pumping, and thawing until no trace of air was observed on a vacuum gauge. The combustion rate was measured by a closed method. The initial temperature was ambient temperature. The ignition was performed by producing an electric spark between electrodes at the center of a sample cell. The duration of the discharge was 1.0 to 9.9 ms, and the ignition energy was typically about 0.1 to 1.0 J. The spread of the flame was visualized using a schlieren photograph. A cylindrical container (inner diameter: 155 mm, length: 198 mm) equipped with two acrylic windows that transmitted light was used as the sample cell, and as the light source, a xenon lamp was used. A schlieren image of the flame was recorded at a framing rate of 600 fps by a high speed digital video camera and stored in a PC.

The flammable range of each mixed refrigerant was measured using a measuring apparatus based on ASTM E681-09 (see FIG. 1T).

Specifically, a spherical glass flask having an internal volume of 12 L was used so that the state of combustion could be visually observed and video-recorded, and the glass flask was adapted so that gas could be released from the upper lid when excessive pressure was generated by combustion. For the ignition method, a spark was generated by discharge from electrodes held at a height of ⅓ from the bottom.

<Test Conditions>
Test container: 280 mm ϕ spherical shape (internal volume: 12 L)
Test temperature: 60° C.±3° C.
Pressure: 101.3 kPa±0.7 kPa
Water: 0.0088 g±0.0005 g per g of dry air (the amount of water at a relative humidity of 50% at 23° C.) Refrigerant composition/air mixing ratio: 1 vol. % increments±0.2 vol. %
Refrigerant composition mixture: ±0.1% by mass
Ignition method: alternating current discharge, voltage 15 kV, current 30 mA, neon transformer
Electrode spacing: 6.4 mm (¼ inch)
Spark: 0.4 s±0.05 s
Determination criteria:

- When the flame extended at an angle of 90° or more from the ignition point, it was evaluated as having flame propagation (flammable)
- When the flame extended at an angle of 90° or less from the ignition point; it was evaluated as having no flame propagation (nonflammable)

TABLE 407

| Item | | Unit | Reference Example2 -1 (R134a) | Comparative Example 2-1 | Comparative Example 2-2 | Example 2-1 | Example 2-2 | Example 2-3 |
|---|---|---|---|---|---|---|---|---|
| Composition ratio | HFO-1132(Z) | % by mass | 0 | 30.0 | 40.0 | 41.0 | 44.0 | 47.0 |
| | HFO-1234yf | % by mass | 0 | 70.0 | 60.0 | 59.0 | 56.0 | 53.0 |
| | HFC-134a | % by mass | 100 | 0 | 0 | 0 | 0 | 0 |

TABLE 407-continued

| | | | | | | | | |
|---|---|---|---|---|---|---|---|---|
| GWP(AR4) | | — | 1430 | 6 | 6 | 6 | 7 | 7 |
| Discharge temperature | | ° C. | 70.7 | 70.7 | 73.4 | 73.6 | 74.4 | 75.3 |
| Saturation pressure (40° C.) | | MPa | 1.017 | 1.004 | 0.998 | 0.997 | 0.995 | 0.994 |
| Evaporating pressure | | MPa | 0.415 | 0.427 | 0.422 | 0.422 | 0.421 | 0.420 |
| Compression ratio | | — | 2.5 | 2.4 | 2.4 | 2.4 | 2.4 | 2.4 |
| COP ratio (to R134a) | | % | 100.0 | 100.0 | 100.2 | 100.2 | 100.2 | 100.3 |
| Refrigerating capacity ratio (to R134a) | | % | 100.0 | 98.0 | 98.1 | 98.2 | 98.2 | 98.2 |
| ASHRAE flammability classification | | — | Class 1 | Class 2L | Class 2L | Class 2L | Class 2L | Class 2L |

| Item | | Unit | Example 2-4 | Comparative Example 2-3 | Comparative Example 2-4 | Comparative Example 2-5 | Comparative Example 2-6 |
|---|---|---|---|---|---|---|---|
| Composition ratio | HFO-1132(Z) | % by mass | 49.0 | 51.0 | 60.0 | 70.0 | 100 |
| | HFO-1234yf | % by mass | 51.0 | 49.0 | 40.0 | 30.0 | 0 |
| | HFC-134a | % by mass | 0 | 0 | 0 | 0 | 0 |
| GWP(AR4) | | — | 7 | 7 | 8 | 8 | 10 |
| Discharge temperature | | ° C. | 75.8 | 76.3 | 78.8 | 81.6 | 90.3 |
| Saturation pressure (40° C.) | | MPa | 0.992 | 0.991 | 0.986 | 0.981 | 0.968 |
| Evaporating pressure | | MPa | 0.419 | 0.418 | 0.415 | 0.411 | 0.402 |
| Compression ratio | | — | 2.4 | 2.4 | 2.4 | 2.4 | 2.4 |
| COP ratio (to R134a) | | % | 100.3 | 100.3 | 100.4 | 100.5 | 100.4 |
| Refrigerating capacity ratio (to R134a) | | % | 98.2 | 98.3 | 98.3 | 98.4 | 98.5 |
| ASHRAE flammability classification | | — | Class 2L | Class 2L | Class 2 | Class 2 | Class 2 |

Test Example 2-2

The GWPs of the mixed refrigerants shown in Examples 2-5 to 2-8, Comparative Examples 2-7 to 2-12, and Reference Example 2-2 (R134a) were evaluated based on the values stated in the IPCC Fourth Report.

The COPs, refrigerating capacities, discharge temperatures, saturation pressures at a saturation temperature of 45° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature 5° C.

Condensation temperature 45° C.

Superheating temperature 5 K

Subcooling temperature 5 K

Compressor efficiency 70%

The meanings of the above terms are the same as in Test Example 2-1.

The results of Test Example 2-2 are shown in Table 408. Table 408 shows Examples and Comparative Examples of refrigerant 3B of the present disclosure. In Table 408, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1T).

TABLE 408

| Item | | Unit | Reference Example 2-2 (R134a) | Comparative Example 2-7 | Comparative Example 2-8 | Example 2-5 | Example 2-6 | Example 2-7 |
|---|---|---|---|---|---|---|---|---|
| Composition ratio | HFO-1132(Z) | % by mass | 0 | 30.0 | 40.0 | 41.0 | 44.0 | 47.0 |
| | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 63.8 | 63.9 | 67.3 | 67.7 | 68.7 | 69.7 |
| Saturation pressure (45° C.) | | MPa | 1.160 | 1.139 | 1.133 | 1.132 | 1.130 | 1.129 |
| Evaporating pressure | | MPa | 0.350 | 0.363 | 0.359 | 0.359 | 0.358 | 0.357 |
| Compression ratio | | — | 3.3 | 3.1 | 3.2 | 3.2 | 3.2 | 3.2 |
| COP ratio (to R134a) | | % | 100.0 | 100.0 | 100.7 | 100.8 | 101.0 | 101.2 |
| Refrigerating capacity ratio (to R134a) | | % | 100.0 | 98.8 | 99.7 | 99.8 | 100.0 | 100.2 |
| ASHRAE flammability classification | | — | Class 1 | Class 2L | Class 2L | Class 2L | Class 2L | Class 2L |

| Item | | Unit | Example 2-8 | Comparative Example 2-9 | Comparative Example 2- 10 | Comparative Example 2-11 | Comparative Example 2-12 |
|---|---|---|---|---|---|---|---|
| Composition ratio | HFO-1132(Z) | % by mass | 49.0 | 51.0 | 60.0 | 70.0 | 100 |
| | HFO-1234yf | % by mass | 51.0 | 49.0 | 40.0 | 30.0 | 0 |
| | HFC-134a | % by mass | 0 | 0 | 0 | 0 | 0 |
| GWP(AR4) | | — | 7 | 7 | 8 | 8 | 10 |
| Discharge temperature | | ° C. | 70.4 | 71.2 | 74.4 | 78.0 | 89.4 |
| Saturation pressure (45° C.) | | MPa | 1.127 | 1.126 | 1.121 | 1.115 | 1.101 |
| Evaporating pressure | | MPa | 0.356 | 0.355 | 0.352 | 0.349 | 0.340 |

TABLE 408-continued

| | | | | | | |
|---|---|---|---|---|---|---|
| Compression ratio | — | 3.2 | 3.2 | 3.2 | 3.2 | 3.2 |
| COP ratio (to R134a) | % | 101.3 | 101.4 | 101.8 | 102.2 | 102.7 |
| Refrigerating capacity ratio (to R134a) | % | 100.4 | 100.5 | 101.1 | 101.6 | 102.8 |
| ASHRAE flammability classification | — | Class 2L | Class 2L | Class 2 | Class 2 | Class 2 |

Test Example 2-3

The GWPs of the mixed refrigerants shown in Examples 2-9 to 2-12, Comparative Examples 2-13 to 2-18, and Reference Example 2-3 (R134a) were evaluated based on the values stated in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature −10° C.

Condensation temperature 40° C.

Superheating temperature 20 K

Subcooling temperature 0 K

Compressor efficiency 70%

The meanings of the above terms are the same as in Test Example 2-1.

The results of Test Example 2-3 are shown in Table 409. Table 409 shows Examples and Comparative Examples of refrigerant 3B of the present disclosure. In Table 409, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1T).

TABLE 409

| Item | | Unit | Reference Example 2-3 (R134a) | Comparative Example 2-13 | Comparative Example 2-14 | Example 2-9 | Example 2-10 | Example 2-11 |
|---|---|---|---|---|---|---|---|---|
| Composition ratio | HFO-1132(Z) | % by mass | 0 | 30.0 | 40.0 | 41.0 | 44.0 | 47.0 |
| | HFO-1234yf | % by mass | 0 | 70.0 | 60.0 | 59.0 | 56.0 | 53.0 |
| | HFC-134a | % by mass | 100 | 0 | 0 | 0 | 0 | 0) |
| GWP(AR4) | | — | 1430 | 6 | 6 | 6 | 7 | 7 |
| Discharge temperature | | ° C. | 80.8 | 80.7 | 85.5 | 85.9 | 87.4 | 88.8 |
| Saturation pressure (40° C.) | | MPa | 1.017 | 1.004 | 0.998 | 0.997 | 0.995 | 0.994 |
| Evaporating pressure | | MPa | 0.201 | 0.215 | 0.212 | 0.212 | 0.211 | 0.210 |
| Compression ratio | | — | 5.1 | 4.7 | 4.7 | 4.7 | 4.7 | 4.7 |
| COP ratio (to R134a) | | % | 100.0 | 100.2 | 100.9 | 101.0 | 101.1 | 101.3 |
| Refrigerating capacity ratio (to R134a) | | % | 100.0 | 101.6 | 102.4 | 102.4 | 102.6 | 102.8 |
| ASHRAE flammability classification | | — | Class 1 | Class 2L | Class 2L | Class 2L | Class 2L | Class 2L |

| Item | | Unit | Example 2-12 | Comparative Example 2-15 | Comparative Example 2-16 | Comparative Example 2-17 | Comparative Example 2-18 |
|---|---|---|---|---|---|---|---|
| Composition ratio | HFO-1132(Z) | % by mass | 49.0 | 51.0 | 60.0 | 70.0 | 100 |
| | HFO-1234yf | % by mass | 51.0 | 49.0 | 40.0 | 30.0 | 0 |
| | HFC-134a | % by mass | 0 | 0 | 0 | 0 | 0 |
| GWP(AR4) | | — | 7 | 7 | 8 | 8 | 10 |
| Discharge temperature | | ° C. | 89.8 | 90.8 | 95.3 | 100.3 | 115.9 |
| Saturation pressure (40° C.) | | MPa | 0.992 | 0.991 | 0.986 | 0.981 | 0.968 |
| Evaporating pressure | | MPa | 0.209 | 0.209 | 0.207 | 0.204 | 0.198 |
| Compression ratio | | — | 4.7 | 4.7 | 4.8 | 4.8 | 4.9 |
| COP ratio (to R134a) | | % | 101.4 | 101.5 | 101.8 | 102.0 | 102.4 |
| Refrigerating capacity ratio (to R134a) | | % | 102.9 | 103.0 | 103.4 | 103.6 | 104.4 |
| ASHRAE flammability classification | | — | Class 2L | Class 2L | Class 2 | Class 2 | Class 2 |

Test Example 2-4

The GWPs of the mixed refrigerants shown in Examples 2-13 to 2-16, Comparative Examples 2-19 to 2-24, and Reference Example 2-4 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature −35° C.

Condensation temperature 40° C.

Superheating temperature 20 K

Subcooling temperature 0 K

Compressor efficiency 70%

The meanings of the above terms are the same as in Test Example 2-1.

The results of Test Example 2-4 are shown in Table 410. Table 410 shows Examples and Comparative Examples of refrigerant 3B of the present disclosure. In Table, 410, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1T).

TABLE 410

| Item | | Unit | Reference Example 2-4 (R134a) | Comparative Example 2-19 | Comparative Example 2-20 | Example 2-13 | Example 2-14 | Example 2-15 |
|---|---|---|---|---|---|---|---|---|
| Composition ratio | HFO-1132(Z) | % by mass | 0 | 30.0 | 40.0 | 41.0 | 44.0 | 47.0 |
| | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 99.1 | 98.5 | 106.5 | 107.3 | 109.8 | 112.2 |
| Saturation pressure (40° C.) | | MPa | 1.017 | 1.004 | 0.998 | 0.997 | 0.995 | 0.994 |
| Evaporating pressure | | MPa | 0.066 | 0.076 | 0.075 | 0.074 | 0.074 | 0.074 |
| Compression ratio | | — | 15.4 | 13.2 | 13.4 | 13.4 | 13.5 | 13.5 |
| COP ratio (to R134a) | | % | 100.0 | 100.7 | 102.2 | 102.3 | 102.7 | 103.0 |
| Refrigerating capacity ratio (to R134a) | | % | 100.0 | 108.8 | 110.4 | 110.5 | 110.9 | 111.3 |
| ASHRAE flammability classification | | — | Class 1 | Class 2L | Class 2L | Class 2L | Class 2L | Class 2L |

| Item | | Unit | Example 2-16 | Comparative Example 2-21 | Comparative Example 2-22 | Comparative Example 2-23 | Comparative Example 2-24 |
|---|---|---|---|---|---|---|---|
| Composition ratio | HFO-1132(Z) | % by mass | 49.0 | 51.0 | 60.0 | 70.0 | 100 |
| | HFO-1234yf | % by mass | 51.0 | 49.0 | 40.0 | 30.0 | 0.0 |
| | HFC-134a | % by mass | 0 | 0 | 0 | 0 | 0 |
| GWP(AR4) | | — | 7 | 7 | 8 | 8 | 10 |
| Discharge temperature | | ° C. | 113.9 | 115.5 | 123.1 | 131.5 | 157.8 |
| Saturation pressure (40° C.) | | MPa | 0.992 | 0.991 | 0.986 | 0.981 | 0.968 |
| Evaporating pressure | | MPa | 0.073 | 0.073 | 0.072 | 0.071 | 0.068 |
| Compression ratio | | — | 13.5 | 13.6 | 13.7 | 13.8 | 14.2 |
| COP ratio (to R134a) | | % | 100.0 | 100.2 | 100.9 | 100.0 | 100.7 |
| Refrigerating capacity ratio (to R134a) | | % | 100.0 | 100.2 | 100.9 | 100.0 | 101.3 |
| ASHRAE flammability classification | | — | Class 2L | Class 2L | Class 2 | Class 2 | Class 2 |

Test Example 2-5

The GWPs of the mixed refrigerants shown in Examples 2-17 to 2-20, Comparative Examples 2-25 to 2-30, and Reference Example 2-5 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature −50° C.

Condensation temperature 40° C.

Superheating temperature 20 K

Subcooling temperature 0 K

Compressor efficiency 70%

The meanings of the above terms are the same as in Test Example 2-1.

The results of Test Example 2-5 are shown in Table 411. Table 411 shows Examples and Comparative Examples of refrigerant 3B of the present disclosure. In Table 411, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test. Example 2-1.

The flammable range of each mixed refrigerant was measured with the same method and test conditions as in Test Example 2-1 using a measuring apparatus based on ASTM E681-09 (see FIG. 1T).

TABLE 411

| Item | | Unit | Reference Example 2-5 (R134a) | Comparative Example 2-25 | Comparative Example 2-26 | Example 2-17 | Example 2-18 | Example 2-19 |
|---|---|---|---|---|---|---|---|---|
| Composition ratio | HFO-1132(Z) | % by mass | 0 | 30.0 | 40.0 | 41.0 | 44.0 | 47.0 |
| | HFO-1234yf | % by mass | 0 | 70.0 | 60.0 | 59.0 | 56.0 | 53.0 |
| | HFC-134a | % by mass | 100 | 0 | 0) | 0 | 0 | 0 |
| GWP(AR4) | | — | 1430 | 6 | 6 | 6 | 7 | 7 |
| Discharge temperature | | ° C. | 114.6 | 113.5 | 123.8 | 124.9 | 128.1 | 131.3 |
| Saturation pressure (40° C.) | | MPa | 1.017 | 1.004 | 0.998 | 0.997 | 0.995 | 0.994 |
| Evaporating pressure | | MPa | 0.029 | 0.036 | 0.035 | 0.035 | 0.035 | 0.035 |
| Compression ratio | | — | 34.5 | 28.1 | 28.5 | 28.5 | 28.7 | 28.8 |
| COP ratio (to R134a) | | % | 100.0 | 101.2 | 103.2 | 103.4 | 103.9 | 104.3 |
| Refrigerating capacity ratio (to R134a) | | % | 100.0 | 115.2 | 117.5 | 117.7 | 118.2 | 118.7 |
| ASHRAE flammability classification | | — | Class 1 | Class 2L | Class 2L | Class 2L | Class 2L | Class 2L |

| Item | | Unit | Example 2-20 | Comparative Example 2-27 | Comparative Example 2-28 | Comparative Example 2-29 | Comparative Example 2-30 |
|---|---|---|---|---|---|---|---|
| Composition ratio | HFO-1132(Z) | % by mass | 49.0 | 51.0 | 60.0 | 70.0 | 100 |
| | HFO-1234yf | % by mass | 51.0 | 49.0 | 40.0 | 30.0 | 0.0 |
| | HFC-134a | % by mass | 0 | 0 | 0 | 0 | 0 |
| GWP(AR4) | | — | 7 | 7 | 8 | 8 | 10 |
| Discharge temperature | | ° C. | 133.4 | 135.6 | 145.3 | 156.4 | 190.6 |
| Saturation pressure (40° C.) | | MPa | 0.992 | 0.991 | 0.986 | 0.981 | 0.968 |
| Evaporating pressure | | MPa | 0.034 | 0.034 | 0.034 | 0.033 | 0.031 |
| Compression ratio | | — | 28.9 | 29.0 | 29.3 | 29.7 | 30.9 |
| COP ratio (to R134a) | | % | 100.0 | 100.3 | 101.2 | 100.0 | 101.0 |
| Refrigerating capacity ratio (to R134a) | | % | 100.0 | 100.2 | 101.2 | 100.0 | 101.6 |
| ASHRAE flammability classification | | — | Class 2L | Class 2L | Class 2 | Class 2 | Class 2 |

Test Example 2-6

The GWPs of the mixed refrigerants shown in Examples 2-21 to 2-24, Comparative Examples 2-31 to 2-36, and Reference Example 2-6 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

<Air Conditioning Conditions>

Evaporating temperature −65° C.

Condensation temperature 40° C.

Superheating temperature 20 K

Subcooling temperature 0 K

Compressor efficiency 70%

The meanings of the above terms are the same as in Test Example 2-1.

The results of Test Example 2-6 are shown in Table 412. Table 412 shows Examples and Comparative Examples of refrigerant 3B of the present disclosure. In Table 412, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1T).

TABLE 412

| Item | | Unit | Reference Example 2-6 (R134a) | Comparative Example 2-31 | Comparative Example 2-32 | Example 2-21 | Example 2-22 | Example 2-23 |
|---|---|---|---|---|---|---|---|---|
| Composition ratio | HFO-1132(Z) | % by mass | 0 | 30.0 | 40.0 | 41.0 | 44.0 | 47.0 |
| | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 134.8 | 132.8 | 146.1 | 147.4 | 151.5 | 155.6 |
| Saturation pressure (40° C.) | | MPa | 1.017 | 1.004 | 0.998 | 0.997 | 0.995 | 0.994 |
| Evaporating pressure | | MPa | 0.011 | 0.015 | 0.015 | 0.014 | 0.014 | 0.014 |
| Compression ratio | | — | 89.3 | 67.4 | 68.7 | 68.8 | 69.2 | 69.6 |
| COP ratio (to R134a) | | % | 100.0 | 101.9 | 104.5 | 104.7 | 105.3 | 105.9 |
| Refrigerating capacity ratio (to R134a) | | % | 100.0 | 124.4 | 127.4 | 127.7 | 128.4 | 129.1 |
| ASHRAE flammability classification | | — | Class 1 | Class 2L | Class 2L | Class 2L | Class 2L | Class 2L |

| Item | | Unit | Example 2-24 | Comparative Example 2-33 | Comparative Example 2-34 | Comparative Example 2-35 | Comparative Example 2-36 |
|---|---|---|---|---|---|---|---|
| Composition ratio | HFO-1132(Z) | % by mass | 49.0 | 51.0 | 60.0 | 70.0 | 100 |
| | HFO-1234yf | % by mass | 51.0 | 49.0 | 40.0 | 30.0 | 0.0 |
| | HFC-134a | % by mass | 0 | 0 | 0 | 0 | 0 |
| GWP(AR4) | | — | 7 | 7 | 8 | 8 | 10 |
| Discharge temperature | | ° C. | 158.3 | 161.0 | 173.5 | 187.7 | 231.5 |
| Saturation pressure (40° C.) | | MPa | 0.992 | 0.991 | 0.986 | 0.981 | 0.968 |
| Evaporating pressure | | MPa | 0.014 | 0.014 | 0.014 | 0.014 | 0.013 |
| Compression ratio | | — | 69.9 | 70.1 | 71.3 | 72.6 | 76.3 |
| COP ratio (to R134a) | | % | 106.3 | 106.6 | 107.9 | 108.9 | 110.2 |
| Refrigerating capacity ratio (to R134a) | | % | 129.5 | 129.9 | 131.4 | 132.7 | 134.9 |
| ASHRAE flammability classification | | — | Class 2L | Class 2L | Class 2 | Class 2 | Class 2 |

(2) Refrigerating Machine Oil (2) Refrigerating Machine Oil

A refrigerating oil can improve the lubricity in the refrigeration cycle apparatus and can also achieve efficient cycle performance by performing a refrigeration cycle such as a refrigeration cycle together with a refrigerant composition.

Examples of the refrigerating oil include oxygen-containing synthetic oils (e.g., ester-type refrigerating oils and ether-type refrigerating oils) and hydrocarbon refrigerating oils. In particular, ester-type refrigerating oils and ether-type refrigerating oils are preferred from the viewpoint of miscibility with refrigerants or refrigerant compositions. The refrigerating oils may be used alone or in combination of two or more.

The kinematic viscosity of the refrigerating oil at 40° C. is preferably 1 $mm^2$/s or more and 750 $mm^2$/s or less and more preferably 1 $mm^2$/s or more and 400 $mm^2$/s or less from at least one of the viewpoints of suppressing the deterioration of the lubricity and the hermeticity of compressors, achieving sufficient miscibility with refrigerants under low-temperature conditions, suppressing the lubrication failure of compressors, and improving the heat exchange efficiency of evaporators. Herein, the kinematic viscosity of the refrigerating oil at 100° C. may be, for example, 1 $mm^2$/s or more and 100 $mm^2$/s or less and is more preferably 1 $mm^2$/s or more and 50 $mm^2$/s or less.

The refrigerating oil preferably has an aniline point of −100° C. or higher and 0° C. or lower. The term "aniline point" herein refers to a numerical value indicating the solubility of, for example, a hydrocarbon solvent, that is, refers to a temperature at which when equal volumes of a sample (herein, refrigerating oil) and aniline are mixed with each other and cooled, turbidity appears because of their immiscibility (provided in JIS K 2256). Note that this value is a value of the refrigerating oil itself in a state in which the refrigerant is not dissolved. By using a refrigerating oil having such an aniline point, for example, even when bearings constituting resin functional components and insulating materials for electric motors are used at positions in contact with the refrigerating oil, the suitability of the refrigerating oil for the resin functional components can be improved. Specifically, if the aniline point is excessively low, the refrigerating oil readily infiltrates the bearings and the insulating materials, and thus the bearings and the like tend to swell. On the other hand, if the aniline point is excessively high, the refrigerating oil does not readily infiltrate the bearings and the insulating materials, and thus the bearings and the like tend to shrink. Accordingly, the deformation of the bearings and the insulating materials due to swelling or shrinking can be prevented by using the refrigerating oil having an aniline point within the above-described predetermined range (100° C. or higher and 0° C. or lower). If the bearings deform through swelling, the desired length of a gap at a sliding portion cannot be maintained. This may result in an increase in sliding resistance. If the bearings deform through shrinking, the hardness of the bearings increases, and consequently the bearings may be broken because of vibration of a compressor. In other words, the deformation of the bearings through shrinking may decrease the rigidity of the sliding portion. Furthermore, if the insulating materials (e.g., insulating coating materials and insulating films) of electric motors deform through swelling, the insulating properties of the insulating materials deteriorate. If the insulating materials deform through shrinking, the insulating materials may also be broken as in the case of the bearings, which also deteriorates the insulating properties. In contrast, when the refrigerating oil having an aniline point within the predetermined range is used as described above, the deformation of bearings and insulating materials due to swelling or shrinking can be suppressed, and thus such a problem can be avoided.

The refrigerating oil is used as a working fluid for a refrigerating machine by being mixed with a refrigerant composition. The content of the refrigerating oil relative to the whole amount of working fluid fora refrigerating machine is preferably 5 mass % or more and 60 mass % or less and more preferably 10 mass % or more and 50 mass % or less.

(2-1) Oxygen-Based Synthetic Oil (2-1) Oxygen-Containing Synthetic Oil

An ester-type refrigerating oil or an ether-type refrigerating oil serving as an oxygen-containing synthetic oil is mainly constituted by carbon atoms and oxygen atoms. In the ester-type refrigerating oil or the ether-type refrigerating oil, an excessively low ratio (carbon/oxygen molar ratio) of carbon atoms to oxygen atoms increases the hygroscopicity, and an excessively high ratio of carbon atoms to oxygen atoms deteriorates the miscibility with a refrigerant. Therefore, the molar ratio is preferably 2 or more and 7.5 or less.

(2-1-1) Ester-Based Refrigerating Machine Oil (2-1-1) Ester-Type Refrigerating Oil Examples of base oil components of the ester-type refrigerating oil include dibasic acid ester oils of a dibasic acid and a monohydric alcohol, polyol ester oils of a polyol and a fatty acid, complex ester oils of a polyol, a polybasic acid, and a monohydric alcohol (or a fatty acid), and polyol carbonate oils from the viewpoint of chemical stability.

(Dibasic Acid Ester Oil)

The dibasic acid ester oil is preferably an ester of a dibasic acid such as oxalic acid, malonic acid, succinic acid, glutaric acid, adipic acid, pimelic acid, suberic acid, azelaic acid, sebacic acid, phthalic acid, isophthalic acid, or terephthalic acid, in particular, a dibasic acid having 5 to 10 carbon atoms (e.g., glutaric acid, adipic acid, pimelic acid, suberic acid, azelaic acid, or sebacic acid) and a monohydric alcohol having a linear or branched alkyl group and having 1 to 15 carbon atoms (e.g., methanol, ethanol, propanol, butanol, pentanol, hexanol, heptanol, octanol, nonanol, decanol, undecanol, dodecanol, tridecanol, tetradecanol, or pentadecanol). Specific examples of the dibasic acid ester oil include ditridecyl glutarate, di(2-ethylhexyl) adipate, diisodecyl adipate, ditridecyl adipate, and di(3-ethylhexyl) sebacate.

(Polyol Ester Oil)

The polyol ester oil is an ester synthesized from a polyhydric alcohol and a fatty acid (carboxylic acid), and has a carbon/oxygen molar ratio oft or more and 7.5 or less, preferably 3.2 or more and 5.8 or less.

The polyhydric alcohol constituting the polyol ester oil is a diol (e.g., ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, or 1,12-dodecanediol) or a polyol having 3 to 20 hydroxyl groups (trimethylolethane, trimethylolpropane, trimethylolbutane, di-(trimethylolpropane), tri-(trimethylolpropane), pentaerythritol, di-(pentaerythritol), tri-(pentaerythritol), glycerol, polyglycerol (glycerol dimer or trimer), 1,3,5-pentanetriol, sorbitol, sorbitan, a sorbitol-glycerol condensate, a polyhydric alcohol such as adonitol, arabitol, xylitol, or mannitol, a saccharide such as xylose, arabinose, ribose, rhamnose, glucose, fructose, galactose, mannose, sorbose, cellobiose, maltose, isomaltose, trehalose, sucrose, raffinose, gentianose, or melezitose, or a partially etherified product of the foregoing). One or two or more polyhydric alcohols may constitute an ester.

For the fatty acid constituting the polyol ester, the number of carbon atoms is not limited, but is normally 1 to 24. A linear fatty acid or a branched fatty acid is preferred. Examples of the linear fatty acid include acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid, and linolenic acid. The hydrocarbon group that bonds to a carboxy group may have only a saturated hydrocarbon or may have an unsaturated hydrocarbon. Examples of the branched fatty acid include 2-methylpropionic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4 dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4 dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2 methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid. One or two or more fatty acids selected from the foregoing may constitute an ester.

One polyhydric alcohol may be used to constitute an ester or a mixture of two or more polyhydric alcohols may be used to constitute an ester. The fatty acid constituting an ester may be a single component, or two or more fatty acids may constitute an ester. The fatty acids may be individual fatty acids of the same type or may be two or more types of fatty acids as a mixture. The polyol ester oil may have a free hydroxyl group.

Specifically, the polyol ester oil is more preferably an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol); further preferably an ester of neopentyl glycol, trimethylolethane, trimethylolpropane, trimethylolbutane, pentaerythritol, or di-(pentaerythritol); and preferably an ester of neopentyl glycol, trimethylolpropane, pentaerythritol, di-(pentaerythritol), or the like and a fatty acid having 2 to 20 carbon atoms.

The fatty acid constituting such a polyhydric alcohol fatty acid ester may be only a fatty acid having a linear alkyl group or may be selected from fatty acids having a branched structure. A mixed ester of linear and branched fatty acids may be employed. Furthermore, two or more fatty acids selected from the above fatty acids may be used to constitute an ester.

Specifically, for example, in the case of a mixed ester of linear and branched fatty acids, the molar ratio of a linear fatty acid having 4 to 6 carbon atoms and a branched fatty acid having 7 to 9 carbon atoms is 15:85 to 90:10, preferably 15:85 to 85:15, more preferably 20:80 to 80:20, further preferably 25:75 to 75:25, and most preferably 30:70 to 70:30. The total content of the linear fatty acid having 4 to 6 carbon atoms and the branched fatty acid having 7 to 9 carbon atoms relative to the whole amount of fatty acid constituting the polyhydric alcohol fatty acid ester is preferably 20 mol % or more. The fatty acid preferably has such a composition that both of sufficient miscibility with a refrigerant and viscosity required as a refrigerating oil are achieved. The content of a fatty acid herein refers to a value relative to the whole amount of fatty acid constituting the polyhydric alcohol fatty acid ester contained in the refrigerating oil.

In particular, the refrigerating oil preferably contains an ester (hereafter referred to as a "polyhydric alcohol fatty acid ester (A)") in which the molar ratio of the fatty acid having 4 to 6 carbon atoms and the branched fatty acid having 7 to 9 carbon atoms is 15:85 to 90:10, the fatty acid having 4 to 6 carbon atoms contains 2-methylpropionic acid, and the total content of the fatty acid having 4 to 6 carbon atoms and the branched fatty acid having 7 to 9 carbon atoms relative to the whole amount of fatty acid constituting the above ester is 20 mol % or more.

The polyhydric alcohol fatty acid ester (A) includes a complete ester in which all hydroxyl groups of a polyhydric alcohol are esterified, a partial ester in which some hydroxyl groups of a polyhydric alcohol are left without being esterified, and a mixture of a complete ester and a partial ester. The hydroxyl value of the polyhydric alcohol fatty acid ester (A) is preferably 10 mgKOH/g or less, more preferably 5 mgKOH/g or less, and most preferably 3 mgKOH/g or less.

For the fatty acid constituting the polyhydric alcohol fatty acid ester (A), the molar ratio of the fatty acid having 4 to 6 carbon atoms and the branched fatty acid having 7 to 9 carbon atoms is 15:85 to 90:10, preferably 15:85 to 85:15, more preferably 20:80 to 80:20, further preferably 25:75 to 75:25, and most preferably 30:70 to 70:30. The total content of the fatty acid having 4 to 6 carbon atoms and the branched fatty acid having 7 to 9 carbon atoms relative to the whole amount of fatty acid constituting the polyhydric alcohol fatty acid ester (A) is 20 mol % or more. In the case where the above conditions for the composition of the fatty acid are not satisfied, if difluoromethane is contained in the refrigerant composition, both of sufficient miscibility with the difluoromethane and viscosity required as a refrigerating oil are not easily achieved at high levels. The content of a fatty acid refers to a value relative to the whole amount of fatty acid constituting the polyhydric alcohol fatty acid ester contained in the refrigerating oil.

Specific examples of the fatty acid having 4 to 6 carbon atoms include butanoic acid, 2-methylpropionic acid, pentanoic acid, 2-methylbutanoic acid, 3-methylbutanoic acid, 2,2 dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid. Among them, a fatty acid having a branched structure at an alkyl skeleton, such as 2-methylpropionic acid, is preferred.

Specific examples of the branched fatty acid having 7 to 9 carbon atoms include 2 methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 1,1,2-trimethylbutanoic acid, 1,2,2-trimethylbutanoic acid, 1-ethyl-1-methylbutanoic acid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, nonanoic acid, 2,2-dimethyiheptanoic acid, 2-methyloctanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid.

The polyhydric alcohol fatty acid ester (A) may contain, as an acid constituent component, a fatty acid other than the fatty acid having 4 to 6 carbon atoms and the branched fatty acid having 7 to 9 carbon atoms as long as the molar ratio of the fatty acid having 4 to 6 carbon atoms and the branched fatty acid having 7 to 9 carbon atoms is 15:85 to 90:10 and the fatty acid having 4 to 6 carbon atoms contains 2-methylpropionic acid.

Specific examples of the fatty acid other than the fatty acid having 4 to 6 carbon atoms and the branched fatty acid having 7 to 9 carbon atoms include fatty acids having 2 or 3 carbon atoms, such as acetic acid and propionic acid; linear fatty acids having 7 to 9 carbon atoms, such as heptanoic acid, octanoic acid, and nonanoic acid; and fatty acids having 10 to 20 carbon atoms, such as decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, and oleic acid.

When the fatty acid having 4 to 6 carbon atoms and the branched fatty acid having 7 to 9 carbon atoms are used in combination with fatty acids other than these fatty acids, the total content of the fatty acid having 4 to 6 carbon atoms and the branched fatty acid having 7 to 9 carbon atoms relative to the whole amount of fatty acid constituting the polyhydric alcohol fatty acid ester (A) is preferably 20 mol % or more, more preferably 25 mol % or more, and further preferably 30 mol % or more. When the content is 20 mol % or more, sufficient miscibility with difluoromethane is achieved in the case where the difluoromethane is contained in the refrigerant composition.

A polyhydric alcohol fatty acid ester (A) containing, as acid constituent components, only 2-methylpropionic acid and 3,5,5-trimethylhexanoic acid is particularly preferred from the viewpoint of achieving both necessary viscosity and miscibility with difluoromethane in the case where the difluoromethane is contained in the refrigerant composition.

The polyhydric alcohol fatty acid ester may be a mixture of two or more esters having different molecular structures. In this case, individual molecules do not necessarily satisfy the above conditions as long as the whole fatty acid constituting a pentaerythritol fatty acid ester contained in the refrigerating oil satisfies the above conditions.

As described above, the polyhydric alcohol fatty acid ester (A) contains the fatty acid having 4 to 6 carbon atoms and the branched fatty acid having 7 to 9 carbon atoms as essential acid components constituting the ester and may optionally contain other fatty acids as constituent components. In other words, the polyhydric alcohol fatty acid ester (A) may contain only two fatty acids as acid constituent components or three or more fatty acids having different structures as acid constituent components, but the polyhydric alcohol fatty acid ester preferably contains, as an acid constituent component, only a fatty acid whose carbon atom (α-position carbon atom) adjacent to carbonyl carbon is not quaternary carbon. If the fatty acid constituting the polyhydric alcohol fatty acid ester contains a fatty acid whose α-position carbon atom is quaternary carbon, the lubricity in the presence of difluoromethane in the case where the difluoromethane is contained in the refrigerant composition tends to be insufficient.

The polyhydric alcohol constituting the polyol ester according to this embodiment is preferably a polyhydric alcohol having 2 to 6 hydroxyl groups.

Specific examples of the dihydric alcohol (diol) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Specific examples of the trihydric or higher alcohol include polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerol, polyglycerol (glycerol dimer or trimer), 1,3,5-pentanetriol, sorbitol, sorbitan, sorbitol glycerol condensates, adonitol, arabitol, xylitol, and mannitol; saccharides such as xylose, arabinose, ribose, rhamnose, glucose, fructose, galactose, mannose, sorbose, and cellobiose; and partially etherified products of the foregoing. Among them, in terms of better hydrolysis stability, an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is preferably used; an ester of neopentyl glycol, trimethylolethane, trimethylolpropane, trimethylolbutane, pentaerythritol, or di-(pentaerythritol) is more preferably used; and neopentyl glycol, trimethylolpropane, pentaerythritol, or di-(pentaerythritol) is further preferably used. In terms of excellent miscibility with a refrigerant and excellent hydrolysis stability, a mixed ester of pentaerythritol, di-(pentaerythritol), or pentaerythritol and di-(pentaerythritol) is most preferably used.

Preferred examples of the acid constituent component constituting the polyhydric alcohol fatty acid ester (A) are as follows:

(i) a combination of 1 to 13 acids selected from butanoic acid, 2-methylpropionic acid, pentanoic acid, 2-methylbutanoic acid, 3-methylbutanoic acid, 2,2-dimethylpropionic acid, 2-methylpentanoic, acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 13 acids selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3 methylbutanoic acid;

(ii) a combination of 1 to 13 acids selected, from butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 25 acids selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3 trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 1 to 13 acids selected from butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 50 acids selected from, 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5 trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

Further preferred examples of the acid constituent component constituting the polyhydric alcohol fatty acid ester are as follows:

(i) a combination of 2-methylpropionic acid and 1 to 13 acids selected from 2-methylhexanoic acid, 3-methylhexanoic acid, 4-methylhexanoic acid, 5-methylhexanoic acid, 2,2 dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of 2-methylpropionic acid and 1 to 25 acids selected from 2-methylheptanoic acid, 3-methylheptanoic acid, 4-methylheptanoic acid, 5-methylheptanoic acid, 6 methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2 ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 2-methylpropionic acid and 1 to 50 acids selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyricacid, and 2,2-diisopropylpropionic acid.

The content of the polyhydric alcohol fatty acid ester (A) is 50 mass % or more, preferably 60 mass % or more, more preferably 70 mass % or more, and further preferably 75 mass % or more relative to the whole amount of the refrigerating oil. The refrigerating oil according to this embodiment may contain a lubricating base oil other than the polyhydric alcohol fatty acid ester (A) and additives as described later. However, if the content of the polyhydric alcohol fatty acid ester (A) is less than 50 mass %, necessary viscosity and miscibility cannot be achieved at high levels.

In the refrigerating oil according to this embodiment, the polyhydric alcohol fatty acid ester (A) is mainly used as a base oil. The base oil of the refrigerating oil according to this embodiment may be a polyhydric alcohol fatty acid ester (A) alone (i.e., the content of the polyhydric alcohol fatty acid ester (A) is 100 mass %). However, in addition to the polyhydric alcohol fatty acid ester (A), a base oil other than the polyhydric alcohol fatty acid ester (A) may be further contained to the degree that the excellent performance of the polyhydric alcohol fatty acid ester (A) is not impaired. Examples of the base oil other than the polyhydric alcohol fatty acid ester (A) include hydrocarbon oils such as mineral oils, olefin polymers, alkyldiphenylalkanes, alkylnaphthalenes, and alkylbenzenes; and esters other than the polyhydric alcohol fatty acid ester (A), such as polyol esters, complex esters, and alicyclic dicarboxylic acid esters, and oxygen-containing synthetic oils (hereafter, may be referred to as "other oxygen-containing synthetic oils") such as polyglycols, polyvinyl ethers, ketones, polyphenyl ethers, silicones, polysiloxanes, and perfluoroethers.

Among them, the oxygen-containing synthetic oil is preferably an ester other than the polyhydric alcohol fatty acid ester (A), a polyglycol, or a polyvinyl ether and particularly preferably a polyol ester other than the polyhydric alcohol fatty acid ester (A). The polyol ester other than the polyhydric alcohol fatty acid ester (A) is an ester of a fatty acid and a polyhydric alcohol such as neopentyl glycol, trimethylolethane, trimethylolpropane, trimethylolbutane, pentaerythritol, or dipentaerythritol and is particularly preferably an ester of neopentyl glycol and a fatty acid, an ester of pentaerythritol and a fatty acid, or an ester of dipentaerythritol and a fatty acid.

The neopentyl glycol ester is preferably an ester of neopentyl glycol and a fatty acid having 5 to 9 carbon atoms. Specific examples of the neopentyl glycol ester include neopentyl glycol di(3,5,5-trimethylhexanoate), neopentyl glycol di(2-ethylhexanoate), neopentyl glycol di(2-methylhexanoate), neopentyl glycol di(2-ethylpentanoate), an ester of neopentyl glycol and 2-methylhexanoic acid·2-ethylpentanoic acid, an ester of neopentyl glycol and 3-methylhexanoic acid·5-methylhexanoic acid, an ester of neopentyl glycol and 2-methylhexanoic acid·2-ethylhexanoic acid, an ester of neopentyl glycol and 3,5-dimethylhexanoic acid·4,5-dimethylhexanoic acid·3,4-dimethylhexanoic acid, neopentyl glycol dipentanoate, neopentyl glycol di(2-ethylbutanoate), neopentyl glycol di(2-methylpentanoate), neopentyl glycol di(2-methylbutanoate), and neopentyl glycol di(3-methylbutanoate).

The pentaerythritol ester is preferably an ester of pentaerythritol and a fatty acid having 5 to 9 carbon atoms. The pentaerythritol ester is, specifically, an ester of pentaerythritol and at least one fatty acid selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

The dipentaerythritol ester is preferably an ester of dipentaerythritol and a fatty acid having 5 to 9 carbon atoms. The dipentaerythritol ester is, specifically, an ester of dipentaerythritol and at least, one fatty acid selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

When the refrigerating oil according to this embodiment contains an oxygen-containing synthetic oil other than the polyhydric alcohol fatty acid ester (A), the content of the oxygen-containing synthetic oil other than the polyhydric alcohol fatty acid ester (A) is not limited as long as excellent lubricity and miscibility of the refrigerating oil according to this embodiment are not impaired. When a polyol ester other than the polyhydric alcohol fatty acid ester (A) is contained, the content of the polyol ester is preferably less than 50 mass %, more preferably 45 mass % or less, still more preferably 40 mass % or less, even more preferably 35 mass % or less, further preferably 30 mass % or less, and most preferably 25 mass % or less relative to the whole amount of the refrigerating oil. When an oxygen-containing synthetic oil other than the polyol ester is contained, the content of the oxygen-containing synthetic oil is preferably less than 50 mass %, more preferably 40 mass % or less, and further preferably 30 mass % or less relative to the whole amount of the refrigerating oil. If the content of the polyol ester other than the pentaerythritol fatty acid ester or the oxygen-containing synthetic oil is excessively high, the above-described effects are not sufficiently produced.

The polyol ester other than the polyhydric alcohol fatty acid ester (A) may be a partial ester in which some hydroxyl groups of a polyhydric alcohol are left without being esterified, a complete ester in which all hydroxyl groups are esterified, or a mixture of a partial ester and a complete ester. The hydroxyl value is preferably 10 mgKOH/g or less, more preferably 5 mgKOH/g or less, and most preferably 3 mgKOH/g or less.

When the refrigerating oil and the working fluid for a refrigerating machine according to this embodiment contain a polyol ester other than the polyhydric alcohol fatty acid ester (A), the polyol ester may contain one polyol ester having a single structure or a mixture of two or more polyol esters having different structures.

The polyol ester other than the polyhydric alcohol fatty acid ester (A) may any of an ester of one fatty acid and one polyhydric alcohol, an ester of two or more fatty acids and one polyhydric alcohol, an ester of one fatty acid and two or more polyhydric alcohols, and an ester of two or more fatty acids and two or more polyhydric alcohols.

The refrigerating oil according to this embodiment may be constituted by only the polyhydric alcohol fatty acid ester (A) or by the polyhydric alcohol fatty acid ester (A) and other base oils. The refrigerating oil may further contain various additives described later. The working fluid for a refrigerating machine according to this embodiment may also further contain various additives. In the following description, the content of additives is expressed relative to the whole amount of the refrigerating oil, but the content of these components in the working fluid for a refrigerating machine is desirably determined so that the content is within the preferred range described later when expressed relative to the whole amount of the refrigerating oil.

To further improve the abrasion resistance and load resistance of the refrigerating oil and the working fluid for a refrigerating machine according to this embodiment, at least one phosphorus compound selected from the group consisting of phosphoric acid esters, acidic phosphoric acid esters, thiophosphoric acid esters, amine salts of acidic phosphoric acid esters, chlorinated phosphoric acid esters, and phosphorous acid esters can be added. These phosphorus compounds are esters of phosphoric acid or phosphorous acid and alkanol or polyether-type alcohol, or derivatives thereof.

Specific examples of the phosphoric acid ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, and xylenyldiphenyl phosphate.

Examples of the acidic phosphoric acid ester include monobutyl acid phosphate, monopentyl acid phosphate, monohexyl acid phosphate, monoheptyl acid phosphate, monooctyl acid phosphate, mononονyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of the thiophosphoric acid ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate, and xylenyldiphenyl phosphorothionate.

The amine salt of an acidic phosphoric acid ester is an amine salt of an acidic phosphoric acid ester and a primary, secondary, or tertiary amine that has a linear or branched alkyl group and that has 1 to 24 carbon atoms, preferably 5 to 18 carbon atoms.

For the amine constituting the amine salt of an acidic phosphoric acid ester, the amine salt is a salt of an amine such as a linear or branched methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, oleylamine, tetracosylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, dioleylamine, ditetracosylamine, trimethylamine, triethylamine, tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine, triheptadecylamine, trioctadecylamine, trioleylamine, or tritetracosylamine. The amine may be a single compound or a mixture of two or more compounds.

Examples of the chlorinated phosphoric acid ester include tris(dichloropropyl) phosphate, tris(chloroethyl) phosphate, tris(chlorophenyl) phosphate, and polyoxyalkylene·bis[di (chloroaklyl)] phosphate. Examples of the phosphorous acid ester include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite. Mixtures of these compounds can also be used.

When the refrigerating oil and the working fluid for a refrigerating machine according to this embodiment contain the above-described phosphorus compound, the content of the phosphorus compound is not limited, but is preferably 0.01 to 5.0 mass % and more preferably 0.02 to 3.0 mass % relative to the whole amount of the refrigerating oil (relative to the total amount of the base oil and all the additives). The above-described phosphorus compounds may used alone or in combination of two or more.

The refrigerating oil and the working fluid for a refrigerating machine according to this embodiment may contain a terpene compound to further improve the thermal and chemical stability. The "terpene compound" in the present invention refers to a compound obtained by polymerizing isoprene and a derivative thereof, and a dimer to an octamer of isoprene are preferably used. Specific examples of the terpene compound include monoterpenes such as geraniol, nerol, linalool, citral (including geranial), citronellol, menthol, limonene, terpinerol, carvone, ionone, thujone, camphor, and borneol; sesquiterpenes such as farnesene, farnesol, nerolidol, juvenile hormone, humulene, caryophyllene, elemene, cadinol, cadinene, and tutin; diterpenes such as geranylgeraniol, phytol, abietic acid, pimaragen, daphnetoxin, taxol, and pimaric acid; sesterterpenes such as geranylfarnesene; triterpenes such as squalene, limonin, camelliagenin, hopane, and lanosterol; and tetraterpenes such as carotenoid.

Among these terpene compounds, the terpene compound is preferably monoterpene, sesquiterpene, or diterpene, more preferably sesquiterpene, and particularly preferably a farnesene (3,7,11-trimethyldodeca-1,3,6,10-tetraene) and/or β-farnesene (7,11-dimethyl-3-methylidenedodeca-1,6,10-triene). In the present invention, the terpene compounds may be used alone or in combination of two or more.

The content of the terpene compound in the refrigerating oil according to this embodiment is not limited, but is preferably 0.001 to 10 mass %, more preferably 0.01 to 5 mass %, and further preferably 0.05 to 3 mass % relative to the whole amount of the refrigerating oil. If the content of the terpene compound is less than 0.001 mass %, an effect of improving the thermal and chemical stability tends to be insufficient. If the content is more than 10 mass %, the lubricity tends to be insufficient. The content of the terpene compound in the working fluid for a refrigerating machine according to this embodiment is desirably determined so that the content is within the above preferred range when expressed relative to the whole amount of the refrigerating oil.

The refrigerating oil and the working fluid for a refrigerating machine according to this embodiment may contain at least one epoxy compound selected from phenyl glycidyl ether-type epoxy compounds, alkyl glycidyl ether-type epoxy compounds, glycidyl ester-type epoxy compounds, allyloxirane compounds, alkyloxirane compounds, alicyclic epoxy compounds, epoxidized fatty acid monoesters, and epoxidized vegetable oils to further improve the thermal and chemical stability.

Specific examples of the phenyl glycidyl ether-type epoxy compound include phenyl glycidyl ether and alkylphenyl glycidyl ethers. The alkylphenyl glycidyl ether herein is an alkylphenyl glycidyl ether having 1 to 3 alkyl groups with 1 to 13 carbon atoms. In particular, the alkylphenyl glycidyl ether is preferably an alkylphenyl glycidyl ether having one alkyl group with 4 to 10 carbon atoms, such as n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, or decylphenyl glycidyl ether.

Specific examples of the alkyl glycidyl ether-type epoxy compound include decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether.

Specific examples of the glycidyl ester-type epoxy compound include phenyl glycidyl ester, alkyl glycidyl esters, and alkenyl glycidyl esters. Preferred examples of the glycidyl ester-type epoxy compound include glycidyl-2,2-dimethyloctanoate, glycidyl benzoate, glycidyl acrylate, and glycidyl methacrylate.

Specific examples of the allyloxirane compound include, 1,2-epoxystyrene and alkyl-1,2-epoxystyrenes.

Specific examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane, and 1,2-epoxyeicosane.

Specific examples of the alicyclic epoxy compound include 1,2-epoxycyclohexane, 1,2-epoxycyclopentane, 3,4-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane.

Specific examples of the epoxidized fatty acid monoester include esters of an epoxidized fatty acid having 12 to 20 carbon atoms and an alcohol having 1 to 8 carbon atoms, phenol, or an alkylphenol. In particular, butyl, hexyl, benzyl, cyclohexyl, methoxyethyl, octyl, phenyl, and butyl phenyl esters of epoxystearic acid are preferably used.

Specific examples of the epoxidized vegetable oil include epoxy compounds of vegetable oils such as soybean oil, linseed oil, and cottonseed oil.

Among these epoxy compounds, phenyl glycidyl ether-type epoxy compounds, alkyl glycidyl ether-type epoxy compounds, glycidyl ester-type epoxy compounds, and alicyclic epoxy compounds are preferred.

When the refrigerating oil and the working fluid for a refrigerating machine according to this embodiment contain the above-described epoxy compound, the content of the epoxy compound is not limited, but is preferably 0.01 to 5.0 mass % and more preferably 0.1 to 3.0 mass % relative to the whole amount of the refrigerating oil. The above-described epoxy compounds may be, used alone or in combination of two or more.

The kinematic viscosity of the refrigerating oil containing the polyhydric alcohol fatty acid ester (A) at 40° C. is preferably 20 to 80 $mm^2/s$, more preferably 25 to 75 $mm^2/s$, and most preferably 30 to 70 $mm^2/s$. The kinematic viscosity at 100° C. is preferably 2 to 20 $mm^2/s$ and more preferably 3 to 10 $mm^2/s$. When the kinematic viscosity is more than or equal to the lower limit, the viscosity required as a refrigerating oil is easily achieved. On the other hand, when the kinematic viscosity is less than or equal to the upper limit, sufficient miscibility with difluoromethane in the case where the difluoromethane is contained as a refrigerant composition can be achieved.

The volume resistivity of the refrigerating oil containing the polyhydric alcohol fatty acid ester (A) is not limited, but is preferably $1.0\times10^{12}$ Ω·cm or more, more preferably $1.0\times10^{13}$ Ω·cm or more, and most preferably $1.0\times10^{14}$ Ω·cm or more. In particular, when the refrigerating oil is used for sealed refrigerating machines, high electric insulation tends to be required. The volume resistivity refers to a value measured at 25° C. in conformity with JIS C 2101 "Testing methods of electrical insulating oils".

The water content of the refrigerating oil containing the polyhydric alcohol fatty acid ester (A) is not limited, but is preferably 200 ppm or less, more preferably 100 ppm or less, and most preferably 50 ppm or less relative to the whole amount of the refrigerating oil. In particular, when the refrigerating oil is used for sealed refrigerating machines, the water content needs to be low from the viewpoints of the thermal and chemical stability of the refrigerating oil and the influence on electric insulation.

The acid number of the refrigerating oil containing the polyhydric alcohol fatty acid ester (A) is not limited, but is preferably 0.1 mgKOH/g or less and more preferably 0.05 mgKOH/g or less to prevent corrosion of metals used for refrigerating machines or pipes. In the present invention, the acid number refers to an acid number measured in conformity with JIS K 2501 "Petroleum products and lubricants—Determination of neutralization number".

The ash content of the refrigerating oil containing the polyhydric alcohol fatty acid ester (A) is not limited, but is preferably 100 ppm or less and more preferably 50 ppm or less to improve the thermal and chemical stability of the refrigerating oil and suppress the generation of sludge and the like. The ash content refers to an ash content measured in conformity with JIS K 2272 "Crude oil and petroleum products—Determination of ash and sulfated ash".

(Complex Ester Oil)

The complex ester oil is an ester of a fatty acid and a dibasic acid, and a monohydric alcohol and a polyol. The above-described fatty acid, dibasic acid, monohydric alcohol, and polyol can be used.

Examples of the fatty acid include the fatty acids mentioned in the polyol ester.

Examples of the dibasic acid include oxalic acid, malonic acid, succinic acid, glutaric acid, adipic acid, pimelic acid, suberic acid, azelaic acid, sebacic acid, phthalic acid, isophthalic acid, and terephthalic acid.

Examples of the polyol include the polyhydric alcohols in the polyol ester. The complex ester is an ester of such a fatty acid, dibasic acid, and polyol, each of which may be constituted by a single component or a plurality of components.

(Polyol Carbonate Oil)

The polyol carbonate oil is an ester of a carbonic acid and a polyol.

Examples of the polyol include the above-described diols and polyols.

The polyol carbonate oil may be a ring-opened polymer of a cyclic alkylene carbonate.

(2-1-2) Ether-Based Refrigerating Machine Oil (2-1-2) Ether-Type Refrigerating Oil The ether-type refrigerating oil is, for example, a polyvinyl ether oil or a polyoxyalkylene oil.

(Polyvinyl Ether Oil)

Examples of the polyvinyl ether oil include polymers of a vinyl ether monomer, copolymers of a vinyl ether monomer and a hydrocarbon monomer having an olefinic double bond, and copolymers of a monomer having an olefinic double bond and a polyoxyalkylene chain and a vinyl ether monomer.

The carbon/oxygen molar ratio of the polyvinyl ether oil is preferably 2 or more and 7.5 or less and more preferably 2.5 or more and 5.8 or less. If the carbon/oxygen molar ratio is smaller than the above range, the hygroscopicity increases. If the carbon/oxygen molar ratio is larger than the above range, the miscibility deteriorates. The weight-average molecular weight of the polyvinyl ether is preferably 200 or more and 3000 or less and more preferably 500 or more and 1500 or less.

The pour point of the polyvinyl ether oil is preferably −30° C. or lower. The surface tension of the polyvinyl ether oil at 20° C. is preferably 0.02 N/m or more and 0.04 N/m or less. The density of the polyvinyl ether oil at 15° C. is preferably 0.8 g/cm$^3$ or more and 1.8 g/cm$^3$ or less. The saturated water content of the polyvinyl ether oil at a temperature of 30° C. and a relative humidity of 90% is preferably 2000 ppm or more.

The refrigerating oil may contain polyvinyl ether as a main component. In the case where HFO-1234yf is contained as a refrigerant, the polyvinyl ether serving as a main component of the refrigerating oil has miscibility with HFO-1234yf. When the refrigerating oil has a kinematic viscosity at 40° C. of 400 mm$^2$/s or less, HFO-1234yf is dissolved in the refrigerating oil to some extent. When the refrigerating oil has a pour point of −30° C. or lower, the flowability of the refrigerating oil is easily ensured even at positions at which the temperature of the refrigerant composition and the refrigerating oil is low in the refrigerant circuit. When the refrigerating oil has a surface tension at 20° C. of 0.04 N/m or less, the refrigerating oil discharged from a compressor does not readily form large droplets of oil that are not easily carried away by a refrigerant composition. Therefore, the refrigerating oil discharged from the compressor is dissolved in HFO-1234yf and is easily returned to the compressor together with HFO-1234yf.

When the refrigerating oil has a kinematic viscosity at 40° C. of 30 mm$^2$/s or more, an insufficient oil film strength due to excessively low kinematic viscosity is suppressed, and thus good lubricity is easily achieved. When the refrigerating oil has a surface tension at 20° C. of 0.02 N/m or more, the refrigerating oil does not readily form small droplets of oil in a gas refrigerant inside the compressor, which can suppress discharge of a large amount of refrigerating oil from the compressor. Therefore, a sufficient amount of refrigerating oil is easily stored in the compressor.

When the refrigerating oil has a saturated water content at 30° C./90% RH of 2000 ppm or more, a relatively high hygroscopicity of the refrigerating oil can be achieved. Thus, when HFO-1234yf is contained as a refrigerant, water in HFO-1234yf can be captured by the refrigerating oil to some extent. HFO-1234yf has a molecular structure that is easily altered or deteriorated because of the influence of water contained. Therefore, the hydroscopic effects of the refrigerating oil can suppress such deterioration.

Furthermore, when a particular resin functional component is disposed in the sealing portion or sliding portion that is in contact with a refrigerant flowing through the refrigerant circuit and the resin functional component is formed of any of polytetrafluoroethylene, polyphenylene sulfide, phenolic resin, polyamide resin, chloroprene rubber, silicon rubber, hydrogenated nitrile rubber, fluororubber, and hydrin rubber, the aniline point of the refrigerating oil is preferably set within a particular range in, consideration of the adaptability with the resin functional component. By setting the aniline point in such a manner, for example, the adaptability of bearings constituting the resin functional component with the refrigerating oil is improved. Specifically, if the aniline point is excessively low, the refrigerating oil readily infiltrates bearings or the like, and the bearings or the like readily swell. On the other hand, if the aniline point is excessively high, the refrigerating oil does not readily infiltrate bearings or the like, and the bearings or the like readily shrink. Therefore, by setting the aniline point of the refrigerating oil within a particular range, the swelling or shrinking of the bearings or the like can be prevented. Herein, for example, if each of the bearings or the like deforms through swelling or shrinking, the desired length of a gap at a sliding portion cannot be maintained. This may increase the sliding resistance or decrease the rigidity of the sliding portion. However, when the aniline point of the refrigerating oil is set within a particular range as described above, the deformation of the bearings or the like through swelling or shrinking is suppressed, and thus such a problem can be avoided.

The vinyl ether monomers may be used alone or in combination of two or more. Examples of the hydrocarbon monomer having an olefinic double bond include ethylene, propylene, various butenes, various pentenes, various hexenes, various heptenes, various octenes, diisobutylene, triisobutylene, styrene, α-methylstyrene, and various alkyl-substituted styrenes. The hydrocarbon monomers having an olefinic double bond may be used alone or in combination of two or more.

The polyvinyl ether copolymer may be a block copolymer or a random copolymer. The polyvinyl ether oils may be used alone or in combination of two or more.

A polyvinyl ether oil preferably used has a structural unit represented by general formula (1) below.

[Chem. 1]

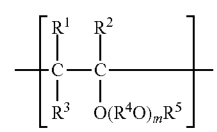

(1)

(In the formula, R$^1$, R$^2$, and R$^3$ may be the same or different and each represent a hydrogen atom or a hydrocarbon group having 1 to 8 carbon atoms, R$^4$ represents a divalent hydrocarbon group having 1 to 10 carbon atoms or an ether bond oxygen-containing divalent hydrocarbon group having 2 to 20 carbon atoms, R$^5$ represents a hydrocarbon group having 1 to 20 carbon atoms, m represents a number at which the average of m in the polyvinyl ether is 0 to 10, R$^1$ to R5 may be the same or different in each of structural units, and when m represents 2 or more in one structural unit, a plurality of R$^4$O may be the same or different.)

At least one of R$^1$, R$^2$, and R$^3$ in the general formula (1) preferably represents a hydrogen atom. In particular, all of R$^1$, R$^2$, and R$^3$ preferably represent a hydrogen atom. In the general formula (1), m preferably represents 0 or more and 10 or less, particularly preferably 0 or more and 5 or less, further preferably 0. R$^5$ in the general formula (1) represents a hydrocarbon group having 1 to 20 carbon atoms. Specific examples of the hydrocarbon group include alkyl groups such as a methyl group, an ethyl group, a n-propyl group, an isopropyl group, a n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups. Among the alkyl groups, the cycloalkyl groups, the phenyl group, the aryl groups, and the arylalkyl groups, alkyl groups, in particular, alkyl groups having 1 to 5 carbon atoms are preferred. For the polyvinyl ether oil contained, the ratio of a polyvinyl ether oil with $R^5$ representing an alkyl group having 1 or 2 carbon atoms and a polyvinyl ether oil with $R^5$ representing an alkyl group having 3 or 4 carbon atoms is preferably 40%:60% to 100%:0%.

The polyvinyl ether oil according to this embodiment may be a homopolymer constituted by the same structural unit represented by the general formula (1) or a copolymer constituted by two or more structural units. The copolymer may be a block copolymer or a random copolymer.

The polyvinyl ether oil according to this embodiment may constituted by only the structural unit represented by the general formula (1) or may be a copolymer further including a structural unit represented by general formula (2) below. In this case, the copolymer may be a block copolymer or a random copolymer.

[Chem. 2]

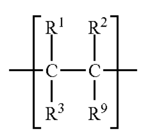

(2)

(In the formula, $R^6$ to $R^9$ may be the same or different and each represent a hydrogen atom or a hydrocarbon group having 1 to 20 carbon atoms.)

The vinyl ether monomer is, for example, a compound represented by general formula (3) below.

[Chem. 3]

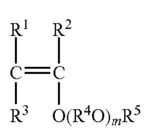

(3)

(In the formula, $R^1$, $R^2$, $R^3$, $R^4$, $R^5$, and m have the same meaning as $R^1$, $R^2$, $R^3$, $R^4$, $R^5$, and m in the general formula (1), respectively.)

Examples of various polyvinyl ether compounds corresponding to the above polyvinyl ether compound include vinyl methyl ether; vinyl ethyl ether; vinyl-n-propyl ether; vinyl-isopropyl ether; vinyl-n-butyl ether; vinyl-isobutyl ether; vinyl-sec-butyl ether; vinyl-tert-butyl ether; vinyl-n-pentyl ether; vinyl-n-hexyl ether; vinyl-2-methoxyethyl ether; vinyl-2-ethoxyethyl ether; vinyl-2-methoxy-1-methylethyl ether; vinyl-2-methoxy-propyl ether; vinyl-3,6-dioxaheptyl ether; vinyl-3,6,9-trioxadecyl ether; vinyl-1,4-dimethyl-3,6-dioxaheptyl ether; vinyl-1,4,7-trimethyl-3,6,9-trioxadecyl ether; vinyl-2,6-dioxa-4-heptyl ether; vinyl-2,6,9-trioxa-4-decyl ether; 1-methoxypropene; 1-ethoxypropene; 1-n-propoxypropene; 1-isopropoxypropene; 1-n-butoxypropene; 1-isobutoxypropene; 1-sec-butoxypropene; 1-tert-butoxypropene; 2-methoxypropene; 2-ethoxypropene; 2-n-propoxypropene; 2-isopropoxypropene; 2-n-butoxypropene; 2-isobutoxypropene; 2-sec-butoxypropene; 2-tert-butoxypropene; 1-methoxy-1-butene; 1-ethoxy-1-butene; 1-n-propoxy-1-butene; 1-isopropoxy-1-butene; 1-n-butoxy-1-butene; 1-isobutoxy-1-butene; 1-sec-butoxy-1-butene; 1-tert-butoxy-1-butene; 2-methoxy-1-butene; 2-ethoxy-1-butene; 2-n-propoxy-1-butene; 2-isopropoxy-1-butene; 2-n-butoxy-1-butene; 2-isobutoxy-1-butene; 2-sec-butoxy-1-butene; 2-tert-butoxy-1-butene; 2-methoxy-2-butene; 2-ethoxy-2-butene; 2-n-propoxy-2-butene; 2-isopropoxy-2-butene; 2-n-butoxy-2-butene; 2-isobutoxy-2-butene; 2-sec-butoxy-2-butene; and 2-tert-butoxy-2-butene. These vinyl ether monomers can be produced by a publicly known method.

The end of the polyvinyl ether compound having the structural unit represented by the general formula (1) can be converted into a desired structure by a method described in the present disclosure and a publicly known method. Examples of the group introduced by conversion include saturated hydrocarbons, ethers, alcohols, ketones, amides, and nitriles.

The polyvinyl ether compound preferably has the following end structures.

[Chem. 4]

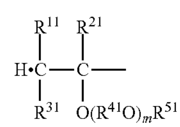

(4)

(In the formula, $R^{11}$, $R^{21}$, and $R^{31}$ may be the same or different and each represent a hydrogen atom or a hydrocarbon group having 1 to 8 carbon atoms, $R^{41}$ represents a divalent hydrocarbon group having 1 to 10 carbon atoms or an ether bond oxygen-containing divalent hydrocarbon group having 2 to 20 carbon atoms, $R^{51}$ represents a hydrocarbon group having 1 to 20 carbon atoms, m represents a number at which the average of m in the polyvinyl ether is 0 to 10, and when m represents 2 or more, a plurality of $R^{41}O$ may the same or different.)

[Chem. 5]

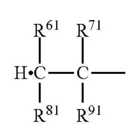

(5)

(In the formula, $R^{61}$, $R^{71}$, $R^{81}$, and $R^{91}$ may be the same or different and each represent a hydrogen atom or a hydrocarbon group having 1 to 20 carbon atoms.)

[Chem. 6]

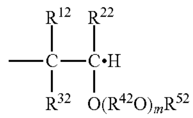

(6)

(In the formula, $R^{12}$, $R^{22}$, and $R^{32}$ may be the same or different and each represent a hydrogen atom or a hydrocarbon group having 1 to 8 carbon atoms, $R^{42}$ represents a divalent hydrocarbon group having 1 to 10 carbon atoms or an ether bond oxygen-containing divalent hydrocarbon group having 2 to 20 carbon atoms, $R^{52}$ represents a hydrocarbon group having 1 to 20 carbon atoms, m represents a number at which the average of m in the polyvinyl ether is 0 to 10, and when m represents 2 or more, a plurality of $R^{42}O$ may be the same or different.)

[Chem. 7]

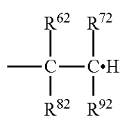

(7)

(In the formula, $R^{62}$, $R^{72}$, $R^{82}$, and $R^{92}$ may be the same or different and each represent a hydrogen atom or a hydrocarbon group having 1 to 20 carbon atoms.)

[Chem. 8]

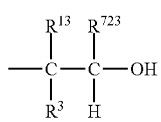

(8)

(In the formula, $R^{13}$, $R^{23}$, and $R^{33}$ may be the same or different and each represent a hydrogen atom or a hydrocarbon group having 1 to 8 carbon atoms.)

The polyvinyl ether oil according to this embodiment can be produced by polymerizing the above-described monomer through, for example, radical polymerization, cationic polymerization, or radiation-induced polymerization. After completion of the polymerization reaction, a typical separation/purification method is performed when necessary to obtain a desired polyvinyl ether compound having a structural unit represented by the general formula (1).

(Polyoxyalkylene Oil)

The polyoxyalkylene oil is a polyoxyalkylene compound obtained by, for example, polymerizing an alkylene oxide having 2 to 4 carbon atoms (e.g., ethylene oxide or propylene oxide) using water or a hydroxyl group-containing compound as an initiator. The hydroxyl group of the polyoxyalkylene compound may be etherified or esterified. The polyoxyalkylene oil may contain an oxyalkylene unit of the same type or two or more oxyalkylene units in one molecule. The polyoxyalkylene oil preferably contains at least an oxypropylene unit in one molecule.

Specifically, the polyoxyalkylene oil is, for example, a compound represented by general formula (9) below.

$$R^{101}[(R^{102})_k\text{—}OR^{103}]_l \qquad (9)$$

(In the formula, $R^{101}$ represents a hydrogen atom, an alkyl group having 1 to 10 carbon atoms, an acyl group having 2 to 10 carbon atoms, or an aliphatic hydrocarbon group having 2 to 6 bonding sites and 1 to 10 carbon atoms, $R^{102}$ represents an alkylene group having 2 to 4 carbon atoms, $R^{103}$ represents a hydrogen atom, an alkyl group having 1 to 10 carbon atoms, or an acyl group having 2 to 10 carbon atoms, 1 represents an integer of 1 to 6, and k represents a number at which the average of k×1 is 6 to 80.)

In the general formula (9), the alkyl group represented by $R^{101}$ and $R^{103}$ may be a linear, branched, or cyclic alkyl group. Specific examples of the alkyl group include a methyl group, an ethyl group, a n-propyl group, an isopropyl group, various butyl groups, various pentyl groups, various hexyl groups, various heptyl groups, various octyl groups, various nonyl groups, various decyl groups, a cyclopentyl group, and a cyclohexyl group. If the number of carbon atoms of the alkyl group exceeds 10, the miscibility with a refrigerant 2 Deteriorates, which may cause phase separation. The number of carbon atoms of the alkyl group is preferably 1 to 6.

The acyl group represented by $R^{101}$ and $R^{103}$ may have a linear, branched, or cyclic alkyl group moiety. Specific examples of the alkyl group moiety of the acyl group include various groups having 1 to 9 carbon atoms that are mentioned as specific examples of the alkyl group. If the number of carbon atoms of the acyl group exceeds 10, the miscibility with a refrigerant 2 Deteriorates, which may cause phase separation. The number of carbon atoms of the acyl group is preferably 2 to 6.

When $R^{101}$ and $R^{103}$ each represent an alkyl group or an acyl group, $R^{101}$ and $R^{103}$ may be the same or different.

Furthermore, when 1 represents 2 or more, a plurality of $R^{103}$ in one molecule may be the same or different.

When $R^{101}$ represents an aliphatic hydrocarbon group having 2 to 6 bonding sites and 1 to 10 carbon atoms, the aliphatic hydrocarbon group may be a linear group or a cyclic group. Examples of the aliphatic hydrocarbon group having two bonding sites include an ethylene group, a propylene group, a butylene group, a pentylene group, a hexylene group, a heptylene group, an octylene group, a nonylene group, a decylene group, a cyclopentylene group, and a cyclohexylene group. Examples of the aliphatic hydrocarbon group having 3 to 6 bonding sites include residual groups obtained by removing hydroxyl groups from polyhydric alcohols such as trimethylolpropane, glycerol, pentaerythritol, sorbitol, 1,2,3-trihydroxycyclohexane, and 1,3,5-trihydroxycyclohexane.

If the number of carbon atoms of the aliphatic hydrocarbon group exceeds 10, the miscibility with a refrigerant 2 Deteriorates, which may cause phase separation. The number of carbon atoms is preferably 2 to 6.

$R^{102}$ in the general formula (9) represents an alkylene group having 2 to 4 carbon atoms. Examples of the oxyalkylene group serving as a repeating unit include an oxyethylene group, an oxypropylene group, and an oxybutylene group. The polyoxyalkylene oil may contain an oxyalkylene group of the same type or two or more oxyalkylene groups in one molecule, but preferably contains at least an oxypropylene unit in one molecule. In particular, the content of the oxypropylene unit in the oxyalkylene unit is suitably 50 mol % or more.

In the general formula (9), 1 represents an integer of 1 to 6, which can be determined in accordance with the number of bonding sites of $R^{101}$. For example, when $R^{101}$ represents an alkyl group or an acyl group, 1 represents 1. When $R^{101}$ represents an aliphatic hydrocarbon group having 2, 3, 4, 5, and 6 bonding sites, 1 represents 2, 3, 4, 5, and 6, respectively. Preferably, 1 represents 1 or 2. Furthermore, k preferably represents a number at which the average of k×1 is 6 to 80.

For the structure of the polyoxyalkylene oil, a polyoxypropylene diol dimethyl ether represented by general formula (10) below and a poly(oxyethylene/oxypropylene) diol dimethyl ether represented by general formula (11) below are suitable from the viewpoints of economy and the above-described effects. Furthermore, a polyoxypropylene diol monobutyl ether represented by general formula (12) below, a polyoxypropylene diol monomethyl ether represented by general formula (13) below, a poly(oxyethylene/oxypropylene) diol monomethyl ether represented by general formula (14) below, a poly(oxyethylene/oxypropylene) diol monobutyl ether represented by general formula (15) below, and a polyoxypropylene diol diacetate represented by general formula (16) below are suitable from the viewpoint of economy and the like.

$$CH_3O—(C_3H_6O)_h—CH_3 \quad (10)$$

(In the formula, h represents 6 to 80.)

$$CH_3O—(C_2H_4O)_i—(C_3H_6O)_j—CH_3 \quad (11)$$

(In the formula, i and j each represent 1 or more and the sum of i and j is 6 to 80.)

$$C_4H_9O—(C_3H_6O)_h—H \quad (12)$$

(In the formula, h represents 6 to 80.)

$$CH_3O—(C_3H_6O)_h—H \quad (13)$$

(In the formula, h represents 6 to 80.)

$$CH_3O—(C_2H_4O)_i—(C_3H_6O)_j—H \quad (14)$$

(In the formula, i and j each represent 1 or more and the sum of i and j is 6 to 80.)

$$C_4H_9O—(C_2H_4O)_i—(C_3H_6O)_j—H \quad (15)$$

(In the formula, i and j each represent 1 or more and the sum of i and j is 6 to 80.)

$$CH_3COO—(C_3H_6O)_h—COCH_3 \quad (16)$$

(In the formula, h represents 6 to 80.)

The polyoxyalkylene oils may be used alone or in combination of two or more.

(2-2) Hydrocarbon-Based Refrigerating Machine Oil (2-2) Hydrocarbon Refrigerating Oil The hydrocarbon refrigerating oil that can be used is, for example, an alkylbenzene.

The alkylbenzene that can be used is a branched alkylbenzene synthesized from propylene polymer and benzene serving as raw materials using a catalyst such as hydrogen fluoride or a linear alkylbenzene synthesized from normal paraffin and benzene serving as raw materials using the same catalyst. The number of carbon atoms of the alkyl group is preferably 1 to 30 and more preferably 4 to 20 from the viewpoint of achieving a viscosity appropriate as a lubricating base oil. The number of alkyl groups in one molecule of the alkylbenzene is dependent on the number of carbon atoms of the alkyl group, but is preferably 1 to 4 and more preferably 1 to 3 to control the viscosity within the predetermined range.

The hydrocarbon refrigerating oil preferably circulates through a refrigeration cycle system together with a refrigerant. Although it is most preferable that the refrigerating oil is soluble with a refrigerant, for example, a refrigerating oil (e.g., a refrigerating oil disclosed in Japanese Patent No. 2803451) having low solubility can also be used as long as the refrigerating oil is capable of circulating through a refrigeration cycle system together with a refrigerant. To allow the refrigerating oil to circulate through a refrigeration cycle system, the refrigerating oil is required to have a low kinematic viscosity. The kinematic viscosity of the hydrocarbon refrigerating oil at 40° C. is preferably 1 $mm^2/s$ or more and 50 $mm^2/s$ or less and more preferably 1 $mm^2/s$ or more and 25 $mm^2/s$ or less.

These refrigerating oils may be used alone or in combination of two or more.

The content of the hydrocarbon refrigerating oil in the working fluid for a refrigerating machine may be, for example, 10 parts by mass or more and 100 parts by mass or less and is more preferably 20 parts by mass or more and 50 parts by mass or less relative to 100 parts by mass of the refrigerant composition.

(2-3) Additives (2-3) Additive

The refrigerating oil may contain one or two or more additives.

Examples of the additives include an acid scavenger, an extreme pressure agent, an antioxidant, an antifoaming agent, an oiliness improver, a metal deactivator such as a copper deactivator, an anti-wear agent, and a compatibilizer.

Examples of the acid scavenger that can be used include epoxy compounds such as phenyl glycidyl ether, alkyl glycidyl ether, alkylene glycol glycidyl ether, cyclohexene oxide, α-olefin oxide, and epoxidized soybean oil; and carbodiimides. Among them, phenyl glycidyl ether, alkyl glycidyl ether, alkylene glycol glycidyl ether, cyclohexene oxide, and α-olefin oxide are preferred from the viewpoint of miscibility. The alkyl group of the alkyl glycidyl ether and the alkylene group of the alkylene glycol glycidyl ether may have a branched structure. The number of carbon atoms may be 3 or more and 30 or less, and is more preferably 4 or more and 24 or less and further preferably 6 or more and 16 or less. The total number of carbon atoms of the α-olefin oxide may be 4 or more and 50 or less, and is more preferably 4 or more and 24 or less and further preferably 6 or more and 16 or less. The acid scavengers may be used alone or in combination of two or more.

The extreme pressure agent may contain, for example, a phosphoric acid ester. Examples of the phosphoric acid ester that can be used include phosphoric acid esters, phosphorous acid esters, acidic phosphoric acid esters, and acidic phosphorous acid esters. The extreme pressure agent may contain an amine salt of a phosphoric acid ester, a phosphorous acid ester, an acidic phosphoric acid ester, or an acidic phosphorous acid ester.

Examples of the phosphoric acid ester include triaryl phosphates, trialkyl phosphates, trialkylaryl phosphates, triarylalkyl phosphates, and trialkenyl phosphates. Specific examples of the phosphoric acid ester include triphenyl phosphate, tricresyl phosphate, benzyl diphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate.

Specific examples of the phosphorous acid ester include triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenylisodecyl phosphite, tristearyl phosphite, and trioleyl phosphite.

Specific examples of the acidic phosphoric acid ester include 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, and isostearyl acid phosphate.

Specific examples of the acidic phosphorous acid ester include dibutyl hydrogen phosphite, dilauryl hydrogen phosphite, dioleyl hydrogen phosphite, distearyl hydrogen phosphite, and diphenyl hydrogen phosphite. Among the phosphoric acid esters, oleyl acid phosphate and stearyl acid phosphate are suitably used.

Among amines used for amine salts of phosphoric acid esters, phosphorous acid esters, acidic phosphoric acid esters, or acidic phosphorous acid esters, specific examples of mono-substituted amines include butylamine, pentylamine, hexylamine, cyclohexylamine, octylamine, laurylamine, stearylamine, oleylamine, and benzylamine. Specific examples of di-substituted amines include dibutylamine, dipentylamine, dihexylamine, dicyclohexylamine, dioctylamine, dilaurylamine, distearylamine, dioleylamine, dibenzylamine, stearyl·monoethanolamine, decyl·monoethanolamine, hexyl·monopropanolamine, benzyl·monoethanolamine, phenyl·monoethanolamine, and tolyl·monopropanolamine. Specific examples of tri-substituted amines include tributylamine, tripentylamine, trihexylamine, tricyclohexylamine, trioctylamine, trilaurylamine, tristearylamine, trioleylamine, tribenzylamine, dioleyl·monoethanolamine, dilauryl·monopropanolamine, dioctyl·monoethanolamine, dihexyl·monopropanolamine, dibutyl·monopropanolamine, oleyldiethanolamine, stearyl·dipropanolamine, lauryl·diethanolamine, octyl·dipropanolamine, butyl·diethanolamine, benzyl·diethanolamine, phenyl·diethanolamine, tolyl·dipropanolamine, xylyl diethanolamine, triethanolamine, and tripropanolamine.

Examples of extreme pressure agents other than the above-described extreme pressure agents include extreme pressure agents based on organosulfur compounds such as monosulfides, polysulfides, sulfoxides, sulfones, thiosulfinates, sulfurized fats and oils, thiocarbonates, thiophenes, thiazoles, and methanesulfonates; extreme pressure agents based on thiophosphoric acid esters such as thiophosphoric acid triesters; extreme pressure agents based on esters such as higher fatty acids, hydroxyaryl fatty acids, polyhydric alcohol esters, and acrylic acid esters; extreme pressure agents based on organochlorine compounds such as chlorinated hydrocarbons, e.g., chlorinated paraffin and chlorinated carboxylic acid derivatives; extreme pressure agents based on fluoroorganic compounds such as fluorinated aliphatic carboxylic acids, fluorinated ethylene resins, fluorinated alkylpolysiloxanes, and fluorinated graphites; extreme pressure agents based on alcohols such as higher alcohols; and extreme pressure agents based on metal compounds such as naphthenic acid salts (e.g., lead naphthenate), fatty acid salts (e.g., lead fatty acid), thiophosphoric acid salts (e.g., zinc dialkyldithiophosphate), thiocarbamic acid salts, organomolybdenum compounds, organotin compounds, organogermanium compounds, and boric acid esters.

The antioxidant that can be used is, for example, a phenol-based antioxidant or an amine-based antioxidant. Examples of the phenol-based antioxidant include 2,6-di-tert-butyl-4-methylphenol (DBPC), 2,6-di-tert-butyl-4-ethylphenol, 2,2'-methylenebis(4-methyl-6-tert-butylphenol), 2,4-dimethyl-6-tert-butylphenol, 2,6-di-tert-butylphenol, di-tert-butyl-p-cresol, and bisphenol A. Examples of the amine-based antioxidant include N,N'-diisopropyl-p-phenylenediamine, N,N'-di-sec-butyl-p-phenylenediamine, phenyl-α-naphthylamine, N,N'-di-phenyl-p-phenylenediamine, and N,N-di(2-naphthyl)-p-phenylenediamine. An oxygen scavenger that captures oxygen can also be used as the antioxidant.

The antifoaming agent that can be used is, for example, a silicon compound.

The oiliness improver that can be used is, for example, a higher alcohol or a fatty acid.

The metal deactivator such as a copper deactivator that can be used is, for example, benzotriazole or a derivative thereof.

The anti-wear agent that can be used is, for example, zinc dithiophosphate.

The compatibilizer is not limited, and can be appropriately selected from commonly used compatibilizers. The compatibilizers may be used alone or in combination of two or more. Examples of the compatibilizer include polyoxyalkylene glycol ethers, amides, nitriles, ketones, chlorocarbons, esters, lactones, aryl ethers, fluoroethers, and 1,1,1-trifluoroalkanes. The compatibilizer is particularly preferably a polyoxyalkylene glycol ether.

The refrigerating oil may optionally contain, for example, a load-bearing additive, a chlorine scavenger, a detergent dispersant, a viscosity index improver, a heat resistance improver, a stabilizer, a corrosion inhibitor, a pour-point depressant, and an anticorrosive.

The content of each additive in the refrigerating oil may be 0.01 mass % or more and 5 mass % or less and is preferably 0.05 mass % or more and 3 mass % or less. The content of the additive in the working fluid for a refrigerating machine constituted by the refrigerant composition and the refrigerating oil is preferably 5 mass % or less and more preferably 3 mass % or less.

The refrigerating oil preferably has a chlorine concentration of 50 ppm or less and preferably has a sulfur concentration of 50 ppm or less.

(3) First Embodiment of Refrigeration Cycle Device for Vehicle

An air conditioner for a vehicle using any one of the refrigerant 1A, the refrigerant 1B, the refrigerant 1C, the refrigerant 1D, the refrigerant 1E, the refrigerant 2A, the refrigerant 2B, the refrigerant 2C, the refrigerant 2D, the refrigerant 2E, the refrigerant 3A, and the refrigerant 3B, and the refrigerating machine oil above is described below. The air conditioner for a vehicle is a refrigeration cycle device for a vehicle.

(3-1) Configuration of Air Conditioner 1 for Vehicle

Figure 3:
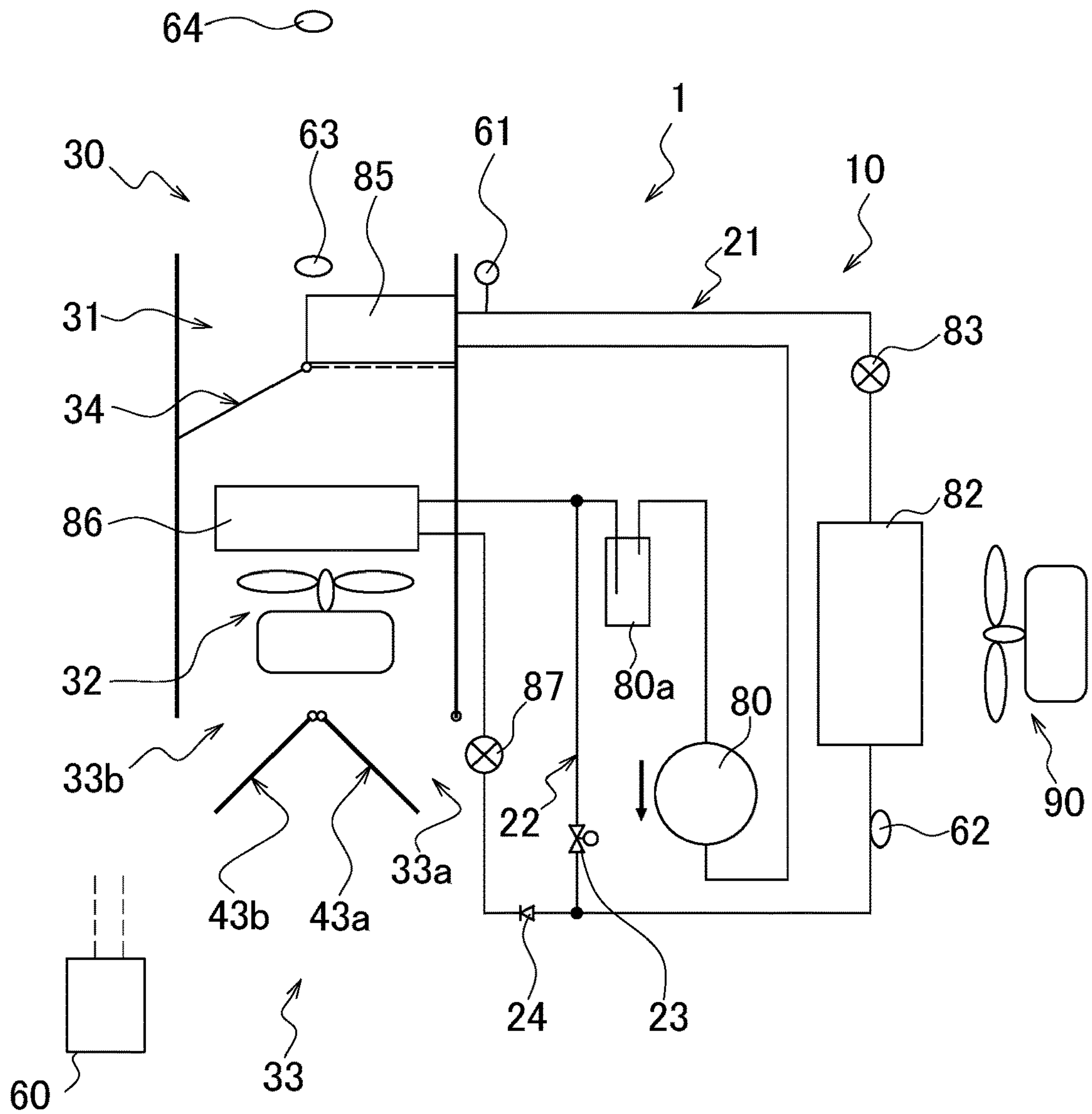
FIG. 3 is a schematic view of a configuration of an air conditioner for a vehicle according to a first embodiment of the present disclosure.

FIG. 3 is a schematic view of a configuration of the air conditioner 1 for a vehicle according to a first embodiment of the present disclosure. In FIG. 3, the air conditioner 1 for a vehicle is a vapor-compression refrigeration cycle device for a vehicle. The "refrigeration cycle device for a vehicle" is one type of refrigeration cycle device that is used in a vehicle, such as a gasoline vehicle, a hybrid vehicle, an electric vehicle, or a hydrogen vehicle.

The air conditioner 1 for a vehicle includes a refrigerant circuit 10, an air-conditioning unit 30, and a controlling device 60, which is controlling means.

The refrigerant circuit 10 is a vapor-compression refrigerant circuit that adjusts the temperature of blowing air that is blown into the interior of a vehicle.

The air-conditioning unit 30 blows the blowing air whose temperature has been adjusted by the refrigerant circuit 10 into the interior of a vehicle. The controlling device 60 controls the operation of various structural units of the air conditioner 1 for a vehicle.

The refrigerant circuit 10 is capable of being switched between a refrigerant circuit for a cooling mode (a cooling operation), in which the interior of the vehicle is cooled by cooling the blowing air, and a refrigerant circuit for a heating mode (a heating operation), in which the interior of the vehicle is heated by heating the blowing air.

(3-2) Refrigerant Circuit 10

Figure 4:
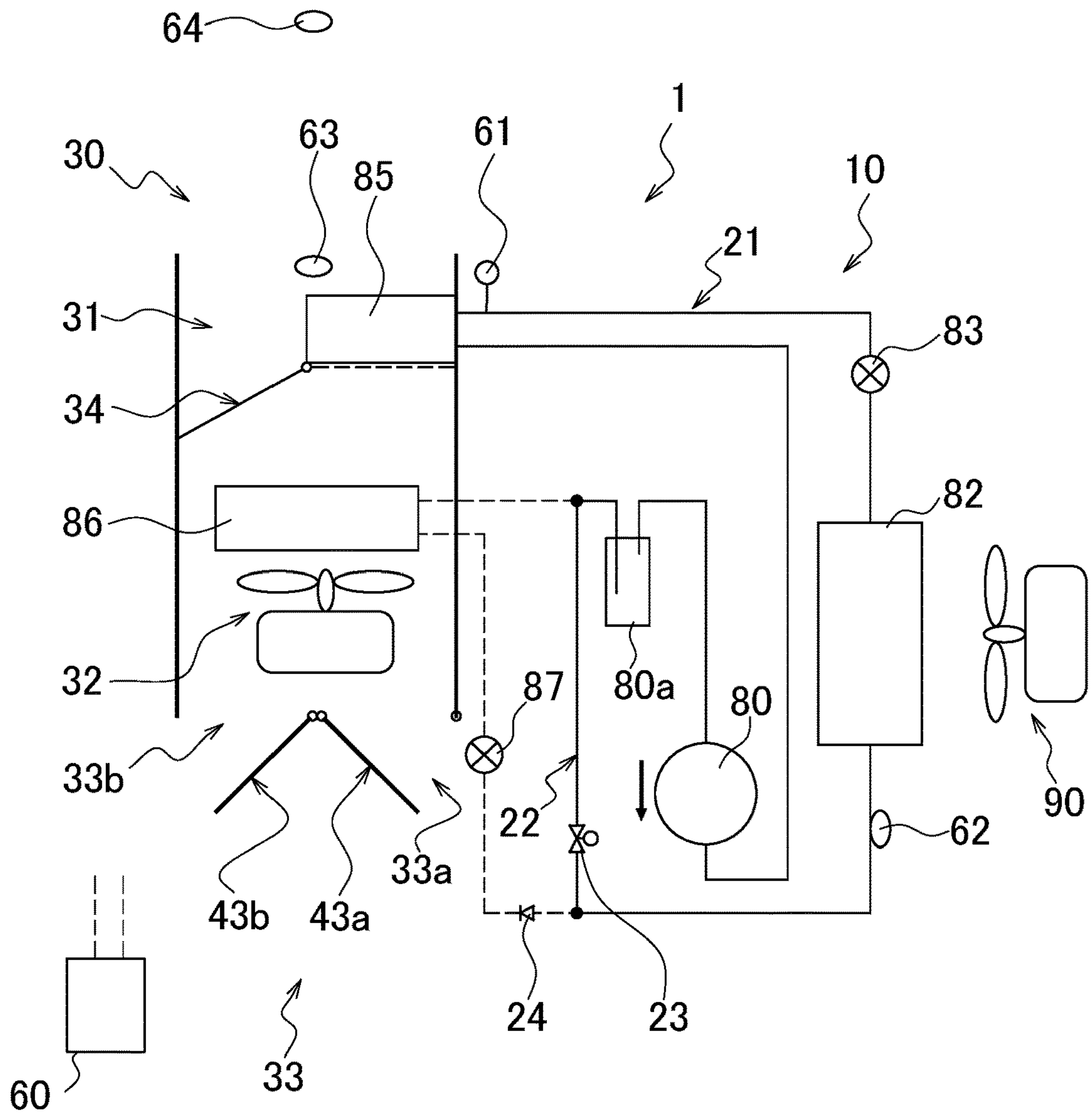
FIG. 4 is a schematic view of the configuration of the air conditioner for a vehicle, and illustrates a circulation path of a refrigerant in a heating mode.

FIG. 4 is a schematic view of the configuration of the air conditioner 1 for a vehicle, and illustrates a circulation path of a refrigerant in the heating mode. In FIG. 4, a portion in which the refrigerant in the heating mode circulates is indicated by a solid line, and a portion in which the circulation of the refrigerant is stopped is indicated by a broken line.

Figure 5:
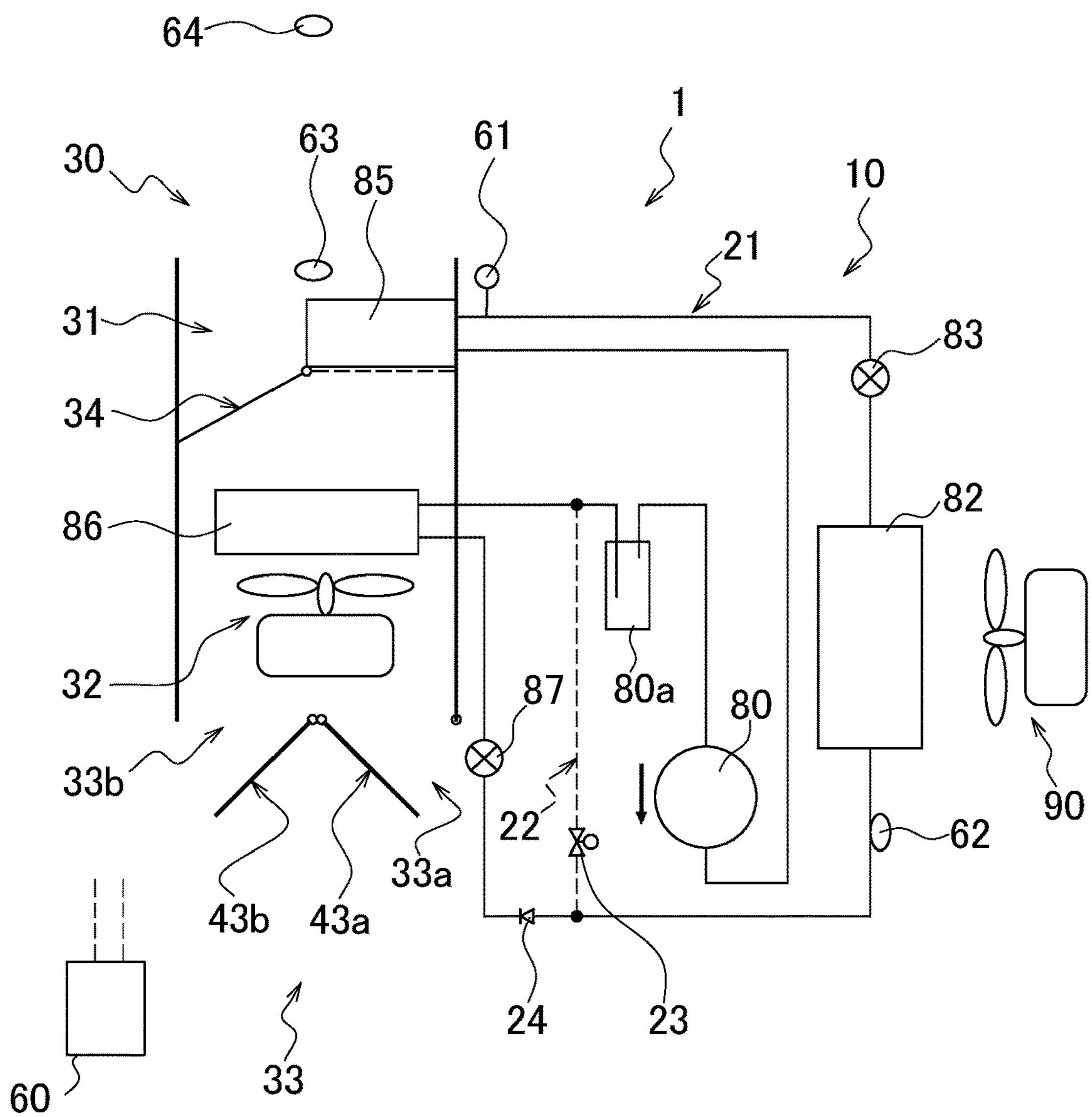
FIG. 5 is a schematic view of the configuration of the air conditioner for a vehicle, and illustrates a circulation path of a refrigerant in a cooling mode.

FIG. 5 is a schematic view of the configuration of the air conditioner 1 for a vehicle, and illustrates a circulation path of a refrigerant in the cooling mode. A portion in which the refrigerant in the cooling mode circulates is indicated by a solid line, and a portion in which the circulation of the refrigerant is stopped is indicated by a broken line.

The refrigerant circuit 10 includes, for example, a compressor 80, a first heat exchanger 85, an outside-air heat exchanger 82, a second heat exchanger 86, an accumulator 80*a*, a heating control valve 83, a cooling control valve 87, an, electromagnetic valve 23, and a check valve 24.

The compressor 80 compresses and discharges a sucked-in refrigerant. The first heat exchanger 85 is a heat exchanger that heats blowing air. The second heat exchanger 86 is a heat exchanger that cools the blowing air. The heating control valve 83 and the cooling control valve 87 constitute a decompressing device that decompresses and expands the refrigerant. The electromagnetic valve 23 is refrigerant-circuit switching means that switches the refrigerant circuit between the refrigerant circuit in the cooling mode and the refrigerant circuit in the heating mode.

(3-2-1) Compressor 80

In the compressor 80, a compression mechanism is driven by a motor. As the motor, for example, an alternating current motor whose number of rotations is controlled by using an alternating voltage that is output from an inverter is used.

The inverter outputs an alternating voltage having a frequency that is in accordance with a control signal that is output from the controlling device 60. A refrigerant 2 Discharge capacity of the compressor 80 is changed by using the number-of-rotations control output. As the compressor 80, various compressors, such as a swash-plate compressor, a scroll compressor, a multi-vane compressor, and a rotary compressor, can be used.

(3-2-2) Outside-Air Heat, Exchanger 82

The outside-air heat exchanger 82 causes a refrigerant that circulates therein and vehicle outdoor air blown from an outdoor fan 90 to exchange heat with each other. The outside-air heat exchanger 82 functions as an evaporator at the time of the heating mode. The outside-air heat exchanger 82 also functions as a heat dissipater at the time of the cooling mode. The number of rotations of the outdoor fan 90 is controlled by using a control voltage that is output from the controlling device 60.

(3-2-3) Heating Control Valve 83

The heating control valve 83 that decompresses a refrigerant at the time of the heating mode is connected to a location between a refrigerant outlet of the first heat exchanger 85 and a refrigerant inlet of the outside-air heat exchanger 82. Although the heating control valve 83 is, for example, an electrically powered expansion valve, the heating control valve 83 is not limited thereto.

(3-2-4) First Heat Exchanger 85

A discharge port of the compressor 80 and a refrigerant inlet of the first heat exchanger 85 are connected to each other by a discharge pipe. The first heat exchanger 85 is disposed in an air-conditioning duct 31 that forms an air passage for blowing air that; is blown into the interior of a vehicle in the air-conditioning unit 30.

The first heat exchanger 85 heats the blowing air by causing a refrigerant that circulates therein and the blowing air to exchange heat with each other.

(3-2-5) Second Heat Exchanger 86

The second heat exchanger 86 is a cooling heat exchanger that is disposed on an upstream side of the flow of the blowing air at the first heat exchanger 85 in the air-conditioning duct 31 and that cools the blowing air by causing a refrigerant that circulates therein and the blowing air to exchange heat with each other. A refrigerant outlet of the second heat exchanger 86 and an inlet of the accumulator 80*a* are connected to each other by a pipe. The accumulator 80*a* is a gas-liquid separator that separates a gas-liquid of a refrigerant that has flowed therein and that accumulates an excessive refrigerant in a cycle. Further, a gas-phase refrigerant outlet of the accumulator 80*a* and an intake port of the compressor 80 are connected to each other by an intake pipe.

(3-2-6) Cooling Control Valve 87

The cooling control valve 87 that decompresses a refrigerant at the time of the cooling mode is connected to a location between a refrigerant outlet of the outside-air heat exchanger 82 and a refrigerant inlet of the second heat exchanger 86.

The cooling control valve 87 is, for example, an electrically powered expansion valve. However, as long as the cooling control valve 87 is capable of performing its function of decompressing the refrigerant at the time of the cooling mode, the cooling control valve 87 is not limited thereto. For the cooling control valve 87, a fixed aperture, such as an orifice or a capillary tube, can be used.

(3-2-7) Bypass 22

A bypass 22 that bypasses the check valve 24, the cooling control valve 87, and the second heat exchanger 86 is provided between the refrigerant outlet of the outside-air heat exchanger 82 and the refrigerant outlet of the second heat exchanger 86. The electromagnetic valve 23 is provided in the bypass 22.

(3-2-8) Electromagnetic Valve 23

The electromagnetic valve 23 is an on/off valve. The electromagnetic valve 23 is refrigerant-circuit switching means that switches the refrigerant circuit between the refrigerant circuit in the cooling mode and the refrigerant circuit in the heating mode. The operation of the electromagnetic valve 23 is controlled by using a control signal that is output from the controlling device 60. The electromagnetic valve 23 is closed at the time of the cooling mode and is open at the time of the heating mode.

(3-2-9) Check Valve 24

The check valve 24 is provided in a refrigerant passage that connects the refrigerant outlet of the outside-air heat exchanger 82 and the refrigerant inlet of the second heat exchanger 86. The check valve 24 allows a refrigerant to circulate into the refrigerant inlet of the second heat exchanger 86 from the refrigerant outlet of the outside-air heat exchanger 82, and does not allow the refrigerant to circulate in the opposite direction.

(3-3) Air-Conditioning Unit 30

The air-conditioning unit 30 is disposed on an inner side of an instrument panel at a front portion in the interior of a vehicle. The air-conditioning unit 30 accommodates such as a fan 32, the second heat exchanger 86, the first heat exchanger 85, and an air mix door 34 in the air-conditioning duct 31 that forms the outer shell of the air-conditioning unit 30.

(3-3-1) Air-Conditioning Duct 31

The air-conditioning duct 31 is molded out of a resin (such as polypropylene) having some elasticity and having excellent strength. An air passage for blowing air that is blown into the interior of a vehicle is formed in the air-conditioning duct 31. An air take-in mechanism 33 that introduces air in the interior of the vehicle (inside air) or outside air into a case by switching between the inside air and the outside air is disposed on an uppermost stream side of the flow of the blowing air of the air-conditioning duct 31.

(3-3-2) Air Take-in Mechanism 33

The air take-in mechanism 33 has an inside-air take-in port **33*a* that takes in the inside air and an outside-air take-in port 33*b* that takes in the outside air. The inside-air take-in port 33*a* is opened and closed by an inside-air door 43*a*. The outside-air take-in port 33*b* is opened and closed by an outside-air door 43*b*. For example, when the inside-air door 43*a* and the outside-air door 43*b* are driven by a motor, the opening degree of the inside-air door 43*a* and the opening degree of the outside-air door 43*b* are adjusted by controlling the rotation amount of the motor by the controlling device 60. As a result, the ratio between the flow rates of the inside air and the outside air that flow into the air-conditioning duct 31** is adjusted.

The fan 32 that blows air sucked in via the air take-in mechanism 33 toward the interior of a vehicle is disposed on a downstream side of the flow of air of the air take-in mechanism 33. The fan 32, which is blowing means, is for example an electrically powered fan in which a centrifugal multi-blade fan is driven by an electrically powered motor, and whose number of rotations is controlled by a control voltage that is output from the controlling device 60.

The second heat exchanger 86 and the first heat exchanger 85 are such that the second heat exchanger 86 and the first heat exchanger 85 are sequentially disposed with respect to the flow of blowing air on a downstream side of the flow of air of the fan 32. The air mix door 34 that adjusts, with regard to blowing air that has passed through the second heat exchanger 86, the ratio between the airflow volume to be passed through the first heat exchanger 85 and the airflow volume not to be passed through the first heat exchanger 85 is disposed in the air-conditioning duct 31.

(3-3-3) Air Mix Door 34

The air mix door 34 is driven by, for example, a motor. The operation of the motor is controlled by using a control signal that is output from the controlling device 60.

In the embodiment, at the time of the heating mode, as shown in FIG. 4, the air mix door 34 is moved to a heating position at which the entire airflow volume of the blowing air that has passed through the second heat exchanger 86 is caused to flow into the first heat exchanger 85.

Therefore, the blowing air that has passed through the second heat exchanger 86 passes through the first heat exchanger 85, flows through a warm-air passage, and reaches an air mix section formed on an upstream side with respect to a plurality of blow-out opening portions.

At the time of the cooling mode, as shown in FIG. 5, the air mix door 34 is moved to a cooling position at which the entire airflow volume of the blowing air that has passed through the second heat exchanger 86 is caused to bypass the first heat exchanger 85.

Therefore, the blowing air that has passed through the second heat exchanger 86 flows into a cool-air passage and reaches the air mix section formed on the upstream side with respect to the plurality of blow-out opening portions.

An opening for blowing out into the interior of a vehicle, which is a space to be air-conditioned, the blowing air that has passed through the first heat exchanger 85 or the blowing air that has bypassed the first heat exchanger 85 is formed in a downmost stream portion of the flow of air of the air-conditioning duct 31.

Therefore, at the time of the cooling mode, the temperature of the blowing air that is blown out into the interior of the vehicle from the blow-out opening may be adjusted by adjusting the opening degree of the air mix door 34 and re-heating at the first heat exchanger 85 a part of the blowing air cooled at the second heat exchanger 86.

(3-4) Controlling Device 60

Figure 6:
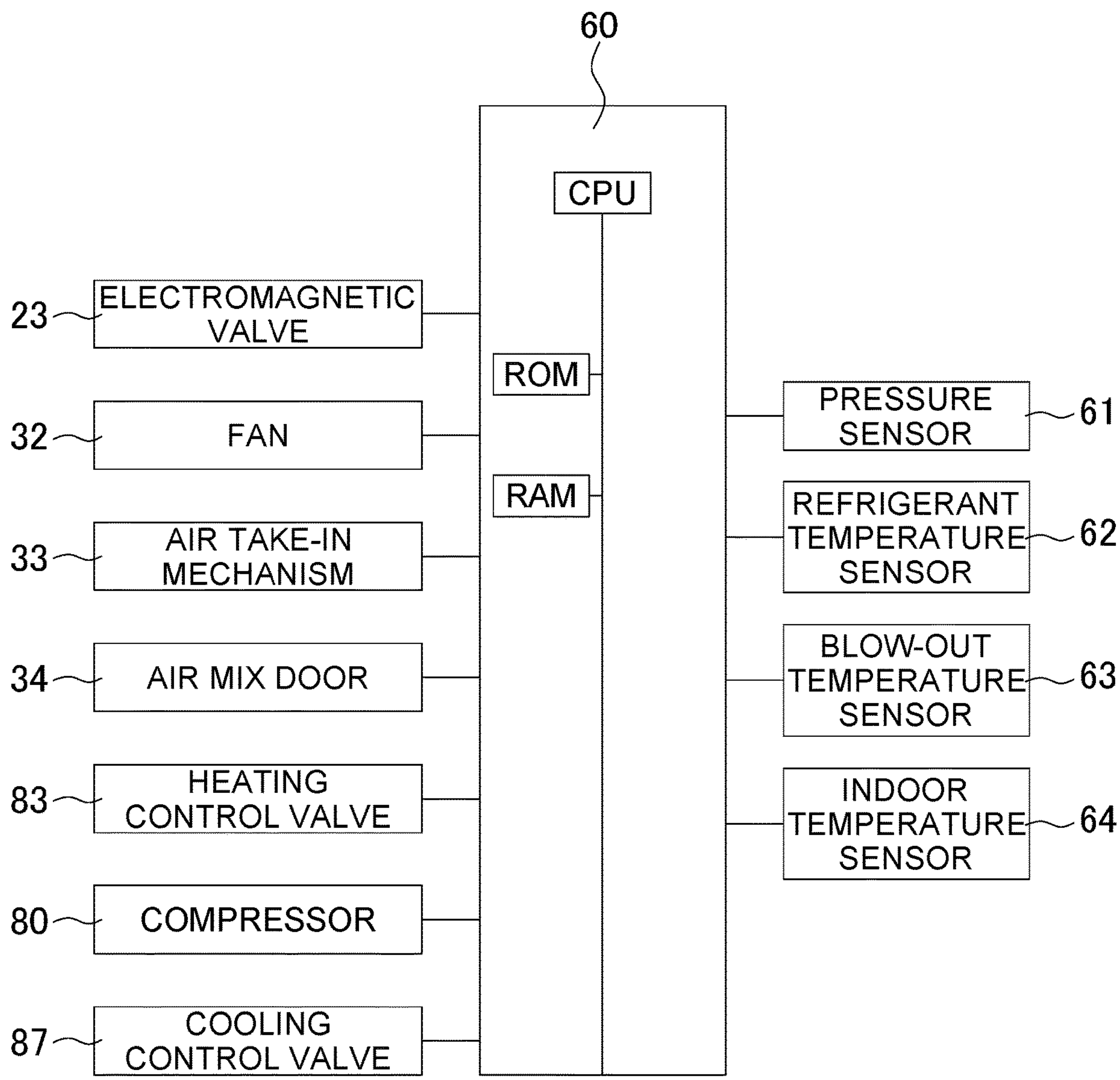
FIG. 6 is a block diagram of a controlling device.

FIG. 6 is a block diagram of the controlling device 60. In FIG. 6, the controlling device 60 is constituted by a known microcomputer and peripheral circuits thereof, the microcomputer including a CPU, ROM, RAM, etc. Based on an air-conditioning control program stored in ROM, various calculations and processing operations are performed to control the operations of, for example, the compressor 80, the heating control valve 83, the cooling control valve 87, the electromagnetic valve 23, and the fan 32, which are connected to an output side of the controlling device 60.

At the time of the heating mode, the controlling device 60 causes the electromagnetic valve 23 to open and the cooling control valve 87 to close to circulate a refrigerant in the refrigerant circuit 10 as shown in FIG. 4.

At the time of the cooling mode, the controlling device 60 causes the electromagnetic valve 23 to close and the heating control valve 83 to open fully to circulate a refrigerant in the refrigerant circuit 10 as shown in FIG. 5.

Detection signals of a group of air-conditioning control sensors such as a pressure sensor 61, a refrigerant temperature sensor 62, a blow-out temperature sensor 63, and an indoor temperature sensor 64 are input to an input side of the controlling device 60.

The pressure sensor 61 detects the temperature and the pressure of a refrigerant that has flowed out from the first heat exchanger 85 and that has not yet flowed into the heating control valve 83. The refrigerant temperature sensor 62 detects' the temperature of a refrigerant that is at the outlet of the outside-air heat exchanger and that flows out from the outside-air heat exchanger 82. The blow-out temperature sensor 63 detects the temperature of air that is blown into the interior of a vehicle immediately after that air has passed through the first heat exchanger 85. The indoor temperature sensor 64 detects the temperature of air in the interior of a vehicle.

(3-5) Operation of Air Conditioner 1 for Vehicle (3-5-1) Cooling Mode

In the cooling mode, the controlling device 60 closes the electromagnetic valve 23 and fully opens the heating control valve 83 to cause the cooling control valve 87 to be in an aperture state that allows it to decompress a refrigerant. Therefore, in the cooling mode, as indicated by a solid-line arrow in FIG. 5, a refrigerant circulates in the compressor 80, the first heat exchanger 85, the heating control valve 83, the outside-air heat exchanger 82, the cooling control valve 87, the second heat exchanger 86, the accumulator **80*a*, and the intake port of the compressor 80** in this order.

The opening degree of the air mix door 34 is determined so that the air mix door 34 allows the air-conditioning duct 31 to be fully open and so that the entire flow rate of the blowing air that has passed through the second heat exchanger 86 passes through the air-conditioning duct 31.

In the cooling mode, the refrigerant 2 Discharged from the compressor 80 flows into the first heat exchanger 85. Here, in the cooling mode, since the air mix door 34 allows the air-conditioning duct 31 to be fully open, the refrigerant that has flowed into the first heat exchanger 85 flows out from the first heat exchanger 85 without dissipating heat to the blowing air.

The refrigerant that has flowed out from the first heat exchanger 85 passes through the fully open heating control valve 83 and flows into the outside-air heat exchanger 82. The refrigerant that has flowed into the outside-air heat exchanger 82 exchanges heat with outside air blown from the fan 32 to dissipate heat.

Since the electromagnetic valve 23 is closed, the refrigerant that has flowed out from the outside-air heat exchanger 82 flows into the cooling control valve 87 and is decompressed. The refrigerant 2Decompressed at the cooling control valve 87 flows into the second heat exchanger 86.

The refrigerant that has flowed into the second heat exchanger 86 absorbs heat from the blowing air blown from the fan 32 and evaporates. Therefore, the blowing air is cooled.

The refrigerant that has flowed out from the second heat exchanger 86 flows into the accumulator **80*a* and is subjected to gas-liquid separation. A gas-phase refrigerant separated at the accumulator 80*a* is sucked into the compressor 80** and is compressed again.

In the air conditioner 1 for a vehicle in the cooling mode, the interior of the vehicle can be cooled by blowing out into the interior of the vehicle the blowing air cooled at the second heat exchanger 86.

(3-5-2) Heating Mode

In the heating mode, the controlling device 60 causes the heating control valve 83 to be in an aperture state, fully closes the cooling control valve 87, and opens the electromagnetic valve 23. Therefore, in the heating mode, as indicated by a solid-line arrow in FIG. 4, a refrigerant circulates in the compressor 80, the first heat exchanger 85, the heating control valve 83, the outside-air heat exchanger 82, the bypass 22, the accumulator **80*a*, and the intake port of the compressor 80** in this order.

The opening degree of the air mix door 34 is such that the air mix door 34 allows the air-conditioning duct 31 to be fully closed and the entire flow rate of the blowing air that has passed through the second heat exchanger 86 passes through the first heat exchanger 85.

In the heating mode, the refrigerant 2 Discharged from the compressor 80 flows into the first heat exchanger 85. The refrigerant that has flowed into the first heat exchanger 85 exchanges heat with the blowing air that has passed through the second heat exchanger 86 to dissipate heat. Therefore, the blowing air is heated.

The refrigerant that has flowed out from the first heat exchanger 85 flows into the heating control valve 83 and is decompressed. The refrigerant 2Decompressed at the heating control valve 83 flows into the outside-air heat exchanger 82.

The refrigerant that has flowed into the outside-air heat exchanger 82 absorbs heat from outside air blown from the outdoor fan 90 and evaporates.

The refrigerant that has flowed out from the outside-air heat exchanger 82 passes through the bypass 22 and flows into the accumulator **80*a*. The refrigerant that has flowed into the accumulator 80*a* is subjected to gas-liquid separation. A gas-phase refrigerant separated at the accumulator 80*a* is sucked into the compressor 80** and is compressed again.

In the air conditioner 1 for a vehicle in the heating mode, the interior of the vehicle can be heated by blowing out into the interior of the vehicle the blowing air heated at the first heat exchanger 85.

(3-5-3) Dehumidifying Heating Mode

In a dehumidifying heating mode, the controlling device 60 causes the heating control valve 83 to be in an aperture state, and fully opens the cooling control valve 87 or causes the cooling control valve 87 to be in an aperture state, and closes the electromagnetic valve 23. Therefore, in the dehumidifying heating mode, as indicated by the solid-line arrow in FIG. 5, a refrigerant circulates in the compressor 80, the first heat exchanger 85, the heating control valve 83, the outside-air heat exchanger 82, the cooling control valve 87, the second heat exchanger 86, the accumulator **80*a*, and the intake port of the compressor 80** in this order. That is, the refrigerant 2Essentially circulates similarly to the refrigerant in the cooling mode.

The opening degree of the air mix door 34 is such that the air mix door 34 allows the air-conditioning duct 31 to be fully closed as in the heating mode.

In the dehumidifying heating mode, the refrigerant 2 Discharged from the compressor 80 flows into the first heat exchanger 85, exchanges heat with blowing air that has been cooled and dehumidified at the second heat exchanger 86, and dissipates heat. Therefore, the blowing air is heated.

The refrigerant that has flowed out from the first heat exchanger 85 flows into the heating control valve 83 and is decompressed. The refrigerant 2Decompressed at the heating control valve 83 flows into the outside-air heat exchanger 82.

A low-pressure refrigerant that has flowed into the outside-air heat exchanger 82 absorbs heat from outside air blown from the outdoor fan 90 and evaporates.

Since the electromagnetic valve 23 is closed, the refrigerant that has flowed out from the outside-air heat exchanger 82 flows into the cooling control valve 87 and is decompressed. The refrigerant 2Decompressed at the cooling control valve 87 flows into the second heat exchanger 86.

The refrigerant that has flowed into the second heat exchanger 86 absorbs heat from the blowing air blown from a fan 84 and evaporates. Therefore, the blowing air is cooled.

The refrigerant that has flowed out from the second heat exchanger 86 flows into the accumulator **80*a* and is subjected to gas-liquid separation. A gas-phase refrigerant separated at the accumulator 80*a* is sucked into the compressor 80** and is compressed again.

In the air conditioner 1 for a vehicle, in the dehumidifying heating mode, the interior of a vehicle can be dehumidified and heated by re-heating at the first heat exchanger 85 the blowing air cooled and dehumidified at the second heat exchanger 86, and by blowing out the re-heated blowing air into the interior of the vehicle.

(3-5-4) Defrosting Mode

When the air conditioner 1 for a vehicle performs a defrosting operation, the air mix door 34 closes an air-flow path that extends toward the first heat exchanger 85. The electromagnetic valve 23 is in an open state. The heating control valve 83 is in a fully open state. The cooling control valve 87 is in a fully closed state.

A refrigerant compressed at the compressor 80 becomes a high-temperature, high-pressure refrigerant, and is discharged. The refrigerant 2 Discharged from the compressor 80 passes through the first heat exchanger 85.

Since the air mix door 34 closes the air-flow path that extends toward the first heat exchanger 85, the heat-dissipation amount of the refrigerant is smaller than the heat-dissipation amount of the refrigerant at the time of the heating operation.

The refrigerant that has passed through the first heat exchanger 85 passes through the fully open heating control valve 83 and flows into the outside-air heat exchanger 82. Therefore, the refrigerant 2Dissipates heat at the outside-air heat exchanger 82, as a result of which it is possible to raise the temperature of and defrost the outside-air heat exchanger 82.

The refrigerant that has flowed out from the outside-air heat exchanger 82 passes through the bypass 22 and flows into the accumulator 80*a*. The refrigerant that has flowed into the accumulator 80*a* is separated into a gas-phase refrigerant and a liquid-phase refrigerant, and the gas-phase refrigerant sucked into the compressor 80.

(3-6) Modifications

In the first embodiment, when the refrigerant that has flowed out from the outside-air heat exchanger 82 is caused to flow through the bypass 22, the electromagnetic valve 23 is in an open state and the cooling control valve 87 is in a fully closed state. In addition, when the refrigerant that has flowed out from the outside-air heat exchanger 82 is caused to flow through the second heat exchanger 86, the electromagnetic valve 23 is in a closed state and the cooling control valve 87 is in an aperture state.

However, the switching of a flow path in the refrigerant circuit is not limited to the methods above, and thus the flow path may be switched by using a three-way valve.

Figure 7:
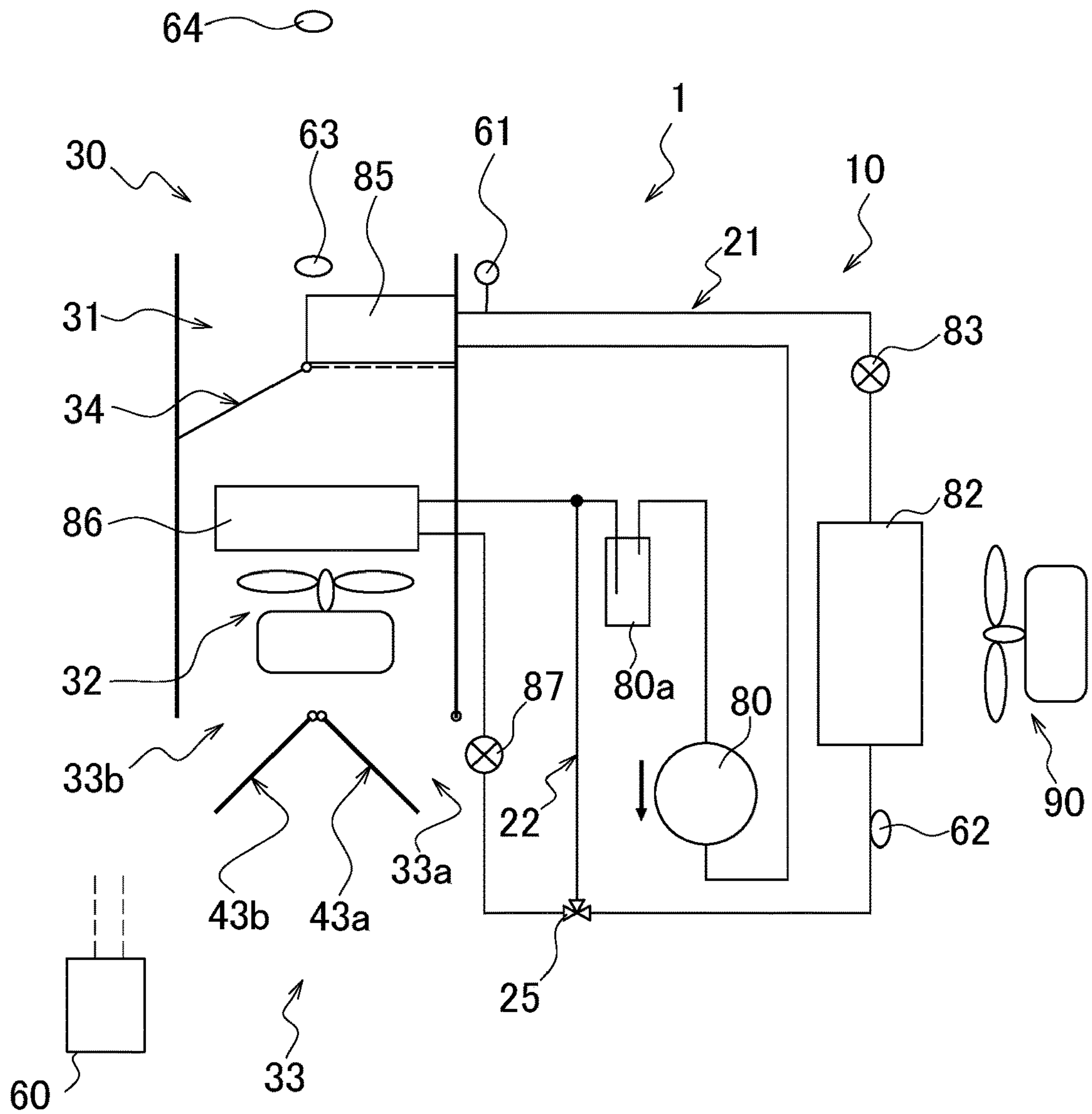
FIG. 7 is a schematic view of a configuration of an air conditioner for a vehicle according to a modification of the first embodiment.

FIG. 7 is a schematic view of a configuration of an air conditioner 1 for a vehicle according to a modification of the first embodiment. In FIG. 7, the modification differs from the first embodiment in that the electromagnetic valve 23 of the first embodiment is not used, and in that a three-way valve 25 is provided at a connection portion at which the bypass 22 and a pipe that is connected to an outlet of the outside-air heat exchanger 82 are connected to each other.

A flow of a refrigerant that has flowed out from the outside-air heat exchanger 82 is selected to be either one of a flow toward the bypass 22 and a flow toward the second heat exchanger 86 by the three-way valve 25.

(3-7) Features (3-7-1)

The air conditioner 1 for a vehicle includes the refrigerant circuit 10 in which a refrigerant that contains at least 1,2-difluoroethylene is sealed.

(3-7-2)

The air conditioner 1 for a vehicle includes the refrigerant circuit 10 in which a mixed refrigerant that contains at least 1132(E), 1234yf, and R32 is sealed.

(3-7-3)

The air conditioner 1 for a vehicle includes the refrigerant circuit 10 in which a refrigerant that contains at least 1132(E), 1123, and R1234yf is sealed.

(3-7-4)

The air conditioner 1 for a vehicle includes the refrigerant circuit 10 in which a refrigerant that contains at least 1132(E)/1234yf is sealed.

(3-7-5)

The air conditioner 1 for a vehicle includes the refrigerant circuit 10 in which a refrigerant that contains at least 1132a, R32, and R1234yf is sealed.

(3-7-6)

The air conditioner 1 for a vehicle includes the refrigerant circuit 10 in which a refrigerant that contains at least R32, R125, R1234yf, R134a, and $CO_2$ is sealed.

(4) Second Embodiment of Refrigeration Cycle Device for Vehicle

An air conditioner for a vehicle using any one of the refrigerant 1A, the refrigerant 1B, the refrigerant 1C, the refrigerant 1D, the refrigerant 1E, the refrigerant 2A, the refrigerant 2B, the refrigerant 2C, the refrigerant 2D, the refrigerant 2E, the refrigerant 3A, and the refrigerant 3B, and the refrigerating machine oil above is described below. The air conditioner for a vehicle is a refrigeration cycle device for a vehicle.

(4-1) Configuration of Air Conditioner 101 for Vehicle

Figure 8:
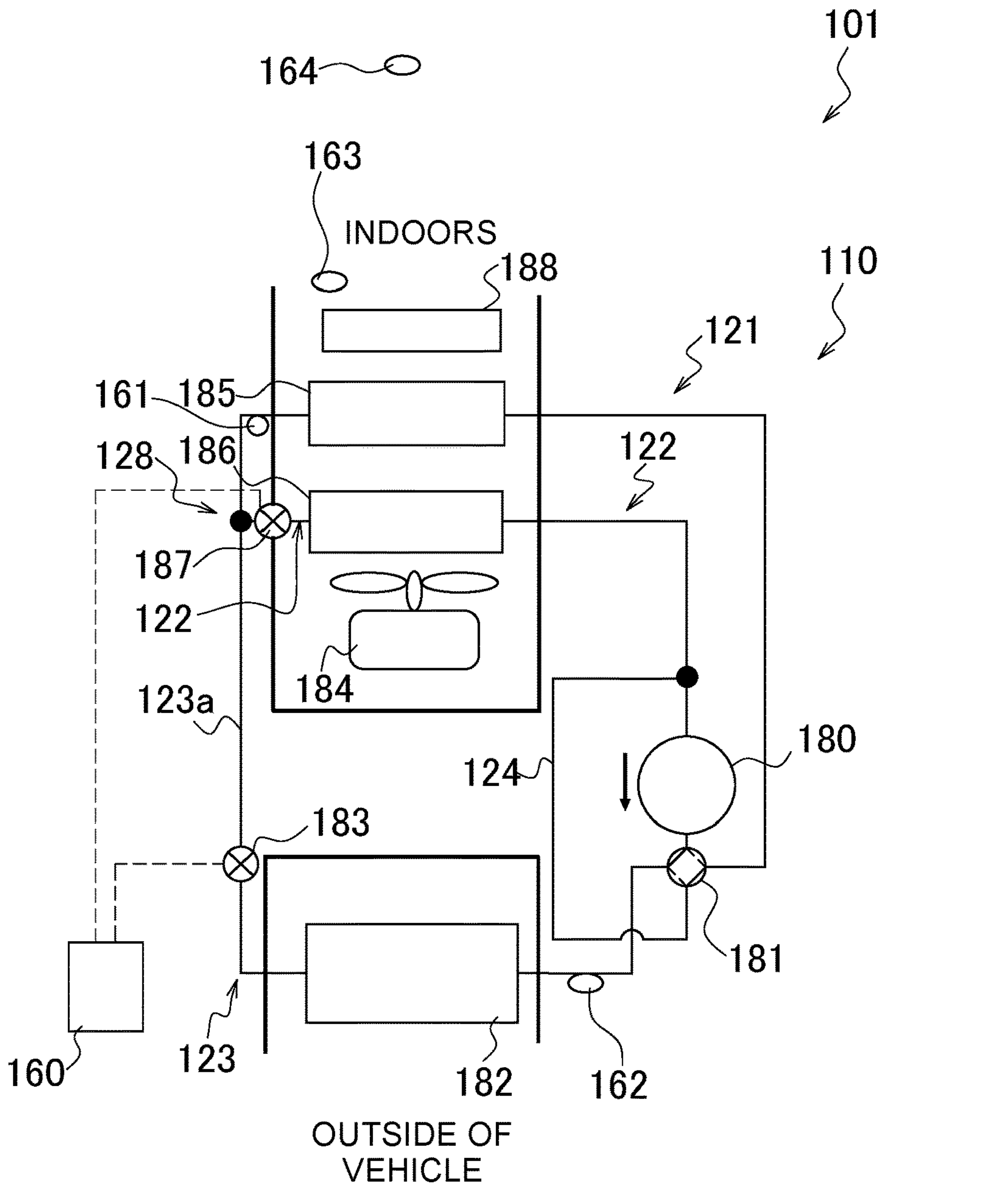
FIG. 8 is a schematic view of a configuration of an air conditioner for a vehicle according to a second embodiment of the present disclosure.

FIG. 8 is a schematic view of a configuration of an air conditioner 101 for a vehicle according to a second embodiment of the present disclosure. In FIG. 8, the air conditioner 101 for a vehicle includes a refrigerant circuit 110 and a controlling device 160. The controlling device 160 controls various units. In the air conditioner 101 for a vehicle, the controlling device 160 controls the various units of the air conditioner to thereby perform air-conditioning (such as cooling, heating, and dehumidifying and heating) in the interior of the vehicle.

(4-2) Refrigerant Circuit 110

As shown in FIG. 8, the refrigerant circuit 110 of the air conditioner 101 for a vehicle is a vapor-compression refrigerant circuit that primarily includes a compressor 180, a four-way switching valve 181, an outside-air heat exchanger 182, a first heat exchanger 185, and a second heat exchanger 186. The refrigerant circuit 110 also includes a branch portion 128.

The branch portion 128 is a portion at which a branch pipe 122 branches off from a main circuit 121 in the refrigerant circuit 110.

The branch pipe 122 is connected at one end to a first refrigerant pipe 123, and is connected at the other end to an intake-side refrigerant pipe 124 that connects the four-way switching valve 181 and an intake portion of the compressor 180 to each other. Therefore, even if a direction of circulation of a refrigerant in the main circuit 121 is changed, the refrigerant flows into the branch pipe 122 in the same one direction toward an intake side of the compressor 180 from the first refrigerant pipe 123.

Note that, in the embodiment, the one end of the branch pipe 122 is connected to a refrigerant pipe 123*a* that is a part of the first refrigerant pipe 123 and that connects a first control valve 183 and the first heat exchanger 185 to each other.

A second control valve 187, which is an expansion mechanism, and the second heat exchanger 186 are sequentially connected to the branch pipe 122.

As shown in FIG. 8, the compressor 180, the outside-air heat exchanger 182 that exchanges heat with outside air, the first control valve 183, and the first heat exchanger 185 for air-conditioning the interior of a vehicle are sequentially connected to the main circuit 121.

(4-2-1) Compressor 180

The compressor 180 is an inverter compressor whose number of rotations is variable, and is provided for compressing a gas refrigerant that has been sucked in.

As the compressor 180, various compressors, such as a swash-plate compressor, a scroll compressor, a multi-vane compressor, and a rotary compressor, can be used.

(4-2-2) Four-Way Switching Valve 181

The four-way switching valve 181 that is connected to the main circuit 121 constitutes a switching mechanism that changes a flow path of a refrigerant that flows in the main circuit 121.

Figure 10:
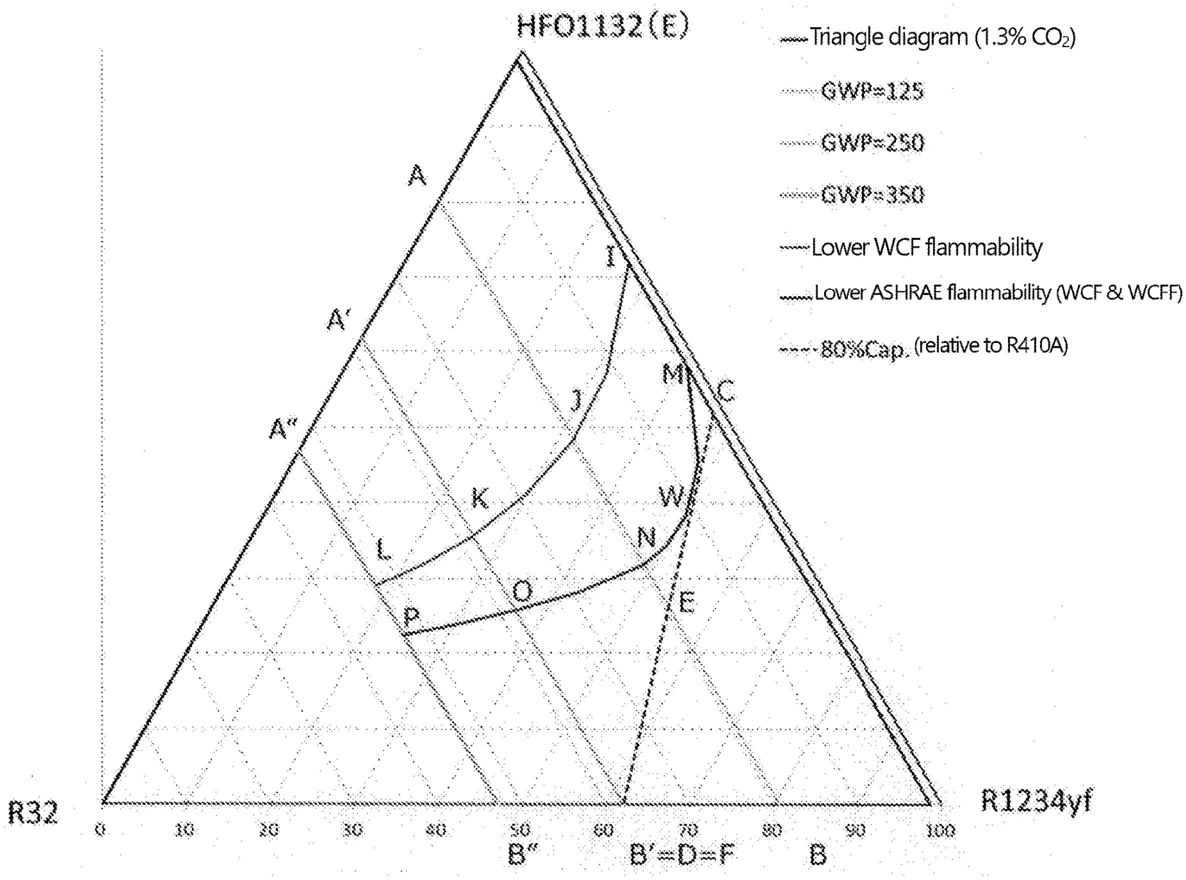
FIG. 10 is a schematic view of the configuration of the air conditioner for a vehicle, and illustrates a circulation path of a refrigerant in a heating mode.
Figure 9:
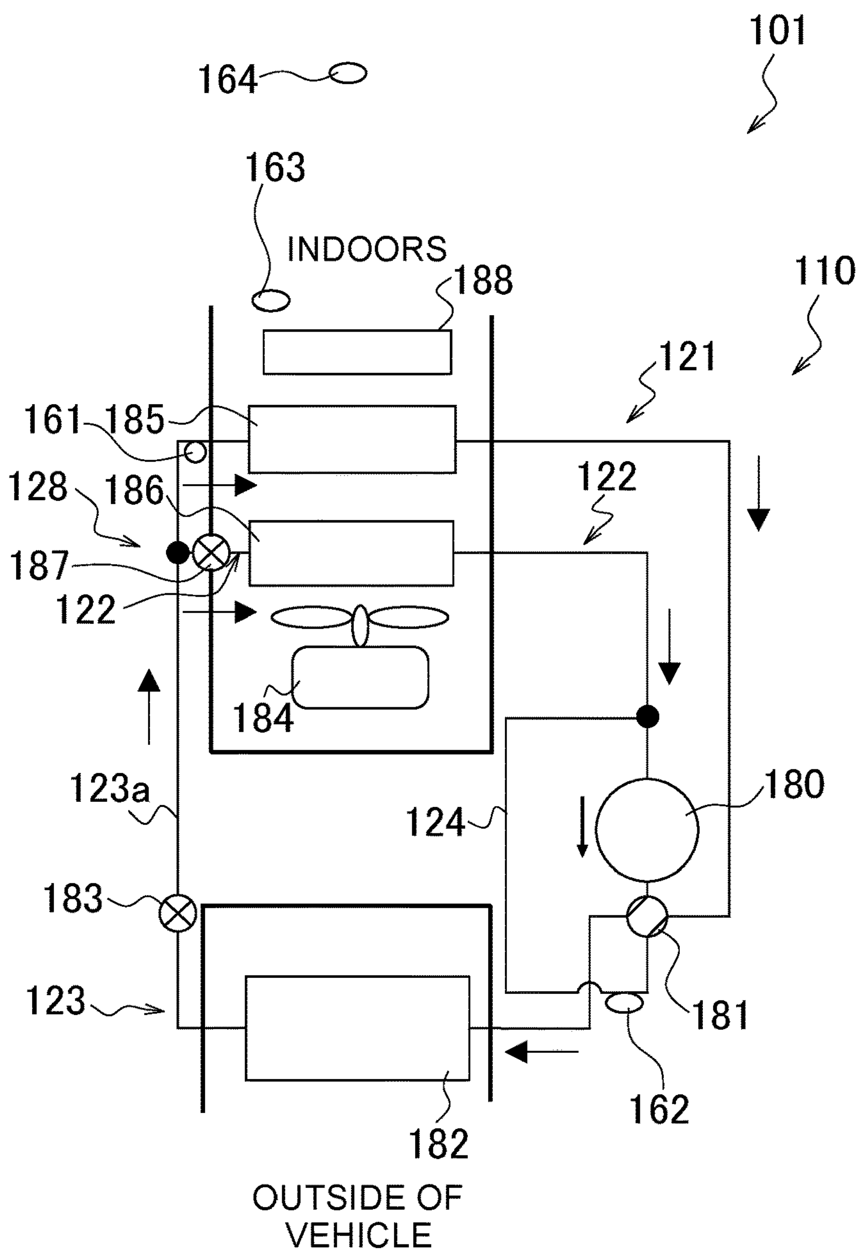
FIG. 9 is a schematic view of the configuration of the air conditioner for a vehicle, and illustrates a circulation path of a refrigerant in a cooling mode.
Figure 10:
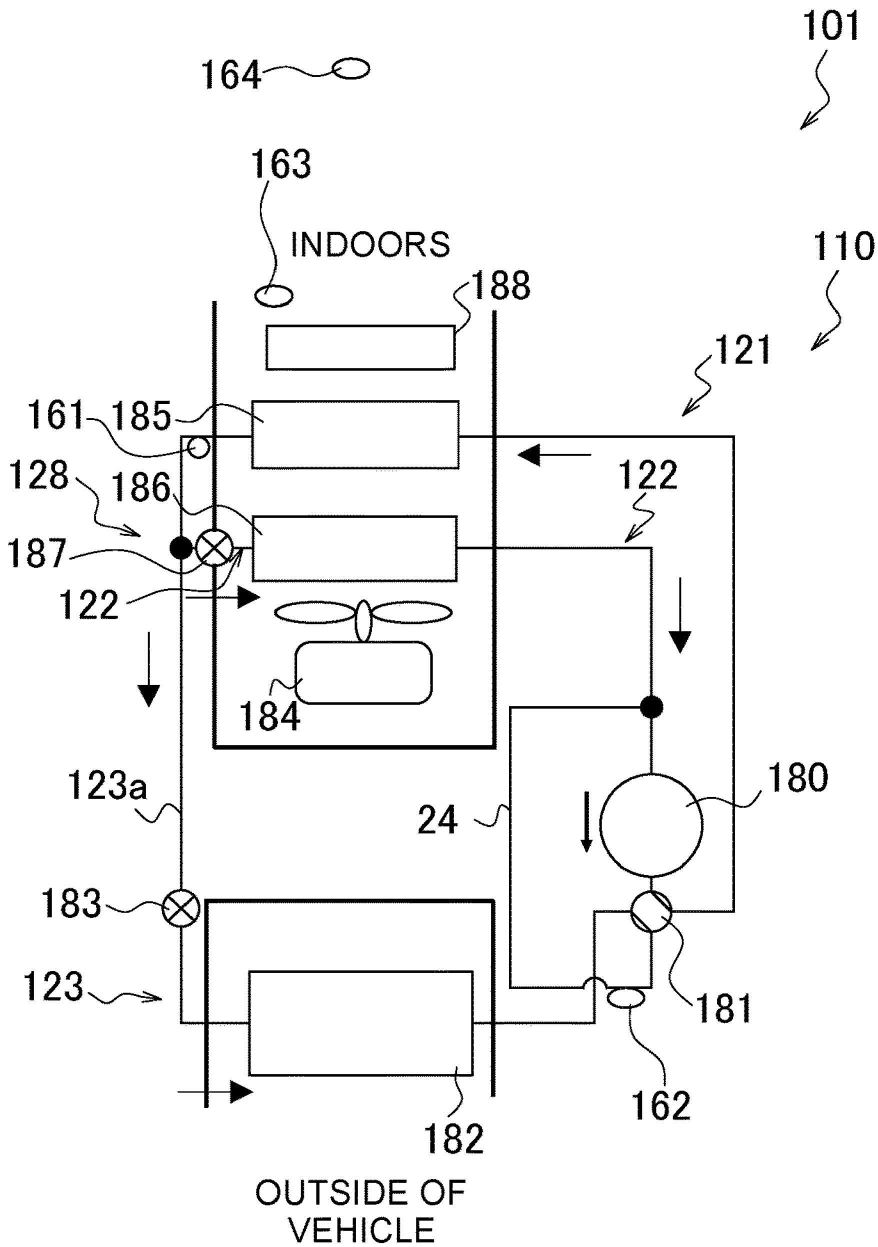

FIG. 9 is a schematic view of the configuration of the air conditioner 101 for a vehicle, and illustrates a circulation path of a refrigerant in the cooling mode. FIG. 10 is a schematic view of the configuration of the air conditioner 101 for a vehicle, and illustrates a circulation path of a refrigerant in the heating mode.

The four-way switching valve 181 is configured to switch between a first state (see the solid line in FIG. 8) and a second state (see the broken line in FIG. 8) to thereby allow a direction of circulation of a refrigerant in the main circuit 121 to be reversible (see FIGS. 9 and 10). The first state is a state in which the four-way switching valve 181 connects a discharge side of the compressor 180 and the outside-air heat exchanger 182 to each other and connects the first heat exchanger 185 and the intake side of the compressor 180 to each other. The second state is a state in which the four-way switching valve 181 connects the discharge side of the compressor 180 and the first heat exchanger 185 to each other and connects the outside-air heat exchanger 182 and the intake-side of the compressor 180 to each other.

(4-2-3) Outside-Air Heat Exchanger 182

The outside-air heat exchanger 182 is provided for causing heat to be exchanged between outside air and a refrigerant that flows in the outside-air heat exchanger 182.

(4-2-4) First Control Valve 183

The first control valve 183 is an electrically powered expansion valve for, for example, adjusting a refrigerant pressure or a refrigerant flow rate of a refrigerant that flows in the first refrigerant pipe 123 that connects the outside-air heat exchanger 182 and the first heat exchanger 185 to each other.

(4-2-5) First Heat Exchanger 185

The first, heat exchanger 185 is provided for allowing air in the interior of a vehicle as a heat source to exchange heat with a refrigerant. A fan 184 generates a flow of air that comes into contact with the first heat exchanger 185 to thereby make it possible for the air in the interior of the vehicle and the refrigerant that flows in the first heat exchanger 185 to exchange heat with each other.

(4-2-6) Second Heat Exchanger 186

Similarly to the first heat exchanger 185, the second heat exchanger 186 is provided for allowing air in the interior of a vehicle as a heat source to exchange heat with a refrigerant. The fan 184 generates a flow of air that comes into contact with the second heat exchanger 186 to thereby make it possible for the air in the interior of the vehicle and the refrigerant that flows in the second heat exchanger 186 to exchange heat with each other.

(4-2-7) Second Control Valve 187

The second control valve 187 is an electrically powered expansion valve for, for example, adjusting a refrigerant pressure or a refrigerant flow rate of a refrigerant that flows into the second heat exchanger 186 from the first refrigerant pipe 123, and is capable of causing the second heat exchanger 186 to function as an evaporator by adjusting a valve opening degree of the second control valve 187. The second control valve 187 is disposed on an intake side of the second heat exchanger 186.

In the embodiment, the refrigerant circuit 110 is designed so that, when a refrigerant flows toward the first heat exchanger 185 and the second heat exchanger 186 from the outside-air heat exchanger 182, the flow rate of the refrigerant that flows in the first heat exchanger 185 and the flow rate of the refrigerant that flows in the second heat exchanger 186 become a predetermined proportion. In the embodiment, when the heating capacity is insufficient at the time of dehumidifying and heating or at the time of heating the interior of a vehicle, a heater 188 is used as a heat source for heating the air in the interior of the vehicle. An output of the heater 188 is controlled, by the controlling device 60 based on the result of detection of the various sensors.

(4-3) Configuration of Controlling Device 160

Figure 11:
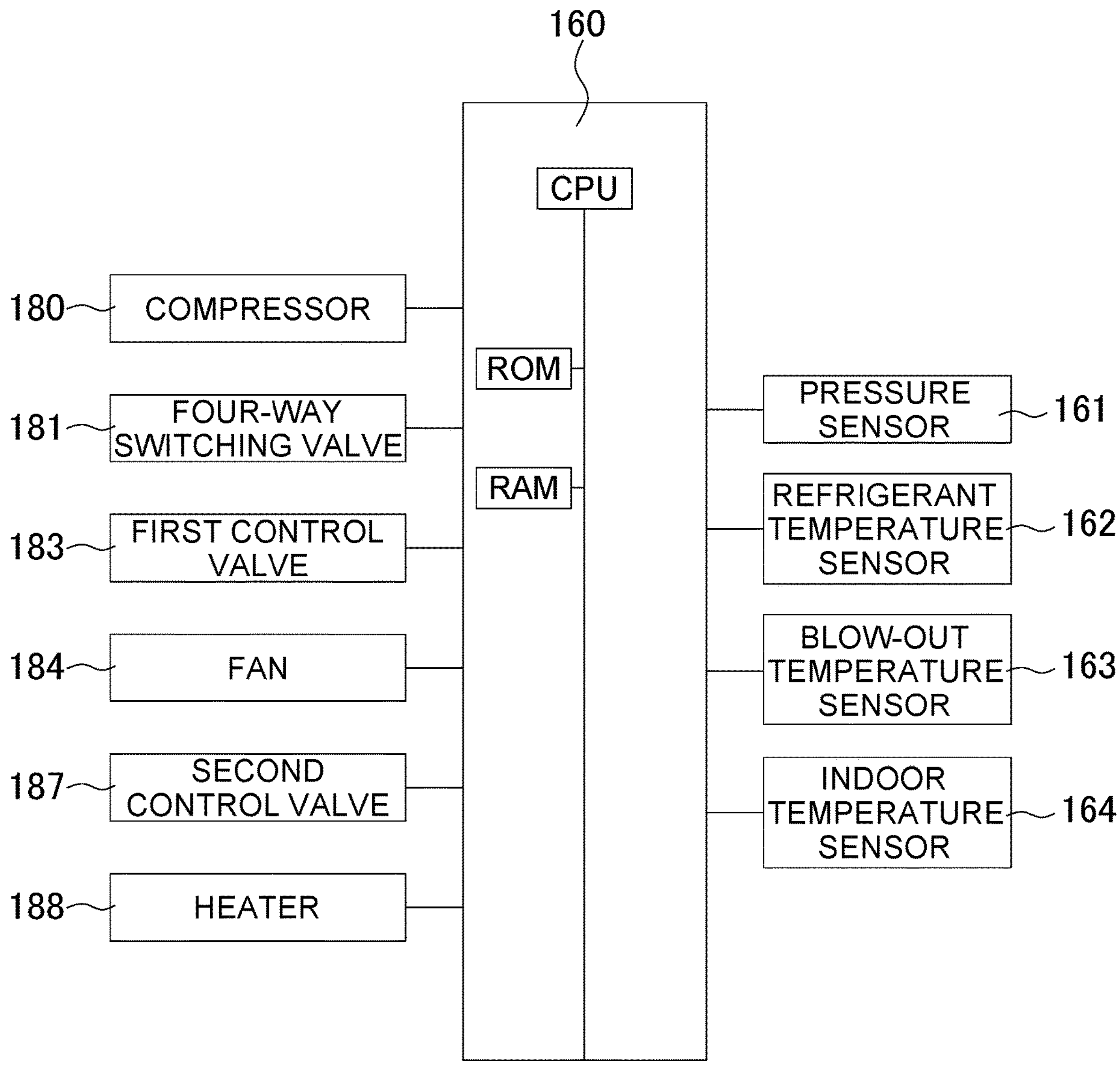
FIG. 11 is a block diagram of a controlling device.

FIG. 11 is a block diagram of the controlling device 160. In FIG. 11, the controlling device 160 is constituted by a known microcomputer and peripheral circuits thereof, the microcomputer including a CPU, ROM, RAM, etc. Based on an air-conditioning control program stored in ROM, various calculations and processing operations are performed to control the operations of, for example, the compressor 180, the four-way switching valve 181, the first control valve 183, the fan 184, the second control valve 187, and the heater 188, which are connected to an output side of the controlling device 160.

Detection signals of a group of air-conditioning control sensors such as a pressure sensor 161, a refrigerant temperature sensor 162, a blow-out temperature sensor 163, and an indoor temperature sensor 164 are input to an input side of the controlling device 160.

The pressure sensor 161 detects the temperature and the pressure of a refrigerant that has flowed out from the first heat exchanger 185 and that has not yet flowed into the first control valve 183. The refrigerant temperature sensor 162 detects the temperature of a refrigerant that is at an outlet of the outside-air heat exchanger and that flows out from the outside-air heat exchanger 182. The blow-out temperature sensor 163 detects the temperature of air that is blown into the interior of a vehicle immediately after that air has passed through the first heat exchanger 185. The indoor temperature sensor 164 detects the temperature of air in the interior of a vehicle.

The controlling device 160 performs control to adjust the valve opening degrees of the first control valve 183 and the second control valve 187 and to adjust the number of rotations of the fan 184 to thereby control the amounts of heat exchange at the first heat exchanger 185 and the second heat exchanger 186.

(4-4) Operation of Air Conditioner 101 for Vehicle

Next, the operations of the air conditioner 101 for a vehicle when, as an air-conditioning operation of the interior of the vehicle, a cooling operation is performed, a humidifying and heating operation is performed, a heating operation is performed, and a defrosting operation is performed are described.

(4-4-1) Cooling Mode

The arrows in FIG. 9 indicate flows of a refrigerant in the refrigerant circuit 110 at the time of the cooling mode. At the time of the cooling mode, the four-way switching valve 181 is switched to the first state, and the number of rotations of the compressor 180 is adjusted in accordance with the cooling capacity or the dehumidifying capacity in the interior of the vehicle.

The valve opening degree of the first control valve 183 is controlled so that the degree of superheating on an outlet side of the first heat exchanger 185 becomes a predetermined value. Further, the valve opening degree of the second control valve 187 is controlled so that the degree of superheating on an outlet side of the second heat exchanger 186 becomes a predetermined value.

A high-pressure gas refrigerant 2 Discharged from the compressor 180 exchanges heat with outside air at the outside-air heat exchanger 182, is cooled, and is condensed. After a high-pressure liquid refrigerant that has flowed out from the outside-air heat exchanger 182 has been decompressed at the first control valve 183, the refrigerant flows through the refrigerant pipe 123*a*, and reaches the first heat exchanger 185 or flows through the branch pipe 122 at a location partway in the refrigerant pipe 123*a*.

The refrigerant that has reached the first heat exchanger 185 exchanges heat with air in the interior of the vehicle that is blown by the fan 184, and the liquid refrigerant 2Evaporates and cools the air, as a result of which the interior of the vehicle is cooled. An evaporated gas refrigerant is sucked into the compressor 180 via the four-way switching valve 181.

On the other hand, the liquid refrigerant that has reached the branch pipe 122 flows into the second heat exchanger 186 via the second control valve 187. Then, the refrigerant that has flowed into the second heat exchanger 186 exchanges heat with air in the interior of the vehicle that is blown by the fan 184, and the liquid refrigerant 2Evaporates and cools the air, as a result of which the interior of the vehicle is cooled. An evaporated gas refrigerant merges with a refrigerant that flows in the intake-side refrigerant pipe 124, and is sucked into the compressor 180.

The refrigerant circulates in the refrigerant circuit 110 in this way, and the first heat exchanger 185 and the second heat, exchanger 186 function as evaporators, as a result of which the interior of the vehicle can be cooled or dehumidified.

(4-4-2) Dehumidifying Heating Mode

The arrows in FIG. 10 indicate flows of a refrigerant in the refrigerant circuit 110 in the dehumidifying heating mode. In the dehumidifying heating mode, the four-way switching valve 181 is switched to the second state, and the number of rotations of the compressor 180 is adjusted in accordance with the heating capacity in the interior of the vehicle.

The valve opening degree of the first control valve 183 is controlled so that the degree of superheating on an outlet side of the outside-air heat exchanger 182 becomes a predetermined value. Further, the valve opening degree of the second control valve 187 is adjusted in accordance with the dehumidifying capacity in the interior of the vehicle.

A high-pressure gas refrigerant 2 Discharged from the compressor 180 exchanges heat with, at the first heat exchanger 185, air in the interior of the vehicle that is blown by the fan 184, and is condensed and heats the air, as a result of which the interior of the vehicle is heated. The high-pressure liquid refrigerant that has flowed out from the first heat exchanger 185 flows through the refrigerant pipe 123*a*, and reaches the first control valve 183 or flows through the branch pipe 122 at a location partway in the refrigerant pipe 123*a*.

After the liquid refrigerant that has reached the first control valve 183 has been decompressed at the first control valve 183, the liquid refrigerant flows into the outside-air heat exchanger 182. In the outside-air heat exchanger 182, the liquid refrigerant that has flowed in evaporates by exchanging heat with outside air. An evaporated gas refrigerant is sucked into the compressor 180 via the four-way switching valve 181.

On the other hand, after the liquid refrigerant that has flowed into the branch pipe 122 has been decompressed at the second control valve 187, the liquid refrigerant flows into the second heat exchanger 186. Then, the refrigerant that has flowed into the second heat exchanger 186 exchanges heat, with air in the interior of the vehicle that is blown by the fan 184, and the liquid refrigerant 2Evaporates and cools the air, as a result of which the interior of the vehicle is dehumidified. An evaporated gas refrigerant merges with a refrigerant that flows in the intake-side refrigerant pipe 124, and is sucked into the compressor 180.

The refrigerant circulates in the refrigerant circuit 110 in this way; and the first heat exchanger 185 functions as a condenser, as a result of which the interior of the vehicle can be heated, and the second heat exchanger 186 functions as an evaporator, as a result of which the interior of the vehicle can be dehumidified.

(4-4-3) Heating Mode

Since the heating mode is a mode in which the dehumidifying operation in the dehumidifying heating mode in FIG. 10 is not performed, the heating mode is described with reference to FIG. 10. In the heating mode, the four-way switching valve 181 is switched to the second state, and the number of rotations of the compressor 180 is adjusted in accordance with the heating capacity in the interior of a vehicle.

The valve opening degree of the first control valve 183 is controlled so that the degree of superheating on the outlet side of the outside-air heat exchanger 182 becomes a predetermined value. The second control valve 187 is in a fully closed state.

A high-pressure gas refrigerant 2 Discharged from the compressor 180 exchanges heat with, at the first heat exchanger 185, air in the interior of the vehicle that is blown by the fan 184, and is condensed and heats the air, as a result of which the interior of the vehicle is heated. The high-pressure liquid refrigerant that has flowed out from the first heat exchanger 185 flows into the refrigerant pipe 123*a* and reaches the first control valve 183. Note that since the second control valve 187 is in a fully closed state, the refrigerant will not flow into the branch pipe 122 at a location partway in the refrigerant pipe 123*a*.

After the liquid refrigerant that has reached the first control valve 183 has been decompressed at the first control valve 183, the liquid refrigerant flows into the outside-air heat exchanger 182. In the outside-air heat exchanger 182, the liquid refrigerant that has flowed in evaporates by exchanging heat with outside air. An evaporated gas refrigerant is sucked into the compressor 180 via the four-way switching valve 181.

The refrigerant circulates in the refrigerant circuit 110 in this way and the first heat exchanger 185 functions as a condenser, as a result of which the interior of the vehicle can be heated.

(4-4-4) Defrosting Mode

Since the defrosting mode is a mode in which the first control valve 183 and the second control valve 187 are in a fully open state in the flow of the refrigerant in the cooling mode in FIG. 9, the defrosting mode is described with reference to FIG. 9.

A refrigerant compressed at the compressor 180 is discharged as a high-temperature, high-pressure refrigerant. The refrigerant 2 Discharged from the compressor 180 flows into the outside-air heat exchanger 182. Therefore, the refrigerant 2Dissipates heat at the outside-air heat exchanger 182, as a result of which it is possible to raise the temperature of the outside-air heat exchanger 182 and perform defrosting.

The refrigerant that has flowed out from the outside-air heat exchanger 182 flows through the fully-open first control valve 183, the refrigerant pipe 123*a*, and the first heat exchanger 185, and is sucked into the compressor 180 via the four-way switching valve 181.

On the other hand, a liquid refrigerant that has reached the branch pipe 122 flows through the fully-open second control valve 187 and the second heat exchanger 186, merges with a refrigerant that flows through the intake-side refrigerant pipe 124, and is sucked into the compressor 180.

(4-5) Modifications

In the second embodiment, the first heat exchanger 185 and the second heat exchanger 186 are provided side by side as heat exchangers for inside air, the first heat exchanger 185 is caused to function as a condenser, and the second heat exchanger 186 is caused to function as an evaporator to make it possible to dehumidify and heat, at the same time.

However, the configuration is not limited thereto. Two heat exchangers may be provided in series, and an expansion mechanism may provided between these two heat exchangers.

Figure 12:
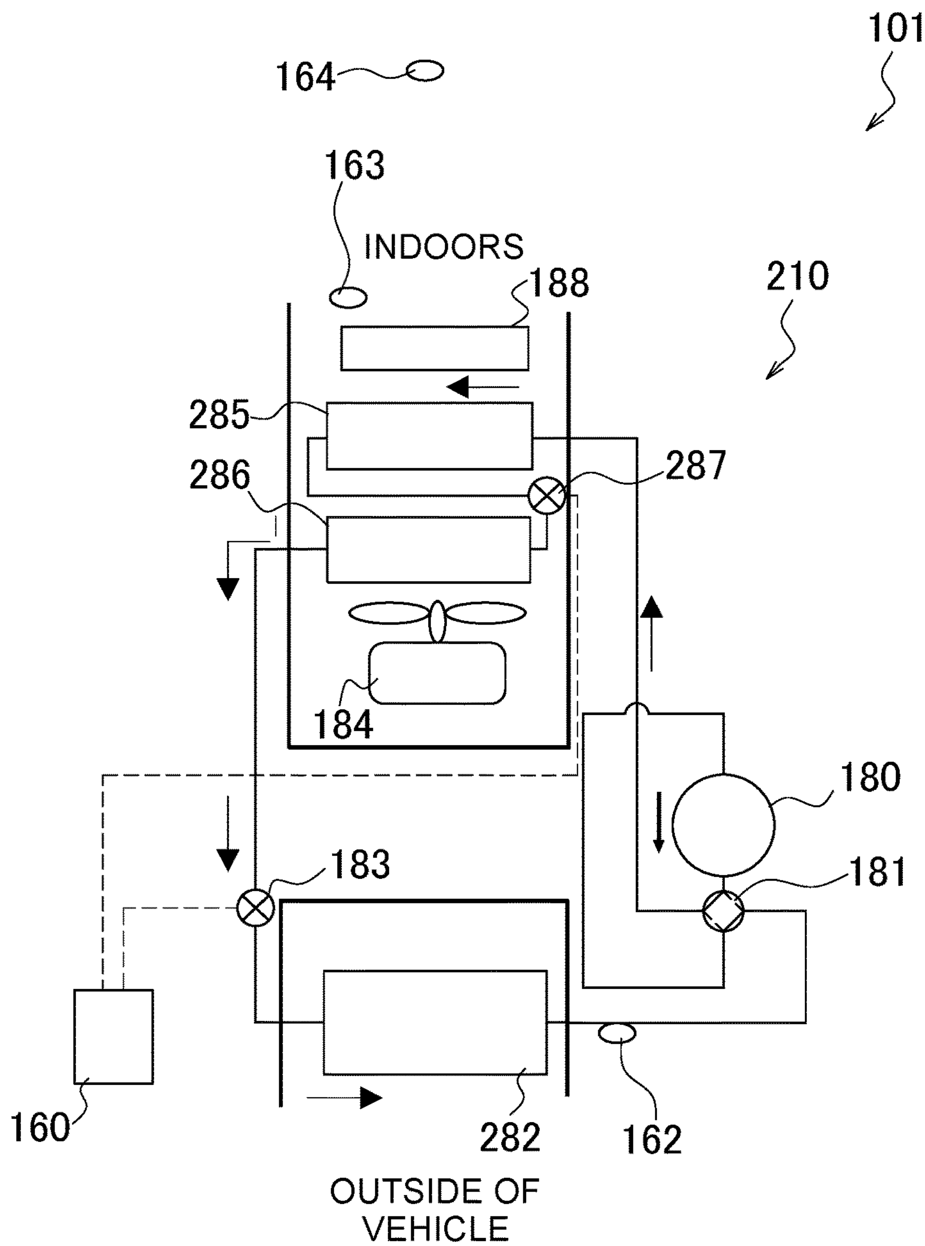
FIG. 12 is a schematic view of a configuration of an air conditioner for a vehicle according to a modification of the second embodiment.

FIG. 12 is a schematic view of a configuration of an air conditioner 101 for a vehicle according to a modification of the second embodiment. In FIG. 12, in a refrigerant circuit 210, a first heat exchanger 285, a second heat exchanger 286, and an outside-air heat exchanger 282 are provided in series, and a control valve 287 is provided as an expansion mechanism between the first heat exchanger 285 and the second heat exchanger 286. Note that, in FIG. 12, units labelled with the same reference numerals as those in the second embodiment have the same functions and are not described below.

Here, an operation in the dehumidifying heating mode is described as an example. In the air conditioner 101 for a vehicle, a refrigerant is decompressed by the control valve 287, the first heat exchanger 285 is caused to function as a condenser, and the second heat exchanger 286 and the outside-air heat exchanger 282 are caused to function as evaporators. Therefore, it is possible to dehumidify and heat the interior of the vehicle.

(4-6) Features (4-6-1)

The air conditioner 101 for a vehicle includes the refrigerant circuit 110 in which a refrigerant that contains at least 1,2-difluoroethylene is sealed.

(4-6-2)

The air conditioner 101 for a vehicle includes the refrigerant circuit 110 in which a mixed refrigerant that contains at least 1132(E), 1234yf, and R32 is sealed.

(4-6-3)

The air conditioner 101 for a vehicle includes the refrigerant, circuit 110 in which a refrigerant that contains at least 1132(E), 1123, and R1234yf is sealed.

(4-6-4)

The air conditioner 101 for a vehicle includes the refrigerant circuit 110 in which a refrigerant that contains at least 1132(E)/1234yf is sealed.

(4-6-5)

The air conditioner 101 for a vehicle includes the refrigerant circuit 110 in which a refrigerant that contains at least 1132a, R32, and R1234yf is sealed.

(4-6-6)

The air conditioner 101 for a vehicle includes the refrigerant circuit 110 in which a refrigerant that contains at least R32, R125, R1234yf, R134a, and $CO_2$ is sealed.

Other Embodiments

The refrigerant circuit may be a refrigerant circuit that uses an economizer heat exchanger and an injection valve.

The economizer heat exchanger has a first flow path and a second flow path, and is configured to exchange heat with a refrigerant that flows in the first flow path and a refrigerant that flows in the second flow path.

The first flow path constitutes a part of a liquid refrigerant pipe. The second flow path constitutes a part of an injection flow path. The injection flow path is a refrigerant flow path that connects the liquid refrigerant pipe and a compression chamber during compression of the compressor to each other. The injection flow path is a refrigerant flow path that branches off from the liquid refrigerant pipe, and that communicates with the compression chamber during compression of the compression mechanism of the compressor.

The injection valve is, for example, an electrically powered valve whose opening degree is capable of being adjusted. The injection valve is provided at a portion, at which the liquid refrigerant pipe and the second flow path of the economizer heat exchanger are connected to each other, of the injection flow path.

When the injection valve is opened, a refrigerant that has branched off from the liquid refrigerant pipe and that has passed through the injection valve flows into the second flow path of the economizer heat exchanger. Then, the refrigerant that has flowed into the second flow path exchanges heat with a refrigerant that flows in the first flow path, becomes a gas-phase refrigerant, and is supplied to the compression chamber during the compression of the compression mechanism of the compressor.

Although the embodiments of the present disclosure are described above, it is to be understood that various changes can be made in the forms and details without departing from the spirit and the scope of the present disclosure described in the claims.

REFERENCE SIGNS LIST

- 1 air conditioner for vehicle (refrigeration cycle device for vehicle)
- 10 refrigerant circuit
- 80 compressor
- 82 outside-air heat exchanger (condenser, evaporator)
- 83 heating control valve (decompressor)
- 85 first, heat exchanger (condenser)
- 86 second heat exchanger (evaporator)
- 87 cooling control valve (decompressor)
- 101 air conditioner for vehicle (refrigeration cycle device for vehicle)
- 110 refrigerant circuit
- 180 compressor
- 182 outside-air heat exchanger (condenser, evaporator)
- 183 first control valve (decompressor)
- 185 first heat exchanger (evaporator, condenser)
- 186 second heat exchanger (evaporator)
- 187 second control valve (decompressor)
- 210 refrigerant circuit

CITATION LIST

Patent Literature

PTL 1: International Publication No. 2005/105947

PTL 2: International Publication No. 2015/141678

PTL 3: Japanese Unexamined Patent Application Publication No. 2018-184597

The invention claimed is:

1. A refrigeration method comprising operating a refrigeration cycle device for a vehicle, wherein the operating comprises applying a refrigerant as an alternative refrigerant for R1234yf alone, wherein a first equipment designed for operation using R1234yf alone is operated using the alternative refrigerant, optionally with changes of a few parts and adjustment of the first equipment, or a second equipment designed for operation using the alternative refrigerant is operated for the same use as an existing use with R1234yf by using the alternative refrigerant, wherein:

the refrigeration cycle device comprises a refrigerant circuit, the refrigerant circuit comprises a compressor, a condenser, a decompressor, and an evaporator;

the refrigerant is sealed in the refrigerant circuit, the refrigerant comprises at least trans-1,2-difluoroethylene (HFO-1132(E)) and 2,3,3,3-tetrafluoropropene (HFO-1234yf), and the refrigerant comprises HFO-1132(E) and HFO-1234yf in such amounts that the sum of HFO-1132(E) and HFO-1234yf is 99.7 mass % or more.

2. The refrigeration method according to claim 1, wherein the refrigerant comprises HFO-1132(E) and HFO-1234yf, a content rate of HFO-1132(E) is 35.0 to 65.0 mass % and a content rate of HFO-1234yf is 65.0 to 35.0 mass %, based on a total mass of HFO-1132(E) and HFO-1234yf, and an evaporating temperature is −75 to −5° C.

3. The refrigeration method according to claim 1, wherein a content rate of HFO-1132(E) is 41.3 to 53.5 mass % and a content rate of HFO-1234yf is 58.7 to 46.5 mass %, based on a total mass of HFO-1132(E) and HFO-1234yf.

4. The refrigeration method according to claim 2, wherein the refrigerant consists only of HFO-1132(E) and HFO-1234yf.

5. The refrigeration method according to claim 1, wherein the refrigerant comprises HFO-1132(E) and HFO-1234yf, and a content rate of HFO-1132(E) is 40.5 to 49.2 mass % and a content rate of HFO-1234yf is 59.5 to 50.8 mass %, based on a total mass of HFO-1132(E) and HFO-1234yf.

6. The refrigeration method according to claim 5, wherein the refrigerant consists only of HFO-1132(E) and HFO-1234yf.

7. The refrigeration method according to claim 1, wherein the refrigerant comprises HFO-1132(E) and HFO-1234yf, and a content rate of HFO-1132(E) is 31.1 to 39.8 mass % and a content rate of HFO-1234yf is 68.9 to 60.2 mass %, based on a total mass of HFO-1132(E) and HFO-1234yf.

8. The refrigeration method according to claim 1, wherein a content rate of HFO-1132(E) is 31.1 to 37.9 mass % and a content rate of HFO-1234yf is 68.9 to 62.1 mass %, based on a total mass of HFO-1132(E) and HFO-1234yf.

9. The refrigeration method according to claim 7, wherein the refrigerant consists only of HFO-1132(E) and HFO-1234yf.

10. The refrigeration method according to claim 1, wherein the refrigerant comprises HFO-1132(E) and HFO-1234yf, and a content of HFO-1132(E) is 21.0 to 28.4 mass % and a content of HFO-1234yf is 79.0 to 71.6 mass %, based on a total mass of HFO-1132(E) and HFO-1234yf.

11. The refrigeration method according to claim 10, wherein the refrigerant consists only of HFO-1132(E) and HFO-1234yf.

12. The refrigeration method according to claim 1, wherein the refrigerant comprises HFO-1132(E) and HFO-1234yf, a content of HFO-1132(E) is 12.1 to 72.0 mass % and a content of HFO-1234yf is 87.9 to 28.0 mass %, based on a total mass of HFO-1132(E) and HFO-1234yf, and the device is in-car air conditioning equipment.

* * * * *